US005680568A

United States Patent [19]

Sakamura

[11] Patent Number: 5,680,568

[45] Date of Patent: Oct. 21, 1997

[54] INSTRUCTION FORMAT WITH SEQUENTIALLY PERFORMABLE OPERAND ADDRESS EXTENSION MODIFICATION

[75] Inventor: Ken Sakamura, Tokyo, Japan

[73] Assignee: Mitsubishi Denki Kabushiki Kaisha, Tokyo, Japan; a part interest

[21] Appl. No.: 260,031

[22] Filed: Jun. 15, 1994

Related U.S. Application Data

[63] Continuation of Ser. No. 763,473, Sep. 20, 1991, abandoned, which is a continuation of Ser. No. 563,749, Aug. 3, 1990, abandoned, which is a continuation of Ser. No. 170,972, Mar. 21, 1988, abandoned.

[30] Foreign Application Priority Data

Sep. 30, 1987 [JP] Japan .................................. 62-247419

[51] Int. Cl.[6] ...................................................... G06F 9/345

[52] U.S. Cl. ................................. 395/421.1; 395/421.04; 395/571; 395/386; 395/800

[58] Field of Search .................................... 395/800, 375, 395/775, 376, 386, 567, 571, 410, 421.04, 421.1; 364/749

[56] References Cited

U.S. PATENT DOCUMENTS

| | | | |
|---|---|---|---|
| 3,614,741 | 10/1971 | McFarland, Jr. | 395/421.04 |
| 3,657,705 | 4/1972 | Mekota et al. | 364/200 |
| 3,943,495 | 3/1976 | Garlic | 364/200 |
| 3,946,366 | 3/1976 | Edwards | 364/200 |
| 3,949,378 | 4/1976 | Crabb et al. | 364/200 |
| 3,953,833 | 4/1976 | Shapiro | 364/200 |
| 4,206,503 | 6/1980 | Woods | 364/200 |
| 4,236,206 | 11/1980 | Strecker et al. | 364/200 |
| 4,241,397 | 12/1980 | Strecker et al. | 364/200 |
| 4,388,685 | 6/1983 | Kotok et al. | 364/200 |
| 4,398,245 | 8/1983 | Fujita | 395/421.04 |
| 4,453,212 | 6/1984 | Gaither | 364/200 |
| 4,503,492 | 3/1985 | Pilat | 364/200 |
| 4,530,050 | 7/1985 | Fukunaga et al. | 364/200 |
| 4,531,200 | 7/1985 | Whittey | 364/900 |
| 4,612,613 | 9/1986 | Gershenson et al. | 395/894 |
| 4,613,935 | 9/1986 | Conley | 364/200 |
| 4,616,313 | 10/1986 | Hoyagi | 364/200 |
| 4,651,274 | 3/1987 | Omuda | 364/200 |
| 4,733,344 | 3/1988 | Watanabe | 364/200 |
| 4,750,112 | 6/1988 | Jones | 364/200 |

(List continued on next page.)

FOREIGN PATENT DOCUMENTS

| | | |
|---|---|---|
| 57-105042 | 6/1982 | Japan . |
| 59-105150 | 6/1984 | Japan . |
| 59-31733 | 8/1984 | Japan . |
| 59-135550 | 8/1984 | Japan . |

OTHER PUBLICATIONS

MC68020 32–Bit Microprocessor User's Manual, copyright 1984 by Motorola, Inc. pp. 2–1 to 2–24.

VAX Architecture Handbook, Chap. 5, pp. 72–81, Digital Equipment Corporation, 1981.

Encyclopedia of Computer Science, Rosen, S., "Addressing," pp. 9–8, 1976.

Lee, et al. "Branch Prediction Strategies and Branch Target Buffer Design", *IEEE Computer*, Vo. 17, No. 1, Jan. 1984.

K. Sakamura, "Architecture of the TRON VSLI CPU", *IEEE Micro*, Apr., 1987.

*Primary Examiner*—Paul V. Kulik

*Attorney, Agent, or Firm*—Townsend and Townsend and Crew LLP

[57] ABSTRACT

A data processor which has an operand instruction having an operation code specifying portion to specify the kind of operation and an effective address specifying field showing the effective address of the operand, so that an additional mode specifying field to perform the extension modification of addressing can be added to an addressing mode shown by the effective address specifying field, whereby even when the address modification extension is carried out at multiple levels, the address calculation can sequentially be performed while reading each part of the operand, thereby improving the execution speed of program and facilitating complier structure.

19 Claims, 211 Drawing Sheets

U.S. PATENT DOCUMENTS

| | | | |
|---|---|---|---|
| 4,794,518 | 12/1988 | Mizushima | 364/200 |
| 4,802,113 | 1/1989 | Onishi | 364/900 |
| 4,807,122 | 2/1989 | Baba | 364/200 |
| 4,825,258 | 4/1989 | Yamazaki | 364/200 |
| 4,827,402 | 5/1989 | Wada | 395/581 |
| 4,837,676 | 6/1989 | Rosman | 364/200 |
| 4,858,105 | 8/1989 | Kuriyama | 364/200 |
| 4,876,646 | 10/1989 | Gotov et al. | 364/200 |
| 4,890,218 | 12/1989 | Bram | 364/200 |
| 4,890,220 | 12/1989 | Nakagawo | 364/200 |
| 4,901,236 | 2/1990 | Utsumi | 395/410 |
| 4,901,316 | 2/1990 | Igarashi et al. | 371/37.1 |
| 4,945,511 | 7/1990 | Itomitsu | 364/900 |
| 4,959,778 | 9/1990 | Miyadera | 364/200 |
| 4,967,339 | 10/1990 | Fukumaru et al. | 395/800 |

Fig. 11:
- Signed 8-bit integer
S: Signed bit
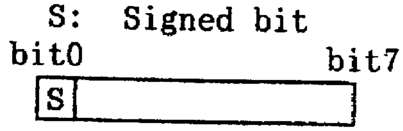
- Unsigned 8-bit integer
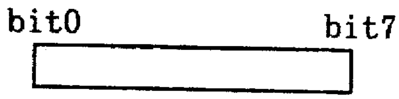
- Signed 16-bit integer
S: Signed bit
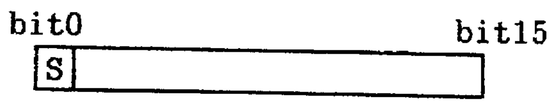
- Unsigned 16-bit integer
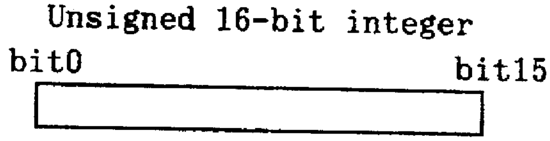
- Singed 32-bit integer
S: Signed bit
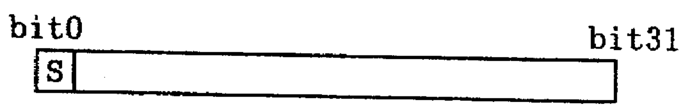
- Unsigned 32-bit integer
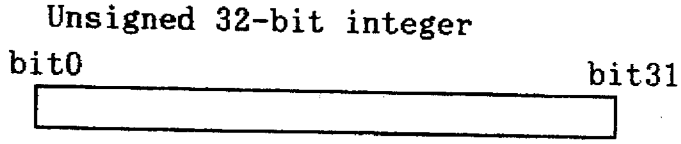
- Signed 64-bit integer <<LX>>
S: Signed bit
- Unsigned 64-bit integer <<LX>>
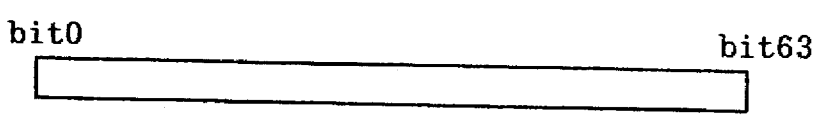

Fig. 12:

- 1-byte (2-digit) unsigned BCD

The digit 0 becomes the most significant digit.

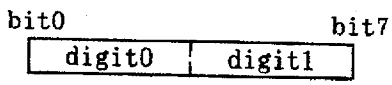

- 2-byte (4-digit) unsigned BCD

The digit 0 becomes the most significant digit.

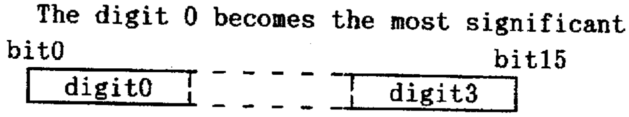

- 4-byte (8-digit) unsigned BCD

The digit 0 becomes the most significant digit.

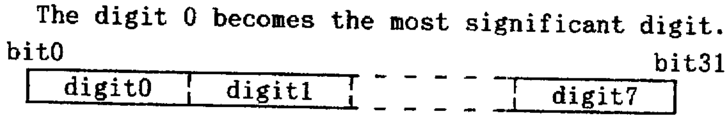

- 8-byte (16-digit) unsigned BCD <<LX>>

The digit 0 becomes the most significant digit.

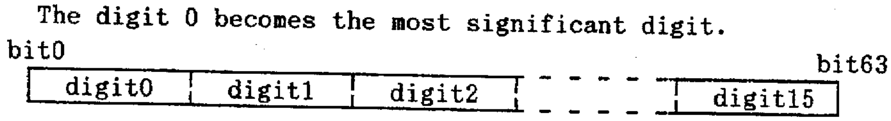

- 1-byte (2-digit) signed BCD <<L2>>

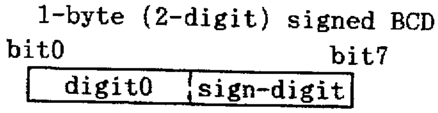

- 2-byte (4-digit) signed BCD <<L2>>

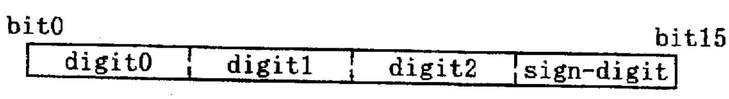

- 4-byte (8-digit) signed BCD <<L2>>

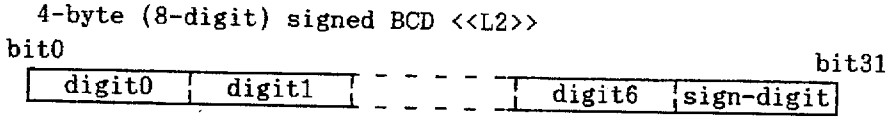

- 8-byte (16-digit) signed BCD <<LX>>

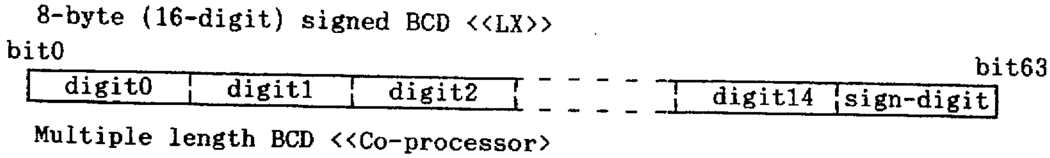

- Multiple length BCD <<Co-processor>

Fig. 16:

MOV:I 010010WW 11.ShW.. ......#iW.......

01001000 11110000 00000000 00010010

<Address> + 0 +1 +2 +3

Fig. 17:

Example: MOV:S Rn,Sh S-format

MOV:L Sh,Rn L-format

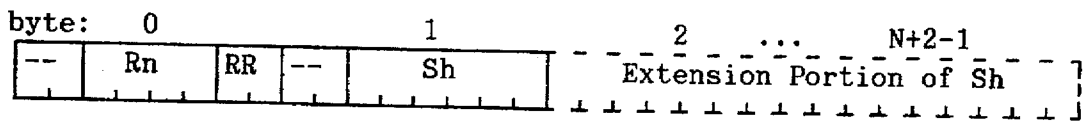

RR Specify the operand size of Sh. The size of another operand located in the register, is fixed to 32 bits.

Sh Specify the source (destination) operand.

Rn Specify the destination (source) register.

Fig. 18:

Example: AND:R Rm,Rn

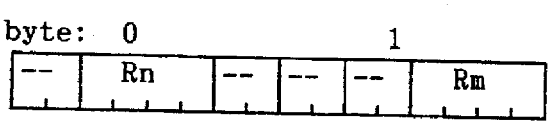

Rn Specify the destination register.

Rm Specify the source register.

The size of the operand is fixed to 32 bits.

Example: ADD:Q #,Sh (#: 3 bits)

MM Specify the size of the destination operand. (In the case of BTST:Q, BSET:Q, BCLR:Q and BSETI:Q, it is an operation code.)

Specify the source operand by a literal.

Sh Specify the destination operand.

Example: ADD:I #,Sh

MM Specify the size of the operand (common with the source and destination).

SH Specify the destination operand.

Fig. 21:

Example: NEG Ea

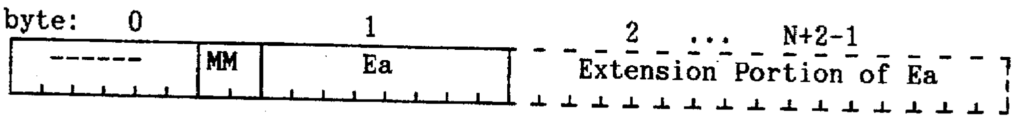

MM Specify the size of the operand.

(There are instructions which have an extra extension portion and which do not use MM.)

Fig. 22:

Example: ADD:G EaR,EaM

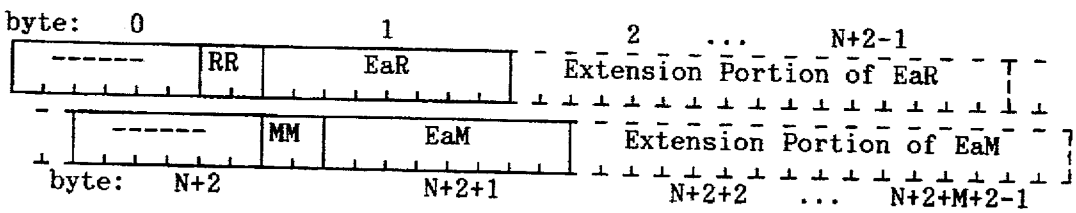

EaM Effective address of the destination operand

MM Specify the size of the destination operand.

EaR Effective address of the source operand

RR Specify the size of the source operand (There are instructions which have an extra extension.)

Example: SUB:E #,EaM

EaM Effective address of the destination operand

MM Specify the size of the destination operand.

Source operand

MOVA:G EaA,EaW

EaW Effective address of the destination operand

WW Specify the size of the destination operand.

EaA Effective address of the source operand

Ea1 Effective address of the first operand

Ea2 Effective address of the second operand (There is an extra extension portion in part of instructions.)

Bcc:D cccc Branch condition disp:8 Displacement (disp) to the destination to be jumped When specifying disp with 8 bits, the value of the bit pattern is doubled and displaced.

There is an extra extension portion in part of instructions.

Fig. 50 (a):

MOV:L src/ShR,dest/RgWw

| | | | | |
|---|---|---|---|---|
| 00 | RgWw | RR | 01 | .ShR.. |

MOV:S src/RgRw,dest/ShW

| | | | | |
|---|---|---|---|---|
| 00 | RgRw | WW | 10 | .ShW.. |

MOV:Z src/#0,dest/EaW

| | |
|---|---|
| 110001WW | ..EaW... |

MOV:Q src/#3n,dest/ShW

| | | | | |
|---|---|---|---|---|
| 011 | #3n | WW | 00 | .ShW.. |

MOV:I src/#iW,dest/ShW

| | | | |
|---|---|---|---|
| 010010WW | 11 | .ShW.. | ......#iW....... |

MOV:G src/EaR,dest/EaW

| | | | |
|---|---|---|---|
| 110100RR | ..EaR... | 100010WW | ..EaW... |

MOV:E src/#ib,dest/EaW

| | | | |
|---|---|---|---|
| 10111111 | ..#ib... | 100010WW | ..EaW... |

Fig. 50 (b):

| Instruction | F | X | V | L | M | Z |
|---|---|---|---|---|---|---|
| MOV | – | – | + | – | + | + |

Fig. 51:

MOVU:G src/EaR,dest/EaW

| | | | |
|---|---|---|---|
| 110100RR | ..EaR... | 100011WW | ..EaW... |

MOVU:E src/#ib,dest/EaW

| | | | |
|---|---|---|---|
| 10111111 | ..#ib... | 100011WW | ..EaW... |

Fig. 52:

| Instruction | F | X | V | L | M | Z |
|---|---|---|---|---|---|---|
| MOVU | - | - | + | - | + | + |

Fig. 53:

PUSH src/EaRL

| | |
|---|---|
| 1011001R | ..EaRL.. |

Fig. 54:

| Instruction | F | X | V | L | M | Z |
|---|---|---|---|---|---|---|
| PUSH | - | - | - | - | - | - |

Fig. 55:

POP dest/EaWL

| | |
|---|---|
| 1001001W | ..EaWL.. |

Fig. 56:

| Instruction | F | X | V | L | M | Z |
|---|---|---|---|---|---|---|
| POP | – | – | – | – | – | – |

Fig. 57:

LDM src/EaRmL,reglist/L1RL

| | | |
|---|---|---|
| 1001101R | ..EaRmL. | ......L1RL...... |

Fig. 58:

| Instruction | F | X | V | L | M | Z |
|---|---|---|---|---|---|---|
| LDM | – | – | – | – | – | – |

Fig. 59:

MSB← →LSB

| | | | | | | | | | | | | | | | | |
|---|---|---|---|---|---|---|---|---|---|---|---|---|---|---|---|---|
| Bit Position | 0 | 1 | 2 | 3 | 4 | 5 | 6 | 7 | 8 | 9 | 10 | 11 | 12 | 13 | 14 | 15 |
| Register | R0 | R1 | R2 | R3 | R4 | R5 | R6 | R7 | R8 | R9 | R10 | R11 | R12 | R13 | R14 | R15 |

Fig. 60:

STM reglist/LsWL,dest/EaWmL

| | | |
|---|---|---|
| 1000101W | ..EaWmL. | ......LsWL...... |

Fig. 61:

| Instruction | F | X | V | L | M | Z |
|---|---|---|---|---|---|---|
| STM | - | - | - | - | - | - |

Fig. 62:

[When EaWmL is in the @-SP mode]

MSB← →LSB

| Bit Position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Register | R15 | R14 | R13 | R12 | R11 | R10 | R9 | R8 | R7 | R6 | R5 | R4 | R3 | R2 | R1 | R0 |

Fig. 63:

[When EaWmL is in another mode]

MSB← →LSB

| Bit Position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Register | R0 | R1 | R2 | R3 | R4 | R5 | R6 | R7 | R8 | R9 | R10 | R11 | R12 | R13 | R14 | R15 |

Fig. 64:

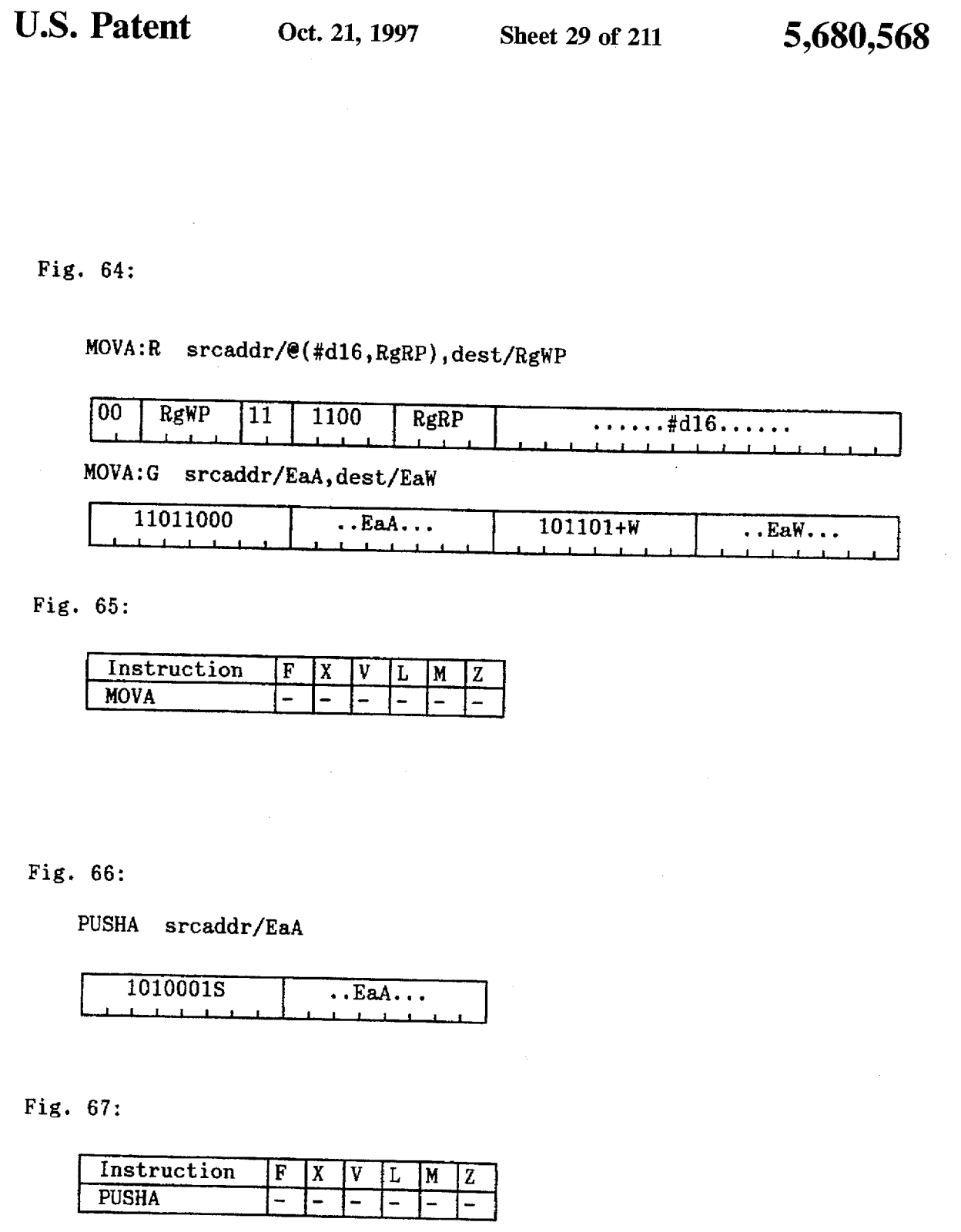

MOVA:R srcaddr/@(#d16,RgRP),dest/RgWP

| | | | | | |
|---|---|---|---|---|---|
| 00 | RgWP | 11 | 1100 | RgRP | ......#d16...... |

MOVA:G srcaddr/EaA,dest/EaW

| | | | |
|---|---|---|---|
| 11011000 | ..EaA... | 101101+W | ..EaW... |

Fig. 65:

| Instruction | F | X | V | L | M | Z |
|---|---|---|---|---|---|---|
| MOVA | – | – | – | – | – | – |

Fig. 66:

PUSHA srcaddr/EaA

| | |
|---|---|
| 1010001S | ..EaA... |

Fig. 67:

| Instruction | F | X | V | L | M | Z |
|---|---|---|---|---|---|---|
| PUSHA | – | – | – | – | – | – |

Fig. 68:

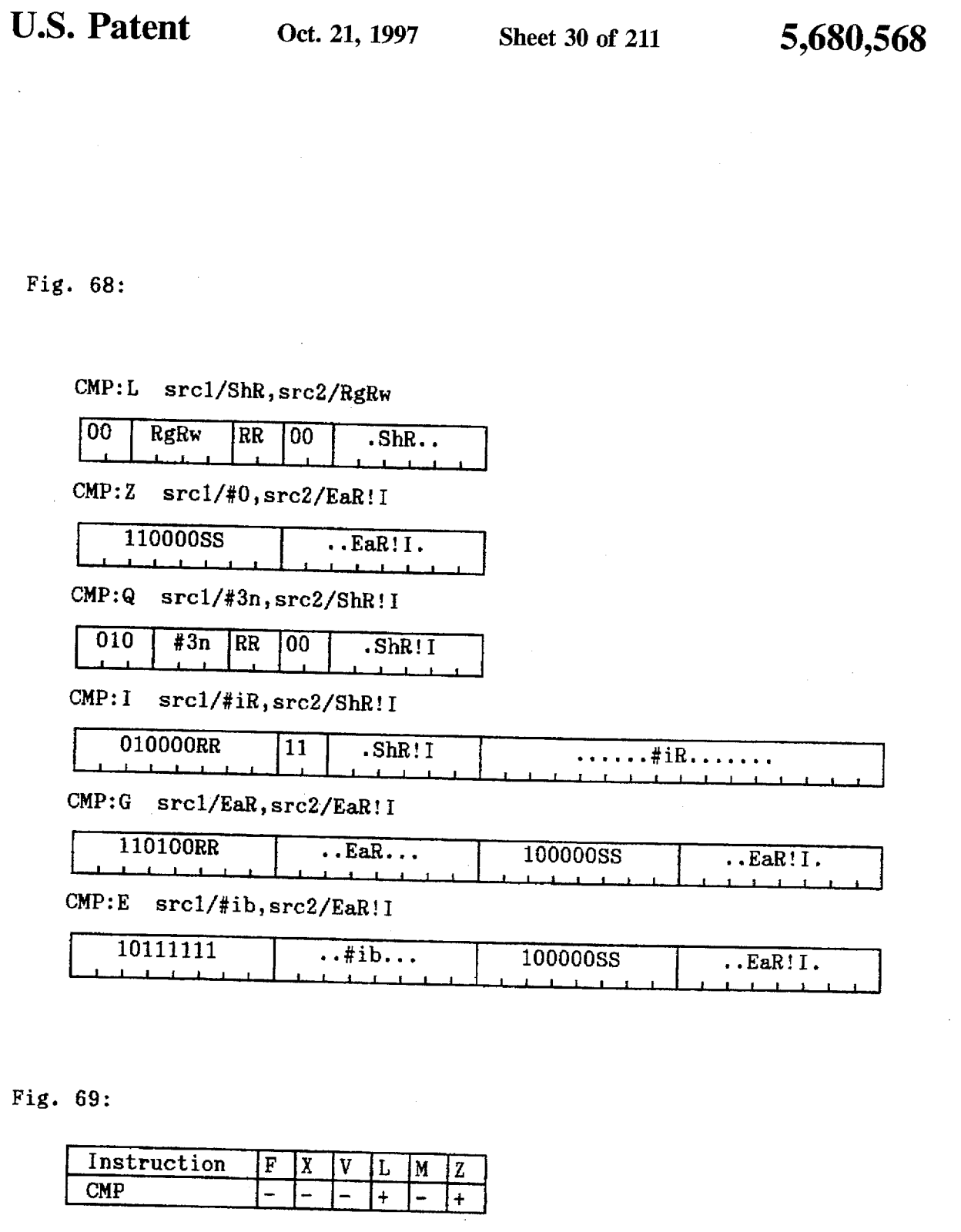

CMP:L src1/ShR,src2/RgRw

| | | | | |
|---|---|---|---|---|
| 00 | RgRw | RR | 00 | .ShR.. |

CMP:Z src1/#0,src2/EaR!I

| | |
|---|---|
| 110000SS | ..EaR!I. |

CMP:Q src1/#3n,src2/ShR!I

| | | | | |
|---|---|---|---|---|
| 010 | #3n | RR | 00 | .ShR!I |

CMP:I src1/#iR,src2/ShR!I

| | | | |
|---|---|---|---|
| 010000RR | 11 | .ShR!I | ......#iR....... |

CMP:G src1/EaR,src2/EaR!I

| | | | |
|---|---|---|---|
| 110100RR | ..EaR... | 100000SS | ..EaR!I. |

CMP:E src1/#ib,src2/EaR!I

| | | | |
|---|---|---|---|
| 10111111 | ..#ib... | 100000SS | ..EaR!I. |

Fig. 69:

| Instruction | F | X | V | L | M | Z |
|---|---|---|---|---|---|---|
| CMP | – | – | – | + | – | + |

Fig. 70:

CMPU:G src1/EaR,src2/EaR!I

| | | | |
|---|---|---|---|
| 110100RR | ..EaR... | 100001SS | ..EaR!I. |

CMPU:E src1/#ib,src2/EaR!I

| | | | |
|---|---|---|---|
| 10111111 | ..#ib... | 100001SS | ..EaR!I. |

Fig. 71:

| Instruction | F | X | V | L | M | Z |
|---|---|---|---|---|---|---|
| CMPU | - | - | - | + | - | + |

Fig. 72:

CHK bound/EaRdR,index/EaR,xreg/RgWR

| | | | | | |
|---|---|---|---|---|---|
| 110101RR | ..EaR... | 00 | RgWR | 1c | ..EaRdR. |

c Select whether to subtract the lower bound value c = 0 Do not subtract the lower bound value. (/N)

c = 1 Subtract the lower bound value. (/S)

RR Size of upper bound value, lower bound value, and comparison value bound Effective address of (upper bound value and lower bound value)

index Effective address of comparison value xreg Register that loads the comparison value

Fig. 73:

| Instruction | F | X | V | L | M | Z |
|---|---|---|---|---|---|---|
| CHK | - | - | * | + | - | + |

L and Z are used for comparison with lower bound value.

Fig. 74:

| | index < LBV | LBV ≤ index<br>index < UBV | UBV ≤ index |
|---|---|---|---|
| L_flag | 1 | 0 | 0 (note2) |
| V_flag | 1 | 0 | 1 |

Fig. 75:

ADD:L src/ShRw,dest/RgMw

| | | | | |
|---|---|---|---|---|
| 10 | RgMw | 01 | 00 | .ShRw. |

ADD:Q src/#3n,dest/ShM

| | | | | |
|---|---|---|---|---|
| 010 | #3n | MM | 01 | .ShM.. |

ADD:I src/#iM,dest/ShM

| | | | |
|---|---|---|---|
| 010001MM | 11 | .ShM.. | ......#iM....... |

ADD:G src/EaR,dest/EaM

| | | | |
|---|---|---|---|
| 110100RR | ..EaR... | 000000MM | ..EaM... |

ADD:E src/#ib,dest/EaM

| | | | |
|---|---|---|---|
| 10111111 | ..#ib... | 000000MM | ..EaM... |

Fig. 76:

| Instruction | F | X | V | L | M | Z |
|---|---|---|---|---|---|---|
| ADD | – | + | + | + | + | + |

Fig. 77:

ADDU:G src/EaR,dest/EaM

| | | | |
|---|---|---|---|
| 110100RR | ..EaR... | 000001MM | ..EaM... |

ADDU:E src/#ib,dest/EaM

| | | | |
|---|---|---|---|
| 10111111 | ..#ib... | 000001MM | ..EaM... |

Fig. 78:

| Instruction | F | X | V | L | M | Z |
|---|---|---|---|---|---|---|
| ADDU | - | + | + | 0 | + | + |

Fig. 79:

ADDX:G src/EaR,dest/EaM

| | | | |
|---|---|---|---|
| 110100RR | ..EaR... | 000100MM | ..EaM... |

ADDX:E src/#ib,dest/EaM

| | | | |
|---|---|---|---|
| 10111111 | ..#ib... | 000100MM | ..EaM... |

Fig. 80:

| Instruction | F | X | V | L | M | Z |
|---|---|---|---|---|---|---|
| ADDX | - | + | + | + | + | + |

Fig. 81:

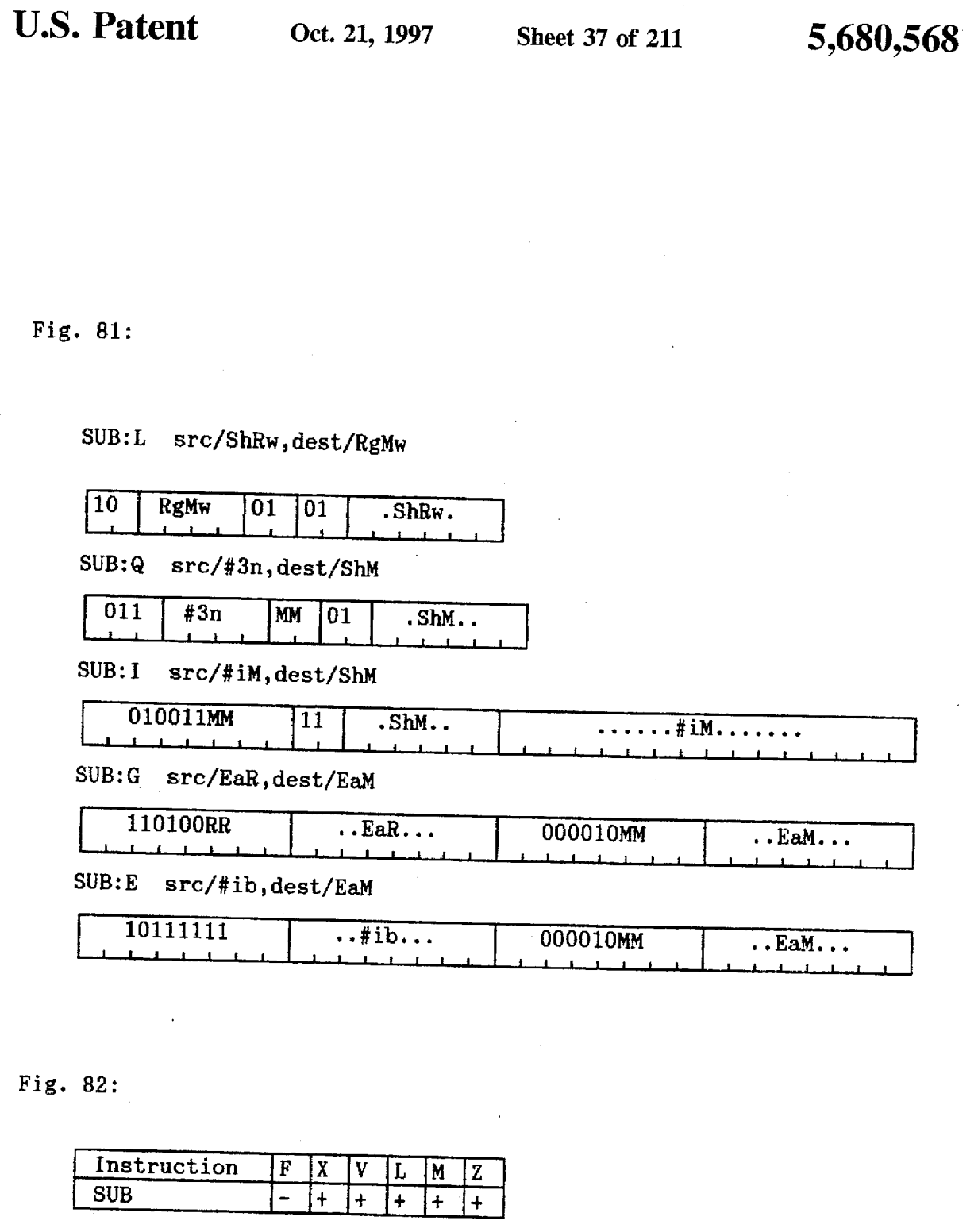

SUB:L src/ShRw,dest/RgMw

| | | | | |
|---|---|---|---|---|
| 10 | RgMw | 01 | 01 | .ShRw. |

SUB:Q src/#3n,dest/ShM

| | | | | |
|---|---|---|---|---|
| 011 | #3n | MM | 01 | .ShM.. |

SUB:I src/#iM,dest/ShM

| | | | |
|---|---|---|---|
| 010011MM | 11 | .ShM.. | ......#iM....... |

SUB:G src/EaR,dest/EaM

| | | | |
|---|---|---|---|
| 110100RR | ..EaR... | 000010MM | ..EaM... |

SUB:E src/#ib,dest/EaM

| | | | |
|---|---|---|---|
| 10111111 | ..#ib... | 000010MM | ..EaM... |

Fig. 82:

| Instruction | F | X | V | L | M | Z |
|---|---|---|---|---|---|---|
| SUB | - | + | + | + | + | + |

Fig. 83:

SUBU:G src/EaR,dest/EaM

| | | | |
|---|---|---|---|
| 110100RR | ..EaR... | 000011MM | ..EaM... |

SUBU:E src/#ib,dest/EaM

| | | | |
|---|---|---|---|
| 10111111 | ..#ib... | 000011MM | ..EaM... |

Fig. 84:

| Instruction | F | X | V | L | M | Z |
|---|---|---|---|---|---|---|
| SUBU | - | + | + | + | + | + |

Fig. 85:

SUBX:G src/EaR,dest/EaM

| | | | |
|---|---|---|---|
| 110100RR | ..EaR... | 000110MM | ..EaM... |

SUBX:E src/#ib,dest/EaM

| | | | |
|---|---|---|---|
| 10111111 | ..#ib... | 000110MM | ..EaM... |

Fig. 86:

| Instruction | F | X | V | L | M | Z |
|---|---|---|---|---|---|---|
| SUBX | – | + | + | + | + | + |

Fig. 87:

MUL:R src/RgRw,dest/RgMw

| | | | | |
|---|---|---|---|---|
| 00 | RgMw | 00 | 1101 | RgRw |

MUL:G src/EaR,dest/EaM

| | | | |
|---|---|---|---|
| 110100RR | ..EaR... | 010000MM | ..EaM... |

MUL:E src/#ib,dest/EaM

| | | | |
|---|---|---|---|
| 10111111 | ..#ib... | 010000MM | ..EaM... |

Fig. 88:

| Instruction | F | X | V | L | M | Z |
|---|---|---|---|---|---|---|
| MUL | – | – | + | + | + | + |

Fig. 89:

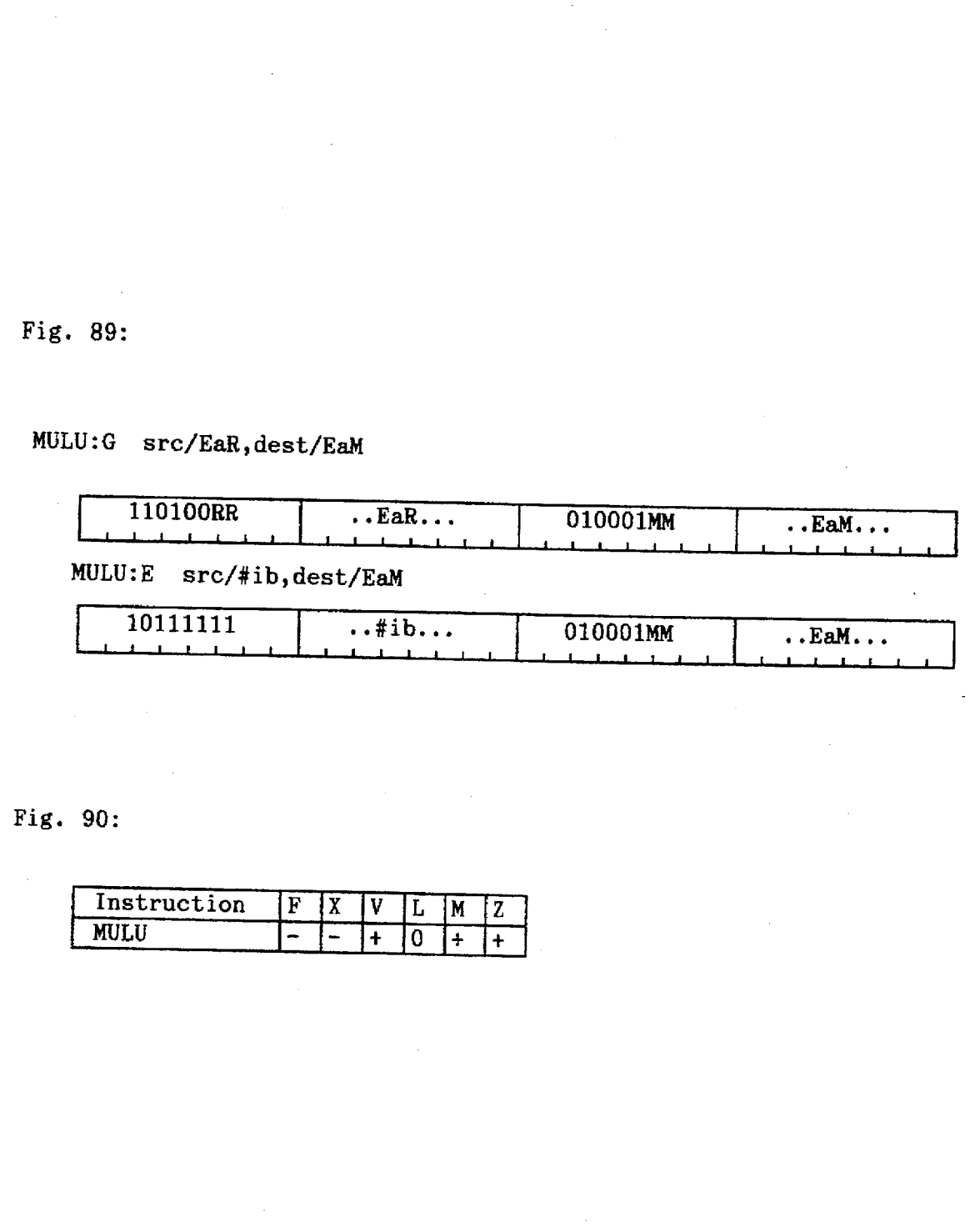

MULU:G src/EaR,dest/EaM

| | | | |
|---|---|---|---|
| 110100RR | ..EaR... | 010001MM | ..EaM... |

MULU:E src/#ib,dest/EaM

| | | | |
|---|---|---|---|
| 10111111 | ..#ib... | 010001MM | ..EaM... |

Fig. 90:

| Instruction | F | X | V | L | M | Z |
|---|---|---|---|---|---|---|
| MULU | – | – | + | 0 | + | + |

Fig. 91:

MULX src/EaR,dest/EaMR,tmp/RgMR

| | | | | | |
|---|---|---|---|---|---|
| 110101!R | ..EaR... | 10 | RgWR | 10 | ..EaMR.. |

Fig. 92:

| Instruction | F | X | V | L | M | Z |
|---|---|---|---|---|---|---|
| MULX | * | – | 0 | 0 | + | + |

Fig. 93:

DIV:R src/RgRw,dest/RgMw

| | | | | |
|---|---|---|---|---|
| 00 | RgMw | 01 | 1101 | RgRw |

DIV:G src/EaR,dest/EaM

| | | | |
|---|---|---|---|
| 110100RR | ..EaR... | 010010MM | ..EaM... |

DIV:E src/#ib,dest/EaM

| | | | |
|---|---|---|---|
| 10111111 | ..#ib... | 010010MM | ..EaM... |

Fig. 94:

| Instruction | F | X | V | L | M | Z | |
|---|---|---|---|---|---|---|---|
| DIV | - | - | 0 | + | + | + | |
| | - | - | 1 | 0 | 1 | 0 | => See note 1 |
| | - | - | 1 | - | - | - | => See note 2 |

Note 1 : In the case of (minimum negative number) ÷ (-1)

Note 2 : Division by zero

Fig. 95:

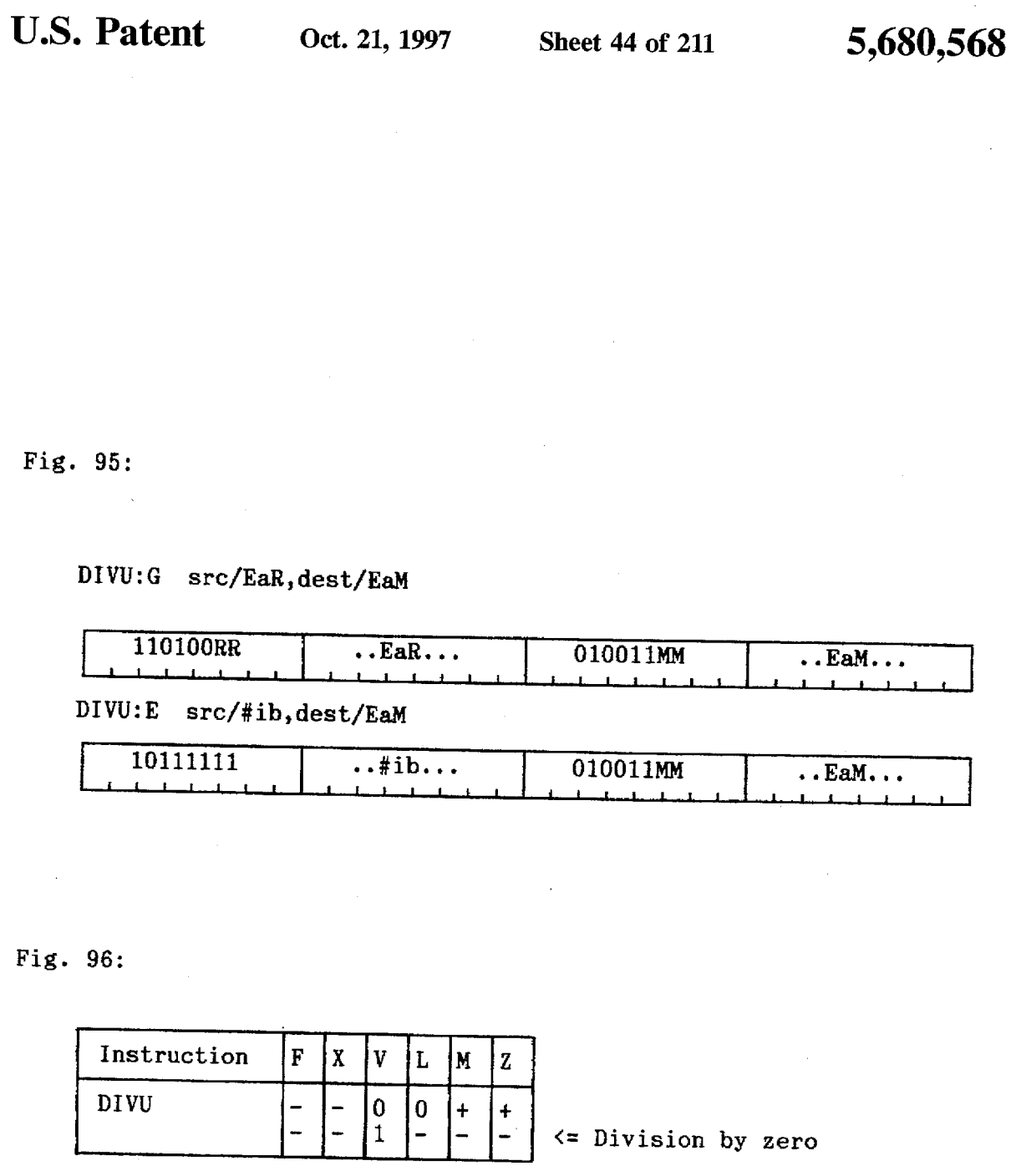

DIVU:G src/EaR,dest/EaM

| | | | |
|---|---|---|---|
| 110100RR | ..EaR... | 010011MM | ..EaM... |

DIVU:E src/#ib,dest/EaM

| | | | |
|---|---|---|---|
| 10111111 | ..#ib... | 010011MM | ..EaM... |

Fig. 96:

| Instruction | F | X | V | L | M | Z | |
|---|---|---|---|---|---|---|---|
| DIVU | – | – | 0 | 0 | + | + | |
| | – | – | 1 | – | – | – | <= Division by zero |

Fig. 97:

DIVX src/EaR,dest/EaMR,tmp/RgMR

| | | | | | |
|---|---|---|---|---|---|
| 110101!R | ..EaR... | 10 | RgMR | 11 | ..EaMR.. |

Fig. 98:

| Instruction | F | X | V | L | M | Z | |
|---|---|---|---|---|---|---|---|
| DIVX | * | - | 0 | 0 | + | + | => See note 1 |
| | - | - | 1 | - | - | - | => See note 2 |
| | - | - | 1 | - | - | - | => See note 3 |

Note 1 : M and Z are based on dest.

F can be used for testing tmp = 0.

Note 2 : Overflow in dest.

Note 3 : Division by zero

Fig. 99:

REM:G src/EaR,dest/EaM

| | | | |
|---|---|---|---|
| 110100RR | ..EaR... | 010110MM | ..EaM... |

REM:E src/#ib,dest/EaM

| | | | |
|---|---|---|---|
| 10111111 | ..#ib... | 010110MM | ..EaM... |

Fig. 100:

| Instruction | F | X | V | L | M | Z | |
|---|---|---|---|---|---|---|---|
| REM | – | – | 0 | + | + | + | |
| | – | – | 0 | – | – | – | <= Division by zero |

Fig. 101:

REMU:G src/EaR,dest/EaM

| | | | |
|---|---|---|---|
| 110100RR | ..EaR... | 010111MM | ..EaM... |

REMU:E src/#ib,dest/EaM

| | | | |
|---|---|---|---|
| 10111111 | ..#ib... | 010111MM | ..EaM... |

Fig. 102:

| Instruction | F | X | V | L | M | Z | |
|---|---|---|---|---|---|---|---|
| REMU | – | – | 0 | 0 | + | + | |
| | – | – | 0 | – | – | – | <= Division by zero |

Fig. 103:

NEG dest/EaM

| | |
|---|---|
| 110010MM | ..EaM... |

Fig. 104:

| Instruction | F | X | V | L | M | Z |
|---|---|---|---|---|---|---|
| NEG | – | – | + | + | + | + |

Fig. 105:

INDEX indexsize/EaR,subscript/EaR2,xreg/RgMR

| | | | | | |
|---|---|---|---|---|---|
| 110101!R | ..EaR... | 11 | RgMR | SS | ..EaR2.. |

R Size of xreg and indexsize

R = 0 : 32 bits

R = 1 : 64 bits <<LX>>

SS Size of subscript xreg Address calculation accumulator

Fig. 106:

| Instruction | F | X | V | L | M | Z |
|---|---|---|---|---|---|---|
| INDEX | - | - | + | + | + | + |

M and Z are based on xreg.

Fig. 107:

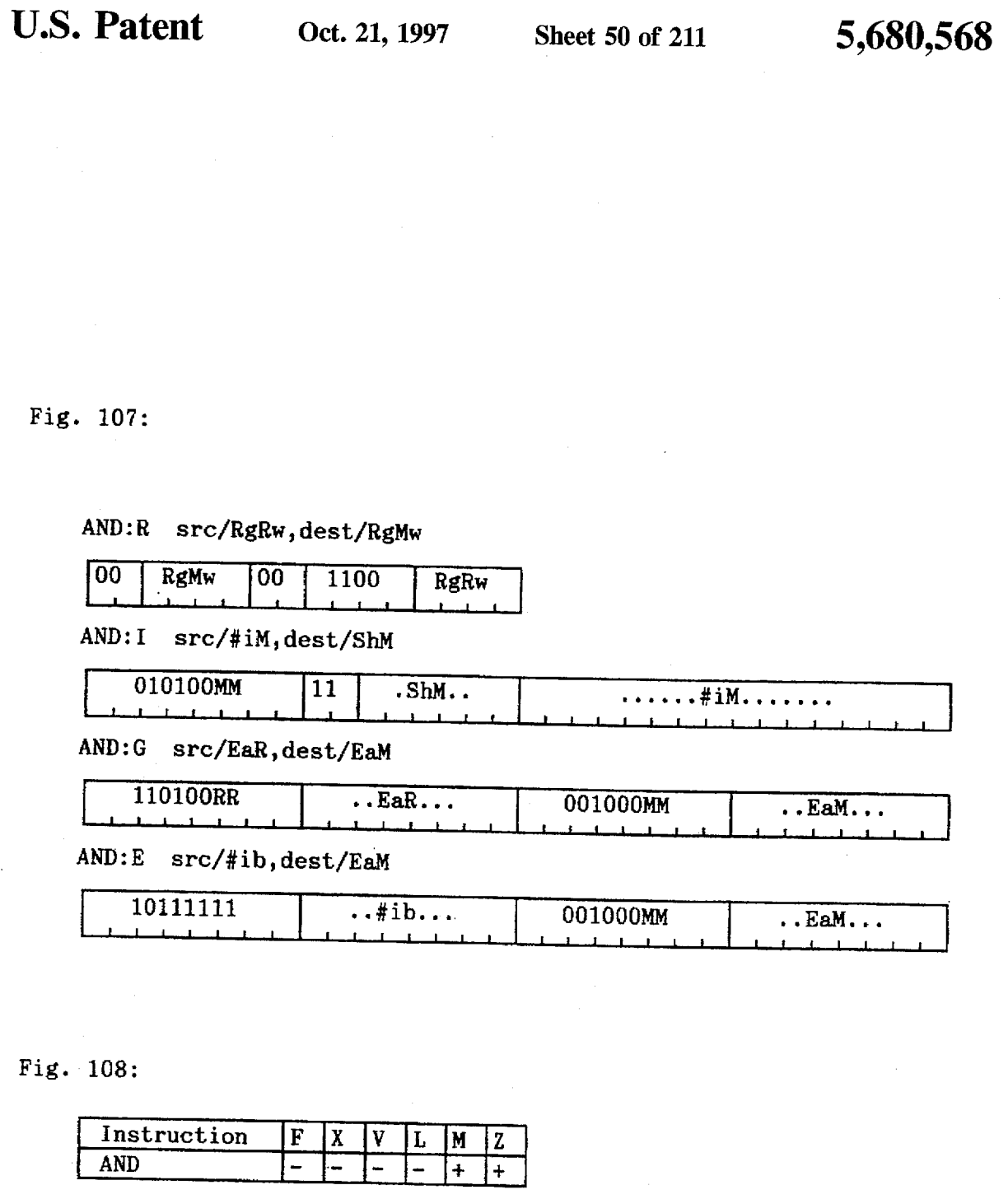

AND:R src/RgRw,dest/RgMw

| | | | | |
|---|---|---|---|---|
| 00 | RgMw | 00 | 1100 | RgRw |

AND:I src/#iM,dest/ShM

| | | | |
|---|---|---|---|
| 010100MM | 11 | .ShM.. | ......#iM....... |

AND:G src/EaR,dest/EaM

| | | | |
|---|---|---|---|
| 110100RR | ..EaR... | 001000MM | ..EaM... |

AND:E src/#ib,dest/EaM

| | | | |
|---|---|---|---|
| 10111111 | ..#ib... | 001000MM | ..EaM... |

Fig. 108:

| Instruction | F | X | V | L | M | Z |
|---|---|---|---|---|---|---|
| AND | – | – | – | – | + | + |

Fig. 109:

OR:R src/RgRw,dest/RgMw

| | | | | |
|---|---|---|---|---|
| 00 | RgMw | 01 | 1100 | RgRw |

OR:I src/#iM,dest/ShM

| | | | |
|---|---|---|---|
| 010101MM | 11 | .ShM.. | ......#iM....... |

OR:G src/EaR,dest/EaM

| | | | |
|---|---|---|---|
| 110100RR | ..EaR... | 001001MM | ..EaM... |

OR:E src/#ib,dest/EaM

| | | | |
|---|---|---|---|
| 10111111 | ..#ib... | 001001MM | ..EaM... |

Fig. 110:

| Instruction | F | X | V | L | M | Z |
|---|---|---|---|---|---|---|
| OR | – | – | – | – | + | + |

M_flag R0
Z_flag [R0 to d-1] = 0

Fig. 111:

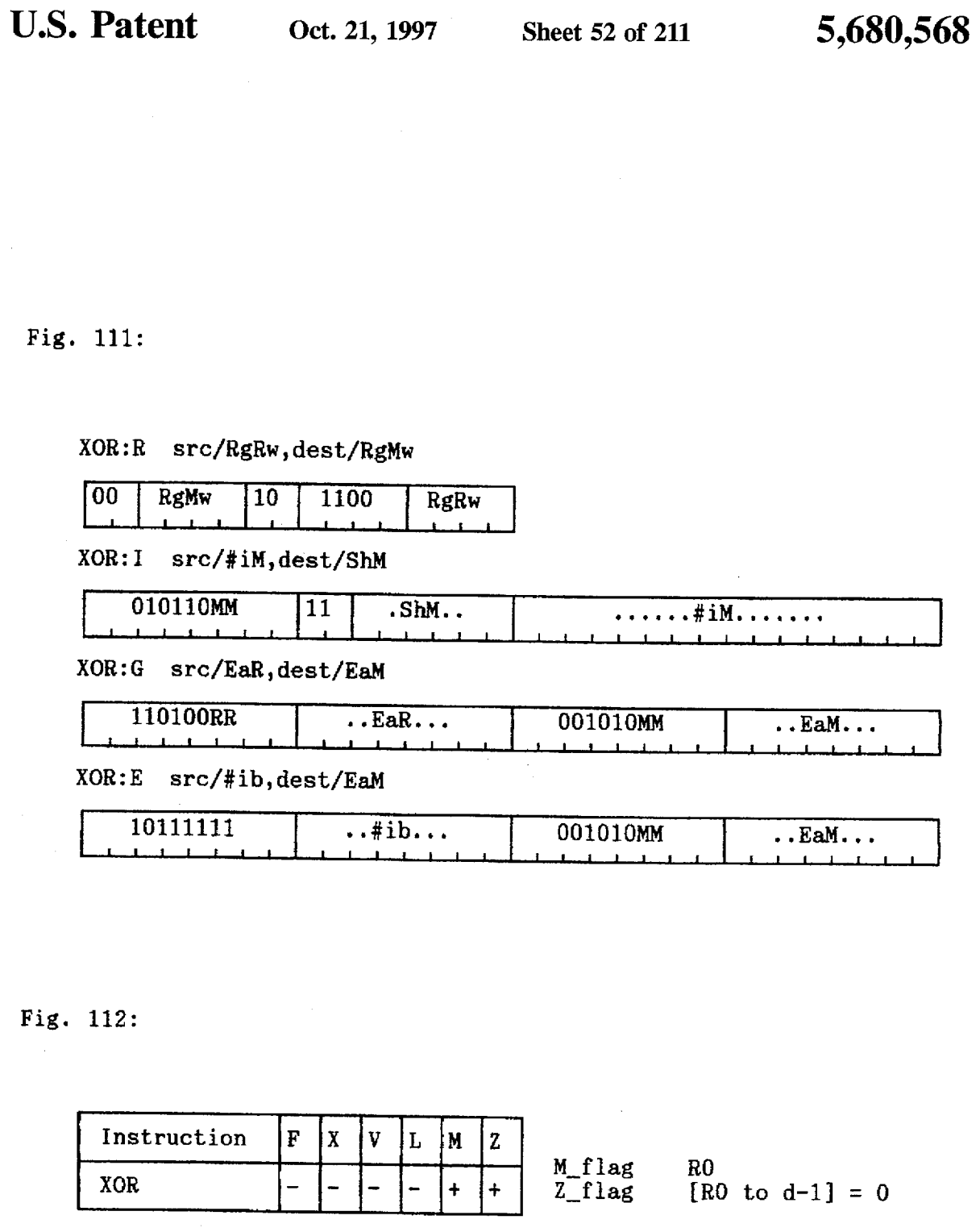

XOR:R src/RgRw,dest/RgMw

| | | | | |
|---|---|---|---|---|
| 00 | RgMw | 10 | 1100 | RgRw |

XOR:I src/#iM,dest/ShM

| | | | |
|---|---|---|---|
| 010110MM | 11 | .ShM.. | ......#iM....... |

XOR:G src/EaR,dest/EaM

| | | | |
|---|---|---|---|
| 110100RR | ..EaR... | 001010MM | ..EaM... |

XOR:E src/#ib,dest/EaM

| | | | |
|---|---|---|---|
| 10111111 | ..#ib... | 001010MM | ..EaM... |

Fig. 112:

| Instruction | F | X | V | L | M | Z |
|---|---|---|---|---|---|---|
| XOR | – | – | – | – | + | + |

M_flag R0
Z_flag [R0 to d-1] = 0

Fig. 113:

NOT dest/EaM

| | |
|---|---|
| 110011MM | ..EaM... |

Fig. 114:

| Instruction | F | X | V | L | M | Z |
|---|---|---|---|---|---|---|
| NOT | – | – | – | – | + | + |

Fig. 115:

SHA:Q count/#3c,dest/ShM (Right shift, count < 0)

| | | | | |
|---|---|---|---|---|
| 011 | #3c | MM | 11 | .ShM.. |

SHA:G count/EaR,dest/EaM

| | | | |
|---|---|---|---|
| 110100RR | ..EaR... | 001101MM | ..EaM... |

SHA:E count/#ib,dest/EaM

| | | | |
|---|---|---|---|
| 10111111 | ..#ib... | 001101MM | ..EaM... |

Fig. 116:

| Instruction | F | X | V | L | M | Z |
|---|---|---|---|---|---|---|
| SHA | – | + | + | + | + | + |

Fig. 119:
SHL:Q count/#3n,dest/ShM (Left shift, count > 0)
| | | | | |
|---|---|---|---|---|
| 010 | #3n | MM | 10 | .ShM.. |
SHL:C count/#3c,dest/ShM (Right shift, count < 0)
| | | | | |
|---|---|---|---|---|
| 011 | #3c | MM | 10 | .ShM.. |
SHL:G count/EaR,dest/EaM
| | | | |
|---|---|---|---|
| 110100RR | ..EaR... | 001100MM | ..EaM... |
SHL:E count/#ib,dest/EaM
| | | | |
|---|---|---|---|
| 10111111 | ..#ib... | 001100MM | ..EaM... |
Fig. 120:
| Instruction | F | X | V | L | M | Z |
|---|---|---|---|---|---|---|
| SHL | – | + | – | – | + | + |
Fig. 121:
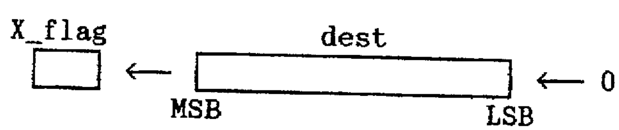
Fig. 122:
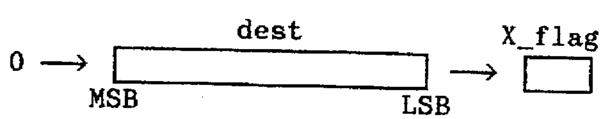

Fig. 123:
ROT:G count/EaR,dest/EaM
| | | | |
|---|---|---|---|
| 110100RR | ..EaR... | 001110MM | ..EaM... |
ROT:E count/#ib,dest/EaM
| | | | |
|---|---|---|---|
| 10111111 | ..#ib... | 001110MM | ..EaM... |
Fig. 124:
| Instruction | F | X | V | L | M | Z |
|---|---|---|---|---|---|---|
| ROT | – | + | – | – | + | + |
Fig. 125:
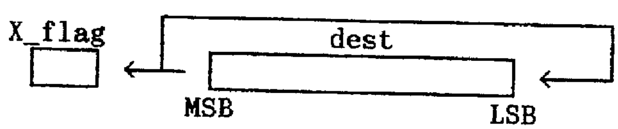
Fig. 126:
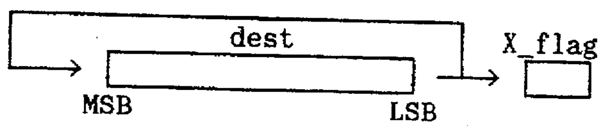

SHXL dest/EaMX

| | | | |
|---|---|---|---|
| 000000+X | 1111-111 | 1--010+- | ..EaMX.. |

| Instruction | F | X | V | L | M | Z |
|---|---|---|---|---|---|---|
| SHXL | - | + | - | - | + | + |

SHXR dest/EaMX

| | | | |
|---|---|---|---|
| 000000+X | 1111-111 | 1--110+- | ..EaMX.. |

| Instruction | F | X | V | L | M | Z |
|---|---|---|---|---|---|---|
| SHXR | - | + | - | - | + | + |

Fig 133:

RVBY src/EaR,dest/EaW

| | | | |
|---|---|---|---|
| 110101RR | ..EaR... | 010000WW | ..EaW... |

Fig. 134:

| Instruction | F | X | V | L | M | Z |
|---|---|---|---|---|---|---|
| RVBY | - | - | - | - | - | - |

Fig. 135:

RVBI src/EaR,dest/EaW

| | | | |
|---|---|---|---|
| 110101RR | ..EaR... | 010001WW | ..EaW... |

Fig. 136:

| Instruction | F | X | V | L | M | Z |
|---|---|---|---|---|---|---|
| RVBI | - | - | - | - | - | - |

| | Register to be operated | Memory to be operated |
|---|---|---|
| Access size .B | OK | OK |
| Access size .H | OK | OK <<L2>> |
| Access size .W | OK | OK <<L2>> |
| Access size .L | <<LX>> | <<LX>> |

All the access size in assembler defaults to '.B'.

Fig. 139:

BTST:Q offset/#3z,base/ShRfq

| | | | | |
|---|---|---|---|---|
| 101 | #3z | 01 | 11 | .ShRfq |

BTST:G offset/EaR,base/EaRF

| | | | |
|---|---|---|---|
| 110100RR | ..EaR... | 101111BB | ..EaRf.. |

BTST:E offset/#ib,base/EaRf

| | | | |
|---|---|---|---|
| 10111111 | ..#ib... | 101111BB | ..EaRf.. |

BB: Specify the bit size to be read.

Fig. 140:

| Instruction | F | X | V | L | M | Z |
|---|---|---|---|---|---|---|
| BTST | - | - | - | - | - | + |

Z indicates the test result.

Fig. 141:

BSET:Q offset/#3z,base/ShMfq

| | | | | |
|---|---|---|---|---|
| 100 | #3z | 01 | 10 | .ShMfq |

BSET:G offset/EaR,base/EaMf

| | | | |
|---|---|---|---|
| 110100RR | ..EaR... | 101100BB | ..EaMf.. |

BSET:E offset/#ib,base/EaMf

| | | | |
|---|---|---|---|
| 10111111 | ..#ib... | 101100BB | ..EaMf.. |

BB: Specify the bit size where the read-modify-write operation is performed.

Fig. 142:

| Instruction | F | X | V | L | M | Z |
|---|---|---|---|---|---|---|
| BSET | - | - | - | - | - | + |

Z indicates the test result.

Fig. 143:

BCLR:Q offset/#3z,base/ShMfq

| | | | | |
|---|---|---|---|---|
| 101 | #3z | 01 | 10 | .ShMfq |

BCLR:G offset/EaR,base/EaMf

| | | | |
|---|---|---|---|
| 110100RR | ..EaR... | 101101BB | ..EaMf.. |

BCLR:E offset/#ib,base/EaMf

| | | | |
|---|---|---|---|
| 10111111 | ..#ib... | 101101BB | ..EaMf.. |

BB: Specify the bit size where the read-modify-write operation is performed.

Fig. 144:

| Instruction | F | X | V | L | M | Z |
|---|---|---|---|---|---|---|
| BCLR | – | – | – | – | – | + |

Z indicates the test result.

Fig. 145:

BNOT:G offset/EaR,base/EaMf

| | | | |
|---|---|---|---|
| 110100RR | ..EaR... | 101110BB | ..EaMf.. |

BNOT:E offset/#ib,base/EaMf

| | | | |
|---|---|---|---|
| 10111111 | ..#ib... | 101110BB | ..EaMf.. |

BB: Specify the bit size where the read-modify-write operation is performed.

Fig. 146:

| Instruction | F | X | V | L | M | Z |
|---|---|---|---|---|---|---|
| BNOT | - | - | - | - | - | + |

Z indicates the test result.

Fig. 147:

BSCH data/EaR,offset/EaM

| 110101RR | ..EaR... | 0101bdMM | ..EaM... |
|---|---|---|---|

data Data to be searched. Since data does not exceed the word boundary, only the data in the address is accessed.

RR Size of data. RR = 00,01 is defined in <<L2>> offset bit offset which starts the search operation and returns the result of the search operation MM Size of offset d Bit value to be searched d=0: Search '0' (/0).

d=1: Search '1' (/1).

b The direction of search operation b=0: The direction where the bit number increases (/F).

b=1: The direction where the bit number decreases (/B).

Fig. 148:

| Instruction | F | X | V | L | M | Z |
|---|---|---|---|---|---|---|
| BSCH | - | - | * | - | - | - |

V indicates the search operation is unsuccessful.

Fig. 150 (a):

```
BFINS:G:I.W   #src[.BHWL], offset[.BHWL], width[.W], base[.W]
BFINS:G:R.W   Rs[.W],      offset[.BHWL], width[.W], base[.W]
BFINS:G:I.L   #src[.BHWL], offset[.BHWL], width[.L], base[.L]
BFINS:G:R.L   Rs[.L],      offset[.BHWL], width[.L], base[.L]
BFINS:E:I.W   #src[.BHWL], #offset,       #width,    base[.W]
BFINS:E:R.W   Rs[.W],      #offset,       #width,    base[.W]
BFINS:E:I.L   #src[.BHWL], #offset,       #width,    base[.L]
BFINS:E:R.L   Rs[.L],      #offset,       #width,    base[.L]

BFINSU:G:I.W  #src[.BHWL], offset[.BHWL], width[.W], base[.W]
BFINSU:G:R.W  Rs[.W],      offset[.BHWL], width[.W], base[.W]
BFINSU:G:I.L  #src[.BHWL], offset[.BHWL], width[.L], base[.L]
BFINSU:G:R.L  Rs[.L],      offset[.BHWL], width[.L], base[.L]
BFINSU:E:I.W  #src[.BHWL], #offset,       #width,    base[.W]
BFINSU:E:R.W  Rs[.W],      #offset,       #width,    base[.W]
BFINSU:E:I.L  #src[.BHWL], #offset,       #width,    base[.L]
BFINSU:E:R.L  Rs[.L],      #offset,       #width,    base[.L]

BFCMP:G:I.W   #src[.BHWL], offset[.BHWL], width[.W], base[.W]
BFCMP:G:R.W   Rs[.W],      offset[.BHWL], width[.W], base[.W]
BFCMP:G:I.L   #src[.BHWL], offset[.BHWL], width[.L], base[.L]
BFCMP:G:R.L   Rs[.L],      offset[.BHWL], width[.L], base[.L]
BFCMP:E:I.W   #src[.BHWL], #offset,       #width,    base[.W]
BFCMP:E:R.W   Rs[.W],      #offset,       #width,    base[.W]
BFCMP:E:I.L   #src[.BHWL], #offset,       #width,    base[.L]
```

Fig. 150 (b):

```
BFCMP:E:R.L    Rs[.L],        #offset,        #width,      base[.L]

BFCMPU:G:I.W   #src[.BHWL],   offset[.BHWL],  width[.W],   base[.W]
BFCMPU:G:R.W   Rs[.W],        offset[.BHWL],  width[.W],   base[.W]
BFCMPU:G:I.L   #src[.BHWL],   offset[.BHWL],  width[.L],   base[.L]
BFCMPU:G:R.L   Rs[.L],        offset[.BHWL],  width[.L],   base[.L]
BFCMPU:E:I.W   #src[.BHWL],   #offset,        #width,      base[.W]
BFCMPU:E:R.W   Rs[.W],        #offset,        #width,      base[.W]
BFCMPU:E:I.L   #src[.BHWL],   #offset,        #width,      base[.L]
BFCMPU:E:R.L   Rs[.L],        #offset,        #width,      base[.L]

BFEXT:G.W      offset[.BHWL], width[.W],      base[.W],    Rd[.W]
BFEXT:G.L      offset[.BHWL], width[.L],      base[.L],    Rd[.L]
BFEXT:E.W      #offset,       #width,         base[.W],    Rd[.W]
BFEXT:E.L      #offset,       #width,         base[.L],    Rd[.L]
BFEXTU:G.W     offset[.BHWL], width[.W],      base[.W],    Rd[.W]
BFEXTU:G.L     offset[.BHWL], width[.L],      base[.L],    Rd[.L]
BFEXTU:E.W     #offset,       #width,         base[.W],    Rd[.W]
BFEXTU:E.L     #offset,       #width,         base[.L],    Rd[.L]
```

Fig. 151:
BFEXT:G offset/EaR,width/RRXw,base/EaRbf,dest/RWXd
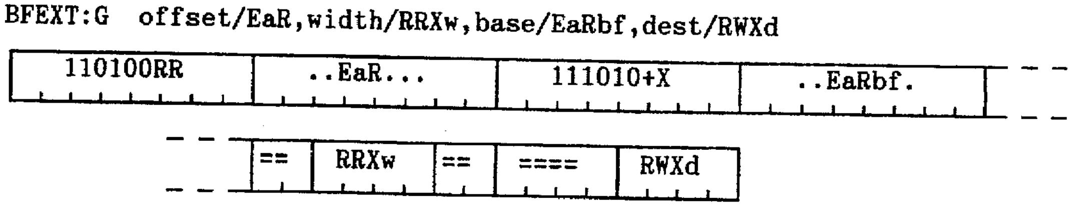
BFEXT:E offset/#ib,width/#6n,base/EaRbf,dest/RWXd
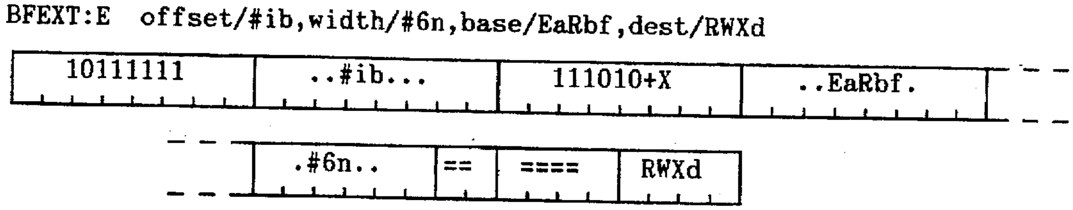
Fig. 152:
| Instruction | F | X | V | L | M | Z |
|---|---|---|---|---|---|---|
| BFEXT | – | – | + | – | + | + |

Fig. 153:
BFEXTU:G offset/EaR,width/RRXw,base/EaRbf,dest/RWXd
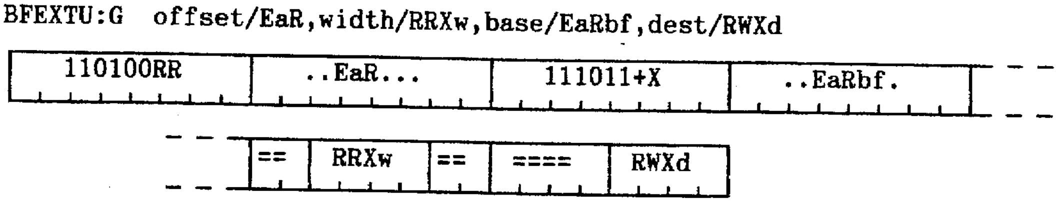
BFEXTU:E offset/#ib,width/#6n,base/EaRbf,dest/RWXd
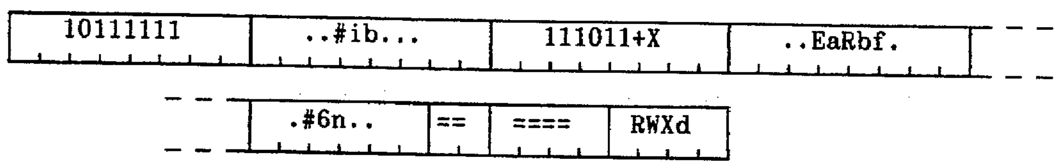
Fig. 154:
| Instruction | F | X | V | L | M | Z |
|---|---|---|---|---|---|---|
| BFEXTU | – | – | + | – | + | + |

| Instruction | F | X | V | L | M | Z |
|---|---|---|---|---|---|---|
| BFINS | – | – | + | – | + | + |

| Instruction | F | X | V | L | M | Z |
|---|---|---|---|---|---|---|
| BFINSU | - | - | + | - | + | + |

| Instruction | F | X | V | L | M | Z |
|---|---|---|---|---|---|---|
| BFCMP | - | - | - | + | - | + |

| Instruction | F | X | V | L | M | Z |
|---|---|---|---|---|---|---|
| BFCMPU | – | – | – | + | – | + |

Fig. 163 (a):

BVSCH

| | |
|---|---|
| 0001bd+X | 1111P111 |

X Size of offset (R1) and width (R2)

X = 0 : 32 bits

X = 1 : 64 bits <<LX>> d Bit value to be searched d = 0 : Search '0' (/0)

d = 1 : Search '1' (/1)

b Search direction b = 0 : Direction of the increasing bit number (/F).

b = 1 : Direction of the decreasing bit number (/B).

Parameters for register

R0: base address

R1: offset

Read-modify-write operand. Search start-offset as a parameter and result-offset as a return parameter are contained. Until the bit of the value specified by d is searched, offset exceeds the word boundary. When the instruction is suspended, the current searching offset is contained. (negative available)

R2: width

Bit field length which searches offset (number of bits). Although width (R2) is treated as a signed number, if

Fig. 163 (b):

width $\leq 0$, only the V_flag is set and the instruction is terminated.

An EIT does not occur.

Fig. 164:

| Instruction | F | X | V | L | M | Z |
|---|---|---|---|---|---|---|
| BVSCH | - | - | * | - | - | - |

V indicates the search operation is unsuccessfully terminated.

Fig. 165:

BVMAP

| | |
|---|---|
| 0011bQ0X | 1111P111 |

X Size of src offset (R1), src width (R2), dest offset (R4)

X = 0: 32 bits

X = 1: 64 bits <<LX>>

P P bit option for src

Q P bit option for dest b Operation direction b = 0: Direction of increasesing bit number (/F)

b = 1: Direction of decreasesing bit number (/B)

Parameters for Register

R0: base address of src bit field

R1: offset of src bit field

Treated as a signed number (negative available).

R2: width bitfield length to be operated (number of bits)

Although width (R2) is treated as a signed number, if width $\leq$ 0, the instruction is terminated without any operation. An EIT does not occur.

R3: base address of dest bit field

R4: offset of dest bit field

Treated as a signed number (negative available).

R5: Type of operation

Lower 4 bits are used.

| Instruction | F | X | V | L | M | Z |
|---|---|---|---|---|---|---|
| BVMAP | - | - | - | - | - | - |

The result of the operation is assured with /B and /F.

Fig. 168:

The length from base to offset for dest is small.

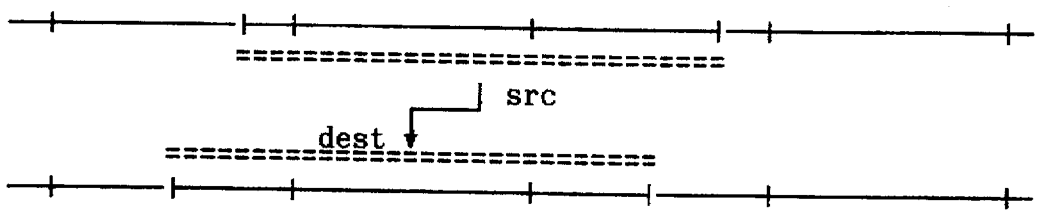

The result of the operation is assured with /F.

The result of the operation is not assured with /B.

Page fault may cause the result to change.

Fig. 169:

The length from base to offset for dest is large.

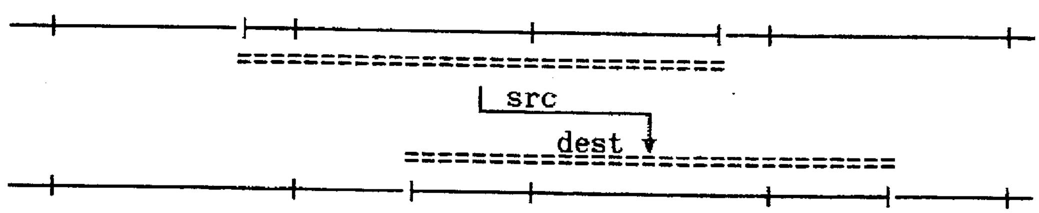

The result of the operation is assured with /B.

However, it is defined in <<L2>>.

The result of the operation is not assured with /F.

Page fault may cause the result to change.

Fig. 170:

BVCPY

| | |
|---|---|
| 0011bQ1X | 1111P111 |

X Size of src offset(R1), src width (R2), and dest offset (R4)

X = 0: 32 bits

X = 1: 64 bits <<LX>>

P P bit option for src

Q P bit option for dest b Operation direction b = 0: Direction of increasing bit number (/F)

b = 1: Direction of decreasing bit number (/B)

Parameters for Register

R0: base address of src bit field

R1: offset of src bit field

Treated as a signed number

R2: width bitfield length to be operated (number of bits)

Although width(R2) is treated as a signed number, if width $\leq$ 0, the instruction is terminated without any operation.

An EIT does not occur.

R3: base address of dest bit field

R4: offset of dest bit field

Treated as a signed number

Fig. 171:

| Instruction | F | X | V | L | M | Z |
|---|---|---|---|---|---|---|
| BVCPY | - | - | - | - | - | - |

Fig. 172:

BVPAT

| | |
|---|---|
| 000001+X | 1111P111 |

X Size of pattern (R0), width (R2), and dest offset (R4)

X = 0: 32 bits

X = 1: 64 bits <<LX>>

P P bit option for dest

Parameters for register

R0: pattern

R1: Not used

R2: width

Length of bitfield to be operated (number of bits)

Although width (R2) is treated as a signed number, if the width $\leq$ 0, the instruction is completed without any operation.

An EIT does not occur.

R3: base address of dest bit field

R4: offset of dest bit field

It is treated as a signed number.

R5: Type of operation

The lower 4 bits are used. Common with the BVMAP instruction

Fig. 173:

| Instruction | F | X | V | L | M | Z |
|---|---|---|---|---|---|---|
| BVPAT | - | - | - | - | - | - |

Fig. 174:

ADDDX:G src/EaR,dest/EaM

| | | | |
|---|---|---|---|
| 110100RR | ..EaR... | 000101MM | ..EaM... |

ADDDX:E src/#ib,dest/EaM

| | | | |
|---|---|---|---|
| 101111111 | ..#ib... | 000101MM | ..EaM... |

Fig. 175:

| Instruction | F | X | V | L | M | Z |
|---|---|---|---|---|---|---|
| ADDDX | - | + | + | 0 | + | + |

Fig. 176:

SUBDX:G src/EaR,dest/EaM

| | | | |
|---|---|---|---|
| 110100RR | ..EaR... | 000111MM | ..EaM... |

SUBDX:E src/#ib,dest/EaM

| | | | |
|---|---|---|---|
| 10111111 | ..#ib... | 000111MM | ..EaM... |

Fig. 177:

| Instruction | F | X | V | L | M | Z |
|---|---|---|---|---|---|---|
| SUBDX | - | + | + | + | + | + |

Fig. 178:

PACKss src/EaR,dest/EaW

| | | | |
|---|---|---|---|
| 110101RR | ..EaR... | 010010WW | ..EaW... |

Fig. 179:

| Instruction | F | X | V | L | M | Z |
|---|---|---|---|---|---|---|
| PACKss | – | – | – | – | – | – |

UNPKss src/EaR,dest/EaW,adj/#iW

| Instruction | F | X | V | L | M | Z |
|---|---|---|---|---|---|---|
| UNPKss | - | - | - | - | - | - |

Fig. 182:

```
UNPKBH   src[.B],dest[.H],adj[.H]

         RR=00,WW=01     tmp composes of 16 bits

                                    0 ==> tmp[00:15],

                         src[00:03] ==> tmp[04:07],

                         src[04:07] ==> tmp[12:15],

                         tmp + adj  ==> dest

UNPKHW   src[.H],dest[.W],adj[.W]                      <<L2>>

         RR=01,WW=10     tmp composes of 32 bits

                                    0 ==> tmp[00:31],

                         src[00:03] ==> tmp[04:07],

                         src[04:07] ==> tmp[12:15],

                         src[08:11] ==> tmp[20:23],

                         src[12:15] ==> tmp[28:31],

                         tmp + adj  ==> dest

UNPKBW   src[.B],dest[.W],adj[.W]

         RR=00,WW=10                0 ==> tmp[00:31],

                         src[00:03] ==> tmp[12:15],

                         src[04:07] ==> tmp[28:31],

                         tmp + adj  ==> dest

UNPKWL   src[.W],dest[.L],adj[.L]                      <<LX>>

UNPKHL   src[.H],dest[.L],adj[.L]                      <<LX>>
```

Fig. 183:

| Termination condition | Mnemonic | Meaning | eeee |
|---|---|---|---|
| <R3 | LTU | less than (unsigned) | 0000 |
| ≥R3 | GEU | greater or equal (unsigned) | 0001 |
| =R3 | EQ | equal | 0010 |
| ≠R3 | NE | not equal | 0011 |
| <R3 | LT | less than (signed) | 0100 |
| ≥R3 | GE | greater or equal (signed) | 0101 |
| none | N | never (or no option) | 0110 |
| - | - | reserved {RIE} | 0111 |
| - | - | reserved {RIE} <<L2>> | 1XXX |

Fig. 184:

SMOV

| | |
|---|---|
| 00eeeeSS | 1110P1Qb |

P P bit option for src

Q P bit option for dest

SS Size of the element and termination conditions (R3 and R4)

b Direction of operation b = 0: Copy the string in the direction the address increases (/F).

b = 1: Copy the string in the direction the address decreases (/B)

eeee Termination condition of the string instruction

Parameters for register

R0: Start address of src string

R1: Start address of dest string

R2: Length of string and amount of data

R3: Comparison value of termination condition (1)

R4: Comparison value of termination condition (2) (ATOM does not use this parameter.)

Fig. 185:

| Instruction | F | X | V | L | M | Z |
|---|---|---|---|---|---|---|
| SMOV | * | – | * | – | * | – |

Fig. 186:

SCMP

| 00eeeeSS | 1110P0Qb |
|---|---|

P P bit option for src1

Q P bit option for src2

SS Size of the element and termination conditions (R3 and R4)

b Direction of operation b = 0: Compare the string in the direction the address increases (/F).

b = 1: Compare the string in the direction the address decreases (/B).

eeee String instruction termination condition

Parameter for register

R0: Start address of src1 string

R1: Start address of src2 string

R2: Length of string and amount of data

R3: Comparison value of termination condition (1)

R4: Comparison value of termination condition (2) (ATOM does not use this option.)

Fig. 187:

| Instruction | F | X | V | L | M | Z |
|---|---|---|---|---|---|---|
| SCMP | * | * | * | + | * | + |

Fig. 188:

| [ SCMP termination causes ] | | | [ flags ] | | | | |
|---|---|---|---|---|---|---|---|
| Length | Not matched | Termination condition | V | Z | L X | F | M |
| X | X | O(src1=src2) | 0 | 1 | 0 | 1 | *A |
| X | O | X(src1) | 0 | 0 | *C | 0 | 0+ |
| X | O | O(src1) | 0 | 0 | *C | 1 | *B |
| O | X | X | 1 | 1 | 0 | 0 | 0+ |

O: indicates the termination causes are satisfied.

X: indicates the termination causes are not satisfied.

+: indicates the status is obtained by the rule rather than the flag's meaning.

*A: Depends on the termination condition src1 = src2.

*B: Depends on the termination condition of src1.

*C: Depends on src1 < src2 or src2 < src1.

Although the /B option is defined in <<L2>>, ATOM supports it.

Fig. 189:

SSCH

| | |
|---|---|
| 00eeeeSS | 1111P10r |

P P bit option for src

SS Size of the element and termination conditions (R3 and R4)

eeee String instruction termination condition r Pointer update method r = 0: Increment only by the element size (/F).

r = 1: Specify the increment/decrement value by register R5 (/R).

Parameters for register

R0: Start address of src string

R1: Not used

R2: Length of string and amount of data

R3: Comparison value of termination condition (1)

R4: Comparison value of termination condition (2)

R5: Pointer update value (in the case of /R option)

Fig. 190:

| Instruction | F | X | V | L | M | Z |
|---|---|---|---|---|---|---|
| SSCH | * | – | * | – | * | – |

V indicates the search is unsuccessfully terminated.

Fig. 191:

SSTR

| 001001SS | 1111P111 |
|---|---|

P P bit option for dest

SS Size of data to be written (R3)

Parameter for register

R0: Not used

R1: Start address of dest string

R2: String length and amount of data

R3: Data to be written

Fig. 192:

| Instruction | F | X | V | L | M | Z |
|---|---|---|---|---|---|---|
| SSTR | - | - | - | - | - | - |

Fig. 193:

QINS entry/EaMqP,queue/EaMqP2

| | | | |
|---|---|---|---|
| 11011000 | ..EaMqP. | 101110+- | ..EaMqP2 |

Fig. 194:

| Instruction | F | X | V | L | M | Z |
|---|---|---|---|---|---|---|
| INDEX | - | - | - | - | - | * |

Fig. 195:

```
address_of_queue ==> mem[address_of_entry] ==> temp1
mem[address_of_queue + 4] ==> mem[address_of_entry +4] ==>temp2
address_of_entry ==> mem[mem[address_of_queue + 4]]
address_of_entry ==> mem[address_of_queue +4]
if (temp1 = temp2) then
      1 ==> Z_flag
else
      0 ==> Z_flag
endif
```

Fig. 198:

QDEL queue/EaRqP,dest/EaW!S

| | | | |
|---|---|---|---|
| 11011000 | ..EaRqP. | 101100+W | ..EaW!S. |

Fig. 199:

| Instruction | F | X | V | L | M | Z |
|---|---|---|---|---|---|---|
| QDEL | - | - | * | - | - | * |

Fig. 200:

```
mem[address_of_queue] ==> successor
if(address_of_queue successor) then
        1 ==> V_flag
        1 ==> Z_flag
else
        successor ==> dest
        mem[successor] ==> mem[address_of_queue] ==> temp1
        address_of_queue ==> mem[mem[successor] + 4] ==> temp2
        if (temp1 = temp2) then
                0 ==> V_flag
                1 ==> Z_flag
        else
                0 ==> V_flag
                0 ==> Z_flag
        endif
endif
```

Fig. 203 (a):

QSCH

| | |
|---|---|
| 00eeeeSS | 1111P0mb |

P P bit option in queue area

SS Comparison termination conditions (R3, R4) and search data size eeee Comparison termination conditions (same as the string instruction termination conditions)

m Presence/absence of mask m = 0 Not mask R6 (/NM).

m = 1 Mask R6 (/MR).

b Search direction b = 0 Forward (/F)

b = 1 Backward (/B)

<u>Parameters for Registers</u>

R0 Address of the queue_entry that the search operation starts with. First, enter the content of the queue head = first queue address.

R1 Used as a return parameter. Upon completion of the instruction, the address of the queue_entry just before it is stored.

Fig. 203 (b):

R2 Queue end address

R3 Comparison value (1)

R4 Comparison value (2)

R5 Offset of search data being entered

Offset from the link address of the member being searched

R6 Mask (when m = 1)

R0, R2, and R3 (options), R4 (option), and R5 and R6 (options) should be set, while the results are stored in R0 and R1. The continuous search operation is available.

Fig. 204:

| Instruction | F | X | V | L | M | Z |
|---|---|---|---|---|---|---|
| QSCH | * | – | * | – | * | – |

V indicates that the search operation is unsuccessfully completed.

Fig. 205 (a):

```
while (1) do
        R0 ==> R1
        if b=0 then
                mem[R0] ==> R0
                /* Search the queue along the forward link. */
        else
                mem[R0+4] ==> R0
                /* Search the queue along the backward link. */
        if(R0 = R2) then
                1 ==> V_flag
                0 ==> M_flag
                0 ==> F_flag
                exit
           /* Unsuccessfully terminate the search operation. */
        endif
        if m=0 then
                compare mem[R0+R5] with R3, R4
                and set F_flag, M_flag according to eeee
           /* If the termination condition is satisfied, F_flag
           is set to 1. */
        else
                compare (mem[R0+R5] & R6) with R3, R4
                and set F_flag, M_flag according to eeee
```

```
        /* If the termination condition is satisfied, F_flag
        is set to 1. */
      endif
      if (F_flag = 1) then
            0 ==> V_flag
            exit
        /* Successfully terminate the search operation. */
      endif
      check_interrupt
end_while
```

Fig. 208

BRA:D newpc/#d8

| | |
|---|---|
| 10101110 | ..#d8... |

BRA:G newpc/#dS

| | | |
|---|---|---|
| 001000SS | 1111P111 | ......#dS....... |

Fig. 209:

| Instruction | F | X | V | L | M | Z |
|---|---|---|---|---|---|---|
| BRA | - | - | - | - | - | - |

Fig. 210:

Bcc:D newpc/#d8

| | |
|---|---|
| 10cccc00 | ..#d8... |

Bcc:G newpc/#dS

| | | |
|---|---|---|
| 00ccccSS | 1111P110 | ......#dS....... |

cccc : Specify the conditions

Fig. 211:

| Instruction | F | X | V | L | M | Z |
|---|---|---|---|---|---|---|
| Bcc | – | – | – | – | – | – |

Fig. 212:

| Mnemonic | Meaning | Condition | cccc |
|---|---|---|---|
| XS | X_flag set | X | 0000 |
| XC | X_flag clear | ~X | 0001 |
| EQ | equal / Z_flag set | Z | 0010 |
| NE | not equal /Z_flag clear | ~Z | 0011 |
| LT | less than / L_flag set | L | 0100 |
| GE | greater or equal / L_flag clear | ~L | 0101 |
| LE | less or equal | L+Z | 0110 |
| GT | greater than | ~L*~Z | 0111 |
| VS | V_flag set | V | 1000 |
| VC | V_flag clear | ~V | 1001 |
| MS | minus / M_flag set | M | 1010 |
| MC | plus / M_flag clear | ~M | 1011 |
| FS | F_flag set | F | 1100 |
| FC | F_flag clear | ~F | 1101 |
| {RIE} | | | 1110 |
| {RIE} | | | 1111 |

If the undefined conditions are specified in Bcc, an RIE occurs.

Fig. 213:

BSR:D newpc/#d8

| | |
|---|---|
| 10101111 | ..#d8... |

BSR:G newpc/#dS

| | | |
|---|---|---|
| 00101QSS | 1111P111 | ......#dS....... |

Fig. 214:

| Instruction | F | X | V | L | M | Z |
|---|---|---|---|---|---|---|
| BSR | – | – | – | – | – | – |

Fig. 215:

JMP newpc/EaA

| | |
|---|---|
| 10000010 | ..EaA... |

Fig. 216:

| Instruction | F | X | V | L | M | Z |
|---|---|---|---|---|---|---|
| JMP | – | – | – | – | – | – |

Fig. 217:

JSR newpc/EaA

| | |
|---|---|
| 1010101P | ..EaA... |

Fig. 218:

| Instruction | F | X | V | L | M | Z |
|---|---|---|---|---|---|---|
| JSR | – | – | – | – | – | – |

Fig. 219:

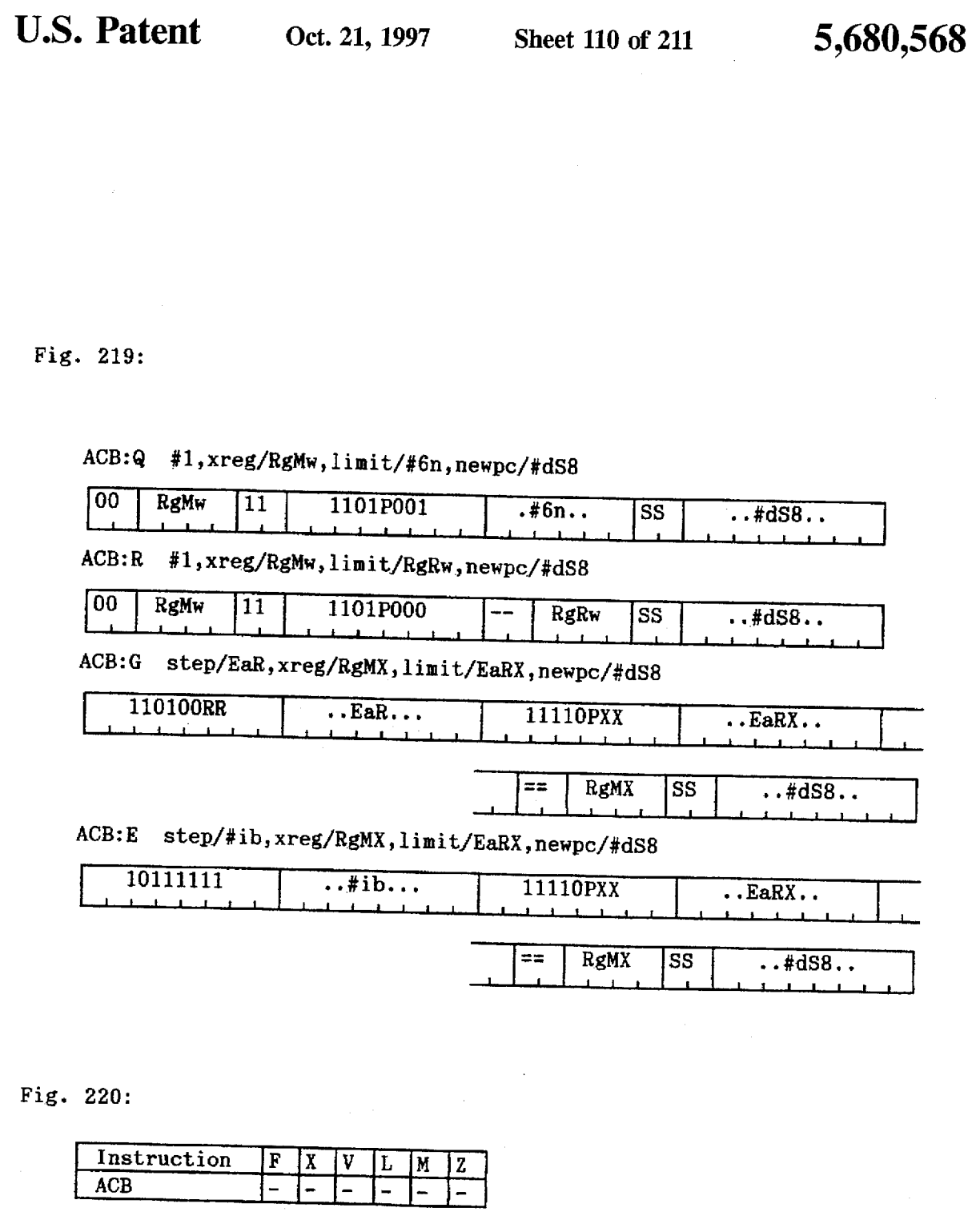

ACB:Q #1,xreg/RgMw,limit/#6n,newpc/#dS8

| | | | | | | |
|---|---|---|---|---|---|---|
| 00 | RgMw | 11 | 1101P001 | .#6n.. | SS | ..#dS8.. |

ACB:R #1,xreg/RgMw,limit/RgRw,newpc/#dS8

| | | | | | | | |
|---|---|---|---|---|---|---|---|
| 00 | RgMw | 11 | 1101P000 | -- | RgRw | SS | ..#dS8.. |

ACB:G step/EaR,xreg/RgMX,limit/EaRX,newpc/#dS8

| | | | | |
|---|---|---|---|---|
| 110100RR | ..EaR... | 11110PXX | ..EaRX.. | |

| | | | | |
|---|---|---|---|---|
| | == | RgMX | SS | ..#dS8.. |

ACB:E step/#ib,xreg/RgMX,limit/EaRX,newpc/#dS8

| | | | | |
|---|---|---|---|---|
| 10111111 | ..#ib... | 11110PXX | ..EaRX.. | |

| | | | | |
|---|---|---|---|---|
| | == | RgMX | SS | ..#dS8.. |

Fig. 220:

| Instruction | F | X | V | L | M | Z |
|---|---|---|---|---|---|---|
| ACB | - | - | - | - | - | - |

Fig. 221:

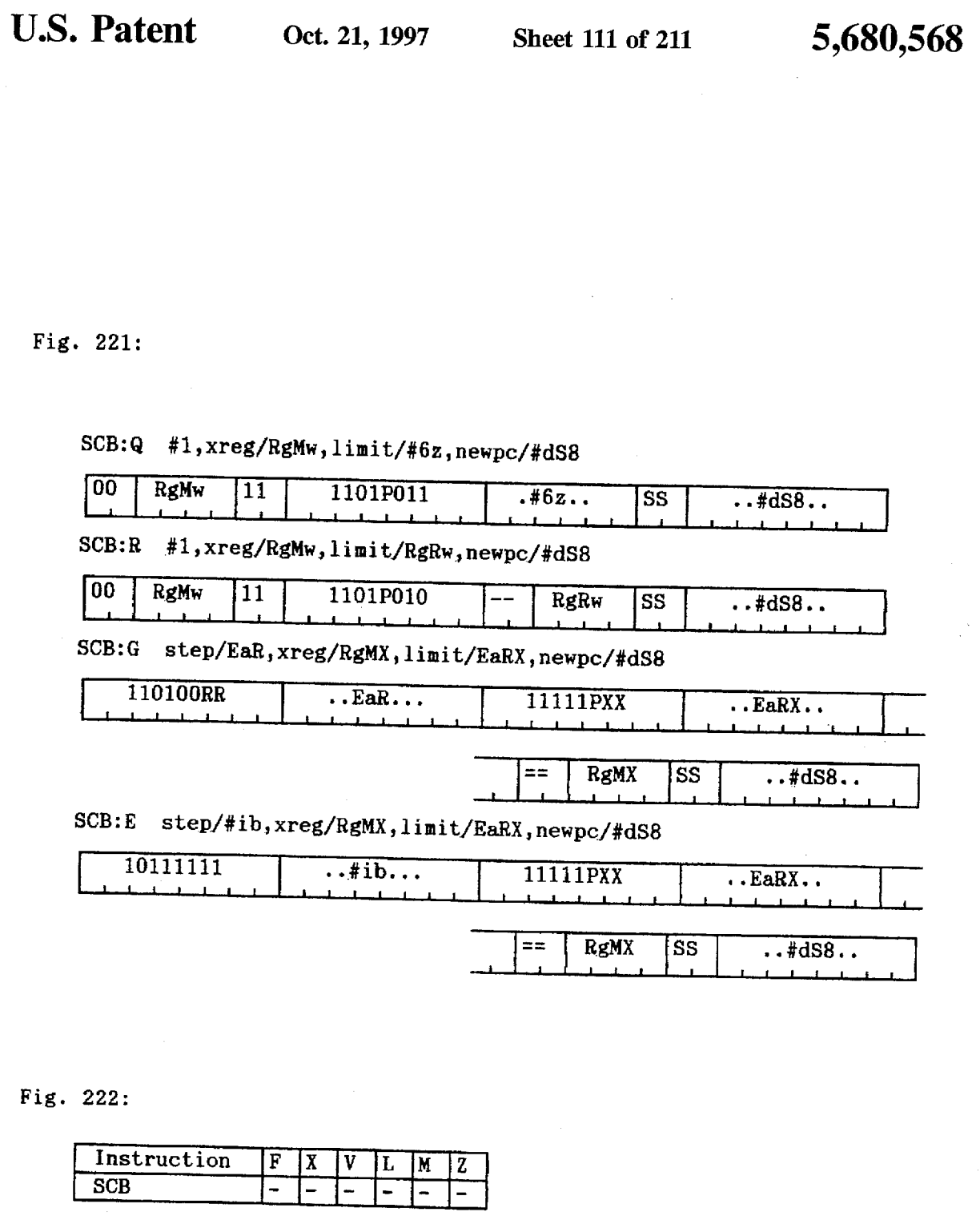

SCB:Q #1,xreg/RgMw,limit/#6z,newpc/#dS8

| | | | | | | |
|---|---|---|---|---|---|---|
| 00 | RgMw | 11 | 1101P011 | .#6z.. | SS | ..#dS8.. |

SCB:R #1,xreg/RgMw,limit/RgRw,newpc/#dS8

| | | | | | | | |
|---|---|---|---|---|---|---|---|
| 00 | RgMw | 11 | 1101P010 | -- | RgRw | SS | ..#dS8.. |

SCB:G step/EaR,xreg/RgMX,limit/EaRX,newpc/#dS8

| | | | | |
|---|---|---|---|---|
| 110100RR | ..EaR... | 11111PXX | ..EaRX.. | |

| | | | | |
|---|---|---|---|---|
| | == | RgMX | SS | ..#dS8.. |

SCB:E step/#ib,xreg/RgMX,limit/EaRX,newpc/#dS8

| | | | | |
|---|---|---|---|---|
| 10111111 | ..#ib... | 11111PXX | ..EaRX.. | |

| | | | | |
|---|---|---|---|---|
| | == | RgMX | SS | ..#dS8.. |

Fig. 222:

| Instruction | F | X | V | L | M | Z |
|---|---|---|---|---|---|---|
| SCB | - | - | - | - | - | - |

Fig. 223:

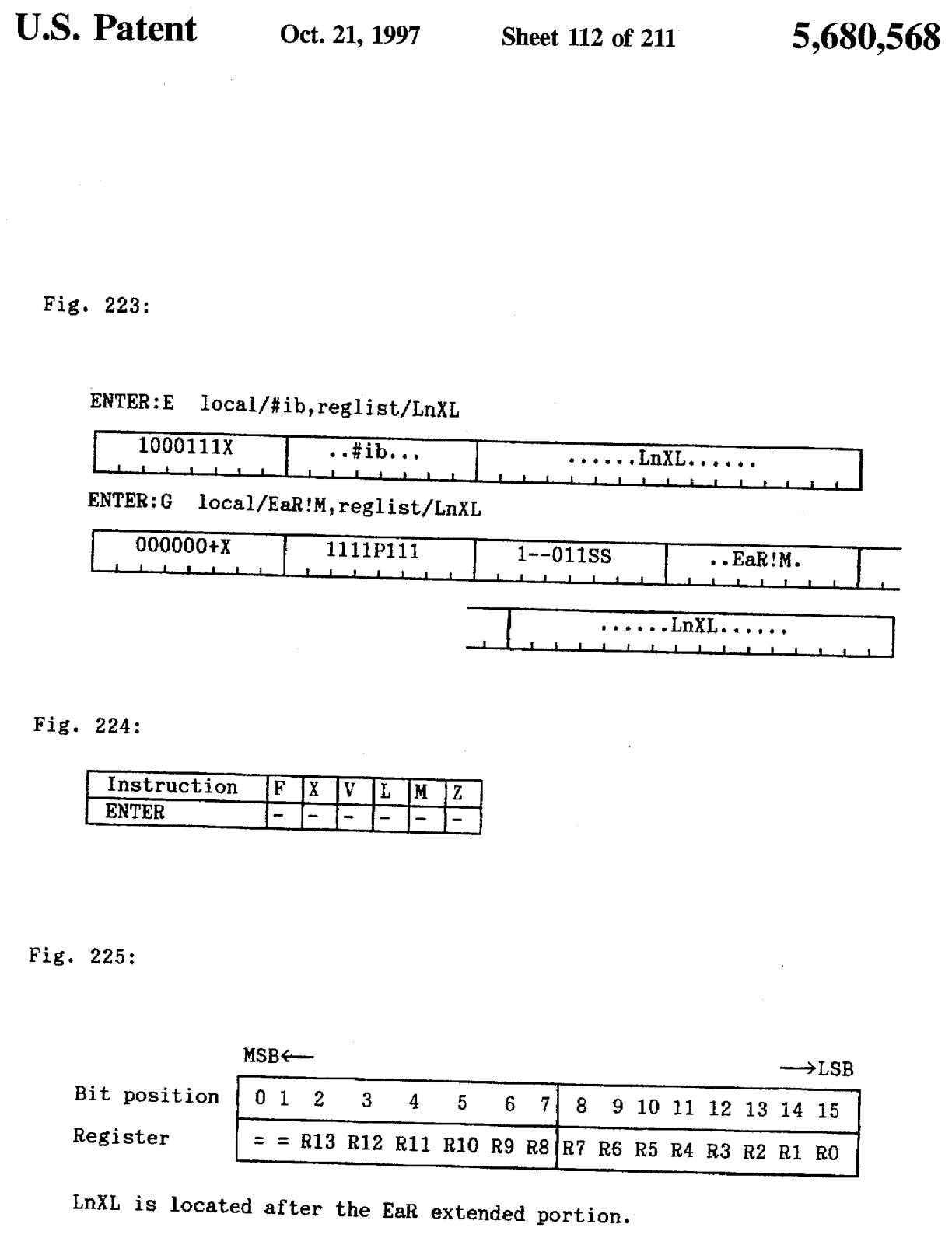

ENTER:E local/#ib,reglist/LnXL

| | | |
|---|---|---|
| 1000111X | ..#ib... | ......LnXL...... |

ENTER:G local/EaR!M,reglist/LnXL

| | | | |
|---|---|---|---|
| 000000+X | 1111P111 | 1--011SS | ..EaR!M. |

| |
|---|
| ......LnXL...... |

Fig. 224:

| Instruction | F | X | V | L | M | Z |
|---|---|---|---|---|---|---|
| ENTER | - | - | - | - | - | - |

Fig. 225:

MSB← →LSB

| Bit position | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Register | = | = | R13 | R12 | R11 | R10 | R9 | R8 | R7 | R6 | R5 | R4 | R3 | R2 | R1 | R0 |

LnXL is located after the EaR extended portion.

Fig. 226:

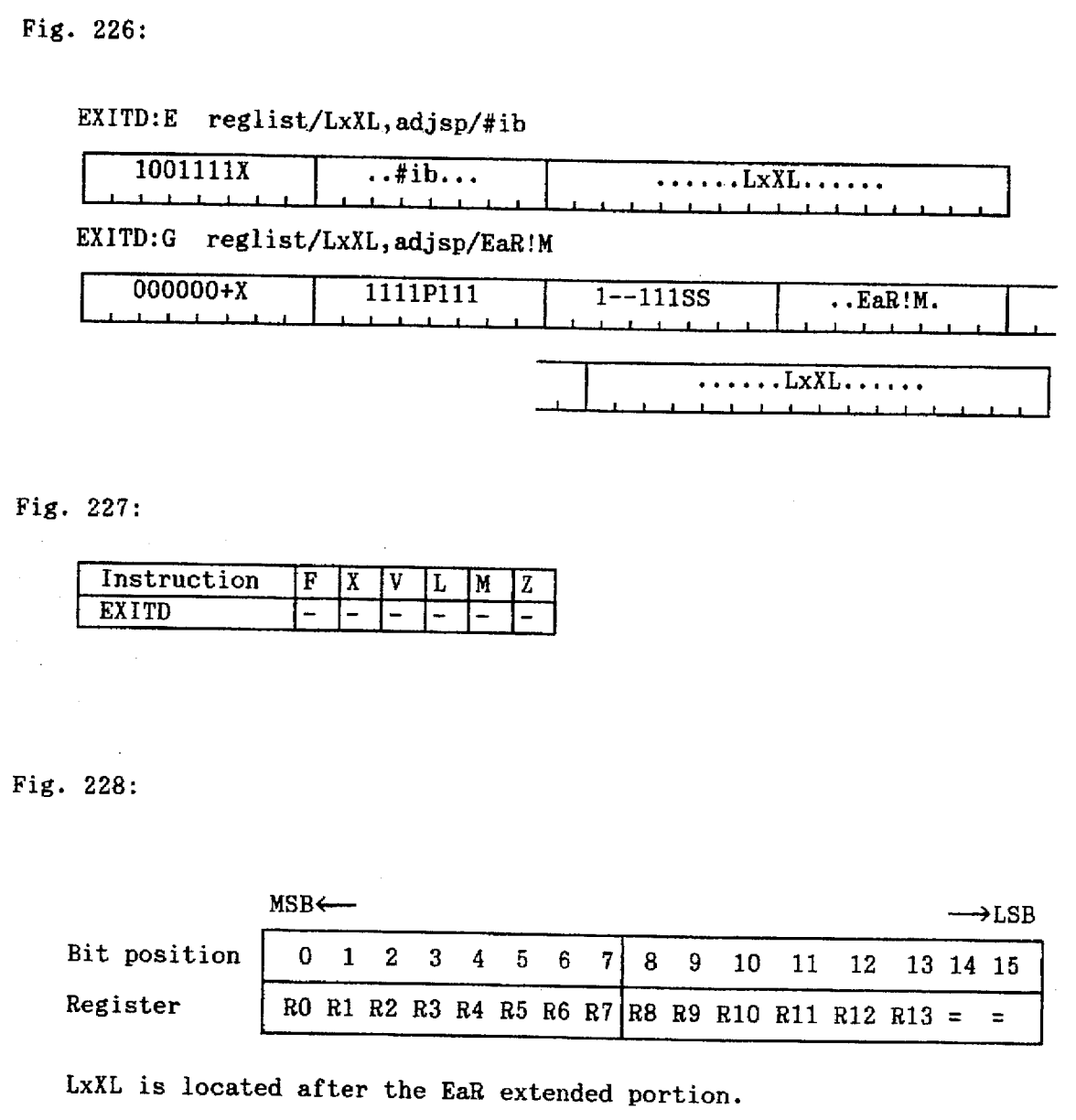

EXITD:E reglist/LxXL,adjsp/#ib

| | | |
|---|---|---|
| 1001111X | ..#ib... | ......LxXL...... |

EXITD:G reglist/LxXL,adjsp/EaR!M

| | | | |
|---|---|---|---|
| 000000+X | 1111P111 | 1--111SS | ..EaR!M. |

| |
|---|
| ......LxXL...... |

Fig. 227:

| Instruction | F | X | V | L | M | Z |
|---|---|---|---|---|---|---|
| EXITD | - | - | - | - | - | - |

Fig. 228:

MSB⟵ ⟶LSB

| | | | | | | | | | | | | | | | | |
|---|---|---|---|---|---|---|---|---|---|---|---|---|---|---|---|---|
| Bit position | 0 | 1 | 2 | 3 | 4 | 5 | 6 | 7 | 8 | 9 | 10 | 11 | 12 | 13 | 14 | 15 |
| Register | R0 | R1 | R2 | R3 | R4 | R5 | R6 | R7 | R8 | R9 | R10 | R11 | R12 | R13 | = | = |

LxXL is located after the EaR extended portion.

Fig. 229:

RTS

| | |
|---|---|
| 00101011 | 1101P110 |

Fig. 230:

| Instruction | F | X | V | L | M | Z |
|---|---|---|---|---|---|---|
| RTS | – | – | – | – | – | – |

Fig. 231:

NOP

| | |
|---|---|
| 00011011 | 1101-110 |

Fig. 232:

| Instruction | F | X | V | L | M | Z |
|---|---|---|---|---|---|---|
| NOP | – | – | – | – | – | – |

Fig. 233:

PIB

| | |
|---|---|
| 00001011 | 1101P110 |

Fig. 234:

| Instruction | F | X | V | L | M | Z |
|---|---|---|---|---|---|---|
| PIB | - | - | - | - | - | - |

Fig. 235:

BSETI:Q offset/#3z,base/ShMfqi

| | | | | |
|---|---|---|---|---|
| 100 | #3z | 01 | 11 | ShMfqi |

BSETI:G offset/EaR,base/EaMfi

| | | | |
|---|---|---|---|
| 110100RR | ..EaR... | 101000BB | ..EaMfi. |

BSETI:E offset/#ib,base/EaMfi

| | | | |
|---|---|---|---|
| 10111111 | ..#ib... | 101000BB | ..EaMfi. |

BB: Specify the size for the read-modify-write operation.

Fig. 236:

| Instruction | F | X | V | L | M | Z |
|---|---|---|---|---|---|---|
| BSETI | – | – | – | – | – | + |

Z indicates the test result.

Fig. 237:

BCLRI:G offset/EaR,base/EaMfi

| 110100RR | ..EaR... | 101001BB | ..EaMfi. |
|---|---|---|---|

BCLRI:E offset/#ib,base/EaMfi

| 10111111 | ..#ib... | 101001BB | ..EaMfi. |
|---|---|---|---|

BB: Specify the size for the read-modify-write operation.

Fig. 238:

| Instruction | F | X | V | L | M | Z |
|---|---|---|---|---|---|---|
| BCLRI | – | – | – | – | – | + |

Z indicates the test result.

Fig. 239:

CSI comp/RMC,update/EaR,dest/EaMiR

| | | | | | |
|---|---|---|---|---|---|
| 110101RR | ..EaR... | 00 | RMC. | 00 | ..EaMiR. |

RR: Size for comp, dest and update

Fig. 240:

| Instruction | F | X | V | L | M | Z |
|---|---|---|---|---|---|---|
| CSI | - | - | - | - | - | + |

Z indicates that the update operation is successfully terminated.

Fig. 241:

LDC:G src/EaR,dest/EaW%

| | | | |
|---|---|---|---|
| 110100RR | ..EaR... | 100110WW | ..EaW%.. |

LDC:E src/#ib,dest/EaW%

| | | | |
|---|---|---|---|
| 10111111 | ..#ib... | 100110WW | ..EaW%.. |

Fig. 242:

| Instruction | F | X | V | L | M | Z | |
|---|---|---|---|---|---|---|---|
| LDC | – | – | – | – | – | – | |
| | * | * | * | * | * | * | ← If dest is PSW |

Fig. 243:

STC src/EaR%,dest/EaW

| | | | |
|---|---|---|---|
| 11011000 | ..EaR%.. | 101010WW | ..EaW... |

Fig. 244:

| Instruction | F | X | V | L | M | Z |
|---|---|---|---|---|---|---|
| STC | – | – | – | – | – | – |

Fig. 245:

LDPSB src/EaRh

| | |
|---|---|
| 11011100 | ..EaRh.. |

Fig. 246:

| Instruction | F | X | V | L | M | Z |
|---|---|---|---|---|---|---|
| LDPSB | * | * | * | * | * | * |

Set by the instruction.

Fig. 247:

LDPSM src/EaRh

| | |
|---|---|
| 11011101 | ..EaRh.. |

Fig. 248:

| Instruction | F | X | V | L | M | Z |
|---|---|---|---|---|---|---|
| LDPSM | - | - | - | - | - | - |

Fig. 249:

STPSB dest/EaWh

| | |
|---|---|
| 11011110 | ..EaWh.. |

Fig. 250:

| Instruction | F | X | V | L | M | Z |
|---|---|---|---|---|---|---|
| STPSB | – | – | – | – | – | – |

Fig. 251:

STPSM dest/EaWh

| | |
|---|---|
| 11011111 | ..EaWh.. |

Fig. 252:

| Instruction | F | X | V | L | M | Z |
|---|---|---|---|---|---|---|
| STPSM | - | - | - | - | - | - |

Fig. 253:

LDP:G src/EaR,dest/EaW%

| | | | |
|---|---|---|---|
| 110100RR | ..EaR... | 100111WW | ..EaW%.. |

LDP:E src/#ib,dest/EaW%

| | | | |
|---|---|---|---|
| 10111111 | ..#ib... | 100111WW | ..EaW%.. |

Fig. 254:

| Instruction | F | X | V | L | M | Z |
|---|---|---|---|---|---|---|
| LDP | – | – | – | – | – | – |

Fig. 255:

STP src/EaR%,dest/EaW

| | | | |
|---|---|---|---|
| 11011000 | ..EaR%.. | 101011WW | ..EaW... |

Fig. 256:

| Instruction | F | X | V | L | M | Z |
|---|---|---|---|---|---|---|
| STP | - | - | - | - | - | - |

Fig. 257:

JRNG:E vector/#ib

| | |
|---|---|
| 10111110 | ..#ib... |

JRNG:G vector/EaRh!M

| | |
|---|---|
| 1011101P | ..EaRh!M |

Fig. 258:

| Instruction | F | X | V | L | M | Z |
|---|---|---|---|---|---|---|
| JRNG | – | – | – | – | – | – |

Fig. 259:

- JRNGVB

| | |
|---|---|
| JRNGVB | ==E |

VR (Vector RNG): Destination ring No. newly jumped by the execution of the JRNG instruction AR (Access RNG): Outermost ring No. where the execution of the JRNG instruction is permitted.

VX (Vector XA): New XA after the JRNG instruction is executed. This bit is fixed to 0.

VPC (Vector PC): New PC after the JRNG instruction is executed.

Stack Frame Formed by JRNG (New Ring)

Stack frame where an EIT occurs when using JRNG (Correct)

Stack frame if an EIT occurs when using JRNG (Incorrect)

Stack frame when jumped to the same ring when using JRNG

Fig. 265:

RRNG

| | |
|---|---|
| 00111011 | 1101P110 |

Fig. 266:

| Instruction | F | X | V | L | M | Z |
|---|---|---|---|---|---|---|
| RRNG | * | * | * | * | * | * |

Return from the stack.

* SP remains unchanged when an inter-ring call is performed.

* In PSW, the value before the RRNG instruction is executed is rewritten by EITVTE of RFE and RTV. PRNG represents the ring which executed the RRNG instruction. PSW saved in the stack (PSW where RFE occurs) does not affect PSW after an EIT occurs.

Fig. 269:

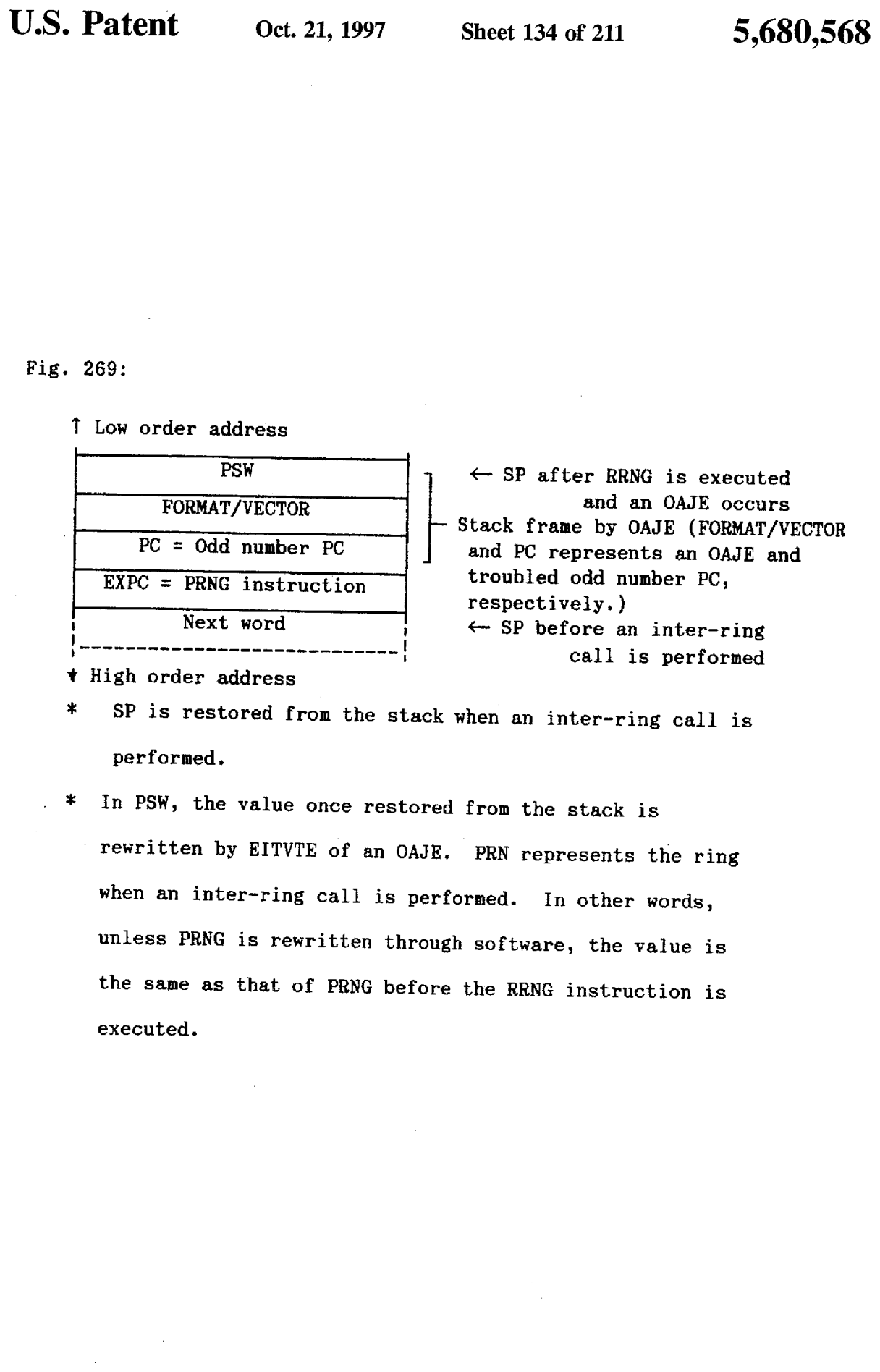

↑ Low order address

| |
|---|
| PSW |
| FORMAT/VECTOR |
| PC = Odd number PC |
| EXPC = PRNG instruction |
| Next word |

← SP after RRNG is executed and an OAJE occurs

Stack frame by OAJE (FORMAT/VECTOR and PC represents an OAJE and troubled odd number PC, respectively.)

← SP before an inter-ring call is performed

↓ High order address

* SP is restored from the stack when an inter-ring call is performed.

* In PSW, the value once restored from the stack is rewritten by EITVTE of an OAJE. PRN represents the ring when an inter-ring call is performed. In other words, unless PRNG is rewritten through software, the value is the same as that of PRNG before the RRNG instruction is executed.

Fig. 270:

TRAPA vector/#4z

| | | | |
|---|---|---|---|
| 00 | #4z. | 11 | 1101P101 |

Fig. 271:

| Instruction | F | X | V | L | M | Z |
|---|---|---|---|---|---|---|
| TRAPA | – | – | – | – | – | – |

Fig. 272:

TRAP

| | |
|---|---|
| 00cccc11 | 1101P100 |

cccc represents conditional specifications.

Fig. 273:

| Instruction | F | X | V | L | M | Z |
|---|---|---|---|---|---|---|
| TRAP | – | – | – | – | – | – |

REIT

| | |
|---|---|
| 00101111 | 1101P110 |

| Instruction | F | X | V | L | M | Z |
|---|---|---|---|---|---|---|
| REIT | * | * | * | * | * | * |

Return from the stack

Fig. 277:

WAIT imask/#ih

| | | |
|---|---|---|
| 00001111 | 1101-110 | ......#ih....... |

Fig. 278:

| Instruction | F | X | V | L | M | Z |
|---|---|---|---|---|---|---|
| WAIT | - | - | - | - | - | - |

Fig. 279:

LDCTX ctxaddr/EaA!A

| | |
|---|---|
| 10xx0110 | ..EaA!A. |

xx Specify the space where CTXB is placed.

xx = 00 Logical space (/LS)

xx = 01 Control space (/CS)

xx = 10 reserved xx = 11 reserved

Fig. 280:

| Instruction | F | X | V | L | M | Z |
|---|---|---|---|---|---|---|
| LDCTX | – | – | – | – | – | – |

Fig. 281:

STCTX

| 00xx0111 | 1101P110 |
|---|---|

xx Specify the space where CTXB is placed.

xx = 00 Logical space (/LS)

xx = 01 Control space (/CS)

xx = 10 reserved xx = 11 reserved

Fig. 282:

| Instruction | F | X | V | L | M | Z |
|---|---|---|---|---|---|---|
| STCTX | – | – | – | – | – | – |

Fig. 283:

ACS chkaddr/EaR

| | |
|---|---|
| 10000011 | ..EaA... |

Fig. 284:

| Instruction | F | X | V | L | M | Z |
|---|---|---|---|---|---|---|
| ACS | - | - | - | * | * | * |

Fig. 285:

MOVPA srcaddr/EaA,deat/EaW!S

| | | | |
|---|---|---|---|
| 11011000 | ..EaA... | 101001+W | ..EaW!S. |

Parameter for Register

R1: Base address on address translation table

Fig. 286:

| Instruction | F | X | V | L | M | Z |
|---|---|---|---|---|---|---|
| MOVPA | * | – | * | – | – | – |

Fig. 287:

| | V_flag | F_flag | Result |
|---|---|---|---|
| Normal termination | 0 | 0 | Physical address ==> dest |
| Error | 1 | 0 | dest does not change. |
| Page out(ST,PT,PAGE) | 1 | 1 | dest does not change. |

"Error" also occurs if an ATE format error (reserved ATE error) occurs or if the areas not used are specified by ATE.

Fig. 288:

| Address | General Memory Access | MOVPA,LDATE, and STATE Instruction |
|---|---|---|
| H'00000000 to H'7fffffff | Address translation using UATB | Address translation using R1 |
| H'80000000 to H'ffffffff | Address translation using SATB | Address translation using SATB |

Fig. 289:

LDATE src/EaR,destaddr/EaA

| 110101!R | ..EaR... | 10pttt00 | ..EaA... |
|---|---|---|---|

p Specify the logical space to be purged.

p = 0: All the spaces (/AS)

p = 1: Space containing LSID specified by R0 (/SS)

ttt ttt Specify ATE to be loaded.

ttt = 000: Load to PTE.

ttt = 001: Load to STE.

Parameters for Register

R0: LSID of the logical space for TLB to be purged (only with /SS).

R1: Base address on the address translation table.

Fig. 290:

| Instruction | F | X | V | L | M | Z |
|---|---|---|---|---|---|---|
| LDATE | * | – | * | – | – | – |

Fig. 291:

| | V_flag | F_flag | Result |
|---|---|---|---|
| Normal termination | 0 | 0 | ATE is set. |
| PI = 0 in ATE being loaded | 0 | 1 | ATE is set. |
| Reserved ATE error for ATE being loaded | 0 | 1 | ATE is set. |
| Reserved ATE error in the middle level ATE | 1 | 0 | ATE is not set. |
| PI = 0 in the middle ATE (page out) | 1 | 1 | ATE is not set. |

V_flag indicates that the ATE set operation is unsuccessful due to a reserved ATE error or page out.

Fig. 292:

STATE srcaddr/EaA,dest/EaW!S

| | | | |
|---|---|---|---|
| 11011000 | ..EaA... | 100ttt+W | ..EaW!S. |

ttt Specify ATE to be stored ttt = 000 Store from PTE.

ttt = 001 Store from STE.

<u>Parameter for Register</u>

R1: Base address on the address translation table

Fig. 293:

| Instruction | F | X | V | L | M | Z |
|---|---|---|---|---|---|---|
| STATE | * | - | * | - | - | - |

Fig. 294:

| | V_flag | F_flag | Result |
|---|---|---|---|
| Normal termination | 0 | 0 | ATE ==> dset |
| PI = 0 in ATE being read | 0 | 1 | ATE ==> dset |
| Reserved ATE error for ATE being read | 0 | 1 | ATE ==> dset |
| Reserved ATE error in the middle level ATE | 1 | 0 | dest does not change. |
| Page out in the middle level | 1 | 1 | dest does not change. |

V_flag represents that the ATE read operation is unsuccessful due to a reserved ATE error or page- out.

Fig. 295:

PTLB

| | |
|---|---|
| 00p11111 | 1101P110 |

p Specify the logical space to be purged.

p = 0 All the spaces (/AS)

p = 1 Space containing LSID specified by R0 (/SS)

<u>Parameter for Register</u>

R0: LSID of the logical spaced of TLB to be purged (only with /SS)

Fig. 296:

| Instruction | F | X | V | L | M | Z |
|---|---|---|---|---|---|---|
| PTLB | – | – | – | – | – | – |

Fig. 297:

PSTLB prgaddr/EaA

| | | | |
|---|---|---|---|
| 000000+- | 1111P111 | 0-pttt-- | ..EaA... |

p Specify the logical space to be purged.

p = 0 All the spaces (/AS)

p = 1 Space containing LSID specified by R0 (/SS)

ttt Specify the logical address range to be purged.

ttt = 000 Purge the entry where all the logical addresses (2^31 to 2^12 bits) are matched (/PT).

ttt = 001 Purge the entry where the 2^31 to 2^22 bits of the logical address are matched (/ST).

ttt = 110 Purge the entry where the 2^31 bit of the logical address is matched (/AT).

<u>Parameter for Register</u>

R0: LSID of the logical space of TLB to be purged (only with /SS).

Fig. 298:

| Instruction | F | X | V | L | M | Z |
|---|---|---|---|---|---|---|
| PSTLB | – | – | – | – | – | – |

Fig. 299:

| AT | Meaning |
|---|---|
| 00 | No address translation, no memory protection |
| 01 | TRONCHIP standard address translation and memory protection <<LA>> (4 KB page ring, 4 rings) |
| 10 | No address translation, simple memory protection using address <<L1R>> (Memory area classification by MSB of address, 2 rings) |
| 11 | Reserved |

Fig. 300:

| AT | Meaning |
|---|---|
| 00 | No address translation, no memory protection |
| 01 | Reserved |
| 10 | No address translation, simple memory protection using only address <<L1R>><br>(Classification of memory area by MSB of address, 2 rings) |
| 11 | Reserved |

Fig. 303:

| Instruction | F | X | V | L | M | Z | Comment |
|---|---|---|---|---|---|---|---|
| MOV | - | - | + | - | + | + | |
| MOVU | - | - | + | - | + | + | |
| PUSH | - | - | - | - | - | - | |
| POP | - | - | - | - | - | - | |
| STM | - | - | - | - | - | - | |
| LDM | - | - | - | - | - | - | |
| MOVA | - | - | - | - | - | - | |
| PUSHA | - | - | - | - | - | - | |

Fig. 304:

| Instruction | F | X | V | L | M | Z | Comment |
|---|---|---|---|---|---|---|---|
| CMP | - | - | - | + | - | + | |
| CMPU | - | - | - | + | - | + | |
| CHK | - | - | * | + | - | + | L and Z serve to compare a value with the low bound value. |

Fig. 305:

| Instruction | F | X | V | L | M | Z | Comment |
|---|---|---|---|---|---|---|---|
| ADD | - | + | + | + | + | + | |
| ADDU | - | + | + | 0 | + | + | |
| ADDX | - | + | + | + | + | + | |
| SUB | - | + | + | + | + | + | |
| SUBU | - | + | + | + | + | + | |
| SUBX | - | + | + | + | + | + | |
| MUL | - | - | + | + | + | + | |
| MULU | - | - | + | 0 | + | + | |
| MULX | * | - | 0 | 0 | + | + | M and Z are changed depending on dest. F is changed if tmp = 0. |
| DIV | - | - | 0 | + | + | + | |
| | - | - | 1 | 0 | 1 | 0 | These flag statuses occur if (minimum negative value)÷ (-1). |
| | - | - | 1 | - | - | - | Division by zero. |
| DIVU | - | - | 0 | 0 | + | + | |
| | - | - | 1 | - | - | - | Division by zero. |
| DIVX | * | - | 0 | 0 | + | + | M and Z are changed depending on dest. F is changed if tmp = 0. |
| | - | - | 1 | - | - | - | An overrflow occurrence in dest. |
| | - | - | 1 | - | - | - | Division by zero. |
| REM | - | - | 0 | + | + | + | |
| | - | - | 0 | - | - | - | Division by zero. |
| REMU | - | - | 0 | 0 | + | + | |
| | - | - | 0 | - | - | - | Division by zero. |
| NEG | - | - | + | + | + | + | |
| INDEX | - | - | + | + | + | + | M and Z are changed depending on xreg. |

Fig. 306:

| Instruction | F | X | V | L | M | Z | Comment |
|---|---|---|---|---|---|---|---|
| AND | – | – | – | – | + | + | |
| OR | – | – | – | – | + | + | |
| XOR | – | – | – | – | + | + | |
| NOT | – | – | – | – | + | + | |

Fig. 307:

| Instruction | F | X | V | L | M | Z | Comment |
|---|---|---|---|---|---|---|---|
| SHL | – | + | – | – | + | + | |
| SHA | – | + | + | + | + | + | |
| ROT | – | + | – | – | + | + | |
| SHXL | – | + | – | – | + | + | |
| SHXR | – | + | – | – | + | + | |
| RVBY | – | – | – | – | – | – | |
| RVBI | – | – | – | – | – | – | |

Fig. 308:

| Instruction | F | X | V | L | M | Z | Comment |
|---|---|---|---|---|---|---|---|
| BTST | – | – | – | – | – | + | Z indicates the test result. |
| BSET | – | – | – | – | – | + | Z indicates the test result. |
| BCLR | – | – | – | – | – | + | Z indicates the test result. |
| BNOT | – | – | – | – | – | + | Z indicates the test result. |
| BSCH | – | – | * | – | – | – | V indicates that the search operation is unsuccessfully terminated. |

Fig. 309:

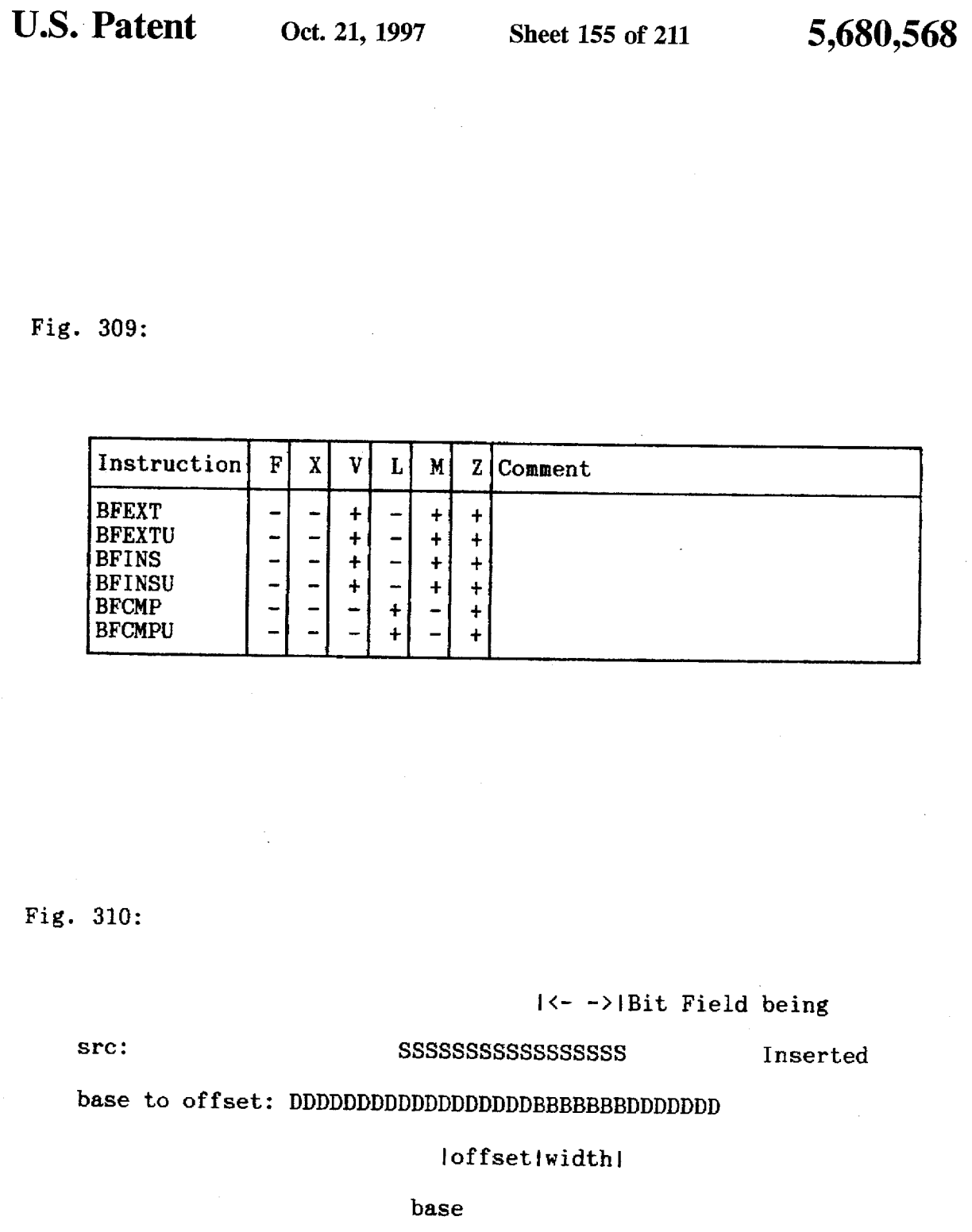

| Instruction | F | X | V | L | M | Z | Comment |
|---|---|---|---|---|---|---|---|
| BFEXT | – | – | + | – | + | + | |
| BFEXTU | – | – | + | – | + | + | |
| BFINS | – | – | + | – | + | + | |
| BFINSU | – | – | + | – | + | + | |
| BFCMP | – | – | – | + | – | + | |
| BFCMPU | – | – | – | + | – | + | |

Fig. 310:

```
                                  |<- ->|Bit Field being
src:                       SSSSSSSSSSSSSSSSS        Inserted
base to offset: DDDDDDDDDDDDDDDDDDBBBBBBBDDDDDDD
                              |offset|width|
                           base
```

Fig. 311:

| Instruction | F | X | V | L | M | Z | Comment |
|---|---|---|---|---|---|---|---|
| BVSCH | - | - | * | - | - | - | V indicates that the search operation is unsuccessfully terminated. |
| BVMAP | - | - | - | - | - | - | |
| BVCPY | - | - | - | - | - | - | |
| BVPAT | - | - | - | - | - | - | |

Fig. 312:

| Instruction | F | X | V | L | M | Z | Comment |
|---|---|---|---|---|---|---|---|
| ADDDX | - | + | + | 0 | + | + | |
| SUBDX | - | + | + | + | + | + | |
| PACKss | - | - | - | - | - | - | |
| UNPKss | - | - | - | - | - | - | |

Fig. 313:

| Instruction | F | X | V | L | M | Z | Comment |
|---|---|---|---|---|---|---|---|
| SMOV | * | - | * | - | * | - | |
| SCMP | * | * | * | + | * | + | X,Land Z are used to compare the last element. |
| SSCH | * | - | * | - | * | - | V indicates that the search operation is unsuccessfully terminated. |
| SSTR | - | - | - | - | - | - | |

Fig. 314:

| Instruction | F | X | V | L | M | Z | Comment |
|---|---|---|---|---|---|---|---|
| QINS | - | - | - | - | - | * | |
| QDEL | - | - | * | - | - | * | |
| QSCH | * | - | * | - | * | - | V indicates that the search operation is unsuccessfully terminated. |

Fig. 315:

| Instruction | F | X | V | L | M | Z | Comment |
|---|---|---|---|---|---|---|---|
| BRA | - | - | - | - | - | - | |
| Bcc | - | - | - | - | - | - | |
| BSR | - | - | - | - | - | - | |
| JMP | - | - | - | - | - | - | |
| JSR | - | - | - | - | - | - | |
| ACB | - | - | - | - | - | - | |
| SCB | - | - | - | - | - | - | |
| ENTER | - | - | - | - | - | - | |
| EXITD | - | - | - | - | - | - | |
| RTS | - | - | - | - | - | - | |
| NOP | - | - | - | - | - | - | |
| PIB | - | - | - | - | - | - | |

Fig. 316:

| Instruction | F | X | V | L | M | Z | Comment |
|---|---|---|---|---|---|---|---|
| BSETI | - | - | - | - | - | + | Z indicates the test result. |
| BCLRI | - | - | - | - | - | + | Z indicates the test result. |
| CSI | - | - | - | - | - | + | Z indicates that the update operation is successfully terminated. |

Fig. 317:

| Instruction | F | X | V | L | M | Z | Comment |
|---|---|---|---|---|---|---|---|
| LDC | - | - | - | - | - | - | |
| | * | * | * | * | * | * | If dest is PSW |
| STC | - | - | - | - | - | - | |
| LDPSB | * | * | * | * | * | * | Set by the instruction. |
| LDPSM | - | - | - | - | - | - | |
| STPSB | - | - | - | - | - | - | |
| STPSM | - | - | - | - | - | - | |
| LDP | - | - | - | - | - | - | |
| STP | - | - | - | - | - | - | |

Fig. 318:

| Instruction | F | X | V | L | M | Z | Comment |
|---|---|---|---|---|---|---|---|
| JRNG | – | – | – | – | – | – | |
| RRNG | * | * | * | * | * | * | Restored from the stack. |
| TRAPA | – | – | – | – | – | – | |
| TRAP | – | – | – | – | – | – | |
| REIT | * | * | * | * | * | * | Restored from the stack. |
| WAIT | – | – | – | – | – | – | |
| LDCTX | – | – | – | – | – | – | |
| STCTX | – | – | – | – | – | – | |

Fig. 319:

| Instruction | F | X | V | L | M | Z | Comment |
|---|---|---|---|---|---|---|---|
| ACS | – | – | – | * | * | * | |
| MOVPA | * | – | * | – | – | – | |
| LDATE | * | – | * | – | – | – | |
| STATE | * | – | * | – | – | – | |
| PTLB | – | – | – | – | – | – | |
| PSTLB | – | – | – | – | – | – | |
| PLCH | – | – | – | – | – | – | |
| PSLCH | – | – | – | – | – | – | |

Fig. 320:
<Entrance of Subroutine>
1. Save the current PC and set the new PC.
2. Save the current FP and set the new FP.
3. Keep the area for local variables.
4. Save the registers.
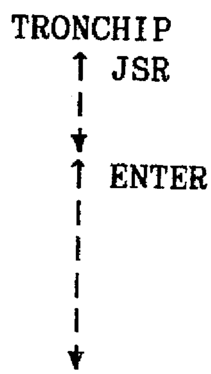
<Exit of Subroutine>
5. Restore the register.
6. Release the local variables and restore the FP.
7. Restore the PC and return.
8. Release the parameters in the stack.
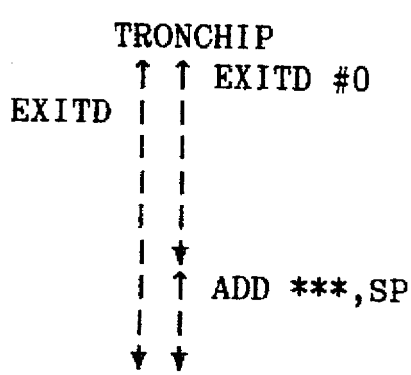

```
<Calling side>                 <Called side>

        |                      sub: ENTER #area,reglist
        |                             |
  PUSH    paraN                       | Parameters and local variables
        |                             | are accessed by @(disp,FP).
  PUSH    para2                       |
  PUSH    para1                       |
  JSR     sub                         |
  ADD     #N*4,SP                   EXITD reglist,#0
        |
        |
```

Fig. 323:

```
<Calling side>                <Called side>

       |                      sub: ENTER #area,reglist
       |                             |
  PUSH    paraN                      | Parameters and local variables
       |                             | are accessed by @(disp,FP).
  PUSH    para2                      |
  PUSH    para1                      |
  JSR     sub                        |
       |                           EXITD reglist,#N*4
       |
       |
```

Fig. 324:

Program Example (Static Scope)

```
┌ procedure proc0 {Lexical Level 0};
│   var var0;
│ ┌ procedure proc1A {Lexical Level 1};
│ │   var var1A;
│ │ ┌ procedure proc2A {Lexical Level 2};
│ │ │   var var2A;
│ │ │   begin
│ │ │     ...
│ │ └   end
│ │ ┌ procedure proc2B {Lexical Level 2};
│ │ │   var var2B;
│ │ │   begin
│ │ │     ...
│ │ └   end
│ │   begin {procedure proc1A}
│ │     ...
│ └   end
│ ┌ procedure proc1B {Lexical Level 1};
│ │   var var1B;
│ │ ┌ procedure proc2C {Lexical Level 2};
│ │ │   var var2C;
│ │ │   begin
│ │ │     ...
│ │ └   end
│ │ ┌ procedure proc2D {Lexical Level 2};
│ │ │   var var2D;
│ │ │   begin
│ │ │     ...
│ │ └   end
│ │   begin {procedure proc1B}
│ │     ...
│ └   end
│   begin {procedure proc0}
│     ...
└   end
```

Fig. 325:

| <<Subroutine Call Status>> | <<Display>> FP lev=X | R13 lev=0 | R12 lev=1 | R11 lev=2 | R10 lev=3 |
|---|---|---|---|---|---|
| proc0 | proc0 (var0) | proc0 | - | - | - |
| ↓ [lev. up, FP → R12] | | | | | |
| proc1A | proc1A (var1A) | proc0 (var0) | proc1A | | |
| ↓ [lev. up, FP → R11] | | | | | |
| proc2B | proc2B (var2B) | proc0 (var0) | proc1A (var1A) | proc2B | |
| ↓ [lev. same, FP → R11] | | | | | |
| proc2A | proc1A (var2A) | proc0 (var0) | proc1A (var1A) | proc2A | |
| ↓ [lev. down, FP → R13] | | | | | |
| proc0(recursion) | proc0* (var0*) | proc0* | - | - | |
| ↓ [lev. up, FP → R12] | | | | | |
| proc1B | proc1B (var1B) | proc0* (var0*) | proc1B | - | |
| ↓ [lev. up, FP → R11] | | | | | |
| proc2D | proc2D (var2D) | proc0* (var0*) | proc1B (var1B) | proc2D | |
| ↓ | | | | | |
| ... | | | | | |

Fig. 335:
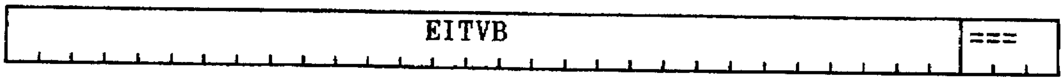
Fig. 336:
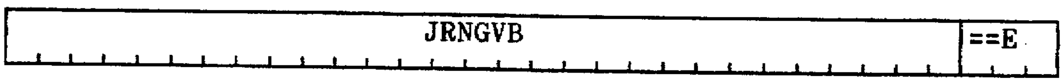
Fig. 337:
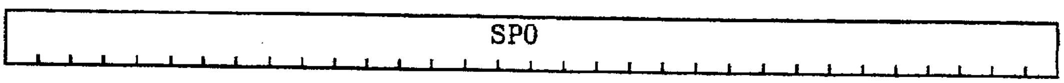
Stack Pointer for ring0
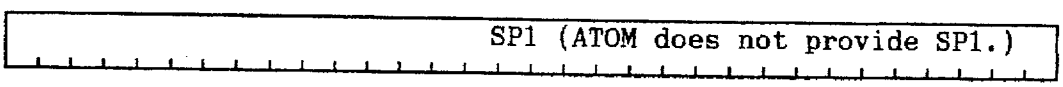
Stack Pointer for ring1
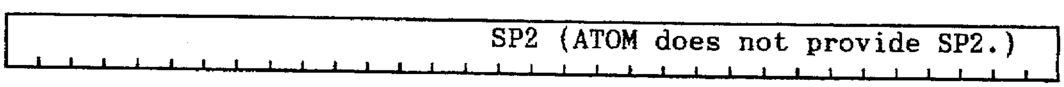
Stack Pointer for ring2
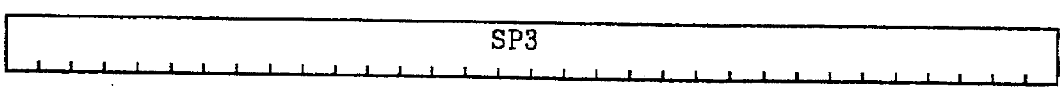
Stack Pointer for ring3
SP0 to SP3 are stack pointers used for rings 0 to 3.

Fig. 338:
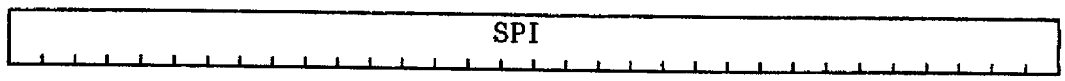
Stack Pointer for Interrupt
Fig. 339:
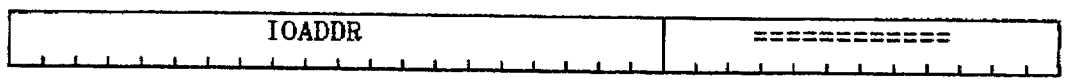
IO Address
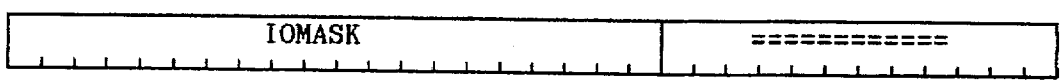
Fig. 340:
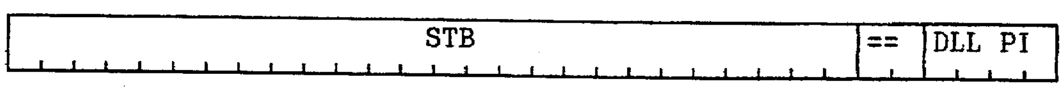
Fig. 341:
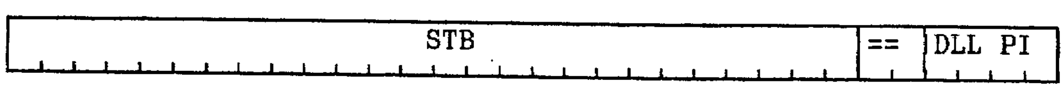
Fig. 342:
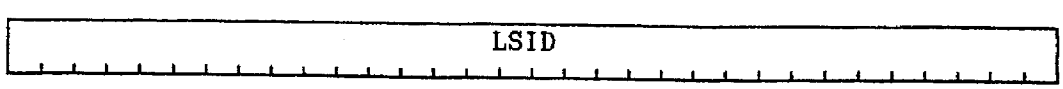

Fig. 343:

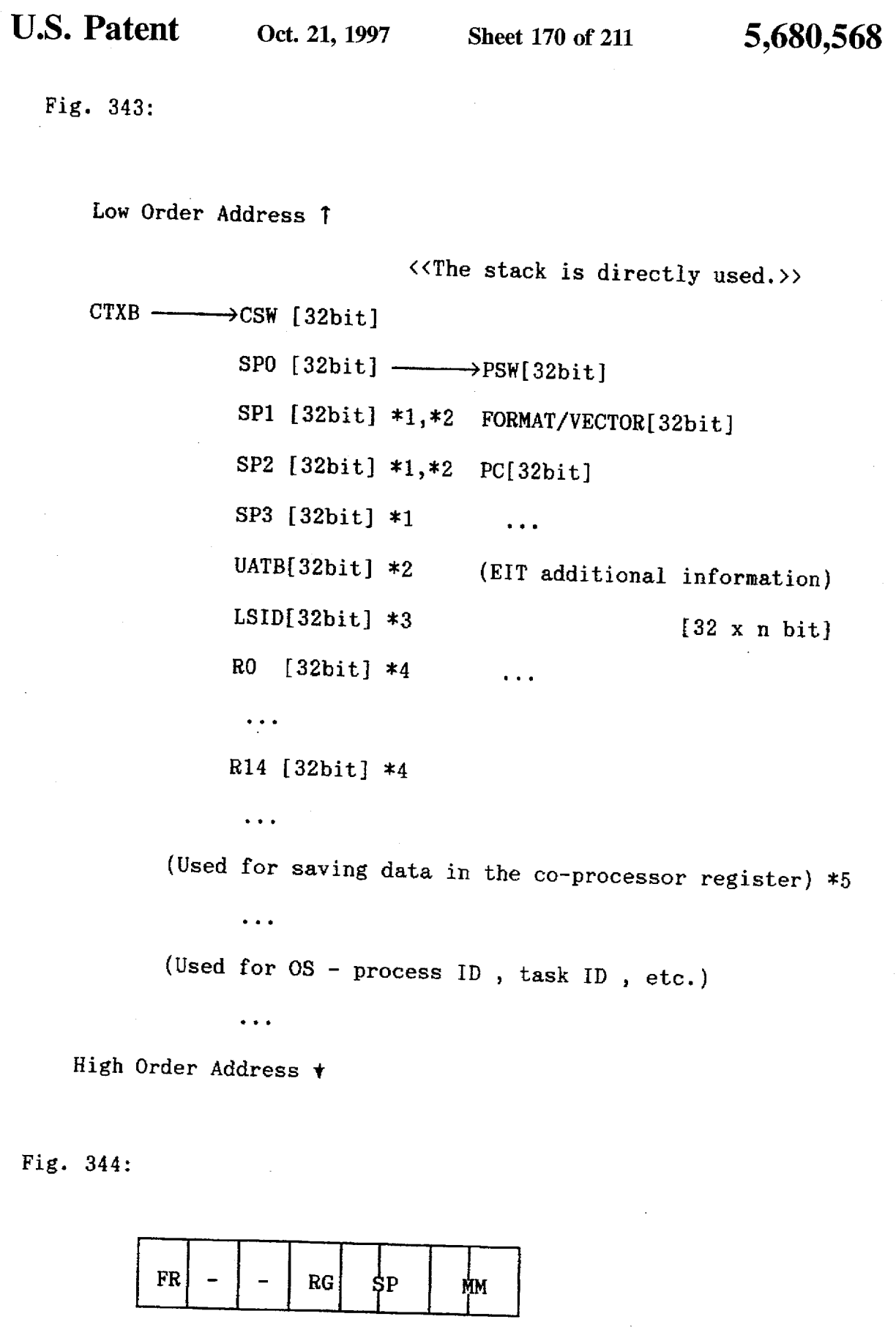

Low Order Address ↑

<<The stack is directly used.>>

CTXB → CSW [32bit]

SP0 [32bit] → PSW[32bit]

SP1 [32bit] *1,*2 FORMAT/VECTOR[32bit]

SP2 [32bit] *1,*2 PC[32bit]

SP3 [32bit] *1 ...

UATB[32bit] *2 (EIT additional information)

LSID[32bit] *3 [32 x n bit]

R0 [32bit] *4 ...

...

R14 [32bit] *4

...

(Used for saving data in the co-processor register) *5

...

(Used for OS - process ID , task ID , etc.)

...

High Order Address ↓

Fig. 344:

| | | | | | |
|---|---|---|---|---|---|
| FR | - | - | RG | SP | MM |

Fig. 347:

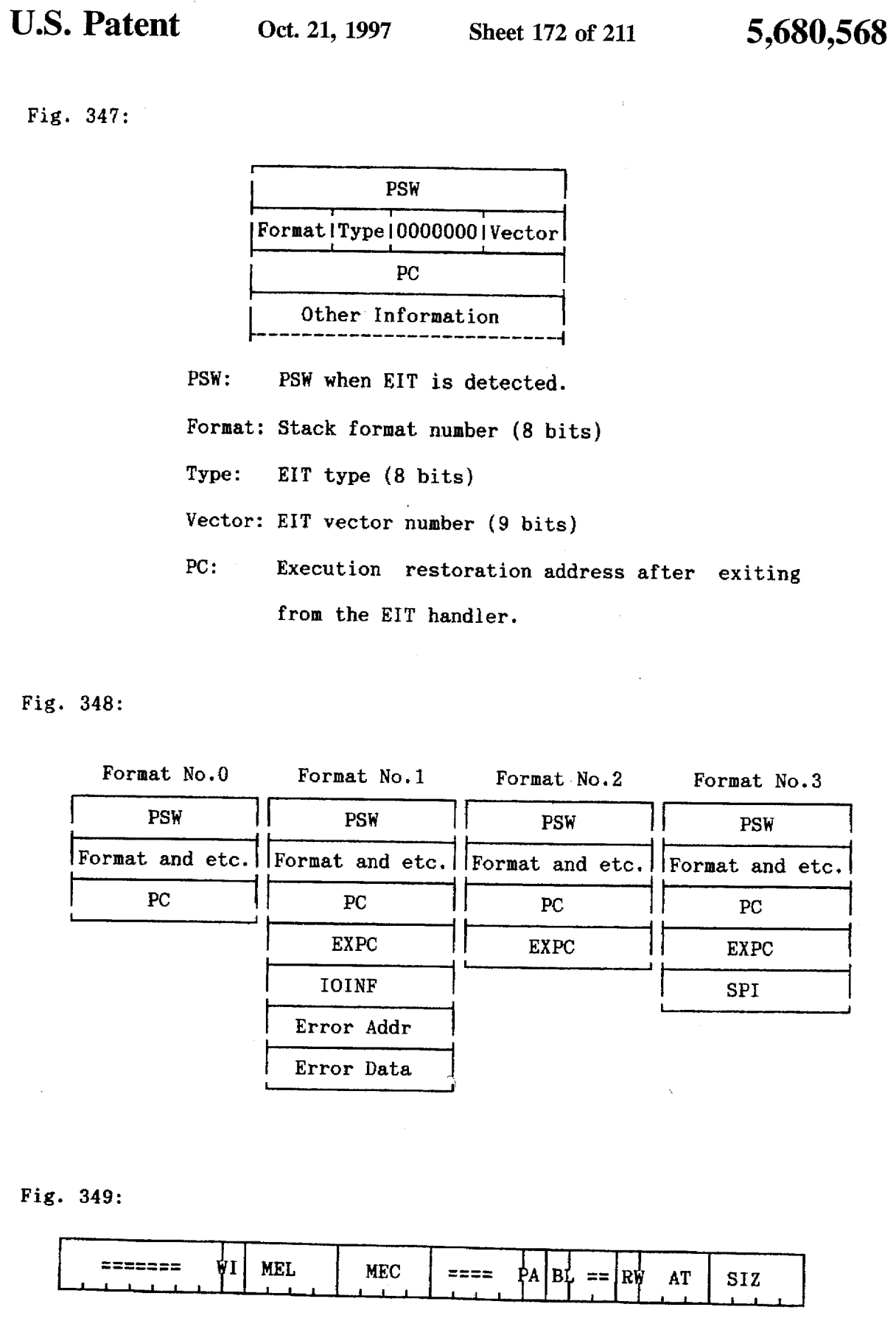

| | | | |
|---|---|---|---|
| PSW | | | |
| Format | Type | 0000000 | Vector |
| PC | | | |
| Other Information | | | |

PSW: PSW when EIT is detected.

Format: Stack format number (8 bits)

Type: EIT type (8 bits)

Vector: EIT vector number (9 bits)

PC: Execution restoration address after exiting from the EIT handler.

Fig. 348:

| Format No.0 | Format No.1 | Format No.2 | Format No.3 |
|---|---|---|---|
| PSW | PSW | PSW | PSW |
| Format and etc. | Format and etc. | Format and etc. | Format and etc. |
| PC | PC | PC | PC |
| | EXPC | EXPC | EXPC |
| | IOINF | | SPI |
| | Error Addr | | |
| | Error Data | | |

Fig. 349:

| | | | | | | | | | | |
|---|---|---|---|---|---|---|---|---|---|---|
| ======= | WI | MEL | MEC | ==== | PA | BL | == | RW | AT | SIZ |

Fig. 350 (a):

| No. | | Name | Content | Class | Type | Stack |
|---|---|---|---|---|---|---|
| 00 | FFFFF000 | RI | Reset interrupt(*) | Suspend | 0 | None |
| 01 | FFFFF008 | DEI | DBG external interrupt | Completion | 3 | 3 |
| 02 | FFFFF010 | DTRA | DBG trap instruction | Completion | 1 | 3 |
| 03 | FFFFF018 | DDBE | DBG debug exception | Completion | 2 | 3 |
| 04 | FFFFF020 | DAVE | DBG access violation | Reexecution | 4 | 3 |
| 05 | FFFFF028 | Reserved | | | | |

| No. | Addr | Name | Content | Class | Type | Stack |
|---|---|---|---|---|---|---|
| 06 | +030 | Reserved | | | | |
| "\|" | | "\|" | | | | |
| 0F | +078 | Reserved | | | | |
| 10 | +080 | DBE | Debug exception | Completion | 2 | 2 |
| 11 | +088 | BAE | Bus access exception (store buffer) | Completion | 1 | 1 |
| | | | Bus access exception (except store buffer) | Reexecution | 4 | 1 |
| 12 | +090 | ATRE | Address translation exception(store buffer) | Completion | 1 | 1 |
| | | | Address translation exception (except store buffer) | Reexecution | 4 | 1 |
| 13 | +098 | Reserved | Page out exception | | | |
| 14 | +0A0 | PIE | Reserved instruction exception | Reexecution | 4 | 0 |
| 15 | +0A8 | PIVE | Privileged instruction | Reexecution | 4 | 0 |

Fig. 350 (b):

| | | | | | | |
|---|---|---|---|---|---|---|
| | | | violation exception | | | |
| 16 | +0B0 | REE | Reserved function exception | Reexecution | 4 | 0 |
| 17 | +0B8 | RSFE | Reserved stack format exception | Reexecution | 4 | 0 |
| 18 | +0C0 | Reserved | Ring transition violation exception | | | |
| 19 | +0C8 | OAJE | Odd address jump exception | Completion | 1 | 2 |
| 1A | +0D0 | ZDE | Zero divide exception | Completion | 1 | 2 |
| 1B | +0D8 | IOE | Illegal operand exception | Reexecution | 4 | 0 |
| 1C | +0E0 | Reserved | Decimal illegal operand exception | | | |
| 1D | +0E8 | L1E | <<L1>> function exception | Reexecution | 4 | 0 |
| 1E | +0F0 | Reserved | | | | |
| 1F | +0F8 | TRAP | Conditional trap instruction | Completion | 1 | 2 |
| 20 | +100 | TRAP | Trap instruction | Completion | 1 | 2 |
| 21 | +108 | TRAP | Trap instruction | Completion | 1 | 2 |
| "\|" | | "\|" | | | | |
| 2F | +178 | TRAP | Trap instruction | Completion | 1 | 2 |
| 30 | +180 | CIE | Co-processor instruction exception | Reexecution | 4 | 0 |
| 31 | +188 | CIE | Co-processor instruction exception | Reexecution | 4 | 0 |
| "\|" | | "\|" | | | | |
| 37 | +1B8 | CIE | Co-processor instruction exception | Reexecution | 4 | 0 |
| 38 | +1C0 | Reserved | Co-processor execution exception | | | |
| 39 | +1C8 | Reserved | Co-processor command | | | |

Fig. 350 (c):

| | | | | | | |
|---|---|---|---|---|---|---|
| | | | exception | | | |
| 3A | +1D0 | Reserved | | | | |
| "¦" | | "¦" | | | | |
| 3F | +1F8 | Reserved | | | | |
| 40 | +200 | FVEI | Fixed vector external interrupt | Completion | 3 | 0 |
| 41 | +208 | FVEI | Fixed vector external interrupt | Completion | 3 | 0 |
| "¦" | | "¦" | | | | |
| 46 | +230 | FVEI | Fixed vector external interrupt | Completion | 3 | 0 |
| 47 | +238 | Reserved | Fixed vector external interrupt | | | |
| "¦" | +240 | "¦" | Fixed vector external interrupt | | | |
| 4E | +277 | Reserved | Fixed vector external interrupt | | | |
| 4F | +278 | Reserved | | | | |
| 50 | +280 | DI | Delayed interrupt exception | Completion | 3 | 0 |
| 51 | +288 | DI | Delayed interrupt exception | Completion | 3 | 0 |
| "¦" | | "¦" | | | | |
| 5E | +2F0 | DI | Delayed interrupt exception | Completion | 3 | 0 |
| 5F | +2F8 | Reserved | Delayed context exception | | | |
| 60 | +300 | Reserved | | | | |
| "¦" | | "¦" | | | | |
| 7F | +3F8 | Reserved | | | | |
| 80 | +400 | EI | External interrupt | Completion | 3 | 0 |

Fig. 350 (d):

| | | | | | | |
|---|---|---|---|---|---|---|
| "\|" | | "\|" | | | | |
| FF | +7F8 | EI | External interrupt | Completion | 3 | 0 |
| 100 | +800 | Reserved | | | | |
| "\|" | | "\|" | | | | |
| IFF | +FF8 | Reserved | | | | |

Fig. 351:

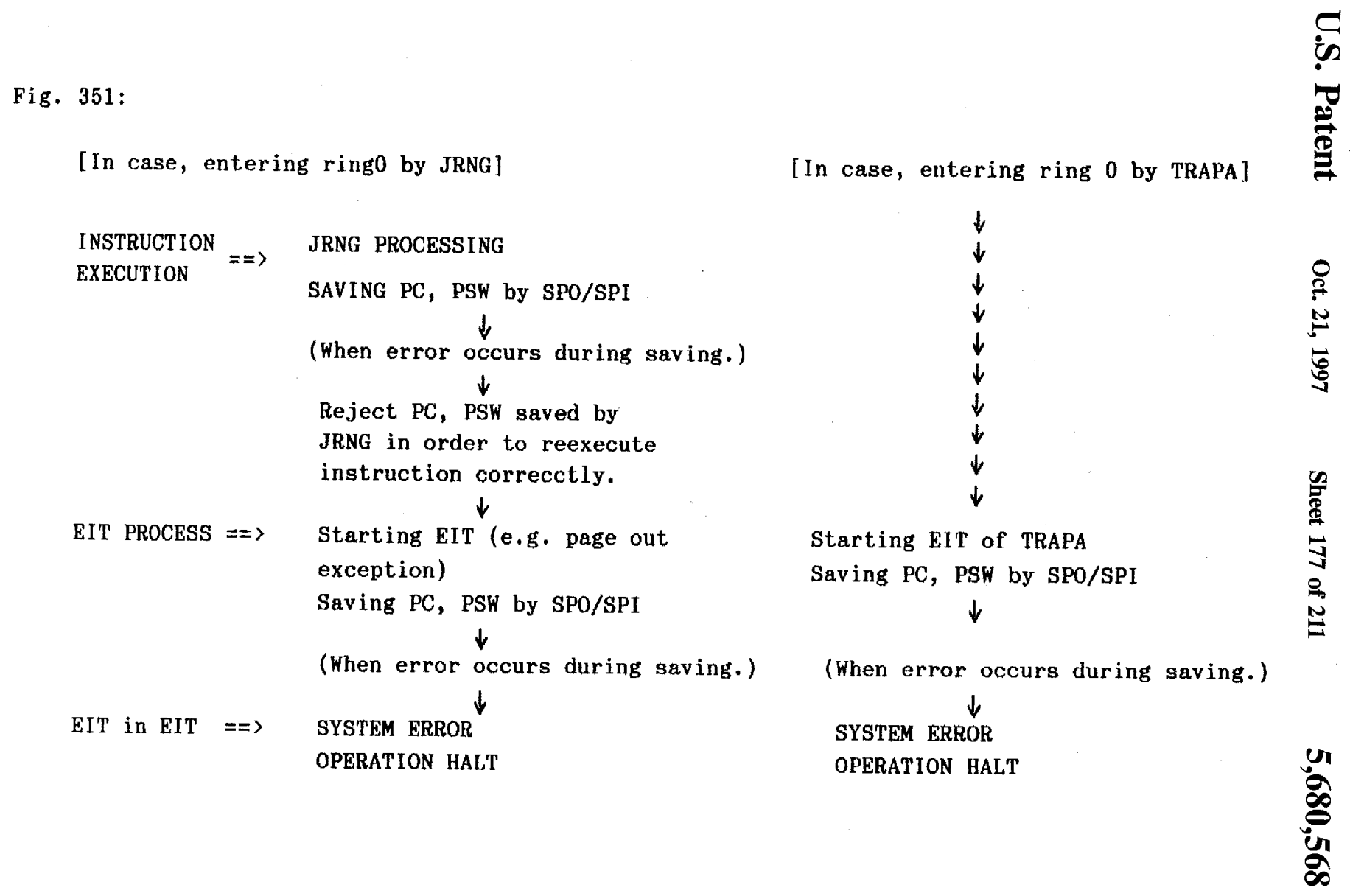

[In case, entering ring0 by JRNG]

INSTRUCTION EXECUTION ==> JRNG PROCESSING

SAVING PC, PSW by SPO/SPI

↓

(When error occurs during saving.)

↓

Reject PC, PSW saved by JRNG in order to reexecute instruction correcctly.

↓

EIT PROCESS ==> Starting EIT (e.g. page out exception)

Saving PC, PSW by SPO/SPI

↓

(When error occurs during saving.)

↓

EIT in EIT ==> SYSTEM ERROR

OPERATION HALT

[In case, entering ring 0 by TRAPA]

↓

Starting EIT of TRAPA

Saving PC, PSW by SPO/SPI

↓

(When error occurs during saving.)

↓

SYSTEM ERROR

OPERATION HALT

Fig. 353:

| TYPE IN EITINF POPPED BY REIT INSTRUCTION | EIT TYPE ACCEPTED JUST AFTER REIT INSTRUCTION |
|---|---|
| 1 | 1 to 4 |
| 2 | 3 to 4 (Not 2 to 4) |
| 3 | 3 to 4 |
| 4 | 4 |

Fig. 354:

| IMASK | DI TO BE STARTED | EXTERNAL INTERRUPT ALLOWABLE |
|---|---|---|
| 0 | — | INT 0 (NMI) |
| 1 | DI 0 | INT 0 (NMI) |
| 2 | DI 0 to 1 | INT 0 to 1 |
| 3 | DI 0 to 2 | INT 0 to 2 |
| 4 | DI 0 to 3 | INT 0 to 3 |
| 5 | DI 0 to 4 | INT 0 to 4 |
| ... | ... | ... |
| 13 | DI 0 to 12 | INT 0 to 12 |
| 14 | DI 0 to 13 | INT 0 to 13 |
| 15 | DI 0 to 14 | INT 0 to 14 |

Fig. 357:

| VALUE OF DCE | MEANING |
|---|---|
| 000 | UNCONDITIONAL DCE REQUEST.<br>IF SM=1, STARTING DCE UNCONDITIONALLY. |
| 001 | (RESERVED) |
| 010 | (RESERVED) |
| 011 | (RESERVED) |
| 100 | DCE REQUEST STARTED WHEN RING 1 to RING 3. |
| 101 | DCE REQUEST STARTED WHEN RING 2 to RING 3. |
| 110 | DCE REQUEST STARTED WHEN RING 3. |
| 111 | NOT REQUESTED. |

Fig. 358:

| DCE | DI | EXTERNAL INTERRUPT (EI) |
|---|---|---|
| BECOME PENDING BY SMRNG VALUE | BECOME PENDING BY IMASK VALUE | BECOME PENDING BY IMASK VALUE |
| CONTEXT SUBORDINATE | CONTEXT STAND-ALONE | CONTEXT STAND-ALONE |
| RELATION BETWEEN INTERNAL EVENT AND CONTEXT (SOFTWARE) | RELATION BETWEEN INTERNAL EVENT AND PROCESSOR (SOFTWARE) | RELATION BETWEEN EXTERNAL EVENT AND PROCESSOR (HARDWARE) |

| | |
|---|---|
| CMP:L | 00RgRwRR 00.ShR.. |
| MOV:L | 00RgWwRR 01.ShR.. |
| MOV:S | 00RgRwWW 10.ShW.. |

***** When CMP and MOV occurs simultaneously, 0 is allocated to CMP, 1 to MOV.

| | | |
|---|---|---|
| AND:R | 00RgMw00 1100RgRw | |
| OR:R | 00RgMw01 1100RgRw | |
| XOR:R | 00RgMw10 1100RgRw | |
| MOVA:R | 00RgWP11 1100RgRP | ......#d16...... |
| MUL:R | 00RgMw00 1101RgRw | |
| DIV:R | 00RgMw01 1101RgRw | |

Other Instructions

| | |
|---|---|
| (5) | 00????1? 1101???? |
| (6) | 00?????? 111????? |

[01??????]

| | |
|---|---|
| CMP:Q | 010#3nRR 00.ShR!I |
| MOV:Q | 011#3nWW 00.ShW.. |
| ADD:Q | 010#3nMM 01.ShM.. |
| SUB:Q | 011#3nMM 01.ShM.. |
| SHL:Q | 010#3nMM 10.ShM.. |

Fig. 360 (b):

| | |
|---|---|
| SHL:C | 011#3cMM 10.ShM.. |
| SHA:C | 011#3cMM 11.ShM.. |
| CMP:I | 010000RR 11.ShR!I ......#iR....... |
| ADD:I | 010001MM 11.ShM.. ......#iM....... |
| MOV:I | 010010WW 11.ShW.. ......#iW....... |
| SUB:I | 010011MM 11.ShM.. ......#iM....... |
| AND:I | 010100MM 11.ShM.. ......#iM....... |
| OR:I | 010101MM 11.ShM.. ......#iM....... |
| XOR:I | 010110MM 11.ShM.. ......#iM....... |
| {RIE} | 010111MM 11.ShM.. ......#iM....... |

***** Distinction between CMP and MOV, ADD and SUB is carried out by 2^3 bit; among AND, OR, XOR, by 2^2 to 2^3 bit; which is common with :I format and :G format.

[10??????]

| | |
|---|---|
| Bcc:D | 10cccc00 ..#d8... |
| ADD:L | 10RgMw01 00.ShRw. |
| SUB:L | 10RgMw01 01.ShRw. |
| BSET:Q | 100#3z01 10.ShMfq |
| BCLR:Q | 101#3z01 10.ShMfq |
| BSETI:Q | 100#3z01 11ShMfqi |
| BTST:Q | 101#3z01 11.ShRfq |

Fig. 360 (c):

***** Further bit allocation.

| | |
|---|---|
| 10???01? | Having Ea |
| 10xx011? | Having Ea (LDCTX) |
| 10??111? | Having imm8 or disp8 |
| 10001?1X | ENTER:E,STM (Having register list)- Enter:G in common |
| 10011?1X | EXIT:E,LDM (Having register list)- EXIT:G in common |

Patterns of JRNG:E and JRNG:G, BSR:8, and JSR are commonized as much as possible.

| | | |
|---|---|---|
| JMP | 10000010 | ..EaA... |
| ACS | 10000011 | ..EaA... |
| POP | 1001001W | ..EaWL.. |
| PUSHA | 1010001S | ..EaA... |
| PUSH | 1011001R | ..EaRL.. |
| LDCTX | 10xx0110 | ..EaA!A. |
| {RIE} | 10**0111 | ..EaA!A. |
| STM | 1000101W | ..EaWmL. ......LsWL...... |
| LDM | 1001101R | ..EaRmL. ......L1Rl...... |
| JSR | 1010101P | ..EaA... |
| JRNG:G | 1011101P | ..EaRh!M |

Fig. 360 (d):

| | | |
|---|---|---|
| ENTER:E | 1000111X | ..#ib... ......LnXL...... |
| EXITD:E | 1001111X | ..#ib... ......LxXL...... |
| BRA:D | 10101110 | ..#d8... |
| BSR:D | 10101111 | ..#d8... |
| JRNG:E | 10111110 | ..#ib... |
| (1)General# | 10111111 | ..#ib... ???????? ..Ea?... |

[11??????]

| | | |
|---|---|---|
| CMP:Z | 110000SS | ..EaR!I. |
| MOV:Z | 110001WW | ..EaW... |
| NEG | 110010MM | ..EaM... |
| NOT | 110011MM | ..EaM... |
| (2)General A | 110100RR | ..EaR... ???????? ..Ea?... |
| (3)General B | 110101RR | ..EaR... ???????? ..Ea?... |

(4)General instruction particular

| | | |
|---|---|---|
| | 11011000 | ..EaA... ????????..Ea?... |
| {RIE} | 11011001 | ******** |
| {RIE} | 1101101* | ******** |
| LDPSB | 11011100 | ..EaRh.. |
| LDPSM | 11011101 | ..EaRh.. |
| STPSB | 11011110 | ..EaWh.. |
| STPSM | 11011111 | ..EaWh.. |

Fig. 360 (e):

| | |
|---|---|
| coproc1 | 1110**?? ..Ea?... ******** ******** |
| coproc2 | 1111**** ******** |

[(1)(2)General Instruction#/General Instruction A]

(2) General Instruction A

110100RR ..EaR... ???????? ..Ea?...

(1) General Instruction #

10111111 ..#ib... ???????? ..Ea?...

| | |
|---|---|
| ADD:G | 110100RR ..EaR... 000000MM ..EaM... |
| ADD:E | 10111111 ..#ib... 000000MM ..EaM... |
| ADDU:G | 110100RR ..EaR... 000001MM ..EaM... |
| ADDU:E | 10111111 ..#ib... 000001MM ..EaM... |
| SUB:G | 110100RR ..EaR... 000010MM ..EaM... |
| SUB:E | 10111111 ..#ib... 000010MM ..EaM... |
| SUBU:G | 110100RR ..EaR... 000011MM ..EaM... |
| SUBU:E | 10111111 ..#ib... 000011MM ..EaM... |

***** Distinction between signed and unsigned instruction is carried out by 2^2 bit, which is common among ADD, SUB, MUL, DIV, REM, CMP, MOV, BFCMP, BFINS.

| | |
|---|---|
| ADDX:G | 110100RR ..EaR... 000100MM ..EaM... |
| ADDX:E | 10111111 ..#ib... 000100MM ..EaM... |
| ADDX:G | 110100RR ..EaR... 000101MM ..EaM... |
| ADDX:E | 10111111 ..#ib... 000101MM ..EaM... |

Fig. 360 (f):

| | |
|---|---|
| SUBX:G | 110100RR ..EaR... 000110MM ..EaM... |
| SUBX:E | 10111111 ..#ib... 000110MM ..EaM... |
| SUBDX:G | 110100RR ..EaR... 000111MM ..EaM... |
| SUBDX:E | 10111111 ..#ib... 000111MM ..EaM... |
| AND:G | 110100RR ..EaR... 001000MM ..EaM... |
| AND:E | 10111111 ..#ib... 001000MM ..EaM... |
| OR:G | 110100RR ..EaR... 001001MM ..EaM... |
| OR:E | 10111111 ..#ib... 001001MM ..EaM... |
| XOR:G | 110100RR ..EaR... 001010MM ..EaM... |
| XOR:E | 10111111 ..#ib... 001010MM ..EaM... |
| DCX:G | 110100RR ..EaR... 001011MM ..EaM... |
| DCX:E | 10111111 ..#ib... 001011MM ..EaM... |
| SHL:G | 110100RR ..EaR... 001100MM ..EaM... |
| SHL:E | 10111111 ..#ib... 001100MM ..EaM... |
| SHA:G | 110100RR ..EaR... 001101MM ..EaM... |
| SHA:E | 10111111 ..#ib... 001101MM ..EaM... |
| ROT:G | 110100RR ..EaR... 001110MM ..EaM... |
| ROT:E | 10111111 ..#ib... 001110MM ..EaM... |
| {RIE-X} | 110100RR ..EaR... 001111MM ..EaM... |
| {RIE-X} | 10111111 ..#ib... 001111MM ..EaM... |
| MUL:G | 110100RR ..EaR... 010000MM ..EaM... |
| MUL:E | 10111111 ..#ib... 010000MM ..EaM... |

Fig. 360 (g):

| | |
|---|---|
| MULU:G | 110100RR ..EaR... 010001MM ..EaM... |
| MULU:E | 10111111 ..#ib... 010001MM ..EaM... |
| DIV:G | 110100RR ..EaR... 010010MM ..EaM... |
| DIV:E | 10111111 ..#ib... 010010MM ..EaM... |
| DIVU:G | 110100RR ..EaR... 010011MM ..EaM... |
| DIVU:E | 10111111 ..#ib... 010011MM ..EaM... |
| {RIE-X} | 110100RR ..EaR... 01010*MM ..EaM... |
| {RIE-X} | 10111111 ..#ib... 01010*MM ..EaM... |
| REM:G | 110100RR ..EaR... 010110MM ..EaM... |
| REM:E | 10111111 ..#ib... 010110MM ..EaM... |
| REMU:G | 110100RR ..EaR... 010111MM ..EaM... |
| REMU:E | 10111111 ..#ib... 010111MM ..EaM... |

***** Patterns of REM, REMU; DIV, DIVU are commonized as much as possible.

| | |
|---|---|
| DCADD:G | 110100RR ..EaR... 011000MM ..EaM... |
| DCADD:E | 10111111 ..#ib... 011000MM ..EaM... |
| DCADDU:G | 110100RR ..EaR... 011001MM ..EaM... |
| DCADDU:E | 10111111 ..#ib... 011001MM ..EaM... |
| DCSUB:G | 110100RR ..EaR... 011010MM ..EaM... |
| DCSUB:E | 10111111 ..#ib... 011010MM ..EaM... |
| DCSUBU:G | 110100RR ..EaR... 011011MM ..EaM... |
| DCSUBU:E | 10111111 ..#ib... 011011MM ..EaM... |

Fig. 360 (h):

| | |
|---|---|
| {RIE-X} | 110100RR ..EaR... 0111**MM ..EaM... |
| {RIE-X} | 10111111 ..#ib... 0111**MM ..EaM... |
| CMP:G | 110100RR ..EaR... 100000SS ..EaR!I. |
| CMP:E | 10111111 ..#ib... 100000SS ..EaR!I. |
| CMPU:G | 110100RR ..EaR... 100001SS ..EaR!I. |
| CMPU:E | 10111111 ..#ib... 100001SS ..EaR!I. |
| MOV:G | 110100RR ..EaR... 100010WW ..EaW... |
| MOV:E | 10111111 ..#ib... 100010WW ..EaW... |
| MOVU:G | 110100RR ..EaR... 100011WW ..EaW... |
| MOVU:E | 10111111 ..#ib... 100011WW ..EaW... |

***** Patterns of CMP, CMPU, BFCMP, BFCMPU, DCCMP, DCCMPU; MOV, MOVU, LDP, LDC, BFINS, BFINSU are unified as much as possible.

| | |
|---|---|
| DCCMP:G | 110100RR ..EaR... 100100SS ..EaR!I. |
| DCCMP:E | 10111111 ..#ib... 100100SS ..EaR!I. |
| DCCMPU:G | 110100RR ..EaR... 100101SS ..EaR!I. |
| DCCMPU:E | 10111111 ..#ib... 100101SS ..EaR!I. |
| LDC:G | 110100RR ..EaR... 100110WW ..EaW%.. |
| LDC:E | 10111111 ..#ib... 100110WW ..EaW%.. |
| LDP:G | 110100RR ..EaR... 100111WW ..EaW%.. |
| LDP:E | 10111111 ..#ib... 100111WW ..EaW%.. |

***** Distinction of the particular space (LDP and LDC) is carried out by 2^2 bit, which is same with the case STP and STC.

Fig. 360 (i):

| | | | | | | |
|---|---|---|---|---|---|---|
| BSETI:G | 110100RR | ..EaR... | 101000BB | ..EaMfi. | | |
| BSETI:E | 10111111 | ..#ib... | 101000BB | ..EaMfi. | | |
| BCLRI:G | 110100RR | ..EaR... | 101001BB | ..EaMfi. | | |
| BCLRI:E | 10111111 | ..#ib... | 101001BB | ..EaMfi. | | |
| {RIE-X} | 110100RR | ..EaR... | 101010?? | ..Ea?... | | |
| {RIE-X} | 10111111 | ..#ib... | 101010?? | ..Ea?... | | |
| DCCMPX:G | 110100RR | ..EaR... | 101011SS | ..EaR!I. | | |
| DCCMPX:E | 10111111 | ..#ib... | 101011SS | ..EaR!I. | | |
| BSET:G | 110100RR | ..EaR... | 101100BB | ..EaMf.. | | |
| BSET:E | 10111111 | ..#ib... | 101100BB | ..EaMf.. | | |
| BCLR:G | 110100RR | ..EaR... | 101101BB | ..EaMf.. | | |
| BCLR:E | 10111111 | ..#ib... | 101101BB | ..EaMf.. | | |
| BNOT:G | 110100RR | ..EaR... | 101110BB | ..EaMf.. | | |
| BNOT:E | 10111111 | ..#ib... | 101110BB | ..EaMf.. | | |
| BTST:G | 110100RR | ..EaR... | 101111BB | ..EaRf.. | | |
| BTST:E | 10111111 | ..#ib... | 101111BB | ..EaRf.. | | |
| BFCMP:G:R | 110100RR | ..EaR... | 110000+X | ..EaRbf. | **RRXw** | ****RRXs |
| BFCMP:E:R | 10111111 | ..#ib... | 110000+X | ..EaRbf. | .6#n..** | ****RRXs |
| BFCMPU:G:R | 110100RR | ..EaR... | 110001+X | ..EaRbf. | **RRXw** | ****RRXs |
| BFCMPU:E:R | 10111111 | ..#ib... | 110001+X | ..EaRbf. | .#6n..** | ****RRXs |
| BFINS:G:R | 110100RR | ..EaR... | 110010+X | ..EaMbf. | **RRXw** | ****RRXs |
| BFINS:E:R | 10111111 | ..#ib... | 110010+X | ..EaMbf. | .#6n..** | ****RRXs |
| BFINSU:G:R | 110100RR | ..EaR... | 110011+X | ..EaMbf. | **RRXw** | ****RRXs |

Fig. 360 (j):

| | | | | | | |
|---|---|---|---|---|---|---|
| BFINSU:E:R | 10111111 | ..#ib... | 110011+X | ..EaMbf. | .#6n..** | ****RRXs |
| BFCMP:G:I | 110100RR | ..EaR... | 110100+X | ..EaRbf. | **RRXwSS | ..#iS8.. |
| BFCMP:E:I | 10111111 | ..#ib... | 110100+X | ..EaRbf. | .#6n..SS | ..#iS8.. |
| BFCMPU:G:I | 110100RR | ..EaR... | 110101+X | ..EaRbf. | **RRXwSS | ..#iS8.. |
| BFCMPU:E:I | 10111111 | ..#ib... | 110101+X | ..EaRbf. | .#6n..SS | ..#iS8.. |
| BFINS:G:I | 110100RR | ..EaR... | 110110+X | ..EaMbf. | **RRXwSS | ..#iS8.. |
| BFINS:E:I | 10111111 | ..#ib... | 110110+X | ..EaMbf. | .#6n..SS | ..#iS8.. |
| BFINSU:G:I | 110100RR | ..EaR... | 110111+X | ..EaMbf. | **RRXwSS | ..#iS8.. |
| BFINSU:E:I | 10111111 | ..#ib... | 110111+X | ..EaMbf. | .#6n..SS | ..#iS8.. |
| {RIE-X} | 110100RR | ..EaR... | 11100*+X | ..Ea?bf. | ******** | ******** |
| {RIE-X} | 10111111 | ..#ib... | 11100*+X | ..Ea?bf. | ******** | ******** |
| BFEXT:G | 110100RR | ..EaR... | 111010+X | ..EaRbf. | **RRXw** | ****RWXd |
| BFEXT:E | 10111111 | ..#ib... | 111010+X | ..EaRbf. | .#6n..** | ****RWXd |
| BFEXTU:G | 110100RR | ..EaR... | 111011+X | ..EaRbf. | **RRXw** | ****RWXd |
| BFEXTU:E | 10111111 | ..#ib... | 111011+X | ..EaRbf. | .#6n..** | ****RWXd |
| ACB:G | 110100RR | ..EaR... | 11110PXX | ..EaRX.. | **RgMXSS | ..#dS8.. |
| ACB:E | 10111111 | ..#ib... | 11110PXX | ..EaRX.. | **RgMXSS | ..#dS8.. |
| SCB:G | 110100RR | ..EaR... | 111111XX | ..EaRX.. | **RgMXSS | ..#dS8.. |
| SCB:E | 10111111 | ..#ib... | 11111PXX | ..EaRX.. | **RgMXSS | ..#dS8.. |

[(3)General Instruction B]

Fig. 360 (k):

(3) General Instruction B

110101RR ..EaR... ???????? ..Ea?...

***** Allocation pattern of the second HW.

| | |
|---|---|
| 00<Rn>?? | First HW 'RR', size not specified, register specified. |
| 01????SS | First HW 'RR', size specified, register not specified. |
| 10????0? | First HW '1R', size not specified, register not specified. |
| 10<Rn>1? | First HW '1R', size not specified, register specified. |
| 11<Rn>SS | First HW '1R', size specified, register specified (INDEX). |

| | | | | | |
|---|---|---|---|---|---|
| CSI | 110101RR | ..EaR... | 00RMC.00 | ..EaMiR. | |
| {RIE-X} | 110101RR | ..EaR... | 00****01 | ..Ea?... | |
| CHK | 110101RR | ..EaR... | 00RgWR1c | ..EaRdR. | |
| RVBY | 110101RR | ..EaR... | 010000WW | ..EaW... | |
| RVBI | 110101RR | ..EaR... | 010001WW | ..EaW... | |
| PACKss | 110101RR | ..EaR... | 010010WW | ..EaW... | |
| UNPKss | 110101RR | ..EaR... | 010011WW | ..EaW... | ......#iW....... |
| BSCH | 110101RR | ..EaR... | 0101bdMM | ..EaW... | |
| DCADJ | 110101RR | ..EaR... | 011000WW | ..EaW... | |
| DCADJU | 110101RR | ..EaR... | 011001WW | ..EaW... | |
| {RIE-X} | 110101RR | ..EaR... | 011010WW | ..EaW... | |
| DCADJX | 110101RR | ..EaR... | 011011WW | ..EaW... | |
| {RIE-X} | 110101RR | ..EaR... | 0111**?? | ..Ea?... | |

***** Bit pattern of DC???X instruction is unifed as ??1011SS.

Fig. 360 (L):

| | | | | |
|---|---|---|---|---|
| LDATE | 110101!R | ..EaR... | 10pttt00 | ..EaA... |
| {RIE-X} | 110101!R | ..EaR... | 10****01 | ..Ea?... |
| MULX | 110101!R | ..EaR... | 10RgWR10 | ..EaMR.. |
| DIVX | 110101!R | ..EaR... | 10RgMR11 | ..EaMR.. |
| INDEX | 110101!R | ..EaR... | 11RgMRSS | ..EaR2.. |

[(4) General Instruction Particular]

(4) General Instruction Particular

| | | | | |
|---|---|---|---|---|
| | 11011000 | ..EaA... | ???????? | ..Ea?... |
| {RIE-X} | 11011000 | ..EaA... | 0*****?? | ..Ea?... |
| STATE | 11011000 | ..EaA... | 100ttt+W | ..EaW!S.. |
| {RIE-X} | 11011000 | ..EaA... | 101000?? | ..Ea?... |
| MOVPA | 11011000 | ..EaA... | 101001+W | ..EaW!S. |
| STC | 11011000 | ..EaR%.. | 101010WW | ..EaW... |
| STP | 11011000 | ..EaR%.. | 101011WW | ..EaW... |
| QDEL | 11011000 | ..EaRqP. | 101100+W | ..EaW!S. |
| MOVA:G | 11011000 | ..EaA... | 101101+W | ..EaW... |
| QINS | 11011000 | ..EaMqP. | 101110+- | ..EaMqP2 |
| {RIE-X} | 11011000 | ..Ea?... | 101111?? | ..Ea?... |
| {RIE-X} | 11011000 | ..EaA... | 11****?? | ..Ea?... |

Fig. 360 (m):

[(5)Other Instructions]

(5) Other Instructions

| | |
|---|---|
| | 00????1? 1101???? |
| {RIE} | 00****10 1101**** |
| ACB:R | 00RgMw11 1101P000 —RgRwSS ..#dS8.. |
| ACB:Q | 00RgMw11 1101P001 .#6n..SS ..#dS8.. |
| SCB:R | 00RgMw11 1101P010 —RgRwSS ..#dS8.. |
| SCB:Q | 00RgMw11 1101P011 .#6z..SS ..#dS8.. |
| TRAP | 00cccc11 1101P100 |
| TRAPA | 00#4z.11 1101P101 |

***** Further Allocation.

| | |
|---|---|
| 00??0011 1101P110 | LVreserved |
| 00??1011 1101P110 | General Instruction |
| 00??0111 1101P110 | Privileged Instruction (STCTX) |
| 00??1111 1101P110 | Privileged Instruction |

| | |
|---|---|
| LVreserved | 00**0011 1101*110 |
| STCTX | 00xx0111 1101P110 |
| PIB | 00001011 1101P110 |
| NOP | 00011011 1101-110 |

Fig. 360 (n):

| | | |
|---|---|---|
| RTS | 00101011 1101P110 | |
| RRNG | 00111011 1101P110 | |
| WAIT | 00001111 1101-110 | ......#ih....... |
| REIT | 00101111 1101P110 | |
| PTLB | 00p11111 1101P110 | |
| {RIE} | 00****11 1101P111 | |

[(6) Other Instructions]

(6) Other Instructions

| | | |
|---|---|---|
| | 00?????? 111????? | |
| SCMP | 00eeeeSS 1110P0Qb | |
| SMOV | 00eeeeSS 1110P1Qb | |
| QSCH | 00eeeeSS 1111P0mb | |
| SSCH | 00eeeeSS 1111P10r | |
| Bcc:G | 00ccccSS 1111P110 | ......#dS....... |

***** Further Allocation

000????? 1111P111 2^9 bit of first HW is always '+'.

001????? 1111P111 2^9 bit of first HW is 0/1 alternative.

| | | |
|---|---|---|
| PSTLB | 000000+- 1111P111 0-pttt— | ..EaA... |
| {RIE-X} | 000000+X 1111P111 1***0*?? | ..Ea?... |

Fig. 360 (o):

| | |
|---|---|
| SHXL | 000000+X 1111-111 1—010+- ..EaMX.. |
| SHXR | 000000+X 1111-111 1—110+- ..EaMX.. |
| ENTER:G | 000000+X 1111P111 1—011SS ..EaR!M. ......LnXL...... |
| EXITD:G | 000000+X 1111P111 1—111SS ..EaR!M. ......LxXL...... |

***** In EaR!M, only Rn and # imm_data are permitted. The size of EaR!M is specified by SS. The sizes of registers retired, returned by LnRL, LxRL are specified by X.

| | |
|---|---|
| BVPAT | 000001+X 1111P111 |
| {RIE} | 00001*+X 1111P111 |
| BVSCH | 0001bd+X 1111P111 |
| BRA:G | 001000SS 1111P111 ......#dS....... |
| SSTR | 001001SS 1111P111 |
| BSR:G | 00101QSS 1111P111 ......#dS....... |
| BVMAP | 0011bQ0X 1111P111 |
| BVCPY | 0011bQ1X 1111P111 |

Fig. 361 (a):

| | |
|---|---|
| #3c | SHA:C, SHL:C |
| #3n | ADD:Q, CMP:Q, MOV:Q, SHL:Q, SUB:Q |
| #3z | BCLR:Q, BSET:Q, BSETI:Q, BTST:Q |
| #4z | TRAPA |
| #6n | ACB:Q, BFCMP:E:I, BFCMP:E:R, BFCMPU:E:I, BFCMPU:E:R, BFEXT:E, BFEXTU:E, BFINS:E:I, BFINS:E:R, BFINSU:E:I, BFINSU:E:R |
| #6z | SCB:Q |
| #d16 | MOVA:R |
| #d8 | BRA:D, BSR:D, Bcc:D |
| #dS | BRA:G, BSR:G, Bcc:G |
| #dS8 | ACB:E, ACB:G, ACB:Q, ACB:R, SCB:E, SCB:G, SCB:Q, SCB:R |
| #iM | ADD:I, AND:I, OR:I, SUB:I, XOR:I, {RIE} |
| #iR | CMP:I |
| #iS8 | BFCMP:E:I, BFCMP:G:I, BFCMPU:E:I, BFCMPU:G:I, BFINS:E:I, BFINS:G:I, BFINSU:E:I, BFINSU:G:I |
| #iW | MOV:I, UNPKss |
| #ib | ACB:E, ADD:E, ADDDX:E, ADDU:E, ADDX:E, AND:E, BCLR:E, BCLRI:E, BFCMP:E:I, BFCMP:E:R, BFCMPU:E:I, BFCMPU:E:R, BFEXT:E, BFEXTU:E, BFINS:E:I, BFINS:E:R, BFIMSU:E:I, BFINSU:E:R, BNOT:E, BSET:E, BSETI:E, BTST:E, CMP:E, CMPU:E, DCADD:E, DCADDU:E, DCCMP:E, DCCMPU:E, DCCMPX:E, DCSUB:E, DCSUBU:E, DCX:E, DIV:E, DIVU:E, ENTER:E, EXITD:E, JRNG:E, LDC:E, LDP:E, MOV:E, MOVU:E, MUL:E, MULU:E, OR:E, REM:E, |

Fig. 361 (b):

| | |
|---|---|
| | REMU:E, ROT:E, SCB:E, SHA:E, SHL:E, SUB:E, SUBDX:E, SUBU:E, SUBX:E, XOR:E |
| #ih | WAIT |
| EaA | ACS, JMP, JSR, LDATE, MOVA:G, MOVPA, PSTLB, PUSHA, STATE |
| EaA!A | LDCTX, {RIE} |
| EaM | ADD:E, ADD:G, ADDDX:E, ADDDX:G, ADDU:E, ADDU:G, ADDX:E, ADDX:G, AND:E, AND:G, BSCH, DCADD:E, DCADD:G, DCADDU:E, DCADDU:G, DCSUB:E, DCSUB:G, DCSUBU:E, DCSUBU:G, DCX:E, DCX:G, DIV:E, DIV:G, DIVU:E, DIVU:G, MUL:E, MUL:G, MULU:E, MULU:G, NEG, NOT, OR:E, OR:G, REM:E, REM:G, REMU:E, REMU:G, ROT:E, ROT:G, SHA:E, SHA:G, SHL:E, SHL:G, SUB:E, SUB:G, SUBDX:E, SUBDX:G, SUBU:E, SUBU:G, SUBX:E, SUBX:G, XOR:E, XOR:G |
| EaMR | DIVX, MULX |
| EaMX | SHXL, SHXR |
| EaMbf | BFINS:E:I, BFINS:E:R, BFINS:G:I, BFINS:G:R, BFINSU:E:I, BFINSU:E:R, BFINSU:G:I, BFINSU:G:R |
| EaMf | BCLR:E, BCLR:G, BNOT:E, BNOT:G, BSET:E, BSET:G |
| EaMfi | BCLRI:E, BCLRI:G, BSETI:E, BSETI:G |
| EaMiR | CSI |
| EaMqP | QINS |
| EaMqP2 | QINS |

Fig. 361 (c):

| | |
|---|---|
| EaR | ACB:G, ADD:G, ADDDX:G, ADDU:G, ADDX:G, AND:G, BCLR:G, BCLRI:G, BFCMP:G:I, BFCMP:G:R, BFCMPU:G:I, BFCMPU:G:R, BFEXT:G, BFEXTU:G, BFINS:G:I, BFINS:G:R, BFINSU:G:I, BFINSU:G:R, BNOT:G, BSCH, BSET:G, BSETI:G, BTST:G, CHK, CMP:G, CMPU:G, CSI, DCADD:G, DCADDU:G, DCADJ, DCADJU, DCADJX, DCCMP:G, DCCMPU:G, DCCMPX:G, DCSUB:G, DCSUBU:G, DCX:G, DIV:G, DIVU:G, DIVX, INDEX, LDATE, LDC:G, LDP:G, MOV:G, MOVU:G, MUL:G, MULU:G, MULX, OR:G, PACKss, REM:G, REMU:G, ROT:G, RVBI, RVBY, SCB:G, SHA:G, SHL:G, SUB:G, SUBDX:G, SUBU:G, SUBX:G, UNPKss, XOR:G |
| EaR!I | CMP:E, CMP:G, CMP:Z, CMPU:E, CMPU:G, DCCMP:E, DCCMP:G, DCCMPU:E, DCCMPU:G, DCCMPX:E, DCCMPX:G |
| EaR!M | ENTER:G, EXITD:G |
| EaR% | STC, STP |
| EaR2 | INDEX |
| EaRL | PUSH |
| EaRX | ACB:E, ACB:G, SCB:E, SCB:G |
| EaRbf | BFCMP:E:I, BFCMP:E:R, BFCMP:G:I, BFCMP:G:R, BFCMPU:E:I, BFCMPU:E:R, BFCMPU:G:I, BFCMPU:G:R, BFEXT:E, BFEXT:G, BFEXTU:E, BFEXTU:G |
| EaRdR | CHK |
| EaRf | BTST:E, BTST:G |
| EaRh | LDPSB, LDPSM |

Fig. 361 (d):

| | |
|---|---|
| EaRh!M | JRNG:G |
| EaRmL | LDM |
| EaRqP | QDEL |
| EaW | DCADJ, DCADJU, DCADJX, MOV:E, MOV:G, MOV:Z, MOVA:G, MOVU:E, MOVU:G, PACKss, RVBI, RVBY, STC, STP, UNPKSss |
| EaW!S | MOVPA, QDEL, STATE |
| EaW% | LDC:E, LDC:G, LDP:E, LDP:G |
| EaWL | POP |
| EaWh | STPSB, STPSM |
| EaWmL | STM |
| L1RL | LDM |
| LnXL | ENTER:E, ENTER:G |
| LsWL | STM |
| LxXL | EXITD:E, EXITD:G |
| RMC | CSI |
| RRXs | BFCMP:E:R, BFCMP:G:R, BFCMPU:E:R:, BFCMPU:G:R, BFINS:E:R, BFINS:G:R, BFINSU:E:R, BFINSU:G:R |
| RRXw | BFCMP:G:I, BFCMP:G:R, BFCMPU:G:I, BFCMPU:G:R, BFEXT:G, BFEXTU:G, BFINS:G:I, BFINS:G:R, BFINSU:G:I, BFINSU:G:R |
| RWXd | BFEXT:E, BFEXT:G, BFEXTU:E, BFEXTU:G |
| RgMR | DIVX, INDEX |
| RgMX | ACB:E, ACB:G, SCB:E, SCB:G |
| RgMw | ACB:Q, ACB:R, ADD:L, AND:R, DIV:R, MUL:R, OR:R, SCB:Q, SCB:R, SUB:L, XOR:R |

Fig. 361 (e):

| | |
|---|---|
| RgRP | MOVA:R |
| RgRw | ACB:R, AND:R, CMP:L, DIV:R, MOV:S, MUL:R, OR:R, SCB:R, XOR:R |
| RgWP | MOVA:R |
| RgWR | CHK, MULX |
| RgWw | MOV:L |
| ShM | ADD:I, ADD:Q, AND:I, OR:I, SHA:C, SHL:C, SHL:Q, SUB:I, SUB:Q, XOR:I, {RIE} |
| ShMfq | BCLR:Q, BSET:Q |
| ShMfqi | BSETI:Q |
| ShR | CMP:L, MOV:L |
| ShR!I | CMP:I, CMP:Q |
| ShRfq | BTST:Q |
| ShRw | ADD:L, SUB:L |
| ShW | MOV:I, MOV:Q, MOV:S |

Fig. 362:

| MNEMONIC | Meaning | condition | cccc |
|---|---|---|---|
| XS | X_flag set | X | 0000 |
| XC | X_flag clear | ~X | 0001 |
| EQ | equal/Z_flag clear | Z | 0010 |
| NE | not equal/Z_flag clear | ~Z | 0011 |
| LT | less than/L_flag set | L | 0100 |
| GE | greater or equal/L_flag clear | ~L | 0101 |
| LE | less or equal | L+Z | 0110 |
| GT | greater than | ~L*~Z | 0111 |
| VS | V_flag set | V | 1000 |
| VC | V_flag clear | ~V | 1001 |
| MS | minus/M_flag set | M | 1010 |
| MC | plus/M_flag clear | ~M | 1011 |
| FS | F_flag set | F | 1100 |
| FC | F_flag clear | ~F | 1101 |
| {RIE} | | | 1110 |
| {RIE} | | | 1111 |

Fig. 363:

| termination condition= (escape condition) | optional mnemonic | | | eeee |
|---|---|---|---|---|
| <R3 | LTU | less than (unsigned) | | 0000 |
| ≥R3 | GEU | greater or equal (unsigned) | | 0001 |
| =R3 | EQ | equal | | 0010 |
| ≠R3 | NE | not equal | | 0011 |
| <R3 | LT | less than (signed) | | 0100 |
| ≥R3 | GE | greater or equal (signed) | | 0101 |
| no termination condition | N | never (or having no option) | | 0110 |
| | {RIE} | | | 0111 |
| <R3.or.≥R4 | OUTU | out of (unsigned) | <<L2>> | 1000 |
| ≥R3.and.<R4 | WINU | within (unsigned) | <<L2>> | 1001 |
| =R3.or.=R4 | OEQ | or, equal | <<L2>> | 1010 |
| ≠R3.and.≠R4 | ANE | and, not equal | <<L2>> | 1011 |
| <R3.or.≥R4 | OUT | out of (signed) | <<L2>> | 1100 |
| ≥R3.and.≤R4 | WIN | within (signed) | <<L2>> | 1101 |
| =0 | Z | zero | <<L2>> | 1110 |
| =R3.or.=0 | ZE | zero, equal | <<L2>> | 1111 |

Fig. 364:

| termination condition= (escape condition) | optional mnemonic | | condition of M_flag=1 |
|---|---|---|---|
| <R3.or.≥R4 | OUTU | out of (unsigned) | ≥R4 |
| =R3.or.=R4 | OEQ | or, equal | =R4 |
| <R3.or.≥R4 | OUT | out of (signed) | ≥R4 |
| =0 | Z | zero | =0 (always) |
| =R3.or.=0 | ZE | zero, equal | =0 |

Fig. 365:

operation result of src=0, dest=0 is placed in bit 0
operation result of src=0, dest=1 is placed in bit 1
operation result of src=1, dest=0 is placed in bit 2
operation result of src=1, dest=1 is placed in bit 3

| | | | |
|---|---|---|---|
| 0000 | F | False | 0==> dest |
| 0001 | NAN | NotAndNot | ~dest.and.~src==> dest |
| 0010 | AN | AndNot | dest.and.~src==> dest |
| 0011 | NS | NotSrc | ~src==> dest |
| 0100 | NA | NotAnd | ~dest.and.src==> dest |
| 0101 | ND | NotDest | ~dest==> dest |
| 0110 | X | Xor | dest.xor.src==> dest |
| 0111 | NON | NotOrNot | ~dest.or.~src==>dest |
| 1000 | A | And | dest.and.src==> dest |
| 1001 | NX | NotXor | ~dest.xor.src==> dest |
| 1010 | D | Dest | dest==> dest |
| 1011 | ON | OrNot | dest.or. ~src ==> dest |
| 1100 | S | Src | src==> dest |
| 1101 | NO | NotOr | ~dest.or.src==> dest |
| 1110 | O | Or | dest.or.src==> dest |
| 1111 | T | True | 1==> dest |

Fig. 366 (a):

| | general (1) | Rn | #imm | @SP+ | @-SP | additional | objective instruction |
|---|---|---|---|---|---|---|---|
| EaA | O | X | X | X | X | O | ACS, JMP, JSR, LDATE, MOVA:G, PUSHA, MOVPA, PSTLB, STATE |
| EaA!A | O | X | X | X | X | X | LDCTX |
| EaM | O | O | X | X | X | O | ADD:E, ADD:G, DIV:E, DIV:G, DIVU:E, DIVU:G, SHA:E, SHA:G, etc. |
| ShM | | | | | | | ADD:I, ADD:Q, SHA:C, OR:I, AND:I, SHL:Q, SHL:C, SUB:I, SUB:Q, XOR:I |
| EaMX | | | | | | | SHXL, SHXR |
| EaMR | | | | | | | DIVX, MULX |
| EaMf | O | (2) O | X | X | X | O | BCLR:E, BCLR:G, BNOT:E, BNOT:G, BSET:E, BSET:G |
| ShMfq | O | O | X | X | X | O | BCLR:Q, BSET:Q |
| EaMbf | O | <<L2>> | X | X | X | O | BFINS:E:I, BFINS:E:R, BFINSU:E:I, BFINSU:E:R, BFINS:G:I, BFINS:G:R, BFINSU:G:I, BFINSU:G:R |

general Rn #imm @SP+ @-SP additional objective instruction

Fig. 366 (b):

| | general | Rn | #imm | @SP+ | @-SP | additional | objective instruction |
|---|---|---|---|---|---|---|---|
| EaMfi | O | X | X | X | X | O | BCLRI:E, BCLRI:G, BSETI:E, BSETI:G |
| ShMfqi | O | X | X | X | X | O | BSETI:Q |
| EaMiR | O | X | X | X | X | O | CSI |
| EaMqP | O | X | X | X | X | O | QINS |
| EaMqp2 | | | | | | | QINS |
| EaR | O | O | O | O | X | O | ACB:G, ADD:G, ADDDX:G, ADDU:G, ADDX:G AND:G, BCLR:G, BSET:G, etc. |
| EaRh | | | | | | | LDPSB, LDPSM |
| ShR | | | | | | | CMP:L, MOV:L |
| ShRw | | | | | | | ADD:L, SUB:L |
| EaR2 | O | O | O | O | X | O | INDEX |
| EaRX | | | | | | | ACB:E, ACB:G, SCB:E, SCB:G |

general Rn #imm @SP+ @-SP additional objective instruction

Fig. 366 (c):

| | general | Rn | #imm | @SP+ | @-SP | additional | objective instruction |
|---|---|---|---|---|---|---|---|
| EaRmL | O | X | X | O | X | X | LDM |
| EaRL | O | O | O | X | X | O | PUSH |
| EaR!I | O | O | X | O | X | O | CMP:E, CMP:G, CMPU:E, CMPU:G, CMP:Z |
| ShR!I | | | | | | | CMP:I, CMP:Q |
| EaR% | O | X | X | X | X | O | STC, STP |
| EaRdR | O | X | X | X | X | O | CHK |
| EaRqP | O | X | X | X | X | O | QDEL |
| EaRf | O | (2) O | X | X | X | O | BTST:E, BTST:G |
| ShRfq | O | O | X | X | X | O | BTST:Q |
| EaRbf | O | <<L2>> | X | X | X | O | BFCMP:E:I, BFCMPU:E:I, BFCMP:E:R, BFCMPU:E:R, BFEXT:E, BFEXTU:E, BFCMP:G:I, BFCMPU:G:I, BFCMP:G:R, BFCMPU:G:R, BFEXT:G, BFEXTU:G |

general Rn #imm @SP+ @-SP additional objective instruction

Fig. 366 (d):

| | general | Rn | #imm | @SP+ | @-SP | additional | objective instruction |
|---|---|---|---|---|---|---|---|
| EaR!M | X | O | O | X | X | X | ENTER:G, EXITD:G |
| EaRh!M | | | | | | | JRNG:G |
| EaW | O | O | X | X | O | O | MOV:Z, MOV:E, MOV:G, MOVA:G, MOVU:E, MOVU:G PACKss, STC, STP, UNPKss, RVBY, RVBI |
| EaWh | | | | | | | STPSB, STPSM |
| ShW | | | | | | | MOV:I, MOV:Q, MOV:S |
| EaW!S | O | O | X | X | X | O | MOVPA, STATE, QDEL |
| EaWmL | O | X | X | X | O | X | STM |
| EaW% | O | X | X | X | X | O | LDC:E, LDC:G LDP:E, LDP:G |
| EaWL | O | O | X | X | X | O | POP |

| | general | Rn | #imm | @SP+ | @-SP | additional | objective instruction |

INSTRUCTION FORMAT WITH SEQUENTIALLY PERFORMABLE OPERAND ADDRESS EXTENSION MODIFICATION

This is a Continuation of application Ser. No. 07/763,473 filed Sep. 20, 1991, now abandoned, which is a continuation of Ser. No. 07/563,749, filed Aug. 3, 1990, now abandoned, which is a continuation of Ser. No. 07/170,972, filed Mar. 21, 1988, now abandoned.

BACKGROUND OF THE INVENTION

1. Field of the Invention

The present invention relates to a data processor, and mope particularly to a data processor which performs general purpose addressing with respect to operands and especially has an extension field for index addressing and memory indirect addressing.

2. Description of the Prior Art

When an electronic computer is used to perform data processing and, e.g. C, Modula-2, Pascal, etc. which are called high level languages more understandable for men, are used to make programs, a source program written in the high level language is usually converted into an object program under a machine language by a translation program called the compiler, and thereafter executed.

However, there is a mechanical difference in construction between the data represented by the high level language and that by machine languages, whereby the reading and writing of data easily describable by the high level language are converted into a plurality of machine language instruction sequences and sequentially processed in series. Hence, the object program after the converting is not inevitably processed with high performance.

For example, the data structure as shown in FIG. 1 is very widely used for programs by high level languages. In FIG. 1, reference character P designates a pointer holding the address of a record 1, having fields named "key," "val," and "next" being defined at record 1 and record 2 respectively.

Data to be held in the respective records is stored in the val field and a key for discriminating the data in the val field is stored in the key field. The next field is a pointer to hold the address of the next record.

Now, when the val field is an array of integers, reference of the i-th element at the val field of record 1, even when a value of P is on a register or at any position on the memory, is represented by P—>val [i]

without being sensible thereof, in, for example, C language.

However, for example, in a case shown in FIG. 2-(A), when the value is translated by the compiler or the like, it is recognized that the size of the key field at record 1 is 2 and the size of the respective elements val [0], val [1] .. at the val field is 4, so that the value of P is added with 2 and further with 4×i, thereby obtaining the address for the field of the objective val [i].

A conventional data processor; for example, VAX by DEC Co., of U.S.A. or NS32032 by National Semiconductor Co., is provided with an addressing mode for computing the above-mentioned address.

For example, in a case where the value of i is already on a register R1, (1) When the value P is already on a register R0, as shown in FIG. 2-(B), an addressing mode is provided which adds the constant 2 to the value of register R0, to the result thereof is added to the product of the value of register R1 and the constant 4, thereby making the address of the operand.

However, (2) in a case where the value P is one of the global variables, or one of the local variables, it is necessary to execute a surplus instruction to temporarily store the value P in the register R0 as shown by the broken lines in FIG. 2-(B).

In this case, when the register R0 keeps any necessary data, it is required to execute a further surplus instruction such that the content of register R0 temporarily escapes onto the memory. Lastly, it is required to execute an instruction to restore to the register R0 the value escaping onto the memory.

The operand extension method at the conventional data processor is as follows:

The conventional data processor, such as VAX by DEC Co., is provided with an instruction format which is capable of carrying out address modification extension in an index mode.

FIG. 3 shows the instruction format of the VAX index mode.

The literature regarding the VAX instruction format describes the instruction format as little-endian, while the the present invention uses big-endian descriptions.

As shown in FIG. 3-(*a*), the 8 bit index specifying field is provided in continuation of the 8 bit operation code specifying field OP. A value of initial 4 bits at the index specifying field is 4 in hexadecimal, which shows the index mode. Also, the next 4 bits Rx field shows the number of the index register. Furthermore, the base address specifying field is provided in continuation of the index specifying field, by which the base address is specified. The Mode field at the base address specifying field specifies the addressing mode for specifying the base address and an Rb field specifies a register serving as the base address pointer. Also, the disp field is a field of variable length depending on the value of the Mode field and specifies a displacement value to be added when the base address is specified.

The base address specifying field serves to carry out the address modification extension with respect to the index mode.

For example, when the value of the Mode field is 6 in hexadecimal, the instruction format becomes as shown in FIG. 3-(*b*), which shows the register indirect index mode, in which the base address is the content of the register specified by the Rb field.

Also, when the value of the Mode field is A in hexadecimal, the instruction format is as shown in FIG. 3-(*c*), which shows the byte displacement index mode. In this mode, base address has a value formed by adding the displacement value of the disp field to the content of the address specified by the Rb field.

Furthermore, when the value of the mode field is B in hexadecimal, the instruction format is as shown in FIG. 3-(*d*), which represents the byte displacement indirect index mode. In this case, the base address is the content of the memory whose address is the result of adding the displacement value of disp field to the content of the register specified by the Rb field.

Such instruction format can formally perform the address modification extension of free levels. For example, the format shown in FIG. 3-(*e*) can represent a two-level index mode. In this case, the base address specifying field corresponding to the first index specifying field is shown by a base address specifying field 1, the base address thereof being specified by the index mode with respect to the second index specifying field 2.

This instruction format, however, cannot efficiently perform address modification at the free level.

For example, in the format in FIG. 3-(*e*), when the effective address of the operand is calculated, the operand is read in the order of the first index specifying field, the second index field and so on, and then the base address specifying field 2, and for the first time after the base address specifying field 2, the base address specifying field 1 is recognized to be the byte displacement index modes thereby calculating the base address corresponding to the base address specifying field 1. The base address and the first index specifying field can be used to obtain the effective address of the operand.

Thus, the conventional instruction format is to represent an address modification extension by the extension format of the base address with respect to the index mode, whereby the address calculation should be carried out from behind the operand. Hence, address calculation is impossible until all the parts of operand are read. Accordingly, when address modification extension is performed at multiple levels, the efficiency of effective address calculation deteriorates, thereby creating a problem in that the number of levels cannot increase.

SUMMARY OF THE INVENTION

The present invention has been designed in order to solve the above problem. The first object of the present invention is to provide a format of addressing modes for instruction operands capable of improving the execution speed of the program at the system of program control method.

The second object of present invention is to provide a format of addressing modes for instruction operands facilitating a complier structure by enabling complicated address specifying used with respect to the data structure of a high level language.

Addressing with respect to operands of an instruction, even complicated, can basically be decomposed into a combination of addition and indirect reference, which is utilized by the present invention. The operations of addition and indirect reference are given as the primitives of addressing, which are freely combined, thereby enabling any complicated addressing mode to be realized. A new instruction format of the present invention represents the addressing mode on the basis of such an idea.

The data processor of the present invention is characterized by having an operand instruction having an operation code specifying portion to specify the kind of operation and an effective address specifying field showing the effective address of at least one operand, adding an additional mode specifying field for performing the addressing extension modification to at least one addressing mode shown by the effective address specifying field, and adding the additional mode specifying field for performing the address extension modification, to at least one first additional addressing mode shown by the above-mentioned additional mode specifying field.

The above and further objects and features of the invention will more fully be apparent from the following detailed description with accompanying drawings.

BRIEF DESCRIPTION OF THE DRAWINGS

FIG. 11 is an illustration of data type as to the integer of the same, FIG. 12 is an illustration of data type as to the decimal number of the same, FIG. 16 shows a bit pattern thereof, FIGS. 17 to 27 show instruction formats of the data processor of the invention respectively, FIG. 51 shows the format of instruction MOVU, FIG. 52 is an illustration of the flag change thereof, FIG. 53 shows the format of instruction PUSH, FIG. 54 is an illustration of the flag change thereof, FIG. 55 shows the format of instruction POP, FIG. 56 is an illustration of the flag change, FIG. 57 shows the format of the instruction LDM, FIG. 58 is an illustration of the flag change thereof, FIG. 59 is an illustration of bit map specifying, FIG. 60 shows the format of an instruction STM, FIG. 61 is an illustration of flag change thereof, FIGS. 62 and 63 are illustrations of the bit map specifying, FIG. 64 shows the format of the instruction MOVA, FIG. 65 is an illustration of flag change thereof, FIG. 66 shows the format of instruction PUSHA, FIG. 67 is an illustration of flag change thereof, FIG. 68 shows the format of instruction CMP, FIG. 69 is an illustration of flag change thereof, FIG. 70 shows the format of instruction CMPU, FIG. 71 is an illustration of flag change thereof, FIG. 72 shows the format of instruction CHK, FIG. 73 is an illustration of flag change thereof, FIG. 74 is an illustration of operation by the instruction CHK, FIG. 75 shows the format of instruction ADD, FIG. 76 is an illustration of flag change, FIG. 77 shows the format of instruction ADDU, FIG. 78 is an illustration of flag change thereof, FIG. 79 shows the format of instruction ADDX, FIG. 80 is an illustration of flag change thereof, FIG. 81 shows the format of instruction SUB, FIG. 82 is an illustration of flag change thereof, FIG. 83 shows the format of instruction SUBU, FIG. 84 is an illustration of flag change thereof, FIG. 85 shows the format of instruction SUBX, FIG. 86 is an illustration of flag change thereof, FIG. 87 shows the format of instruction MUL, FIG. 88 is an illustration of flag change thereof, FIG. 89 shows the format of instruction MULU, FIG. 90 is an illustration of flag change thereof, FIG. 91 shows the format of instruction MULX, FIG. 92 is an illustration of flag change thereof, FIG. 93 shows the format of instruction DIV, FIG. 94 is an illustration of flag change thereof, FIG. 95 shows the format of instruction DIVU FIG. 96 is an illustration of flag change thereof, FIG. 97 is a view showing the format of instruction DIVX, FIG. 98 is an illustration of flag change thereof, FIG. 99 is a view of format of instruction REM, FIG. 100 is an illustration of flag change thereof, FIG. 101 is a view of the format of instruction REMU, FIG. 102 is an illustration of flag change thereof, FIG. 103 shows the format of instruction NEG, FIG. 104 is an illustration of flag change thereof, FIG. 105 is a view of the format of instruction INDZX, FIG. 106 is an illustration of flag change thereof, FIG. 107 is a view of the format of instruction AND, FIG. 108 is an illustration of flag change thereof, FIG. 109 is a view of the format of instruction OR, FIG. 110 is an illustration of flag change thereof, FIG. 111 is a view of the format of instruction XOR, FIG. 112 is an illustration of flag change thereof, FIG. 113 is a view of the format of instruction NOT, FIG. 114 is an illustration of flag change thereof, FIG. 115 is a view of the format of instruction SHA, FIG. 116 is an illustration of flag change thereof, FIG. 119 is a view of the format of instruction SHL, FIG. 120 is an illustration of flag change thereof, FIG. 121 is an illustration of the left-side shift, FIG. 122 is an illustration of the right-side shift, FIG. 123 is a view of the format of instruction ROT, FIG. 124 is an illustration of flag change thereof, FIG. 125 is an illustration of counterclockwise rotation, FIG. 126 is an illustration of clockwise rotation, FIG. 133 is a view of the format of instruction RVBY, FIG. 134 is an illustration of flag change thereof, FIG. 135 is a view of the format of instruction RVBI, FIG. 136 is an illustration of flag change thereof, FIG. 139 is a view of the format of instruction BTST, FIG. 140 is an illustration of flag change thereof, FIG. 141 is a view of the format of instruction BSET, FIG. 142 is an illustration of flag change thereof, FIG. 143 is a view of the format of instruction BCLR, FIG. 144 is an illustration of flag change thereof, FIG. 145 is a view of the format of instruction BNOT, FIG. 146 is an illustration of flag change thereof, FIG. 147 is a view of the format of instruction BSCH, FIG. 148 is an illustration of flag change thereof, FIG. 150 is a view of the format of instruction of bit field instruction, FIG. 151 is a view of the format of instruction BFEXT, FIG. 152 is an illustration of flag change thereof, FIG. 153 is a view of the format of instruction BFEXTU, FIG. 154 is an illustration of flag change thereof, FIG. 164 is an illustration of flag change thereof, FIG. 165 is a view of the format of instruction BVMAP, FIG. 166 is an illustration of flag change thereof, FIGS. 167 to 169 are views of format of instruction BVMAT, FIG. 170 is a view of the format of instruction BVCPY, FIG. 171 is an illustration of flag change thereof, FIG. 172 is a view of the format of instruction BVPAT, FIG. 173 is an illustration of flag change thereof, FIG. 174 is a view of the format of instruction ADDDX, FIG. 175 is an illustration of flag change thereof, FIG. 176 is a view of the format of instruction SUBDX, FIG. 177 is an illustration of flag change thereof, FIG. 178 is a view of the format of instruction PACKss, FIG. 179 is an illustration of flag change thereof, FIG. 182 is an illustration of instruction UNPKss, FIG. 183 is an illustration of termination condition, FIG. 184 is a view of the format of instruction SMOV, FIG. 185 is an illustration of flag change thereof, FIG. 186 is an illustration of instruction SCMP, FIGS. 187 and 188 are illustrations of flag change thereof, FIG. 189 is a view of the format of instruction SSCH, FIG. 190 is an illustration of the flag change thereof, FIG. 191 is a view of the format of the instruction SSTR, FIG. 192 is an illustration of the flag change thereof, FIG. 193 is a view of the format of instruction QINS, FIG. 194 is an illustration of the flag change thereof, FIGS. 195 to 197 are illustrations of the instruction QINS, FIG. 198 is a view of the format of instruction QDEL, FIG. 199 is an illustration of the flag change thereof, FIGS. 200 to 202 are illustrations of the instruction QDEL, FIGS. 203(*a*) and 203(*b*) are a view of the format of instruction QSCH, FIG. 204 is an illustration of the flag change thereof, FIGS. 205(*a*)–205(*b*) to 207 are illustrations of the instruction QSCH, FIG. 208 is a view of the format of instruction BRA, FIG. 209 is an illustration of the flag change thereof, FIG. 210 is a view of the format of instruction Bcc, FIG. 211 is an illustration of the flag change thereof, FIG. 212 is an illustration of the detail and mnemonic of the portions, FIG. 213 is a view of the format of instruction BSR, FIG. 214 is an illustration of the flag change thereof, FIG. 215 is a view of the format of instruction JMP, FIG. 216 is an illustration of the flag change thereof, FIG. 217 is a view of the format of instruction JSR, FIG. 218 is an illustration of the flag change thereof, FIG. 219 is a view of the format of instruction of ACB, FIG. 220 is an illustration of the flag change thereof, FIG. 221 is a view of the format of instruction SCB, FIG. 222 is an illustration of the flag change thereof, FIG. 223 is a view of the format of instruction ENTER, FIG. 224 is an illustration of the flag change thereof, FIG. 225 is an illustration of the instruction ENTER, FIG. 226 shows the format of instruction EXITD, FIG. 227 is an illustration of the flag change thereof, FIG. 228 is an illustration of the instruction EXITD, FIG. 229 is a view of the format of instruction RTS, FIG. 230 is an illustration of the flag change thereof, FIG. 231 is a view of the format of instruction NOP, FIG. 232 is an illustration of the flag change thereof, FIG. 233 is a view of the format of instruction PIB, FIG. 234 is an illustration of the flag change thereof, FIG. 235 is a view of the format of instruction BSETI, FIG. 236 is an illustration of the flag change thereof, FIG. 237 is a view of the format of instruction BCLRI, FIG. 238 is an illustration of the flag change thereof, FIG. 239 is a view of the format of instruction CSI, FIG. 240 is an illustration of the flag change thereof, FIG. 241 is a view of the format of instruction LDC, FIG. 242 is an illustration of the flag change thereof, FIG. 243 is a view of the format of instruction STC, FIG. 244 is an illustration of the flag change thereof, FIG. 245 is a view of the format of instruction LDPSB, FIG. 246 is an illustration of the flag change thereof, FIG. 247 is a view of the format of instruction LDPSM, FIG. 248 is an Illustration of the flag change thereof, FIG. 249 is a view of the format of instruction STPSB, FIG. 250 is an illustration of the flag change thereof, FIG. 251 is a view of the format of instruction STPSM, FIG. 252 is an illustration of the flag change thereof, FIG. 253 is a view of the format of instruction LDP, FIG. 254 is an illustration of the flag change thereof, FIG. 255 is a view of the format of instruction STP, FIG. 256 is an illustration of the flag change thereof, FIG. 257 is a view of the format of instruction JRNG, FIG. 258 is an illustration of the flag change thereof, FIGS. 259 to 264 are illustration of the instruction JRNG, FIG. 265 is a view of the format of instruction RRNG, FIG. 266 is an illustration of the flag change thereof, FIGS. 267 to 269 are illustrations of the instruction RRNG, FIG. 270 is a view of the format of instruction TRAPA, FIG. 271 is an illustration of the flag change thereof, FIG. 272 is a view of the format of instruction TRAP, FIG. 273 is an illustration of the flag change thereof, FIG. 277 is a view of the format of instruction WAIT, FIG. 278 is an illustration of the flag change thereof, FIG. 279 is a view of the format of instruction LDCTX, FIG. 280 is an illustration of the flag change thereof, FIG. 281 is a view of the format of instruction STCTX, FIG. 282 is an illustration of the flag change thereof, FIG. 283 is a view of the format of instruction ACS, FIG. 284 is an illustration of the flag change thereof, FIG. 285 is a view of the format of instruction MOVPA, FIG. 286 is an illustration of the flag change thereof, FIGS. 287 and 288 are views of the format of instruction MOVPA, FIG. 289 is an illustration of instruction LDATE, FIGS. 290 and 291 are illustrations of the flag change thereof, FIG. 292 is a view of the format of instruction STATE, FIGS. 293 and 294 are illustrations of the flag change thereof, FIG. 295 is a view of the format of instruction PTLB, FIG. 296 is an illustration of the flag change thereof, FIG. 297 is a view of the format of instruction PSTLB, FIG. 298 is an illustration of the flag change thereof, FIG. 299 is an illustration of an AT field, FIG. 300 is an illustration of an AT field, FIG. 303 is an illustration of the flag change in the data transfer instruction, FIG. 304 is an illustration of the flag change in the comparison test instruction, FIG. 305 is an illustration of the flag change of the arithmetic operation instruction, FIG. 306 is an illustration of the flag change in the logical operation instruction, FIG. 307 is an illustration of the flag change in the shift instruction, FIG. 308 is an illustration of the flag change in the bit control instruction, FIGS. 309 and 310 are illustrations of the flag change in the fixed table bit field instruction, FIG. 311 is an illustration of the flag change in the free table bit field, FIG. 312 is an illustration of the flag change in the decimal number operation instruction, FIG. 313 is an illustration of the flag change in the string instruction, FIG. 314 is an illustration of the flag change in the queue control instruction, FIG. 315 is an illustration of the flag change in the jump instruction, FIG. 316 is an illustration of the flag change in the multiprocessor instruction, FIG. 317 is an illustration of the flag change in the control space and physical space control instruction, FIG. 318 is an illustration of the flag change in the OS relevant instruction, FIG. 319 is an illustration of the flag change in the MMU relevant introduction, FIG. 320 is an illustration of subroutine call, FIG. 321 is an illustration of stack frame, FIGS. 322 and 323 are illustrations of instruction sequence, FIG. 324 is an illustration showing a program example, FIG. 325 is an illustration of subroutine call, FIG. 335 is a view of the format of EITVB, FIG. 336 is a view of the format of JRNGVB, FIG. 337 is a view of the format of SP0 to SP3, FIG. 338 is a view of the format of SP1, FIG. 339 is a view of the format of 10ADDR and 10MASK, FIG. 340 is a view of the format of UATB, FIG. 341 is a view of the format of SATB, FIG. 342 is a view of the format of LSID, FIG. 343 is a view of the format of CTXB, FIG. 344 is a view of the format of CTXBFM, FIGS. 347 and 348 are views of the stack format of EIT, FIG. 349 is a view of the format of 10 INF, FIGS. 350(*a*)–350(*d*) are a vector table of EIT, FIG. 351 is an illustration of JRNG, FIGS. 352 and 353 are illustrations of EIT, FIG. 354 is an illustration of IMASK, FIG. 357 is an illustration of DCE, FIG. 358 shows comparison of DCE, DI and EI with each other, FIG. 362 shows the cccc allocation, FIG. 363 shows eeee allocation, FIG. 364 is an illustration of M-flag, FIG. 365 is a view of operation code of the BVMAP instruction, FIGS. 366(*a*)–366(*d*) are a view correspondent to the addressing mode.

DESCRIPTION OF THE PREFERRED EMBODIMENTS

An embodiment of the present invention will be detailed in accordance with the accompanying drawings.

Figure 4:
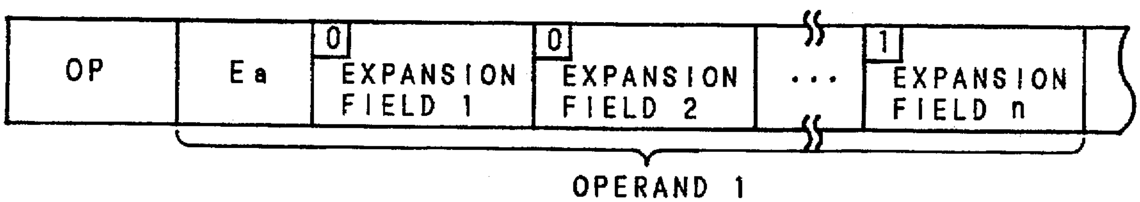
FIG. 4 shows a format of an instruction of a data processor of the invention.

Referring to FIG. 4, an example of a new format of instruction proposed by the present invention is shown, in which an effective address field Ea showing an effective address of an operand 1 is provided in continuation of an operation code specifying field OP, and an extension field 1 for performing the address modification is provided in continuation of the field Ea. The extension field is provided with a continuation/termination bit, so that when a value thereof is 0, it is meant that an extension field further is provided behind the bit, and when 1, the extension field ends.

When the continuation/termination bit at the extension field 1 is 0, another extension field 2, as shown, continues behind the extension field 1. Similarly, some extension fields continue behind the extension field 2 and the continuation/termination bit at the last extension field is 1, whereby the sequence of extension fields terminates.

Such format actually carries out the operand address calculation as follows:

(1) At first, the effective address specified by the field Ea is treated as the temporary value for address calculation.

(2) The next extension field is read to perform with respect to the temporary value the address modification specified in the extension field, the result of which is treated as a new temporary value.

(3) The continuation/termination bit at the extension field is read so that when the value is 0, the process returns to the item (2).

When the value is 1, the temporary value is decided as address of the last operand.

Figure 5:
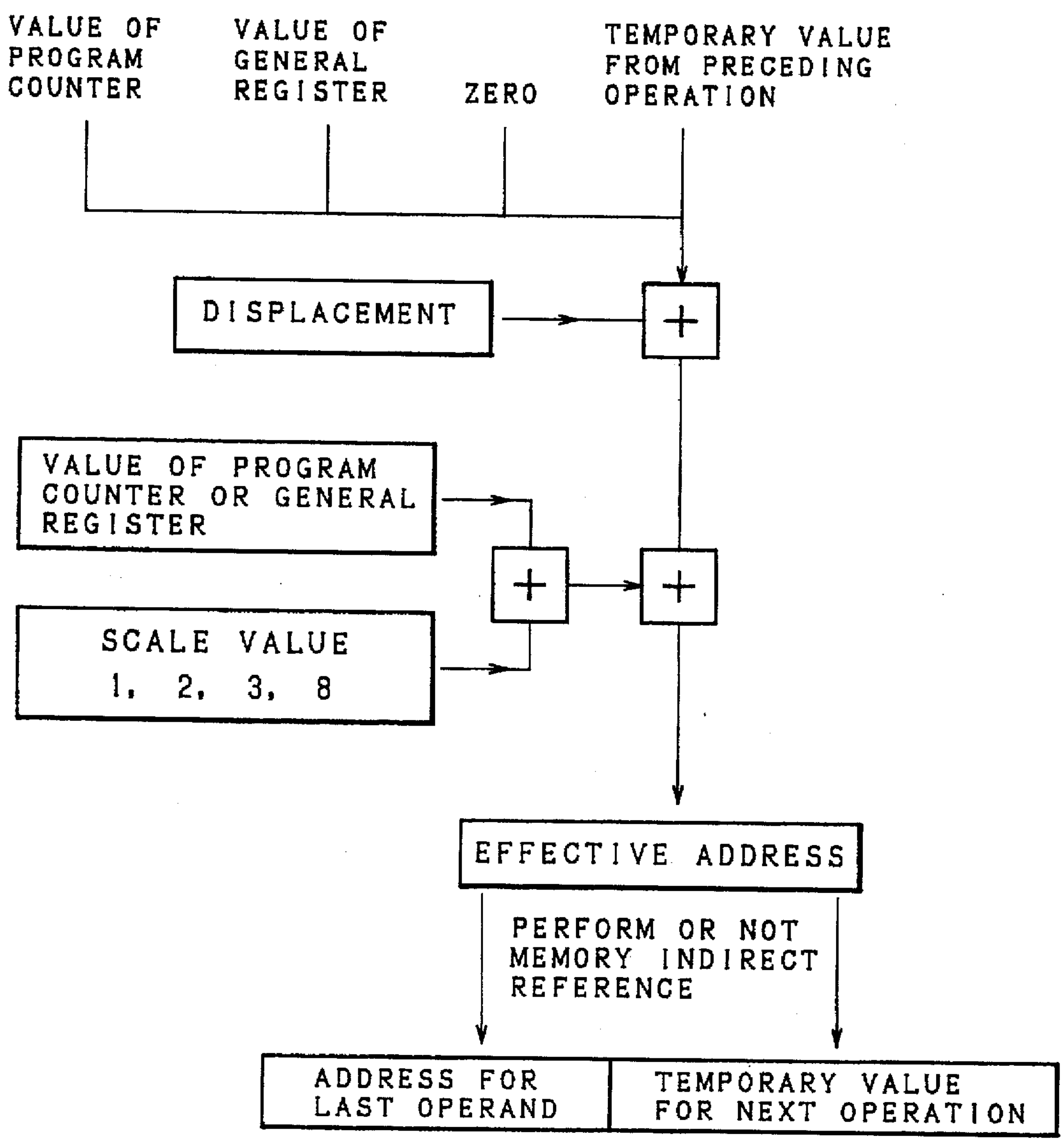
FIG. 5 is an illustration of operation thereof.

Such mechanism is explained in FIG. 5.

Figure 6:
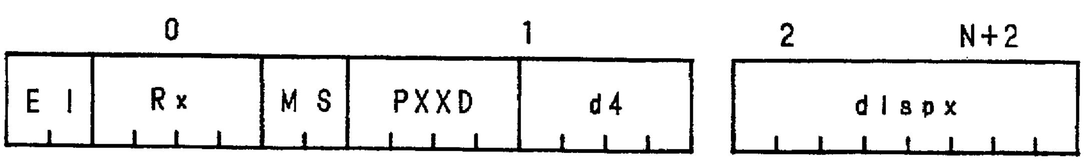
FIG. 6 shows a basic format of an extension field of the same.

FIG. 6 shows the basic format of the extension field of the embodiment of the data processor of the invention.

As shown in FIG. 6, the extension field is provided with;

an E bit to specify whether the extension field continues or terminates;

an I bit to specify whether or not indirect reference is carried out;

an M bit to specify the method for index;

an Rx field to specify an index register or the like together with the M bit;

an XX field to specify the scale of index;

an S bit to specify the size of index register;

a D-bit to specify a specifying method of displacement;

a d4 field specifying the value of displacement when the value of D-bit is 0, and specifying the size of displacement when 1;

a dispx field existing only when the value of D-bit is 1, specifying the value of displacement, and having a field length specified by the d4 field; and a P bit specifying any independent operation at the memory reference.

Next, the data processor of the present invention will be entirely detailed, the aforesaid format being detailed in Chapter 7, paragraph 16.

In addition, the following description is of large volume so that the contents thereof are attached and the matters needful of detailed description are described in the form of appendix.

CONTENTS

1. Features of The Data Processor of the Present Invention
  1-1 Basic Design Concept
  1-2 OS Oriented Architecture
  1-3 Instruction Set Being Tuned
  1-4 Instruction Set for Compiler
2. The Data Processor 32 of the Present Invention and Data Processor 64 of the Present Invention
3. Classification of The Data Processor Specifications of the Present Invention.
4. Register Set
5. Data Type
  5-1 Bit
  5-2 Bit Field
  5-3 Integer
  5-4 Floating Point
  5-5 Decimal
  5-6 String
  5-7 Queue
6. Instruction Format
  6-1 Two-Operand Short Format
  6-1-1 Register and Memory (S-Format and L-Format)
  6-1-2 Between Registers (R-Format)
  6-1-3 Between Literal and Memory (Q-Format)
  6-1-4 Between Immediate and Memory (I-Format)
  6-2 One-Operand General Type (G1-Format)
  6-3 Two-Operand General Type
  6-3-1 First Operand for Memory Read (G-Format)
  6-3-2 First Operand for 8-Bit Immediate (E-Format)
  6-3-3 First Operand for Address Calculation (GA-Format)
  6-3-4 Other Two-Operand Instructions
  6-4 Short Branch
  6-5 Others
7. Addressing Mode
  7-1 P Bit
  7-2 Symbols Used in Format
  7-3 Register Direct
  7-4 Register Indirect
  7-5 Register Relative Indirect
  7-6 Immediate
  7-7 Absolute
  7-8 PC Relative Indirect
  7-9 Stack Pop
  7-10 Stack Push
  7-11 Register Relation Additional Mode
  7-12 PC Relative Additional Mode
  7-13 Absolute Additional Mode
  7-14 FP Relative Indirect
  7-15 SP Relative Indirect
  7-16 Format of Additional Mode
  7-17 Levels of Additional Mode Specification
8. Description Relating to Implementation
  8-1 Supporting Virtual Storage
  8-2 Rewrite of Instruction
9. EIT Processing
10. Structure of PSW
  10-1 Structure of PSS
  10-2 Structure of PSH
  10-3 Flag Change
11. Instruction Set Description Format
  11-1 Outline of Descriptive Format
  11-2 Instruction Bit Pattern and Assembler Syntax
  11-3 Field Name
  11-4 Operand Field Name
  11-5 Restrictions for Addressing Mode
  11-6 Notes for Description
12. Instruction Set of The Data Processor of the Present Invention
  12-1 Data Transfer Instructions
  12-2 Comparison and Test Instructions
  12-3 Arithmetic Instructions
  12-4 Logical Instructions
  12-5 Shift Instructions
  12-6 Bit Manipulation Instructions
  12-7 Fixed-Length Bit Field Operation Instructions
  12-8 Variable-Length Bit Field Operation Instructions
  12-9 BCD Arithmetic Instructions
  12-10 String Manipulation Instructions
  12-11 Queue Manipulation Instructions
  12-12 Control Transfer Instructions
  12-13 Multiprocessor Support Instructions
  12-14 Control Space, Address Space Operation Instructions
  12-15 OS-Support Instructions
  12-16 MMU Support Instructions
Appendix 1 Instruction Set Reference of The Data Processor of the Present Invention
Appendix 2 Assembler Syntax of The Data Processor of the Present Invention
Appendix 3 Memory Management System of The Data Processor of the Present Invention
Appendix 4 Flag Change of The Data Processor of the Present Invention
Appendix 5 Operation between Different Size Data Sets
Appendix 6 Subroutine Calls for High Level Languages
Appendix 7 Control Registers and Control Space
Appendix 8 CTXB of The Data Processor of the Present Invention
Appendix 9 EIT Processing of The Data Processor of the Present Invention
Appendix 10 Instruction Bit Pattern of The Data Processor of the Invention
Appendix 11 Detail Specification of High Level Instructions and Register Values in End State 1. Features of The Data Processor of the Present Invention (The Data Processor of the Present Invention)

1-1 Basic Design Concept

The data processor of the present invention is not RISC. The first target of The data processor of the present invention is to execute basic instructions at a high speed. In addition, high level instructions are added.

The data processor32 of the present invention, which is a 32-bit microprocessor, and data processor64 of the present invention, which is a 64-bit microprocessor, have been developed at the same time as a series. From the beginning, the expandability to 64-bit addressing has been considered.

The data processor of the present invention series has been developed along with the OS, so that I-TRON (industrial-TRON), which is a real time OS, and B-TRON (business-TRON), which is a work-station type OS, can be executed at a high speed. The data processor of the present invention meets data processor of the present invention <<L1R>> specification. In particular, it is focused on the high-speed processing in a real storage environment, i.e., virtual memory is not supported.

The data processor of the present invention is a microprocessor processor which will become the core of an ASIC LSI.

1-2 OS Oriented Architecture

Bit Map Operation Supporting Instructions:

Instructions which serve to move and operate the bit map necessary for B-TRON

Context Switch Instructions:

Instructions which serve to switch tasks for I-TRON at a high speed

Queue Operation Instructions:

Instructions which serve to operate the ready queue and wait queue for I-TRON

Memory Management Using 2-Level Ring Protection:

Extra 2-level ring is provided for future expansion.

1-3 Instruction Set Being Tuned

The instruction set is tuned so that frequently used instructions and addressing modes can be described in a short format:

Shortening the length of the instructions for operation between registers and of those for the literal operation.

1-4 Instruction Set for Compiler

Instruction set being orthogonalized 16 general-purpose registers used for various purposes such as storing data, addresses and index values.

Sophisticated addressing mode:

Additional mode allows index addition and indirect reference in any level.

Arithmetic operations between different size data sets: Different sizes can be specified for the source operand and destination operand.

Sophisticated jump instructions suitable for high level languages

2. The Data Processor32 of the Present Invention and The Data Processor64 of the Present Invention The data processor of the present invention has a 32-bit version, the data processor32 of the present invention, and a 64-bit version, the data processor64 of the present invention. From the beginning, expandability to the 64-bit version has been considered. The data processor of the present invention64 can handle 64-bit integers in addition to the data types handled by the data processor32 of the present invention.

The 32-bit mode/64-bit mode of the data processor64 of the present invention is switched in the following manner:

Data Size of Operand

The 32-bit mode/64-bit mode is selected using the size specification bit which exists in each instruction and operand. It is also possible to use an 8-bit mode or a 16-bit mode. The data size is selected from the four types from a two bit field.

The data processor32 of the present invention does not handle 64-bit data. Consequently, if the 64-bit data size is specified, the instruction in use is treated as an error.

Size of Pointer

Normally, the data processor32 of the present invention uses a 32-bit pointer, while the data processor64 of the present invention uses a 64-bit pointer. However, since the data processor64 of the present invention executes an object code for the data processor32 of the present invention, it provides the mode which changes the pointer size to 32 bits. Since this mode is specified in PSW, it is possible to use a 32-bit type program and 64-bit type program in a context (process or task).

As an extension bit for 64-bit addressing, a reserved bit named "P bit" is provided every operand which accesses the memory.

Due to the following reasons, the 32-bit size/64-bit size of the pointer is switched by the mode rather than every instruction.

It is difficult to use the pointers which differ in size, because they serve to identify the location. If there is a 64-bit size pointer together with a 32-bit size pointer, the location cannot be identified unless the size of all the pointers is 64 bits. Therefore, even if a 32-bit pointer and 64-bit pointer are switched in each instruction, the same specification is repeated in each context. Therefore, its efficiency is low. In such a situation, it is suitable to switch the bit size of the pointer by using the mode, rather than in each instruction.

When the bit size of the pointer is switched between 32 bits and 64 bits using the mode bit, a question about the compatibility between the data processor32 of the present invention and the data processor64 of the present invention may arise. However, in the structure where the bit size of the pointer defaults to 32 bits and the mode is changed whenever the 64-bit address is used, a program for the data processor32 of the present invention can be directly executed in the data processor64 of the present invention. Even if the bit size of the pointer is switched in each instruction rather than by the mode, OS will know whether the bit size of each context is 32 bits or 64 bits to set the stack and to determine whether the bit size of the system call parameters is 32 bits or 64 bits. A bit size of 32 bits or 64 bits is determined by observing the mode in PSW (which is stored in the stack).

3. Classification of The Data Processor Specifications of the Present Invention

The data processor of the present invention provides optional implementations to meet various needs such as expandability to the 64-bit version, serialization, adaptability to many applications, and so forth. To clarify the optional functions of the data processor of the present invention, the specifications of the data processor of the present invention are classified as follows.

<<L0>> Specification (Level 0)

The minimum specification which will satisfy as the data processor of the present invention requirements:

For example, the programming model viewed from the user program (most of ISP, general purpose registers and PSH), bit pattern in machine language, and so forth. Unless otherwise specified, the specification is <<L0>>.

<<L1>> Specification (Level 1)

This specification should usually be implemented, however, when a processor does not have special requirements the <<L1>> specification may not always need to be implemented. <<L1>> specification includes high level functional instructions such as string instructions, additional modes, queue operation instructions, and bit map instructions. The details of <<L1>> instructions will be described separately. <<L1R>> Specification (Level 1 Real)

The <<L1R>> specification excludes the instruction rerun function and MMU related functions from the <<L1>> specification. This <<L1R>> specification is used to effectively operate I-TRON and micro-BTRON with real memory. The instruction set for <<L1R>> is nearly the same as that for <<L1>>, so the compiler and user program can be used in common with <<L1>>. However, part of the instructions relating to MMU (MOVPA and so forth) and OS (JRNG and so forth) may not be supported.

<<L2>> Specification (Level 2)

This specification will be introduced in accordance with an increase of hardware amount in future:

<<L2>> includes the specification which serves to enhance the symmetry of instructions and are newly added instructions to <<L0>>, <<L1>> or <<L1R>> for high speed operation.

The former includes the "/B" option of the BVSCH instruction, complicated termination conditions of the string instruction, additional mode in indefinite stages, while the latter includes the INDEX instruction.

The <<L2>> specification is represented as "<<L2>>".

<<LX>> Specification (Extension)

This specification will be introduced for the expansion to the data processor of the present invention64. Although it has the same content as <<L2>>, it is treated as a different class because of the expandability to the data processor64 of the present invention.

The <<LX>> specification is represented as "<<LX>>".

<<LU>> Specification (Undefined)

The specification which will be introduced for the future extension:

At present, the specification details have not been determined.

<<LV>> Specification (Variable)

The specification which can be freely determined by each manufacturer:

The <<LV>> specification includes the pin assignment of the chip, specification relating to the level and performance of the pipeline, bit pattern assigned to each manufacturer, usage of control registers and so forth. The bit patterns of the instructions assigned to each manufacturer are represented with LV reserved in the bit pattern reference.

<<LA>> Specification (Alternative)

Although the <<LA>> specification describes the standard specification for the data processor of the present invention (or will describe it), if necessary, it may be changed. However, if the specification is changed, the compatibility may be lost. In other words, the <<LA>> specification does not assure the compatibility of the data processor of the present invention.

The <<LA>> specification mainly includes the as memory management system, control registers, and part of the privileged instructions. The data processor of the present invention aims at high speed processing in a real storage environment without an MMU. Thus, the data processor of the present invention does not support most of the <<LA>> specification relating to the memory management.

Figure 7:
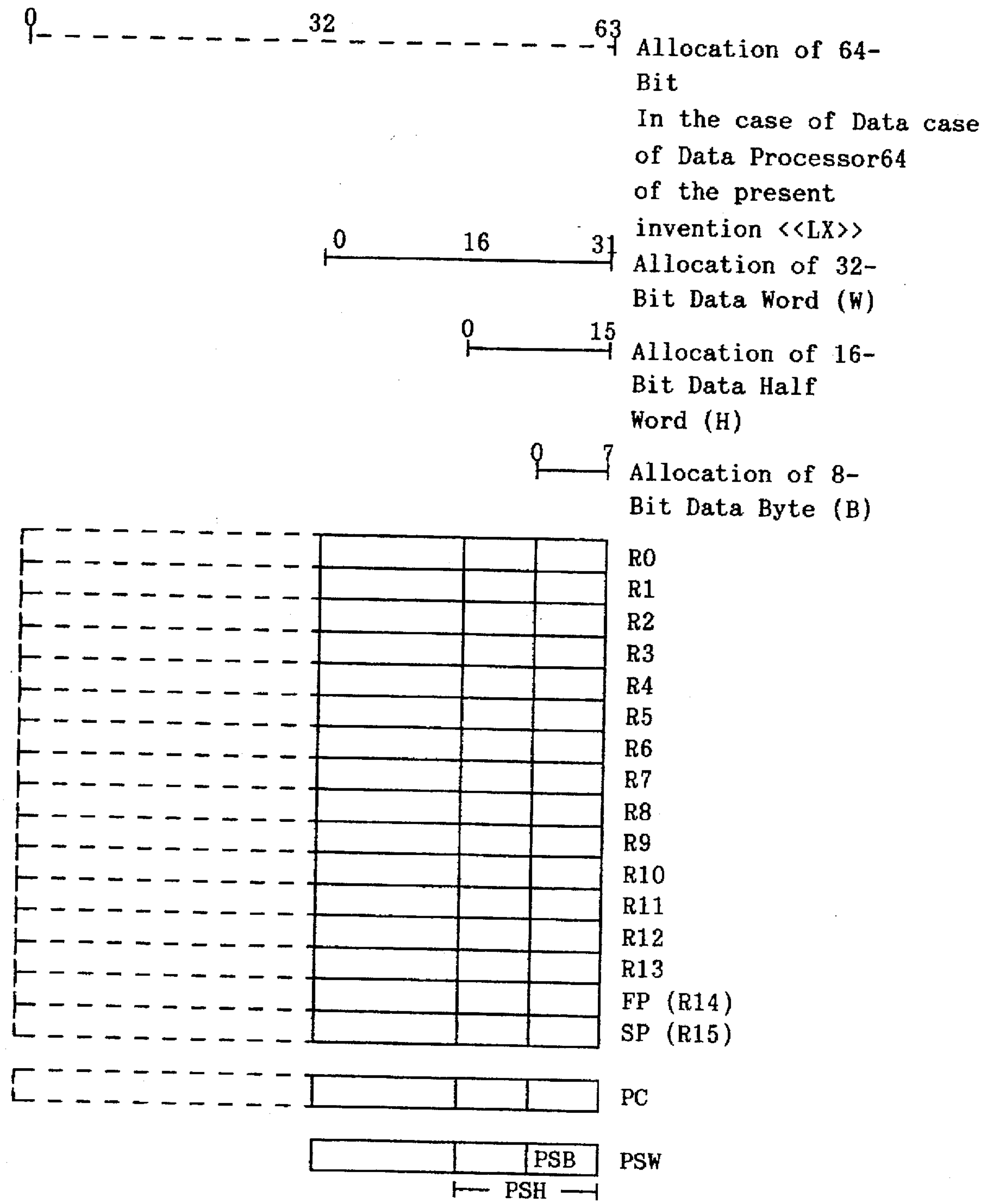
FIG. 7 is an illustration of a register set of the same.

4. Register Set: see FIG. 7.

The data processor32 of the present invention provides 16 32-bit general purpose registers, while the data processor64 of the present invention provides 16 64-bit general purpose registers.

The stack pointer (SP) and frame pointer (FP) are included in the general purpose registers. SP and FR are R15 and R14, respectively.

The program counter (PC) is not included in the general purpose registers.

The general purpose registers serve to store data and base addresses as well as serving as an index register which can be used for many purposes.

A processor status word (PSW) register is provided to store the status of the processor.

SP is switched according to the context (ring number or interrupt processing).

PSW consists of four bytes; the low-order first byte (processor status byte, or PSB) is used to indicate the status, the low-order second byte (processor status half word, or PSH, which is used along with PSB) is used to set the user mode, and the two high-order bytes are used to indicate the system status.

The data processor of the present invention is called a "big-endian" chip. It assigns 8-bit and 16-bit data in the register starting with the LSB side. Thus, an absolute bit number, irrespective of the data size, cannot be defined. A bit number can only defined along with the data size.

8-bit data in the register is assigned 0, 1, ..., 7 starting with the MSB side. In addition, 16-bit data in the register is assigned 0, 1, ..., 15 starting with the MSB side. 32-bit data in the register is assigned 0, 1, ..., 31 starting with the MSB side. Consequently, bit position 7 of 8-bit data, bit position 15 of 16-bit data, and bit position 31 of 32-bit data all correspond to the same bit.

In instructions where the register is used as the destination operand, when the data size of the register is 8 bits or 16 bits, the high-order bytes are not influenced. They are not changed to comply with the specification of the operation in the memory. To influence the high-order bits, use a different data size operation.

[EXAMPLE]

MOV #H'12345678, R0.W

MOV #H'aa, R0.B

When the above instructions are performed, R0 becomes H'123456aa.

When 8-bit data and 16-bit data are placed in a register, they are assigned from the LSB side. For example:

MOV.W #H'12345678,R0

MOV.B #H'aa,R0

MOV.W #R0,R1

The result of the above instructions is R1=H'123456aa.

When the same operation is performed for the memory with the following instructions,

MOV.W #H'12345678, @R0

MOV.B #H'aa, @R0

MOV.W @R0, R1 the 8-bit data and 16-bit data are assigned from the MSB side, resulting in R1=H'aa345678. Note that the result in the register differs from that in the memory.

5. Data Type

The data processor of the present invention uses "big-endian". In other words, when the byte address or bit number is assigned, the smaller number (address) is MSB (most significant bit/byte).

In the big-endian structure, the address of some data in the memory differs depending on whether it is treated as 8-bit data or 16(32)-bit data. For example, when

| address: | N | N+1 | N+2 | N+3 |
|---|---|---|---|---|
| data: | 0 | 0 | 0 | H'12 |

although the content of the address N as 32-bit data is H'00000012, (where H' represents hexadecimal notation), when the data of the same content is treated as 8-bit data, it is necessary to refer to the address N+3.

However, since 8-bit data and 16-bit data in the register are assigned from the LSB side, they can be treated as different size data. For example,

MOV #0, R0.W

MOV #H'12, R0.B

MOV R0.W, R1.W

The result becomes R1=H'00000012. (For the meaning of the instructions, see the related chapter.)

On the other hand, when the same operation is performed for the memory.

MOV #0, @R0.W

MOV #H'12, @R0.B

MOV @R0.W, R1.W cause the 8-bit data H'12 and MSB of the 32-bit data to be matched, resulting in R1=H'12000000.

The data types that the data processor of the present invention supports are as follows.

5-1 Bit

Figure 8:
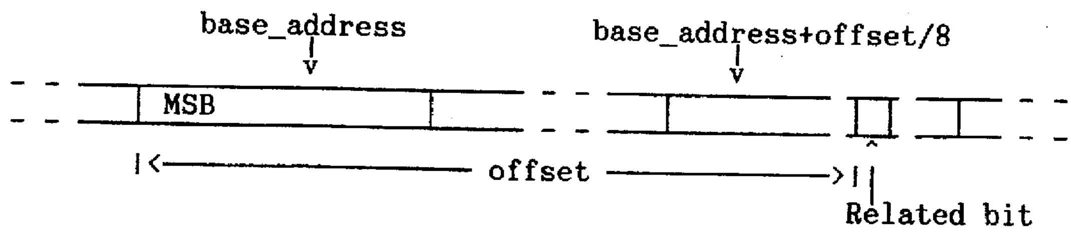
FIG. 8 is an illustration of data type of bits of the same.

The related bit is indicated in FIG. 8. In the case of the bit operation in the memory, offset can be freely used.

In the case of the bit operation in the register, offset can be limited in one register (the upper bits of the offset is ignored).

The bit is assigned using a set of base_address, size of base_address and offset.

When a bit in the memory is assigned, MSB of the memory address represented by base_address is the bit of offset=0. At the time, the assignment of the size of base_address does not influence the bit which is actually operated. For the bit operation instruction, to assign the access size for the read-modify-write operation for the memory, the size of base_address is assigned. However, the access size does not depend on the bit actually operated.

On the other hand, when a bit in the register is assigned, MSB in the data size which is assigned as the size of base_address is the bit of offset=0. The bit actually operated depends on the size of base_address.

5-2 Bit Field

Signed bit field

Figure 9:
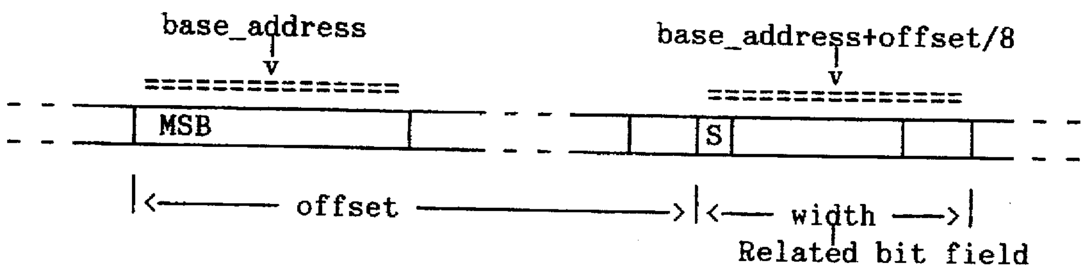
FIG. 9 is an illustration of data type as to a bit field of the same.

The related bit field is indicated in FIG. 9.

0<width≦32 (<<LX>>0<width≦64)

S: Signed bit

The distance between MSB of base_address and that of the related bit field (signed bit) is offset.

In the case of the bit field operation in the memory using the BF:G instruction, offset can be freely used.

In the case of the bit field operation in the memory using the BF:E instruction or the bit field operation in a register, the operation in the bit field which exceeds the one word (1-long word) of base_address is not assured.

Unsigned bit field

Figure 10:
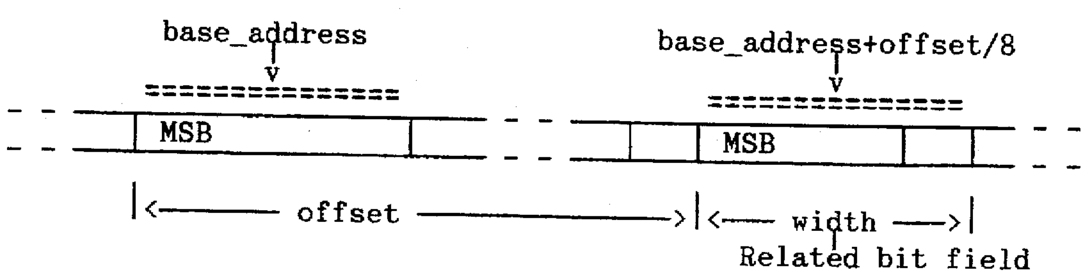
FIG. 10 is an illustration of data type as to the bit field of unsigned number of the same.

The related bit field is indicated in FIG. 10.

0<width≦32 (<<LX>>0<width≦64)

The distance between MSB of base_address and that of the related bit field is offset.

In the case of the bit field operation in the memory using the BF:G instruction, offset can be freely used.

In the case of the bit field operation in the memory using the BF:E instruction or the bit field operation in a register, the operation in the bit field which exceeds the one word (1-long word) of base_address is not assured.

Unfixed length bit field

Both offset and width can be freely assigned in the condition of width>0.

5-3 Integer

The data type of integer is indicated in FIG. 11.

5-4 Floating Point

The floating point operation is processed by a co-processor. The format of the floating point is specified by IEEE standard. The details of the floating point will be separately specified.

Single precision 32-bit floating point <<Co-processor>>

Double precision 64-bit floating point <<Co-processor>>

80-bit floating point <<Co-processor>>

5-5 Decimal

The addition, subtraction, multiplication and division in multiple length decimal notation are processed by a co-processor. The main processor of the data processor of the present invention only processes unsigned fixed-length PACKED format decimal numbers and signed PACKED format decimal numbers. However, all the instructions which process the signed PACKED format decimal numbers are <<L2>>.

The data type is shown in FIG. 12.

5-6 String

Figure 13:
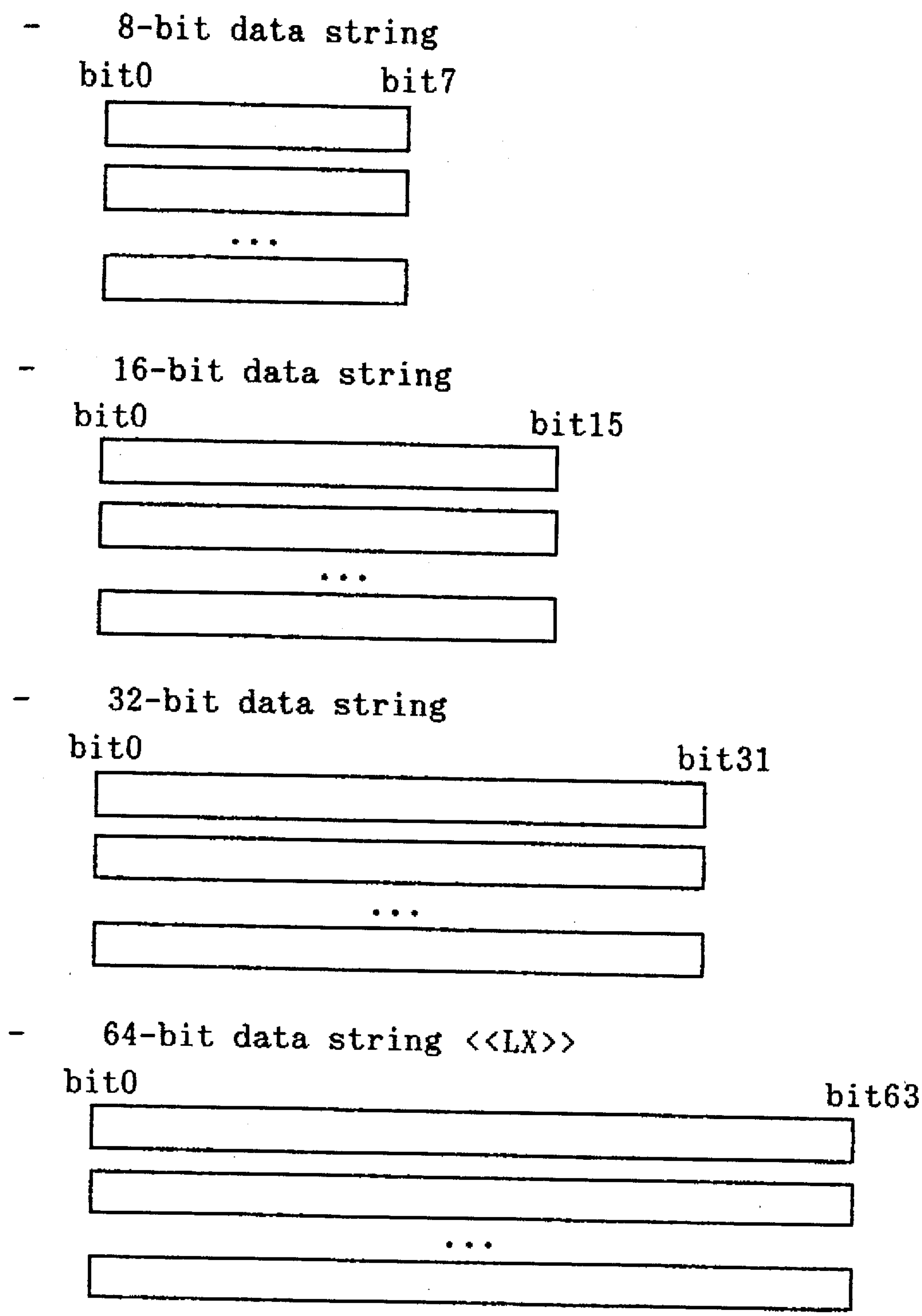
FIG. 13 is an illustration of data type as to a string of the same.

In the string case, the data type is shown in FIG. 13.

5-7 Queue

Figure 14:
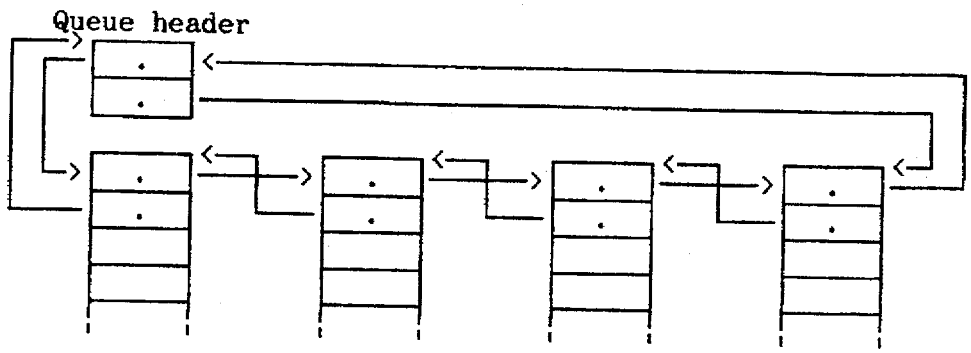
FIG. 14 is an illustration of data type as to a queue at the same.

The data type of linear list connected by double links is shown in FIG. 14.

6. Instruction Format

Any instruction is written in variable length every 16 bits. However, instructions whose length is odd bytes are not permissible.

Instructions with two operands are classified into two types: one is the general type, which has 4 bytes+extension portion and can use all the addressing modes (Ea), and another is the abbreviation type, which can use only frequently used instructions and the addressing mode (Sh). Depending on the instruction function and code size being required, the suitable type can be selected.

Although the instruction format of the data processor of the present invention can be classified into many types, we will roughly classify and describe the the types of the instruction format so that the user can easily understand it. For detail types of the instruction format, see Appendix 10.

These are the abbreviations used for the codes described with the format.

– Portion where an operation code is placed

Portion where a literal or immediate value is placed.

Ea General type addressing mode specified with 8 bits (General Format)

Sh Abbreviation type addressing mode specified with 6 bits (Short Format)

Rn Portion where the register is specified

The format is described assuming that the right side is LSB and the high-order address (big-endian).

Figure 15:
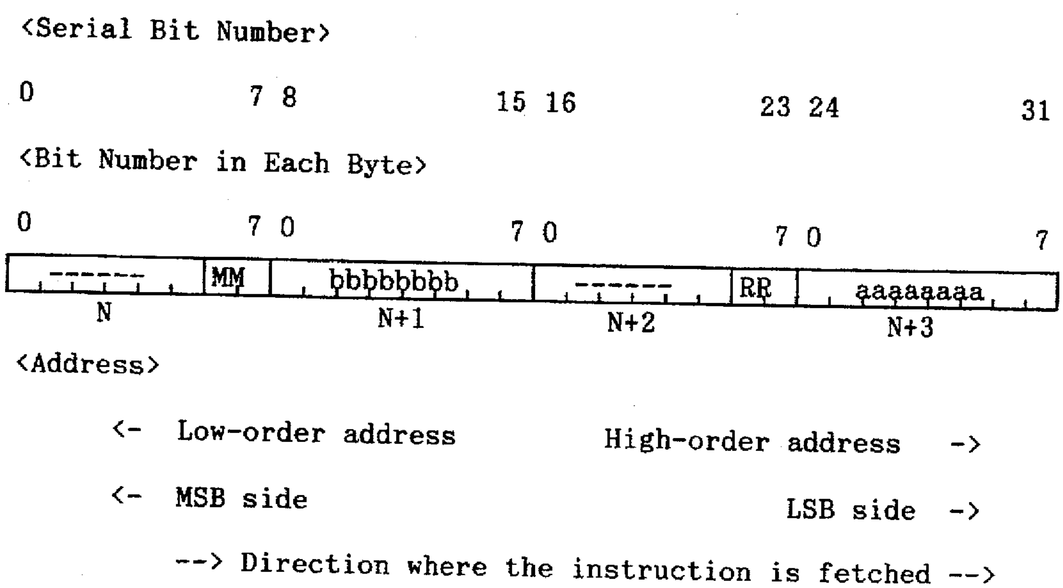
FIG. 15 is an illustration exemplary of description of the instruction format of the same.

Example of Format Description is shown in FIG. 15.

The instruction format can be determined by the two bytes of the address N and address N+1, because any instruction is fetched and decoded every 16 bits (2bytes).

In any format, the extension portion of Ea or Sh of each operand should be located just after the half word containing the basic portion of Ea or Sh. It has higher precedence than the immediate data which is implicitly specified by an instruction and than the extension portion of an instruction. Therefore, the operation code of an instruction consisting of 4 bytes or more may be separated by the extension portion of Ea.

If extra extension portion is added to the extension portion of Ea in the additional mode, the extra extension portion has higher precedence than the operation code of the next instruction.

For example, consider a 6-byte instruction which consists of the first half word containing Ea1, the second half word containing Ea2, and the third half word. Since the additional mode is used for Ea1, the extension portion for the addition mode is also added as well as the conventional extension portion. At the time, the real instruction bit pattern is assigned in the following order.

First half word of the instruction (including the basic portion of Ea1)

Extension portion of Ea1

Extension portion of Ea1 in the additional mode

Second half word of the instruction (including the basic portion of Ea2)

Extension portion of Ea2

Third half word of the instruction

When only 8 bits of the 16-bit field are used depending on the alignment, they are placed in the low order (to the higher address). It is applied when the #imm_data mode is specified to EaR and ShR while the operand size is 8 bits, when the operand size is 8 bits in the I-format, or when BRA:G, Bcc:G, BSR:G and SS=00.

For example, in the following case,

MOV:I.B #H'12, @RO

The first byte is an operation code of MOV:I.B.

The second byte is used to specify both part of the operation code and ShW(@RO).

The third byte is 0.

The fourth byte is H'12.

The bit pattern is represented in FIG. 16.

In this case, the upper (lower address) 8 bits of the 16-bit field should be filled with 0. When the upper 8 bits are not 0, the data is unstable depending on the implementation. In other words, in the case of I-Format or #imm_data mode, the operand depends on the implementation, while in the case of the instructions of BRA:G,Bcc:G and BSR:G, the destination to be jumped becomes unstable. In any case, they are not treated as EIT (exception).

6-1 Two Operand Short Format 6-1-1 Register and Memory (S-format,L-format):

an example is shown in FIG. 17.

There are two types of instructions in the L-format and S-format: one type is where the size can be specified (MOV:L, MOV:S, CMP:L) and another type is where the size cannot be specified (ADD:L, SUB:L).

For instructions where the size can be specified, the specification of the size by RR and the like is only applied to the memory and the size of the memory is fixed to 32 bits. If the size of the register differs from that of the memory while the size of source is smaller than another, the sign extension is performed. If the size of the source is smaller than another, the high-order byte is truncated and overflow check is performed.

On the other hand, for the instructions of ADD:L and SUB:L where the size cannot be specified, both the operand sizes of the register and memory are fixed to 32 bits.

Since there is a rule for the data processor of the present invention where data in the register is usually treated as a 32-bit signed integer, the size of the register is fixed to 32 bits. This rule is also applied to the bit field instructions and instructions with advanced functions where an operand is placed in the register as well as the instructions in the L-format and S-format.

6-1-2 Between Registers (R-Format):

an example is shown in FIG. 18.

Figure 19:
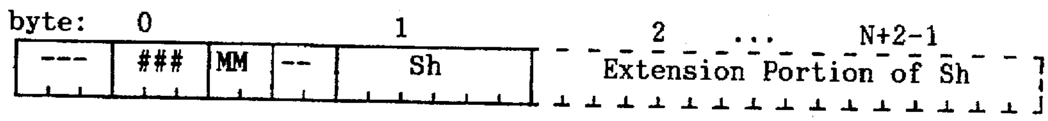

6-1-3 Between Literal and Memory (Q-Format):

an example is shown in FIG. 19.

Figure 20:
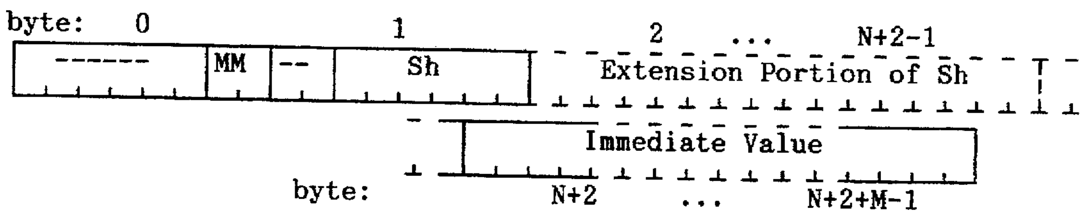

6-1-4 Between Immediate and Memory (I-Format):

an example is shown in FIG. 20.

The size of the immediate value in the I-format is 8, 16, 32 and 64 bits which are in common with the size of the destination operand. The zero extension and sign extension are not performed.

6-2 One Operand General Type (G1-Format): an example is shown in FIG. 21.

6-3 Two Operand General Type

Instructions which have two operands in the general type addressing mode and which are specified with 8 bits. Occasionally, the total number of operands becomes 3.

6-3-1 First Operand for Memory Read (G-Format):

an example is shown in FIG. 22.

Figure 23:
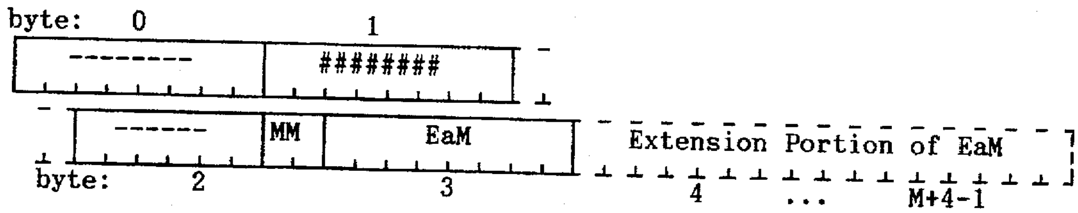

6-3-2 First Operand for 8-Bit Immediate (E-Format):

an example is shown in FIG. 23.

Although the function of this format is similar to that between the immediate and memory (I-format), their concepts remarkably differ. Since the E-format is a derivation of the 2-operand general type (G-format), the size of the source operand is fixed to 8 bits and the size of the destination operand is selected from 8/16/32/64 bits. In other words, supposing the different size operation, for scr consisting of 8 bits, the zero extension or sign extension is performed in accordance with the size of dest.

On the other hand, in the I-format, the immediate pattern which is frequently used in MOV and CMP is changed to the short type and the size of the source is the same as that of the destination.

Figure 24:
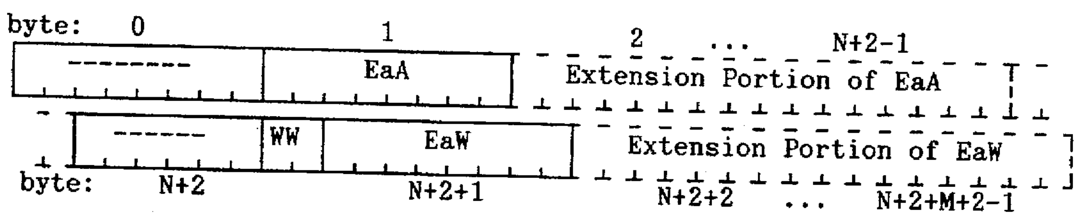

6-3-3 First Operand for Address Calculation (GA-Format):

an example is shown in FIG. 24.

Figure 25:
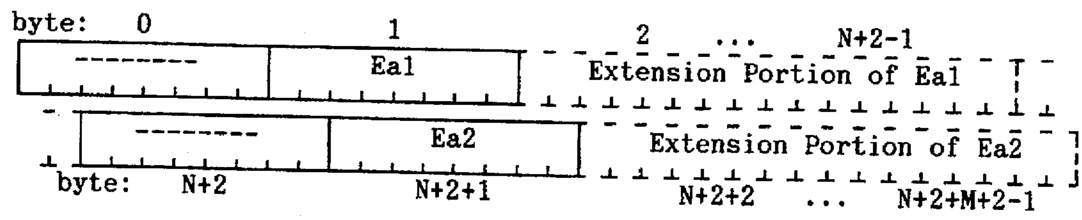

6-3-4 Other Two-Operand Instructions:

an example is shown in FIG. 25.

Figure 26:

6-4 Short Branch:

an example is shown in FIG. 26.

Figure 27:
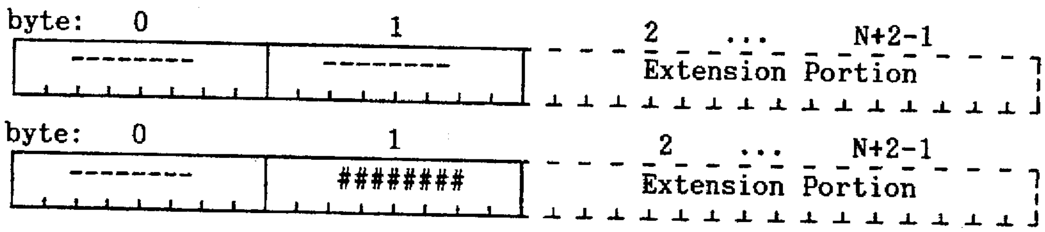

6-5 Others:

except above described, there are examples shown in FIG. 27.

7. Addressing Mode

The data processor of the present invention provides two addressing modes: the short format (Sh), which assigns the address for the memory and registers with a 6 bits field and the general format (Ea), which specifies with an 8 bits field.

If an addressing mode which has not been defined or an improper combination of addressing modes is specified, a reserved instruction exception (RIE) occurs like an execution of the undefined instruction and it causes the exception processing to start. It may occur when the destination is in the immediate mode or when the immediate mode is used for an instruction which calculates the address.

7-1 P Bit

The data processor of the present invention can assign a one-bit optional function assignment bit for accessing the memory. This bit is named the P bit. The P bit is used to add some additional capability whenever the memory is accessed.

The P bit is independently assigned whenever the memory is accessed. Therefore, in case of the register indirect addressing mode, absolute addressing mode, and the like, one P bit is assigned in accordance with the operand. In case of the multiple level indirect addressing mode where the additional mode is used, the P bit should be used for the number of times corresponding to the number of levels. The P bit is expected for tag checking, logical space switching, and switching between 32-bit addressing and 64-bit addressing for future expansion. Therefore, in the current specification, the P bit is reserved.

In the description of the P bit, the position of the P bit is represented with 'P'. However, it should always be "0".

If the P bit is not "0", a reserved instruction exception (RIE) will occur.

The function of the P bit should conform to the <<LU>> specification.

7-2 Symbols Used in Format

Rn: Assign the register.

P: P bit (always "0")

mem[EA]: Content of the memory at the address represented with EA

The portion surrounded by dotted lines represents the extension portion.

7-3 Register Direct

Assembler syntax: Rn

Operand: Rn

Figure 28:
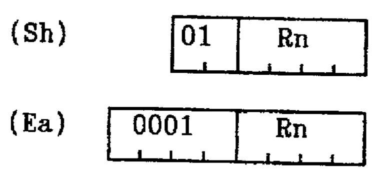
FIG. 28 to 39 show the format of the addressing mode of the same.

Format: shown in FIG. 28.

7-4 Register Indirect

Assembler syntax: @Rn

Operand: mem[Rn]

Figure 29:
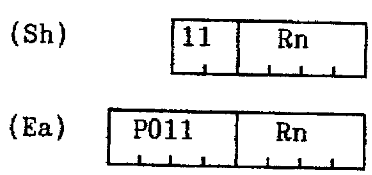

Format: shown in FIG. 29.

7-5 Register Relative Indirect

Assembler syntax:

@(disp,Rn)

@(disp:16,Rn)

@(disp:32,Rn)

Operand: mem[disp+Rn]

Figure 30:
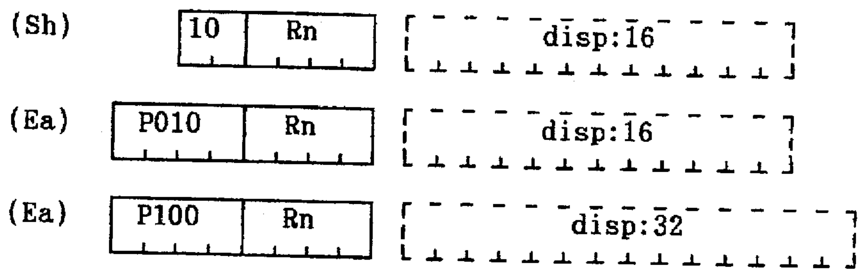

Format: shown in FIG. 30.

disp should be treated as a signed operand.

7-6 Immediate

Assembler syntax: #imm_data

Operand: imm_data

Figure 31:
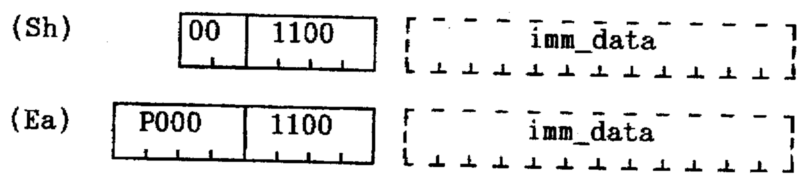

Format: shown in FIG. 31. The size of imm_data is assigned in an instruction as the operand size.

7-7 Absolute

Assembler syntax:

@abs

@abs:16

@abs:32

@abs:64 <<LX>>

Operand: mem[abs]

Figure 32:
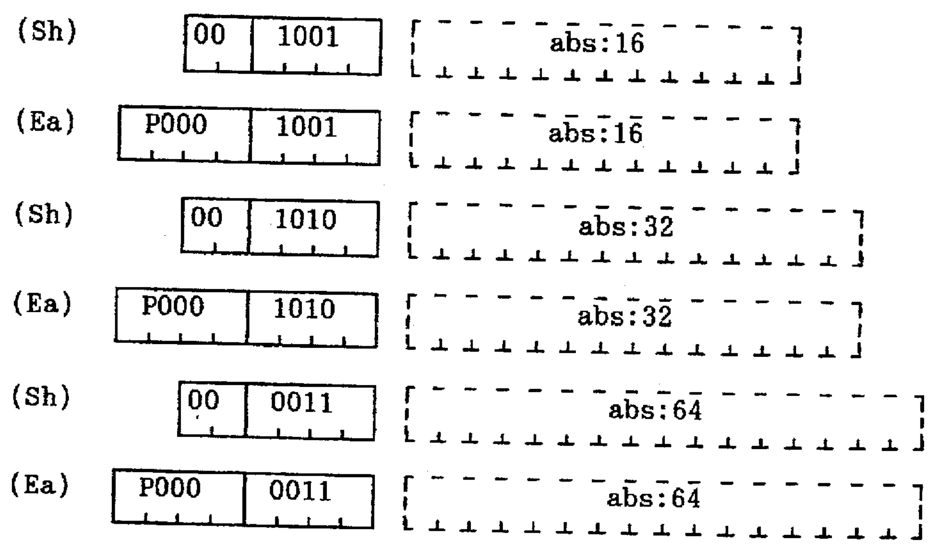

Format: shown in FIG. 32.

In the 32-bit addressing mode, the address specified is extended to the 32-bit signed address. On the other hand, in the 64-bit addressing mode, the address assigned by abs:16, abs:32 is extended to the 64-bit signed address.

7-8 PC Relative Indirect

Assembler syntax:

@(disp,PC)

@(disp:16,PC)

@(disp:32,PC)

Operand: mem[disp+PC]

Figure 33:
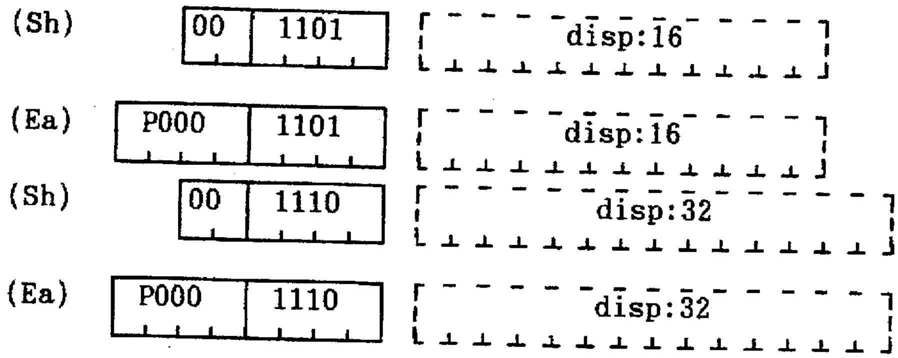

Format: shown in FIG. 33.

The PC value being referenced in the PC relative indirect mode is the beginning address of the instruction which includes the operand. Thus, an endless loop can be produced by the following instruction.

JMP @(0,PC)

When the PC value in the additional mode is referenced, the beginning address of the instruction is used as the reference value of the PC relative indirect mode.

7-9 Stack Pop

Assembler syntax: @SP+

Operand: mem[SP]

SP is incremented.

Figure 34:
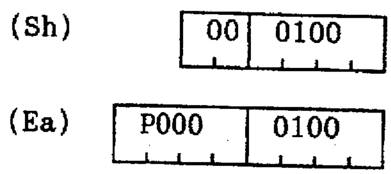

Format: shown in FIG. 34

In the @SP+ mode, SP is incremented in accordance with the operand size. For example, when the data processor64 of the present invention processes 64-bit data, SP is updated by +8. It is also possible to specify @SP+ for an operand which is the size of B and H, so that SP is updated for+1 and+2, respectively. However, it causes the stack alignment to be disordered, resulting in a slower processing speed.

If the @SP+ mode is not used for the operand, a reserved instruction exception (RIE) occurs. Actually, a reserved instruction exception occurs when @SP+ is used for the write operand and read-modify-write operand.

7-10 Stack Push

Assembler syntax: @-SP

Operand: SP is decremented.

mem[SP]

Figure 35:
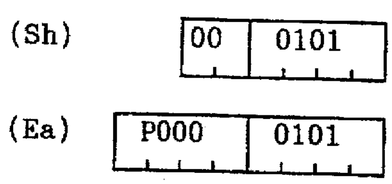

Format: shown in FIG. 35

In the @-SP mode, SP is decremented in accordance with the operand size. For example, when the data processor of the present invention64 processes 64-bit data, SP is updated by −8. It is also possible to specify @-SP for an operand which is the size of B and H, so that SP is updated for −1 and −2, respectively. However, it causes the stack alignment to be disordered, resulting in a slower processing speed.

If the @-SP mode is not used for the operand, a reserved instruction exception (RIE) occurs. Actually, a reserved instruction exception occurs when @-SP is used for the read operand and read-modify-write operand.

7-11 Register Relation Additional Mode

Operand: Rn==>tmp

Additional mode processing

Figure 36:
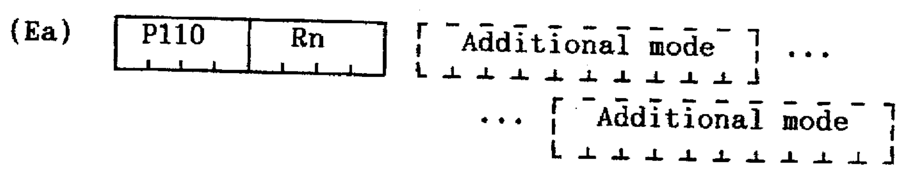

Format: shown in FIG. 36.

For details of the additional mode, see section 7-16.

7-12 PC Relative Additional Mode

Operand: PC==>tmp

Additional mode processing

Figure 37:
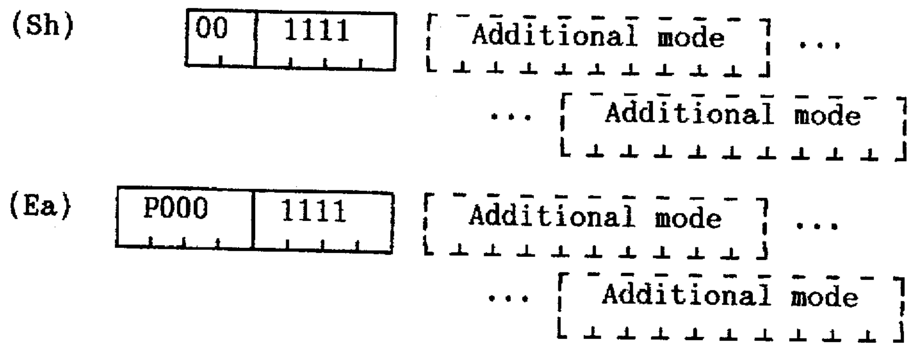

Format: shown in FIG. 37.

7-13 Absolute Additional Mode

Operand: 0==>tmp

Additional mode processing

Figure 38:
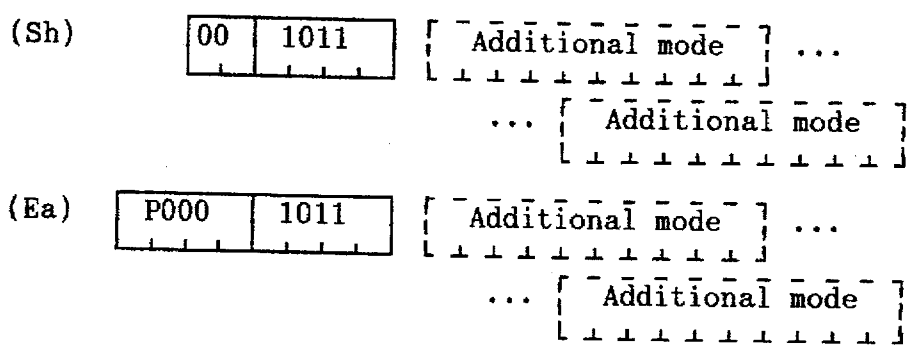

Format: shown in FIG. 38.

7-14 FP Relative Indirect

Assembler Syntax: @(disp,FP)

@(disp:4,FP) Operand: mem[d4*4+FP]

(disp=d4*4)

Figure 39:
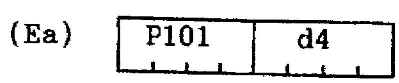

Format: shown in FIG. 39.

The prescaled displacement, d4, is treated as a signed operand. It should be used by multiplying by 4 irrespective of the size. Thus, the memory address of the multiples of 4 in the range from (FP−8*4) to (FP+7*4) can be referenced. When the address is described in the assembler representation, the value multiplied by 4 should be described for displacement. This addressing mode is <<L2>>. Since the data processor of the present invention does not provide the FP relative indirect mode, when this mode is specified, a reserved instruction exception (RIE> occurs.

Since this addressing mode cannot be used in the short format, for example,

MOV @(disp,FP),R1 becomes 4 bytes as follows.

MOV:G.W @(disp:4,FP),R1

MOV:L.W @(disp:16,FP),R1

Thus, the code is ambiguously selected, so that the mode is <<L2>>. This mode is expected to effectively use the short format when the rate of usage of the abbreviations is decreased in the data processor64 of the present invention.

Figure 40:
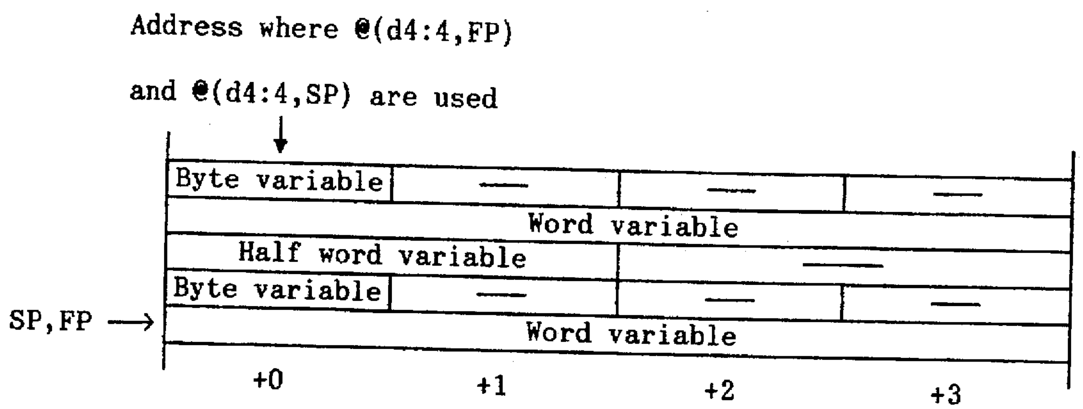
FIG. 40 is an illustration exemplary of arrangement of local variations of the same.

In the modes of @(d4:4,FP) and @(d4:4,SP), d4 is used by multiplying by 4 irrespective of the operand size. Therefore, if the modes of @(d4:4,FP) and @(d4:4,SP) are used with variables of 8 bits, 16 bits and 32 bits lengths in the stack frame at the same time, it is necessary to left justify each variable to the word boundary, since the data processor of the present invention is big-endian. Example of allocation of local variables for using modes of @(d4:4,FP) and @(d4:4,SP) is shown in FIG. 40.

7-15 SP Relative Indirect

Assembler syntax: @(disp,SP)

@(disp:4,SP)

Operand: mem[d4*4+SP]

(disp=d4*4)

Figure 41:
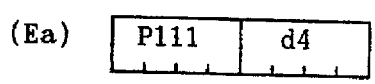
FIG. 41 to 44 show the format of the addressing mode of the same.

Format: shown in FIG. 41.

The prescaled displacement, d4, is treated as a signed operand. It should be used by multiplying by 4 irrespective of the size. However, the operation where d4 is negative is not described. Thus, the memory address of the multiples of 4 in the range from (SP) to (SP+7*4) can be referenced. When the address is described in the assembler syntax, the value multiplied by 4 should be described for displacement. This addressing mode is <<L2>>. Since the data processor of the present invention does not provide the FP relative indirect mode, when this mode is specified, a reserved instruction exception (RIE) occurs.

Like @(disp:4,FP), this mode is expected to effectively use the short format when the rate of usage of the abbreviations is decreased in the data processor64 of the present invention.

7-16 Format of Additional Mode

Complicated addressing can basically be separated into a combination of operations of addition and indirect reference. Therefore, when assigning the operations of addition and indirect reference as primitives of addressing, and combining them freely, any complicated addressing mode can be obtained.

The additional mode will be used for such a purpose. A complicated addressing mode is especially useful for data reference between modules and processing systems for artificial intelligent languages.

However, when the addressing mode is widely used for the data processor of the present invention, the processing speed may decrease. Thus, care should be taken to use the memory indirect addressing mode.

The additional mode is specified every 16 bits and repeated for the number of times required.

With only one occurrence of the additional mode, the following operations are performed.

Addition of constant (displacement)

Scalling (x1, x2, x4 and x8) and addition of index register

Memory indirect reference

With the additional mode in n levels, the indirect reference of up to (N+1) levels can be performed.

Processes of basic additional modes:

tmp+Rx*scale+d4*4==>tmp when I=0 and D=0 tmp+Rx*scale+displx==>tmp when I=0 and D=1 mem[tmp+Rx*scale+d4*4==>tmp when I=1 and D=0 mem[tmp+Rx*scale+dispx]==>tmp when I=1 and D=1

Figure 42:
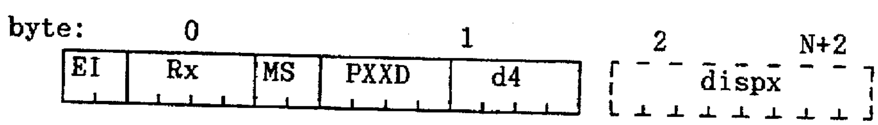

Basic format: shown in FIG. 42.

EI=00 Absence of indirect reference; continuation of additional mode tmp+disp+Rx*Scale==>tmp EI=01 Indirect reference; continuation of additional mode mem[tmp+disp+Rx*Scale]==>tmp EI=10 Indirect reference; completion of additional mode mem[tmp+disp+Rx*Scale]>operand EI=11 Dual indirect reference; completion of additional mode mem[mem[tmp+disp+Rx*Scale]]>operand M=0 <Rx> is used as an index.

M=1 Special index

<Rx>=0: The indexes are not added. (Rx=0)

<Rx>=1: PC is used as the index Rx. (Rx=PC)

<Rx>=2 or more: reserved

D=0 4-bit d4 in the additional mode is multiplied by 4, treated as disp, and then added. d4 should always be multiplied by 4 and used irrespective of the operand size.

D=1 dispx (16/32/64 bits) specified by the extension portion in the additional mode is treated as disp and then added. The size of the extension portion is specified by the d4 field.

d4=0001: dispx is 16 bits.

d4=0010: dispx is 32 bits.

d4=0011: dispx is 64 bits. <<LX>>

XX Scale of index (scale=1/2/4/8)

S Size of index register

S=0 <Rx> is extended to signed 32 bits.

S=1 <Rx> is 64 bits <<LX>>

P P bit <<LU>>

The P bit is placed in each level of the additional mode.

The P bit can be specified independent from all the memory references.

Whether the indirect reference is performed or not can be selected.

The level which does not perform the indirect reference is used for addition of the base register and index register with multiple levels (such as mem[R1+R2+R3]). It may be used for the relocation base register, etc. by the user.

Size of index register

Since 32-bit data will be frequently used even with a 64-bit address, 32/64-bit address size can be switched in each level of the additional mode.

@(disp:64,Rn) of the register relative indirect and the addressing mode of the memory indirect can be obtained by using the additional mode.

If the scaling of x2, x4 and x8 for PC is performed, the temporary value (tmp) after the processing of the level is completed, the value, depends on the hardware implementation. The effective address obtained by the additional mode cannot be predicted. However, an exception does not occur.

Figure 43:
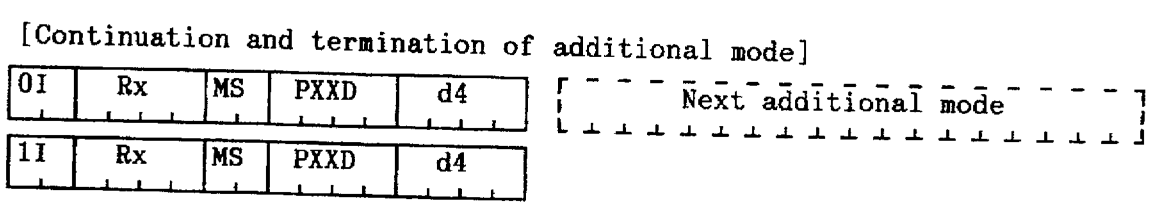
Figure 44:
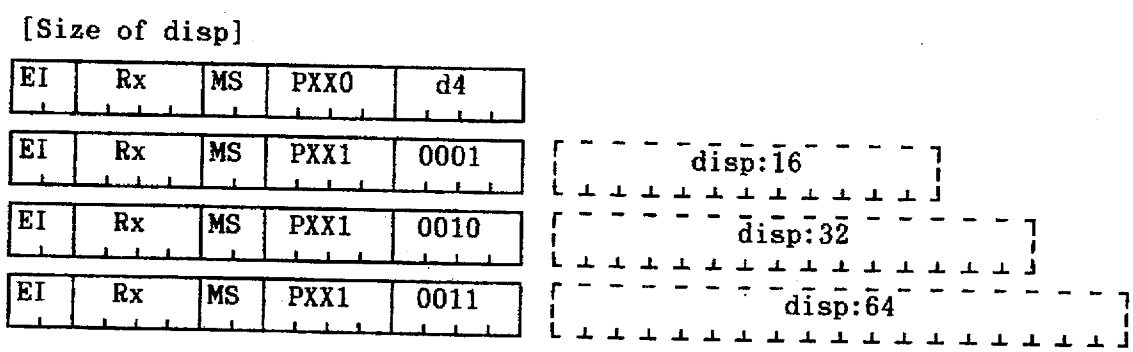

Variation of format: shown in FIG. 43, 44, respectively.

7-17 Levels of Additional Mode Specification

The additional mode is used for normal indirect reference, as a table reference for external variables for modular object codes, and execution of AI oriented instructions. In particular, the applications of AI may use the indirect reference in many levels. However, the normal applications use it in 4 or less levels.

When the additional mode in any number of levels can be used, the classification by the number of levels in the compiler is not required, thus reducing the load of the compiler. Even if the frequency of the indirect reference in many levels is very small, the compiler should always generate correct codes.

However, from the point of view of implementation, if executing interrupts are accepted in any number of levels, the load on the compiler becomes heavy. Therefore, it is necessary to restrict the number of levels.

The versions of the data processor of the present invention which can use the additional mode with up to only 4 levels (4 basic formats of the additional mode) is defined as the <<L1>> specification. Versions that can use any number of levels are defined as the <<L2>> specification. Even in the <<Li>> specification, it is possible to perform the memory indirect reference up to 5 times. For the additional mode which exceeds 5 levels (5 half words), a reserved instruction exception (RIE) occurs. However, in the format where any number of levels can be used, the number of levels will be extended.

The data processor of the present invention can use the additional mode in any number of levels. However, when the memory indirect addressing is frequently used along with the additional mode, the processing speed may decrease. Especially, if the additional mode with many levels is used in the second operand, an interrupt cannot be accepted during the processing of the additional mode.

Since the data processor32 of the present invention will use floating point, the scaling of 'x8' is implemented. The scaling of 'x8' is the <<L1>> specification rather than the <<LX>> specification.

8. Description Relating to Implementation 8-1 Supporting Virtual Storage

While the data processor of the present invention has provisions for virtual memory, they are not currentry implemented on the data processor of the present invention.

To provide the virtual storage, it is necessary to properly recover page faults which occur during execution of instructions. The data processor of the present invention generally uses the instruction re-execution system.

If a page fault occurs in the instruction re-execution system, the processor resets all the registers and activates the page-in process routine. Thus, even if the execution of instructions are resumed from the beginning, inconsistency does not occur.

In the instruction re-execution system, normally, it is not necessary to hold the status flags during execution.

Therefore, the system is comparatively simple. When re-executing instructions, the data processor of the present invention does not use the instructions and addressing mode (such as auto-increment) which may cause side effects however, since the re-execution after the page fault may cause an unnecessary memory access. Therefore, care should be taken when OS operates the I/O device.

For example, if the first operand of a normal instruction serves to read the I/O device and the second operand causes a page fault by the re-executing the instruction, the I/O device is read again. Therefore, inconsistency may occur depending on the type of I/O device. Thus, when an I/O device causes a side effect is read and accessed, take care not to cause a page fault by another operand. Practically, it is possible that another operand is always a register or residual page.

If the source operand and destination operand are partially overlapped, inconsistency will occur when a simple execution is performed.

EXAMPLE

Moving 2-byte data for 1 byte.

Figure 45:
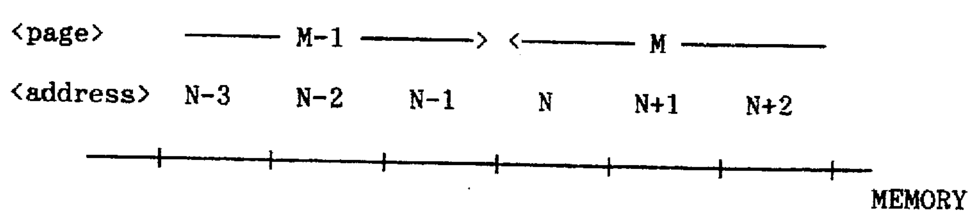
FIG. 45 is an illustration of cautioun at the instruction MOV.

The destination is located at the page boundary: shown in FIG. 45.

In FIG. 45, if the MOV.H instruction causes [N–2:N–1] to be moved to [N–1:N], the write cycle of the destination is separated with two sessions. First, the data of [N–2] is written to [N–1] and the former [N–1] is written to [N]. If page M–1 has a fault while the data is written to [N–1], after the page-in operation, [N–2:N–1]- - <[N–1:N] is retried. Since the content of N–1 has been rewritten, inconsistency will occur.

For an instruction such as LDM which serves to transfer data in multiple sessions, if the source and destination are overlapped, care should be taken that inconsistency does not occur during re-execution of the instruction.

For example, in the following case,

LDM @R6,(R6–R10)

when R8 is read after loading R6 and R7, if a page fault occurs, R6 has been rewritten upon re-execution. Thus, if the instruction is re-executed from the beginning, inconsistency will occur. To avoid that, it is necessary to take the following countermeasures.

Check that a page fault has not occurred at the beginning of the instruction.

Save the temporary value which represents the address which is transferred during page fault to the stack (a kind of instruction continuous execution system).

Store the initial value of R6 and restore it if a page fault occurs.

These countermeasures should be applied to STM and other instructions.

To re-execute instructions without inconsistency, LDM, STM and LDCTX prohibit the additional mode. On the other hand, ENTER, EXIT and JRNG prohibit all the addressing modes which access the memory.

8-2 Rewrite of Instruction

Generally, a computer which has the stored program system can rewrite the instruction program to be executed by itself through a program. However, when an instruction is rewritten in the current high performance processors which provide prefetch and instruction cache functions and the operation must be assured, the load on the hardware is remarkably increased. The necessity of this function is not high and it is not suitable for software training. Therefore, the data processor of the present invention normally prohibits the instruction codes to be rewritten by software. If the instruction code is rewritten, its operation will not be assured.

In some special applications, instruction codes are produced by a user program and they are executed. Therefore, when some conditions are met, it is necessary to assure the execution operation of instruction codes being rewritten.

To do that, the data processor of the present invention has PIB instruction which informs the processor that instruction codes have been rewritten. By executing this instruction, the execution operation of the instruction codes being rewritten are assured. This instruction serves to inform the processor that the instruction codes to be executed have been probably rewritten (after the processor has been reset or the former PIB instruction has been executed). This instruction will serve to purge the pipeline, instruction queue and instruction cache.

9. EIT Processing

EIT stands for the initial letters of Exception (exceptional interrupt), Interrupt (external interrupt) and Trap (internal interrupt).

In the data processor of the present invention, a process which is asynchronous with the flow of the execution of the program is termed an EIT process.

The EIT processes are generally called exception and interrupt processes. The EIT process contains the following types.

Internal interrupt (call between rings, trap)

It is intentionally generated by the programmer when issuing a system call. It relates to the context which is executed at the time.

Exceptional interrupt (exception)

It occurs if some error is generated during execution of a conventional instruction. It relates to the context being executed at the time.

External interrupt (interrupt)

It occurs when a signal is generated by external hardware. It does not relate to the context being executed at the time. For details of the EIT processing, see Appendix 9.

10. Structure of PSW

Figure 46:
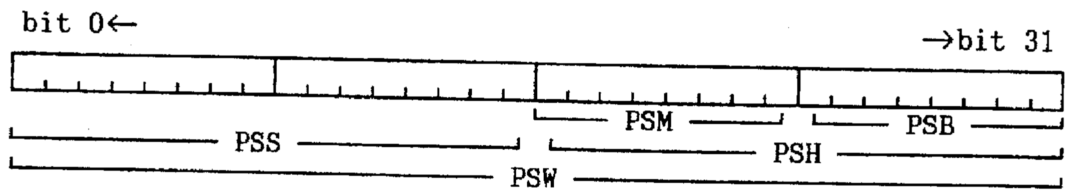
FIG. 46 shows the format of PSW.

PSW (Processor Status Word) of the data processor of the present invention consists of 32 bits. The lower 16 bits of PSW (PSH—Processor Status Halfword) is used for the user program. It can be freely operated by the user process. On the other hand, the upper 16 bits of PSW (PSS—Processor Status halfword for System) is used for the system. Therefore, it cannot be operated by the user program (ring 3). The upper 8 bits of PSH serves to set various modes and are named PSM (Processor Status byte for Mode). In addition, the lower 8 bits of the PSH serves to display the operation result, which is named PSB (Processor Status Byte): shown in FIG. 46.

Figure 47:
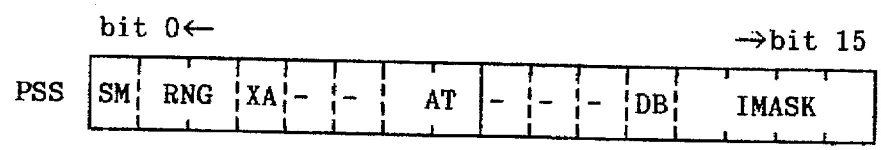
FIG. 47 shows the format of PSS.

10-1 Structure of PSS: shown in FIG. 47.

Reserved to '0'.

If '1' is written, a reserved functional exception (RFE) occurs.

SM,RNG=000 Uses the external interrupt stack pointer (SPI) at ring 0.

SM,RNG=001 reserved

SM,RNG=010 reserved

SM,RNG=011 reserved

SM,RNG=100 Uses the stack pointer for ring 0 (SP0) at ring 0.

SM,RNG=101 Reserved (for ring 1)

SM,RNG=110 Reserved (for ring 2)

SM,RNG=111 Uses the stack pointer for ring 3 (SP3) at ring 3. SM,RNG is <<LA>>. (SM: Stack Mode, RNG: Ring)

XA=0 32-bit context

XA=1 64-bit context <<LX>>

AT=00 Absence of address conversion

AT=01 Presence of address conversion (the data processor of the present invention standard MMU specification)

AT=10 Absence of address conversion, memory protection by address (<<L1R>>)

AT=11 reserved (AT: Address Translation mode)

DB=0 Context which is not currently debugged

DB=1 Context which is currently debugged

IMASK Interrupt priority which inhibits an external interrupt and DI (Delayed Interrupt).

IMASK=0000 Accepts only NMI (unmaskable interrupt of priority 0)

IMASK=0001 Masked up to priority 1 (consequently, accepts NMI only).

IMASK=0010 Masked up to priority 2. represented by IMASK.

IMASK=1110 Masked up to priority 14.

IMASK=1111 Not masked

The data processor of the present invention controls the memory by 4 levels of ring protection as the <<LA>> specification. (See Appendix.) The data processor of the present invention controls the memory by 2 levels of ring protection. The RNG field represents which rings exist in the current processor. Even if the ring protection is not performed, this field is used to switch between the supervisor mode and the user mode.

The XA bit of the data processor of the present invention32 is reserved. If '1' is written to the bit, an exception occurs.

Since it is difficult to standardize the debug information such as trace in detail, it is stored in a different control register (DCR—Debug Control Register). However, only the information which represents the debugging condition is stored in PSW as DB.

The lower priority external interrupts of the data processor of the present invention are represented with higher numbers. The priority of the external interrupts consist of seven levels from 0 to 7. The priority 0 is the unmaskable interrupt (NMI).

Since it is difficult to completely standardize the control information of the cache and MMU, it is separated from PSW.

Since AT (address translation specified field) is placed in PSW, it is possible to convert the address any context, change the memory protection method, and temporarily stop the address translation only during execution of the EIT process handler.

When AT (address translation bit) in PSW is changed from '00' to '01' by starting LDC, REIT, LDCTX or EIT; TLB and cache purge are automatically conducted, so that TLB and matching with the logical cache is assured. In addition, when AT is changed from '01' to '00', the matching of the cache (logical cache and physical cache) is assured.

Figure 48:
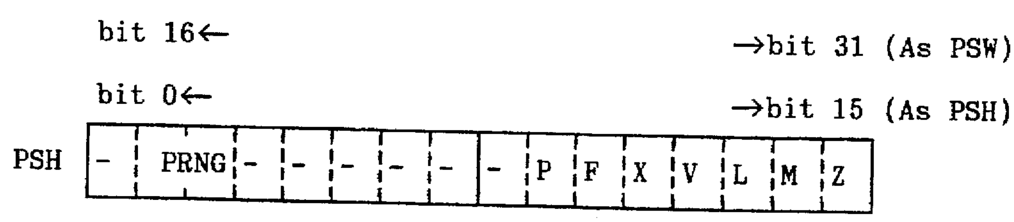
FIG. 48 shows the format of PSH.

10-2 Structure of PSH: shown in FIG. 48.

Reserved to '0'

If '1' is written, a reserved functional exception (RFE) occurs.

PRNG Ring number just before entering this ring. PRNG is <<LA>>.

P P-bit Error Flag <<LU>>

Set if an error relating to the P-bit function occurs. Otherwise, it is cleared.

Reserved to '0' at present.

F General Flag

Used to detect the cause of the termination of a high level instruction.

X Extension Flag

The carry-out of a multiple length operation.

V Overflow Flag

Indicates an overflow occurrence.

L Lower Flag

Indicates the contents of the first operand is smaller than those of the other operand in a comparison instruction for both signed with signed comparison and unsigned with unsigned comparison.

M MSB Flag

Indicates the MSB of the operation result is '1'.

Z Zero Flag

Indicates the operation result is '0'.

The "ring just before entering" in the PRNG field represents a "ring which is placed at one outer location" or a "ring which requests a service to the ring". Thus, when EIT occurs, PRNG changes as follows:

PSW<RNG>==>PSW<PRNG>.

When EIT occurs in the return mode with the REIT instruction, PRNG changes as follows:

stack==>PSW (including RNG and PRNG).

In the return mode, it is necessary to return from the stack rather than copying RNG. The relationship RNG≦PRNG is always satisfied. PRNG is referenced by the ACS command.

Actual ring transition uses the information of RNG. In instruction flow from compared to the conditional jump, processors other than the data processor of the present invention usually distinguish signed data and unsigned data by using a conditional jump instruction rather than a comparison instruction.

For example, unsigned integers are compared using the following instructions:

CMP src1,src2

BLTS next Branch Lower Than (Signed)

Signed integers are compared using the following instructions:

CMP src1,src2

BLTU next Branch Lower Than (Unsigned)

Thus, in this type of flag implementation, information to distinguish the size of numbers and the presence or absence of signs is required.

In the data processor of the present invention, however, the distinction between the presence or absence of a sign is made by using different compare instructions such as the CMP and CMPU instructions. On the other hand, the conditional jump instruction can be used regardless of whether the contents are signed or unsigned. Thus, the flag structure is simplified.

The carry flag used in conventional processors has two functions: one serves to compare the size of unsigned integers and another serves to represent a carry-out in multiple length operations. However, for the latter function, since the data processor of the present invention uses X_flag, the carry flag is used only for comparing the size of integers. Thus, the carry flag of the data processor of the present invention is defined as that which represents the relationship of size and is named L_flag (Lower Flag). In the case of an unsigned operation, this flag works as conventional carry flag. In the case of a signed operation, it represents the true size since it includes the overflow, unlike conventional carry flags.

F_flag (general flag), which represents the termination condition of a string instruction and queue instruction, and P_flag (P-bit error flag) which represents an error of the P bit are provided. P_flag is reserved to '0' in the specification at present.

Although conventional processors use a carry flag which can contain the dropped bit from a shift instruction, the data processor of the present invention has L_flag rather than a carry flag, so that the dropped bit is placed in X_flag.

10-3 Flag Change

All the addition, subtraction, comparison and logical operation instructions are 2-operand instructions which have the following format:

dest .op. src==>dest

If the size of dest differs from that of src, the smaller size operand is sign-extended in accordance with the larger size operand (ADDU, SUBU and CMPU are zero-extended), calculated, the result of the operation is converted into the size of dest, and then stored in dest.

In the case of CMP, CMPU, SUB and SUBU, L_flag indicates that the size of the first operand of the previous operation is smaller. For CMPU and SUBU, which are for unsigned operations, L_flag functions like the carry (borrow) flag of the convention processors. In a signed operation, L_flag represents the true size because it includes the overflow, rather than just copying the M_flag. In the ADD instruction, L_flag indicates whether the result is negative. It also represents true positive and negative as well as overflow rather than copying the M_flag. In the ADDU, since the result always becomes positive, L_flag is set to '0'.

V_flag indicates the result of the operation cannot be shown by the size being specified. In other words, when the result of an operation cannot be represented by the signed integer of the size of dest (unsigned integer for ADDU and SUBU), V_flag is set. In the CMP and CMPU instructions, the status of the V_flag is unchanged.

X_flag is used to maintain the status of a carry-out in multiple length operations. The flag status is changed regardless of whether the operation is signed or unsigned. Although it functions similar to the carry flag of conventional processors, only the addition, subtraction and shift instructions change X_flag.

In the CMP, SUB, CMPU and SUBU instructions, the status of L_flag is changed in a similar manner. While SUB, SUBU and SUBX instructions cause X_flag to change, CMP and CMPU instructions do not cause it to changed.

In the case of MOV, MOVU, ADD, ADDU, ADDX, SUB, SUBU and SUBX instructions, the statuses of M_flag and Z_flag are changed depending on the value when the operation result is converted in the size of dest. Thus, if the size of dest is smaller than that of src, even if the operation result is not 0, Z_flag may be set. On the other hand, in the CMP and CMPU instructions, the status of Z_flag is changed depending on the value of the operation result regardless of the size of dest.

EXAMPLE

If @dest.B=1

| | | |
|---|---|---|
| SUB | #H'101.W,@dest.B ==> | Although the operation result 1 - H'101 is not 0, since dest becomes 0, Z_flag is set. |
| CMP | #H'101.W,@dest.B ==> | Since the operation result 1 - H'101 is not 0, Z_flag is cleared. |

In ADDX and SUBX instructions, the flag status is irregularly changed to some extent, so that it can be used for both the unsigned integer extended operation and signed integer extended operation. In this case, although it does not completely match the mnemonic of the conditional jump instruction, since the extended operation is not frequently used, this irregularity should be permissible.

L_flag Represents the relationship of size (SUBX) and positive and negative (ADDX) for signed operation.

V_flag Represents an overflow for signed operation.

X_flag In ADDX, represents a carry from the size of dest for the dest+src+X_flag operation. In SUBX, it represents a borrow from the size of dest for the dest−src−X_flag operation. However, if the size of src is smaller than that of dest, src is sign-extended. In SUBX, if the size of src is the same as that of dest, X_flag consequently represents the result of the comparison as unsigned data.

When an operation between different size operands is performed with ADDX and SUBX, the smaller size operand is sign-extended. However, whether the value which is sign-extended is operated on as a signed value or an unsigned value depends on the status of the flag.

In the MOV instruction, MOVU instruction and logical operation instructions, the statuses of X_flag and L_flag are not changed.

In the logical operation instructions, the status of V_flag is not changed.

The details of status flag changes are described in each instructions description. Special attention should be given descriptions marked with an asterisk.

11. Instruction Set Description Format 11-1 Outline of Descriptive Format

MNEMONIC:

Represents the name (mnemonic) of the instruction.

OPERATION:

Summarizes the function of the instruction.

OPTIONS:

Represents the types of options available for the instruction. The options of the instruction serve to change the sub-functions of the instruction and are described as '/xxx' in the assembler syntax.

INSTRUCTION FORMAT AND ASSEMBLER SYNTAX:

Represents the bit pattern, assembler syntax, size, and type of the instruction. In the data processor of the present invention, one instruction mnemonic may have multiple instruction formats such as the general format and short format, each of which is used depending on the addressing mode and size. This paragraph describes the addressing mode and size used in each instruction format.

STATUS FLAGS AFFECTED:

Shows how the status flags (PSB) are changed after the instruction is executed.

DESCRIPTION:

Describes the functions of the instruction. For details of the assembler mnemonics used in the description, see the Appendix at the end of the manual.

11-2 Instruction Bit Pattern and Assembler Syntax

The "INSTRUCTION FORMAT AND ASSEMBLER SYNTAX" portion is comprised of the mnemonic by format, operand name, operand field name and instruction bit pattern.

Figure 49:
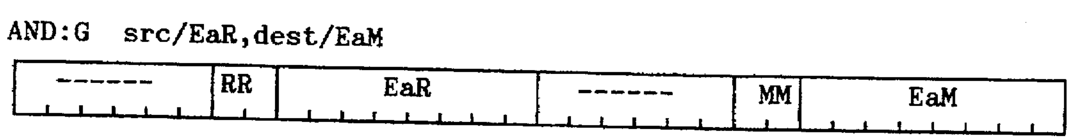
FIG. 49 shows the format of description example of the instruction set, FIG. 50-(*a*) shows the format of instruction MOV, FIG. 50-(*b*) is an illustration of status flags thereof.

Example of Description is shown in FIG. 49.

AND:G ... Mnemonic-every-Format

Represents the mnemonic-every-format of the instruction bit pattern to be described (see Appendix).

src,dest ... Operand Name

Variable which is used to describe the function of the instruction. This variable is referenced by the "OPERATION" and "DESCRIPTION". The order of the operands described in this description is that of the assembler.

Ear,EaM ... Operand Field Name

Represents the relationship of the bit pattern, available operand size, available addressing mode, memory access method, and other restricted information. The letters which represent operand field names relate to their meanings so that various meanings can be simply represented.

Portion surrounded by lines ... INSTRUCTION BIT PATTERN

The "INSTRUCTION BIT PATTERN" represents the operand field, size specified field position, and operation code of the instruction.

The bit represented by '*' is the don't care bit. 0 and 1 of this bit do not effect the instruction decoding.

The bits represented by '–', '+', '=' and '#' are currently not used to distinguish the instruction function and operand. However, the portions of '–' and '=' and those of '+' and '#' of the user program should be filled with 0 and 1, respectively. If the bit of '–' is not 0 or if the bit of '+' is not 1, a reserved instruction exception (RIE) occurs.

If the bit of '=' is not 0 or if the bit of '#' is not 1, it is ignored In other words, as hardware, all '*', '=' and '#' have the same meaning. However, for future extension, it is necessary to instruct in the users manual that the bits '=' and '#" should be filled with 0 and 1, respectively.

11-3 Field Name

The INSTRUCTION BIT PATTERN contains the option field and size specification field as well as the instruction bit pattern. The data processor of the present invention uses the following option and size specification field names.

Size Specification Field Names

RR Specifies the size of the operand which performs read accessing.

WW Specifies the size of the operand which performs write accessing.

MM Specifies the size of the operand which performs read-modify-write accessing.

BB Specifies the memory accessing size for bit operation instructions.

XX Specifies the general size except for the above items (mainly used for specifying the register size).

SS Specifies the general size except for the above items (mainly used for specifying the displacement size, CMP second operand, string instruction which implicitly specifies an operand, and the MOVA:U instruction which implicitly specifies a stack).

Be sure to repeat the same upper case letter. However, if only 32 bits and 64 bits can be specified, use only one of the two letter.

Option Field Names

The option bit names should mainly be specified by using lower case letters (except the items concerning P bit). The optional field names are as shown bellow. In any case, the assembler defaults to the first description item (eg. 0, or 00.. as option value).

cccc Specifies the conditions for Bcc and TRAP/cc.

eeee Specifies the termination conditions of a string instruction and QSCH instruction.

P.Q .. Specifies the P bit (Q .. is used to specify the termination condition for the QSCH instruction).

b/F=0,/B=1 (BSCH, BVSCH, BVMAP, BVCPY, SCMP, SMOV, QSCH)

r/F=0,/R=1 (SSCH)

c/N=0,/S=1 (CHK) .. 'c' for CHK and change index value d/0=0,/1=1 (BSCH, BVSCH) .. 'd' for data m/NM=0,/MR=1 (QSCH) ... 'm' for mask p/AS=0,/SS=1 (PTLB, PSTLB, LDATE) .. 'p' for PTLB and specific space ttt /PT=000,/ST=001,/AT=110,/reserved=010 to 101,111 (PSTLB, LDATE,STATE)

xx/LS=00,/CS=01 reserved=10,11 (LDCTX,STCTX)

The field names which are not listed above represent the operand field names. If possible, the letters should not have multiple meanings.

11-4 Operand Field Name

The letters which represent the operand field names have the meanings indicated below. Only these field names can indicate various information such as available addressing mode, operand size, and access method.

Basic Addressing Modes

Ea Uses the addressing mode in 8-bit general format.

Sh Uses the addressing mode in 6-bit short format.

Literal

#i Immediate

#d Displacement

Rg Register

Ll Register list (for LDM)

Ls Register list (for STM)

Ln Register list (for ENTER)

Lx Register list (for EXITD)

Access Method

Part of basic addressing modes defaults to the following access method. In this case, the letter which represents the access method is not assigned.

#,#i,#d Reads from the instruction space.

Ls,Ln Reads from a register.

Ll,Lx Writes to a register.

For other basic addressing modes, the access method is represented by using the following letters.

R Read

W Write

M Read-modify-write

To abbreviate the field name, RgR, RgW, and RgM are described as RR, RW, and RM, respectively. (BF and CSI instructions)

A Only performs address calculation.

f Determines the memory address which is actually operated in with combination with the bit offset. (Suffix of R and M)
Example: Bit manipulation instruction fq Although the bit offset is used, it does not exceed the byte boundary. The address to be accessed is determined without referencing the offset. (Suffix of R and M)
Example: bit operation instruction in short format bf Determines the memory address and range actually operated with a combination of the bit offset and bit field width. (Suffix of R and M)
Example: Fixed length bit field operation instructions q Performs complicated accessing by the queue instruction. (Suffix of other access methods)
Example: QINS and QDEL instructions i Performs accessing by bus interlock. (Suffix of M)

% Performs accessing of special space such as control space and physical space. (Suffix of R, W, and M)

d Operates two data segments (double). (Suffix of R)
Example: CHK instruction m Operates multiple data segments (multiples). (Suffix of R and W)
Example: LDM and STM instructions Restrictions of Addressing Modes Once the basic addressing mode and access method have been determined, the restrictions for the addressing mode are automatically determined (such as inhibiting the immediate mode for EaW). However, if other restrictions besides the above exist, the following letters should be placed after the instruction.

!I Inhibits the immediate mode.
Example: Second operand of CMP instruction

!M Inhibits the addressing mode for the memory.
Example: Local operand of ENTER:G instruction !A Inhibits the additional mode.
Example: ctxaddr operand of LDCTX instruction !S Inhibits the stack pop and stack push modes.
Example: dest operand of QDEL instruction Size Specification The size should be regularly specified by the following fields:

When the access method is R, the size is specified by the RR field.

When the access method is W, the size is specified by the WW field.

When the access method is M, the size is specified by the MM field.

When the access method is R!I, R!M, or R2, the size is specified by the SS field.

When the access method is *f, the size is specified by the BB field. However, it means the access size for the memory operation.

When the access method is A, the size is not specified.

If there is an exception for specifying the address, add the letters listed below to distinguish it. Normally, numbers and lower case letters represent the fixed size, while upper case letters represent the variable size. For example, 'w' represents a 32-bit (word) fixed size, while 'W' represents the size specified by the WW field.

w The operand size is always 32 bits.
Example: MUL:R instruction h The operand size is always 16 bits.
Example: WAIT instruction b The operand size is always 8 bits.
Example: src of MOV:E instruction S8 The size of the operand (displacement) is specified by the SS field. However, when SS=00 (i.e. when 8 bits are specified), this operand specification field is used. Otherwise, the operand is specified by the extension portion and this field is ignored (it should be set to 0).
Example: src of BF:I instruction S The size of the operand (displacement) is specified by the SS field.
Example: BRA:G instruction R The operand size is specified by the RR field together with the size of another operand.
Example: CMP:I instruction W The operand size is specified by the WW field together with the size of another operand.
Example: MOV:I instruction The operand size is specified by the MM field together with the size of another operand.
Example: Instruction of I format L Since the bit pattern which specifies 8 or 16 bits has not been assigned as the operand size, only the operand for 32 or 64 bits can be specified. The size is specified by the R, M, W, and B fields rather than the RR, WW, MM, and BB fields.

P Since the pointer is used, the size is not specified in the instruction. The size is actually specified by the P bit or the mode (XA bit in PSW).
Example: QINS and QDEL instructions X The operand size is specified by the XX field.
Example: xreg of ACB and SCB instructions Xw The operand size is specified by the X field together with another operand. This is used for specifying the width of the BF instruction.

Xs The operand size is specified by the X field together with another operand. This is used for specifying src for the BF instruction.

Xd The operand size is specified by the X field together with another operand. This is used for specifying dest for the BF instruction.

C The operand size is specified by the RR field together with another operand. This is used for specifying the value to be compared in the CSI instruction.

3 3-bit literal 4 4-bit literal
Example: TRAPA instruction 6 8-bit literal 8 8-bit displacement Example: BRA: 8 instruction 16 16-bit displacement Example: MOVA:R instruction When the operand size (which is implicitly specified by a high level instruction such as a string manipulation instruction) is specified, SS is used as the field name. In the free-length bit field instruction, X is also used.

Others

Z Indicates 0 of the bit pattern of the literal accords with 0 of the operand value. N is the bit number in the literal.

| | |
|---|---|
| 0 . . . 000 | 0 |
| 0 . . . 001 | 1 |
| 0 . . . 010 | 2 |
| | . . . |
| 1 . . . 110 | 2^N-2 |
| 1 . . . 111 | 2^N-1 |

Example: offset of BTST:Q n Indicates 0 of the bit pattern of the literal accords with 2^N of the operand value. N is the bit number in the literal.

| | |
|---|---|
| 0 . . . 000 | 2^N |
| 0 . . . 001 | 1 |
| 0 . . . 010 | 2 |
| | . . . |
| 1 . . . 110 | 2^N-2 |
| 1 . . . 111 | 2^N-1 |

Example: src of MOV:Q c Indicates the bit pattern of the literal shows the 2's complement. N is the bit number in the literal.

| | |
|---|---|
| 0 . . . 000 | –2^N |
| 0 . . . 001 | –(2^N-1) |
| 0 . . . 010 | –(2^N-2) |
| . . . | |
| 1 . . . 110 | –2 |
| 1 . . . 111 | –1 |

Example: Shift count of shift-right operation in SHA:C and SHL:C 1,2.. If there are two or more operands which are accessed in the same manner in one instruction, distinguish them.

The restrictions for size which specifically relate to the instruction functions are given in each instruction rather than the operand field and size specification field names. They contain the specification of a size which is not 8 bits for shift count and logical operation in different size operands.

11-5 Restriction for Addressing Mode

The following operand field names have restrictions in the available addressing modes.

EaR,ShR .... @-SP cannot be used.

EaW,ShW .... #imm_data and @SP+ cannot used.

EaM,ShM .... #imm_data, @-SP, and @SP+ cannot be used.

EaA .... @SP+, @-SP, Rn, and #imm_data cannot be used.

The restrictions concerning the addressing mode are given in "DESCRIPTION' of each instruction.

11-6 Notes for Description

For the stack operation instructions, TOS represents the top position of the stack. (↑) TOS represents the pop from the stack, while (↓) TOS represents the push to the stack.

The basic 2-operand instructions (MOV, MOVU, ADD, ADDU, ADDX, SUB, SUBU, SUBX, AND, OR, XOR, CMP and CMPU) describe their operations in the following manner:

The sizes of dest (src2) and src(src1) (number of bits) and the value, where src(src1),dest(src2) is broken down into individual bits are represented as d and s and D0,D1, ...,Dd-1,S0,S1, ...,Ss-1, respectively. Thus, dest(src2)=[D0.D1 ... Dd-2.Dd-1]

src(src1)=[S0.S1 ... Ss–2.Ss–1]

[.. ] represent the binary notation and '.' represents a delimiter between each digit. The value which is set to dest as the result of the operation is represented as follows:

dest .op. src=result=[R0.R1 ... Rd-2.Rd-1]

Except for MOV, MOVU, CMP and CMPU, the result is set to dest. In addition, if s>d, only the lower bits of the operation result are set to dest. The value before the upper bits of the operation result are removed is represented as follows:

result=[F0.F1 ... Fs–2.Fs–1]

The number of bits of R and F are d and s, respectively.

When the bit string [..] is treated as a signed binary number, the value of the bit string is represented by S[..]. If it is treated as an unsigned binary number, the value that the bit string shows is represented as U[..]. On the other hand, if the bit string is treated as a signed packed type decimal number, the value that the bit string shows is represented as SD[..]. If it is treated as an unsigned packed type decimal number, the value that the bit string shows is represented as UD[..]. In addition, '' and '^' represent the logical negation and power, respectively.

Likewise, "DESCRIPTION" of the fixed length bit field instruction gives the description of detail operation in the following notation.

bitfield=[Bo.Bo+1 ... Bo+w–2.Bo+w–1]

[Sn.Sn+1 ... Sm-2.Sm-1] is abbreviated as [Sn to m-1].

S0.S1 ... Sd-2.Sd-1]=[S0 to s-1] may be simply represented as [S].

This rule is applicable to [D], [R], [B], and [F].

12. Instruction Set of the Data Processor of the Present Invention 12-1 Data Transfer Instructions

MNEMONIC:

MOV src,dest

OPERATION:

src==>dest

Move and sign-extend data.

OPTIONS:

None

INSTRUCTION FORMAT AND ASSEMBLER SYNTAX: shown in FIG. 50(*a*)

STATUS FLAGS AFFECTED: shown in FIG. 50(*b*).

DESCRIPTION:

Move data from the source operand (src) to the destination operand (dest).

If the size of the source operand is smaller than that of the destination operand, the size of the source operand is sign-extended.

If the value of the source operand cannot be represented as a signed integer in the size of the destination operand because the size of the destination operand is smaller than that of the source operand, V_flag is set.

Although MOV:Z is a clear instruction, since its operation and status flags change are the same as those of the MOV instruction, it is treated as one of the short formats of MOV.

Although the MOV, ADD, SUB and CMP instructions serve to perform operations with sign, the literal contains only the positive range. This is because the literal which can be used by MOV:Q, ADD:Q, SUB:Q and CMP:Q is in the range from 1 to 8 (operand field name: #3n). If src of the MOV and MOVU instruction is an immediate value, the relationship between the immediate value and the available format is as follows.

| | | |
|---|---|---|
| [MOV] | :Z | src = 0 |
| | :Q | 1 ≦ src ≦ 8 |
| | :E | −128 ≦ src ≦ 127 |
| | :I | src is any number. |
| | :G | src is any number. |
| [MOVU] | :E | 0 ≦ src ≦ 255 |
| | :G | src is any number. |

It is also applicable to the ADD, SUB and CMP instructions.
(If d≧s)

```
                        [S0.      S1 . . . . Ss–2.Ss–1] ==>
  [S0.S0 . . . . . . . . S0.  S0.      S1 . . . . Ss–2.Ss–1] ==>
          ↑
  Sign-extended for d-s bits
  [R0.R1 . . . . . Rd–s+1.Rd–s.Rd–s+1 . . . . Rd–2.Rd–1] (Set to dest)
(If d<s)
  [S0.S1 . . . . . Ss–d–1.Ss–d.Ss–d+1 . . . . Ss–2.Ss–1] ==>
                        [Ss–d.Ss–d+ 1 . . . . Ss–2.Ss–1] ==>
          ↑
  s-d bits (S0.S1 . . . . . Ss–d–1) are truncated.
                        [  R0.     R1 . . . . Rd–2.Rd-1] (set to dest)
```

| | |
|---|---|
| M_flag | R0 |
| Z_flag | [R0 to d–1] = 0 |
| V_flag* | S[S] < −2^(d–1) .or. S[S] ≧ +2^(d–1)<br>In other words, if d≧s, they are cleared.<br>If d<s, when,<br>S0 = S1 = . . . . . = Ss–d–1 = Ss–d(=R0)<br>they are cleared. Otherwise, the flag is set. |

PROGRAM EXCEPTION:

Reserved instruction exceptions

When RR='11'

When WW='11'

When EaR or ShR is @-SP

When EaW or ShW is #imm_data or @SP+

MNEMONIC:

MOVU src,dest

OPERATION:

zex(src)==>dest

Move and zero-extend data.

OPTIONS:

None

INSTRUCTION FORMAT AND ASSEMBLER SYNTAX: shown in FIG. 51.

STATUS FLAGS AFFECTED: shown in FIG. 52.

DESCRIPTION:

Move the contents from the source operand src to the destination operand dest.

If the size of the source operand is smaller than that of the destination operand, the data of the source operand is zero-extended.

If the value of the source operand cannot be represented as an unsigned integer with the size of the destination operand because the size of the destination operand is smaller than that of the source operand, V_flag is set.

(If d≧s)

```
                        [S0.      S1 . . . . Ss–2.Ss–1] ==>
  [  0. 0 . . . . . . . . . . 0.  S0.      S1 . . . . Ss–2.Ss–1] ==>
  Zero-extended for d-s bits
```

-continued

```
  [R0.R1 . . . . . Rd–s+1.Rd–s.Rd–s+1 . . . . Rd–2.Rd–1] (Set to dest)
(If d<s)
  [S0.S1 . . . . . Ss–d–1.Ss–d.Ss–d+1 . . . . Ss–2.Ss–1] ==>
                        [Ss–d.Ss–d+1 . . . . Ss–2.Ss–1] ==>
  s-d bits (S0.S1 . . . . . Ss-d-1) are truncated.
                        [  R0.     R1 . . . . Rd-2.Rd-1]
                        (set to dest)
```

| | |
|---|---|
| M_flag | R0 |
| Z_flag | [R0 to d–1]= 0 |
| V_flag* | U[S] ≧ +2^d<br>In other words, if d≧s, they are cleared.<br>If d<s, when,<br>S0 = S1 = . . . . . = Ss–d–1 = 0<br>it is cleared, Otherwise,it is set. |

PROGRAM EXCEPTION:

Reserved instruction exceptions

When RR='11'

When WW='11'

When EaR is @-SP

When EaW is #imm_data or @SP+

MNEMONIC:

PUSH src

OPERATION:

push to stack

OPTIONS:

None

INSTRUCTION FORMAT AND ASSEMBLER SYNTAX: shown in FIG. 53.

STATUS FLAGS AFFECTED: shown in FIG. 54.

DESCRIPTION:

Push the contents of the source operand src to the stack.

Although this instruction can be considered as a short form of 'MOV*, @-SP', its status flag is not changed and functions symmetrically to POP, it is treated as a different instruction.

The @SP+ mode cannot be used in the addressing mode specified by src/EaRL because the @-SP mode cannot be used by dest/EaWL of the POP instruction.

PROGRAM EXCEPTION:

Reserved instruction exceptions

When R='1'

When EaRL is @SP+ or @-SP

MNEMONIC:

POP dest

OPERATION:

pop from stack

OPTIONS:

None

INSTRUCTION FORMAT AND ASSEMBLER SYNTAX: shown in FIG. 55.

STATUS FLAGS AFFECTED: shown in FIG. 56.

DESCRIPTION:

Move the contents which are popped from the stack to dest.

This instruction can be considered a short form of MOV @SP+, *. Since the operation where SP is contained in src differs from that of MOV @SP+, and the flag status is not changed, it is treated as a different instruction.

The @-SP mode cannot be used in the addressing mode specified by dest/EaWL. If it is specified, a reserved instruction exception (RIE) occurs. This is because if the instruction POP @-SP is executed, it is not clear when SP is updated.

PROGRAM EXCEPTION:

Reserved instruction exceptions

When W='1'

When EaWL is #imm_data, @SP+ or @-SP

MNEMONIC:

LDM src,reglist

OPERATION:

load multiple registers

OPTIONS:

None

INSTRUCTION FORMAT AND ASSEMBLER SYNTAX: shown in FIG. 57.

STATUS FLAGS AFFECTED: shown in FIG. 58.

DESCRIPTION:

Load the multiple registers from the memory. Specify the registers to be loaded using the bit map reglist/LIRL (register list). LIRL should follow the extension portion of EaRmL, Specify the bit map of the register list to be loaded in the following manner shown in FIG. 59.

When the addressing mode @SP+ is specified by EaRmL, the contents are popped in order beginning with the smallest number register. The contents of SP increase 4 times (or 8 times) as fast as the number of register being loaded. When another addressing mode is specified, the effective address being obtained points to the beginning of the memory data to be loaded into the registers. In any case, the smaller number registers are located at the smaller number addresses.

The format of the registers' bit map to be loaded is determined so that the next register where data is moved can be identified by the same circuit as that used by the BSCH/F and BVSCH/F instructions. The circuit where the '0' or '1' bits which occurs next time can be searched in the MSB direction. For LDM @SP+, since data is moved from the smaller number registers, the smaller number registers are on the MSB side. In the case of other addressing modes, since the start address of the register save block is treated as an effective address, it is necessary to move data from the smaller number registers. Thus, the same format as LDM @SP+ is used.

These formats are determined by considering the data movement order of the registers. If the hardware resource is small, the data movement order described above is very suitable. However, since the real data movement order is not defined in the data processor of the present invention specifications, it can be freely determined when it is implemented.

In the EaRmL addressing mode, the specification of @-SP, register direct mode Rn, immediate mode #imm_data and additional mode are illegal. The additional mode is inhibited because if an overlap exists between the registers and register save area which are saved and restored by LDM and STM and those which are used in the additional mode, it becomes difficult to reexecute the instruction.

If the register list is all zeroes, no operation is performed and the instruction is terminated (rather than flagging the occurrence of an error).

PROGRAM EXCEPTION:

Reserved instruction exceptions

When R='1'

When EaRmL is Rn, #imm_data, @-SP or additional mode

MNEMONIC:

STM reglist,dest

OPERATION:

store multiple registers

OPTIONS:

None

INSTRUCTION FORMAT AND ASSEMBLER SYNTAX: shown in FIG. 60.

STATUS FLAGS AFFECTED: shown in FIG. 61.

DESCRIPTION:

Store the contents of multiple registers to memory. Specify the registers to be stored by the bit map reglist/LsWL (register list). LsWL should follow the extended portion.

Specify the bit map of the register list (reglist) to be stored in the manner shown in FIG. 62, 63.

When the addressing mode of @-SP is specified to EaWmL, the contents are pushed in order beginning with the largest number register. The contents of SP decrease 4 times (or 8 times) as much as the number of registers being saved. When another addressing mode is specified, the effective address being obtained points to the beginning of the memory data to be saved to the registers. In any case, the smaller number registers are located at the smaller number addresses.

The format of the registers' bit map to be moved is determined so that the next register where data is moved can be identified by the same circuit as that used by the BSCH/F and BVSCH/F instructions which search for the first occurrence of '0' or '1' starting with the LSB and moving toward the MSB.

Since data is moved from the larger number registers, the larger number registers are on the MSB side in STM @-SP. In other addressing modes, since the start address of the register save block is treated as the effective address, it is necessary to move data from the smaller number registers, so the smaller number registers are on the MSB side.

These formats are determined by the data movement order of the registers. If the hardware resource is small, the data movement order described above is very suitable. However, since the real data movement order is not defined in the data processor of the present invention specifications, it can be freely determined when implemented in hardware.

In the EaWmL addressing mode, the specification of @SP+, register direct mode Rn, immediate mode #imm_data and additional mode are illegal. The additional mode is inhibit d because if an overlap exists between the registers and register save area, which are saved and restored by LDM and STM, and those which are used in the additional mode, it becomes difficult to reexecute the instruction.

In the LDM and STM instructions, the memory area is not assigned to the registers where data is not moved.

For example,

STM.W (R1,R3,R9),@-SP causes the following operation. (However, assume that the SP value before executing the instruction is initSP.)

R9==>mem[initSP–4]

R3==>mem[initSP–8]

R1==>mem[initSP–12]

initSP–12==>SP

If the register list is all zeroes, no operation is performed and the instruction is terminated (rather than flagging the occurrence of an error).

PROGRAM EXCEPTION:

Reserved instruction exception

When W='1'

When EaWmL is Rn, #imm_data, @SP+ or additional mode

MNEMONIC:

MOVA srcaddr,dest

OPERATION:

address of src==>dest

Move address of src to dest

OPTIONS:

None

INSTRUCTION FORMAT AND ASSEMBLER SYNTAX: shown in FIG. 64.

STATUS FLAGS AFFECTED: shown in FIG. 65.

DESCRIPTION:

Move the effective address of the source operand to the destination operand.

Although the operation of the instruction is equivalent to the MOV instruction, this instruction is treated as a different instruction. The MOVA instruction features the address calculation on the left-side, pointer operation in high level language and application in an address calculation circuit, resulting in much faster calculation.

The following instruction in the short format

MOVA:R @(disp:16,Rs),Rd actually becomes a three-operand addition instruction.

Rs+disp:16–>Rd

However, since the status flags are not changed, this instruction is classified as the MOVA instruction.

When the PC relative indirect mode is specified to srcaddr and the PC relative displacement is set to 0, the current PC value, that is, the start address of the MOVA instruction, is stored in dest. On the other hand, when the instruction length of the MOVA instruction is specified as the PC relative displacement, the address of the instruction following the MOVA instruction is stored in dest. These functions are useful when the coroutine process is performed.

In the assembler, the size is specified by the <OPERATION> or dest. srcaddr serves only for calculating the address rather than for specifying the size.

In the addressing mode specified by EaA, the immediate, @SP+, and @-SP modes are not used.

PROGRAM EXCEPTION:

Reserved instruction exceptions

When+=‘0’

When=‘1’

When EaA is Rn, #imm_data, @SP+ or @-SP

When EaW is #imm_data or @SP+

MNEMONIC:

PUSHA srcaddr

OPERATION:

push address to stack

OPTIONS:

None

INSTRUCTION FORMAT AND ASSEMBLER SYNTAX: shown in FIG. 66.

STATUS FLAGS AFFECTED: shown in FIG. 67.

DESCRIPTION:

Push the effective address of the source operand (srcaddr) to the stack.

Although this instruction can be considered as a short format of MOVA*, @-SP. It is treated as a different instruction. It features an increase in the execution speed over the MOV instruction.

PROGRAM EXCEPTION:

Reserved instruction exception

When S=‘1’

When EaA is Rn, #imm_data, @SP+ or @-SP 12-2 Comparison and Test Instructions

MNEMONIC:

CMP src1,src2

OPERATION:

src2-src1, flags affected

Comparison and sign-extension and comparison

OPTIONS:

None

INSTRUCTION FORMAT AND ASSEMBLER SYNTAX: shown in FIG. 68.

STATUS FLAGS AFFECTED: shown in FIG. 69.

DESCRIPTION:

Compare the contents of the src1 operand to those of the src2 operand and set PSB (L_flag and Z_flag).

If the size of the src1 operand differs from that of the src2 operand, the smaller size operand is sign-extended and both the contents are compared.

In the EaR!I and ShR!I modes, the immediate is inhibited, while in the @SP+ mode, it is available. In the ‘CMP @SP+, @SP+’, although the stack pointer changes twice as much as the size of the operand, this instruction may be used to simulate a stack machine.

Although CMP:Z is one of the test instructions, since its operation and status flags change are the same as those of the CMP instruction, it is treated as one of the short formats of CMP.

The operation of CMP is described using the following instructions:

```
    src1 = [S0.S1 . . . Ss–2.Ss–1]
    src2 = [D0.D1 . . . Dd–2.Dd–1]
(If d≧s)
  [D0.D1 . . . . . Dd–s–1.Dd–s.Dd–s+1 . . . . Dd–2.Dd–1] –
  [S0.S0 . . . . . . . . . S0. S0.     S1 . . . . Ss–2.Ss–1] ==>
  Sign-extended for d–s bits
  [R0.R1 . . . . . Rd–s–1.Rd–s.Rd–s+1 . . . . Rd–2.Rd–1]
                                        (Not set to any location)
(If d<s)
  [D0.D0 . . . . . . . . . D0.  D0.     D1 . . . . Dd–2.Dd–1] -
  Sign-extended for s–d bits
  [S0.S1 . . . . . Ss–d–1.Ss–d.Ss–d+1 . . . . Ss–2.Ss–1] ==>
  [F0.F1 . . . . . Fs–d–1.Fs–d.Fs–d+1 . . . . Fs–2.Fs–1]
                                        (Not set to any location)
L_flag*     S[D] < S[S]
            Same as SUB instruction
Z_flag      [R0 to d–1] = 0      (If d≧s)
      *     [F0 to s–1] = 0      (If d≧s)
```

PROGRAM EXCEPTION:

Reserved instruction exceptions

When RR=‘11’

When SS=‘11’

When EaR or ShR is @-SP

When EaR!I or ShR!I is #imm_data or @-SP

MNEMONIC:

CMPU src1,src2

OPERATION:

src2-src1, flags affected

Zero-Extension and comparison

OPTIONS:

None

INSTRUCTION FORMAT AND ASSEMBLER SYNTAX: shown in FIG. 70.

STATUS FLAGS AFFECTED: shown in FIG. 71.

DESCRIPTION:

Compare the contents of the src1 operand to these of the src2 operand and set PSB (L_flag and Z_flag).

If the size of the src1 operand is smaller than that of the src2 operand, the smaller size operand is zero-extended and both the contents are compared.

In the EaR!I mode, the immediate is inhibited, while in the @SP+ mode, it is available.

The operation of CMPU is described using the following instructions:

```
    src1 = [S0.S1 . . . Ss–2.Ss–1]
    src2 = [D0.D1 . . . Dd–2.Dd–1]
(If d≧s)
    [D0.D1 . . . . . Dd–s–1.Dd–s.Dd–s+1 . . . . Dd–2.Dd–1] -
    [0. 0 . . . . . . . . . . .0.  S0.     S1 . . . . Ss–2.Ss–1] ==>
    Zero-extended for d-s bits
    [R0.R1 . . . . . Rd–s–1.Rd–s.Rd–s+1 . . . . Rd–2.Rd–1]
                                              (Not set to any location)
(If d<s)
    [ 0. 0 . . . . . . . . . . 0. D0.     D1 . . . . Dd-2.Dd-1] –
    Zero-extended for s-d bits
    [S0.S1 . . . . . Ss-d-1.Ss-d.Ss-d+1 . . . . Ss-2.Ss-1] ==>
    [F0.F1 . . . . . Fs-d-1.Fs-d.Fs-d+1 . . . . Fs-2.Fs-1]
                                              (Not set to any location)
L_flag*     U[D] < U[S]
            Same as SUBU instruction
Z_flag      [R0 to d-1] =0       (If d≧s)
      *     [F0 to s-1] =0       (If d≧s)
```

PROGRAM EXCEPTION:

Reserved instruction exceptions

When RR='11'

When SS='11'

When EaR is @-SP

When EaR!I is #imm_data or @-SP

MNEMONIC:

CHK bound,index,xreg

OPERATION:

check upper and lower bounds check the range of the array

OPTIONS:

/S Subtract lower bound value.

/N Do not subtract lower bound value. (Default)

INSTRUCTION FORMAT AND ASSEMBLER SYNTAX: shown in FIG. 72.

STATUS FLAGS AFFECTED: shown in FIG. 73.

DESCRIPTION:

Check the range of the array index and load it into the register.

At the address specified by bound, a pair of upper and lower bound values are placed. The upper and lower bound values are compared to the contents of the comparison value operand which is fetched by the index. The upper bound value is placed at the effective address of bound, while the lower bound value is located at the address of: (effective address of bound+operand size). The comparison is made using signed integers. If the comparison value is not in the range between the upper bound value and lower bound value, V_flag is set. Therefore, by executing the TRAP instruction, it is possible to start the exception process. When /S is specified, the value where the lower bound value is subtracted from the comparison value, is loaded to the register xreg. When /S is not specified, the comparison value is directly loaded to the register xreg. The comparison value being loaded to the register is often used to calculate the address of the array index.

Operation:

```
tmp = mem[address_of_bound + operand_size]
if (index ≧ mem[address_of_bound] .or. index < tmp)
then
```

-continued

```
    set V_flag;
if (c == 1)
then
    index – tmp ==> xreg
else
    index ==> xreg
Since 'address_of_' is the inverse operator of 'mem[ . . ]',
the meaning of bound is the same as that of mem[address_of_bound].
```

If the comparison value accords with the lower bound value, it is treated as being in the range. If the comparison value accords with the upper bound value, it is treated as being out of the range. For example, if the memory of bound is (0,100), CHK treats 0 to 99 of the index as being in the range.

L_flag and Z_flag are set in accordance with the result of the comparison to index like CMP. In the following case, L_flag=1.

index<lower bound value

This relation is tabulated as in FIG. 74.

note1: LBV stands for lower bound value, UBV stands for upper bound value.

note2: If the upper bound value<lower bound value, the comparison value may become '1' due to comparison to the lower bound value.

In this case, the flags are set depending on the operation result of (index—lower bound value). The following three instructions show that L_flag is set if the contents of the second operand are smaller than those of the first operand (lower bound value of the first operand bound in CHK).

CMP src1,src2

SUB src,dest

CHK bound,index,xreg

The CHK instruction does not check (upper bound value≧lower bound value). The instruction should function as described in the "Operation" above regardless of the upper bound value and lower bound value.

In the addressing mode specified by EaRdR, the register direct Rn, @-SP, @SP+ and #imm_data modes cannot be used. If it is necessary to compare some value to that in a register, use CMP twice rather than CHK.

PROGRAM EXCEPTION:

Reserved instruction exceptions

When RR='11'

When EaR is @-SP

When EaRdR is Rn, #imm_data, @SP+ or @-SP 12-3 Arithmetic Instructions

MNEMONIC:

ADD src,dest

OPERATION:

dest+src==>dest

Addition or addition with sign-extension

OPTIONS:

None

INSTRUCTION FORMAT AND ASSEMBLER SYNTAX: shown in FIG. 75.

STATUS FLAGS AFFECTED: shown in FIG. 76.

DESCRIPTION:

Add the contents of the source operand (src) to those of the destination operand (dest).

If the size of the source operand is smaller than that of the destination operand, the source operand is sign-extended and the contents of the source operand are added to those of the destination operand.

If the result of the operation cannot be expressed as a signed integer in the size of the destination operand because its size is smaller than that of the source operand, V_flag is set.

For doing ADD:L @SP+,SP in the L-format, like ADD:G @SP+,SP, it is recommended that the following operation be performed.

(initSP+4)+@initSP==>SP

However, it may be difficult to perform such an operation in the L-format, so the operation of ADD:L @SP+,SP should depend on the implementation.

```
(If d≧s)
    [D0.D1 . . . . . Dd–s–1.Dd–s.Dd–s+1 . . . . Dd–2.Dd–1] +
    [S0.S0 . . . . . . . . S0.  S0.     S1 . . . . Ss–2.Ss–1] ==>
    Sign-extended for d – s bits
    [R0.R1 . . . . . Rd–s–1.Rd–s.Rd–s+1 . . . . Rd–2.Rd–1] (Set to dest)
(If d<s)
    [D0.D0 . . . . . . . . D0.  D0.     D1 . . . . Dd–2.Dd–1] +
    Sign-extended for d – s bits
    [S0.S1 . . . . . Ss–d–1.Ss–d.Ss–d+1 . . . . Ss–2.Ss–1] ==>
    [F0.F1 . . . . . Fs–d–1.Fs–d.Fs–d+1 . . . . Fs–2.Fs–1] ==>
    [   R0.     R1 . . . . Rd–2.Rd–1] (Set to dest)
    F0.F1 . . . . . Fs–d–1
    s – d bits are truncated.
L_flag*    S[D] + S[S] < 0
Show a negative result.
(M_flag correctly represents the result as positive or nega-
tive only when there is no overflow.)
M_flag     R0
Z_flag     [R0 to d–1] = 0
V_flag     S[D] + S[S] < –2^(d–1)
X_flag*    The carry bit is loaded into X_flag. The number of
           bits in (size of) dest determines where the carry
           bit is needed.
(If d≧s)
    U[D0.D1 . . . . . Dd-s-1.Dd-s.Dd-s+1 . . . . Dd–2.Dd–1] +
    U[S0.S0 . . . . . . . . S0.  S0.     S1 . . . . Ss–2.Ss–1] ≧ +2^d
    Sign-extended for d – s bits
(If d<s)
    U[   D0.     D1 . . . . Dd–2.Dd–1] +
                  U[Ss–d.Ss–d+1 . . . . . Ss–2.Ss–1] ≧ +2^d
    S0.S1 . . . . . Ss–d–1
    s – d bits are truncated.
```

PROGRAM EXCEPTION:

Reserved instruction exceptions

When RR is '11'

When MM is '11'

When EaR or ShRw is @-SP

When EaM or ShM is #imm_data, @SP+ or @-SP.

MNEMONIC:

ADDU src,dest

OPERATION:

dest+src==>dest

Zero-Extension and addition

OPTIONS:

None

INSTRUCTION FORMAT AND ASSEMBLER SYNTAX: shown in FIG. 77.

STATUS FLAGS AFFECTED: shown in FIG. 78.

DESCRIPTION:

Add the contents of the source operand (src) to those of the destination operand (dest).

If the size of the source operand is smaller than that of the destination operand, the source operand is zero-extended and the contents are added to those of the destination operand.

If the operation result cannot be represented as an unsigned integer in the size of the destination operand because the size of the destination operand is smaller than that of the source operand, V_flag is set.

Because the operation result always becomes positive, L_flag of ADDU is always reset to 0.

```
(If d≧s)
    [D0.D1 . . . . . Dd–s–1.Dd–s.Dd–s+1 . . . . Dd–2.Dd–1] +
    [ 0. 0 . . . . . . . . . . 0.  S0.     S1 . . . . Ss–2.Ss–1] ==>
    2ero-extended for d – s bits
    [R0.R1 . . . . . Rd–s–1.Rd–s.Rd–s+ 1 . . . . Rd–2.Rd–1] (Set to dest)
(If d<s)
    [ 0. 0 . . . . . . . . . . .0.  D0.     D1 . . . . Dd–2.Dd–1] +
    Zero-extended for s – d bits
    [S0.S1 . . . . . Ss–d–1.Ss–d.Ss–d+1 . . . . Ss–2.Ss–1] ==>
    [F0.F1 . . . . . Fs–d–1.Fs–d.Fs–d+1 . . . . Fs–2.Fs–1] ==>
                   [   R0.     R1 . . . . Rd–2–Rd–1] (Set to dest)
    F0.F1 . . . . . Fs–d–1
    s – d bits are truncated.
L_flag     0
M_flag     R0
Z_flag     [R0 to d–1] = 0
V_flag     U[D] + U[S] ≧ +2^d
X_flag*    The carry bit is loaded into X_flag. The number of
           bits in (size of) dest determines where the carry
           bit is needed.
(If d≧s)
    U[D0.D1 . . . . . Dd–s–1.Dd–s.Dd–s+1 . . . . Dd–2.Dd–1] +
    U[ 0.0 . . . . . . . . . . 0.  S0.     S1 . . . . Ss–2.Ss–1] ≧ +2^d
    Zero-extended for d – s bits
    Same as V_flag of ADDU instruction
(If d<s)
                   U[   D0.     D1 . . . . Dd–2,Dd–1] +
                    [Ss–d.Ss–d+1 . . . . Ss–2.Ss–1] ≧ +2^d
    S0.S1 . . . . . Ss–d–1
    s – d bits are truncated.
```

PROGRAM EXCEPTION:

Reserved instruction exceptions

When RR='11'

When MM='11'

When EaR is @-SP

When EaM is #imm_data, @SP+ or @-SP

MNEMONIC:

ADDX src,dest

OPERATION:

dest+src+X_flag==>dest

Addition with a carry

OPTIONS:

None

Figures 79, 80:
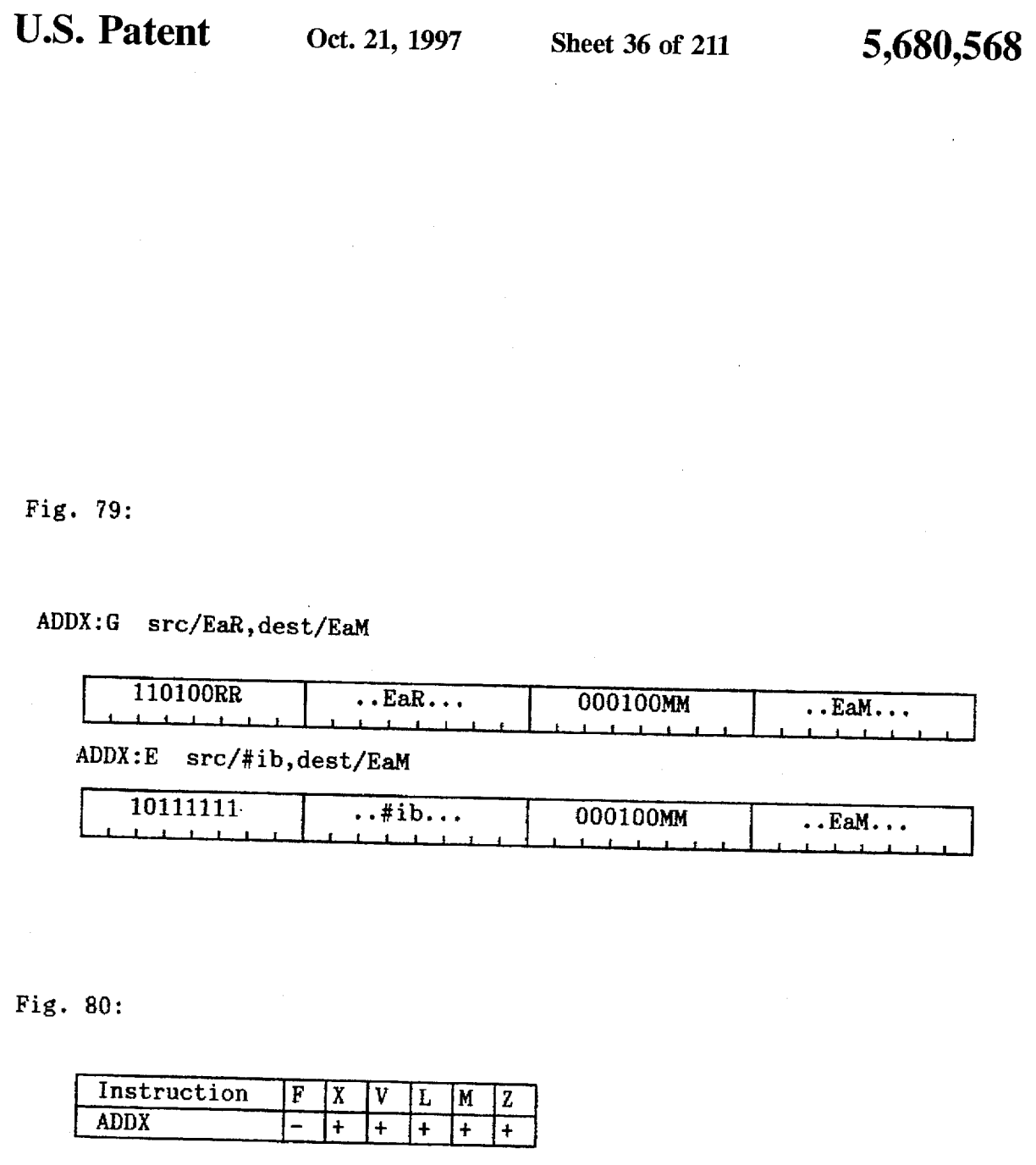

INSTRUCTION FORMAT AND ASSEMBLER SYNTAX: shown in FIG. 79.

STATUS FLAGS AFFECTED: shown in FIG. 80.

DESCRIPTION:

Add the contents (X_flag) of the source operand (src) with the carry to the contents of the destination operand (dest).

If the size of the source operand is smaller than that of the destination operand, the source operand is sign-extended and the contents are added to those of the destination operand.

The flag value of Z_flag can be accumulated. The status flags of ADDX, including sign- and zero-extension, are the same as those of ADD, except for Z_flag.

For the different size operands in ADDX and SUBX, for example, if the contents of 4 bytes in src are added to the contents of 8 bytes in dest2 to dest1, this instruction may be used as ADDX:E #0 in the following:

ADD @src.W,@dest1.W

ADDX #0,@dest2.W

---

(If d≧s)
[D0.D1 . . . . . Dd−s−1.Dd−s.Dd−s+1 . . . . Dd−2.Dd−1] +
[S0.S0 . . . . . . . . . . S0. S0. S1 . . . . Ss−2.Ss−1] + X_flag
==>
Sign-extended for d − s bits
[R0.R1 . . . . . Rd−s−1.Rd−s.Rd−s+1 . . . . Rd−2.Rd−1] (Set to dest)
(If d<s)
[D0.D0 . . . . . . . . . . D0. D0. D1 . . . . Dd−2.Dd−1] +
Sign-extended for s − d bits
[S0.S1 . . . . . Ss−d−1.Ss−d.Ss−d+1 . . . . Ss−2.Ss−1] + X_flag ==>
[F0.F1 . . . . . Fs−d−1.Fs−d.Fs−d+1 . . . . Fs−2.Fs−1] ==>
_[ R0. R1 . . . . Rd−2.Rd−1] (Set to dest)
F0.F1 . . . . . Fs−d−1
s − d bits are truncated.
L_flag* S[D] + S[S] + X_flag < 0

---

Assume that the number is signed, perform the operation, and represent the result as negative. If d≠s, sign-extend the operand and compare the contents of both the operands. (M_flag correctly represents the result as positive or negative only when there is no overflow.)

| | |
|---|---|
| M_flag | R0 |
| Z_flag | [R0 to d−1] = 0 .and. previous Z_flag |
| V_flag | S[D] + S[S] + X_flag < −2^(d−1) .or. S[D] + S[S] + X_flag < −2^(d−1) Assume that the number is signed and represent the result has overflowed. If d ≠ s, the operand is sign-extended. |
| X_flag* | The carry bit is loaded into X_flag. The number of bits in (size of) dest determines where the carry bit is needed. |

(If d≧s)
U[D0.D1 . . . . . Dd−s−1.Dd−s.Dd−s+1 . . . . Dd−2.Dd−1] +
U[S0.S0 . . . . . . . . . . S0. S0. S1 . . . . Ss−2.Ss−1] + X_flag
≧ +^d
Sign-extended for d - s bits

---

If d>s, sign-extend the operand so that it is used in conjunction with other flag setting operations such as dest. However, the operand is treated as an unsigned number in the operation is done after the operand is sign-extended.

---

(If d<s)
U[ D0. D1 . . . . Dd-2.Dd-1] +
U[Ss-d.Ss-d+1 . . . . Ss-2.Ss-1] + X_flag ≧ +2^d
S0.S1 . . . . . Ss-d-1
s - d bits are truncated.

---

PROGRAM EXCEPTION:
Reserved instruction exceptions
When RR='11'
When MM='11'
When Ear is @-SP
When EaM is #imm_data, @SP+ or @-SP
MNEMONIC:
SUB src,dest
OPERATION:
dest−src==>dest
Subtraction or subtraction with sign-extension
OPTIONS:
None
INSTRUCTION FORMAT AND ASSEMBLER SYNTAX: shown in FIG. 81.
STATUS FLAGS AFFECTED: shown in FIG. 82.
DESCRIPTION:
Subtract the contents of the source operand (src) from those of the destination operand(dest).

If the size of the source operand is smaller than that of the destination operand, the source operand is sign-extended and the contents of the source operand are subtracted from those of the destination operand.

If the operation result cannot be represented as a signed integer in the size of the destination operand, V_flag is set.

---

(If d>s)
[D0.D1 . . . . . Dd−s−1.Dd−s.Dd−s+1 . . . . Dd−2.Dd−1] -
[S0.S0 . . . . . . . . . S0. S0. S1 . . . . Ss−2.Ss−1] ==>
Sign-extended for d − s bits
[R0.R1 . . . . . Rd−s−1.Rd−s.Rd−s+1 . . . . Rd−2.Rd−1] (Set to dest)
(If d<s)
[D0.D0 . . . . . . . . . D0. D0. D1 . . . . Dd−2.Dd−1] -
Sign-extended for s − d bits
[S0.S1 . . . . . Ss−d−1.Ss−d.Ss−d+1 . . . . Ss−2.Ss−1] ==>
[F0.F1 . . . . . Fs−d−1.Fs−d.Fs−d+1 . . . . Fs−2.Fs−1] ==>
[ R0. R1 . . . . Rd−2.Rd−1] (Set to dest)
F0.F1 . . . . . Fs−d−1
s − d bits are truncated.
L_flag* S[D] - S[S] < 0
Show a negative result. (M_flag correctly represents the result as positive or negative only when there is no overflow.)

| | |
|---|---|
| M_flag | R0 |
| Z_flag | [R0 to d−1] = 0 |
| V_flag | S[D] - S[S] < −2^(d−1) .or. S[D] - S[S] ≧ +2^(d−1) |
| X_flag* | The borrow bit is loaded into X_flag. The number of bits in (size of) dest determines where the borrow bit needed. |

(If d≧s)
U[D0.D1 . . . . . Dd−s−1.Dd−s.Dd−s+1 . . . . Dd−2.Dd−1] -
U[S0.S0 . . . . . . . . S0. S0. S1 . . . . Ss−2.Ss−1] < 0
Sign-extended for d − s bits
(If d<s)
U[ D0. D1 . . . . Dd−2.Dd−1] -
U[Ss−d.Ss−d+1 . . . . Ss−2.Ss−1] < 0
S0.S1 . . . . . Ss−d−1
s - d bits are truncated.

---

Figures 83, 84:
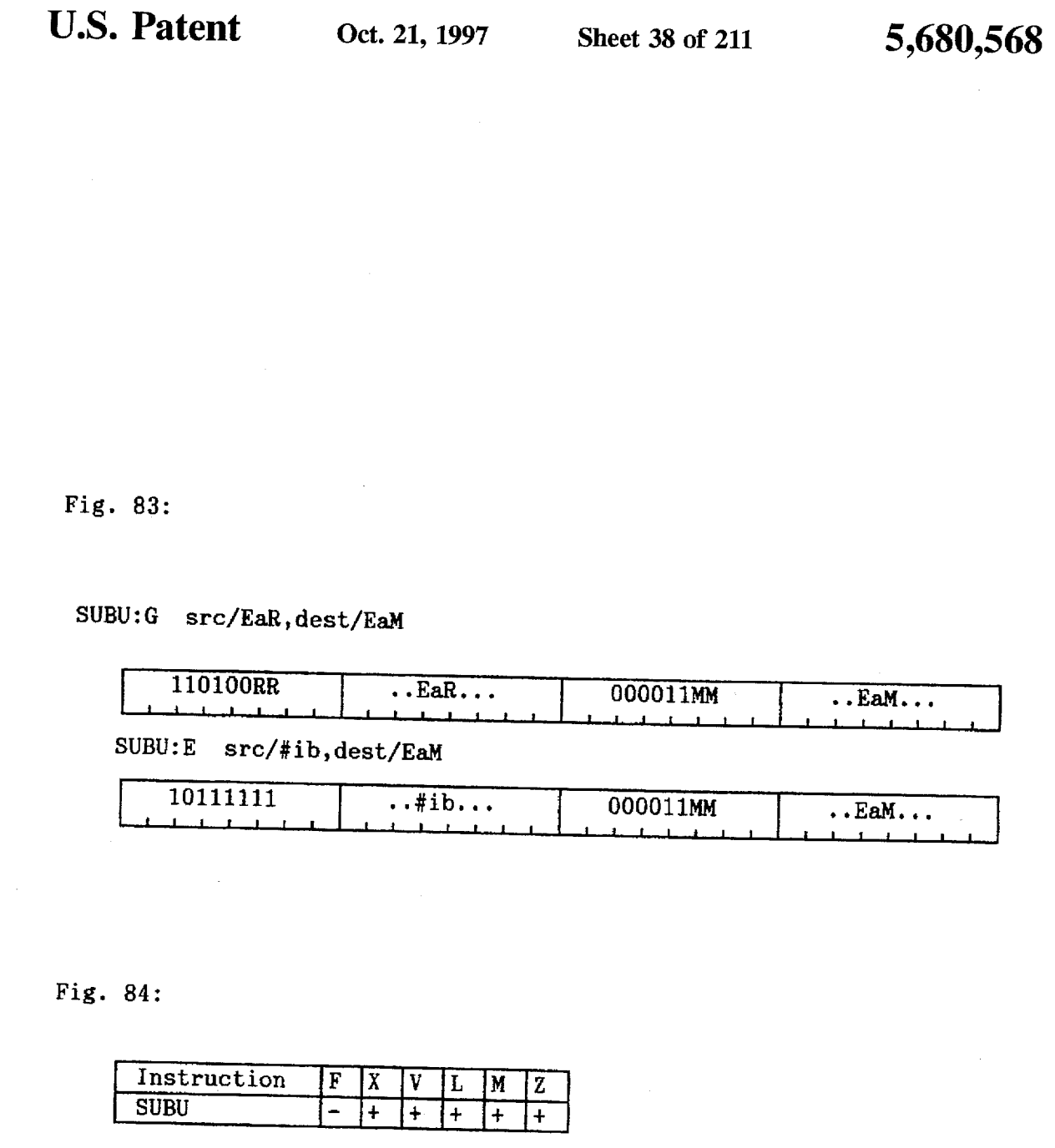

PROGRAM EXCEPTION:
Reserved instruction exceptions
When RR='11'
When MM='11'
When EaR or ShRw is @-SP
When EaM or ShM is #imm_data, @SP+ or @-SP
MNEMONIC:
SUBU src,dest
OPERATION:
dest−src ==>dest
Zero-extension and subtraction
OPTIONS:
None
INSTRUCTION FORMAT AND ASSEMBLER SYNTAX: shown in FIG. 83.
STATUS FLAGS AFFECTED: shown in FIG. 84.
DESCRIPTION:
Subtract the contents of the source operand (src) from those of the destination operand (dest).

If the size of the source operand is smaller than that of the destination operand, the source operand is zero-extended and the contents of the source operand are subtracted from those of the destination operand.

If the operation result cannot be represented as an unsigned integer in the size of the destination operand, V_flag is set.

(If d≧s)
[D0.D1 . . . . . Dd−s−1.Dd−s.Dd−s+1 . . . . Dd−2.Dd−1] -
[ 0.0 . . . . . . . . . . 0. S0. S1 . . . . Ss−2.Ss−1] ==>
Zero-extended for s − d bits
[R0.R1 . . . . . Rd−s−1.Rd−s.Rd−s+1 . . . . Rd−2.Rd−1] (Set to dest)
(If d<s)
[ 0.0 . . . . . . . . . . 0. D0. D1 . . . . Dd−2.Dd−1] -
Zero-extended for s − d bits
[S0.S1 . . . . . Ss−d−1.Ss−d.Ss−d+1 . . . . Ss−2.Ss−1] ==>
[F0.F1 . . . . . Fs−d−1.Fs−d.Fs−d+1 . . . . Fs−2.Fs−1] ==>
[ R0. R1 . . . . Rd−2.Rd−1] (Set to dest)
F0.F1 . . . . . . Fs−d−1
s − d bits are truncated.

| | |
|---|---|
| L_flag* | U[D] - U[S] < 0<br>Show a negative result. (M_flag correctly represents the result as positive or negative only when there is no overflow.) |
| M_flag | R0 |
| Z_flag | [R0 to d−1] = 0 |
| V_flag | U[D] - U[S] < 0<br>Same as L_flag of SUBU instruction |
| X_flag* | The borrow bit is loaded into X_flag. The number of bits (size of) dest determines where the borrow bit is needed. |

(If d≧s)
U[D0.D1 . . . . . Dd−s−1.Dd−s.Dd−s+1 . . . . . Dd−2.Dd−1] -
U[ 0.0 . . . . . . . . . . 0. S0. S1 . . . . Ss-2.Ss-1] < 0
Zero-extended for d − s bits
Same as X_flag of SUB instruction and L_flag and V_flag of SUBU instruction
(If d<s)
U[ D0. D1 . . . . Dd−2.Dd−1] -
U[Ss−d.Ss−d+1 . . . . Ss−2.Ss−1] < 0
S0.S1 . . . . . Ss−d−1
s − d bits are truncated.

PROGRAM EXCEPTION:

Reserved instruction exceptions

When RR='11'

When MM='11'

When EaR is @-SP

When EaM is #imm_data, @SP+ or @-SP

MNEMONIC:

SUBX src,dest

OPERATION:

dest−src−X_flag==>dest

Subtraction with a carry

OPTIONS:

None

INSTRUCTION FORMAT AND ASSEMBLER SYNTAX: shown in FIG. 85.

STATUS FLAGS AFFECTED: shown in FIG. 86.

DESCRIPTION:

Subtract the contents of the source operand (src) with the carry from those of the destination operand (dest).

If the size of the source operand is smaller than that of the destination operand, the source operand is sign-extended and the contents of the source operand are subtracted from those of the destination operand.

The flag value of Z_flag can be accumulated. The status flags of SUBX including sign- and zero-extension are the same as those of SUB except for Z_flag.

(If d≧s)
[D0.D1 . . . . . Dd−s−1.Dd−s.Dd−s+1 . . . . Dd−2.Dd−1] -
(S0.S0 . . . . . . . . S0. S0. S1 . . . . Ss−2.Ss−1] - X_flag ==>
Sign-extended for d - s bits
[R0.R1 . . . . . Rd−s−1.Rd−s.Rd−s+1 . . . . Rd−2.Rd−1] (Set to dest)
(If d<s)

-continued

[D0.D0 . . . . . . . . D0. D0. D1 . . . . . Dd−2.Dd−1] -
Sign-extended for s − d bits
[S0.S1 . . . . . Ss−d−1.Ss−d.Ss−d+1 . . . . Ss.2.Ss−1] - X_flag ==>
[F0.F1 . . . . . Fs−d−1.Fs−d.Fs−d+1 . . . . Fs−2.Fs−1] ==>
[ R0. R1 . . . . Rd−2.Rd−1] (Set to dest)
F0.F1 . . . . . Fs−d−1
s − d bits are truncated..

| | |
|---|---|
| L_flag* | S[D] - S[S] - X_flag < 0<br>Assume that the number is signed and show the result as negative. If d ≠ s, the operand is sign-extended and then both operands are compared. (M_flag correctly represents the result as positive or negative only when there is no overflow.) |
| M_flag | R0 |
| Z_flag | [R0 to d-1] 0 .and. previous Z_flag |
| V_flag | S[D] − S[S] − X_flag <−2^(d−1) .or.<br>S[D] − S[S] − X_flag ≧+2^(d−1)<br>Assume that the number is signed and represent that the result is overflowed. If d ≠ 9, the operand is sign-extended. |
| X_flag* | The borrow bit is loaded into X_flag. The number of bits in (size of) dest determines where the borrow bit is needed. |

(If d≧s)
U[D0.D1 . . . . . Dd−s−1.Dd−s.Dd−s+1 . . . . Dd−2.Dd−1] -
U[S0.S0 . . . . . . . . S0. S0. S1 . . . . Ss−2.Ss−1] - X_flag < 0
Sign-extended for d − s bits
If d > s, sign-extend the operand so that this operand is used in conjunction with other flag setting operations such as dest. However, the operand is treated as an unsigned number in the operation is done after the operand is sign-extended.
(If d<s)
U[ D0. D1 . . . . Dd−2.Dd−1] -
U[Ss−d.Ss−d+1 . . . . Ss−2.Ss−1] −
X_flag < 0
S0.S1 . . . . . Ss−d−1
s − d bits are truncated.

PROGRAM EXCEPTION:

Reserved instruction exceptions

When RR='11'

When MM='11'

When EaR is @-SP

When EaM is #imm_data, @SP+ or @-SP

MNEMONIC:

MUL src,dest

OPERATION:

dest*src ==>dest

Multiplication

OPTIONS:

None

INSTRUCTION FORMAT AND ASSEMBLER SYNTAX: shown in FIG. 87.

STATUS FLAGS AFFECTED: shown in FIG. 88.

DESCRIPTION:

Multiply the contents of the destination operand (dest) by those of the source operand (src). The multiplication is performed with signed numbers. The contents of the operands are treated as signed integers.

This instruction is useful for high level languages because the size of the multiplicand is the save as that of the result.

If the operation result cannot be represented as a signed integer because the size of the destination operand is small, V_flag is set. Even if an overflow occurs, M_flag and Z_flag are set depending on the data which is set to dest (low order bit of correct result). For example, with

R0=H'10000 when executing the following instruction

MUL.W #H'10000,R0 since the product becomes H'100000000, the following results are obtained:

RO=0 (low order bit), V_flag=1, and Z_flag=1.

PROGRAM EXCEPTION:

Reserved instruction exceptions

When RR='11'

When MM='11'

When EaR is @-SP

When EaM is #imm_data, @SP+ or @-SP

MNEMONIC:

MULU src,dest

OPERATION:

dest*src ==>dest

Unsigned multiplication

OPTIONS:

None

INSTRUCTION FORMAT AND ASSEMBLER SYNTAX: shown in FIG. 89.

MULU:G src/EaR,dest/EaM

STATUS FLAGS AFFECTED: shown in FIG. 90.

DESCRIPTION:

Multiply the contents of the destination operand (dest) by those of the source operand (src). The multiplication is performed with unsigned numbers. The contents of the operands are treated as unsigned integers.

If the operation result cannot be represented as an unsigned integer because the size of the destination operand is smaller than that of the source operand, V_flag is set.

PROGRAM EXCEPTION:

Reserved instruction exceptions

When RR='11'

When MM='11'

When EaR is @-SP

When EaM is #imm_data, @SP+ or @-SP

MNEMONIC:

MULX src,dest,tmp

OPERATION:

dest*src ==>reg&dest (double size)

Extended multiplication, double size

OPTIONS:

None

INSTRUCTION FORMAT AND ASSEMBLER SYNTAX: shown in FIG. 91.

STATUS FLAGS AFFECTED: shown in FIG. 92.

DESCRIPTION:

Multiply the contents of the destination operand (dest) by those of the source operand (src). Since the result of this instruction is double sized, the temporary register tmp is specified for placing the high order bits of the product. The register is fixed to 32 bits (selected from 32/64 bits). The multiplication is performed with unsigned numbers. The size of the product is twice as much as the size of the multiplicand.

[Operation of MULX]

dest[0:31]*src[0:31]==>tmp1[0:63]

tmp1[32:63]==>tmp[0:31]

tmp1[0:31]==>dest[0:31]

Since MULX has two results to be obtained: one is dest and another is tmp, if the values of two results are overlapped (i.e., the same register is used for dest and tmp), a problem occurs.

Since tmp (high order digit of MULX) is often used for a carry out to the next digit, it may not be used for calculating the last digit. Thus, if both the results are overlapped, the value which should be set to dest (low order digit) would be kept.

The status flags of M_flag and Z_flag in MULX are changed according to dest. The value being set to tmp does not affect these flags because of the following reasons:

The status flags are changed in the manner of those of ADDX and SUBX. (Even if X_flag of ADDX and SUBX are set, when dest is 0, Z_flag is set.)

In the case of multiple length operations, the status flags changed only by tmp and dest (tmp&dest) are not usefull. To change the flags in the proper manner, it is necessary to determine them in steps rather than one of them. Even if the status flags are changed by tmp and dest (tmp&dest), the correct result cannot be obtained.

EXAMPLE

```
      [Before Execution]
      R1=H'00000000 dest=H'20000000 src=H'40000000
      MULX @src,@dest,R1
      [After Execution]
tmp=H'0800000000000000
      |______||______|
         R1     dest
```

Since the value to be set to dest is 0, Z_flag is set.

Unlike ADDX and SUBX, in MULX and DIVX, the status of Z_flag is not accumulatively changed.

With F_flag, tmp=0 can be tested.

If !=0, the operation cannot be assured.

In the data processor of the present invention, if !=0, the contents of the operand are fetched as !R (8 bits or 16 bits) in the src size. It is sign-extended to 32 bits and the instruction is executed.

However, dest and tmp are always treated as 32 bits regardless of !R.

PROGRAM EXCEPTION:

Reserved instruction exceptions

When !R='11'

Note: If !=0, the instruction is not detected as a reserved instruction exception.

When EaR is @-SP

When EaMR is #imm_data, @SP+ or @-SP

MNEMONIC:

DIV src,dest

OPERATION:

dest/src==>dest

Division

OPTIONS:

None

INSTRUCTION FORMAT AND ASSEMBLER SYNTAX: shown in FIG. 93.

STATUS FLAGS AFFECTED: shown in FIG. 94.

DESCRIPTION:

Divide the contents of the destination operand (dest) by those of the source operand (src). The division is performed with signed numbers. (The contents of the operands are treated as signed integers.)

Since the size of the dividend of this instruction is the same as that of the result, this instruction is usefull for high level languages.

The quotient is rounded off to 0 and the sign of the remainder becomes the same as that of the dividend.

EXAMPLE

10/3-->Quotient=3, Remainder=1

(−10)/3-->Quotient=(−3), Remainder=(−1)

10/(−3)-->Quotient=(−3), Remainder=1

If src=0, a zero division exception (ZDE) occurs. In the case of division by zero, V_flag is set, so that the exception process is started. The value of dest is not changed, however the data processor of the present invention does not care whether the write access for the dest is performed or not. In addition, the status flags, except for V_flag, are not changed, so that it functions like dest. To analyze the cause where the exception occurs, it is necessary to keep the previous status (including status flags).

Besides division by zero of DIV, only (minimum negative value)÷(−1), causes an overflow. Unlike DIVX, since DIV is a conventional operation instruction which is generated by the compiler, it is recommended they handle overflow the same way. To do that, the status flags are changed as follows:

V_flag=1, L_flag=0, M_flag=1, Z_flag=0
(Where the minimum negative number÷(−1))

An overflow occurs only when the minimum negative number÷(−1) occurs. Even if the low order bits of the correct result are set to dest, the status of dest is not changed. Even if it becomes the low order bits of the correct result, the value is not changed.

EXAMPLE

If DIV.H is executed while src=H'ffff=(−1) and dest=H'80000=(−32768), the following result is obtained.

==>dest=H'80000, V_flag=1

It is possible to consider H'8000 of dest as the low order bits of the correct result (H'... 008000=32768) or more simply, dest is unchanged.

PROGRAM EXCEPTION:

Reserved instruction exceptions
When RR='11'
When MM='11'
When EaR is @-SP
When EaM is #imm_data, @SP+ or @-SP
Zero division exception
When src=0

MNEMONIC:

DIVU src,dest

OPERATION:

dest/src==>dest
Unsigned division

OPTIONS:

None

INSTRUCTION FORMAT AND ASSEMBLER SYNTAX: shown in FIG. 95.

STATUS FLAGS AFFECTED: shown in FIG. 96.

DESCRIPTION:

Divide the contents of the destination operand (dest) by those of the source operand (src). The division is performed by unsigned numbers. (The contents of the operands are treated as unsigned integers.)

If src=0, a zero division exception (ZDE) occurs. In the case of division by zero, V_flag is set, so that the exception process is started. The value of dest is not changed, however the data processor of the present invention does not care whether the write access for the dest is performed or not. In addition, the status flags, except for V_flag, are not changed, so that it functions like dest. To analyze the cause where the exception occurs, it is necessary to keep the previous status (including status flags).

Besides division by zero of DIVU instruction, V_flag is not reset by an occurrence of an overflow. Except for division by zero, V_flag is always cleared.

PROGRAM EXCEPTION:

Reserved instruction exceptions
When RR='11'
When MM='11'
When EaR is @-SP
When EaM is #imm_data, @SP+ or @-SP
Zero division exception
When src=0

MNEMONIC:

DIVX src,dest,tmp

OPERATION:

reg&dest/src ==>dest, reg (quotient, remainder)
Extended division, shortening size, and presence of remainder

OPTIONS:

None

INSTRUCTION FORMAT AND ASSEMBLER SYNTAX: shown in FIG. 97.

STATUS FLAGS AFFECTED: shown in FIG. 98.

DESCRIPTION:

Divide the contents of the destination operand by those of the source operand. Since this instruction becomes a primitive of multiple length division, a register besides src and dest, is used to place the temporary value (remainder) for the extension operation. The size is fixed to 32 bits (which is selected from 32/64). The division is performed with unsigned numbers. The size of the dividend becomes twice as much as the size of divider.

[Operation of DIVX]

concatinate(tmp[0:31],dest[0:31])==>tmp1[0:63]
quo(tmp1[0:63],src[0:31])==>dest[0:31]
rem(tmp1[0:63],src[0:31])==>tmp[0:31]

Since DIVX has two results to be obtained: one is dest and another is tmp, if the values of two results are overlapped (if the same register is used for dest and tmp), a problem occurs. Since tmp (remainder of DIVX) is often used for a borrow to the next digit, it may not be used for calculating the last digit. Thus, if both the results are overlapped, the value which would be sent to dest (quotient of DIVX) would be kept.

Although DIVX is used when the dividend is multiple length, if the divider becomes multiple length, DIVX cannot be used. The division should be performed by repeating the shift operations and subtraction operations using a subroutine. A multiple length shift operation is required. To perform the multiple length shift operation, rotate instructions (SHXR and SHXL) are provided using X_flag.

The statuses of M_flag and Z_flag of DIVX are based on dest (quotient). The value (remainder) which is set to tmp does not affect such flags. However, with F_flag, tmp=0 can be tested.

Unlike ADDX and SUBX, Z_flag of MULX and DIVX is not accumulatively changed.

If an overflow occurs as the result of the DIVX operation, to match the specification of this instruction to the overflows of MOV, ADD, SUB and MUL, it is recommended that the low order bits of the correct result be set to dest. Unlike ADD and SUB, the low order bits of the correct result are not automatically obtained even if an overflow occurs. The division is calculated from the high order bits, so it is difficult to obtain the low order bits of the correct result due to the nature of the algorithm. Thus, if an overflow occurs in DIVX, dest is not changed.

If an overflow occurs because the quotient is not contained in dest in the DIVX operation, the status flags, except for the V_flag, are not changed. If an overflow occurs in the DIVX operation, dest is not changed.

If src=0, a zero division exception (ZDE) occurs. If division by zero occurs, the contents of dest and tmp are not changed, however the data processor of the present invention does not care whether the write access of dest is performed or not. The status flags, except for the V_flag, are not changed so that they accord with the contents of dest. It is recommended to keep the previous status (including status flags) to analyze the cause the exception by the exception process program.

If !=0, the operation of the instruction is not assured.

In the data processor of the present invention, if !=0, the contents of the operand are fetched as !R (8 bits or 16 bits) in the src size. It is sign-extended to 32 bits and the instruction is executed.

However, dest and tmp are always treated as 32 bits regardless of !R.

PROGRAM EXCEPTION:

Reserved instruction exceptions

When !='0'

When R='1'

When EaR is @-SP

When EaMR is #imm_data, @SP+ or @-SP

Zero division exception

When src=0

MNEMONIC:

REM src,dest

OPERATION:

dest % src==>dest

Remainder

OPTIONS:

None

INSTRUCTION FORMAT AND ASSEMBLER SYNTAX: shown in FIG. 99.

STATUS FLAGS AFFECTED: shown in FIG. 100.

DESCRIPTION:

Divide the contents of the destination operand (dest) by those of the source operand (src) and obtain the remainder. The division is performed with signed numbers. (The contents of the operands are treated as signed integers.)

Since the size of the dividend is the same as that of the remainder, this instruction is usefull to high level programming languages.

The quotient is rounded off toward 0 and the sign of the remainder becomes the same as that of the dividend.

EXAMPLE

10/3-->Quotient=3, Remainder=1

(−10)/3-->Quotient=(−3), Remainder=(−1)

10/(−3) -->Quotient=(−3), Remainder=1

If src=0, a zero division exception (ZDE) occurs. However, if division by zero is performed in REM, the overflow is cleared and the exception process is started. Unlike the DIV instruction, the zero division of the REM instruction does not cause dest (remainder) to be overflowed, so it is necessary to clear V_flag.

When V_flag is cleared, it can be easily distinguished whether the error is caused by DIV or REM in the exception process.

When division by zero is performed, the contents of dest are not changed. Defining whether the memory access of dest is performed (read or read-modify-write by the same value) or not causes the implementation to be restricted, so that it is not defined.

PROGRAM EXCEPTION:

Reserved instruction exceptions

When RR='11'

When MM='11'

When EaR is @-SP

When EaM is #imm_data, @SP+ or @-SP

Zero division exception

When src=0

MNEMONIC:

REMU src,dest

OPERATION:

dest % src==>dest

Remainder by unsigned division operation

OPTIONS:

None

INSTRUCTION FORMAT AND ASSEMBLER SYNTAX: shown in FIG. 101.

STATUS FLAGS AFFECTED: shown in FIG. 102.

DESCRIPTION:

Divide the contents of the destination operand (dest) by those of the source operand (src) and obtain the remainder. The division operation is performed by unsigned numbers. (The contents of the operands are also treated as unsigned integers.) If the size of src differs from that of dest, the zero-extension is performed.

Since the size of the dividend is the same as that of the remainder, it is usefull to high level languages.

If src=0, a zero division exception (ZDE) occurs. When division by zero is performed, the same result as division by zero in REM occurs.

PROGRAM EXCEPTION:

Reserved instruction exceptions

When RR='11'

When MM='11'

When EaR is @-SP

When EaM is #imm_data, @SP+ or @-SP

Zero division exception

When src=0

MNEMONIC:

NEG dest

OPERATION:

0–dest==>dest

Complimentary operation

OPTIONS:

None

INSTRUCTION FORMAT AND ASSEMBLER SYNTAX: shown in FIG. 103.

STATUS FLAGS AFFECTED: shown in FIG. 104.

DESCRIPTION:

Negate the sign of the operand.

L_flag If the value of dest is negative after the instruction is executed, namely, if the initial value of dest is positive, this flag is set.

M_flag If MSB of dest is 1 after the instruction is executed, namely, if the initial value of dest is positive or the minimum negative value, this flag is set.

Z_flag If the value of dest is 0 after the instruction is executed, namely, if the initial value of dest is 0, this flag is set.

V_flag If the initial value of dest is the minimum negative value (only MSB is 1 and other bits are all 0), this flag is set.

PROGRAM EXCEPTION:

Reserved instruction exceptions

When MM='11'

When EaM is #imm_data, @SP+ or @-SP

MNEMONIC:

INDEX indexsize,subscript,xreg

OPERATION:

calculate address of array

OPTIONS:

None

INSTRUCTION FORMAT AND ASSEMBLER SYNTAX: shown in FIG. 105.

STATUS FLAGS AFFECTED: shown in FIG. 106.

DESCRIPTION:

Multiply by the scale and add the index for calculating the address in order to convert a multiple dimensional array into a single dimensional array.

If the size of the subscript is smaller than that of xreg, the subscript is sign-extended. xreg, indexsize, and subscript are treated as signed integers. The multiplication and addition are performed with signed numbers. If an overflow is detected in the multiplication or addition operations, V_flag is set.

Although indexsize is always immediate, to create an array descriptor in the memory, general purpose addressing is used.

If the INDEX instruction is executed after the CHK instruction, it is possible only to specify the register for the subscript. However, depending on the high level language specification, the range may not be checked (namely, the CHK instruction is not executed). Therefore, in order to use the variable in the memory as a subscript, it can also be addressed by the general purpose addressing.

[Operation of INDEX]

xreg*indexsize+subscript==>xreg

In the INDEX instruction, all the operands xreg, indexsize, and subscript are treated as signed numbers rather than pointers. Even if they are negative, they are used directly rather than performing special operations such as EIT. In addition, the status flags (V_flag, L_flag, M_flag and Z_flag) are based on the general arithmetic operation instructions. The operands which are used in INDEX, are array indexes rather than pointers. INDEX transforms the array index into a single dimension array.

The index becomes the pointer after the scaling, such as (×4), is performed in the additional mode. Therefore, it is possible to consider INDEX as signed data. Testing for negative indexs can be done if a language cannot deal with a negative index.

If !=0, the operation cannot be assured.

In the data processor of the present invention, if !=0, the contents of the operand are fetched as !R (8 bits or 16 bits) in the src size. It is sign-extended to 32 bits and the instruction is executed.

However, xreg is always treated as 32 bits regardless of !R.

PROGRAM EXCEPTION:

Reserved instruction exceptions

When −!='0'

When R='1'

When SS='11'

When EaR or EaR2 is @-SP 12-4 Logical Instructions

MNMONIC:

AND src,dest

OPERATION:

dest .and. src ==>dest

AND operation

OPTIONS:

None

INSTRUCTION FORMAT AND ASSEMBLER SYNTAX: shown in FIG. 107.

STATUS FLAGS AFFECTED: shown in FIG. 108.

DESCRIPTION:

AND the contents of the source operand (src) and those of the destination operand (dest).

If the size of the source operand differs from that of the destination operand (AND:G RR≠MM and AND:E MM≠00), the instruction is executed directly and the reserved instruction exception does not occur. However, the result which is sent to dest cannot be assured (it depends on the hardware implementation). The the data processor of the present invention specification does not define the logical operation between different size operands. Although the logical operation between different size operands does not have meaning, it is not treated as a reserved instruction exception. Otherwise, the implementation's load is increased and the execution speed is lowered.

M_flag R0

Z_flag R0 to d-1]=0

PROGRAM EXCEPTION:

Reserved instruction exceptions

When RR='11'

When MM='11'

When EaR is @-SP

When EaM is #imm_data, @SP+ or @-SP

MNEMONIC:

OR src,dest

OPERATION:

dest .or. src==>dest

OR operation

OPTIONS:

None

INSTRUCTION FORMAT AND ASSEMBLER SYNTAX: shown in FIG. 109.

STATUS FLAGS AFFECTED: shown in FIG. 110.

DESCRIPTION:

OR the contents of the source operand (src) with those of the destination operand (dest).

If the size of the source operand differs from that of the destination operand (OR:G RR≠MM and OR:E MM≠00), the instruction is executed directly and the reserved instruction exception does not occur. However, the result which is sent to dest cannot be assured (it depends on the hardware implementation).

PROGRAM EXCEPTION:

Reserved instruction exceptions

When RR='11'

When MM='11'

When EaR is @-SP

When EaM is #imm_data, @SP+ or @-SP

MNEMONIC:

XOR src,dest

OPERATION:

dest .xor. src==>dest

Exclusive or operation

OPTIONS:

None

INSTRUCTION FORMAT AND ASSEMBLER SYNTAX: shown in FIG. 111.

STATUS FLAGS AFFECTED: shown in FIG. 112.
DESCRIPTION:

Exclusive or the contents of the source operand (src) with those of the destination operand (dest).

If the size of the source operand differs from that of the destination operand (XOR:G RR≠MM and XOR:E MM≠00), the instruction is executed directly and the reserved instruction exception (RIE) does not occur. However, the result which is sent to dest cannot be assured (it depends on the hardware implementation).

PROGRAM EXCEPTION:

Reserved instruction exceptions

When RR='11'

When MM='11'

When EaR is @-SP

When EaM is #imm_data, @SP+ or @-SP

MNEMONIC:

NOT dest

OPERATION:

dest==>dest

Logical not at all bits.

OPTIONS:

None

INSTRUCTION FORMAT AND ASSEMBLER SYNTAX: shown in FIG. 113.

STATUS FLAGS AFFECTED: shown in FIG. 114.

DESCRIPTION:

Complement 1 and 0 of each bit of the operand.

M_flag If MSB of dest is 1 after the instruction is executed, namely, if MSB of the initial value of dest is 0, this flag is set.

Z_flag If the value of dest is 0 after the instruction is executed, namely, if the initial value of dest is 0, this flag is set.

PROGRAM EXCEPTION:

Reserved instruction exceptions

When MM='11'

When EaM is #imm_data, @SP+ or @-SP 12-5 Shift Instructions

MNEMONIC:

SHA count,dest

OPERATION:

Shift arithmetic OPTIONS:

None

INSTRUCTION FORMAT AND ASSEMBLER SYNTAX: shown in FIG. 115.

STATUS FLAGS AFFECTED: shown in FIG. 116.

DESCRIPTION:

Arithmetically shift the contents of the destination operand (dest) for the number of bits specified by the source operand (count). In the general format instruction, the shift direction is determined by the sign of count: if count is positive, a left shift takes place; if count is negative, a right shift takes place.

The right shift operation in the arithmetic shift operation causes MSB (sign bit) of the destination operand not to be changed and the same value to be copied to the bit to the right of the sign bit. The left shift operation causes the contents of LSB to shifted into the bit to the left of the LSB and 0 to be placed in LSB.

The specification of the shift direction by count may be effective for the emulation of floating point operation.

Although the left shift operation does not have a short format of SHA, if the status flags change which differs from SHA is permissible, SHL:Q which is a short format of SHL can alternatively be used.

Figure 117:
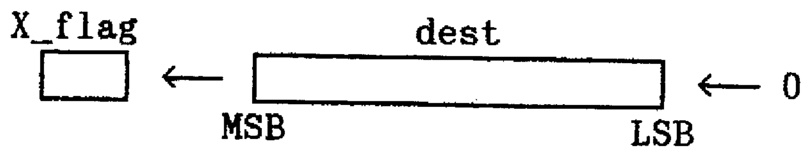
FIG. 117 is an illustration of the left-side shift.

[left shift operation (count>0)]:

diagrammed in FIG. 117.

Figure 118:
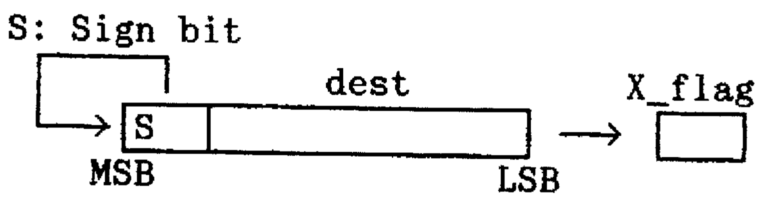
FIG. 118 is an illustration of the right-side shift.

[right shift operation (count<0)]:

diagrammed in FIG. 118.

If count=0, X_flag=0.

In the SHA instruction, only the lower 8 bits are used to determine the size of count. If RR≠00, the operation cannot be assured. The reason the RR≠00 function cannot be used is due to the restriction of the implementation.

If RR≠00, the data processor of the present invention fetches the count operand in the size RR. Only the lower 8 bits of count are used to execute the instruction.

Since SHA is an arithmetic instruction, it sets L_flag depending on the sign (MSB) of dest, so that the correct signs of the result can be obtained even if an overflow or underflow occurs. In a shift instruction, unless an overflow occurs, the sign of dest is not changed. In a right shift operation or if an overflow does not occur in a left shift operation, L_flag=M_flag. However, if an overflow occurs in a left shift operation, L_flag may not be the same as M_flag.

Because the data processor of the present invention is a big-endian chip, the shift direction differs depending on whether count is considered as an increase/decrease of the bit position or as a power of 2. In other words, in the first case, if count>0, a right shift operation would take place. In the latter case it is like little-endian; if count>0, the left shift operation takes place. However, the shift operations are similar to arithmetic instructions rather than bit operation instructions. Consequently, count should be considered as powers of 2 rather than as an increase/decrease of bit position. Thus, the specification of the data processor of the present invention defines that left shift operation takes place if count>0.

In SHL and SHA, even if the absolute value of count exceeds (dest size+1), the shift operation is continued for the number of times specified. Consequently, the absolute value of count functions like (dest size+1). For example, the following operations take place.

| | | |
|---|---|---|
| SHA #33, dest,W | : | dest = X_flag = 0 |
| SHL #33, dest,W | : | dest = X_flag = 0 |
| SHA #-33, dest,W | : | dest = X_flag = MSB of a previos dest |
| SHL #-33, dest,W | : | dest = X_flag = 0 |

Except for X_flag, if the absolute value of count is the same as (dest size), the same result is obtained.

PROGRAM EXCEPTION:

Reserved instruction exceptions

When RR='11'

When MM='11'

When EaR is @-SP

When EaM or ShM is #imm_data, @SP+ or @-SP

MNEMONIC:

SHL count,dest

OPERATION:

shift logical

OPTIONS:

None

INSTRUCTION FORMAT AND ASSEMBLER SYNTAX: shown in FIG. 119.

STATUS FLAGS AFFECTED: shown in FIG. 120.

DESCRIPTION:

Logically shift the contents of the destination operand (dest) for the number of bits specified by the contents of the source operand (count). In the general format, the shift direction is specified by the sign of count. If count is positive, a left shift takes place. If count is negative, a right shift takes place.

The right shift operation causes the contents of MSB to shifted into the bit to the right of the MSB and 0 to be placed. The left shift operation causes the contents of LSB to shifted into the bit to the left of the LSB and 0 to be placed in LSB.

[A left shift operation (count>0)]:

diagrammed in FIG. 121.

[A right shift operation (count<0)]:

diagrammed in FIG. 122.

If count=0, X_flag=0.

In the SHL instruction, only the lower 8 bits are used as the shift count. If RR≠00, the operation cannot be assured. The reason the RR≠00 function cannot be used is due to the restrictions of the implementation.

If RR≠00, the data processor of the present invention fetches the count operand in the size RR. Only the lower 8 bits of count are used to execute the instruction.

PROGRAM EXCEPTION:

Reserved instruction exceptions

When RR='11'

When MM='11'

When EaR is @-SP

When EaM or ShM is #imm_data, @SP+ or @-SP

MNEMONIC:

ROT count,dest

OPERATION:

rotate

OPTIONS:

None

INSTRUCTION FORMAT AND ASSEMBLER SYNTAX: shown in FIG. 123.

STATUS FLAGS AFFECTED: shown in FIG. 124.

DESCRIPTION:

Rotate the contents of the destination operand for the number of bits being specified by the operand count.

The shift operation is performed by filling the bit from LSB (MSB) to MSB (LSB).

The direction of the rotation is specified by the sign of count. If the count is positive, a left rotation takes place. If the count is negative, a right rotation takes place.

When a rotation takes place, dest does not rotate through X_flag (although it does set it).

[A left rotation (count>0)]:

diagrammed in FIG. 125.

[A right rotation (count<0)]:

diagrammed in FIG. 126.

If count=0, X_flag=0.

In the ROT instruction, only the lower 8 bits are used as the count. If RR≠00, the operation cannot be assured. The reason the RR≠00 function cannot be used is due to restrictions of the implementation.

If RR≠00, the data processor of the present invention fetches the count operand in the size RR. Only the lower 8 bits of count are used to execute the instruction. Even if the absolute value of count in ROT exceeds 'dest size', the rotation for the specified number is executed. Consequently, the result is the same as the remainder where count is divided by 'dest size' is treated as count. However, if the contents of count is an integer times 'dest size' (except for count=0), X_flag is set depending on MSB (in a right rotation) or LSB (in a left rotation) unlike the case of count=0. For example, in a left rotation, if the number of bits which are rotated are the same as the data size, the data is not changed and dest becomes the same value as when count=0. However, since LSB of the former data is copied to the X_flag, the status flags change in the different manner than when count=0

PROGRAM EXCEPTION:

Reserved instruction exceptions

When RR='11'

When MM='11'

When EaR is @-SP

When EaM is #imm_data, @SP+ or @-SP

MNEMONIC:

SHXL dest

OPERATION:

logical shift left with extend

OPTIONS:

None

Figures 127, 128, 129:
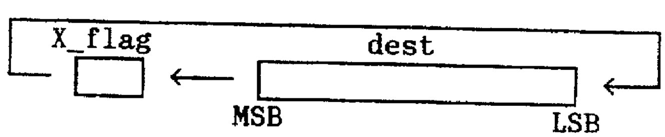
FIG. 127 is a view of the format of instruction SHXL.
FIG. 128 is an illustration of flag change thereof.
FIG. 129 is a view of the format of instruction XHXL.

INSTRUCTION FORMAT AND ASSEMBLER SYNTAX: shown in FIG. 127.

STATUS FLAGS AFFECTED: shown in FIG. 128.

DESCRIPTION:

Shift the contents of dest to the left for one bit and place the contents of the former X_flag in LSB. The bit which is carried out from MSB is placed in X_flag. This instruction is a primitive for a special instruction which shifts one bit of multiple words.

The specification of this instruction differs a lot from those of SHA, SHL and ROT in that the size to be shifted is fixed at 32 bits and only one bit shift operation is available.

Although DIVX is used when the dividend is a multiple length number, if the divider becomes a multiple length number, DIVX cannot be used. The division should be performed by continuing the shift operations and subtraction operations. At that time, a multiple length shift operation is required. This instruction serves such a purpose: of which diagram is shown in FIG. 129.

PROGRAM EXCEPTION:

Reserved instruction exceptions

When+='0'

When−='1'

When X='1'

When EaMX is #imm_data, @SP+ or @-SP

MNEMONIC:

SHXR dest

OPERATION:

logical shift right with extend

OPTIONS:

None

Figures 130, 131, 132:
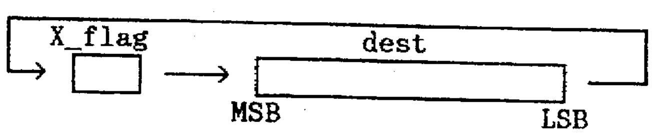
FIG. 130 is an illustration of flag change thereof.
FIG. 131 is a view of the format of instruction SHXR.
FIG. 132 is a view of the format of instruction SHXR.

INSTRUCTION FORMAT AND ASSEMBLER SYNTAX: shown in FIG. 130.

STATUS FLAGS AFFECTED: shown in FIG. 131.

DESCRIPTION:

Shift the contents of dest to the right for one bit and place the contents of the former X_flag in MSB. The bit which is carried out from LSB is placed in the X_flag. This instruction is a primitive for a special instruction which shifts one bit of multiple words.

The specification of this instruction differs a lot from those of SHA, SHL and ROT in that the size to be shifted is fixed at 32 bits and only one bit shift operation is available.

Although DIVX is used when the dividend is multiple length number, if the divider becomes a multiple length number, DIVX cannot be used. The division should be performed by continuing the shift operations and subtraction operations. At that time, a multiple length shift operation is required. This instruction serves such a purpose: of which diagram is shown in FIG. 132.

PROGRAM EXCEPTION:

Reserved instruction exceptions

When +=‘0’

When −=‘1’

When X=‘1’

When EaMX is #imm_data, @SP+ or @-SP

MNEMONIC:

RVBY src,dest

OPERATION:

reverse byte order

OPTIONS:

None

INSTRUCTION FORMAT AND ASSEMBLER SYNTAX: shown in FIG. 133.

STATUS FLAGS AFFECTED: shown in FIG. 134.

DESCRIPTION:

Reverse the byte order of the contents of src and place them in dest.

If the size of dest is larger than that of src, the size of src is zero-extended to that of dest and the reverse byte order is placed in dest.

If the size of dest is smaller than that of src, the high order bytes of src are truncated, the size of src is matched to that of dest, and the reverse byte order is placed in dest. (Even if the address of src is moved and then the size of src is matched to that of dest, the same result is obtained.)

EXAMPLE src=H'1234

RVBY src.H,dest.H==>dest=H'3412

RVBY src.H,dest.W==>dest=H'34120000

RVBY src.H,dest.B==>dest=H'34 (Not H'12)

This instruction serves to eliminate the overhead of conversion from one endian format to another endian format.

PROGRAM EXCEPTION:

Reserved instruction exceptions

When RR=‘11’

When MM=‘11’

When EaR is @-SP

When EaM is #imm_data, @SP+ or @-SP

MNEMONIC:

RVBI src,dest

OPERATION:

reverse bit order

OPTIONS:

None

INSTRUCTION FORMAT AND ASSEMBLER SYNTAX: shown in FIG. 135.

STATUS FLAGS AFFECTED: shown in FIG. 136.

DESCRIPTION:

Reverse the bit order of the contents of src and place them in dest.

If the size of dest is larger than that of src, src is zero-extended to the size of dest and the reverse bit order is placed in dest.

If the size of dest is smaller than that of src, the high order bytes of src are truncated, the size of src is matched to that of dest, and the reverse bit order is placed in dest. (Even if the address of src is moved and then the size of src is matched to that of dest, the same result is obtained.)

This instruction serves to eliminate the overhead of conversion from one endian format to another endian format.

The bit reverse instruction RVBI, which reverses the bit order, is also necessary for the bit map process. However, since it is less frequently used than the byte reverse instruction and additional hardware may be required, the RVBI instruction is defined in <<L2>>.

PROGRAM EXCEPTION:

Reserved instruction exceptions

When RR=‘11’

When MM=‘11’

When EaR is @-SP

When EaW is #imm_data, @SP+ or @-SP 12-6 Bit Manipulation Instructions

The bit manipulation instructions that the data processor of the present invention provides specify the bit to be operated on by using the two parameters shown in the following example.

base(base address)

offset(bit address)

In addition, when operating on a bit of a register, the base size affects the specification of the bit to be operated.

Figures 137, 138:
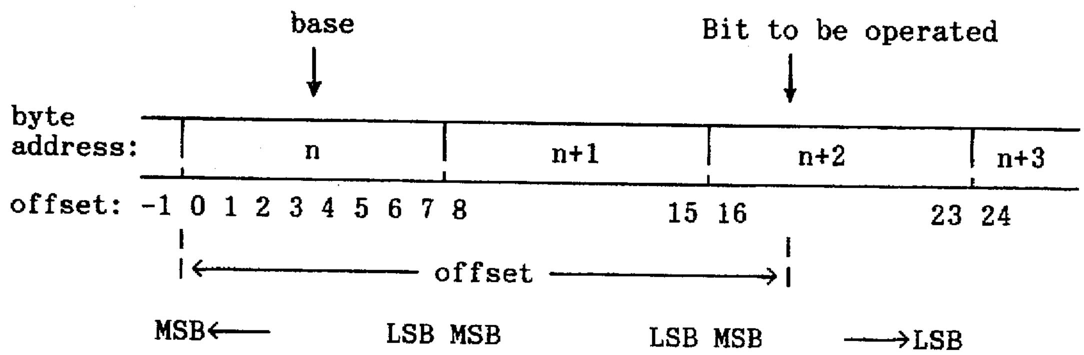
FIGS. 137 and 138 are illustrations of bit operation instruction.

[When operating on a bit of a memory]:

diagrammed in FIG. 137.

The general bit manipulation instructions that the data processor of the present invention provides do not restrict the value of offset, so it can exceed the byte boundary. Offset is treated as signed integer.

The bit manipulation instructions are designed so that they can specify the range for accessing the memory using the BB field. In other words, the memory address range can be specified for read operations by BTST and for read-modify-write operation by BSET, BCLR and BNOT. The memory address range which is accessed should take into account the I/O and the use of multiple processors.

Since accessing every byte (‘.B’) covers all cases, accessing every halfword and word are defined in <<L2>> (except for the bit manipulation instruction for registers). Since accessing every half word and word is available only when the half word and word should be aligned, to use the accessing function, an address which is aligned should be specified as required so that the implementation of the access range is simplified. To access the memory that contains the related bit every half word being aligned, it is necessary to specify a multiple of 2 as base. To access the memory which contains the related bit every word which is being aligned, it is necessary to specify a multiple of 4 as the base. The value of the offset is not restricted. When the access range of an address which is not aligned is specified should depend on the implementation.

The data processor of the present invention implements accessing of the memory every half word and accessing of the memory every word in <<L2>>. If an address which is not aligned as base is specified, the access range is accessed every half word and every word being aligned.

[EXAMPLE]

BSET.B #H'84,@H'100

Since offset % 8=4; base+offset/8=H'110, bit 4 of H'110 is set.

BSET.B #H'7C,@H'101

Since the access size is every byte when offset % 8=4; base+offset/8=H'110, the same operation as BSET.B #H'84, @H'100 is performed.

BSET.W #H'84,@H'100

Since offset % 8=4; base+offset/8=H'110, bit 4 of H'110 is set.

Since base is a multiple of 4, the read-modify-write operation for 32 bits (H'110 to H'113) which are aligned is performed to set the related bit.

BSET.W #H'7c,@H'101

Since offset % 8=4; base+offset/8=H'110, likewise bit 4 of H'110 is set. However, since base is not a multiple of 4, the access range for the read-modify-write operation depends on the implementation.

The size represented by BB is "in what range the read-modify-write operation is performed" rather than representing the offset range (for example, if '.B', the offset is less than 8, and so forth).

In the bit manipulation instructions for registers, since the bit position of offset=0 (MSB) varies depending on the access size (base size), the base size is important. If base is register direct Rn, the base sizes '.H' and '.W' are defined in <<L1>>.

In the bit manipulation instructions where the register Rn is treated as the base, only the low order 3 bits with '.B', only the low order 4 bits with '.H'', only the low order 5 bits with '.W', and only the low order 6 bits with '.L' are enabled and the high order bits are ignored. Even if the high order bits are not 0, an error or EIT does not occur. Although it is recommended that the offset range be checked like the width of the BF instruction, since the instruction execution time increases due to the check time, modulo is obtained by the bit size for offset.

When 8-bit data, 16-bit data or 32-bit data is held in a register, even if a bit has the same bit position in some data, it actually represents a different value. To prevent the specification from getting complicated, the default of the assembler for the memory and registers should be '.B'. The short format should be the specification of '.B'. Thus, the range of the register which can be accessed in the short format should be the bits from 2^ to 2^7. (See FIG. 138)

[EXAMPLE]

In BSET:Q #1,R0, since the default of BSET is '.B', bit 1 of R0.B is set.

This bit differs from the bit 1 of R0.W and corresponds to bit 25 of R0.W.

For example, when describing the following instruction to access the bit of 2^17,

BTST #17,R0 actually, it is interpreted as

BTST.B #17,R0 and offset ignores the high order bits, so bit 2^1 is accessed.

To prevent that, it is necessary to describe the following instruction.

BTST.W #17,R0

In such a case, it is recommended the assembler generate an alarm.

MNEMONIC:

BTST offset,base

OPERATION:

bit ->Z_flag

Test a bit.

OPTIONS:

None

INSTRUCTION FORMAT AND ASSEMBLER SYNTAX: shown in FIG. 139.

STATUS FLAGS AFFECTED: shown in FIG. 140.

DESCRIPTION:

Complement the bit value being specified and copy the result to Z_flag.

In the addressing mode specified by EaRf or ShRfq, the immediate modes #imm_data, @-SP and @SP+ cannot be used. When using the Rn mode, the values of high order offset bits are ignored.

In the assembler syntax, the memory access size is the same as base size. With BTST:Q, the memory access size is fixed at 8 bits. For specifying the size, it is only possible to describe '.B'.

PROGRAM EXCEPTION:

Reserved instruction exceptions

When RR='11'

When BB='11'

When EaR is @-SP

When EaRf or ShRfq is #imm_data, @SP+ or @-SP

MNEMONIC:

BSET offset,base

OPERATION:

bit ->Z_flag, 1 ->bit

Set a bit.

OPTIONS:

None

INSTRUCTION FORMAT AND ASSEMBLER SYNTAX: shown in FIG. 141.

STATUS FLAGS AFFECTED: shown in FIG. 142.

DESCRIPTION:

Complement the bit value being specified, copy the result to Z_flag, and then set the bit to 1.

In the addressing mode specified by EaMf or ShMfq, the immediate modes #imm_data, @-SP and @SP+ cannot be used. When using the Rn mode, the values of high order offset bits are ignored.

In the assembler syntax, the memory access size is the same as the base size. With BSET:Q, the memory access size is fixed at 8 bits. For specifying the size, it is possible only to describe '.B'.

PROGRAM EXCEPTION:

Reserved instruction exceptions

When RR='11'

When BB='11'

When EaR is @-SP

When EaMf or ShMfq is #imm_data, @SP+ or @-SP

MNEMONIC:

BCLR offset,base

OPERATION:

bit ->Z_flag, 0 ->bit

Clear a bit.

OPTIONS:

None

INSTRUCTION FORMAT AND ASSEMBLER SYNTAX: shown in FIG. 143.

STATUS FLAG AFFECTED: shown in FIG. 144.

DESCRIPTION:

Complement the bit value being specified, copy the result to Z_flag, and then clear the bit to 0.

In the addressing mode specified by EaMf or ShMfq, the immediate modes #imm_data, @-SP and @SP+ cannot be used. When using the Rn mode, the values of high order offset bits are ignored.

In the assembler syntax, the memory access size is specified as the base size. With BCLR:Q, the memory access size is fixed at 8 bits. For specifying the size, it is possible only to describe '.B'.

PROGRAM EXCEPTION:

Reserved instruction exceptions

When RR='11'

When BB='11'

When EaR is @-SP

When EaMf or ShMfq is #imm_data, @SP+ or @-SP

MNEMONIC:

BNOT offset,base

OPERATION:

bit ->Z_flag, bit ->bit

Compliment a bit.

OPTIONS:

None

INSTRUCTION FORMAT AND ASSEMBLER SYNTAX: shown in FIG. 145.

STATUS FLAGS AFFECTED: shown in FIG. 146.

DESCRIPTION:

Complement the bit value being specified, copy the result to Z_flag, and then complement the bit.

In the addressing mode specified by EaMf, the immediate modes #imm_data, @-SP and @SP+ cannot be used. When using the Rn mode, the values of high order offset bits are ignored.

In the assembler syntax, the memory access size is specified to be the same as the base size.

PROGRAM EXCEPTION:

Reserved instruction exceptions

When RR='11'

When BB='11'

When EaR is @-SP

When EaMf is #imm_data, @SP+ or @-SP

MNEMONIC:

BSCH data,offset

OPERATION:

find first '0' or '1' in the bitfield (within a word) Search 0 or 1 (in one word).

OPTIONS:

/O Search '0'. (default)

/1 Search '1'.

/F Search 0 or 1 to the direction where the bit number increases. (default)

/B Search 0 or 1 to the direction where the bit number decreases. <<L2>> (the data processor of the present invention supports this option.)

INSTRUCTION FORMAT AND ASSEMBLER SYNTAX: shown in FIG. 147.

STATUS FLAGS AFFECTED: shown in FIG. 148.

DESCRIPTION:

Search for the first bit which is '0' or '1' in a word.

When this instruction is executed, after the bit number (bit offset) to be searched is set to the offset operand, the bit number after the search operation is set to the offset operand. offset is used for the read-modify-write operation because it is assumed the bit search operation may be used repetitively.

The bit position to be searched is restricted to the range from 0 to (data size) of the data operand. It does not exceed the word boundary.

Although any size can be specified for offset, the high order bits of the initial value of offset are ignored in the search operation. The "high order bits" represent the bits higher than log 2 (the number of bits of data). When data is 32 bits, the high order bits are in the range from 2^5 to 2^31.

In the standard specification <<L0>>, the search operation is performed in the direction of the high order bits, namely, in the big-endian the data processor of the present invention, the search operation is performed toward the LSB direction. This operation is conducted by the /F option. The search operation in the reverse direction, namely /B option is defined in the <<L2>> specification because the search operation in the normal direction (LSB) differs from the reverse direction (MSB) in hardware. 8 bits and 16 bits (RR=00,01 of the data size to be searched are defined in <<L2>>.

The data processor of the present invention supports both the/B option and the data size (RR=00,01) of 8 bits and 16 bits in the <<L2>> specification.

Although BSCH is classified in the same group as bit manipulation instructions, it provides much different properties than them. If offset can be freely set in the BSCH instruction like other bit operation instructions, the BSCH instruction may be more easily used. To do that, the BVSCH instruction is provided. Thus, BSCH is defined as a much lower grade specification and the range of offset is restricted. The effective range of offset is the same as that where the register direct mode Rn is specified by another bit operation instruction. However, take care that the offset and base of other bit manipulation instructions are read-only and read-modify-write, respectively, while offset and data (base address) of BSCH are read-modify-write and read-only, respectively.

If the specified bit is not found with BSCH/F, offset of the bit following the last bit (word boundary) is set and V_flag=1 takes place. If the search operation is unsuccessfully terminated, an EIT does not occur. The number of bits being searched is added to offset.

[EXAMPLES]

When BSCH/0/F @mem1.W,R0 is executed with @mem1=H'00000000, R0=0, and big-endian, ==>R0=0 remains unchanged and V_flag is set to 0.

When BSCH/0/F @mem1.W,R0 is executed with @mem1=H'ffff7fff, R0=0, and big-endian, ==>R0=16 takes place and V_flag is set to 0.

When BSCH/0/F @mem1.W,R0 is executed with @mem1=H'ffffffff, R0=0, and big-endian, ==>R0=32 takes place and V_flag is set to 1.

If the specified bit is not found with BSCH/B, the offset is set to (−1). In this case, V_flag is also set; however, an EIT does not occur.

In the BSCH instruction, the high order bits of the initial value of offset are ignored, while the high order bits of the offset value (result of the search operation), which is set after the instruction is terminated, are meaningful. In other words, after the BSCH instruction is executed, the high order bits of offset are also rewritten regardless of what was originally in it. If the search operation is successfully terminated, the contents of the offset range from 0 to 31 (when data is 32 bits), for any case of /F and /B, the high order bits are always 0. In addition, the search operation is unsuccessfully terminated with /F, the contents of offset become 32. Consequently, the high order bits and low order bits become 00.....001 and 00000, respectively. If the search operation is unsuccessfully terminated with /B, the contents of offset become (−1), so that the high order bits and the low order bits become 11....111 and 11111, respectively.

[EXAMPLES]

When BSCH/0/F @mem1.W,R0.W is executed with @mem1=H'00000000 and R0=H'00000020, ==>R0= H'00000000 takes place. (R0≠H'00000020)

When BSCH/0/F @mem1.W,R0.W is executed with @mem1=H'fff7fff and R0=H'00000020, ==>R0=H'00000010 takes place. (R0≠H'00000030)

When BSCH/0/F @mem1.W,R0.W is executed with @mem1=H'ffffff and R0=H'12345678, ==>Since the search operation is unsuccessfully terminated, R0=H'00000020 and V_flag=1 take place.

When BSCH/0/F @mem1.W,R0.W is executed with @mem1=H'ffffff and R0=H'00000020, ==>Since the search operation is unsuccessfully terminated, V_flag is set to 1 and R0=H'00000020 remains unchanged. (R0≠H'00000040 (carry-out))

PROGRAM EXCEPTION:

Reserved instruction exceptions

When RR='11'

When MM='11'

When EaR is @-SP

When EaM is #imm_data, @SP+ or @-SP 12-7 Fixed Length Bit Field Manipulation Instructions The bit field is specified by the MSB position and bit field width. The MSB position of the bit field is represented by a combination of base and offset. The memory's MSB (bit 0) represented by base is offset=0. The function of offset is the same as that of bit manipulation instructions. The relationship among the bit field, base, offset and width is as follows.

Figure 149:
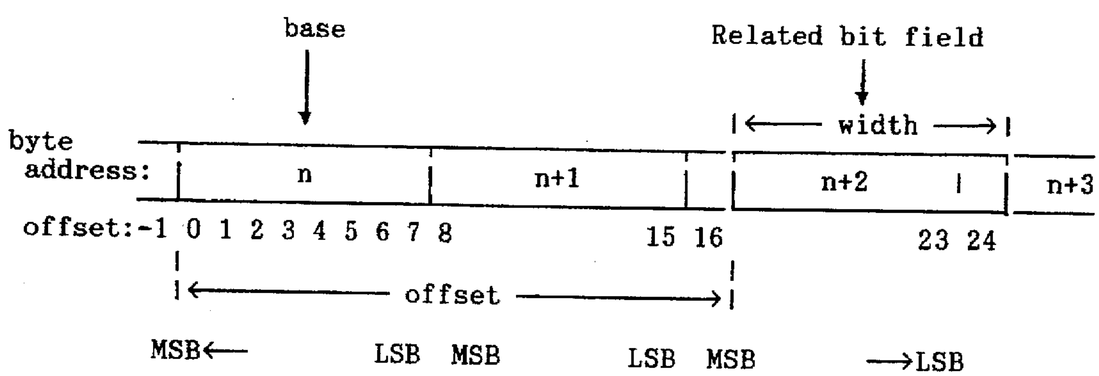
FIG. 149 is an illustration of fixed length bit field operation instruction.

[When the bit field manipulation is performed in the memory]: diagrammed in FIG. 149.

The fixed length bit field manipulation instructions (BFEXT, BFEXTU, BFCMP, BFCMPU, BFINS, BFINSU) are especially effective for the AI oriented tag processing (comparison and separation of tags).

The fixed length bit field instructions have the following two formats.

offset is specified by the 8-bit general addressing mode, while width is specified by a register. This format is termed the 'G:' format. In the ':G' format, the memory address to be actually accessed is determined by adding, the value where the content of offset is divided by 8, to the base. This method allows a bit field consisting of 26 bits and ranging over 5 bytes.

offset is specified by an 8-bit immediate value, while width is specified by a literal. This format is termed the ':E' format. In the ':E' format, only a bit field which does not exceed the word boundary is processed in order to increase the process speed. A result which is larger than one word of base is not assured. Even if width+offset>size, an EIT does not occur. However, the value being read and written becomes uncertain. Since the instruction specification can be obtained by accessing one word of base, it is possible to determine the memory address of the bit field to be operated by referencing only the base. Thus, depending on the implementation, the instruction can be executed at a high speed.

The addressing mode which is available from the base of BF:E is exactly the same as that of BF:G.

BFINS, BFINSU, BFCMP and BFCMPU have the following two formats for both :G and :E formats.

Specify the src operand by a register. :R format

Specify the src operand by an immediate. :I format

The value of the width is restricted in the range from 1 to 32 (from 1 to 64 in <<LX>>), so that before executing the instruction, the value of the width is checked to determine whether it is in the range of 0<width≦32 (64). If width=0, an error occurs. If the value is out of the range, an invalid operand exception (IOE)occurs. The contents of both offset and width for all instructions, are treated as signed numbers. However, since the value available for width is in the range from 1 to 32 (64), whether it is signed or unsigned does not affect the actual operation, but a problem in the specification occurs. Offset of the instruction in the :E format is treated as a signed number. Offset represents a value in the range from −128 to +127. (However, as described later, the bit field which is larger than one word base to base+3 of the base address is not assured in the :E format.)

The operand which is not the bit field of the BF instruction is treated as a normal integer. For BFEXT, the bit field being obtained is set to the LSB side of the register and the sign extension is performed to words the MSB rather than setting the bit field in accordance with the bit position=0 (MSB).

If a register is treated as a base, the bit field is restricted in one register range. The data processor of the present invention supports fixed length bit field instructions which use registers in the <<L2>> specification because at present the bit field operations which treat these registers can be executed at a much higher speed by a combination of the shift instruction and the AND instruction rather than by the BF:E instruction. In the bit field instructions which use registers (<<L2>>), :G like :E can not assure the result of an operation of the bit field which is larger than one word (register). In BFEXT and BFEXTU, a meaningless value is obtained, while in BFINS and BFINSU, it is ignored. If offset+width≧size, an EIT does not occur.

In the :E format, the result of the operation that has a bit offset which exceeds the size is not assured. The result of the operation which has negative bit offset is also not assured. The operation which contains the base address in one word is correctly executed.

[EXAMPLE]

| | | | |
|---|---|---|---|
| address | N-1 | N | N+1 |
| data | B'abcdefgh | B'ijklmnop | B'qrstuvwx |
| | | | (a to x: 0 or 1), |

BFEXT:E.W #3,#9,@N,R0 ==> R0 = B'lmnopqrst

BFEXT:E.W #-5,#9,@N,R0 ==> R0 = B'?????ijkl (? is an unstable value.)

The width, src and dest registers are commonly specified by the X field. The size specification field X serves to switch between 32-bit operation and 64-bit operation (<<LX>>). It functions as follows:

(1) Specify the src (dest) register size (in :R format).

(2) Specify the width register size (in :G format).

(3) Specify the width range.

When X=0, 0<width≦32

When X=1, 0<width≦64

In the :E:I format, (1) and (2) above do not function. To distinguish (3), the X field is used. In other words, the X field serves to enhance the compatibility of 32-bit operation and 64-bit operation.

If SS≠00 in the :I format instruction, the #iS8 field is not used. Even if the #iS8 field is not 0, it is ignored. It is important that the user note that the field of #iS8 should be filled with zeroes.

The formats and the sizes used for the bit field instructions are shown in FIG. 150.

In the bit field instructions, like the bit operation instructions, the memory range to be accessed should be considered. However, it depends on the implementation, so that a strict definition is not required.

MEMONIC:

BEFEXT offset, width, base, dest

OPERATION:

extract bit field (signed)

OPTIONS:

None

INSTRUCTION FORMAT AND ASSEMBLER SYNTAX: shown in FIG. 151.

STATUS FLAGS AFFECTED: shown in FIG. 152.

DESCRIPTION:

Extract the bit field and transfer the result to the destination.

If the size of the destination is larger than the width of the bit field, the data is sign-extended. The offset of BFEXT:G is also sign-extended.

In the EaRbf addressing mode, the @-SP, @SP+and #imm_data modes cannot be used. Although the register direct mode Rn of base is specified in <<L2>>, the data processor of the present invention supports it.

[Operation]

Assume that the initial value of dest is

[D0.D1....Dd-2.Dd-1] d=32,64 the value which is set to dest is

[R0.R1....Rd-2.Rd-1] d=32,64 offset=o,width=w offset and width are treated as signed numbers. (If width≦0 or width>d, an invalid operand exception (IOE) occurs.)

The extracted bit field and the flag change occur as follows:

---

(If d≧w)
bit 0 of base
↓
[. . . B0.B1 . . . . Bo–2.Bo–1.Bo.Bo+1 . . . . Bo+w–1.Bo+w.Bo+w+1 . . . ]
This portion is sign-extended and is set to dest.
[ Bo. Bo+1 . . . . Bo+w–2.Bo+w–1] ==>
[Bo.Bo . . . . . . Bo. Bo. Bo+1 . . . . Bo+w–2.Bo+w–1] ==>
Sign-extended for d-w bits
[R0.R1 . . . Rd–w–1.Rd–w.Rd–w+1 . . . . . . Rd–2. Rd–1] (Set to dest)
(If d<w)
It does not occur in the data processor32 of the present invention.
bit 0 of bas
↓
[. . . B0.B1 . . . . . Bo-1.Bo.Bo+1 . . . . Bo+w–d–1.Bo+w–d . . . .Bo+w–2.Bo+w–1.Bo+w . . .]
This portion is truncated. This Portion is set to dest.
[Bo.Bo+1 . . . . Bo+w–d–1.Bo+w–d . . . . Bo+w–2.Bo+w–1] ==>
[Bo+w–d . . . . Bo+w–2.Bo+w–1] ==>
This portion is truncated.
[ R0 . . . . . . Rd–2. Rd–1] (Set to dest)

| | |
|---|---|
| M_flag | R0<br>(If d≧w) Bo<br>(If d<w) Bo+w–d |
| Z_flag. | [R0 to d–1 = 0<br>(If d≧w) [Bo to o+w–1] = 0<br>(If d<w) [Bo+w–d to o+w–1] = 0 |
| V_flag* | S[Bo to o+w–1] < –2^(d–1) .or.<br>S[Bo to o+w–1] ≧ +2^(d–1)<br>(If d≧w) 0<br>(If d<w) Cleared when Bo=Bo+1= . . . =Bo+w–d–1= Bo+w–d.<br>Otherwise, it is set. |

In the data processor32 of the present invention, it is always cleared.

---

PROGRAM EXCEPTION:

Reserved instruction exceptions

When RR='11'

When+='11'

When X='1'

When EaR is @-SP

When EaRbf is #imm_data, @SP+ or @-SP

Invalid operand exception

When width<0 or width>32

MNEMONIC:

BFEXTU offset,width,base,dest

OPERATION:

extract bit field(unsigned)

OPTIONS:

None

INSTRUCTION FORMAT AND ASSEMBLER SYNTAX: shown in FIG. 153.

STATUS FLAGS AFFECTED: shown in FIG. 154.

DESCRIPTION:

Extract the bit field and transfer the result to the destination.

If the size of the destination is larger than the width of the bit field, the data is zero-extended. However, offset of BFEXTU:G is also sign-extended.

In the EaRbf addressing mode, the modes of @-SP, @SP+ and #imm_data cannot be used. Although the register direct mode Rn of base is specified in <<L2>>, the data processor of the present invention supports it.

[Operation]

Assuming that the initial value of dest is

[D0.D1....Dd-2.Dd-1] d=32,64 the value which is set to dest is

[R0.R1....Rd-2.Rd-1] d=32,64 offset=0, width=w offset and width are treated as signed numbers. (If width≦0 or width>d, an invalid operation exception (IOE) occurs.)

The extracted bit field and flag change occur as follows:

---

(If d≧w)
bit 0 of base
↓
[. . . B0.B1 . . . . Bo–2.Bo–1.Bo.Bo+1 . . . Bo+w–2.Bo+w–1.Bo+w.Bo+w+1 . . .]
This portion is sign-extended and set to dest.
[ Bo. Bo+1 . . . . Bo+w–2.Bo+w–1] ==>
[ 0 . . . . . . . 0. Bo. Bo+1 . . . . Bo+w–2.Bo+w–1] ==>
Sign-extended for d–w bits
[R0.R1 . . . Rd–w–1.Rd–w.Rd–w+1 . . . . . . Rd–2. Rd–1] (Set to dest)
(If d<w)
It does not occur in the data processor32 of the present invention.
bit 0 of base
↓
[. . B0.B1 . . . . . Bo–1.Bo.Bo+1 . . . . Bo+w–d–1. Bo+w–d . . . Bo+w–2.Bo+w–1.Bo+w . . .]
This portion is truncated. This portion is set to dest.
[Bo.Bo+1 . . . . Bo+w–d–1.Bo+w–d . . . . Bo+w–2.Bo+w–1] ==>
[Bo+w–d . . . . Bo+w–2.Bo+w–1] ==>
This portion is truncated.
[ R0 . . . . . . Rd–2. Rd–1] (Set to dest)

| | |
|---|---|
| M_flag | R0<br>(If d>w) 0<br>(If d=w) Bo<br>(If d<w) Bo+w–d |
| Z_flag | [R0 to d–1) = 0<br>(If d≧w) [Bo to o+w–1] = 0<br>(If d<w) [Bo+w–d to o+w–1] = 0 |
| V_flag* | U[Bo to o+w–1] ≧ +2^d<br>(If d≧w) 0<br>(If d<w) Cleared when Bo=Bo+1= . . . =Bo+w–d–1=0. |

-continued

Otherwise,it is set.
It is always cleared in the data processor of the present invention32.

PROGRAM EXCEPTION:

Reserved instruction exceptions

When RR='11'

When+='0'

When X='1'

When EaR is @-SP

When EaRbf is #imm_data, @SP+ or @-SP

Invalid operand exception

When width<0 or width>32

MNEMONIC:

BFINS src,offset,width,base

OPERATION:

insert bit field (signed)

OPTIONS:

None

Figures 155, 156:
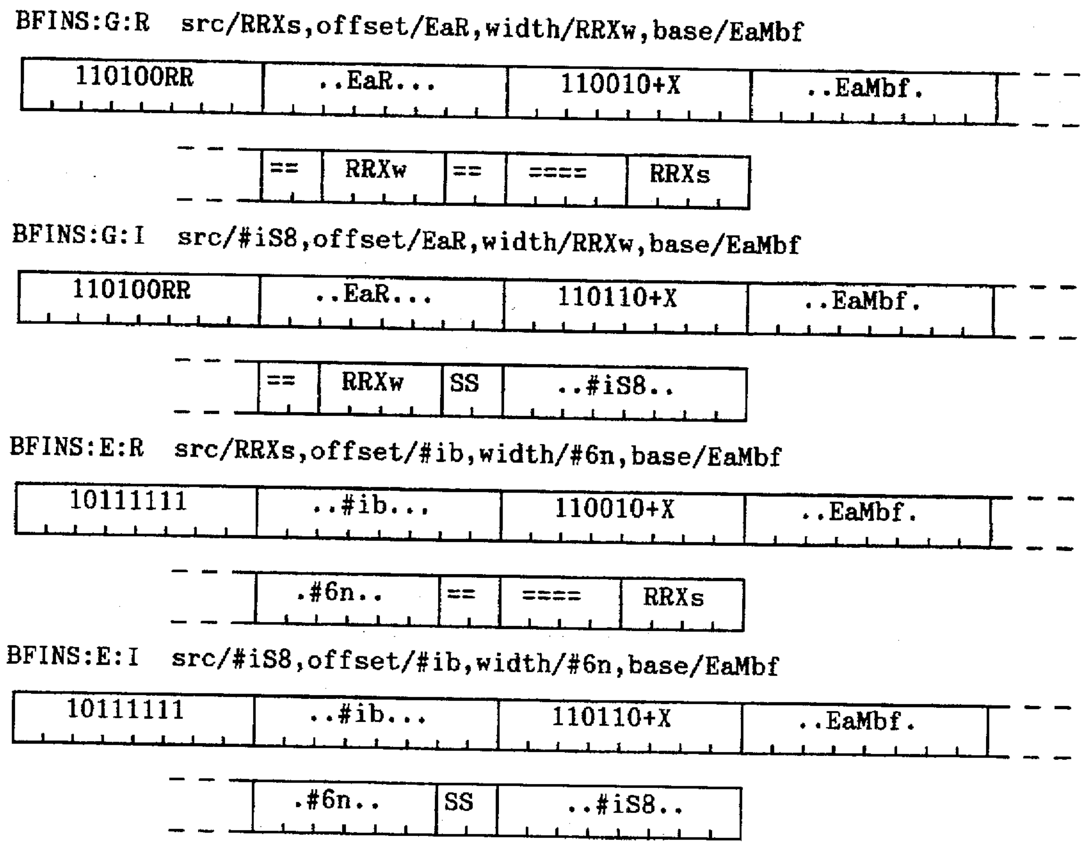
FIG. 155 is a view of the format of instruction BFINS.
FIG. 156 is an illustration of flag change thereof.

INSTRUCTION FORMAT AND ASSEMBLER SYNTAX: shown in FIG. 155.

STATUS FLAGS AFFECTED: shown in FIG. 156.

DESCRIPTION:

Insert the contents of the source into the bit field.

If the size of the bit field width is larger than that of the source, the data is sign-extended. The offset of BFINS:G is also sign-extended.

In the EaRbf addressing mode, the modes of @-SP, @SP+ and #imm_data cannot be used. Although the register direct mode Rn of base is specified in <<L2>>, the data processor of the present invention supports it.

[Operation]

Assume that the initial value of src is

[S0.S1 ... Ss-2.Ss-1] s=8,16,32,64(:I)

s=32,64(:R)

offset=o, and width=w offset and width are treated as signed numbers. (If width≦0 or width>d, an invalid operation exception (IOE) occurs.) The bit field to be inserted and the flag change occur as follows:

```
(If w≧s)
Bit field change
bit 0 of base
    ↓
[ . . . B0.B1 . . . . Bo−1.Bo.Bo+1 . . . . Bo+w−s−1.Bo+w−s.
Bo+w−s+1 . . . .
                                        Bo+w−1.Bo+w . . . ]
                                        ==>
[ . . . B0.B1 . . . . Bo−1.S0.  S0 . . . . . . . . . .S0.
     S0.       S1 . . . . .
                                              Ss−1.Bo+w . . .]
                        src is sign-extended for w−s bits.
(If w<s)
Bit field change
bit 0 of base
    ↓
[ . . . B0.B1 . . . . Bo−2.Bo−1.   Bo.   Bo+1 . . . . Bo+w−1.Bo+w . . . ]
==>
[ . . . B0.B1 . . . . Bo−2.Bo−1.Ss−w.Ss−w+1 . . . . . . Ss-1.Bo+w . . . ]
                             ↑
[S0.S1 . . . . Ss−w−1] of src is truncated.
M_flag       Based on the change of MSB (Bo) in the related bit
field.
                        (If w≧s) S0
                        (If w<s) Ss−w
Z_flag       Based on the change of
[Bo to o+w−1] in the related bit field
                        (If w≧s)   [S0 to s−1] = src = 0
                        (If w<s)   [Ss−w to s−1] = 0
V_flag*      S[S0 to s−1] = src < +2^(w−1) .or.
             S[S0 to s−1] = src ≧ +2^(w−1)
                (If w≧s) 0
                (If w<s) Cleared if S0=S1= . . . =Ss−w−1=Ss−w.
                         Otherwise, it is set.
```

PROGRAM EXCEPTION:

Reserved instruction exceptions

When RR='11'

When+='1'

When X='1'

When SS='11'

When EaR is @-SP

When EaMbf is #imm_data, @SP+ or @-SP

Invalid operand exception

When width≦0 or width>32

MNEMONIC:

BFINSU src,offset,width,base

OPERATION:

insert bit field (unsigned)

OPTIONS:

None

Figures 157, 158:
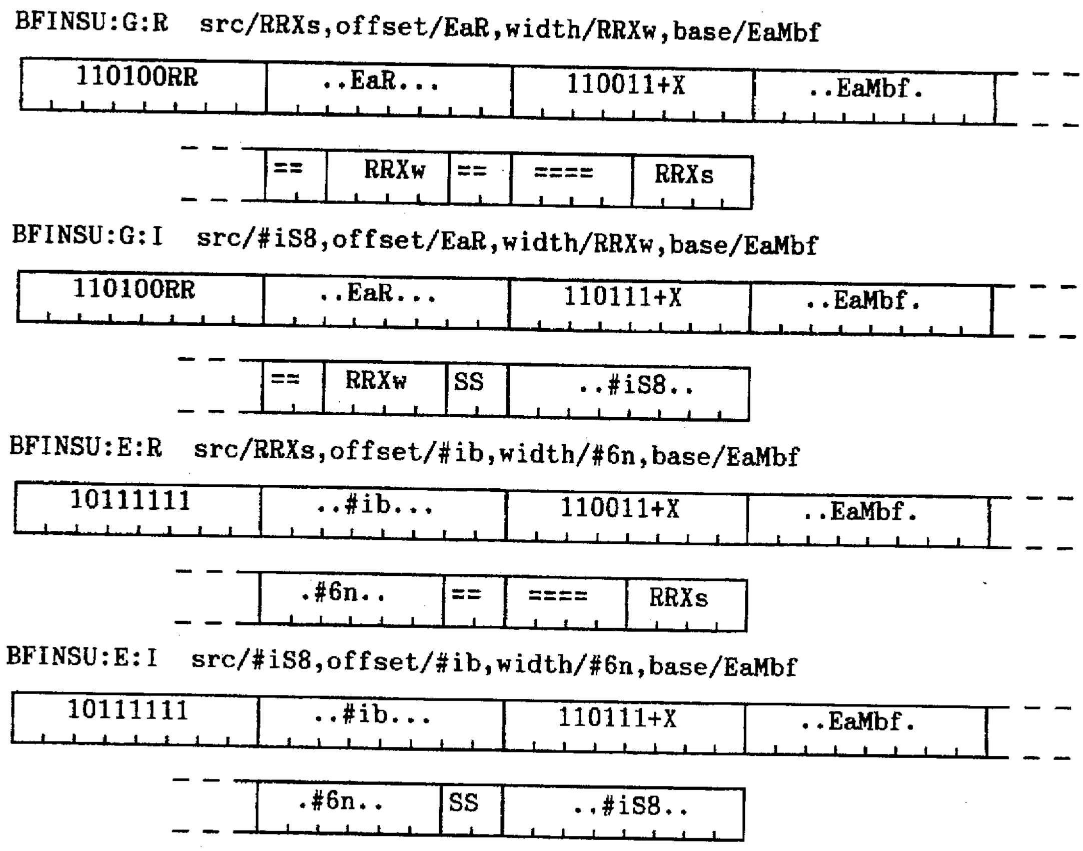
FIG. 157 is a view of the format of instruction BFINSU.
FIG. 158 is an illustration of flag change thereof.

INSTRUCTION FORMAT AND ASSEMBLER SYNTAX: shown in FIG. 157.

STATUS FLAGS AFFECTED: shown in FIG. 158.

DESCRIPTION:

Insert the contents of the source into the bit field.

If the width of the bit field is larger than that of the source, the data is zero-extended. The offset of BFINSU:G is also sign-extended.

In the EaRbf addressing mode, the @-SP, @SP+ and #imm_data mades cannot be used. Although the register direct mode Rn of the base is specified in <<L2>>, the data processor of the present invention supports it.

[Operation]

Assuming that the initial value of src is

[S0.S1 ... Ss-2.Ss-1] s=8,16,32,64(:I)

s=32,64(:R)

offset=o, width=w offset and width are treated as signed numbers. (If width≧0 or width>d, an invalid operation exception (IOE) occurs.)

The bit field to be inserted and the flag change are as follows:

```
(If w≧s)
Bit field change
bit 0 of base
    ↓
[ . . . B0.B1 . . . . Bo−1.Bo.Bo+1 . . . .
Bo+w−s−1.Bo+w−s.Bo+w−s+1 . . . .
                                   Bo+w−1.Bo+w . . .] ==>
[ . . . B0.B1 . . . . Bo−1. 0.   0 . . . . . . . . . . 0.     S0.     S1 . . . . . .
                                                    Ss−1.Bo+w . . .]
                       src is sign-extended for w−s bits.
(If w<s)
Bit field change
bit 0 of base
    ↓
```

-continued

[ . . . B0.B1 . . . . Bo−2.Bo−1. Bo. Bo+1 . . . . Bo+w−1.Bo+w . . .] ⟹
[ . . . B0.B1 . . . . Bo−2.Bo−1.Ss−w.Ss−w+1 . . . . . . Ss−1.Bo+w . . . ]
↑
[S0.S1 . . . . Ss−w−1] of src is truncated.

M_flag field. Based on the change of MSB (Bo) in the related bit
(If w>S) 0
(If w=s) S0
(If w<s) Ss−w Z_flag bit field. Based on the change of [Bo to o+w−1] in the related
(If w≧s) [S0 to s−1] = src = 0
(If w<s) [Ss−w to s−1] = 0

V_flag* U[S0 to s−1] = src ≧ +2^w
(If w≧s) 0
(If w<s) Cleared if S0=S1= . . . =Ss−w−1=0.
Otherwise, it is set.

PROGRAM EXCEPTION:

Reserved instruction exceptions

When RR='11'

When+='0'

When X='1'

When SS='11'

When EaR is @-SP

When EaMbf is #imm_data, @SP+ or @-SP

Invalid operand exception

When width≦0 or width>32

MNEMONIC:

BFCMP src,offset,width,base

OPERATION:

compare bit field(signed)

OPTIONS:

None

Figures 159, 160:
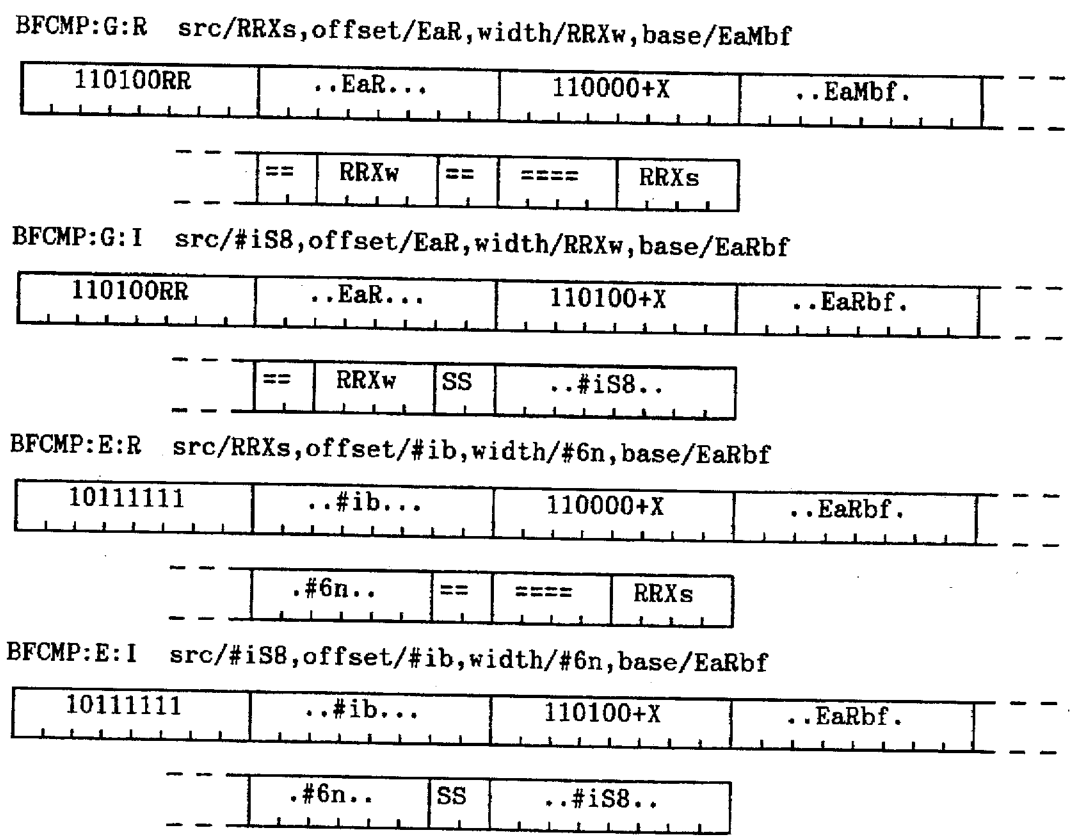
FIG. 159 is a view of the format of instruction BFCMP.
FIG. 160 is an illustration of flag change thereof.

INSTRUCTION FORMAT AND ASSEMBLER SYNTAX: shown in FIG. 159.

STATUS FLAGS AFFECTED: shown in FIG. 160.

DESCRIPTION:

Compare the contents of the source with that of the bit field.

If the width of the bit field differs from that of the source, the smaller size data is sign-extended and then both the values are compared. The offset of BFINS:G is also sign-extended.

In the EaRbf addressing mode, the @-SP, @SP+ and #imm_data modes cannot be used. Although the register direct mode Rn of base is specified in <<L2>>, the data processor of the present invention supports it.

[Operation]

Assume that the initial value of src is

[S0.S1....Ss-2.Ss-1] s=8,16,32,64(:I)

s=32,64(:R)

offset=o, and width=w, offset and width are treated as signed numbers. (If width≦0 or width>d, an invalid operation exception (IOE) occurs.)

The bit field to be compared and the flag change occur as follows:

(If s≧w)
bit 0 of base
↓
[ . . . B0.B1 . . . . Bo−2.Bo−1.Bo.Bo+1 . . . . Bo+w−2.Bo+w−1.
Bo+w.Bo+w.
Bo+w+1 . . . ]
This portion is sign-extended and compared with src.

(If s<w)
bit 0 of base
↓
[ . . . B0.B1 . . . . . Bo−1.Bo.Bo+1 . . . . Bo+w−s−1.Bo+w−s . . . . Bo+w−2.
Bo+w− 1.Bo+w . . . ]
src is sign-extended and compared with this portion.

L_flag S[Bo to o+w−1] - S[S0 to s−1] < 0
Set depending on the comparison result.

Z_flag S[Bo to o+w−1] S[S0 to s−1] = 0
Set depending on the comparison result.

PROGRAM EXCEPTION:

Reserved instruction exceptions

When RR='11'

When+='0'

When−='1'

When SS='11'

When EaR is @-SP

When EaRbf is #imm_data, @SP+ or @-SP

Invalid operand exception

When width≦0 or width>32

MNEMONIC:

BFCMPU src,offset,width,base

OPERATION:

compare bit field (unsigned)

OPTIONS:

None

Figures 161, 162:
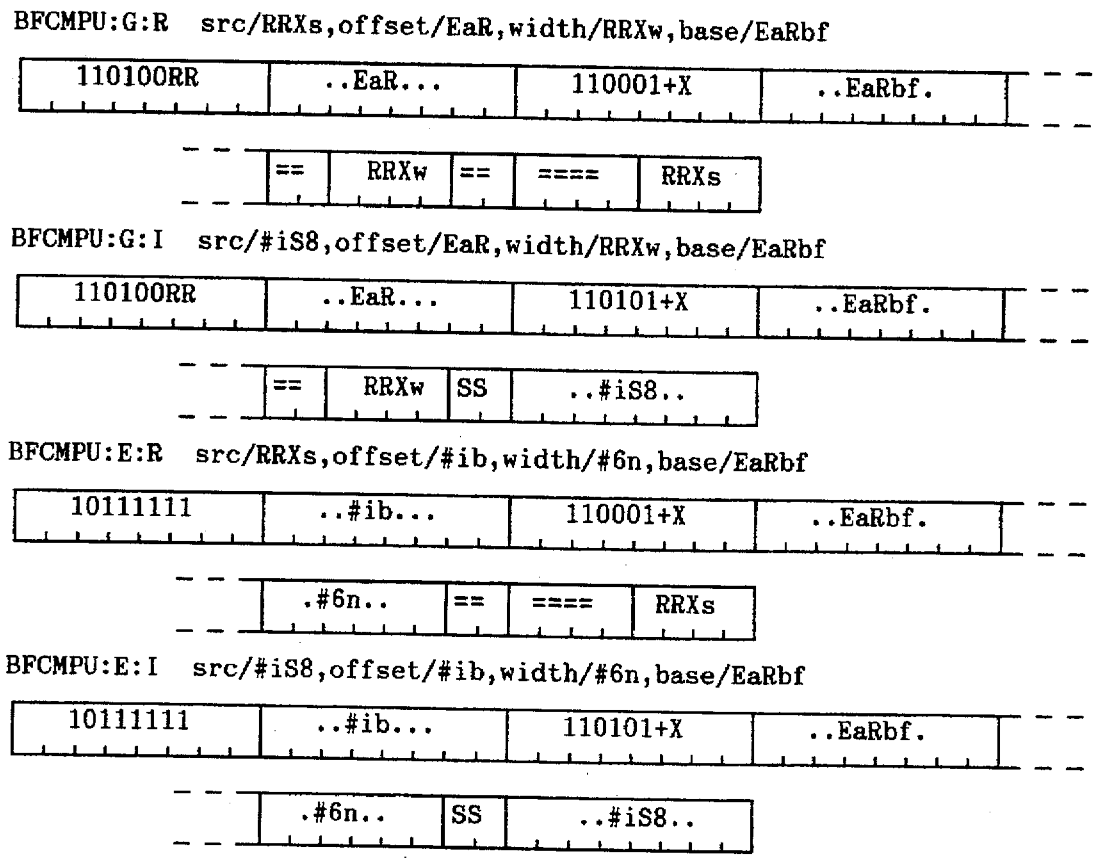
FIG. 161 is a view of the format of instruction BFCMPU.
FIG. 162 is an illustration of flag change thereof, FIGS. 163(*a*) and 163(*b*) are a view of the format of instruction BVSCH.

INSTRUCTION FORMAT AND ASSEMBLER SYNTAX: shown in FIG. 161.

STATUS FLAGS AFFECTED: shown in FIG. 162.

DESCRIPTION:

Compare the contents of the source with that of the bit field.

If the width of the bit field differs from that of the source, the smaller size data is zero-extended and then both the values are compared. The offset of BFCMPU:G is also sign-extended.

In the EaRbf addressing mode, the @-SP, @SP+ and #imm_data modes cannot be used. Although the register direct mode Rn of the base is specified in <<L2>>, the data processor of the present invention supports it.

[Operation]

Assume that the initial value of src is

[S0.S1 ... Ss-2.Ss-1] s=8,16,32,64(:I)

s=32,64(:R)

offset=o, width=w, offset and width are treated as signed numbers. (If width≦0 or width >d, an invalid operation exception (IOE) occurs.)

The bit field to be compared and the flag change occur as follows:

(If s≧w)
bit 0 of base
↓
[ . . . B0.B1 . . . . Bo−2.Bo−1.Bo.Bo+1 . . . . Bo+w−2.Bo+w−1.Bo+w.Bo+w+1 . . . ]
This portion is zero-extended and compared with src.

-continued

| | |
|---|---|
| (If s<w) | |
| bit 0 of base ↓ | |
| [ . . . B0.B1 . . . . . Bo−1.Bo.Bo+1 . . . . Bo+w−s−1.Bo+w−s . . . . Bo+w−2. Bo+w−1. Bo+w . . . ] | |
| | src is zero-extended and compared with this portion. |
| L_flag | U[Bo to o+w−1] - U[S0 to s−1] < 0 Set depending on the comparison result. |
| Z_flag | U[Bo to o+w−1] - U[S0 to s−1] = 0 Set depending on the comparison result. |

PROGRAM EXCEPTION:

Reserved instruction exceptions

When RR='11'

When +='0'

When −='1'

When SS='11'

When EaR is @-SP

When EaRbf is #imm_data, @SP+ or @-SP

Invalid operand exception

When width≦0 or width>32

12-8 Variable Length Bit Field Manipulation Instruction

The variable length bit field manipulation instructions consist of the following instructions.

General operation and transfer BMVAP

Transfer BVCPY

Operation and transfer of repetitive patterns BVPAT

Search for 0 or 1 BVSCH

BVMAP, BVPAT and BVCPY are instructions which mainly serve for window operations (bitblt) on the bit map display.

The terms of the bit map display attributes are defined as follows: (color scale, color offset, and bit-dot polarity)

color scale:

Specifies how many continuous bits one dot represent.

EXAMPLES

<color scale=1>

1 dot is represented by 1 bit. Continuous 8 dots are represented by 1 byte. Monochrome bit map display or bit map display where each bit forming the colors is banked.

<color scale=4>

1 dot is represented by successive 4 bits. Successive 2 dots are represented by 1 byte.

It supports 16-color bit map display.

bit-dot polarity

The bit-dot polarity is a concept which should be considered in a combination of a bit map display and processor. In a general bit map display where the low order addresses are represented on the left side, if dots corresponding to smaller bit numbers are represented on the left side, it is named such that a bit map display has the positive bit-dot polarity. If dots corresponding to larger bit numbers are represented on the left side, it is named such that a bit map display has the negative bit-dot polarity. In other words, a big-endian processor has the positive bit-dot polarity only when the MSB is represented on the left side.

color offset

Specify what bit of multiple bits forming 1 dot is operated. The following relationship is obtained.

0≦color offset<color scale

This attribute is a parameter for the bit map display operation rather than an attribute of the bit map display hardware.

When dots which move horizontally for X (dot offset) from the dot corresponding to base address bit offset in the memory is calculated as follows.

(dot offset is a group of points on the screen, while bit offset is a group of bits in the memory.)

In positive bit-dot polarity:

bit offset=X*color scale+color offset

In negative bit-dot polarity:

bit offset=(X*color scale+color offset) .xor. 7

The BVMAP, BVCPY and BVPAT instructions actually used in the data processor of the present invention have restrictions that affect the implementation. These instructions can be used only when:

bit-dot polarity is positive.

color scale is 1.

Thus, it is necessary to define the hardware of the bit map display to some extent. The practical restrictions are as follows.

Since the bit-dot polarity is positive, when the data processor of the present invention is big-endian, the small address and the small bit number (MSB) should be displayed on the left side of the screen.

Since only color scale=1 is available, there are the following restrictions for the bit map display where color scale≠1.

For the bit map display where color scale≠1, the type of operation cannot be changed every color offset.

Since color scale cannot be changed with the BVMAP instruction, if color scale of the bit map display is not 1, unless the internal expression is not the same content as color scale, the BVMAP instruction cannot be used. Because the inner expression of the screen image depends on the hardware, to convert data between different hardware systems, data format should be changed.

The variable length bit field manipulation instructions use many operands and require long execution times. Thus, mechanisms for accepting interrupts during execution and for reexecuting the instruction after an interrupt process are required. The data processor of the present invention uses a fixed number of registers which specify an operand and represent the progress condition of the operation. Therefore, even if an interrupt occurs during execution of a variable length bit field instruction, if the register is correctly saved and restored in the interrupt process handler, after the interrupt process, the bit field instruction can be restored on the way. Even if the status is saved or the context is switched after execution is suspended or the same bit map instruction is executed with a different process after the context is switched, when the former bit map instruction is resumed at the same context, it should work correctly.

In the BTRON specification, with a conventional main memory, which is not VRAM, characters and figures may be described. Consequently, in the variable length bit field instructions, since a page fault may occur, like the string instructions, it is possible for a suspension of execution due to the page fault.

In the BVMAP and BVCPY instructions, to move a figure horizontally with an insert editor the source of the bit map can be overlapped with the destination of the bit map. Like the string instructions, the direction to be operated is specified with the options /F and /B. The direction to be operated is determined by software so that the source is not destroyed by the destination. However, the option /B which can specify the reverse operation is defined in <<L2>> to simplity the complexity of the implementation.

The data processor of the present invention also supports the reverse operation for increasing the operation speed of BTRON.

If src is overlapped with dest and if the length from base to offset for dest is smaller than that for src, a smaller offset is first processed so that the content of src is not destroyed by that of dest. To do that, the /F option is used. Therefore, the smaller offset side (address) is located on the left side. The length from base to offset for dest is smaller than that for src when the bit map data is moved on the left side by deleting characters.

In addition, if the length from base to offset for dest is longer than that for dest, the larger offset is first processed so that the content of src is not destroyed by that of dest. To do that, the /B option is used. The length from base to offset for dest is larger than that for src when the bit map data is moved on the right side by inserting characters.

If src may be overlapped with dest, the correct option should be used depending on the decision of software so that the contents of src is not destroyed by that of dest. However, since the /B option is defined in <<L2>>, if /B cannot be used, the contents of src should be temporarily copied to another position and then the operation with dest should be performed.

If there is no overlap between src and dest, the result is the same no matter which option is used.

If the /B option is used when the length from base to offset for dest is smaller than that for src or if the /F option is used when the length from base to offset for dest is larger than that for dest, it is necessary to consider which operation occurs. Because dest, of the portion which has been operated, destroys the portion where src has not been referenced, the correct result cannot be obtained. If an instruction which was suspended is reexecuted due to the algorithm, the result may change. Since the correct result is not assured, it does not matter if the result is changed by an execution suspension. When no execution suspension takes place, a correct result may be obtained, so that an non-repeatable bug can happen. However, if the error check is performed completely, overhead increases, resulting in decreased execution time. The error check is not performed, so the user should take care of it.

In the variable length bit field instructions, only 32 bits or 64 bits <<LX>> can be used for bit offset (offset), bit width (width), and pattern data (pattern) in registers. 8 bits and 16 bits can not be specified. The resister size of 32 bits and 64 bits is selected by the X field.

In the BVMAP, BVCPY and BVPAT instructions, the memory access method on the dest side is not specified except that it be performed by the write or read-modify-write operation.

If width≦0 in the BV instructions, the instruction is terminated without any operation being performed. However, an EIT does not occur. In the BVSCH instruction, V_flag which represents the completion due to width (same as search operation failure) is set. In complex instructions such as the BV instructions and string instructions, a high level subroutine may be created using such an instruction. For example, BVMAP is repeated for a number of lines to produce the BitBlt function. It is not necessary to check width every time, but codes which may be directly generated by the compiler should be carefully checked. Thus, detection of the width of the BF instructions is an exception.

If offset+width overflow in a variable length bit field instruction, when the execution is suspended by an interrupt or when the instruction is completed, the offset value on the register becomes incorrect, so that the instruction cannot be correctly executed. In this case, the operation is not assured. On the architecture, although it is recommended that it be detected and treated as an invalid operand exception (IOE) when the instruction is executed, to prevent prolonged execution time, it is executed without checking. (In string instructions, since a pointer address rather than an integer accords with offset, it is not treated as an overflow, but only as a wraparound of the address.)

MNEMONIC:

BVSCH

OPERATION:

find first '0' or '1' in the bitfield (variable length)

OPTIONS:

/0 Search '0' (default).

/1 Search '1'.

/F Search for 0 or 1 in the direction of increasing bit number (default).

/B Search for 0 or 1 in the direction of decreasing bit number <<L2>>. (the data processor of the present invention supports this option.)

INSTRUCTION FORMAT AND ASSEMBLER SYNTAX: shown in FIG. 163.

STATUS FLAGS AFFECTED: shown in FIG. 164.

DESCRIPTION:

Search for a '0' or '1' in the variable length bit field.

When this instruction is executed after the search start bit number (bit offset) is set to the offset operand (R1), the bit number of the search result is set to the offset operand (R1). In other words, offset is processed by the read-modify-write operation, so that the bit search operation can be continuously repeated. Offset is treated as a signed integer.

After BVSCH is executed, if the search operation is unsuccessfully terminated, V_flag is set and offset indicates the bit to be searched next. An EIT does not occur. The offset and V_flag of the BVSCH instruction are set the same way as the BSCH instruction.

Although the search operation in the reverse direction using /B is defined in the <<L2>> specification, the data processor of the present invention supports it.

This instruction can be used to search an empty block of a disk and memory.

For detailed specification of comlex instructions such as variable length bit field instructions and string instructions as well as the register values after the instruction is terminated, see Appendix 11.

PROGRAM EXCEPTION:

Reserved instruction exceptions

When+='0'

When X='1'

When P='1'

MNEMONIC:

BVMAP

OPERATION:

bit operation (one line BitBlt)

OPTIONS:

/F Perform the operation from the smaller offset (default).

/B Perform the operation from the larger offset <<L2>>. (the data processor of the present invention supports it.)

INSTRUCTION FORMAT AND ASSEMBLER SYNTAX: shown in FIG. 165.

Figures 166, 167:
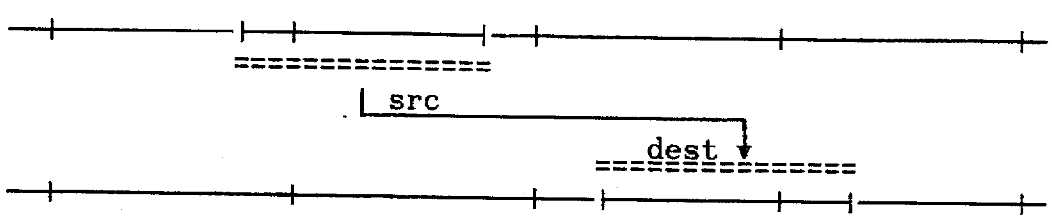

STATUS FLAGS AFFECTED: shown in FIG. 166.

DESCRIPTION:

The instruction provides for various logical operations for variable length bit fields src and dest to perform the bit map operation on a computer display. The type of operation is specified by the lower 4 bits of R5. The following 16 types are provided.

| Bit pattern | Mnemonic | Function | Operation |
|---|---|---|---|
| 0000 | F | False | 0 ==>dest |
| 0001 | NAN | NotAndNot | ¯dest .and. ¯src ==> dest |
| 0010 | AN | AndNot | dest .and. ¯src ==> dest |
| 0011 | NS | NotSrc | ¯src ==> dest |
| 0100 | NA | NotAnd | ¯dest .and. src ==> dest |
| 0101 | ND | NotDest | ¯dest ==> dest |
| 0110 | X | Xor | dest .xor. src ==> dest |
| 0111 | NON | NotOrNot | ¯dest .or. ¯src ==> dest |
| 1000 | A | And | dest .and. src ==> dest |
| 1001 | NX | NotXor | ¯dest .xor. src ==> dest |
| 1010 | D | Dest | dest ==> dest |
| 1011 | ON | OrNot | dest .or. ¯src ==> dest |
| 1100 | S | Src | src ==> dest |
| 1101 | NO | NotOr | ¯dest .or. src ==> dest |
| 1110 | O | Or | dest .or. src ==> dest |
| 1111 | T | True | 1 ==> dest |

The D (Dest) operation mode is provided for the symmetry of operations.

If the high order bits of register R5, which specifies the operation, are not zeroes, it is not checked. An invalid operand exception (IOE) does not occur in order to minimize the implementation complexity and keep the execution speed from being degraded.

/F and/B options serve to specify whether the operation is performed from the smaller offset or from the larger offset. If src and dest of the bit map are overlapped, the contents of dest destroy that of src, so that the correct result cannot be obtained.

When src and dest are overlapped, if the length from base to offset for dest is smaller than that for src, the operation is started from the smaller offset so that the contents of src are not destroyed by dest. To do that, the /F option is used. Generally, the smaller offset (address) is placed on the left side as the relationship between the screen and bit map. Thus, when the bit map data is moved to the left by deleting characters, the length from base to offset for dest is smaller than that for src.

If the length from base to offset for dest is larger than that for src, the operation is started from the larger offset so that the contents of src are not destroyed by dest. To do that, the /B option is used. The length from base to offset for dest is larger than that for src when the bit map data is moved to the right by inserting characters.

In addition, if the /B option is used when the length from base to offset for dest is smaller than that for src or if the /F option is used when the length from base to offset for dest is larger than that for src, the result (dest) is not assured. If the instruction reexecution occurs due to an interrupt and page fault during instruction execution, the result may change.

If src and dest are overlapped, it is necessary to use the correct option through software and proceed to the operation so that the content of src is not destroyed by that of dest. Since the /B option is defined in <<L2>>, if it cannot be used, it is necessary to copy the contents of src to another location and perform the operation with dest. The data processor of the present invention supports the /B option.

If no overlap occurs, the result is not changed regardless of which option is used.

<— The length from base to offset is small.
The length from base to offset is large. —>

[In the case of no overlap]:
diagrammed in FIG. 167.
The result of the operation is assured with /B and /F.
[In the case of overlap]:
diagrammed in FIG. 168.
[In the case of overlap]:
diagrammed in FIG. 169.

PROGRAM EXCEPTION:
Reserved instruction exceptions
When Q='1'
When X='1'
When P='1'

MNEMONIC:
BVCPY

OPERATION:
bit transfer

OPTIONS:
/F Perform the operation from the smaller offset (default).
/B Perform the operation from the larger offset <<L2>>. (the data processor of the present invention supports this option.)

INSTRUCTION FORMAT AND ASSEMBLER SYNTAX: shown in FIG. 170.

STATUS FLAGS AFFECTED: shown in FIG. 171.

DESCRIPTION:

This instruction serves to transfer bits between variable length bit fields src and dest for bit map operation on a monitor screen. This instruction transfers bits without the arithmetic operation function of the BVMAP instruction so that the bit transfer operation can be performed at a high speed.

The functions of the /F and /B options are the same as those of the BVMAP instruction. If src and dest of the bit map are not overlapped, the results are the same regardless of which option is used. On the other hand, if they are overlapped, it is necessary to use the correct option so that the contents of src are not destroyed by dest.

When the /B option is used, the offset value, the maximum number of the bit field to be transferred, is added to 1. It is specified as the offset value to be placed in R1 and R4. This function is in accordance with the specifications of SMOV/B and SCMP/B. Although the/B option is defined in <<L2>>, the data processor of the present invention supports it.

PROGRAM EXCEPTION:
Reserved instruction exceptions
When Q='1'
When X='1'
When P='1'

MNEMONIC:
BVPAT

OPERATION:
cyclic bit operation
Operation of pattern and bit map

OPTIONS:
None

INSTRUCTION FORMAT AND ASSEMBLER SYNTAX: shown in FIG. 172.

STATUS FLAGS AFFECTED: shown in FIG. 173.

DESCRIPTION:

This instruction is used to fill the bit map on a computer screen with some pattern or to perform logical operations for the bit map on a screen with some pattern. When continuously generating a pattern, perform logical operations on the bit field.

If the high order bits for the operation specification (R5) are not 0, they are ignored.

However, even though they are not checked, for future expansion, the high order bits should be filled with '0'. This function does not use an invalid operand exception (IOE) so that the complexity of the implementation is not increased and the execution speed is not lowered.

This instruction does not perform a shift operation during a memory write unlike BVMAP and BVCPY. The specification of offset only masks pattern. On the other hand, the BVMAP instruction performs a shift operation if the offset of src differs from that of dest.

PROGRAM EXCEPTION:

Reserved instruction exceptions

When+='0'

When X='1'

When P='1'

12-9 Decimal Arithmetic Instructions

The data processor of the present invention supports unsigned PACKED format (BCD) decimal one word addition/subtraction operation and the PACK/UNPACK process according to the <<L1>> specification of the main processor and signed PACKED format decimal one word addition/subtraction operation according to the <<L2>> specification. In addition, the addition, subtraction, multiplication, and division of long digit decimal numbers are processed by a coprocessor.

This paragraph describes only the addition and subtraction of the PACKED format decimal numbers and PACK/UNPACK process. The addressing mode of the decimal arithmetic operations is the same as that of the conventional instructions.

The data processor of the present invention does not support the four types of decimal arithmetic operation instructions described in this paragraph.

MNEMONIC:

ADDDX src,dest (the data processor of the present invention does not support this instruction.)

OPERATION:

dest+src+X_flag==>dest BCD

Addition in BCD

OPTIONS:

None

INSTRUCTION FORMAT AND ASSEMBLER SYNTAX: shown in FIG. 174.

STATUS FLAGS AFFECTED: shown in FIG. 175.

DESCRIPTION:

Add packed BCD numbers.

This instruction can handle BCD data consisting of 8 bits (2 digits, 16 bits (4 digits), 32 bits (8 digits), and 64 bits (16 digits). However, 64 bits are only handled in the <<LX>> specification.

If the size of the source operand is smaller than that of the destination operand, the source operand is zero-extended and the content of the source operand is added to that of the destination operand.

Since the sign-extension of a BCD number is not meaningful, it is treated as an unsigned number and the flag change of ADDDX is based on that of ADDU. Like ADDU, V_flag is set if the result is not completely placed in dest and a carry-out from dest is sent to X_flag if d<s. However, the status of Z_flag cumulatively changes as in ADDX and SUBX rather than ADDU.

If each digit of src and dest contains a number other than 0 to 9, in other words, if the contents of each operand of ADDDX and SUBDX are not a number in BCD, an EIT does not occur. However, the contents of dest and the results sent to flags are not assured (depending on the implementation). This function does not use an invalid operand exception (IOE) so that the complexity of the implementation is not increased and the execution speed is not lowered.

PROGRAM EXCEPTION:

Reserved instruction exceptions

When RR='11'

When MM='11'

When EaR is @-SP

When EaM is #imm_data, @SP+ or @-SP.

<<L1>> functional exception

When the bit pattern of ADDDX is decoded.

MNEMONIC:

SUBDX src,dest (the data processor of the present invention does not support this instruction.)

OPERATION:

dest-src-X_flag==>dest BCD

Subtraction in decimal BCD

OPTIONS:

None

INSTRUCTION FORMAT AND ASSEMBLER SYNTAX: shown in FIG. 176.

STATUS FLAGS AFFECTED: shown in FIG. 177.

DESCRIPTION:

Subtract packed BCD numbers.

This instruction can handle BCD data consisting of 8 bits (2 digits), 16 bits (4 digits), 32 bits (8 digits), and 64 bits (16 digits). However, 64 bits are only handled in the <<LX>> specification.

If the size of the source operand is smaller than that of the destination operand, the source operand is zero-extended and the content of the source operand is subtracted from that of the destination operand.

Since the sign-extension of a BCD number is not meaningful, it is treated as an unsigned number and the flag change of SUBDX is based on that of SUBU. Like SUBU, V_flag is set if the result becomes negative and a borrow from dest is set to X_flag if d<s. However, the status of Z_flag cumulatively changes like ADDX and SUBX rather than SUBU.

If the result becomes negative in SUBDX, dest is not represented as an absolute value, but a complement (complement of 10). Thus, the value becomes the same as from the high order digit in dest.

EXAMPLE

If SUBDX is executed with 16 bits, dest src

0123–0456=(–0333) dest becomes (–333)=9667

If each digit of src and dest contains a number other than 0 to 9, in other words, if the contents of each operand of ADDDX and SUBDX is not a number in BCD, an EIT does not occur. However, the content of dest and the results sent to flags are not assured (depending on the implementation). This function does not use an invalid operand exception (IOE) so that the complexity of the implementation is not increased and the execution speed is not lowered.

PROGRAM EXCEPTION:

Reserved instruction exceptions

When RR='11'

When MM='11'

When EaR is @-SP

When EaM is #imm_data, @SP+ or @-SP.

<<L1>> functional exception

When the bit pattern of SUBDX is decoded.

MNEMONIC:

PACKss src,dest (the data processor of the present invention does not support this instruction.)

OPERATION:

pack data

OPTIONS:

None

INSTRUCTION FORMAT AND ASSEMBLER SYNTAX: shown in FIG. 178.

STATUS FLAGS AFFECTED: shown in FIG. 179.

DESCRIPTION:

Pack the content of src in BCD (Binary Coded Decimal) and transfer it to dest. Actually, one of B, H, W and L is placed in s of PACKss and the following mnemonic and operation take place.

| | | |
|---|---|---|
| PACKHB | src[.H],dest[.B]<br>RR=01,WW=00 | src[04:07] ==> dest[00:03],<br>src[12:15] ==> dest[04:07] |
| PACKWH | src[.W],dest[.H]<br>RR=10,WW=01 | <<L2>><br>src[04:07] ==> dest[00:03],<br>src[12:15] ==> dest[04:07]<br>src[20:23] ==> dest[08:11],<br>src[28:31] ==> dest[12:15] |
| PACKWB | src[.W],dest[.B]<br>RR=10,WW=00 | src[12:15] ==> dest[00:03],<br>src[28:31] ==> dest[04:07] |
| PACKLW | src[.L],dest[.W] | <<LX>> |
| PACKLH | src[.L],dest[.H] | <<LX>> |

Since the mnemonic in PACKss and UNPKss depends on the size, it is considered that the function of the instruction significantly changes depending on the size. In other words, only the zero-extension and sign-extension are performed in the conventional instructions depending on the size, while the operations in PACKss and UNPKss significantly change depending on the size.

If a combination of sizes which are not listed in the above table is specified, the result of the operation is not assured (the value depending on the implementation is set to dest). Although it is desirable to generate a reserved instruction exception (RIE) on the architecture, a reserved instruction exception does not occur. This concept also applies to the logical operation between different sizes.

The bits of src which do not affect dest (2^7 to 2^4 bits of PACKHB), they are not checked for 0 or 1. Even if they are not 0, they are ignored. Since letter codes are packed directly, for the most part they are not 0.

PROGRAM EXCEPTION:

Reserved instruction exceptions

When RR='11'

When W='1'

When EaR is @-SP

When EaW is #imm_data or @SP+

<<L1>> function exception

When the bit pattern of PACKss is decoded.

MNEMONIC:

UNPKss src,dest,adj (the data processor of the present invention does not support this instruction.)

OPERATION:

unpack data

OPTIONS:

None

Figures 180, 181:
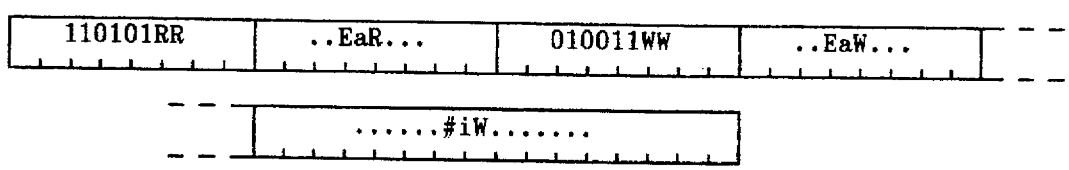
FIG. 180 is a view of the format of instruction UNPKss.
FIG. 181 is an illustration of flag change thereof.

INSTRUCTION FORMAT AND ASSEMBLER SYNTAX: shown in FIG. 180.

STATUS FLAGS AFFECTED: shown in FIG. 181.

DESCRIPTION:

Unpack the contents of src in packed form decimal, add the adjustment value adj to the value being unpacked, and transfer the result to dest. To directly generate character codes using the UNPK instruction, the adjustment value adj is added. Adj is added in binary rather than in decimal. The adj size is specified by the WW field together with the dest size.

Actually, one of B, H, W and L is placed in s of UNPKss and the mnemonic and operation take place; as described in FIG. 182.

If a combination of sizes which is not listed in the above table is specified, the result of the operation is not assured (the value depending on the implementation is set to dest). Although it is desirable to generate a reserved instruction exception (RIE) on the architecture, since it is difficult to detect an RIE by a combination of the two operand sizes, a reserved instruction exception does not occur.

An overflow by addition of adj is ignored.

PROGRAM EXCEPTION:

Reserved instruction exceptions

When RR='11'

When WW='11'

When EaR is @-SP

When EaW is #imm_data or @SP+

<<L1>> function exception

When the bit pattern of UNPKss is decoded.

12-10 String Manipulation Instructions

A 'string' is a data type where data of 8 bits, 16 bits, 32 bits or 64 bits is continuously aligned for any length. (Only the SSCH instruction supports data collection which is not continuously aligned.)

The meaning of string data is not specified. It may be real character code, integer or floating point, each of which is interpreted by the user.

The string range can be represented in the following two manners.

Specify the string length (amount of data).

Specify the character which represents the end of string (terminator).

It is necessary to select one of the above two methods depending on the purpose and language in use. In the string instructions of the data processor of the present invention, a parameter for the amount of data or the terminator in the format of the optional termination condition can be specified. The string instructions of the data processor of the present invention support both specification methods.

One of the features of the string instructions of the data processor of the present invention is the ability to freely select the amount of incrementation/decrementation by the pointer. Thus, with the string search instruction (SSCH instruction), the table can be searched and a multiple element array can be scanned.

As the termination conditions of the string instructions SMOV, SCMP and SSCH, various conditions such as large-small comparison and two-value comparison can be specified. The SSCH instruction is used for searching a string. Since the search condition is specified as a termination condition, it only works as a termination condition. Termination conditions (eeee) specified by the string instructions are as seen in FIG. 183.

As applications of the string instructions imply, processing of character strings of 8 bits/16 bits, searching the specific bit pattern, transferring a memory block, inserting a structure, clearing a memory area, etc., are available.

Since the string instructions deal with non-fixed length data the same as variable length bit field instructions, the functions of interrupt acceptance during execution and execution resumption are required. On the other hand, the string instructions themselves do not become codes generated by the compiler. Instead, they are provided as subroutines written by the assembler. Therefore, the restrictions for symmetry and addressing mode are not strictly necessary. Thus, the string instructions of the data processor of the present invention use the fixed number registers (R0 to R4) to keep the operand and the status during execution. The major registers used are as follows.

R0: Start address of the source string

R1: Start address of the destination string

R2: Length of string and amount of data

R3: Comparison value of termination condition (1)

R4: Comparison value of termination condition (2)

R2 represents the length of string using the number of elements rather than the number of byte. R2 is treated as an unsigned number. R2=0 indicates the instruction is not terminated by the number of elements. In other words, to avoid terminating the instruction by the number of elements, the instruction should be performed with R2=0. The execution pattern of the string instruction is described as follows:

```
do {
        . . .
        R2 - 1 ==> R2;
            check_interrupt;
   } while (R2 !=0);
```

If R2=0, whether the number of elements is H'100000000 or more (the number of elements is not checked) depends on the implementation. In other words, if the instruction is not terminated even after the elements are operated on H'100000000 times, the operation that follows depends on the implementation. However, if the instruction is terminated due to a cause other than the number of elements (it generally occurs when R2=0), the value of R2 (see Appendix 11) after the instruction is terminated should be correctly set. Except for a special case where R5=0 is specified by SSCH/R, an address transfer exception (ATRE) and bus access exception (BAE) occur when the elements are operated for H'100000000 times, resulting in the suspension of the instruction.

Since the string instructions can be terminated by various causes, flags are used to distinguish them. The meaning of each flag is as follows:

V_flag Termination by the number of elements (string length)

F_flag Termination by the termination condition (eeee) To distinguish multiple termination conditions, M_flag is used. For the status change of M_flag, see the related appendix.

In SCMP and SSCH, which do not have other termination causes, the status changes of V_flag and F_flag are complementarily performed. The SCMP instruction may be terminated whether the comparison data is matched or not.

MNEMONIC:

SMOV

OPERATION:

copy string

OPTIONS:

/F Copy the string in the direction the address increases.

/B Copy the string in the direction the address decreases.

/Various termination conditions (eeee)

INSTRUCTION FORMAT AND ASSEMBLER SYNTAX: shown in FIG. 184.

STATUS FLAGS AFFECTED: shown in FIG. 185.

DESCRIPTION:

Transfer the string.

In the string instruction, SMOV/B copies the string in the direction the address decreases. The addresses specified by R0 and R1 point the maximum address of the string+1 and the string copy operation is performed by decreasing R0 and R1.

If one of the /F and /B options is improperly used when src and dest are overlapped, the result of the SMOV operation is not assured. In other words, the result may depend on the implementation and whether the instruction execution is suspended or not.

When memory access is conducted using the feature of the complex instruction in a pipeline manner, the memory access order may change and the element that follows is never read after the element that precedes is written.

The backward string copy option /B is defined in <<L1>> instead of <<L2>> only in the instruction SMOV/B.

For a detailed specification of complex instructions such as variable length bit field instructions and field instructions as well as the register value after the instruction is completed, see Appendix 11.

PROGRAM EXCEPTION:

Reserved instruction exceptions

When SS='11'

When P='1'

When Q='1'

When eeee='0111'~'1111'

MNEMONIC:

SCMP

OPERATION:

compare string

OPTIONS:

/F Compare the string in the direction the address increases.

/B Compare the string in the direction the address decreases. <<L2>> (the data processor of the present invention supports this option.)

/various termination conditions (eeee)

INSTRUCTION FORMAT AND ASSEMBLER SYNTAX: shown in FIG. 186.

STATUS FLAGS AFFECTED: shown in FIG. 187.

DESCRIPTION:

Compare the contents of string src1 with those of string src2.

The comparison operation is continued while the contents of the two strings are matched. If an unmatched string is found, the operation is terminated. The SCMP instruction sets the flags depending on the result of src2–src1 like the CMP instruction. For example, L_flag indicates the contents of src2 are smaller than those of src1 rather than setting the flag based on the result of src1–src2. SCMP has the following three instruction termination causes which can be distinguished from the flag status.

1. Termination by the number of elements (amount of data)(R2) V_flag=1

2. Termination by termination conditions F_flag=1, M_flag is changed by termination causes.

3. Termination by unmatched data being compared

Z_flag=0, L_flag and X_flag are changed by the comparison result.

L_flag is the comparison result when the comparison is made by treating the last data as signed data.

X_flag is the comparison result when the comparison is made by treating the last data as unsigned data.

Although 2 and 3 can be checked at the same time, cause 1 is checked in a different phase than causes 2 and 3. Thus, although causes 2 and 3 may be satisfied at the same time, causes 1 and 2 and causes 1 and 3 are not satisfied at the same time. If one or more of the causes are satisfied, the SCMP instruction is terminated.

As long as the data to be compared is matched, the value (src1=src2) is tested as the termination condition. If data is not matched, src1 represented by R0 is tested as the termination condition.

For M_flag, which does not have meaning unless the termination conditions are satisfied, if the instruction is terminated due to a different termination cause, the result becomes uncertain. The M_flag status should always be set to 0.

Z_flag, L_flag and X_flag are always affected by the comparison result of the last data regardless of whether the result is matched or unmatched. Thus, if the instruction is completed by a condition other than cause 3 (when the data is matched), the status flags are automatically changed as follows.

Z_flag=1, L_flag=0, and X_flag=0.

Since SCMP deals with both signed data and unsigned data, the comparison result, where the element is considered as signed data, is placed in L_flag. The comparison result, where the element is considered as unsigned data, is placed in X_flag. The character codes of BTRON should be treated as unsigned data. When normal integers are encountered, it is also necessary to use signed data.

The flag change of SCMP is summarized as Shown in FIG. 188.

PROGRAM EXCEPTION:

Reserved instruction exceptions

When SS='11'

When P='1'

When Q='1'

When eeee='0111'~'1111'

MNEMONIC:

SSCH

OPERATION:

find a character in a string

OPTIONS:

/F Search a character in a string to the direction the address increases. (The pointer value increments by the element size.)

/R The increment value of the pointer is specified by R5.

/various termination conditions (eeee)

INSTRUCTION FORMAT AND ASSEMBLER SYNTAX: shown in FIG. 189.

STATUS FLAGS AFFECTED: shown in FIG. 190.

DESCRIPTION:

Search a string and find an element which satisfies the conditions.

When the /R option is used, the elements are compared and R0 is updated (by post increment or post decrement) regardless of whether R5 is positive or negative.

The size of R5 of SSCH/R is the same as that of the pointer R0. In other words, the size of R5 in the data processor 32 of the present invention is fixed at 32 bits, while that in the data processor64 of the present invention is specified by the P bit or mode independent from SS (R3, R4 and element size).

PROGRAM EXCEPTION:

Reserved instruction exceptions

When SS='11'

When P='1'

When eeee='0111'~'1111'

MNEMONIC:

SSTR

OPERATION:

Continuously write the same data (fill data in string).

OPTIONS:

None

INSTRUCTION FORMAT AND ASSEMBLER SYNTAX: shown in FIG. 191.

STATUS FLAGS AFFECTED: showin in FIG. 192.

DESCRIPTION:

Continuously write the value of R3 to the memory area being specified by the start address (R1) and the length (R2).

Since the SSTR instruction does not require any termination conditions, they are not specified.

When R2=0 in string instructions, the instruction is not terminated by the number of elements. However, in the SSTR instruction, the termination by the number of elements is the only termination cause. When R2=0 is specified, an endless loop is formed. It should be prevented by software rather than hardware. However, it is possible to accept an interrupt during execution of the instruction and to reexecute the instruction. Thus, even if control enters an endless loop, the scheduling of the task and process is not affected. An endless loop which is formed by multiple instructions can be summarized with one instruction. R2=0 is not treated as an invalid operand exception (IOE) so that the specification is the same as other string instructions, the implementation's complexity is reduced, and the operation speed is not lowered.

Depending on the parameters and termination conditions being specified, an endless loop may be formed with the SSCH or QSCH instructions.

PROGRAM EXCEPTION:

Reserved instruction exceptions

When SS='11'

When P='1'

12-11 Queue Manipulation Instructions

The data processor of the present invention provides QINS (insertion of queue being entered), QDEL (deletion of queue being entered), and QSCH (search of queue being entered) for queue operations. The queues that the data processor of the present invention supports are double linked queues where the beginning first and second data of a queue being entered are link pointers in the absolute address. The beginning data of the queue being entered is the pointer to the next queue entry, while the second data of the queue being entered is the pointer back to the previous queue entry.

The specification of the queue instructions have been defined so that the queue header can be employed directly as an operand of the queue instruction.

1. In QDEL, the queue just after the instruction is deleted, rather than the queue being specified. If the queue head is specified as an operand, the beginning operand being entered is deleted. If the queue being searched with QSCH/B is deleted or if the last queue is deleted, an indirect reference is required. However, it is assumed their operations are not performed as often as those where the queue being deleted with QSCH/F and the beginning queue being entered are deleted.

2. In QINS, a new queue is inserted just before the queue being specified. If the queue head is specified as an operand, the new queue to be inserted follows the present queue. This operation is performed in one of the following two ways. To obtain the symmetry with the QDEL instruction in QINS, it is preferred to insert the new queue just after the queue being specified (or queue head) because the same operand can be specified to delete the new queue being entered with QINS using QDEL. In addition, this way is preferred where the queue is used as a stack (LIFO). On the other hand, if the queue is used for FIFO, with QINS, a new queue is inserted after the present queue and QDEL is often used to delete the beginning queue being entered. The latter is the natural queue operation as exemplified by ITRON, consequently, the latter specification is employed.

3. In QSCH, the queue being specified is searched just after the instruction rather than from the present queue being entered. If the queue head is specified as an operand, the queue search operation starts from the beginning queue. To search the next queue after the first search operation is successful, one only has to execute QSCH again. This way differs from other high level instructions (string, variable length bit field operation). In other words, with a string instruction, the queue search operation starts from the data that the pointer points at. When the continuous queue search operation is required, it is necessary to update the pointer with instructions other than queue instructions. However, since a different header is used in queues, it is possible to employ a different specification.

4. Whether the queue is empty or not is determined by flags. If data is inserted in an empty queue with QINS and then the queue becomes empty after the queue being entered is deleted with QDEL, Z_flag is set. Since an attempt is made to delete from an empty queue causes an error, the pointer is not changed, but V_flag is set.

MNEMONIC:

QINS entry,queue

OPERATION:

insert a new entry into a queue

OPTIONS:

None

INSTRUCTION FORMAT AND ASSEMBLER SYNTAX: shown in FIG. 193.

STATUS FLAGS AFFECTED: shown in FIG. 194.

DESCRIPTION:

Insert a new entry specified by the entry field, just before the queue represented by the queue field.

If the queue being specified with queue is the queue header, this instruction causes a new entry to be inserted at the end of the present queue.

Z_flag is set depending on whether the queue is empty or not before the instruction is executed.

[QINS instruction operation in 32-bit structure]:

described in FIG. 195.

Figure 196:
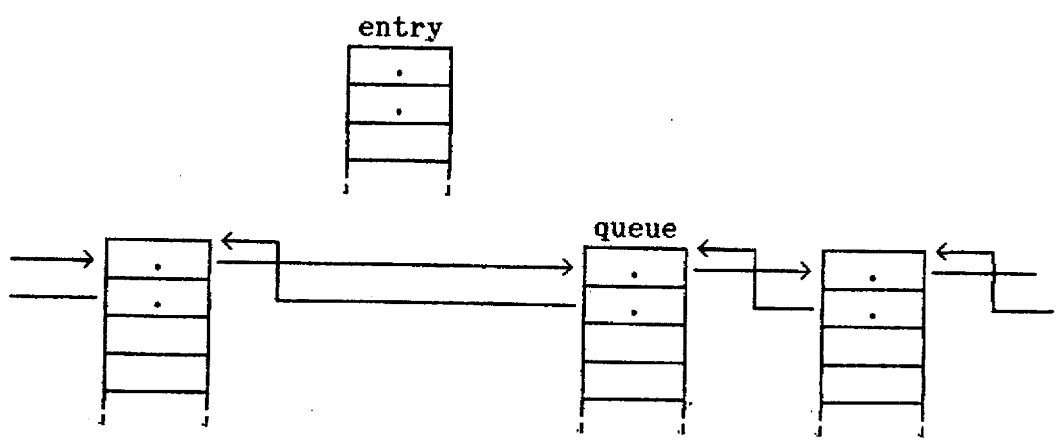

[Before execution]: diagrammed in FIG. 196.

Figure 197:
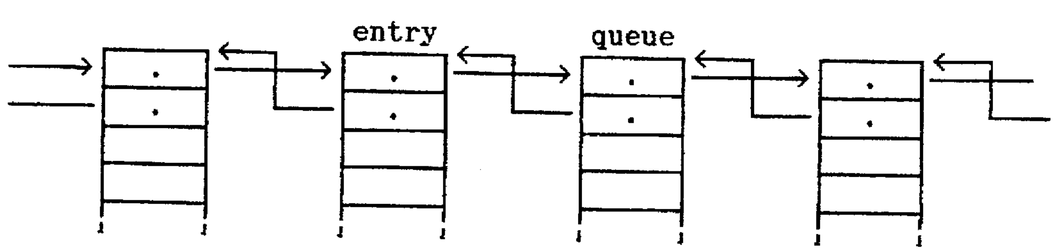

[After execution]: diagrammed in FIG. 197.

In the addressing mode which is specified by EaMqP and EaMqP2, the register direct Rn, @-SP, @SP+ and #imm_data cannot be used.

In addition, in QINS, the data structure for the portion which is not directly required for executing the instruction is not checked (such as linking condition for a new queue being entered just before and after a present queue). The QINS instruction works as described in "OPERATION".

PROGRAM EXCEPTION:

Reserved instruction exceptions

When+='0'

When–='1'

When EaMqP is Rn, #imm_data, @SP+ or @-SP

When EaMqP2 is Rn, #imm_data, @SP+ or @-SP

MNEMONIC:

QDEL queue,dest

OPERATION:

remove a entry from a queue

OPTIONS:

None

INSTRUCTION FORMAT AND ASSEMBLER SYNTAX: shown in FIG. 198.

STATUS FLAGS AFFECTED: shown in FIG. 199.

DESCRIPTION:

Delete the entry following the queue being specified by the queue field and set the address of the queue being deleted to dest. The address of the queue being deleted is set to dest because it may be frequently used.

If the queue header is specified for queue, the beginning queue is deleted.

If the queue being specified by the queue field is empty, the instruction cannot be executed. EIT does not occur, but V_flag and Z_flag are set and the instruction is terminated. dest is not changed.

dest/EaW!S prohibits the @-SP mode. If @-SP is allocated to dest while the queue is empty, V_flag is set, and the content of dest cannot be transferred. The instruction operation becomes ambiguous.

[QDEL instruction operation in 32-bit structure]:

shown in FIG. 200

Figure 201:
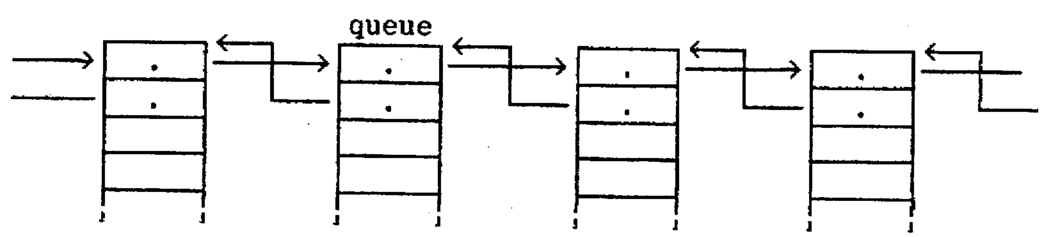

[Before execution]: diagrammed in FIG. 201.

Figure 202:
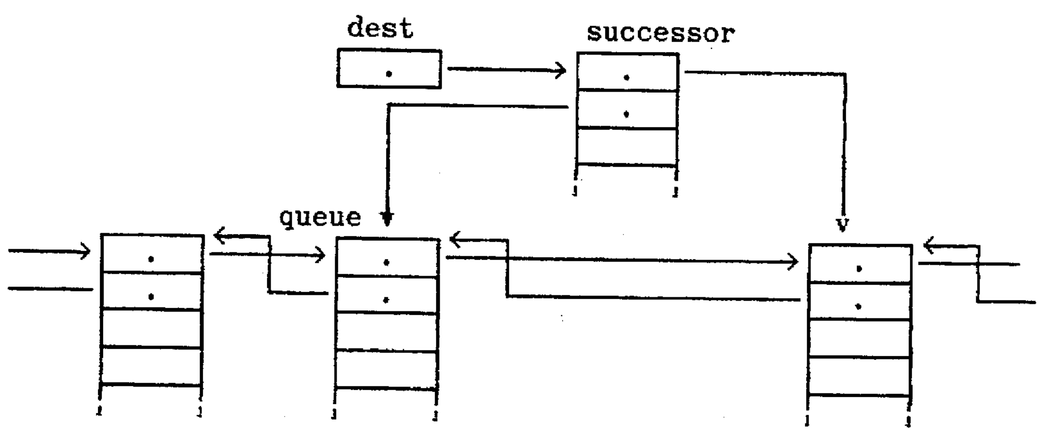

[After execution]: diagrammed in FIG. 202.

In the addressing mode specified by EaRqP, the register direct Rn, @-SP, @SP+ and #imm_data modes cannot be used.

In QDEL, the data structure for the portion which is not directly required for executing the instruction, is not checked (such as the linking condition for a new queue being entered just before and after a present queue). The QDEL instruction works as described in "OPERATION".

PROGRAM EXCEPTION:

Reserved instruction exceptions

When+='0'

When W='1'

When EaRqP is Rn, #imm_data, @SP+ or @-SP

When EaW!S is #imm_data, @SP+ or @-SP

MNEMONIC:

QSCH

OPERATION:

search queue entries

OPTIONS:

/NM Not mask R6.

/MR Mask R6. <<L2>> (the data processor of the present invention does not support this option.)

/F Search a queue in the forward direction.

/B Search a queue in the reverse (backward) direction. <<L2>> (the data processor of the present invention supports this option.)

/Various termination conditions (eeee)

INSTRUCTION FORMAT AND ASSEMBLER SYNTAX: shown in FIG. 203.

STATUS FLAGS AFFECTED: shown in FIG. 204.

DESCRIPTION:

Search and find the specified queue being entered. The backward search operation /B and mask function /MR are specified in <<L2>>. the data processor of the present invention supports the reverse search operation /B. However, it does not support the mask function /MR.

Since this instruction requires the operation correspond to the length of the queue, it is necessary to consider cancelling the operation dynamically like the string instructions. Thus, the operand and the execution status during the execution are placed in the fixed number registers.

The search conditions provide the mask operation (fetches a specified bit) and comparison operation. The mask operation is used to search a flag, while the comparison operation is used to perform the priority operation and the like. The comparison conditions are specified like the termination conditions of the string instructions.

To determine the end of the queue, the queue entry address and the queue end address R2 are compared. If they are matched, the instruction is terminated. If the instruction is terminated by comparison with R2, in other words, if the search operation is unsuccessful because the search conditions are not met, V_flag is set and the instruction is terminated, but an EIT does not occur.

Depending on the conditions of the QSCH instruction being specified, control may enter an endless loop in the instruction. It should be checked by the program rather than the hardware. An interrupt during execution and reexecution are available, so even if control mistakenly enters an endless loop in the user program, it does not affect the scheduling of the task and process. Usually, it is considered that an endless loop which is composed of multiple instructions is controlled by one instruction.

Upon completion of the search operation, R0 points at the queue_entry which meets the conditions being specified, while R1 points at the queue_entry just preceding the queue that R0 points at.

R1 is used to delete the single linked queue. QDEL deletes the queue_entry following the queue_entry being specified. After QSCH/F is executed, it is possible to execute QDEL with parameter @R1 rather than @R0.

Generally, by executing the QSCH instruction by setting the address of the queue head to R0 and R2, the entire queue (including a case where the queue is empty) can be searched.

QSCH aims to be used in conjunction with the single linked queue and double linked queue.

Figures 205, 206:
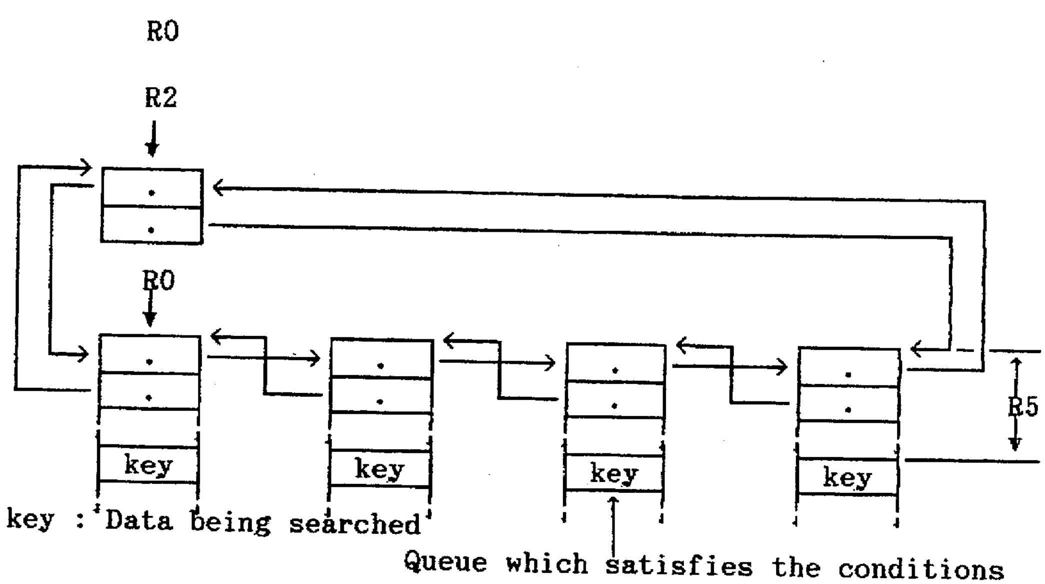

[QSCH operation]: described in FIG. 205.

'check_interrupt' checks whether an interrupt from the outside occurs or not. If the interrupt occurs, the execution of QSCH is canceled and the interrupt operation is started. After the interrupt operation is terminated, the remaining portion of the QSCH instruction is executed.

[Before execution]: diagrammed in FIG. 206.

Figure 207:
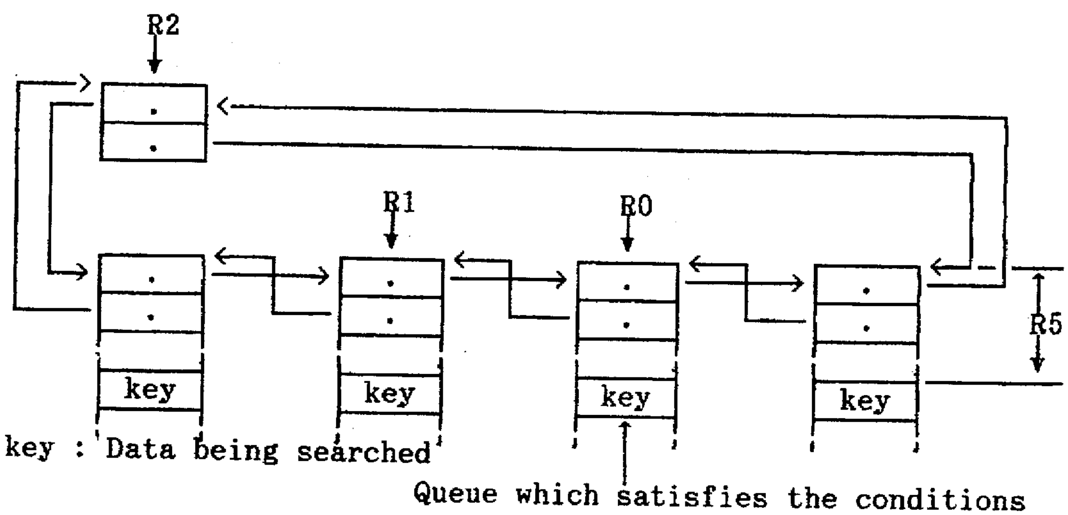

[After execution]: diagrammed in FIG. 207.

PROGRAM EXCEPTION:

Reserved instruction exceptions

When SS='11'

When eeee='0111'~'1111'

When m='1'

12-12 Jump Instructions

MNEMONIC:

BRA newpc

OPERATION:

branch always (PC relative)

OPTIONS:

None

INSTRUCTION FORMAT AND ASSEMBLER SYNTAX: shown in FIG. 208.

STATUS FLAGS AFFECTED: shown in FIG. 209.

DESCRIPTION:

The BRA instruction serves to support the addressing only for PC relative. BRA:D can use 8 bits, while BRA:G can use 8 bits, 16 bits, 32 bits, and 64 bits as the sizes of the displacement. Since the instructions of the data processor of the present invention always start with an even address, with the short format BRA:D instruction, #d8 is doubled and used. In short, PC+#d8*2==>PC If SS=00 is specified with BRA:G, #dS is not doubled, but used directly.

If newpc is 16 bits long in BRA:G, although its instruction function and code size are the same as those of JMP @(#dS:16, PC). However, since it may be possible to shorten the number of the execution cycles, they are provided as different instructions.

If newpc is an odd number in BRA:G, since the destination to be jumped becomes an odd address, an odd address jump exception (OAJE) takes place like the Bcc:G, BSR:G, JMP, and JSR instructions. In BRA:D, Bcc:D, and BSR:D, since the operand is doubled and then used, an OAJE does not occur.

If SS=00 in BRA:G, Bcc:G, and BSR:G, although the operand size is 8 bits long, the #dS field becomes 16 bits long. It is necessary to use the low order eight bits of the #dS field and place 0 in the high order 8 bits. If the high order eight bits are not 0, the data to be represented becomes a meaningless value depending on the implementation. EIT does not occur.

The data processor of the present invention performs the dynamic branch predict process for this instruction.

PROGRAM EXCEPTION:

Reserved instruction exceptions

When SS='11'

When P='1'

Odd address jump exception

When jumped to an odd address

MNEMONIC:

Bcc newpc

OPERATION:

branch conditionally (PC relative)

OPTIONS:

None

Figures 210, 211:
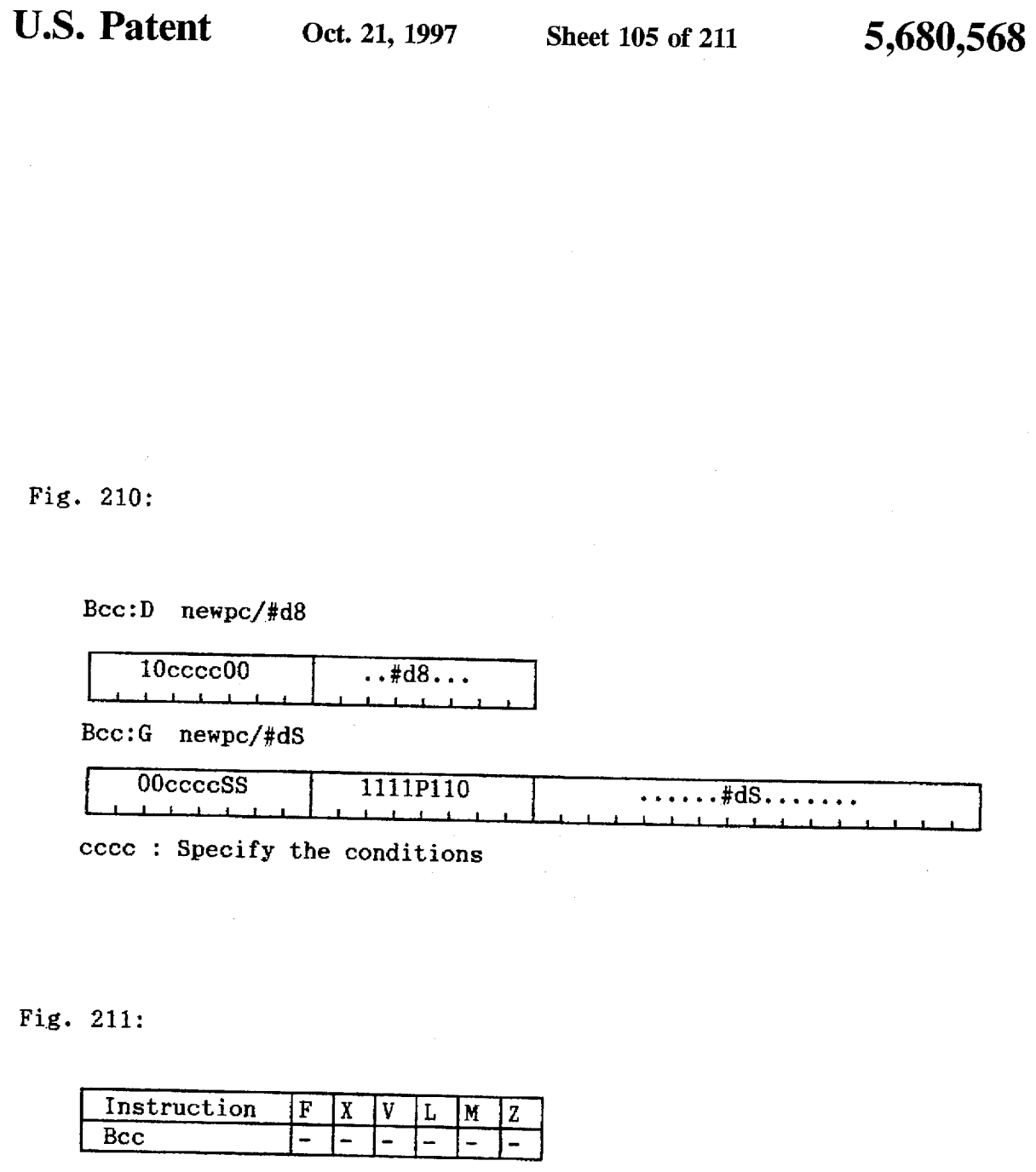

INSTRUCTION FORMAT AND ASSEMBLER SYNTAX: shown in FIG. 210.

STATUS FLAGS AFFECTED: shown in FIG. 211.

DESCRIPTION:

The Bcc instruction serves to support only the PC relative addressing mode. Bcc:D can use 8 bits, while Bcc:G can use 8 bits, 16 bits, 32 bits, and 64 bits as the sizes of the displacement. Since the instructions of the data processor of the present invention always start with an even address, in the short format Bcc:D instruction, #d8 is doubled and used. In short, if (cccc)

PC+#d8*2==>PC

If SS=00 is specified with Bcc:G, #dS is not doubled, but used directly.

The detail and mnemonic of the portions where the conditions are specified in Bcc (portion 'cc') and the bit pattern of cccc, is shown in FIG. 212.

If the jump operation does not occur because the conditions are not matched in Bcc:G, an OAJE may or may not occur in the data processor of the present invention. The data processor of the present invention performs the dynamic branch prediction process for this instruction.

PROGRAM EXCEPTION:

Reserved instruction exceptions

When SS='11'

When P='1'

When cccc='1110'~'1111'

Odd address jump exception

When jumped to an odd address

MNEMONIC:

BSR newpc

OPERATION:

jump to subroutine (PC relative)

OPTIONS:

None

INSTRUCTION FORMAT AND ASSEMBLER SYNTAX: shown in FIG. 213.

STATUS FLAGS AFFECTED: shown in FIG. 214.

DESCRIPTION:

The BSR instruction is a subroutine jump instruction where only the PC relative addressing mode is supported. The value of PC is saved in the stack.

BSR:D can use 8 bits, while BSR:G can use 8 bits, 16 bits, 32 bits and 64 bits as the sizes of the displacement. Since the instructions of the data processor of the present invention always start with an even address, in the short format BSR:D instruction, #d8 is doubled and used. In short, PC+#d8*2==>PC If SS=00 is specified with BSR:G, #dS is not doubled, but used directly.

As a PC value saved on the stack with the BSR and JSR instructions, the start address of the instruction that follows is used. On the other hand, if PC is referenced for calculating the effective address (including a case where PC is implicitly referenced in BSR and the like), note that the start address of the instruction rather than the next instruction is used as a value of PC.

Although former PC is saved in the stack with BSR and JSR, the alignment of SP is not checked. Even if SP is not a multiple of 4, such instructions are directly executed.

The data processor of the present invention performs the dynamic branch prediction process for this instruction.

PROGRAM EXCEPTION:

Reserved instruction exceptions

When SS='11'

When P='1'

When Q='1'

Odd address jump exception

When jumped to an odd address

MNEMONIC:

JMP newpc

OPERATION:

address of src==>PC jump

OPTIONS:

Note

INSTRUCTION FORMAT AND ASSEMBLER SYNTAX: shown in FIG. 215.

STATUS FLAGS AFFECTED: shown in FIG. 216.

DESCRIPTION:

Jump to an effective address of newpc. The jump instruction is available in the general addressing mode.

In executing the case statement, the jump table is referenced to determine the address of the destination to be jumped. This operation is available by combining the JMP instruction and the index addressing in the additional mode.

PROGRAM EXCEPTION:

Reserved instruction exceptions

When EaA is Rn, #imm_data, @SP+ or @-SP

Odd address jump exception

When jumped to an odd address

MNEMONIC:

JSR newpc

OPERATION:

jump to subroutine

OPTIONS:

None

INSTRUCTION FORMAT AND ASSEMBLER SYNTAX: shown in FIG. 217.

STATUS FLAGS AFFECTED: shown in FIG. 218.

DESCRIPTION:

Jump to a subroutine at an effective address. A value of PC is saved in the stack.

As a value of PC saved in the stack with the BSR and JSR instructions, the start address of the instruction that follows is used. If PC is referenced to calculate the effective address (including a case where PC is implicitly referenced in BSR and so on), note that the start address of the instruction rather than the instruction that follows is used as a PC value.

PROGRAM EXCEPTION:

Reserved instruction exceptions

When P='1'

When EaA is Rn, #imm_data, @SP+ or @-SP

Odd address jump exception

When jumped to an odd address

MNEMONIC:

ACB step,xreg,limit,newpc

OPERATION:

add, compare and branch

OPTIONS:

None

INSTRUCTION FORMAT AND ASSEMBLER SYNTAX: shown in FIG. 219.

STATUS FLAGS AFFECTED: shown in FIG. 220.

DESCRIPTION:

This instruction is a compound instruction composed of an addition instruction, comparison instruction and conditional jump instruction. This instruction is used as a primitive of a loop instruction.

The step, xreg and limit are operated and compared as signed integers. Although step should be a positive value for a conditional jump operation (xreg varies in the reverse direction of the end value). This instruction works as described in "OPERATION", without checking whether step is positive or negative.

In the ACB instruction, to execute a loop instruction at a high speed, overflow is not checked during the add step. If an overflow occurs after the step is added and the sign is changed, the incorrect value where the signal is changed is directly compared with limit. However, even if the result of the subtraction of limit−xreg overflows, the comparison of xreg<limit is accurate.

In ACB and SCB, the jump operation is conducted in the PC relative mode. Even if the displacement is 8 bits when SS=00, like SS≠00, #dS8 is not doubled, but used directly. When SS≠00, the field of #dS8 is not used (set to 0), but the data in the size specified by SS (16, 32 or 64 bits) just follows #dS8.

For example, in ACB:Q #1,R0,#4,label

If the difference between label and ACB:Q instruction is H'1234, the following bit pattern is obtained. It is also the same as that in the :I format in the variable length bit field instruction.

```
ACB:Q
00RgMw11   1101P001   .#6n . . SS   . . #dS8 . .
00000011   11010001   00010001      00000000      00010010   00110100

   +0         +1         +2            +3            +4         +5
<Address>
[ACB operation]
      xreg + step ==> xreg
        /* If an overflow occurs, only the low order
        bits are enable. */
      if (xreg < limit) then PC + #dS8 ==> PC endif
```

If newpc is an odd number, an OAJE occurs. In the data processor of the present invention, even if the jump operation does not occur because the termination conditions are satisfied, an OAJE occurs.

If SS≠00 occurs in the ACB and SCB instructions, the field of #dS8 is not used. At the time, even if the field of #dS8 is not 0, it is ignored. However, it is necessary to instruct the user that the field of #dS8 should be filled with zeros.

The data processor of the present invention performs the dynamic branch prediction process for this instruction.

PROGRAM EXCEPTION:

Reserved instruction exceptions

When RR='11'

When XX='11'

When SS='11'

When P='1'

When EaR is @-SP

When EaRX is @-SP

Odd address jump exception

When jumped to an odd address

MNEMONIC:

SCB step,xreg,limit,newpc

OPERATION:

subtract, compare and branch

OPTIONS:

None

INSTRUCTION FORMAT AND ASSEMBLER SYNTAX: shown in FIG. 221.

STATUS FLAGS AFFECTED: shown in FIG. 222.

DESCRIPTION:

This instruction is a compound instruction composed of a subtraction instruction, comparison instruction and conditional jump instruction. This instruction is used for a primitive of a loop instruction.

The step, xreg and limit are operated and compared as signed integers. Although step should be a positive value for a conditional jump operation (xreg varies in the reverse direction of the end value). This instruction works as described in "OPERATION", without checking whether step is positive or negative.

In the SCB instruction, to execute a loop instruction at a high speed, an overflow is not checked during the subtraction step. If an overflow occurs after the step is subtracted and the sign is changed, the incorrect value is compared directly with limit. However, even if the result of the subtraction of limit−xreg overflows, the comparison of xreg<limit is accurate.

In ACB and SCB, the jump operation is performed in the PC relative mode. Even if the displacement is 8 bits when SS=00, like SS≠00, #dS8 is not doubled, but used directly. When SS≠00, the field of #dS8 is not used (set to 0), but the data in the size specified by SS (16, 32 or 64 bits) follows #dS8.

```
[SCB operation]
      xreg − step ==> xreg
        /* Only low order bits are enabled if an overflow
        occurs. */
      if (xreg ≧ limit) then PC + #dS8 ==> PC endif
```

If newpc is an odd number, an OAJE occurs. In the data processor of the present invention, even if the jump operation does not occur because the termination conditions are satisfied, an OAJE occurs.

If SS≠00 in the ACB and SCB instructions, the #dS8 field is not used. Even if the #dS8 field is not 0, it is ignored. However, it is necessary to instruct the user that the field of #dS8 should be filled with zeros.

The data processor of the present invention performs the dynamic branch prediction process for this instruction.

PROGRAM EXCEPTION:

Reserved instruction exceptions

When RR='11'

When XX='11'

When SS='11'

When P='1'

When EaR is @-SP

When EaRX is @-SP

Odd address jump exception

When jumped to an odd address

MNEMONIC:

ENTER local,reglist

OPERATION:

Create a new stack frame and jumps to a subroutine for a high level subroutine.

OPTIONS:

None

INSTRUCTION FORMAT AND ASSEMBLER SYNTAX: shown in FIG. 223.

STATUS FLAGS AFFECTED: shown in FIG. 224.

DESCRIPTION:

Creates a stack frame for a high level language.

The local of ENTER is treated as a signed number. If the size of local is small, the value of local is sign-extended. If the content is negative, a meaningless stack frame is created and the instruction works as described in "OPERATION" without checking the contents like the ACB and SCB instructions.

Operation:

FP->↓TOS

SP->FP

SP−local->SP registers(mask)->↓TOS

For detail of a stack frame for a high level language, see the related appendix.

The bit map of the register to be saved, LnXL, is specified as in FIG. 225.

If bit 0 and bit 1 (SP and FP) are specified with reglist, their specifications are simply ignored. Even if bit 0 and bit 1 are "1", SP and FP are not transferred. An illegal operand exception (IOE) does not occur. However, the FP and SP bits should be filled with zeroes.

The alignment of FP and SP is not checked. Even if FP and SP are not multiples of 4, the instruction works as described in "OPERATION".

If the local operand of ENTER:G is in the memory and it is overlapped with the stack frame area which is formed by the execution of the ENTER instruction, it is very difficult to reexecute the instruction. In ENTER:G and JRNG:G, and the symmetrical instruction EXITD:G, the addressing modes requiring the memory access operation (except the register direct Rn mode and immediate mode) are inhibited. If it is necessary to set a dynamic value as an operand of the instruction, one temporary register should be prepared to use the register direct Rn mode.

The operation where FP and SP are specified as local depends on the implemention.

PROGRAM EXCEPTION:

Reserved instruction exceptions

When X='1'

When+='0'

When−='1'

When P='1'

When SS='11'

When EaR!M is a mode other than #imm_data and Rn

MNEMONIC:

EXITD reglist,adjsp

OPERATION:

exit and deallocate parameters

OPTIONS:

None

INSTRUCTION FORMAT AND ASSEMBLER SYNTAX: shown in FIG. 226.

STATUS FLAGS AFFECTED: shown in FIG. 227.

DESCRIPTION:

Reallocate a stack frame for a high level language and reset the registers to exit from a subroutine. Add the content of adjsp to SP and discard the subroutine parameters on the stack.

The adjsp of EXITD is treated as a signed number. If the size of adjsp is small, the value of adjsp is sign-extended. If the value of adjsp is negative, the instruction performs a meaningless operation. It is not checked, but works as described in "OPERATION" like ACB and SCB.

Operation adjsp==>tmp

↑TOS==>registers (mask)

FP==>SP

↑TOS==>FP

↑TOS==>PC sp+tmp ==>SP

For the details of stack frame for a high class language, see the related appendix.

The bit map of the register to be saved, LxXL, is specified as in FIG. 228.

If bit 14 and bit 15 (SP and FP) are specified with reglist of EXITD, their specifications are ignored. Even if bit 14 and bit 15 are "1", SP and FP are not transferred. An illegal operand exception (IOE) does not occur. However, the FP and SP bits should be filled with zeroes.

The alignment of FP and SP is not checked. Even if FP and SP are not multiples of 4, the instruction works as described in "OPERATION".

In EXITD, if the return address restored from the stack is an odd number, the destination becomes an odd address, so that an odd address jump exception (OAJE) occurs.

In the operand adjsp/EaR!M of EXITD, all the addressing modes which require the memory access operations except the register direct Rn mode and immediate mode are inhibited. If the operand of the instruction should be a dynamic value, one temporary register is available to use the register direct Rn mode.

If the register direct Rn mode is used and the same register Rn is used for reglist, a value before restoring the register is used as adjsp. In other words, the register value before executing the EXITD instruction rather than the value after that becomes the content of adjsp.

The operation to specify FP and SP as adjsp depends on the implementation.

PROGRAM EXCEPTION:

Reserved instruction exceptions

When X='1'

When+='0'

When−='1'

When P='1'

When SS='11'

When EaR!M is a mode other than #imm_data and Rn

MNEMONIC:

RTS

OPERATION:

return from subroutine

OPTIONS:

None

INSTRUCTION FORMAT AND ASSEMBLER SYNTAX: shown in FIG. 229.

STATUS FLAGS AFFECTED: shown in FIG. 230.

DESCRIPTION:

Return control from a subroutine.

Operation:

↑TOS->PC

If the return address returned from the stack is an odd number, an OAJE occurs.

PROGRAM EXCEPTION:

Reserved instruction exception

When P='1'

Odd address jump exception

When the return address is an odd number

MNEMONIC:

NOP

OPERATION:

no operation

OPTIONS:

None

Figures 231, 232:
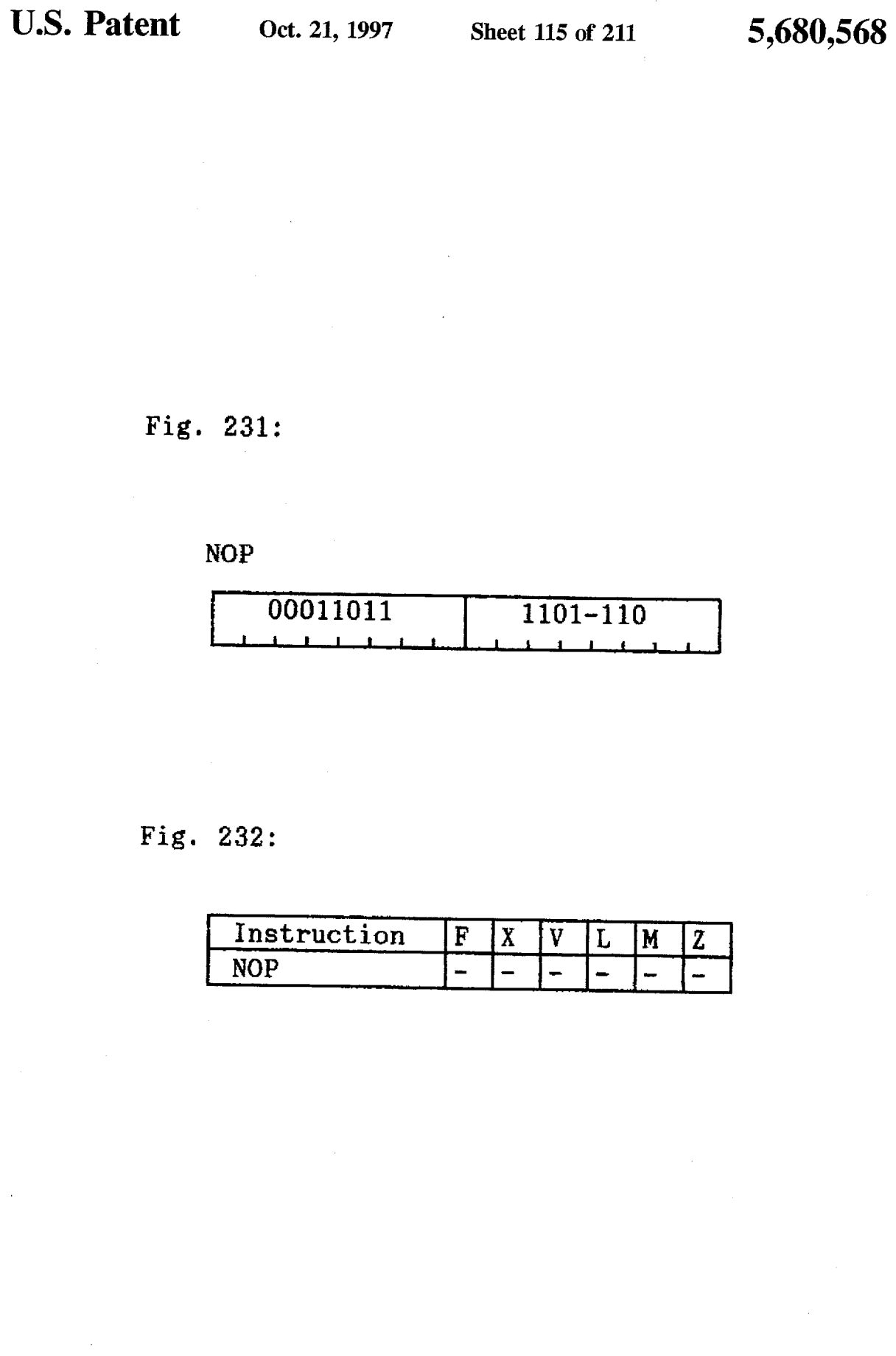

INSTRUCTION FORMAT AND ASSEMBLER SYNTAX: shown in FIG. 231.

STATUS FLAGS AFFECTED: shown in FIG. 232.

DESCRIPTION:

No operation

PROGRAM EXCEPTION:

Reserved instruction exception

When '−'='1'

MNEMONIC:

PIB

OPERATION:

purge instruction buffer

OPTIONS:

None

INSTRUCTION FORMAT AND ASSEMBLER SYNTAX: shown in FIG. 233.

STATUS FLAGS AFFECTED: shown in FIG. 234.

DESCRIPTION:

Purge all the buffers of the instruction pipeline, instruction queue and instruction cache so that it is assured that the instruction string in the memory matches the processor internal status. This instruction is used to acknowledge that the instruction codes may be changed (after the the processor is reset or the former PIB instruction is executed).

In the data processor of the present invention, to simplify the controls of pipeline, instruction queue and instruction cache, the instruction codes cannot be changed through a program. Even if the instruction codes are changed by a program, their operation is not assured. However, from a macro view of the OS process, a program is first loaded and then executed. In other words, instruction codes are changed by the OS program. In special applications, instruction codes created by a program are executed.

The purpose of this instruction is to correctly execute instructions in such a case. When this instruction precedes the instruction codes being changed, it is assured that the new instruction codes are correctly executed. With this instruction, pipeline, instruction queue and instruction cache are purged.

However, if the pipeline and cache mechanisms provide the bus monitoring features for rewriting the memory and the coincidence with the memory is always assured by hardware, the purge operation by the PIB instruction is not required. In this case, the PIB instruction is executed as the NOP instruction. In any case, it is necessary to assure the coincidence between the pipeline and instruction cache with the memory after this instruction is executed.

If multilevel logical space is formed by using MMU, the execution of only the instruction codes for the logical space where the PIB instruction is executed is assured. For example, if the following instruction string is executed:

Rewrite the instruction codes of context_A

STCTX

LDCTX context_B

Rewrite the instruction codes of context_B

PIB

The operation of context_B is assured even if the instruction codes being changed are executed. After LDCTX context_A is executed, the execution of the instruction codes of context_A being changed are not assured. To assure the execution of the context_A, it is necessary to execute the PIB instruction again. If LSID is used in the instruction cache, it is necessary only to purge the coincident instruction cache entry where LSID is matched.

In the instructions other than the PIB instruction, even after the jump instructions and OS related instructions (LDCTX, REIT, RRNG, TRAP, EIT start, etc.), the operation of the portion of the program where instruction codes are changed is not guaranteed to decrease as much as the purge operation of the instruction cache. Thus, when executing the program that OS loads, it is necessary to execute the PIB instruction (for example, between LDCTX and REIT).

"Buffer" of the mnemonic PIB (Purge Instruction Buffer) of the instruction is used in a wide variety of applications including cache, pipeline and so forth. The B buffer of PTLB is used in the same manner. The mnemonic PIB is created from the same association as PTLB.

This instruction is not a privileged instruction. It can be used from the user program.

Coincidence of instruction codes

To precisely describe the operation of the PIB instruction, the "coincidence of instruction codes" is defined as follows.

The "coincidence of instruction codes" is defined for each logical address of each logical space. For example, the "coincidence of instruction codes" is used such that in the logical space A, the "coincidence of instruction codes" from H'00000000 to H'000fffff is assured; in the logical space B, the "coincidence of instruction codes" from H'00010000 to H'0003ffff is assured. Only when the "coincidence of instruction codes" is assured do these instructions work correctly (including the access right check operation of execute). Generally, the area where the "coincidence of instruction codes" is assured is the instruction code area, but in the data area, the "coincidence of instruction codes" is not assured.

The "coincidence of instruction codes" is assured in the following cases.

When the processor is reset:

In all physical spaces (logical spaces), the "coincidence of instruction codes" is obtained.

When the PIB instruction is executed:

In all the areas of the logical space where the PIB instruction is executed, the "coincidence of instruction codes" is obtained. If AT=00, like the reset state, in all the physical spaces (=logical spaces), the "coincidence of instruction codes" is obtained.

The "coincidence of instruction codes" is lost in the following cases:

When the memory content is rewritten:

When the memory content is rewritten, the "coincidence of instruction codes" in the area where the content is rewritten is lost regardless of whether the memory is accessed by logical address or physical address (AT=00, LDP instruction, and so forth).

When ATE is updated:

When ATE is updated, the "coincidence of instruction codes" where the address is converted by ATE is lost. Thus, for example, if the protection bit during ATE in LDATE is changed, unless the PIB instruction is executed, the protection information is correctly checked. (It would be effective to reduce the burden of the implement for checking the protection information.)

In executing regular instructions which do not relate to the above items (BRA, JMP, JRNG, RRNG, TRAP, REIT, LDCTX and starting EIT), the "status of the coincidence of instruction codes" is not changed.

12-13 Multiprocessor Support Instructions

MNEMONIC:

BSETI offset,base

OPERATION:

bit->Z_flag, 1->bit (interlocked)

Set a bit (lock the bus).

OPTIONS:

None

INSTRUCTION FORMAT AND ASSEMBLER SYNTAX: shown in FIG. 235.

STATUS FLAGS AFFECTED: shown in FIG. 236.

DESCRIPTION:

Invert the bit value being specified, copy the inverted bit to Z_flag, and then set the bit value to 1. These two operations are both performed while the bus is locked. Consequently, this instruction is used to synchronize multiple processors.

In the addressing modes specified with ShMfqi and EaMfi, the register direct mode Rn, @-SP, @SP+ and #imm_data modes cannot be used.

In the assembler syntax, the memory access size is specified as the base size. In BSETI:Q, the memory access size is fixed to 8 bits, so it is possible to describe only 'B'. The assignment of .H and .W for the access size in BSETI:G and BSETI:E is specified in <<L2>> like BSET and BCLR.

If base is an address which is not aligned while the access size .H or .W is assigned in <<L2>> specification, the memory access range depends on the implementation like the bit operation instructions. If an unaligned word or half word is accessed, multiple bus cycles are executed while the bus is locked like the CSI instruction.

The data processor of the present invention implements access operations every half word or word, as specified in <<L2>>. In addition, if an address which is not aligned is assigned as base, the access operation is performed every half word or word which is aligned.

PROGRAM EXCEPTION:

Reserved instruction exceptions

When RR='11'

When BB='11'

When EaR is @−SP

When EaMfi or ShMfqi is Rn, #imm_data, @SP+ or @−SP

MNEMONIC:

BCLRI offset,base

OPERATION:

bit->Z_flag, 0->bit (interlocked)

Clear a bit (lock the bus).

OPTIONS:

None

INSTRUCTION FORMAT AND ASSEMBLER SYNTAX: shown in FIG. 237.

STATUS FLAGS AFFECTED: shown in FIG. 238.

DESCRIPTION:

Invert the bit value being specified, copy the inverted bit to Z_flag, and then set the bit value to 0. These two operations are concurrently performed while the bus is locked. Consequently, this instruction is used to synchronize multiple processors.

In the addressing mode specified with EaMfi, the register direct mode Rn, @−SP, @SP+ and #imm_data modes cannot be used.

In the assembler syntax, the memory access size is assigned as the base size. The assignment of .H and .W for the access size in BCLRI:G and BCLRI:E is specified in <<L2>> like BSET and BCLR.

If base is an address which is not aligned while the access size .H or .W is assigned in the <<L2>> specification, the memory access range depends on the implementation like the bit operation instruction. If an unaligned word or half word is accessed, multiple bus cycles are executed while the bus is locked as in the CSI instruction.

The data processor of the present invention implements the access operation every half word or word as specified in <<L2>>. In addition, if an address which is not aligned is assigned as base, the access operation is performed every half word or word which is aligned.

PROGRAM EXCEPTION:

Reserved instruction exceptions

When RR='11'

When BB='11'

When EaR is @−SP

When EaMfi is Rn, #imm_data, @SP+ or @−SP

MNEMONIC:

CSI comp,update,dest

OPERATION:

compare and store (interlocked)

OPTIONS:

None

INSTRUCTION FORMAT AND ASSEMBLER SYNTAX: shown in FIG. 239.

STATUS FLAGS AFFECTED: shown in FIG. 240.

DESCRIPTION:

If the dest value is the same as the previous value (specified by comp), the content is updated.

This instruction can be used when simply structured data is updated by multiple processors. After the CSI instruction is executed, if the dest value differs from the previous value, it means that the content of the data has been rewritten by another processor. Therefore, the processor which detects the difference in the dest value with the CSI instruction should update the content of the data based on the new dest value. In this manner, data can be maintained in a multiprocessor environment.

```
[CSI Operation]
    update ==> tmp
    /* The following operations are conducted while the bus
    is locked. */
    if (dest. = comp)
    then
        tmp ==> dest
        1 ==> Z_flag
else
        dest ==> comp
        0 ==> Z_flag
```

Due to the restriction of the bit pattern, in CSI, even if the comparison operation is unsuccessfully terminated, the content of the update operand is read. In addition, the access right (access permission) of dest in the CSI instruction is also necessary for the read and write operations. In other words, even if the comparison operation is unsuccessfully terminated and data is not written to dest, unless there is write access permission for dest, an address translation exception (ATRE) occurs.

The size of RMC and EaMiR is assigned by RR. In the addressing mode assigned by EaMiR, the @−SP, @SP+, Rn and #imm_data modes cannot be used.

If the size .H or .W is assigned in the CSI instruction and an unaligned address is assigned for the operand, while the bus is locked, multiple bus cycles are executed. In this case, the memory is accessed with two read operations and two write operations. Consequently, while the bus is locked during the entire instruction, four memory access operations are performed in the order: read, read, write and write operations.

In general instructions except CSI, if the memory is accessed to an address which is not aligned, the bus is not locked.

Thus, for example, in the following instruction, var1 EQU H'00000006; Address not aligned When the following instruction is executed by processor A:

MOV.W #H'12345678,@var1

When the following instruction is executed by processor B:

MOV.W #H'87654321,@var1.

Depending on the memory write timing, the following results are obtained.

H'00000006−7=H'8765

H'00000008−9=H'5678

Thus, the result may differ from that where the MOV instruction of processor A is first executed and that where the MOV instruction of processor B is first executed.

Since data of the variables common to multiple processors should be updated (read-modify-write) rather than only writing data, it is necessary to use the CSI instruction. However, if a variable which is not aligned is accessed from multiple processors with any instruction other than CSI, note that a problem may occur.

PROGRAM EXCEPTION:

Reserved instruction exceptions

When RR='11'

When EaR is @−SP

When EaMiR is Rn, #imm_data, @SP+ or @−SP 12-14 Control Space, Physical Space Operation Instructions In the data processor of the present invention, the control register group for the main processor can create one address space named control space as well as control register group for a co-processor and high speed memory on the chip bus. This concept is effective when a co-processor and context-saving high speed memory (both of which are currently in different chips) will be combined in a main processor in near future. The control register operation instructions serve to access the control space.

Since the general purpose control space operation instructions such as LDC and STC are privileged instructions, when the user wants to operate PSB and PSM which are part of the control space, the LDPSB, STPSB, LDPSM and STPSM instruction should be used instead.

Since the data processor of the present invention does not provide the address translation feature, the logical space address is always the same as the physical space address. Thus, the functions of the physical space operation instructions are included in other instructions which operate the logical space. The data processor of the present invention which distinguishes between the logical space and physical space; the data processor of the present invention supports the physical space operation instructions.

MNEMONIC:

LDC src,dest

OPERATION:

load control space or register (privileged)

OPTIONS:

None

INSTRUCTION FORMAT AND ASSEMBLER SYNTAX: shown in FIG. 241.

STATUS FLAGS AFFECTED: shown in FIG. 242.

DESCRIPTION:

Transfer the src value to dest in the control space. If the size of src is smaller than that of dest, the former is sign-extended.

For dest/EaW%, the register direct mode Rn and @−SP cannot be specified.

This instruction is a privileged instruction. If this instruction is not executed from ring 0, a privileged instruction violation exception (PIVE) occurs.

The data processor of the present invention does not support the .B and .H access functions for the control space. In the control space, it only implements the control register in the CPU. Since Data Processor of the present invention does not provide UATB and SATB, UATB and SATB cannot be changed by LDC.

In the operands of the LDATE, STATE, LDP, STP, LDC, STC and MOVPA instructions which reference the special space, if an indirect reference occurs by the additional mode, the logical space (LS) rather than the special space is referenced. On the other hand, if a stack pointer (SP) reference occurs, the current ring RNG rather than PRNG is referenced. The meaningful special space address is the only final effective address which is obtained.

If the control space operand size .B or .H is assigned in a processor which does not provide the .B and .H access functions for the control space, a reserved instruction exception (RIE) occurs.

If a control register or an address where a control register is not provided is assigned by LDC, a reserved function exception (RFE) occurs. It is also applied to the area specified in <<LV>>.

In a processor which has some restrictions for the address in the control space, if the restriction is violated, a reserved function exception (RFE) occurs. For example, there is a restriction as to when the address of the control register should be multiples of 4. In a processor which accommodates a high speed memory for saving a context, there is a case where only the address for the control register is restricted to multiples of 4 and the address for the high speed memory is not restricted. Even in this case, if the restriction is violated, a reserved function exception (RFE) occurs. In a processor which can assign .B and .H for part of the address, if the address where .B and .H cannot be accessed is assigned, a reserved function exception (RFE) rather than a reserved instruction exception (RIE) occurs. This concept is such that if an error is determined only by the instruction bit pattern (including the assignment of size), a reserved instruction exception (RIE) occurs; if occurrence of an error depends on the address and operand value, a reserved function exception (RFE) occurs.

If the address of the control space is off-chip (such as the address of a co-processor) and the area cannot be accessed due to a restriction in the implementation, a reserved function exception (RFE) occurs. In LDC and STC, even if the address of the control space becomes an address of the co-processor, a co-processor instruction exception (CIE) does not occur. A co-processor instruction exception (CIE) occurs only when an instruction for the co-processor is executed.

In LDC, if an illegal value is written to the reserved bits represented with '−' and '+' of the control register or if a reserved value is written to some field, a reserved function exception (RFE) occurs. If a reserved value such as '001' is written to the SMRNG field of PSW, a reserved function exception (RFE) also occurs. On the other hand, if an illegal value is written to the reserved bits represented with '=' and '#', it is ignored. However, it is necessary to instruct the user that '=' should be filled with zeroes. In addition, if any value is written to the bit represented with '*', it is ignored. It is assured that this bit is not used even if the specification is expanded, unlike '=' and '#'. Thus, it is not necessary to mask this bit to '0' before executing the LDC instruction.

If CTXBB is changed by LDC, the content of CTXBB in the memory does not match the context in the chip. However, it should be arranged by the programmer. From a hardware point of view, only CTXBB is changed. If CTXBB is changed and the context is loaded, it is possible to do using LDCTX. When UATB and SATB are changed with the LDC instruction, TLB and the logical cache (process equivalent to PSTLB/AT) are automatically purged. In a processor which provides LSID, the logical space assigned by the LSID control register is purged. In this case, the LDC instruction does not provide the /SS and /AS options used in the PSTLB instruction due to the following reasons.

The TLB purge operation using the PTLB and PSTLB instructions, is not like LDC * and UATB, so that cache and TLB in another logical space can be purged, the parameters equivalent to the LSID function are assigned by a different register (R1). In this case, the LSID control register is not used. Thus, it is necessary to switch the /SS and /AS options to distinguish whether the parameter is used or not. To prevent data inconsistency, in LDC * and UATB, the cache and TLB are purged from the space currently being used. Thus, the control register of LSID works as it is expected. In other words, like a normal memory access operation, the logical space which is assigned by the LSID control register is purged. In a processor which does not accommodate LSID, the purge operation is performed in all the logical spaces (actually, one logical space).

PROGRAM EXCEPTION:

Reserved instruction exceptions

When RR='11'

When WW is not '10'

When EaR is @–SP

When EaW% is Rn, #imm_data, @SP+ or @–SP

Privileged instruction violation exception

When the instruction is executed from a ring other than ring 0

Reserved function exceptions

When a control register which has not been accommodated is accessed

When a reserved value is written to a specific field of the control register (except =, #, and *)

When the word alignment of the address of EaW% is not obtained

MNEMONIC:

STC src,dest

OPERATION:

store control space or register (privileged)

OPTIONS:

None

INSTRUCTION FORMAT AND ASSEMBLER SYNTAX: shown in FIG. 243.

STATUS FLAGS AFFECTED: shown in FIG. 244.

DESCRIPTION:

Transfer the src value in the control space to dest. Since the size of src and dest is specified by a common field, data is not transferred between different size operands.

This instruction is a privileged instruction. If this instruction is executed from a ring other than ring 0, a privileged instruction violation exception (PIVE) occurs.

For src/EaR%, the register direct mode Rn, immediate #imm_data and @SP+ cannot be specified.

The data processor of the present invention does not support the .B and .H access functions for the control space. It only implements the control register in the CPU.

In the operands of the LDATE, STATE, LDP, STP, LDC, STC and MOVPA instructions, which reference the special space, if a memory indirect reference occurs due to the additional mode, the logical space (LS) rather than the special space is referenced. On the other hand, if a stack pointer (SP) reference occurs, the current ring RNG stack rather than PRNG is referenced. The meaningful special space address is the only final effective address which is obtained.

If the control space operand size .B or .H is assigned in a processor which does not provide the .B and .H access functions for the control space, a reserved instruction exception (RIE) occurs.

If a control register which is not provided or an address where a control register is not provided is assigned by STC, a reserved function exception (RFE) occurs. It is also applied to the area specified in <<LV>>.

In a processor which has some restrictions for the address in the control space, if the restriction is violated, a reserved function exception (RFE) occurs. For example, there is a restriction as to when the address of the control register should be multiples of 4. In a processor which accommodates a high speed memory for saving a context, there is a case where only the address for the control register is restricted to multiples of 4 and the address for the high speed memory is not restricted. Even in this case, if the restriction is violated, a reserved function exception (RFE) occurs. In a processor which can assign .B and .H for part of the address, if the address where .B and .H cannot be accessed is assigned, a reserved function exception (RFE) rather than a reserved instruction exception (RIE) occurs.

This concept is such that if an error is determined only by the instruction bit pattern (including the assignment of size), a reserved instruction exception (RIE) occurs; if occurrence of an error depends on the address and operand value, a reserved function exception (RFE) occurs.

If the address of the control space is off-chip (such as the address of a co-processor) and the area cannot be accessed due to a restriction in the implementation, a reserved function exception (RFE) occurs. In LDC and STC, even if the address of the control space becomes an address of the co-processor, a co-processor instruction exception (CIE) does not occur. A co-processor instruction exception occurs only when an instruction intended for the co-processor is executed.

In STC, if the bit of the register represented with '–' is read, '0' is read; if the bit represented with '+' is read, '1' is read; If the bit represented with '=', '#' or '*' is read, the value being read is unknown. It depends on the implementation. To allow for future expansion, it is necessary that the user not program using bit values represented with '=', '#' and '*'.

PROGRAM EXCEPTION:

Reserved instruction exceptions

When WW is not '10'

When EaR% is Rn, #imm_data, @SP+ or @–SP

When EaW is #imm_data or @SP+

Privileged instruction violation exception

When the instruction is executed from a ring other than the ring 0

Reserved function exceptions

When a control register which has not been accommodated is accessed

When the word alignment of the address of EaR% is not obtained

MNEMONIC:

LDPSB src

OPERATION:

load PSB

OPTIONS:

None

Figures 245, 246:
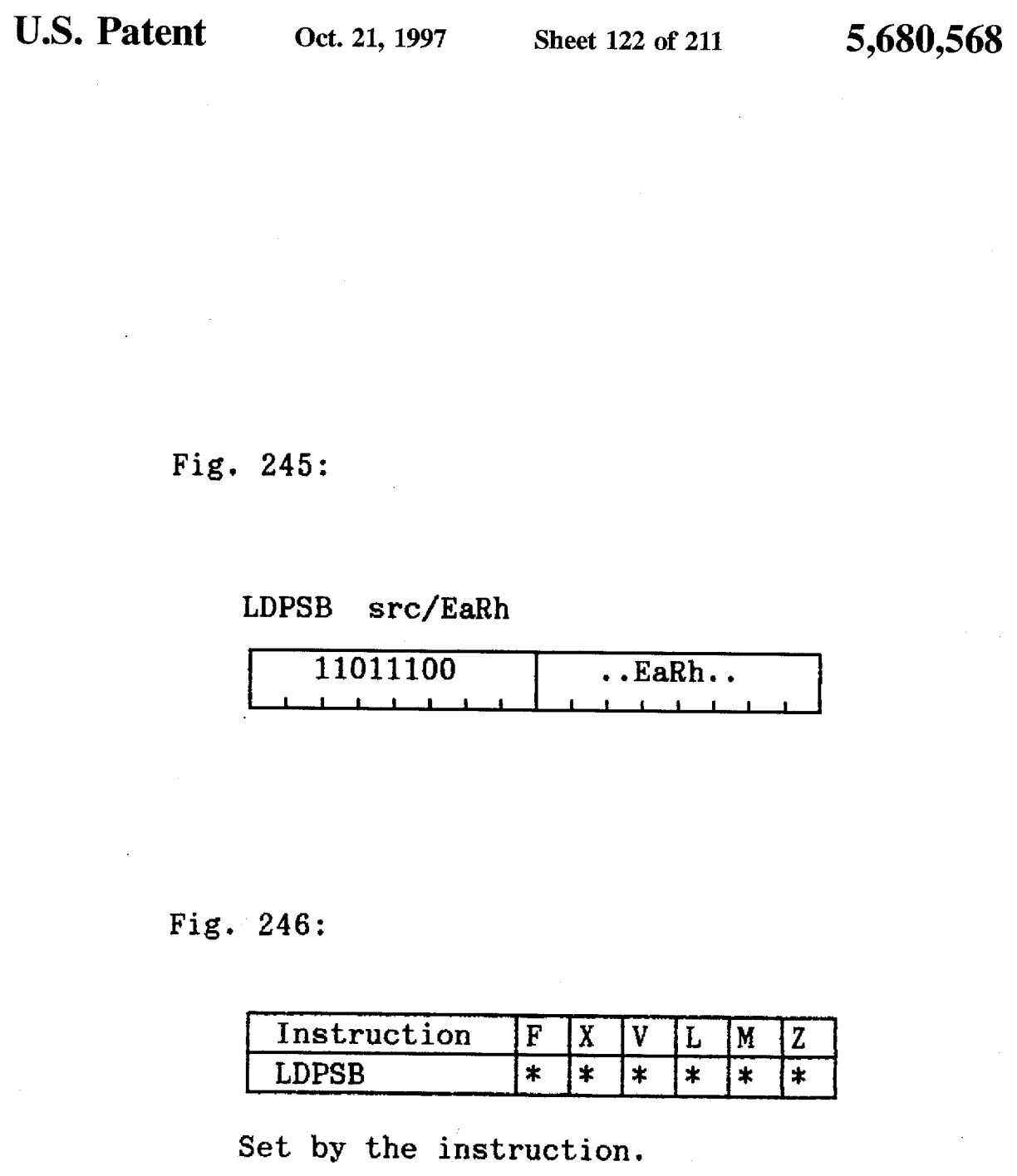

INSTRUCTION FORMAT AND ASSEMBLER SYNTAX: shown in FIG. 245.

STATUS FLAGS AFFECTED: shown in FIG. 246.

DESCRIPTION:

Transfer the content of src to PSB.

Except when the save operation and restore operation are performed (regardless of the meaning of each bit of PSB and PSM in a user's call routine), in PSM and PSB, it is often necessary to rewrite only part of the fields. Therefore, the src operand of the LDPSB and LDPSM instructions is composed of 16 bits (EaRh) where the high order byte represents the masking (the bits to be changed are set to 0) and the low order byte represents the data being changed.

[LDPSB Operation]

Assuming src=[S0.S1 . . . S7.S8.S9 . . . S15]

the following result is obtained. ([S0.S1 . . . S7].and.PSB) .or.([S0.S1 . . . S7].and.[S8.S9 . . . S15]) ==>PSB where '' represents a negated bit.

For example, the instruction which sets X_flag at the position 2^4 is as follows.

LSPSB #H'ef10

In the high order byte, any bit equal to 0 is changed and any bit equal to 1 is not changed. When all eight bits are changed, set all of the high order byte to 0 and simply write byte data. As described earlier, all the eight bits should be changed to save and restore PSB and PSM.

In LSPSB and LDPSM, if the value of a field not used in PSB and PSM is set to 1, a reserved function exception (RFE) occurs.

PROGRAM EXCEPTION:

Reserved instruction exception

When EaRh is @−SP

MNEMONIC:

LDPSM src

OPERATION:

load PSM

OPTIONS:

None

INSTRUCTION FORMAT AND ASSEMBLER SYNTAX: shown in FIG. 247.

STATUS FLAGS AFFECTED: shown in FIG. 248.

DESCRIPTION:

Transfer the content of src to PSM.

Except when the save operation and restore operation are performed (regardless of the meaning of each bit of PSB and PSM in a user's call routine), in PSM and PSB, it is often necessary to rewrite only part of fields. Therefore, the src operand of the LDPSB and LDPSM instructions is composed of 16 bits (EaRh) where the high order byte represents the masking (the bits to be changed are set to 0) and the low order byte represents the data being changed.

[LDPSM Operation]

Assuming src=[S0.S1 . . . S7.S8.S9 . . . S15]

the following result is obtained.

([S0.S1 . . . S7].and. PSM).or.([S0.S1 . . . S7].and.[S8.S9 . . . S15]) ==>PSM where '' represents a negated bit.

In LDPSB and LDPSM, if the value of a field which is not used in PSB and PSM is set to 1, a reserved function exception (RFE) occurs.

PROGRAM EXCEPTION:

Reserved instruction exception

When EaRh is @−SP

MNEMONIC:

STPSB dest

OPERATION:

store PSB

OPTIONS:

None

INSTRUCTION FORMAT AND ASSEMBLER SYNTAX: shown in FIG. 249.

STATUS FLAGS AFFECTED: shown in FIG. 250.

DESCRIPTION:

Transfer PSB to dest. The high order eight bits should always be 0.

The dest is structured with 16 bits rather than 8 bits and the high order eight bits always return 0 so that PSM and PSB are returned directly in LSPSM and LDPSB.

PROGRAM EXCEPTION:

Reserved instruction exception

When EaWh is #imm_data or @SP+

MNEMONIC:

STPSM dest

OPERATION:

store PSM

OPTIONS:

None

INSTRUCTION FORMAT AND ASSEMBLER SYNTAX: shown in FIG. 251.

STATUS FLAGS AFFECTED: shown in FIG. 252.

DESCRIPTION:

Transfer PSM to dest. The high order eight bits should always be 0.

The dest is structured with 16 bits rather than 8 bits and the high order eight bits always return 0 so that PSM and PSB are returned directly in LSPSM and LDPSB.

PROGRAM EXCEPTION:

Reserved instruction exception

When EaWh is #imm_data or @SP+

MNEMONIC:

LDP src,dest

OPERATION:

load physical space (privileged)

OPTIONS:

None

INSTRUCTION FORMAT AND ASSEMBLER SYNTAX: shown in FIG. 253.

STATUS FLAGS AFFECTED: shown in FIG. 254.

DESCRIPTION:

Transfer the src value to dest in the control space. If the size of src is smaller than that of dest, the former is sign-extended.

Since the data processor of the present invention does not provide the address translation feature, the logical space address is always the same as the physical space address. Thus, the function of the physical space operation instruction is included in the MOV instruction. The data processor of the present invention distinguishes between the logical space and physical space: Data Processor of the present invention supports the physical space operation instruction.

This instruction is a privileged instruction.

For dest/EaW%, the register direct mode Rn and @−SP cannot be specified.

In the operands of the LDATE, STATE, LDP, STP, LDC, STC and MOVPA instructions which reference the special space, if a memory indirect reference occurs by the additional mode, the logical space (LS) rather than the special space is referenced. On the other hand, if a stack pointer (SP) reference occurs, the current ring (RNG) stack rather than PRNG is referenced. The meaningful special space address is the only effective address which is finally obtained.

PROGRAM EXCEPTION:

Reserved instruction exceptions

When SS='11'

When WW='11'

When EaR is @−SP

When EaW% is Rn, #imm_data, @SP+ or @−SP

Privileged instruction violation exception

When this instruction is executed from a ring other than ring 0.

MNEMONIC:

STP src,dest

OPERATION:

store physical space (privileged)

OPTIONS:

None

INSTRUCTION FORMAT AND ASSEMBLER SYNTAX: shown in FIG. 255.

STATUS FLAGS AFFECTED: shown in FIG. 256.

DESCRIPTION:

Transfer the src value to dest in the control space. Since the size of src and dest is commonly assigned in STP, data is not transferred between different size operands.

Since the data processor of the present invention does not provide the address translation feature, the logical space address is always the same as the physical space address. Thus, the function of the physical space operation instruction is included in the MOV instruction. The data processor of the present invention distinguishes between the logical space and physical space; the data processor of the present invention supports the physical space operation instruction.

This instruction is a privileged instruction.

For src/EaR%, the register direct mode Rn, immediate #imm_data, and @SP+ cannot be specified.

In the operands of the LDATE, STATE, LDP, STP, LDC, STC and MOVPA instructions which reference the special space, if a memory indirect reference occurs due to the additional mode, the logical space (LS) rather than the special space is referenced. On the other hand, if a stack pointer (SP) reference occurs, the current ring (RNG) stack rather than PRNG is referenced. The meaningful special space address is the only effective address which is finally obtained.

PROGRAM EXCEPTION:

Reserved instruction exceptions

When WW='11'

When EaR% is Rn, #imm_data, @+SP or @−SP

When EaW is #imm_data or @SP+

Privileged instruction violation exception

When this instruction is executed from a ring other than ring 0.

12-15 OS-Support Instructions

MNEMONIC:

JRNG vector (the data processor of the present invention does not support it.)

OPERATION:

jump to new ring

OPTIONS:

None

INSTRUCTION FORMAT AND ASSEMBLER SYNTAX: shown in FIG. 257.

STATUS FLAGS AFFECTED: shown in FIG. 258.

DESCRIPTION:

This instruction performs the transition and jump operations between rings (an inter-ring call). This instruction is used to call a program in a more inner level than the current ring (including a system call).

To protect the inner ring from the outer ring, the destination to be jumped to using JRNG is limited to the specified address. The table containing this address is named the ring transition tale JRNGVT (JRNG vector table). In the JRNG instruction, the vector operand is an index for JRNGVT. One entry for JRNGVT is named JRNGVTE.

JRNGVT is a table which has 65535 entries for vector. The logical address of the base is represented by JRNGVB. The size of vector is composed of 16 bits. JRNGVB is one of the control registers and is configured as shown in FIG. 259.

JRNGVB represents the logical start address of the vector table (JRNGVT) of the JRNG instruction. The lower three bits of the base address of the table are fixed at 0 for alignment.

If E is 0, the execution of JRNG is inhibited. If JRNG is executed, a ring transition violation exception (RTVE) occurs. Since JRNGVB is meaningless, OS can freely employ such a field.

The bits represented with '=' should be filled with '0'. However, even if these bits are not filled with '0', it is ignored.

Figure 260:
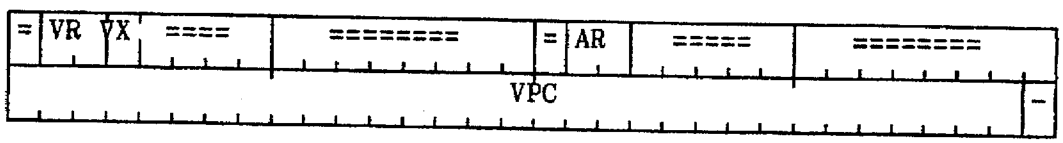

JRNGVTE is composed of 8 bytes in the configuration: diagrammed in FIG. 260. It works as a gate for entering the inner ring.

The AR function indicates from which ring a call can be issued between rings of the entry represented with the vector. If the current ring is located at a more outer position than the ring represented with AR, it is assumed that an inter-ring call (system call) is not permitted, resulting in a ring transition violation exception (RTVE). AR uses the field relating to the position of PRNG of PSW from the stand point that each entry of JRNGVT and EITVT, is basically a subset of PSW+PC.

The VX function is enabled if the 32/64 bit mode differs between OS and the user program.

In the fields not used in JRNGVTE (represented with '=') the 'VX' bit should be filled with '0'. However, even if they are filled with '1', they are ignored. It is not a reserved function exception (RFE).

The VPC field of JRNGVTE should be an even number. In other words, LSB of the VPC field should be '0'. When JRNG is executed, an odd address jump exception (OAJE) occurs if it is violated.

When MSB=0 in JRNGVB, the address is changed using UATB; when MSB=1, the address is changed using SATB. JRNGVB uses a logical address for the following reasons.

(1) The table can be provided every context.

(2) A virtual table can be used. In other words, the table can be free from paging.

(3) The difference between JRNGVB and TRAPA, is that EIT can be clarified.

By considering JRNGVB as a logical address, a virtual table can be created. The data processor of the present invention uses mostly 16 bits of vector (65536 entries, 512 KB table). It does not provide a register which assigns the upper limit of the vector. However, since JRNGVB uses a logical address, it can be used together with the MMU function, so that it is not always necessary to use the physical memory for the table. If STE and PTE of JRNGVT are set to areas not used, it is not necessary to prepare all the table for 16 bits=65536 entries with the physical memory.

JRNGVTE is read in the same manner as the general memory access operation with a logical address. Therefore, JRNGVTE is read by the ring access permission of the program which executes JRNG. If there is permission whereby JRNGVTE of the assigned vector can be read from the ring which executes JRNG, a ring protection violation error, ATRE, occurs. On the other hand, if JRNGVTE of the vector being assigned is an area not used, a not-used area reference error of an address translation exception (ATRE) occurs. Although the user would prefer that it be treated in the same manner as a ring transition violation exception (RTVE), the specification above is used due to restrictions in the implementation. When JRNCVTE is read, a page out exception (POE) or bus access exception (BAE) may occur.

With the JRNG function, 512 KB of the logical space is always required for JRNGVT. To prevent an illegal call between rings, OS should set STE and PTE in the JRNGVT area before executing the user program. When the call function between rings is not used, the entire ring call function can be disabled so that such a process is not required. To assign this function, the E bit at the LSB of JRNGVB is used. If the E bit of JRNGVB is 0, the ring call function cannot be used. When JRNG is executed, a ring transition violation exception (RTVE) unconditionally occurs.

To satisfy JRNG, the following conditions should be met.

E of JRNGVB=1

If E=0, it means that JRNGVT is not provided, so that a ring transition violation exception (RTVE) occurs.

JRNGVTE for the vector being assigned can be read from a ring before JRNG is executed.

If a page out exception (POE) occurs, after a page-in operation, the instruction is reexecuted.

If a not-used area reference error of an address translation exception (ATRE) occurs, it means that the related table is not provided, so that an error is returned to the user program.

If there is no read access permission, it means that due to data protection, the execution of JRNG is inhibited, so that an error is returned to the user program. It has the same meaning as the VA field, but it is assigned every 512 vectors.

If the current ring≧VR

Control does not enter an outer ring. If it is violated, a ring transition exception (RTVE) occurs.

If the current ring≧AR

Whether the ring can be accepted or not is checked. If it is violated, a ring transition violation exception (RTVE) occurs. AR represents the AR field of JRNGVTE.

[JRNG Operation]

If JRNGVB E bit=0 then ring transition violation exception (RTVE) occurs.

VR, AR and VPC are fetched from the logical address mem[vector x 8+JRNGVB]

If old RNG>AR .or. old RNG<VR then ring transition violation exception (RTVE) occurs.

Old SP==>TOS↓ (Use a new stack represented with VR)

Old PC==>TOS↓

As old PC, the start address following the JRNG instruction is pushed to the stack like the JSR instruction.

Old PSW .and. B'01110000_00000000_11111111_11111111==>TOS↓

In the old PSW, the fields which are meaningful in RRNG, namely, only the RNG, XA, and PSH fields are pushed directly to the stack and other fields such as SM, AT, and IMASK are masked to 0 and then pushed to the stack, so that the program in an outer ring cannot read information which should be known only to OS (such as IMASK).

Old RNG==>New PRNG

VR==>New RNG

VPC==>New PC

Figure 261:
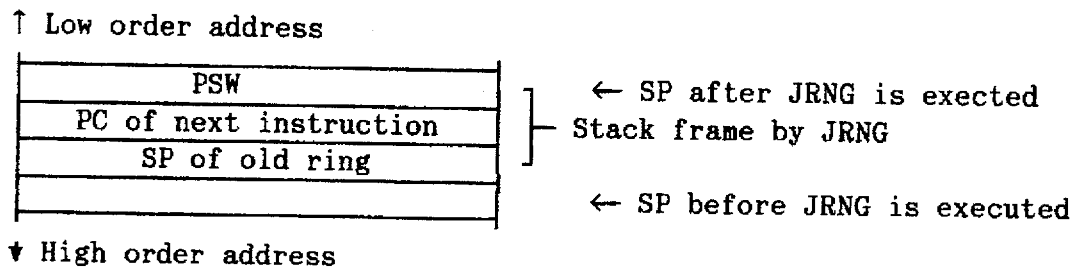

The stack frame formed by the JRNG instruction is as shown in FIG. 261.

SP of the old ring is placed at the stack of the new ring to access the stack pointer SP and stack of the old ring from the new ring. Although the stack can be accessed as the control register every ring, it is necessary to use a privileged instruction (STC). Thus, to observe a parameter placed at the ring 3 stack from ring 1, this function is required.

In JRNG, only part of PSS and PRNG of PSM rather than PSB are updated. In addition, unlike EIT, the inter-ring call function provides only one stack format, so FORMAT (EITINF) is not placed at the stack.

In JRNG:E, vector is zero-extended.

If AT=00 (no address translation), JRNGVB represents a physical address.

After JRNG is executed, if an instruction reexecution-type EIT, such as a ring transition violation exception (RTVE) occurs, the stack frame for an inter-ring call that JRNG originally provides is not formed. Only the stack frame for the EIT process is formed. For example, if JRNG is executed when SMRNG=000 to jump to RNG=00 and an EIT occurs, the stack frame as shown in FIG. 262, not FIG. 263 is formed.

Figure 262:
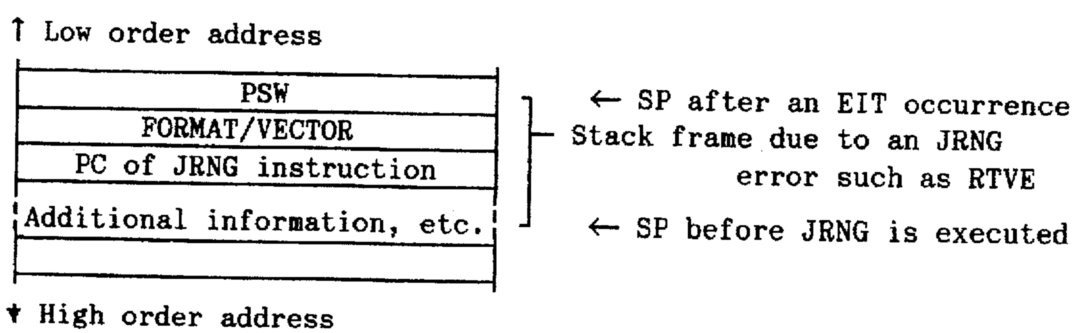
Figure 263:
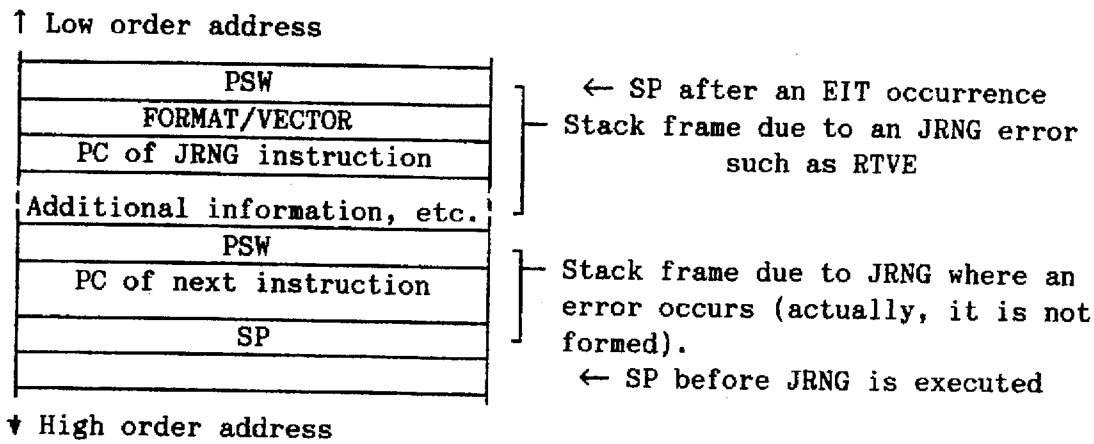

The specification as shown in FIG. 262 is used so that the instruction can be reexecuted after an EIT occurs. In other words, before entering the EIT process handler, the status of the processor is restored to the status before the instruction is executed. If the stack used by EIT differs from that of JRNG, only the stack used by EIT is changed; the stack SP used by JRNG is not changed.

Figure 264:
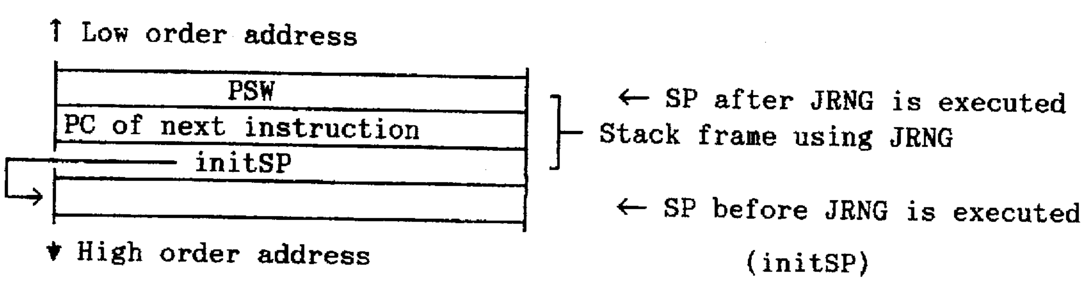

In JRNG, it is possible to jump to the same ring as the current ring. In this case, the stack is not switched by JRNG. The value to be pushed to the stack as SP is the value of SP before the instruction is executed. It works in the same manner as if PUSH SP is executed at the beginning of the JRNG instruction, as shown in FIG. 264.

When jumping to the same ring as the current ring using JRNG, if the vector operand of JRNG:G is in the memory and it overlaps with the stack frame area which is formed by the execution of the JRNG instruction, it is very difficult to reexecute the instruction. Therefore, in the JRNG:G instruction, all the address modes which require access to the memory, everything except the register direct Rn and immediate modes are inhibited. If a dynamic value is set as the operand of the instruction, it is necessary to prepare one temporary register and to use the register direct Rn mode.

The inter-ring call function is not included in EIT.

Both TRAPA and JRNG serve to evoke an OS system call. Generally, the OS which has many system calls and uses multiple rings, like BTRON, often employs JRNG, while that which does not have many system calls and uses not more than two rings, like ITRON, employs TRAPA.

In TRAPA, control does not enter ring 1 and ring 2. Therefore, if the outer core is placed at ring 1 in BTRON, it is necessary to use JRNG.

If the user extends OS for BTRON, it may be necessary to use an outgoing ring call. However, the outgoing ring call is not supported in the instruction set level.

PROGRAM EXCEPTION:

Reserved instruction exceptions

When P='1'

When EaRh!M is not Rn or #imm_data

<<L1>> function exception

When a bit pattern of JRNG is decoded

MNEMONIC:

RRNG (the data processor of the present invention does not support it.)

OPERATION:

return from previous ring

OPTIONS:

None

INSTRUCTION FORMAT AND ASSEMBLER SYNTAX: shown in FIG. 265.

STATUS FLAGS AFFECTED: shown in FIG. 266.

DESCRIPTION:

Return for an inter-ring call.

```
[RRNG Operation]
↑ TOS ==> temp1
↑ TOS ==> temp2
↑ TOS ==> SP of temp1<RNG>
if RNG > temp1<RNG> then ring transition violation excep-
tion
        (RTVE) occurs
            - temp1 <RNG> represents the portion equivalent
              to the RNG field when considering templ as PSW.
            - If this check is not conducted, with the RRNG
              instruction, control illegally enters an inner
              ring.
if SM = 0 .and. temp1 <RNG> ≠ 00 then reserved function
exception (RFE) occurs.
temp1<PSH> ==> PSH (Including PRNG)
temp1<RNG> ==> RNG
temp1<XA> ==> XA
temp2 ==> PC
```

When the RRNG instruction is executed, since an EIT may occur in DCE, it is necessary to check for it. For detail, see Appendix 9.

The old PRNG stack pointer is popped from the RNG stack and it is set as the PRNG stack pointer so that OS may update the user stack pointer because a parameter of the system call placed in the PRNG stack is popped.

With PRMG, if control tries to enter an inner ring, a ring transition violation exception (RTVE) occurs. If PC popped from the stack is an odd number, an odd address jump exception (OAJE) occurs.

If SM of the current PSW is 0 and RNG in the stack which is popped with the RRNG instruction (temp1 <RNG> in the operation above) is not 0, a combination of SM and RNG in PSW becomes a reserved pattern. A reserved function exception (RFE) occurs.

Figure 267:
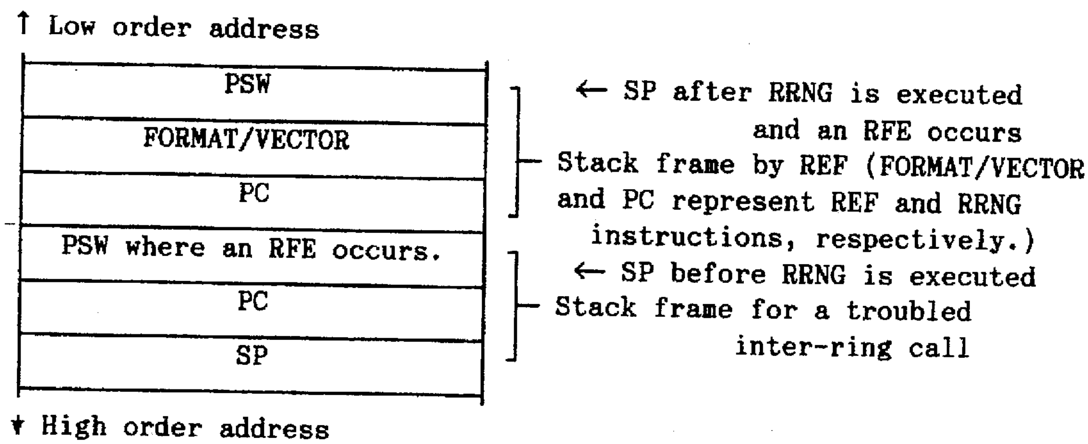

In the RRNG instruction, if a ring transition violation exception (RTVE) or a reserved function exception (RFE) occurs, each of which is an instruction reexecution type exception, the stack frame for inter-ring call remains. Therefore, if the same stack is used for EIT and inter-ring call, the EIT stack frame is added to the inter-ring call stack frame. If the stack for EIT differs from that for the inter-ring call, the contents of the stack and stack pointer for the inter-ring call are not changed, similar to a DCE caused by RRNG. In DCE, after the stack frame for the previous inter-ring is called, a new stack frame for DCE is formed.
<<Example of a stack when an RFE occurs, if EIT uses the same stack>>: diagrammed in FIG. 267.

On the other hand, OAJE will be an instruction completion type EIT. In this case, like a DCE, after the stack frame for an inter-ring call is cleared, the stack frame for an EIT is formed. If an OAJE occurs with the RRNG instruction, the stack works as follows.
<<Example of stack when an OAJE occurs, if the same stack is used for an EIT>>

Figure 268:
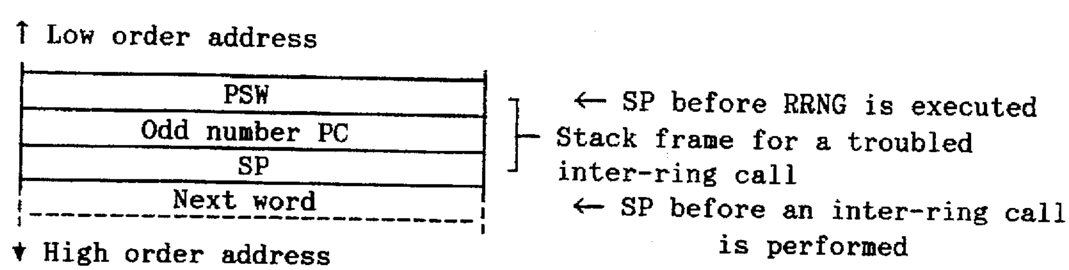

(Before executing RRNG): Shown in FIG. 268.

(After RRNG is executed and an OAJE occurs): shown in FIG. 269.

The fields other than PSH, RNG, and XA of PSW being popped from the stack with the RRNG instruction (temp1 above) are ignored. Between the JRNG instruction and the RRNG instruction in the program, except for the fields PSH, RNG and XA, the stack should not be rewritten.

When control comes back to the same ring with the RRNG instruction (32 bits), the final value of SP becomes as follows.

mem[initSP+8]==>SP ('+8' is for PC and PSW)

The above instruction works as POP SP after the PC and PSW processes are executed.

The E bit of JRNGVB is evaluated irrespective of the operation of the RRNG instruction. Even if the E bit is 0, the RRNG instruction is executed.

PROGRAM EXCEPTION:

Reserved instruction exceptions

When P='1'

<<L1>> function exception

When a bit pattern for RRNG is decoded

MNEMONIC:

RAPA vector

OPERATION:

TRAP always

OPTIONS:

None

Figures 270, 271:
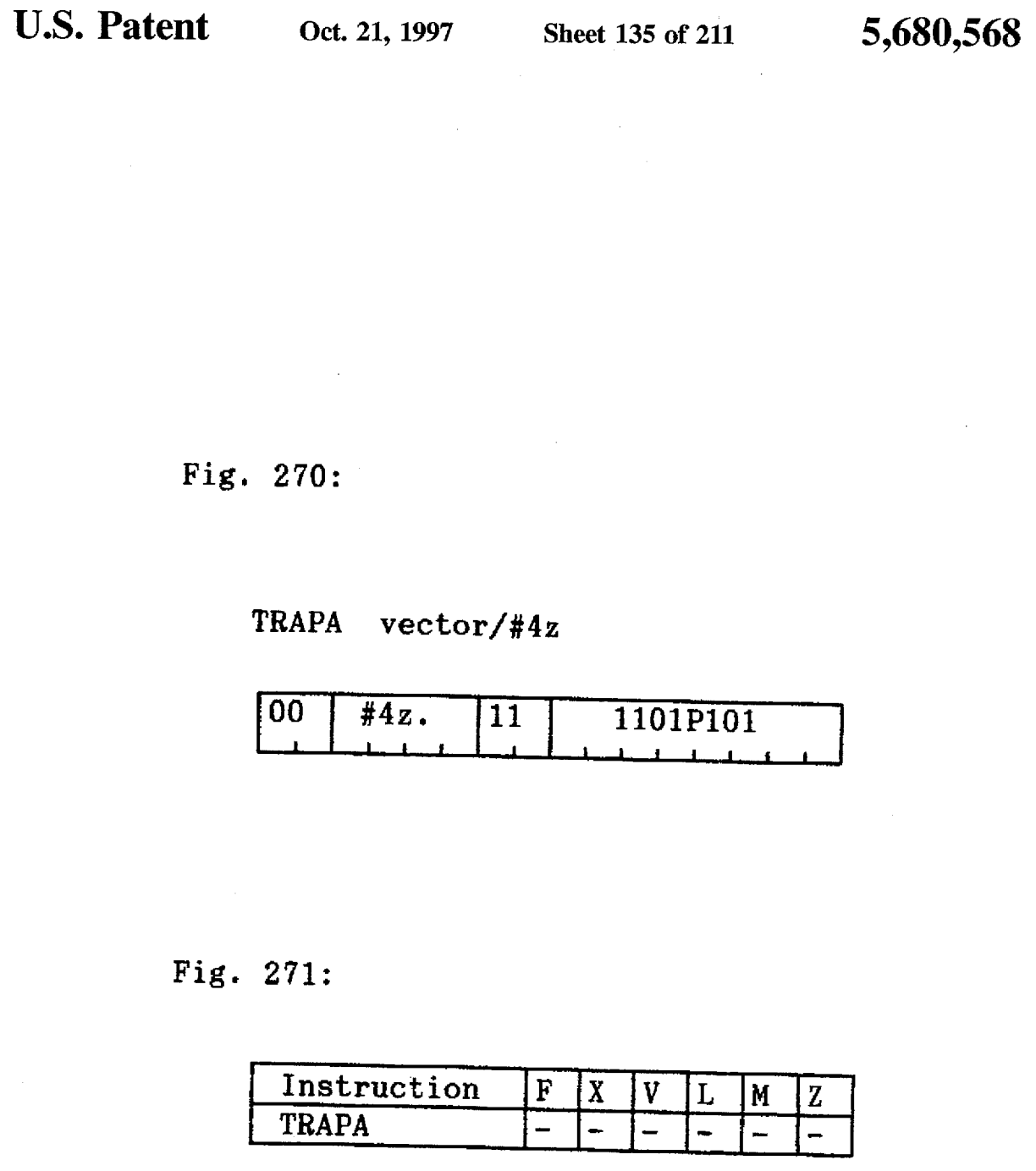

INSTRUCTION FORMAT AND ASSEMBLER SYNTAX: shown in FIG. 270.

STATUS FLAGS AFFECTED: shown in FIG. 271.

DESCRIPTION:

Generate an internal interrupt (trap).

This instruction is used to evoke OS from a user process. Since an EIT occurs with the TRAPA instruction, control always enters ring 0.

In TRAP and TRAPA, like other EIT processes, part of PSS and PRNG of PSM are updated.

The fields, except PRNG of PSM (including PSB) are not updated.

PROGRAM EXCEPTION:

Reserved instruction exceptions

When P='1'

Unconditional trap instruction

MNEMONIC:

TRAP

OPERATION:

TRAP conditionally

OPTIONS:

/various conditional specifications (cccc)

Figures 272, 273:
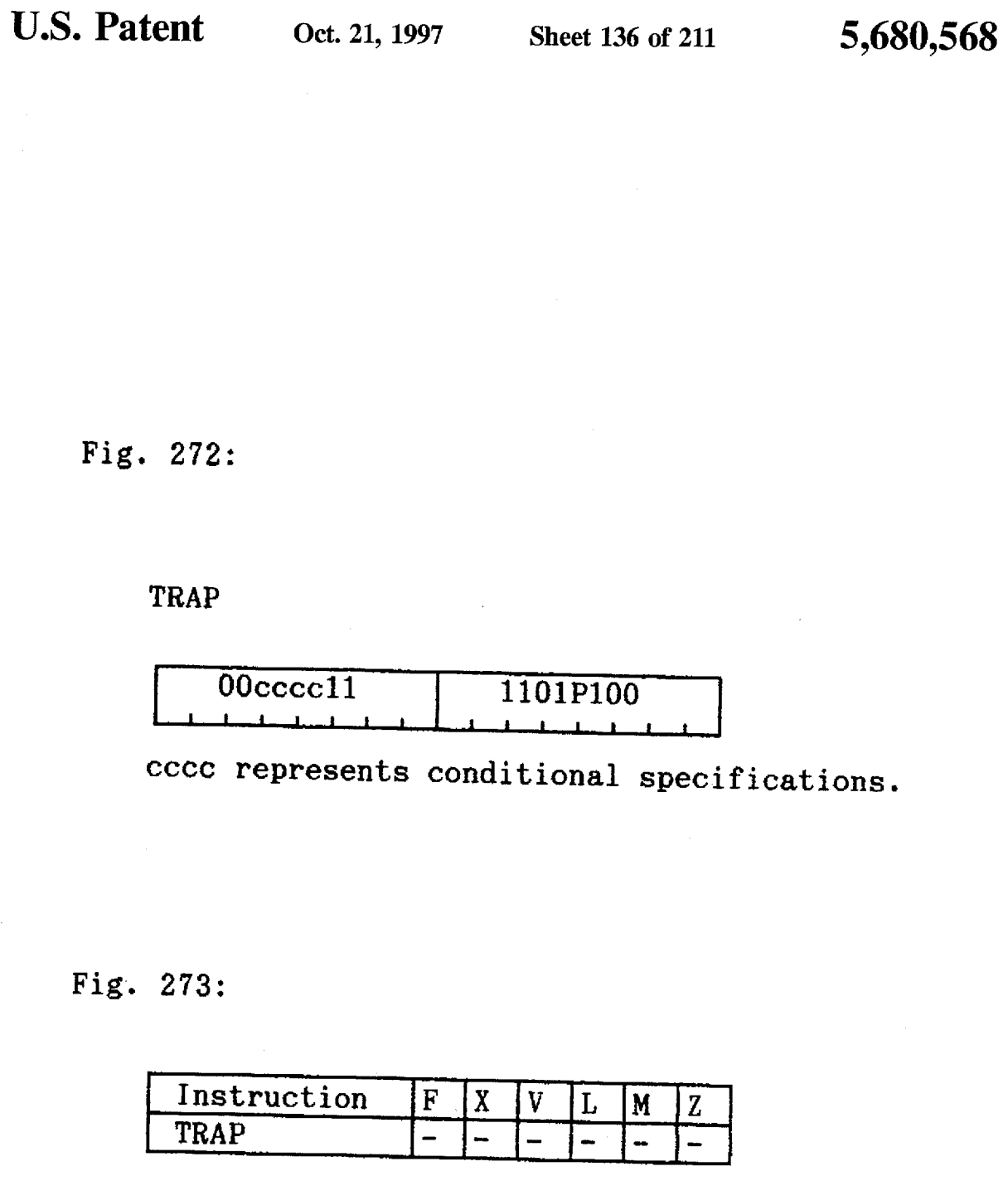

INSTRUCTION FORMAT AND ASSEMBLER SYNTAX: shown in FIG. 272.

STATUS FLAGS AFFECTED: shown in FIG. 273.

DESCRIPTION:

If the conditions being specified are met, an internal interrupt (trap) occurs.

Since an EIT occurs with the TRAP instruction, control always enters ring 0. The conditional specifications are the same as those of the Bcc instruction.

In TRAP and TRAPA, like other EIT processes, only part of PSS and PRNG of PSM are updated.

The fields other than PRNG of PSM (including PSB) are not updated.

If a condition which has not been defined in TRAP is specified, a reserved instruction exception (RIE) occurs.

PROGRAM EXCEPTION:

Reserved instruction exceptions

When P='1'

When cccc='1110,1111'

Conditional trap instruction

MNEMONIC:

REIT

OPERATION:

return from EIT (privileged)

OPTIONS:

None

Figures 274, 275, 276:
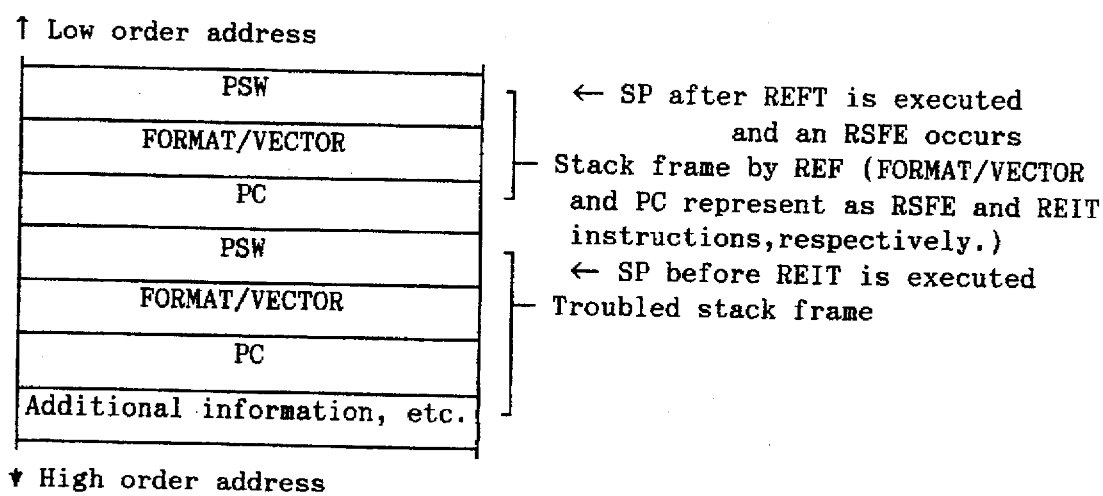
FIG. 274 is a view of the format of instruction REIT.
FIG. 275 is an illustration of the flag change thereof.
FIG. 276 is an illustration of the instruction REIT.

INSTRUCTION FORMAT AND ASSEMBLER SYNTAX: shown in FIG. 274.

STATUS FLAGS AFFECTED: shown in FIG. 275.

DESCRIPTION:

In the data processor of the present invention, exception, external interrupt and internal interrupt are generally named EIT (Exception, Interrupt, Trap). The REIT instruction is used to return from EIT, namely, return from OS and from an interrupt process.

This instruction is a privileged instruction.

[REIT Operation]

↑TOS==>PSW;

↑TOS==>FORMAT/VECTOR;

↑TOS==>PC;

Depending on the EIT type, additional information may be placed on the stack. It is popped to restore the state before an EIT occurs. Whether there is additional information or not is determined by FORMAT/VECTOR (EITINF). When the REIT instruction is executed, an EIT of DI and DCE may occur and it should be checked. For details, see Appendix 9.

If a stack format which has not been supported as FORMAT/VECTOR, a reserved stack format exception (RSFE) occurs. A stack frame whose format is illegal remains because there is no way to determine whether there is additional information or not. It is added to the stack frame and the stack frame for RSFE is formed , unlike DI and DCE , since it is started in REIT. In DI and DCE, the stack frame of the previous EIT is cleared and the new stack frame for DI and DCE is formed. <<RSFE process—If the same stack is used for RSFE>>: diagrammed in FIG. 276.

In the REIT instruction, if PC which is popped from the stack is an odd number, an odd address jump exception (OAJE) occurs. On the other hand, if the reserved bit ('–') in PSW (including the XA bit) is changed to '1' or if the reserved value is rewritten as SMRNG, a reserved function exception (RFE) occurs.

Whether the SM bit is changed or not is not checked. As long as the REIT instruction is used to exit from EIT, SM is not changed from 1 to 0. However, it is considered in operation and in the REIT instruction SM is not checked to see whether it changed from 1 to 0.

PROGRAM EXCEPTION:

Reserved instruction exception

When P='1'

Privileged instruction violation exception

When the instruction is executed from a ring other than ring 0

Reserved stack format exception

If a stack format which has not been supported is specified when control exits from an EIT Odd address jump exception When the PC being popped from the stack is an odd number Reserved functional exception The value of reserved is written to PSW by another PSW which is popped from the stack

MNEMONIC:

WAIT imask

OPERATION:

set IMASK and wait (privileged)

OPTIONS:

None

INSTRUCTION FORMAT AND ASSEMBLER SYNTAX: shown in FIG. 277.

STATUS FLAGS AFFECTED: shown in FIG. 278.

DESCRIPTION:

Set the IMASK field of PSW, stop executing the program and restore the execution by an external interrupt or reset.

This instruction is a privileged instruction. Imask is interpreted as an unsigned number. If imask≦16, a reserved function exception (RFE) occurs.

If an external interrupt occurs, there is information which cannot be settled until an interrupt occurs (stack selection of SPI/SP0 and vector No.). Thus, the information is saved to the stack after an external interrupt occurs in the WAIT instruction.

[WAIT Operation]
imask ==> IMASK
wait for interrupt
<======== External interrupt
save PC, FORMAT/VECTOR, PSW — PC which is the same external interrupt,EIT,represents the next address of the WAIT instruction.
set newPC, newPSW

PROGRAM EXCEPTION:

Reserved instruction exceptions

When–='1'

Privileged instruction violation exception

When the instruction is executed from ring 0

MNEMONIC:

LDCTX ctxaddr

OPERATION:

load context from CTXB (privileged)

OPTIONS:

/LS Load CTXB from the logical space.

/CS Load CTXB from the control space <<L2>>. (Data processor the of the present invention does not support this option.)

INSTRUCTION FORMAT AND ASSEMBLER SYNTAX: shown in FIG. 279.

STATUS FLAGS AFFECTED: shown in FIG. 280.

DESCRIPTION:

Load the effective address represented with ctxaddr to the CTXBB register and load the contents of the context block (CTXB) of a task and process to processor registers. Although the register where the effective address is loaded depends on whether MMU is used or not and on the content of CTXBFM, they include SP0 to SP3, UATB, and CSW. For details of the registers where the effective address is transferred, see Appendix 8.

When the /LS option is specified, ctxaddr represents an address in the logical space. In this case, CTXB is placed in the logical space. On the other hand, if the /CS option is specified, ctxaddr represents an address in the control space. These options will be used when a context saving high speed memory is accommodated in the chip. Currently, it is specified in <<L2>>. These options are provided to bring flexibility to a space where CTXB is placed to perform the highest context switching in accordance with the implementation of the chip and chip bus.

The data processor of the present invention does not support the /CS option.

In a processor which accommodates a standard the data processor of the present invention MMU, UATB is changed with the LDCTX instruction. As UATB is changed in a processor which does not accommodate LSID, TLB and cache (equivalent to PSTLB/AT) are automatically purged. In the LDCTX instruction, since the logical space is switched, ctxaddr should point at SR to allow LDCTX/LS to properly work. The result of the operation is not assured with LDCTX/LS if ctxaddr points at UR.

(SR: shared region, UR: unshared region)

In the LDCTX and STCTX instructions of the data processor of the present invention, data is not transferred to the general purpose registers R0 to R14 due for the following reasons.

For the general purpose registers, data can be transferred with the LDM and STM instructions. These instructions allow a register to be specified. In the real context switching process, working registers are required beside the registers where data is changed. Therefore, it may be necessary not to transfer data to some of the registers. Consequently, it is preferable to use more general purpose instructions such as LDM and STM.

Since it is currently technically difficult to accommodate a context saving memory in the chip, an external memory should be used to save a context. Even if data is transferred to the general purpose registers with LDCTX, its speed is nearly the same as that using a different instruction (LDM).

When all CTXB is accommodated in the chip to speed up the process, it is necessary to expand the specification by using the reserved option of LDCTX and the CTXBFM function.

In the LDCTX and STCTX instructions, data is not transferred to PC and PSW for the following reasons.

Generally, PC and PSW of a user program, rather than OS, should be switched by the context switch. However, PC and PSW of a user program are saved in the stack when evoking OS. Therefore, when using the stack of SP0 to save PC and PSW, PC and PSW are also indirectly switched by switching SP0 with the context switch. By using this feature and realizing PC and PSW are placed in the portion (stack) indirectly referenced from SP0, it is not necessary to perform the PC and PSW operations (copy between the stack and CTXB) with the context switch instruction.

If the context is switched in the last portion of the process handler of an external interrupt using SPI, it is necessary to transfer PC and PSW between the SPI stack and CTXB. However, when the context switching is deleted during an external interrupt and the context switching is performed with DCE and DI when exiting from the external interrupt, SP0 specified with DCE and DI allows the data structure above to naturally be formed.

This instruction is a privileged instruction. When '1' is loaded from CTXB for the reserved bit (represented with '–') of PSW being set by LDCTX, a reserved function exception (RFE) occurs. When '1' is loaded from CTXB for the reserved bit (represented with '='), it is ignored acting as if like the control register is set with LDC.

In the chip specified in <<L1>>, even if AT=00 (no address translation), UATB is transferred, because it is assumed that the address translation is temporarily suspended in OS. However, if AT=00, even if /LS is specified, ctxaddr is treated as a physical address. To specify that UATB not be transferred with LDCTX, it is necessary to use CTXBFM.

In the current specification of LDCTX, data is not transferred to the general purpose registers. However, if the specification is expanded or if a context saving memory is accommodated on the chip in future, the contents of the multiple general purpose registers will be loaded with the LDCTX instruction. If the additional mode is allowed in ctxaddt/EaA!A, like LDM, it is difficult to reexecute the instruction which has been suspended. Therefore, in ctxaddr/EaA!A of LDCTX, the additional mode is inhibited.

If the additional mode function is required, with the following instructions (including MOVA) the same effect can be obtained.

MOVA @(@(@(...))):A,R0

LDCTX @RO

PROGRAM EXCEPTION:

Reserved instruction exceptions

When xx='01' to '11'

When EaA!A is Rn, #imm_data, @SP+, @-SP, or additional mode

Privileged instruction violation exception

When the instruction is executed from a ring other than ring 0.

Reserved function exception

When the reserved value is written to PSW

MNEMONIC:

STCTX

OPERATION:

store context to CTXB

OPTIONS:

/LS Store CTXB in the logical space.

/CS Store CTXB in the control space <<L2>>. (the data processor of the present invention does not support this option.)

INSTRUCTION FORMAT AND ASSEMBLER SYNTAX: shown in FIG. 281.

STATUS FLAGS AFFECTED: shown in FIG. 282.

DESCRIPTION:

Save the contents of the current context in the processor to the area (CTXB) represented by the CTXBB register. The registers where the contents are saved depend on whether MMU is used or not and on the contents of CTXBFM. They include SP0 to SP3, UATB and CSW. For details on the registers where data is transferred with STCTX, see Appendix 8.

Like LDCTX, the general purpose registers, PC and PSW are not transferred in STCTX.

The space that CTXBB points at is specified by the /LS and /CS options. However, the /CS option only works when the content saving memory is located on the chip. It is specified in <<L2>>.

The data processor of the present invention does not support the /CS option.

In a processor which accommodates a standard the data processor of the present invention MMU, UATB is saved with the STCTX instruction. CTXBB should point at SR to allow STCTX/LS to properly work. I is not checked to determine whether CTXBB points at SR or UR.

This instruction is a privileged instruction.

For the bits represented with '–' and '+' in the reserved bits of the control register saved to CTXB with STCTX, '0' and '1' are set to CTXB For the bits represented with '–', '#' and '*', a value being set to CTXB is meaningless and depends on the implementation like the STC instruction.

In a chip specified with <<L1>>, UATB is transferred because the address translation is temporarily suspended only in OS even if AT=00 (no address translation). However, if AT=00, CTXBB is treated as a physical address even if /LS is specified. To specify that UATB not be transferred with STCTX, it is necessary to use CTXBFM.

PROGRAM EXCEPTION:

Reserved instruction exceptions

When xx=not '00'

When P='1'

Privileged instruction violation exception

When the instruction is executed from a ring other than ring 0.

12-16 MMU Support Instructions

MNEMONIC:

ACS chkaddr

OPERATION:

test access rights

OPTIONS:

None

INSTRUCTION FORMAT AND ASSEMBLER SYNTAX: shown in FIG. 283.

STATUS FLAGS AFFECTED: shown in FIG. 284.

DESCRIPTION:

Check for ATE of the page containing the address specified by chkaddr and check that chkaddr can be accessed by PRNG.

The flags are set depending on the result being checked. (ATE: Address Translation Table Entry)

Read enable==>M_flag

Write enable==>Z_flag

Execute enable==>L_flag

This instruction is not a privileged instruction, so it is available to the user. For example, it is possible to check the access right (permission) for PRNG=ring3 from ring 3. Therefore, information managed by OS such as page-out is not displayed if possible. If a page-out occurs on the section table and page table which are necessary to execute ACS, like regular instructions, the instruction is reexecuted as a page out exception (POE). In addition, while referencing the ATE with the ACS instruction, an address translation exception (ATRE) or bus access exception (BAE) may occur.

The size of the operand to be tested with the ACS instruction is a byte. In other words, it is the one byte of the address represented with EaA which can be accessed from PRNG. When checking area which is over multiple bytes, it should be handled with software.

In ACS, when checking the access permission for a process request from the preceding ring, PRNG can be used. However, if a process is called from ring3 to ring2 and ring1 is evoked from ring2, it may be necessary to check the access permission from ring3 at ring1. When PRNG is at ring 2, the ACS instruction cannot be used. After PRNG is rewritten for ring3, ACS should be executed.

To fulfill such a requirement, PRNG is placed at a PSM the user can operate. PRNG is a field which is used as a parameter for the ACS instruction. However, the protection information of ring0 is viewed from ring 3. To prevent the protection information from being viewed, if PRNG<RNG, set the flags as follows.

L_flag=M_flag=Z_flag=0

In ACS, if chkaddr is in an area not used (out of the page range), the instruction is normally terminated as no access permission with M_flag=0, Z_flag=0 and L_flag=0 as Read disabled, Write disabled and Execute disabled. An EIT does not occur.

Since the ring protection is not checked if AT=00 (no address translation), it is assumed that there are access permissions for all addresses. Actually, when a bus access exception (BAE) occurs, there are areas which cannot be accessed. However, they are not checked. Since the level of the access error caused by the system bus differs from that caused by the memory protection, only the latter access error is checked in ACS. Therefore, if AT=00, after chkaddr is obtained, no exception occurs and the instruction is terminated as L_flag=M_flag=Z_flag=1 (presence of access permission).

The ACS instruction can be used when the ring protection level check should be completely emulated in an instruction emulation program. Since the emulation program is normally placed at ring 0, it is normally executed in a different ring from the instruction being emulated. In other words, for the ring protection level, the environment of the program to be emulated differs from that of the emulation program. Therefore, the ring protection check can be correctly emulated by checking whether the operand can be accessed from the same ring (PRNG) as the instruction being emulated before accessing the operand of an instruction to be emulated.

In calculating the effective address of chkaddr of ACS, if the stack pointer SP is referenced, the stack of the current ring RNG rather than PRNG is referenced.

PROGRAM EXCEPTION:

Reserved instruction exception

When EaA is Rn, #imm_data, @SP+or @-SP

MNEMONIC:

MOVPA srcaddr, dest (the data processor of the present invention does not support this instruction.)

OPERATION:

move physical address (privileged)

OPTIONS:

None

INSTRUCTION FORMAT AND ASSEMBLER SYNTAX: shown in FIG. 285.

STATUS FLAGS AFFECTED: shown in FIG. 286.

DESCRIPTION:

Calculate the effective address (logical address) of the operand being specified by srcaddr, convert it into the physical address, and then transfer it to dest. The address translation method of the effective address is such that the R1 register rather than the UATB register is used for the base address of the address translation table unlike the regular instructions. It allows a space, except the logical space, where the current program runs to be operated from OS.

This instruction uses fixed number registers to specify spaces like high level instructions. Because this instruction is not directly used in a high level language, more symmetry for the instruction is not required, and there is a restriction for bit assignment.

In the MOVPA instruction, if a page out exception or address translation exception occurs after srcaddr is obtained until it is translated into the physical address, such an error affects the flags, but an EIT does not occur. The error occurs if 1) a page-out occurs on the section table and page table which are used for address translation of srcaddr, 2) a page-out occurs on the last page (not the page table), or 3) there is an error in the entry (ATE) format of the translation table (reserved ATE error). Dest is not changed, V_flag is set, and the instruction is terminated. An occurrence of a page fault is indicated by F_flag. If the instruction is terminated without an error and page fault, V_flag is cleared. Since this instruction is basically considered to be an address operation, other flags are not changed.

The flag changes of the MOVPA instruction are summarized as FIG. 287.

If V_flag=0 and F_flag=1 occur in STATE, a page out in the next level is included in the page out where V_flag=1 and F_flag=1 in MOVPA. Thus, the flag change pattern of STATE differs from that of MOVPA.

If a page fault occurs to obtain an effective address such as srcaddr and dest, like regular instructions, a page out execution (POE) occurs.

This instruction is a privileged instruction.

For dest/EaW!S, the @-SP mode is inhibited. If @-SP is specified to dest while V_flag is set due to an error and page out and the content of dest cannot be transferred, the operation of the instruction cannot be distinguished.

In the operands of the LDATE, STATE, LDP, STP, LDC, STC and MOVPA instructions which reference the special space, if a memory indirect reference occurs in the additional mode, the logical space (LS) rather than the special space is referenced. On the other hand, if a stack pointer (SP) reference occurs, the current ring RNG stack rather than PRNG is referenced. The meaningful special space address is the only effective address which is finally obtained.

In the MOVPA, LDATE and STATE instructions, if MSB of the related address is 1 (if SR is represented), the address translation is conducted using STAB rather than R1, as summarized as in FIG. 288.

In MOVPA, LDATE and STATE, the base register for the address translation operation is assigned by R1 rather than UATB. Even if the R1 bit corresponding to the reserved portion of UATB (the bits of 2^4 and 2^5 represented by '=') is not '1', it is not checked Even if it is not checked, the bits of 2^4 and 2^5 should be filled with '0'.

After the effective address of srcaddr is obtained, the address translation is conducted using R1. The operation for obtaining the physical address does not affect the AT bit. In short, even if AT=00, the address translation for srcaddr is conducted to obtain the physical address the same as when AT=01. As a pre-operation for the address translation operation, it is assumed that this instruction is used. The effective address calculation for srcaddr and dest (such as an indirect reference) and data write operation to dest are sent to the physical address when AT=00.

PROGRAM EXCEPTION:

Reserved instruction exceptions

When+='0'

When W='1'

When EaA is Rn, #imm_data, @SP+ or @-SP

When EaW!S is #imm_data, @SP+ or @-SP

<<L1>> function exception

When a bit pattern of MOVPA is decoded

MNEMONIC:

LDATE src,destaddr (the data processor of the present invention does not support this instruction.)

OPERATION:

load address translation table entry (privileged)

load ATE (PTE,STE)

OPTIONS:

/AS Purge TLB in all the logical spaces.

/SS Purge TLB in the logical space containing LSID specified by R0. <<L2>>

/PT PTE (Page Table Entry) operation

/ST STE (Section Table Entry) operation

INSTRUCTION FORMAT AND ASSEMBLER SYNTAX: shown in FIG. 289.

STATUS FLAGS AFFECTED: shown in FIG. 90.

DESCRIPTION:

Calculate the effective address (logical address) of the operand specified by destaddr and transfer data obtained by src to the address translation table entry used for the physical address translation operation. The address translation method for destaddr is such that the R1 register rather than the UATB register is used as the base address (physical address) of the address translation table unlike regular instructions, so that a space other than a logical space where a program is currently executed can be operated through OS. If MSB of destaddr is 1 (SR: Shared region), the address translation is conducted using SATB rather than R1.

With the/PT and/ST options, R1 represents the base address of the section table.

Consequently, two levels of indirect reference occur with /PT, while one level of indirect reference occurs with /ST.

If the ATE set operation is conducted normally, TLB and logical cache, which are affected by changing the ATE value, are automatically purged.

If TLB's for multiple contexts (processes and tasks) exist, LSID is used to distinguish them. If TLB can distinguish multiple logical spaces, with the /SS option being specified, only TLB's where LSID is matched to R0 can be purged. Although LSID for the logical space which is currently in use is placed in the LSID control register, it is not affected by the execution of the LDATE instruction. Since the memory management and TLB configuration strongly depend on the implementation, when this instruction is accommodated, it is not always necessary to implement the /SS option. The LSID function is not always required. The /SS option provids a processor with LSID that is compatible with others without it. For detail, see the description of PSTLB.

In this instruction, the fixed number registers are used to assign spaces like high level functional instructions. Instructions are thus not required to be symmetrical because they are not directly used in a high level language and because a restriction exists due to the bit assignment. In this instruction, F_flag and V_flag are used to distinguish between various cases such as error of the ATE and page out. The instruction works as follows:

1. If a format error (reserved ATE error) occurs in ATE in a higher level than that to be operated on the section and page tables used for the address translation of destaddr, the ATE set operation is not conducted and the instruction is terminated with V_flag=1 and F_flag=0 since ATE to be operated cannot be obtained.

2. If a page-out occurs on the table containing ATE in the level to be operated or in a higher level than that on the section and page tables used for the address translation of destaddr, the ATE set operation is not also conducted and the instruction is terminated with V_flag=1 and F_flag=1 since ATE to be operated cannot be obtained. In addition, if both a reserved ATE error and next level page-out occur at ATE in the middle level, a reserved ATE error has a higher priority than the next level page out and the flag status becomes V_flag=1 and F_flag=0.

3. Otherwise

Otherwise, data in src is set to ATE and V_flag is set to 0. When the PI bit of the data set to ATE becomes 0 because of LDATE, F_flag becomes 1 to indicate a page-out in the lower level. If setting data causes reserved ATE error to occur, F_flag is set to 1. In both cases, if the address translation is conducted with ATE having set, an exception occurs. If there is no error in ATE set and the PI bit is '1', F_flag is set to '0'.

The flag change of the LDATE instruction is summarized as shown in FIG. 291.

Since this instruction is basically considered an address operation, the statuses of M_flag and Z_flag are not changed. If a page fault occurs while the effective address for src and destaddr is obtained, a page out exception (POE) occurs as in regular instruction.

This instruction is a privileged instruction.

With LDATE/ST, the process equivalent to PSTLB/ST is automatically conducted, the process equivalent to PSTLB/PT is automatically conducted with LDATE/PT.

In the operands of the LDATE, STATE, LDP, STP, LDC, STC and MOVPA instructions which reference the special space, if a memory indirect reference occurs because of the additional mode, the logical space (LS) rather than the special space is referenced. On the other hand, if a stack pointer (SP) reference occurs, the current ring RNG stack rather than PRNG is referenced. The meaningful special space address is the only effective address which is finally obtained.

In MOVPA, LDATE and STATE, the base register for the address translation operation is assigned by R1 rather than UATB. Even if the R1 bit corresponding to the reserved portion of UATB (the bits of 2^4 and 2^5 represented by '=') is not '1', it is not checked. Even if it is not checked by the hardware, the bits of 2∝and 2≡should be filled with '0'.

In executing LDATE when AT=00, the contents of src are fetched and the effective address of destaddr is calculated without the address translation operation like other instructions. However, the LDATE instruction itself does not depend on the value of AT. In short, even if AT=00, the effective address of destaddr being obtained is interpreted as a logical address and the contents of src are transferred to ATE which is used to translate the logical address into the physical address. It is assumed that this instruction is used as a pre-operation for the address translation.

The specifications of LDATE, STATE and MOVPA when AT=00 are determined so that they conform to the specifications when AT=01, so that OS can be used to initially set the operation environment of MMU, and so that they can be used consistently when a user program works with AT=01 and OS works with AT=00.

PROGRAM EXCEPTION:

Reserved instruction exceptions

When !R='11'(Not detected when !='0')

When P='1'

When ttt='010' to '111'

When EaR is @-SP

When EaA is Rn, #imm_data, @SP+ or @-SP

<<L1>> function exception

When a bit pattern of LDATE is decoded

MNEMONIC:

STATE srcaddr,dest (the data processor of the present invention does not support this instruction)

OPERATION:

store address translation table entry (privileged)

store ATE (PTE,STE)

OPTIONS:

/PT PTE (Page Table Entry) operation

/ST STE (Section Table Entry) operation

INSTRUCTION FORMAT AND ASSEMBLER SYNTAX: shown in FIG. 292.

STATUS FLAGS AFFECTED: shown in FIG. 293.

DESCRIPTION:

Calculate the effective address (logical address) of the operand specified by srcaddr, read the address translation table entry (ATE) which is used to convert the effective address into the physical address, and set it to dest. The address translation method for srcaddr is such that the R1 register rather than the UATB register is used as the base address (physical address) of the address conversion table unlike regular instructions, so that a space other than a logical space where a program is currently executed can be operated through OS. If MSB of srcaddr is 1 (SR: Shared Region), the address translation is conducted using SATB rather than R1.

With the /PT and /ST options, R1 represents the base address of the section table.

Consequently, two levels of indirect reference occur with /PT, while one level of indirect reference occurs with /ST. In this instruction, the fixed number registers are used to assign spaces like high level functional instructions. This is due to the fact that the symmetry of instructions is not required because it is not used directly in a high class language and because a restriction exists due to the bit assignment.

In this instruction, F_flag and V_flag are used to distinguish various cases, such as an error in ATE and page out. The instruction works as follows:

1. If a reserved ATE error occurs in ATE in a higher level than that to be operated on the section and page tables used for the address translation of srcaddr, The ATE read operation is not conducted and the instruction is terminated with V_flag=1 and F_flag=0 since the ATE to be operated on cannot be obtained.

2. If a page-out occurs on the table containing ATE in the level to be operated or in a level higher than that on the section and page tables used for the address translation of srcaddr, Since ATE to be operated cannot be obtained, the ATE read operation is also not conducted and the instruction is terminated with V_flag=1 and F_flag=1. In addition, if both a reserved ATE error and next level page-out occur at ATE in the middle level, a reserved ATE error has a higher priority than the next level page-out and the flag status becomes V_flag=1 and F_flag=0.

3. Otherwise

Otherwise, ATE is read, and it is set to dest and V_flag is set to 0. To represent the page-out in the lower level, F_flag is set to 1 when the PI bit of ATE read by STATE becomes 0. If data being read causes an reserved ATE error to occur, F_flag is set to 1. In both cases, if the address translation is conducted with ATE being read, an exception occurs. If there is no error in when ATE is being read and the PI bit is '1', F flag is set to '0'.

The flag change of the STATE instruction is summarized as shown in FIG. 294.

A reserved ATE error occurs when the ATE reserved bit is used. By considering the flag status change, F_flag .or. V_flag of STATE is equivalent to V_flag of MOVPA. Therefore, the flag change pattern of STATE differs from that of MOVPA.

Since this instruction is considered basically an address operation, the statuses of M_flag and Z_flag are not changed.

If a page fault occurs while the effective address for srcaddr and dest is obtained, a page out exception (POE) occurs as in the regular instructions.

This instruction is a privileged instruction.

For dest/EaW!S, the @-SP mode is inhibited. The operation of the instruction cannot be distinguished. If @-SP is specified to dest while V_flag is set due to an error or page-out and the content of dest cannot be transferred.

In the operands of the LDATE, STATE, LDP, STP, LDC, STC and MOVPA instructions which reference the special space, if a memory indirect reference occurs by the additional mode, the logical space (LS) rather than the special space is referenced. On the other hand, if a stack pointer (SP) reference occurs, the current ring RNG stack rather than PRNG Is referenced. The meaningful special space address is the only effective address which is finally obtained.

In executing STATE when AT=00, the effective address of srcaddr and dest is calculated without the address translation operation like other instructions. However, the STATE instruction itself does not depend on the value of AT. In short, even if AT=00, the effective address of srcaddr being obtained is interpreted as a logical address and ATE is transferred to dest which is used to translate the logical address into the physical address. It is assumed that this instruction is used as a pre-operation for the address translation.

In MOVPA, LDATE and STATE, the base register for the address translation operation is assigned by R1 rather than UATB. Even if the R1 bit corresponding to the reserved portion of UATB (the bits of 2^4 and 2^5 represented with '=') is not '1', it is not checked by the hardware. Even if it is not checked, the bits of 2^4 and 2^5 should be filled with '0'.

PROGRAM EXCEPTION:

Reserved instruction exceptions

When+='0'

When W='1'

When EaA is Rn, #imm_data, @SP+ or @-SP

When EaW!S is #imm_data, @SP+ or @-SP

<<L1>> function exception

When a bit pattern of STATE is decoded

MNEMONIC:

PTLB (the data processor of the present invention does not support this instruction.)

OPERATION:

purge TLB (privileged)

OPTIONS:

/AS Purge TLB in all the logical spaces.

/SS Purge TLB in the logical spaces containing LSID specified by R0

INSTRUCTION FORMAT AND ASSEMBLER SYNTAX: shown in FIG. 295.

STATUS FLAGS AFFECTED: shown in FIG. 296.

DESCRIPTION:

Purge TLB.

The control register is used to perform miscellaneous operations for TLB such as TLB lock operation and TLB enable operation. However, only the TLB purge operation is required, the TLB purge instruction is used, rather than adding the control register which would otherwise cause the burden on the hardware implementation to increase.

If TLB's for multiple contexts (processes and tasks) exist, LSID is used to distinguish them. If TLB can distinguish multiple logical spaces, only TLB's where LSID is matched to R0 can be purged with the /SS option specified. Although LSID for the logical space which is currently in use is placed in the LSID control register, it is not affected by the execution of the PTLB instruction.

The PTLB instruction does not have a function which purge only TLB at a specified logical address. All TLB's in the specified logical space are purged. When purging TLB at a specified logical address, the PSTLB instruction is used. However, when the /SS option is specified, only TLB of UR in the specified logical space is purged, rather than purging SR.

To purge SR, it is necessary to use the /AS option.

This instruction is a privileged instruction.

Since the memory management and the TLB configuration strongly depend on the implementation, this instruction is specified in <<L2>>. When accommodating this instruction, it is not always necessary to implement all the options. In addition, the LSID function is not always required. In PTLB, the purge operation is executed even when AT=00 as well as when AT=01. It is assumed that the PTLB instruction is used as a pre-operation for address translation.

PROGRAM EXCEPTION:

Reserved instruction exception

MNEMONIC:

PSTLB (the data processor of the present invention does not support this instruction.)

OPERATION:

purge specific TLB

OPTIONS:

/AS Purge TLB in all the logical spaces.

/SS Purge TLB in the logical space containing LSID specified by R0.

/PT Purge the entry where all the logical addresses (2^31 to 2^12 bits) accord with prgaddr. In other words, the portion which is affected when PTE is changed is purged.

/ST Purge the entry where the 2^31 to 2^22 bits of the logical address accord with prgaddr. In other words, the portion which is affected when STE is changed is purged.

/AT Purge the entry where the 2^31 bit of the logical address accords with prgaddr. In other words, the portion which is affected when UATB or SATB is changed is purged.

INSTRUCTION FORMAT AND ASSEMBLER SYNTAX: shown in FIG. 297.

STATUS FLAGS AFFECTED: shown in FIG. 298.

DESCRIPTION:

Purge TLB of the specified logical address.

TLB which is in the related logical space and where the logical address equivalent to the indexes from STE to PTE (namely, all the logical addresses) accords with prgaddr is purged with the /PT option. With the /ST option specified, TLB, which is in the related logical space and where the logical address equivalent to the index of STE accords with prgaddr, is purged. With the /AT option specified, all the entries are purged which are in the cache in the related logical space and where MSB of the logical address accords with prgaddr.

If TLB's for multiple contexts (processes and tasks) exist, LSID is used to distinguish them. If TLB can distinguish multiple logical spaces, with the /SS option specified, only TLB's where LSID is matched to R0 can be purged. Although LSID for the logical space which is currently used is placed in the LSID control register, it is not affected by the execution of the PTLB instruction.

This instruction is a privileged instruction.

Since the memory management and the TLB configuration are strongly dependent on the implementation, this instruction is specified in <<L2>>. When accommodating this instruction, it is not always necessary to implement all the options. In addition, the LSID function is not always required.

The /AS and /SS options are provided to maintain the compatibility of whether LSID is used or not. Functionally, when PSTLB is used, it is possible to specify only /SS. However, if /SS is always specified, the compatibility may be lost depending on whether LSID is used or not. For example, if a processor which does not have the LSID function is produced, a program working on the processor will execute the PSTLB instruction rather than setting LSID to R0. If the same program is executed in a future processor which has the LSID function, due to remaining data in R0, PSTLB will be executed by a completely incorrect LSID. To prevent that, if R0 has not been set with an option, /AS should be set. If R0 will be included in the near future, it will be necessary to set /SS. The specification of /AS in PSTLB has such a meaning.

Thus, in PSTLB, all the combinations that follow are allowed.

/AS/PT

/AS/ST

/SS/PT

/SS/ST

/SS means to purge TLB of UR in the logical space specified by R0.

/AS means to purge TLB in all the logical spaces or TLB in a processor which does not have the LSID function (/PT and /ST options are also enable. R0 is not used.)

With the /AS option, a program can be created for both a processor which has LSID and that which does not. On the other hand, although the LSID function can be used with the SS option, in a processor which does not have LSID, an error (reserved instruction exception) occurs because the option has not been accommodated.

In the PTLB and PSTLB instructions, if the /SS option is specified, only TLB of UR in the specified logical space is purged, rather than TLB of SR. To purge TLB from SR, it is necessary to use /AS. The operation when the /SS option is specified in PTLB and PSTLB are summarized as follows.

PSTLB/SS

Purge UR in the logical space specified by R0.

PSTLB/SS/AT @uraddr; uraddr is UR.

Purge UR in the logical space specified by R0.

PSTLB/SS/AT @sraddr; sraddr is SR.

Since SR is specified with /SS, no operation takes place. To purge all SR, use PSTLB/AS/AT @sraddr.

PSTLB/SS/PT @uraddr; uraddr is UR.

Purge part of UR in the logical space specified by R0.

PSTLB/SS/PT @sraddr ; sraddr is SR.

Since SR is specified with /SS, no operation takes place.

To purge part of SR, use PSTLB/AS/PT @sraddr.

If it is difficult to accommodate the /ST option in PSTLB, reduce the function to maintain the compatibility so that the instruction can be simply executed and an EIT does not occur. Practically, the operation equivalent of /AT rather than /ST is performed.

If PSTLB is executed at AT=00, the effective address of prgaddr is calculated without an address translation like other instructions. However, the instruction operation of PSTLB does not depend on the value of AT. In other words, even if AT=00, the effective address of prgaddr obtained is interpreted as a logical address and the purge operation is executed like AT=01 because it is assumed the PSTLB instruction is used as a pre-operation for address translation.

Program Exception:

Reserved instruction exception

Appendix 1 Instruction Set Reference of The Data Processor of the Present Invention

* means the instruction that the data processor of the present invention does not support.

| | | |
|---|---|---|
| (Data Transfer Instructions) | | |
| MOV | src,dest | Move and sign extend data |
| MOVU | src,dest | Move and zero-extend data |
| PUSH | src | Push to stack |
| POP | dest | Pop from stack |
| STM | reglist,dest | Store mutltiple registers |
| LDM | src,reglist | Load-multiple registers |
| MOVA | srcaddr,dest | Obtain effective address |
| PUSHA | srcaddr | Push address to stack |

-continued

| | | |
|---|---|---|
| (Comparison and Test Instructions) | | |
| CMP | src1,src2 | Comparison and sign extension and comparison |
| CMPU | src1,src2 | Zero-extension and comparison |
| CHK | bound,index,xreg | Cheek upper and lower bounds |
| (Arithmetic Instructions) | | |
| ADD | src,dest | Addition and addition with sign-extension |
| ADDU | src,dest | Zero-extension and addition |
| ADDX | src,dest | Addition including a carry in from X_flag |
| SUB | src,dest | Subtraction and subtraction with sign-extension |
| SUBU | src,dest | Zero-extension and subtraction |
| SUBX | src,dest | Subtraction including a carry in from X_flag |
| MUL | src,dest | Multiplication |
| MULU | src,dest | Unsigned multiplication |
| MULX | src,dest,tmp | Extended multiplication, double precision |
| DIV | src,dest | Division |
| DIVU | src,dest | Unsigned division |
| DIVX | src,dest,tmp | Extended division, double precision, and presence of remainder |
| REM | src,dest | Remainder |
| REMU | src,dest | Remainder by unsigned division operation |
| NEG | dest | Complementary operation |
| <<L2>> INDEX | indexsize, subscript,xreg | Calculate address of array |
| (Logical Instructions) | | |
| AND | src,dest | AND operation |
| OR | src,dest | OR operation |
| XOR | src,dest | XOR operation |
| NOT | dest | Not all bits |
| (Shift Instructions) | | |
| SHL | count,dest | Shift logical |
| SHA | count,dest | Arithmetic shift operation |
| ROT | count,dest | Rote |
| SHXL | dest | Shift left and extend with X_flag |
| SHXR | dest | Shift right and extend with X_flag |
| RVBY | src,dest | Reverse byte order |
| <<L2>> RVBI | src,dest | Reverse bit order |
| (Bit Operation Instructions) | | |
| BTST | offset,base | Test a bit |
| BSET | offset,base | Set a bit |
| BCLR | offset,base | Clear a bit |
| BNOT | offset,base | Complement a bit |
| BSCH | data,offset | Search 0 or 1 (in one word) |
| (Fixed Length Bit Field Operation Instructions) | | |
| BFEXT | offset,width,base,dest | Extract bit field (signed) |
| BFEXTU | offset,width,base,dest | Extract bit field (unsigned) |
| BFINS | src,offset,width,base | Insert bit field (signed) |
| BFINSU | src,offset,width,base | Insert bit field (unsigned) |
| BFCMP | src,offset,width,base | Compare bit field (signed) |
| BFCMPU | src,offset,width,base | Compare bit field (unsigned) |
| (Variable Length Bit Field Operation Instructions) | | |
| BVSCH | Find first '0' or '1' in the bitfield (variable length) | |

-continued

| | | |
|---|---|---|
| BVMAP | Bit map operation | |
| BVCPY | Bit transfer | |
| BVPAT | Operation of pattern and bit map | |
| (Decimal Arithmetic Instructions) | | |
| * ADDDX | src,dest | Addition in BCD |
| * SUBDX | src,dest | Subtraction in BCD |
| * PACKss | src,dest | Pack string into BCD |
| * UNPKss | src,dest,adj | Unpack BCD |
| (String Instructions) | | |
| SMOV | | Copy string |
| SCMP | | Compare string |
| SSCH | | Find a character in a string |
| SSTR | | Continuously write same data (fill data in string) |
| (Queue Operation Instructions) | | |
| QINS | entry,queue | Insert a new entry into a queue |
| QDEL | queue,dest | Remove an entry from a queue |
| QSCH | | Search queue entries |
| (Jump Instructions) | | |
| BRA | newpc | Branch always (PC relative) |
| Bcc | newpc | Branch conditionally (PC relative) |
| BSR | newpc | Subroutine jump (PC relative) |
| JMP | newpc | Jump |
| JSR | newpc | Jump to subroutine |
| ACB | step,xreg, limit,newpc | Add, compare and branch |
| SCB | step,xreg,limit, newpc | Subtract, compare, and branch |
| ENTER | local,reglist | Create new stack frame (High level language subroutine jump) |
| EXITD | reglist,adjsp | Exit and deallocate parameter (High level language subroutine return and parameter release) |
| RTS | | Return from subroutine |
| NOP | | No operation |
| PIB | | Purge instruction buffer (instruction cache and pipeline arrangement) |
| (Multiprocessor Instructions) | | |
| BSETI | offset,base | Set a bit (lock the bus) |
| BCLRI | offset,base | Clear a bit (lock the bus) |
| CSI | comp,update,dest | Compare and store (lock the bus) |
| (Control Space, Physical Space Operation Instructions) | | |
| LDC | src,dest | Load control space or register |
| STC | src,dest | Store control space or register |
| LDPSB | src | Load PSB |
| LDPSM | src | Load PSM |
| STPSB | dest | Store PSB |
| STPSM | dest | Store PSM LDP src,dest |
| | | Load physical space |
| STP | src,dest | Store physical space |
| (OS-Support Instructions) | | |
| * JRNG | vector | Jump to new ring |
| * RRNG | | Return from previous ring |
| TRAP | vector | Trap always |
| TRAP | | Trap conditionally |
| REIT | | Return from EIT |
| WAIT | imask | Set IMASK and wait |
| LDCTX | pcbaddr | Load context from CTXB |
| STCTX | | Store context to CTXB |
| (MMU Support Instructions) | | |
| ACS | chkaddr | Test access rights |
| * MOVPA | srcaddr,dest | Move physical address |
| * LDATE | src,destaddr | Load address translation table entry |

-continued

| | | | |
|---|---|---|---|
| | * STATE | srcaddr,dest | Store address translation table entry |
| | <<L2>> | * PTLB | Purge TLB <<L2>> |
| * PSTLB | | prgaddr | Purge specific TLB |
| (Signed Decimal Arithmetic Operation Instructions) | | | |
| <<L2>> | * DCADD | src,dest | Signed addition in BCD |
| <<L2>> | * DCADDU | src,dest | Unsigned addition in BCD |
| <<L2>> | * DCSUB | src,dest | Signed subtraction in BCD |
| <<L2>> | * DCSUBU | src,dest | Unsigned subtraction in BCD |
| <<L2>> | * DCX | src,dest | Addition and subtraction in BCD including a carry |
| <<L2>> | * DCADJ | src,dest | Signed complement in BCD |
| <<L2>> | * DCADJU | src,dest | Unsigned complement in BCD |
| <<L2>> | * DCADJX | src,dest | Complement in BCD with a carry |
| <<L2>> | * DCCMP | src1,src2 | Signed comparison in BCD |
| <<L2>> | * DCCMPU | src1,src2 | Unsigned comparison in BCD |
| <<L2>> | * DCCMPX | scr1,src2 | Comparison in BCD with a carry |

Appendix 2 Assembler Syntax of the Data Processor of the Present Invention

A2-1 Outline

This appendix describes the definitions of instruction mnemonics and addressing mode mnemonics for the data processor of the present invention.

A2-1-1 Symbol Syntax in this Document

| | |
|---|---|
| < . . . > | Indicates a meta character. |
| [A] | A is omissible. |
| {A}* | A is either not used or repeated one or more times. |
| {A}+ | A is repeated one or more times |
| A :: = B ¦¦ C | A is B or C |
| A :: = BC | B and C are connected to A. |

A2-1-2 Determining Mnemonics (1) "General mnemonic" and "Mnemonic-every-format" are provided.

The general mnemonic is a mnemonic which correspond with each instruction. Even if instructions have multiple formats the number of general mnemonics of the instruction is only one. On the other hand, the mnemonic-every-format, is used to distinguish the different formats. By determining a character which represents an instruction format, the mnemonic every format is systematically created from the general mnemonic. When creating an assembler source program, the programmer regularly uses the general mnemonic. The format most suitable for the general mnemonic is selected by the assembler.

(2) A Unified rule for data type parameters is provided. The data type parameters are required to specify the data type for the arithmetic operation, the same size operand for the entire instruction, and the size of every operand.

(3) The mnemonics attempt to follow the IEEE Microprocessor Assembly Language Standard (page 694) as closely as possible. However, since it is not completely compatible with the architecture of the data processor of the present invention, these mnemonics are used only for reference to determine individual names. The concept and rule for the mnemonics used for the data processor of the present invention do not completely conform to the IEEE standard.

(4) Special symbolic characters should not be used if possible.

In the assembler defined here, special symbolic characters should not be used if possible. Otherwise, special symbolic characters in the assembler may contend with them in numerical expressions in operands and in an extended assembler. In addition, to create software through a host computer which does not provide many character sets, it is recommended not to use many special symbolic characters. To avoid using many special symbolic characters, only one type bracket is used in the assembler. The special symbolic characters such as ';' and '&' are not used.

A2-1-3 Assembler Instructions

Each instruction of the data processor of the present invention assembly language is described by one operation mnemonic and zero or more operand mnemonics. An opcode mnemonic and operand mnemonic are delimited with one or more blank characters (space or tab). Two operand mnemonics are delimited with one command, seperated by ','.

<Assembler instruction>::=

<Operation>[<Operand>{,<Operand>}*]

A2-1-4 Operand Order

Although the operand order is determined every instruction, it is generally described as follows.

Move Instruction (MOV)

The first operand and the second operand become the source and destination, respectively.

In short,

First operand==>Second operand

It is the same as the IEEE standard.

Two-operand instruction for dyadic (two-term) instructions (such as SUB)

The first operand becomes the second source and the second operand becomes the first source and destination.

In short,

Second operand .op. First operand==>Second operand

It differs from the IEEE standard but, it is widely used in many processors and it is popular.

A2-2 Operation Mnemonics

A2-2-1 Mnemonic Generation Rule

Although a verb which describes an operation in the IEEE standard is often placed at the beginning of the mnemonic, in the data processor of the present invention, a data type parameter precedes such a verb. The mnemonics for the operations are nearly the same as the IEEE standard.

The instruction mnemonics for the data processor of the present invention are generated in the following rule.

<Operation> ::=
[<Data type>]<Operation>{<Variation>}*{/<Option>}*
{:<Format>}*[.<Size>}

EXAMPLE:

MOV
SMOV/NE.W
MOV.W
MOV:L
MOV:Q.W

<Data type>

The data type which significantly affects the operation method (which is irrespective of the <Operation>) is specified at the beginning of an instruction. This data type includes a string, queue, bit field, etc.

The data size (8, 16, 32 and 64 bits for an integer and 32 and 64 bits for floating point) is specified in <Size>. Signed, unsigned and address operations are specified in <Variation>.

<Operation>

The operation itself is specified in accordance with the IEEE standard. Although the conditions of conditional jump instructions should be specified as options, they are customarily included in the basic portion of the <Operation>.

<Variation>

Detailed controls and attributes for an operation are specified.

<Option>

Instruction options represented with several bits in the instruction format are represented. The options include the termination conditions of the string instructions and the search conditions of queues.

<Format>

A format for the short type and general type is specified. Generally, it is omissible. If it is omitted, the general mnemonic is used. If the general mnemonic is used without <Format> in an assembler source program, the assembler automatically selects the suitable format. If <Format> is described, the mnemonic-every-format is described. If the user describes <Format> in an assembler source program, it means to use the described format compulsorily. The mnemonic-every-format specified by <Format> is used to distinguish instruction formats in descriptions of the specification, manual or disassembler.

<Size>

The operand size is specified. The instruction with <Size> mainly uses integers and floating point. <Size> is closely related to <Operation> unlike <Data Type>.

A2-2-2 Data Type

The following characters are used to represent <Data type>.

None Integer operation, address operation, miscellaneous operation, etc.

F Floating point

S String

Double-linked queue

B One-bit operation

BF Fixed length bit field operation

BV Variable length bit field operation

A2-2-3 Operations

The following instructions of the data processor of the present invention assembler conform to the IEEE mnemonics. ADD, SUB, MUL, DIV, CMP, NEG, AND, OR, XOR, NOT, LD, ST, MOV, PUSH, POP, WAIT, NOP Note:

Usage of MOV, LD, and ST:

MOV Transfer data between registers and between memories.

LD Transfer data from a memory to a register.

ST Transfer data from a register to a memory.

LD and ST are used for the instructions where the direction is a consideration.

The shift operations do not directly conform to the IEEE mnemonics because their left and right assignment method for the data processor of the present invention assembler differs from that for the IEEE standard. However, by using the IEEE rule, SHA, SHL, and ROT are used.

If the branch (conditional jump) instructions conform to the IEEE standard, 'BV' has a different meaning. In addition, for easier distinctions between comparisons of signed integers and unsigned integers, the condition specification portion does not conform to the IEEE standard.

JMP, JSR, and RTS do not conform to the IEEE standard due to symmetry of the branch instructions.

Since the extension operations are uniformly represented with 'X' of <Variation>, ADDX, SUBX, MULX, and DIVX do not conform to the IEEE standard.

A2-2-4 Variation

<Variation> serves to specify the attributes for operations and uses the following characters.

A Address calculation
  Example: MOVA, PUSHA, MOVPA
C Operation for control space (control register)
  Example: LDC, STC
D Decimal operation (unsigned, no data check)
  Example: ADDDX, SUBDX
  Stack parameter discard process
  Example: EXITD
I Operation performed by locking the bus
  Example: BSETI, BCLRI, CSI
M Multiple data process
  Example: LDM, STM
P Operation for physical space
  Example: LDP, STP
U Unsigned data opera
  Example: MOVU, ADDU, MULU, etc.
X Extended operation
Example: ADDX, MULX, etc.

A2-2-5 Format

<Format> serves to distinguish the instruction format in detail and uses the following characters.

| | |
|---|---|
| E | 8-bit immediate of two-operand instructions in general format<br>Example: ADD:E.W #100.B,@abs2 |
| G | General format of two-operand instructions<br>Example: ADD:G.W @abs1,@abs2<br>ACB:G @abs1,R1,@abs2,loop3 |
| I | Short format of immediate<br>Example: ADD:I.W #100000,@abs2 |
| L | Short format of operation between memory and register<br>Example: ADD:L.W @abs,R2<br>MOV:L.W @(disp,R2),R3 |
| Q | Literal short format<br>Static format of bit field instruction<br>Literal short format of loop instruction<br>Example: MOV:Q.W #3,@abs<br>BTST:Q.B #4,@abs<br>ACB:Q #1,R1,#5,loop1 |
| R | Short format of operation between registers<br>Short format of register of loop instruction<br>Example: AND:R.W R1,R2<br>MOVA:R.W @(disp:16,R2),R3<br>ACB:R #1,R1,R2,loop2 |
| S | Short format of operation between register and memory (only MOV)<br>Example: MOV:S.W R2,@abs |
| 8 | newpc is 8 bits.<br>Example: ACB:G @abs1,R1,@abs2,loop3:8 |
| 16 | newpc is 16 bits.<br>Example: BEQ:G error:16 |
| 32 | newpc is 32 bits.<br>Example: BNE:G next:32 |
| 64 | newpc is 64 bits.<br>Example: BRA:G loop:64 |

The format specifications such as ':Q', ':G', . . . are used to distinguish the formats with in one instruction (general mnemonic) and create mnemonics-every-format. In short, it is used to specify a format in the assembler syntax. On the other hand, G-format, E-format, . . . described in "Instruction Format" are used to describe the formats in all the instructions. Therefore, while the ':G' in 'MOVA:G' is the general format,GA, of the MOVA instruction, the ':G' in 'MOV:G' is the general format,G, of the the MOV instruction.

A2-2-6 Size

Since the IEEE standard does not consider 64 bit integers, the data size handled also differs from that of the IEEE standard.

In the case of integers 4 types of sizes are symmetrically supported and the data type can be specified with the operand.

Since the same data is written on both the operation side and the operand side, it is delimited with '.'. The following characters are used for <Size>.

| | |
|---|---|
| B Byte | 8-bit long integer |
| H Half word | 16-bit long integer |
| W Word | 32-bit long integer |
| L Longword | 64-bit long integer |

'L' cannot be used in the data processor 32 of the present invention.

In the case of floating point

It will be separately defined.

A2-3 Operand Mnemonics

Operands are classified into those where the general addressing mode or its subset can be used (the general operands are named) and those where special specification is made depending on the instruction (the special operands are named). For the special operands, the format is defined every instruction. The following instructions use the special operands.

BRA, Bcc, BSR, ACB, SCB (newpc operand)

LDM, STM (reglist operand) etc.

<Operand>::=<General operand>¦¦<Special operand>

The general operands are such that the data size can be specified every operand. This feature is available for the general operand description in the assembler. In addition, operands have also the general mnemonic and the mnemonic-every-format.

The general operand mnemonic is composed of a real operand value (effective address), specification of additional mode format, and size.

<General operand> ::=
    <Operand value>[:<Additional mode specification>][.<Size>}

A2-3-1 Rule for Addressing Mode Notation

Since conventional processors do not have many addressing modes, their modes are individually considered and it is possible to assign unique symbols to them. In addition, the notation of the addressing modes does not accord with the real addressing operations. For example, although in some processor, the addressing mode of the register relative indirect may be represented with disp(Rn), its operation is only mem[disp+Rn] and the disp portion and Rn portion are not symmetrically handled. Although it can be used without a problem, if it is used to create a complicated mode, an inconsistency may occur.

Since the data processor of the present invention has a function named "additional mode", the addressing should be uniformly and regularly described to prevent confusion. To do that, Data Processor of the present invention has a naming convention for real operations and their notations. In Data Processor of the present invention, the addressing mode including the additional mode will be uniformly described.

The addressing is basically composed of addition operations and indirect references, each of which is repeated.

Thus, it is necessary to represent these two types of operations. The rule of notation for the data processor of the present invention is summarized as follows:

| |
|---|
| [Rule of Notation of the data processor of the present invention Addressing Modes] |
| @A or @(A) Reference the content of the memory of address A. mem[A] |
| @(A,B,C, . . . ) Add A, B, C, . . . , and reference the content of memory of the address which contains the result of the addition operations. mem[A+B+C+ . . . ] |

'( )' in the data processor of the present invention does not have a special meaning such as indirect reference. Like general numerical expressions, it simply represents the order of connection. Thus, the meaning of @A is the same as that of @(A). Even if '(..)' is used, if there is only one term, it is possible to omit it.

In conventional processors, '(..)' may mean an indirect reference and it is customarily used in the notation. However, with such a notation, the following misunderstandings can occur.

EXAMPLE

| Customer notation | Operand value |
|---|---|
| Rn | Rn |
| (Rn) | mem[Rn] |
| abs | mem[abs] or abs |
| (abs) | mem[mem[[abs]] or mem[abs] |

To prevent such cases, in the data processor of the present invention, an indirect reference is always represented with '@'.

On the other hand, since there is not such a rule for the immediate reference, (the addressing mode for stack operation and index scaling process), their notations should be determined by referencing the rule.

A2-3-2 Specifying Additional Mode

<Additional mode specification>::=A¦¦N

'A' is specified when emphasizing that the format of the additional mode is used. On the other hand, 'N' is specified when emphasizing that the format of the additional mode is not used. These specifications are equivalent to the mnemonic-every-format. If neither ':N' nor ':A' are written, the assembler determines whether the addressing can be realized in a short mode other than the additional mode and if it can be realized, it uses the mode. If it determines that it cannot be realized unless it is in the additional mode, it uses the additional mode.

EXAMPLE

@(disp,PC):A The PC relative additional mode is always used. Even if disp is 32 bits or less, the additional mode is used.

@(disp,PC):N The PC relative indirect mode is always used. If disp is 64 bits, an error occurs.

@(disp,PC) If disp is 32 bits, the PC relative indirect mode is used. If disp is 64 bits, the PC relative additional mode is used.

A2-3-3 Size

<Size> represents the operation size of an operand. It serves to specify the real operation size of an operand along with the size represented with the mnemonic of the operation. The characters used to specify the size are the same as those used for the operations.

The relationship between <Size> of an operand and <Size> of an operation is regular:

If <Size> is specified in an operation, <Size> becomes the default size for all operands except operands whose size cannot be specified: immediate operands, and operands having special meaning.

If <Size> is specified for an operand, it becomes the size of the operand. Even if a different size is specified in an operation, the <Size> specified in the operand has a higher priority than any other sizes.

If the <Size> which is specified for an operand cannot be used, an error occurs.

EXAMPLE

MOV.W @src,@dest Both src and dest are W(WORD) type.

MOV.W @src.B,@dest src is B(BYTE) type, while dest is W(WORD) type.

MOV @src.B,@dest.W src is B(BYTE) type, while dest is W(WORD) type.

A2-3-4 Operand Value

The assembler syntax for general operands each addressing mode is described in the following.

Numeric characters, variable names and numeric expressions can be described as the contents of <Immediate value> and <Absolute value>. Their syntax will be determined separately. <Format> is described to clarify the format selection of the addressing mode. It is mainly used to specify the size of the extension portion of the addressing mode. It is omissible. However, if it is omitted, the assembler automatically selects the suitable format (size). <Format> is used to distinguish the format in the addressing portion for the description of the specification, manual or disassembling.

<Format>::=4¦¦16¦¦32¦¦64

4 4-bit long addressing modification portion 16 16-bit long addressing extension portion Example: @(disp:16,Rn),abs:16

32 32-bit long addressing extension portion Example: @(disp:32,Rn),abs:32

64 64-bit long addressing extension portion Example: abs:64

<Format> only specifies the size of an instruction format. On the other hand, <Size> specifies the size of an operand. Except in the immediate mode, <Format> differs completely from <Size>.

EXAMPLE

MOV R0.W,@addr:16,W

This instruction transfers the content of R0 to the memory represented with 'addr'. The absolute addressing mode is used.

':16' indicates that 'addr' is represented with 16 bits. Thus, the range of 'addr' is $ffff8000 to $00007fff. On the other hand, '.W' indicates that the operation is performed with words (32 bits). In short, this instruction transfers 4 bytes of data.

<Register No.> is used to describe a mnemonic of the general purpose registers.

| |
|---|
| <Register No.> ¦¦= |
| R0¦¦ R1¦¦ R2¦¦ R3¦¦ R4¦¦ R5¦¦ R6¦¦ R7¦¦ R8¦¦ R9 ¦¦R10¦¦R11¦¦R12¦¦R13¦¦R14¦¦R15¦¦ FP¦¦ SP |

FP and R14; SP and R15 are exactly the same.

```
A2-3-4-1 Register Direct
Operand = Rn
<Operand value> ::=
    <Register No.>
Example: R1
A2-3-4-2 Register Indirect
Operand = mem[Rn]
<Operand value> ::=
    @<Register No.>
Example: @R2
A2-3-4-3 Register Relative Indirect
Operand = mem[disp16 + Rn]
          mem[disp32 + Rn]
<Operand value> ::=
    @(<Displacement>[:<Format>],<Register No.>)
<Format>::=16||32
Example: @(disp:16,R5)
A2-3-4-4 Literal and Immediate
Operand = imm_data
<Operand value> ::=
    #<Literal value>
<Operand value> ::=
    #<Immediate value>
```

When the use of the literal instruction format is clearly described, it should be described in the mnemonic of an operation.

In the case of an immediate, since the size of the extension portion is determined by the size of an operand, the meaning of <Format> becomes the same as that of <Size>. In the assembler, the size can be specified as either <Format> or <Size>.

If the size is not specified on the operand side of an immediate operand and the function of the instruction has a flexibility for size, the minimum size is automatically selected.

EXAMPLE

ADD:Q.W #1,R0 Use the literal format (2 bytes).

ADD:I.W #1,R0 Use the immediate type format (6 bytes). The source operand '1' is represented with 32 bits.

ADD:L.W #1,R0 Use a short format (6 bytes). Specify an 8-bit immediate as the source operand.

ADD:G.W #1.R,R0 Use a general format (6 bytes). Specify an 8-bit immediate as the source operand. '1' is represented with the low order 8 bits in the 16 bit field. '1' is sign extended to 32 bits.

ADD:E.W #1,R0 Use a general type 8-bit immediate format (4 bytes). '1' is sign-extended to 32 bits.

ADD:G.W #1,R0 Since the size is not specified for #1 and the :G format is used, there is a flexibility in size. Thus, the minimum size is automatically selected. The instruction becomes equal to the following instruction.

ADD:G #1.B,R0.W (6-byte instruction) rather than the following instruction.

ADD:G #1.W,R0.W (8-byte instruction).

ADD:G.W #1:16,R0 Select an instruction by using <Format> rather than <Size>.

This instruction becomes equal to the following instruction.

ADD:G.W #1.H,R0

In the general mnemonic, if simply described as follows,

ADD.W #1,R0 the shortest code is selected as follows.

ADD:Q.W #1,R0

Although the number of sizes is not limited to one, part of them actually uses only one size. For these instructions, unless <Size> is placed on the operand side, the default size which is specified is applied depending on the instruction. It is an exception to the rule where the mnemonic of <Operation> is applied to all of the operands.

[EXAMPLE]

In the access size of the bit operation instruction (BB is specified), the default size is 8 bits (.B).

'.H' and '.W' are specified in <<L2>>, while '.L' is specified in <<LX>>.

In the register size of the fixed length bit field operation (X is specified), the default size is 32 bits (.W). '.H' and '.B' cannot be used. '.L' is specified in <<LX>>.

```
BTST.W RO, @addr = BTST RO.W, @addr.B
A2-3-4-1 Absolute
        Operand = mem[abs16]
                  mem[abs32]
                  mem[abs64]
        <Operand value> ::=
            @<Absolute address>[:<Format>]
        <Format>::= 16 || 32 || 64
        Example: @abs:32
A2-3-4-6 PC Relative Indirect
        Operand = mem[disp16 + PC]
                  mem[disp32 + PC]
        <Operand value> ::=
            @([<Displacement>[:<Format>]], PC)
        <Format>::=16 || 32
        Example: @(disp,PC)
A2-3-4-7 Stack Pop
Operand = mem[SP++]
        <Operand value> ||=
            @SP+
        Example: @SP+
A2-3-4-8 Stack Push
        Operand = mem[--SP]
        <Operand value> ||=
            @-SP
        Example: @-SP
A2-3-4-9 FP Relative Indirect
        Operand = mem[disp4 + FP]
        <Operand value> ::=
            @([<Displacement>[:<Format>]],<Register No.>)
        <Format>::= 4
        <Register No.>::= FP || R14
        Example: @(disp4:4,FP)
```

In this addressing mode, although the disp value being specified in the bit pattern is quadrupled to produce the real displacement, the value being quadrupled is used in the assembler syntax.

Since the assembler syntax is the same as that in the register relative indirect mode, if <Format> is not specified the assembler selects the suitable mode. In short, in an operand described as @(disp,Rn), when Rn is R14 or FP, and then disp is a multiple of 4 in the range from −32 to 31, the FP relative indirect mode is selected. Otherwise, the register relative indirect mode is selected.

A2-3-4-10 SP Relative Indirect

```
Operand = mem[disp4 + SP]
<Operand value> ::=
    @([<Displacement>[:<Format>]],<Register No.>)
<Format>::= 4
<Register No.>::= SP || R15
Example: @(disp4:4,SP)
```

Although the disp value specified in the bit pattern is quadrupled to produce the real displacement in this addressing mode, the value being quadrupled is used in the assembler syntax.

A2-3-5 Additional Mode

In the additional mode, there are the general mnemonics which represent functional requirements and the mnemonic-every-format which symbolizes format and bit pattern.

[General Mnemonic]

An indirect reference is represented with @ or @(...). An addition of address is also represented with (...,...,...)

The order of syntax is usually as follows,

Base mode or current additional mode temp value

==> Displacement

==> Index

In this manner, the flow of the effective address calculation from the left to the right becomes simple. The information necessary for the earlier level additional mode and that for the later level additional mode are grouped to the earlier side and the later side, respectively. In other words, the order of the general mnemonic syntax becomes the same as that of the machine language bit pattern in the additional mode. Therefore, the general mnemonic syntax corresponds properly with the mnemonics-every-format and real machine language additional mode, so that the assembler can be simplified and easily understood.

[Mnemonic-every-Format]

By using the following three characters for specifying a format, the syntax which corresponds to the machine language bit pattern can be obtained.

:B Indicates the process of the specified portion is performed by the base mode.

:A Indicates the process until the specified portion is performed by the general additional mode.

:N Indicates the process of the specified portion is performed by the additional mode in the next level (the portion specified with ':A').

"Process of the specified portion" means the addition process of the value if the format specification character is assigned to the displacement and register. However, it means the indirect reference process if the format specification character is assigned to a closed parenthesis ')'. In addition, "Process until the specified portion" in ':A' indicates that the process of the ':A' portion and the ':N' portion on the left side are performed at the same time.

If all the formats are specified, the number of ':A' becomes the number of levels of the additional mode. Usually, one ':A' corresponds with one level indirect reference. However, when adding the contents of multiple index registers (':A' is required even if there is no indirect reference), there is an exception where a dual indirect at the last level is performed (even in two level indirect references, it is possible to use only one ':A').

If there is no format syntax, the additional mode which can perform the general mnemonic (represented as the general mnemonic) is automatically selected.

If the format which cannot be obtained in the real additional mode is specified to the mnemonic-every-format, an error occurs. If a format specification character is removed from the format specification mnemonic, it becomes the general mnemonic like the general rule of the mnemonic every format.

[General Format]

If multiple address additions are not performed, parentheses of @(...) are omissible. Thus, @(@(@(R1) of triple indirect reference used in the additional mode can be described as @@@R1. This rule applies to all the addressing modes except the additional mode and is a so-called syntax sugar.

Although the IEEE standard uses the size specification characters such as ':B' and ':W' for the index scale values, since it is supposed that larger values may be placed in the scale value in future, the numeric characters are directly described to the scale value. The character used to specify the scaling should be '*' rather than ':' in the IEEE standard because ':' is used to specify a format.

EXAMPLE

@(offset,PC)

mem[offset+PC]

General mnemonic. If offset is represented in 32 bits or less, the process is performed in the PC relative indirect mode. If offset is over 32 bits, the process is performed in the additional mode.

@(offset,PC):N mem[offset+PC]

The process should be performed in the PC relative indirect mode rather than the additional mode. In the data processor 64 of the present invention, if offset is over 32 bits, an error occurs.

@(offset[:N],PC[:N]):A mem[offset+PC]

The process should be performed in the additional mode. Since there is no portion which specifies the base mode, the process is performed in the absolute additional mode +additional mode EI=10, disp=offset, index=PC, and scale=1.

@(PC[:B),offset[:N])[:A]

mem[offset+PC]

The process should be performed in the PC relative additional mode

+additional mode EI=10, disp=offset, index=0, and scale=*.

@(@(@(R3[:B],base1[:N],R4*4[:N])[:A],base2[:N],R5[*1:][:N])[:N])[:A]

mem[mem[mem[R3+base1+R4*4]+base2+R5]]

R3 relative additional mode

+additional mode EI=01, disp=base1, index=R4, and scale=4

+additional mode EI=11, disp =base2, index=R5, and scale=1

@(R3[:B],base1[:N],R4*4[:A],R5*2[:N])[:A]

mem[R3+base1+R4*4+R5*2]

R3 relative additional mode

+additional mode EI=00, disp=base1, index=R4, and scale=4

+additional mode EI=10, disp=base2, index=R5, and scale=2

@(R3[:B],base1:A,R4*4:A):A mem[R3+base1+R4*4]

R3 relative additional mode

+additional mode EI=00, disp=base1, index=0, and scale=*

+additional mode EI=00, disp=0, index=R4, and scale=4

+additional mode EI=10, disp=0, index=0, and scale=*

This example uses three levels of additional modes by specifying the format although it can be specified in one level of the additional mode.

The syntax of the additional mode is summarized in the following, however, abbreviated syntax omitting parentheses and the syntax for commas ',' which delimit each portion are excluded.

```
Operand = mem[mem[ . . . ] + disp + Rn * Scale1 + Rm * Scale2
<General operand>
    <Operand value>[:N][.<Size>]
¦ <Additional mode operand value>[.<Size>]
<Additional mode operand value> ::=
    @(<Additional mode intermediate value>, [<disp value>
[:N]],
    [Index value>[:N]])[:A]
    Accords with EIU = 10
¦ @(@(<Additional mode intermediate value>,[<disp value>
[:N]],
    [<Index value> [:N]])[:N])[:A]
    Accords with EI = 11
    It represents the last level of the additional mode.
<Additional mode intermediate value> ::=
    <Additional mode intermediate value>,<disp value>[:A]
¦ <Additional mode intermediate value>, [<disp value>
[:N]],
    <Index value>[:A]
    Accords with EI = 00
¦ @(<Additional mode intermediate value>, [<disp value>
[:N]],
    [<Index value>[:N]])[:A]
    Accords with EI = 01
    It represents one middle level of the additional mode.
<Additional mode intermediate value> ::=
    [0[:B]   Accords with the absolute additional mode.
¦ <Register No.>[:B]   Accords with the register relative
additional mode.
¦ PC[:B]   Accords with the PC relative additional mode.
    It represents the base mode (distinction of register
    relative additional mode, PC relative additional mode,
    and absolute additional mode.
<disp value> ::=
<Displacement>[:<Format>]
Accords with D,dddd field.
<Format>::= 4 ¦ 16 ¦ 32 ¦ 64
<Index value> ¦=
    (Register No.)[.<Size>]['*'<Scale value>]
¦ PC[.<Size>]['*'<Scale value>]
    Accords with S, M, Rx, and XX fields.
<Size>::= W ¦ L
<Scale value>::= 1 ¦ 2 ¦ 4 ¦8
```

'*' represents that an asterisk '*' is used for a character. It does not mean "repetition".

<Size> of <Index> is the effective data size of the index register. If '.W' is specified in the data processor 64 of the present invention, the low order 32 bits of the register are sign-extended to 64 bits.

If <Scale> of <Index> is omitted, '1' is assumed.

A2-3-6 Special Operands

For the operands which are specified in other modes except the general addressing modes (special operands), the following syntax is used, however, the syntax for the commands ',' which delimit each portion are not excluded.

reglist (LDM,STM,ENTER,EXITD instructions)

```
<Register No.> or <Register No.> - <Register No.> is delimit-
ed with ',' and then parenthesized '( . . . )'.
<Special operand> ::=
    ({<Serial register No.>,}*)
<Serial register No.> ::=
    <Register No.>              Specify the numbered
                                register.
¦ <Register No.>-<Register No.> Specify all the registers
                                between the register numbers.
Example:
ENTER.W #10,( )
    LDM.W @block,(SP)
    STM.W (R1,R3,R9-R13,FP),@-SP
```

newpc (BRA,Bcc,BSR,ACB,SCB instructions)

The available addressing mode is only the PC relative mode. As the operand, only the label to be jumped is described. In this case, the assembler sets the difference between the start address of the instruction and the address to be jumped as the bit pattern of nepc so that control can jump to the specified label when the instruction is executed.

```
<Special operand> ::=
    (label of destination)
Example:
    BEQ     nextaddr                  Jump to nextaddr.
    ACB.B #1,R1,@limit,loopaddr       Jump to loopaddr.
```

In the BRA, Bcc, BSR, ACB and SCB instructions, because the special addressing mode (only PC relative) is often used and because it is preferred to directly writing a destination label, by describing only <Destination label>, the difference between <Destination label> and the address where the instruction is placed is automatically set to the displacement. Only on <Destination label>, does a symbol name (except registers) appear without '#' and '@'.

For example: The following instruction

BRA label represents the same meaning as the following instruction.

JMP @(label-$,PC)

'$' represents the start address of the instruction containing '$' (in this case, JMP instruction).

adj (UNPKss instruction)

'#' is placed at the beginning of the instruction.

<Special operand>::=

¦#<offset> Directly set the value

EXAMPLE

UNPKBW @src,@dest,#H'23302330 vector (TRAPA instruction)

'#' is placed at the beginning of the instruction.

<Special operand>::=

¦#<Vector> Directly set the value.

EXAMPLE

TRAPA #1

Others

The literal specification for the bit field instructions are represented like the short format literal specification.

#<Literal value>

The register specification for the bit field instructions such as CHK, INDEX, ACB and SCB is represented like the general address register direct mode.

<Register No.>

A2-4 "Mnemonic-Every-Format" and "General Mnemonic"

The "General mnemonic" and "Mnemonic-every-format" are some features of the assembler of the data processor of the present invention . Although a similar feature is present in some instructions of conventional processors (for example, MOV and MOVQ in the 68020 processor), the data processor of the present invention completely systematizes both types of mnemonics, so that the same concept is applied to both the operations and descriptions of operands.

There are following relationship between the mnemonic-every-format and the general mnemonic.

With the general mnemonic, the user is released from various restrictions caused by the implementation and format. As long as the general mnemonic is used, the assembler selects the suitable codes. Instructions which have the same function and flags whose status are changed in the same way, should be unified under one general mnemonic.

The mnemonic-every-format corresponds with the bit pattern of the machine language. Even if the mnemonicevery-format is changed, it only affects the object size and the number of execution cycles, but to the user, the instruction function including the flag status is not changed. Therefore, the format parameters basically differ from the size parameters. In the case of the size parameters, when the operation size is changed, the instruction function appears to the user to also change, so that in the conditional jump instructions, a format parameter such as "BRA label:32" is used, while in the addition instruction, a size parameter such as "ADD src.B,dest.W" is used.

The user usually employs the "general mnemonic". The "mnemonic-every-format" is not used for describing the format in the specification and for disassembling. Thus, although occasionally it seems to be redundant, it makes sense when considering the purpose of their usage. The "general mnemonic" and "mnemonic-every-format" are only two extremes of syntax. There is an intermediate syntax which specifies part of the format. For example, if "@(offset,PC) is described in the additional mode and the formats of each level of the additional mode are not specified, the following description is used.

@(offset,PC):A

Although the "mnemonic-every-format" is used, it is possible to specify only the portion where the format is required, so that the instruction being described is not so long.

The "mnemonic-every-format" can be converted into the "general mnemonic" by simply deleting ":X". Conversely, the "general mnemonic" can also be converted into the "mnemonic-every-format" by adding ":X" in the range where the format is allowed. The order of operands is not changed. Although it can be used to change symbols and order of the mnemonic-every-format, the relationship between the mnemonic-every-format and the general mnemonic can become complicated. (Various types of classification are required and the expandability is also degraded.)

If part of a format like "@(offset,PC)" is specified, it is desired to uniformly distinguish the "mnemonic-every-format" and the "general mnemonic".

The interface requested by the user is the general mnemonic, while the interface restricted by the machine language is the mnemonic-every-format. Both are arranged by the ':X' format specification character and assembler.

When both the mnemonic-every-format and the general mnemonic are used at a time, the assembler must unfortunately be more complicated. However, it is preferable to have the format processed by the assembler than the user, even if the assembler's process is complicated to some extent.

Even if the bit pattern is similar, if the machine language and flag status are changed, a different general mnemonic is used.

For the above reasons, it is preferable that the use of the mnemonic-every-format and the format to be used should be clarified. To do that, the portion which represents the format should consistently be fixed to ':X'.

The portion of '[...]' in the syntax is omissible. However, it is not necessary to uniformly determine whether it is omitted or not. For example, some '[...]' can be omitted, while another '[...]' can remain.

A2-5 Assembler as Language

The assembler syntax described above is the syntax for using the mnemonics as instructions for the machine language bit pattern and is the core of the assembly language. In the data processor of the present invention, this syntax is specified in <<L0>>.

The following items should be defined. They should conform to the IEEE standard if their application causes no inconsistency with the architecture of the data processor of the present invention.

Whether upper case characters and lower case characters are used

How many symbolic characters can be used?

Whether an expression can be descried in symbolic characters and what syntax is used What label format is used (whether ':' following a label is used)?

What syntax is used for binary, octal, decimal and hexadecimal?

What syntax is used for comments?

What syntax is used for strings?

What syntax is used for special characters (example, line feed character '¥')?

What detail syntax and characters are available?

What assembler pseudo instructions are used?

What about macros?

The syntax for binary, octal, decimal and hexadecimal in IEEE is specified as follows.

| | | |
|---|---|---|
| B' Binary | Example: B'00010010 = H'12 | |
| Q' Octal | Example: | Q'22 = H'12 |
| D' Decimal | Example: | D'18 = H'12 |
| H' Hexadecimal | | |

This specification uses "H'xx" for hexadecimal notation and "B'xx" for binary notation.

A2-5-1 Upper Case Characters and Lower Case Characters

Although the IEEE standard does not differentiate between the upper and lower case characters, the data processor of the present invention treats the upper and lower case characters for mnemonics and reserved names equally. In short, programming examples written in upper case characters in this document can be described in lower case characters. However, for variables that the user defines, the upper case characters and lower case characters are generally distinguished.

A2-5-2 Symbol Value

In items such as <Displacement>, <Literal value>, <Immediate value>, and <Absolute address> (named <Symbol value>, expressions of arithmetic operations including constants and labels can be described. To change the priority order in the expressions, it is possible to use '(...)'. However, for an expression containing an unstable value (such as a label which is defined by an external name or defined later), the format of the arithmetic expressions can be restricted to obtain correct relocation.

In addition, it is possible in expressions to use '$' which represents the address of the instruction currently under consideration.

The PC relative indirect mode is represented as follows.

@(disp,PC)

The disp value is set directly in the displacement. However, if a program which is PC relative and relocatable is described, it is necessary to set the difference between the operand address and the instruction address as the disp value rather than setting the operand address as the disp value. To do that, '$' can be used. In other words, it is possible to set (operand-$) as the disp value.

Example of a program with '$'

| <<Address>> | |
|---|---|
| H'00FE | ... |
| H'0100 | MOV.B #1,@(loc-$:16,PC) |

-continued

| | | |
|---|---|---|
| H'0104 | | MOV.B #2,@(8:16,PC) |
| H'0108 | | ... |
| H'010C | | ... |
| | | ... |
| H'0180 | loc: | ... |

In the second operand @(loc-$:16,PC) of the MOV.B instruction at the address H'0100, the value being set for the bit pattern of the real disp becomes H'0180–H'0100=H'0080. With this instruction, 1 is set to loc at address H'0180. On the other hand, with the MOV.B instruction at H'0104, 2 is set at address H'0104+8=H'010C.

Syntax of an operand with both additional mode and '$'

@(@([0:B,]label1-$[:N],PC[:N])[:A],label2-$[:N],PC[:N])[:A]represents mem[mem[disp1+PC]+disp2+PC]

However, disp1 is the difference between the address that label1 represents and the current address.

disp2 is the difference between the address that label2 represents and the current address.

The extension portion of the additional mode is composed of the following:

Absolute additional mode

+additional mode EI=01, disp=disp1, index=PC, and scale=1

+additional mode EI=10, disp=disp2, index=PC, and scale=1

This mode can be used when a relocatable table (such as a jump table for the case statement) is placed in the program area.

The following PC relative indirect in the first level is used to make the table reference for the case statement relocatable.

mem[disp1+PC]

The following PC relative indirect in the second level is used to make the decision of the address to be jumped relocatable.

mem[mem[...]+disp2+PC]

Appendix 3 Outline of Memory Management Method of Data Processor of the Present Invention It is assumed that there will be chips which contain the data processor instruction sets of the present invention without memory management hardware (MMU), depending on the applications.

Thus, the memory management mechanism of the data processor of the present invention is not always defined in the <<L0>> specification, but in the <<LA>> specification which only lists the standard specification. The paragraphs that follow describe the standard memory management method of the data processor of the present invention in the <<LA>> specification.

A3-1 Memory Management Method Selection and <<L1R>> Specification

The data processor of the present invention provides the standard specifications of address translation and memory management methods by hardware (named MMU) in the <<LA>> specification. However, where ITRON and micro-BTRON are accommodated in the data processor of the present invention, MMU is not required for the most part. Even if an application requires MMU, until the execution environment concerning MMU (such as page table) is terminated, it is necessary to execute the instructions without address translation.

To do that, the data processor of the present invention provides a field in PSW which indicates whether the MMU mechanism is used or not and whether the address translation is performed or not. By rewriting this field, the address translation and memory protection availability can be specified. This field is named the AT (address translation) field. AT is placed at bits 6 and 7 of PSS. With AT provided in PSW, the context switch by LDCTX, EIT process operation, and switching of address translation are available, even if a return is made from the EIT process handler by REIT instruction are available.

The meaning of the AT field is as in FIG. 299.

For the data processor of the present invention which accommodates the standard memory management in the <<LA>> specification, AT=00 and 01 can be used. For the data processor of the present invention which accommodates the memory management specified in <<L1R>>, AT=00 and 10 can be used.

Although memory protection every page cannot be conducted because MMU is not implemented, when AT=10 in the <<L1R>> specification, only ring 0 and ring 3 of the four rings in <<LA>> are enabled for simple memory protection by address.

The MSB=1 address area (SR in <<LA>>) can be accessed from ring 0; however, it cannot be accessed from ring 3. Usually, OS is placed in the area of MSB=0, but the area of MSB=0 (UR in <<LA>>) can be accessed from ring 0 and ring 3. Usually, the user program is located in the area of MSB=0. Although the memory protection between user programs is not available because MMU is not accommodated, OS can be protected from the user program.

If AT=00 (no address translation), the ring protection for accessing the memory cannot be checked.

Thus, page out exception (POE) and address translation exception (ATRE) do not occur.

However, even if AT=00, a privileged instruction is checked. It is preferred that the operation at AT=00 in <<L1>> be the same as that in <<L1R>>. However, in instructions such as LDATE, they are practical instructions for setting the MMU environment, while they are meaningless in <<L1R>>. In addition, instructions such as PTLB have meaning at AT=00 in <<L1>>, while they are meaningless in <<L1R>> because of the absence of TLB itself. Thus, in the <<L1R>> specification, such MMU related instructions are not provided. If execution of these instructions is attempted in <<L1R>>, regardless of the value of AT, a reserved instruction exception (RIE) occurs.

A3-2 Memory Management Method of the Data Processor of the Present Invention

The data processor of the present invention is the Data processor in the <<L1R>> specification.

The AT field of the data processor of the present invention has meaning as in FIG. 300.

A3-3 Accessing I/O Space of The Data Processor of the Present Invention

If an instruction fetch operation for the I/O space represented with IOMASK and IOADDR and an operand fetch operation in the memory indirect addressing mode are conducted, an address translation exception occurs.

In the memory indirect addressing mode, the I/O space is not accessed. However, when an instruction is fetched, the access operation is performed. Thus, it is necessary to lock out any external I/O device when the bus access type (BAT) signal is the instruction fetch. Since the I/O space is usually located in the ring 0 area, it is handled such that if data is accessed from ring 3, a ring protection violation occurs. A ring protection violation can be rapidly detected, so that the memory is not accessed. Although an address translation exception occurs, if data is accessed over the I/O space and non-I/O space, the reexecution operation cannot be assured.

A3-4. Expandability of 64 Bits

If a switch bit of SR/UR is fixed to MSB of the logical address, there is the problem when expanded to 64 bits. The data processor of the present invention will solve the problem by treating the logical address as the signed number.

Figure 301:
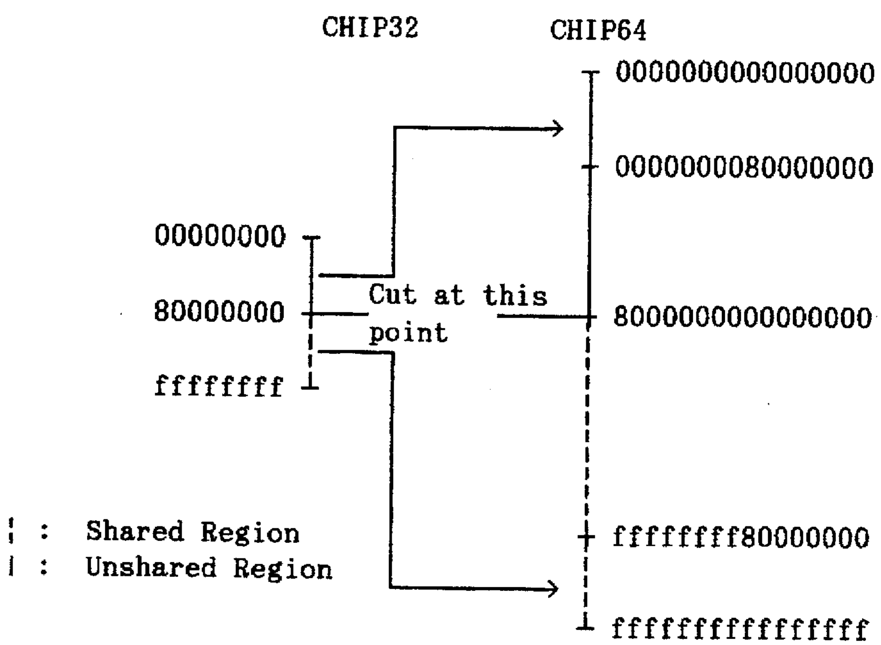
FIGS. 301 and 302 show the memory map relative to the logical address extension of the invention.
Figure 302:
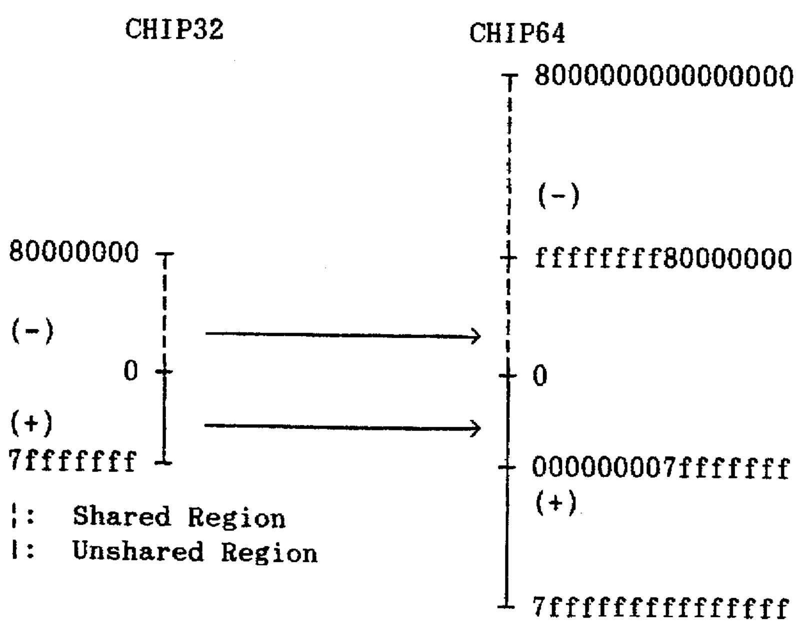

In order to expand both SR and UR from 32 bits to 64 bits, the address space needs only to expand in the two directions. Hence, the address is assumed to be the signed number and the UR region is assumed to expand in the positive direction and the SR region in the negative direction, thereby solving the problem. Concretely, the logical address is kept to sign-extend with respect to expansion of 32 to 64. A memory map is as shown in FIG. 301. Or, depiction can be also shown as in FIG. 302.

The address is assumed to be the signed number, thereby keeping continuity with respect to expansion at both the SR and UR regions.

Instead, the address space is split into OS region and user region at the address of H'80000000 for the 32 bits processor and the both two regions are placed away for the 64 bits, which is considered non-problematical.

In addition, at the 16-bits absolute addressing mode (@ads:16) of the data processor of the present invention, the logical address is adapted to be sign-extended, to which an idea of] address with signed number is applied.

Appendix 4 Status Flag Changes of the Data Processor of the Present Invention

The syntax of flag changes in each instruction are as follows.

- No change

+ The flag is changed depending on its meaning.

* The flag is changed irrespective of its meaning.

0 Cleared to 0.

1 Set to 1.

A4-1 Data Transfer Instructions: shown in FIG. 303.

A4-2 Comparison and Test Instructions: shown in FIG. 304.

A4-3 Arithmetic Operation Instructions: shown in FIG. 305.

X_flag of ADDX and SUBX indicate a carry or borrow in the size of dest. If the size of src in SUB is the same as that of dest, X_flag indicates the comparison of two sizes in an unsigned operation.

On the other hand, L_flag indicates the comparison of two sizes in a signed operation.

M_flag and Z_flag in MUL, MULU, MULX, DIV, DIVU, DIVX, REM, REMU and NGE are set depending on the set value of dest irrespective of whether an overflow occurs or not. M_flag and Z_flag in MULX and DIVX are irrespective of the set value of reg.

V_flag in DIV is set in division by zero or "(minimum negative number)÷(−1)" occurs.

V_flag in DIVU is set in the case of division by zero.

V_flag in DIVX is set in the case of division by zero or the quotient is out of the dest size.

V_flag in NEG is set if dest is the minimum negative number.

M_flag and Z_flag in INDEX are changed depending on the set value of xreg (part of the result). L_flag indicates that the result is negative, while V_flag indicates that an overflow occurs in multiplication or addition.

A4-4 Logical Operation Instructions: shown in FIG. 306.

M_flag and Z_flag in NOT are changed depending on the set value of dest (reversed result).

A4-5 Shift Instructions: shown in FIG. 307.

M_flag and Z_flag are changed depending on the set value of dest (shift result).

The last shift out value is placed in X_flag.

If count of SHA, SHL and ROT is 0, X_flag is set to 0.

In SHA, only if the sign is changed while count>0 is V_flag set to 1. Otherwise, V_flag is set to 0.

A4-6 Operation Instructions: shown in FIG. 308.

A4-7 Fixed Length Bit Field Instructions: shown in FIG. 309.

In the fixed length bit field instructions, the status flags of BFCMP and BFCMPU are changed similar to these of CMP and CMPU. The status flags of other instructions are changed similar to those of MOV and MOVU. In BFINS and BFINSU, the status flags are changed depending on BBBBBBBB in FIG. 310.

In BFEXT and BFEXTU, the status flags are changed depending on the set value of the destination rather than the bit field being fetched, so that it accords with the MOV instruction and so forth where the status flags are changed depending on the value being set on the destination.

A4-8 Variable Length Bit Field Instructions: shown in FIG. 311.

A4-9 Decimal Operation Instructions: shown in FIG. 312.

Sign-extension does not have meaning in BCD numbers. Basically, they treat unsigned numbers. Their status flags are changed similar to ADDU and SUBU. However, since ADDX and SUBX treat both unsigned and signed numbers, their status flags change irregularly, unlike those of ADDU, ADDDX, SUBU and SUBDX.

The data processor of the present invention does not support decimal operations.

A4-10 String Instructions: shown in FIG. 313.

F_flag in SMOV, SCMP and SSCH indicates that the operation is terminated by the termination condition (in the case of SSCH, it indicates that the search operation is successfully terminated).

V_flag indicates that the instruction is terminated by the number of elements.

M_flag is used to distinguish multiple termination conditions. If the operation terminates in a condition relating to R3, M_flag is set to 0. If the operation is terminated by another 0 or in a condition relating to R4, (only available in <<L2>>), the flag is set to 1.

X_flag, L_flag and Z_flag in SCMP are set depending on the result of comparison in the last element.

X_flag indicate the comparison when the element is considered as unsigned data, while L_flag indicate the comparison when the element is considered as signed data.

A4-11 Queue Operation Instructions: shown in FIG. 314.

Z_flag in QINS indicates that data is placed in an empty queue.

Z_flag in QDEL indicates that after an entry is deleted, the queue becomes empty, while V_flag in QDEL indicates that an attempt was made to delete an entry from an empty queue.

F_flag in QSCH indicates that the operation is terminated in the termination condition (the search operation is successfully terminated).

V_flag indicates that the operation is terminated by the queue termination value R2 (the search operation is unsuccessfully terminated).

M_flag is used to distinguish multiple termination conditions. If the operation is terminated in a condition relating to R3, the flag is set to 0. If the operation is terminated by another 0 or in a condition relating to R4 (available only in <<L2>>), the flag is set to 1.

A4-12 Jump Instructions: shown in FIG. 315.

The flags in the jump instructions are never changed.

A4-13 Multiprocessor Instructions: shown in FIG. 316.

A4-14 Control Space, Physical Space Operation Instructions: shown in FIG. 317.

If PSW is specified to dest with LDC, all the flags are changed.

A4-15 OS Related Instructions: shown in FIG. 318.

The data processor of the present invention does not support JRNG and RRNG.

A4-18 MMU Related Instructions: shown in FIG. 319.

M_flag, L_flag and Z_flag in the ACS instruction indicates the read permission, execute permission and write permission, respectively.

V_flag in MOVPA indicates the physical address has not been obtained due to a page fault or error.

F_flag indicates that a page fault occurs.

V_flag in LDATE and STATE indicates that ATE cannot be transferred due to a page fault or error.

The data processor of the present invention does not support the MMU related instructions except for the ACS instruction.

Appendix 5 Operation between Different Size Data Sets

The data processor of the present invention can perform various operations with different size (in byte increments) integers. It is called "operation between different size data sets". Currently only integers are treated in "different sizes". Data size are converted by simple processes such as zero-extension and sign-extension. For example, if an 8-bit signed integer is added to a 32-bit integer, the signed bit (MSB) of the 8-bit integer is extended to the high order bit and the addition operation is performed. Since the sign-extension process is available in 1 to 2 levels of gates, it is not much more complicated than regular addition instructions.

A5-1 Availability of Different Size Operation

The different size operations are used in the following cases.

(1) When one operand is an immediate:

When a variable and constant are the operands, since the size of the constant can be obtained during the compiling operation, if the constant is treated as the smaller size, it can be effective in reducing the length of the instruction. For example, when an 8-bit constant, 100, is added to a 32-bit register, if a 32-bit addition instruction is used, a 32-bit field is required.

However, the instruction which adds 8 bits to 32 bits is used, since the field which specifies a constant of 100 only needs 8 bits, the length of the instruction can be shortened.

In a multiplication or division operation, the different size operands affect the performance of such an operation as well as its length. Since it is difficult to provide a 32 to 64 bit parallel multiplier in microprocessors, multiplication operations are conducted with addition and shift operations. However, the amount of multiplication operations is proportional to the product of two operand sizes. Thus, it is profitable to have one of two operands small. Without the different size operation functions for multiplying a 32-bit variable by 3, for example, it is necessary to perform a multiplication operation of 32 bits * 32 bits.

(2) Address Calculation

In an address calculation, it is necessary to match the size of the destination with the address length. Thus, in the case of a 32-bit processor, operations between a 32-bit operand and a different size operand are often conducted. For example, in a character conversion table, if the index range of the table is 8 bits or less, an addition operation of the index and base address is conducted as an addition of an 8-bit unsigned integer and a 32-bit integer.

(3) High Level Language

Generally, in a high level language, the size of subroutine parameters is often extended to the machine's basic size (for example, 32 bits) because the subroutine parameters are transferred using a stack, or because the divided compile operation can be simplified. In the C language, the evaluation of expressions is always done in the machine's basic size irrespective of the data size of variables in the expression. On the other hand, the size of variables in the memory, arrays in particular, is usually minimized to save the memory area. Thus, in a program which uses arrays and subroutines at the same time, their size should be converted when data is moved or while the operation is executing. To evaluate an expression and convert the size of operands at a time, different size operations like the data processor of the present invention is convenient.

A5-2 Real Operations in the Data Processor of the Present Invention

In the data processor of the present Invention, to support different size operations, the independence for specifying the data size has been enhanced so that different size operations are available in most of the 2-operand, general format basic operation instructions. In short, with 2-operand general-format basic operation instructions, the source size and destination size can be independently specified. If necessary, sign-extension, zero-extension, roundoff of the high order bits, and so forth are available. Even if the destination size is smaller than the source size, the operation is executed and an overflow is detected depending on the destination size.

The different size operation of each instruction is exemplified in the following.

| | | |
|---|---|---|
| B: | Byte | 8 bits |
| H: | Halfword | 16 bits |
| W: | Word | 32 bits |

MOV src.B,dest.W

Sign-extend 8-bit src and transfer it to dest.

MOV src.W,dest.B

Transfer low order 8 bits of src to dest.

If the value of src as a 32-bit signed integer differs from the value of dest as an 8-bit signed integer, an overflow occurs.

ADD src.B,dest.W

Sign-extend 8-bit src to 32 bits and add it to dest.

ADD src.W,dest. B

The value which is sent to dest is the same as that where the low order 8 bits of src are added to dest. However, the instruction means that the contents of src (32 bits) are added to the contents of dest (the 8-bit operand is sign-extended to 32-bits), the result is converted into an 8-bit signed integer, and then it is stored in dest. Thus, if the sum of the 32-bit operation cannot be expressed by 8 bits of dest, an overflow occurs.

In the data processor of the present invention, if the source data size differs from the destination data size, normal sign extension is performed. However, for instructions which may require a zero-extension operation (MOV, CMP, ADD, SUB), the zero and sign extension can be switched at the instruction level. MOVU, CMPU, ADDU and SUBU instructions are used. In MOVU, CMPU, ADDU, SUBU, MULD and DIVU, if the destination size is larger than the source size, the zero-extension operation is performed and an overflow is detected assuming that the result is treated as an unsigned integer.

A5-3 Different Size Logical Operations

Since each bit is completely independent in logical operations, different size operations are meaningless, i.e., they are the same as small size operations except that the flags are changed in a different manner. Zero-extension and sign-extension operations for operands of logical operations differ also.

If the following function is described using the C language, the sign-extension operation and logical operation should be performed (although they are meaningless).

```
foo( ){
        short        int16;  /* 16-bit signed integer    */
        int          int32;  /* 32-bit unsigned integer */
        int32  &=  int16;  /* int16 is sign-extended. */
}
```

Such an example is included for regularity and symmetry for the language. It is hardly used except as part of programming tricks.

Problems of whether different size operations in logical operations are supported or not are summarized as follows.

(1) During execution

Logical operations with different size operands are not performed often and they do not have logical meaning. Practically, they can be substituted with other instructions and are only used for programming tricks.

(2) During compiling

Even in logical operations in the C language, zero extension and sign extension operations may be required. Even if they are not used often, the compiler should generate correct codes, so that the symmetry of instructions is maintained.

(3) Implementation for chip

While the distinction of sign extension and zero extension operations is the same in all instructions due to the regularity of implementation, even in the logical operations, the introduction of zero extension and sign extension operations is benefited. However, to do that, many bit patterns are required for assigning the instructions, resulting in complex encoding of the instructions. Practically, the sign extension and zero extension operations cannot be distinguished in logical operations, so that the regularity of implementation for sign extension and zero extension operations in logical operations is not benefited. In addition, since this matter may differ according to manufacturer, it is difficult to unify the specifications.

Although the problem is determining whether to focus on (2) or (3), for maximum performance enhancement, it is preferable to select (3).

In short,

In different size logical operations, it is not desirable to degrade the performance enhancement by operations which are hardly executed.

Since the different size logical operations for item (2) (including the sign extension operation) are not often used, it is possible to slightly lower their execution speed. For example:

although the following instruction

| | | |
|---|---|---|
| AND | src.B,dest.W | Sign-extend src. |

is replaced with the following instructions,

| | | |
|---|---|---|
| MOV | src.B,@-SP.W | Sign-extend src. |
| AND | @SP+.W,dest.W | |

the execution speed is slightly lowered, but the symmetry for the sign-extension and logical operations can be performed. With this operation, the burden on the compiler does not increase.

The data processor of the present invention specification does not support different size logical operations. If the instruction bit patterns are different sizes, logical operations are not assured.

A5-4 Summary of Different Size Operation Function

The paragraph that follows summarizes the relationship between instructions supported by the data processor of the present Invention and integer data types.

Supports 8-, 16-, 32-, and 64-bit long instructions.

Supports signed integers with higher priority.

For arithmetic operations of signed integers, different size operations in 2-operand instructions are supported.

The source size and destination size can be independently specified without restriction due to the size. If the source size is smaller than the destination size, the sign extension operation is performed. The result is treated as a signed integer and the flags are set accordingly.

Unsigned integer operations are supported only in part of instructions (MOV, CMP, ADD, SUB, MUL and DIV). The source size and destination size can be independently specified. If the source size is smaller than the destination size, the zero extension is performed. The result is treated as an unsigned integer and the flags are set accordingly.

The operations which include signed and unsigned integers cannot be performed. However, in the case of an addition instruction, the presence or absence of the sign of the destination only affects the flags. If the flags do not need to be observed, the operation can be replaced with ADD or ADDU.

The different size logical operations are not supported.

Appendix 6 Subroutine Calls for High Level Languages

In subroutine calls in high level languages, it is necessary to save the return address, set the frame pointer, keep the local variable area, and save the contents of the general purpose resisters. Although these operations can be broken down into instructions such as JSR and STM, they are usually lumped as one instruction (ENTER, EXITED).

A6-1 Subroutine Calls in the Data Processor of the Present Invention

In subroutine calls of high level languages (C and PASCAL in particular), the process is performed as in FIG. 320.

The paragraph that follows describes the subroutine instruction ENTER and return instruction EXITD that the data processor of the present Invention provides for high level languages.

FP (frame pointer) and displacement

The language which provides a static scope like PASCAL employs a display register which accesses variables in the intermediate level (which is located between the level of the local variables and the level of the global variables). For processors which use many registers like the data processor of the present invention, it is effective to provide such a display register in the general purpose registers. It means that these processors have multiple FP's (for implementation, see the description in A6-2).

Parameters

When parameters are passed, they are grouped as a packet and the start address is passed with a register or parameters are placed in the stack. In high level languages, the latter method is often used. To access parameters in the stack by the called subroutine, the FP relative mode is used.

After a subroutine is executed, the parameters in the stack should be released by the called side. Depending on the language, the number of parameters (value to be added to SP) to be released can be specified in the return instruction, unless partitioned compiling is performed. To do that, the data processor of the present invention provides the EXITD instruction. Since the number of parameters may be automatically determined (when the specific register and stack are used to inform the subroutine of the number of parameters), it is possible to use a value in the register as well as the immediate value, as the value to be added to SP.

However, in languages where the number of parameters cannot be determined, as in the C language, the subroutine side does not know the number of parameters which is determined by the side which calls the subroutine. Thus, in the EXITD instruction which is executed on the called side, the number of parameters to be released cannot be specified. In this case, the side which calls the subroutine should execute the instruction "ADD #n,SP" to release the parameters.

The ENTER instruction and EXITD instruction of the data processor of the present invention perform the processes 2 to 4 in the schematic on the preceding page and the processes 5 to 7 or 5 to 8, respectively. (However, the number of parameters being released in process 8 is specified on the subroutine side.) Process 1 is the same as JSR, while process 8 serves to perform "ADD ***,SP" on the side which calls the subroutine.

Figures 321, 322:
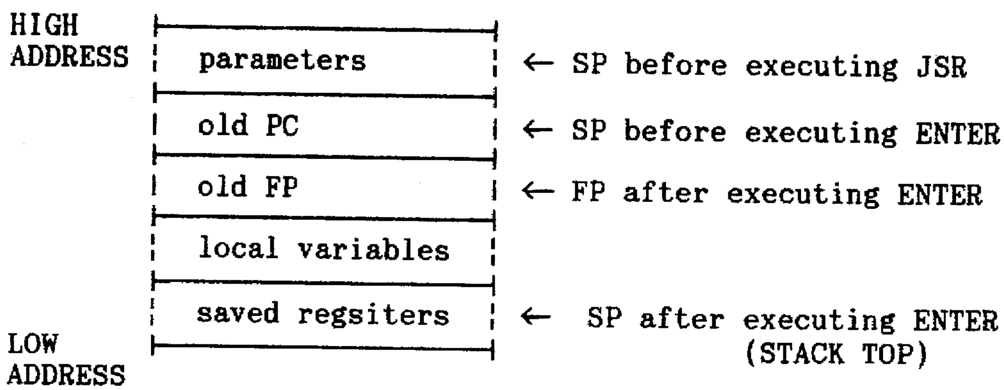

The stack frame in high class languages for the data processor of the present invention is as in FIG. 321.

To place the local variables and parameters near FP, the register saving operation precedes the local variable keeping operation.

The EXITD instruction includes the restore (RTS) operation.

Practical Instruction Sequence (If the subroutine side does not know the number of parameters): shown in FIG. 322.

(If the subroutine side knows the number of parameters): shown in FIG. 323.

A6-2 Example of Configuration of Display Register for Block Structural Language

To use the FP register, which is used in ENTER-EXITD as a dynamic link, it is necessary to assign the FP register to the frame pointer for the internal block (maximum lexical level).

For frame pointers in other lexical levels, R13, R12, R11 ..., are used in the order of smaller value change to match the content of the smallest number register with FP.

After the ENTER instruction is executed in each subroutine, FP is copied to the frame pointer register corresponding to their own lexical level. The registers larger than the number are used for the displacement registers and those smaller than the number are used for the saving registers. However, the contents of the registers newly rewritten should be saved.

Program Example (Static Scope): shown in FIG. 324.

Example of Execution Statuses (Dynamic Link and Display Registers): shown in FIG. 325.

proc0*,var0* proc0 has a different frame from the former proc0 because of a recursive call.

For the registers whose contents are destroyed by the FP copy operation, the contents should be saved with the ENTER instruction before the copy operation. If the contents of the registers are saved, when the control returns to the function just before executing the subroutine, the contents of the display registers return to the former values irrespective of whether the lexical level is high or low.

In the preceding example, the following relationship can be obtained depending on how the registers are used.

For the execution of subroutines in the lexical level n, the following items are required.

(1) n registers from R13 to R13–n+1 are only referenced: they are not written.

(2) Since the R13–n registers are used for displaying the local variables in this level, it is copied from FP after ENTER is executed. This display is used to access the variables in this level from the called subroutine when the higher level subroutine is called during the subroutine execution. To access the variables in this level from the subroutine, it is preferable to use FP which has the same content.

(3) The (13–n) registers, from R13–n–1 to R0, are used for the register variables and for their evaluation.

(4) The contents registers R13–n–1 to R0, should be saved with the ENTER instruction. The contents of all the registers should be stored.

Appendix 7 Control Registers and Control Space

Since the specifications for the control registers closely relate to the chip bus (which is connected to the coprocessor, cache, TBL, and so forth) and the implementation method, they are specified in <<LA>>.

A7-1 Concept of Control Space

In the data processor of the present Invention, a unique address is assigned to all the registers, MMU, cache, control registers (such as TLB of the main processor and co-processor on the chip bus) and context switch high speed memories on the chip bus. It is called the control space. The control space of the data processor of the present invention is such that the address space (co-processor-ID) for conventional processors and the control register address of the main processor are unified and generalized. It features the following:

The control space in the data processor of the present Invention contains the following:

(1) Main processor control registers ... PSW, stack pointer of each ring, etc.

(2) MMU control registers (the data processor of the present invention does not provide either or MMU.) ... UATB, SATB, etc.

Registers depending on the implementation (3) [Co-processor control registers]

(4) [Context saving high speed memory] ... For future chips (5) [General purpose registers and temporary registers in processor] ... Remote diagnosis and debugging The control space is the common space between contexts (processes and tasks). The control space is accessed at high speed by a simplified protocol because address conversion is not required. This function is also used for the high speed context switching.

The concept of the control space will only become a reality when a co-processor and context saving memory are built in the future. For the first version chips, since it may be difficult to unify the operation of the control space, only the address assignment is determined for future use and some of the control space operation instructions can be used with some restrictions.

Practically, there are the following restrictions:

Although the control space addresses are assigned from R0 to R15 with PC used for diagnosing the processor, they are specified in <<L2>> and the data processor of the present invention does not provide them.

LDC and STC are generally used to access the main processor control registers, FPU control registers and context saving memories. However, in the data processor of the present invention, only the control registers with the effective addresses H'0 to H'07ff (main processor control register) can be accessed with LDC and STC.

In the addresses of the control space in the data processor of the present invention, the byte and half-word accesses cannot be used. The word access is automatically specified.

The context saving memory cannot be located in the area where the control registers are located (from H'0). Since the addresses from H'ffff8000 to H'ffffffff are assigned (and also the extension area from H'80000000) as the context saving memory, if LDCTX/CS or STCTX/CS is executed while a value other than H'80000000 to H'ffffffff is set to CTXBB, an error occurs. The function of LDCTX/CS and STCTX/CS is specified in <<L2>>.

- The data processor of the present invention does not support LDCTX/CS and STCTX/CS.

| | |
|---|---|
| —: | Required specification <<L1>> |
| . . .: | Only address assignment <<L2>> |

Figure 326:
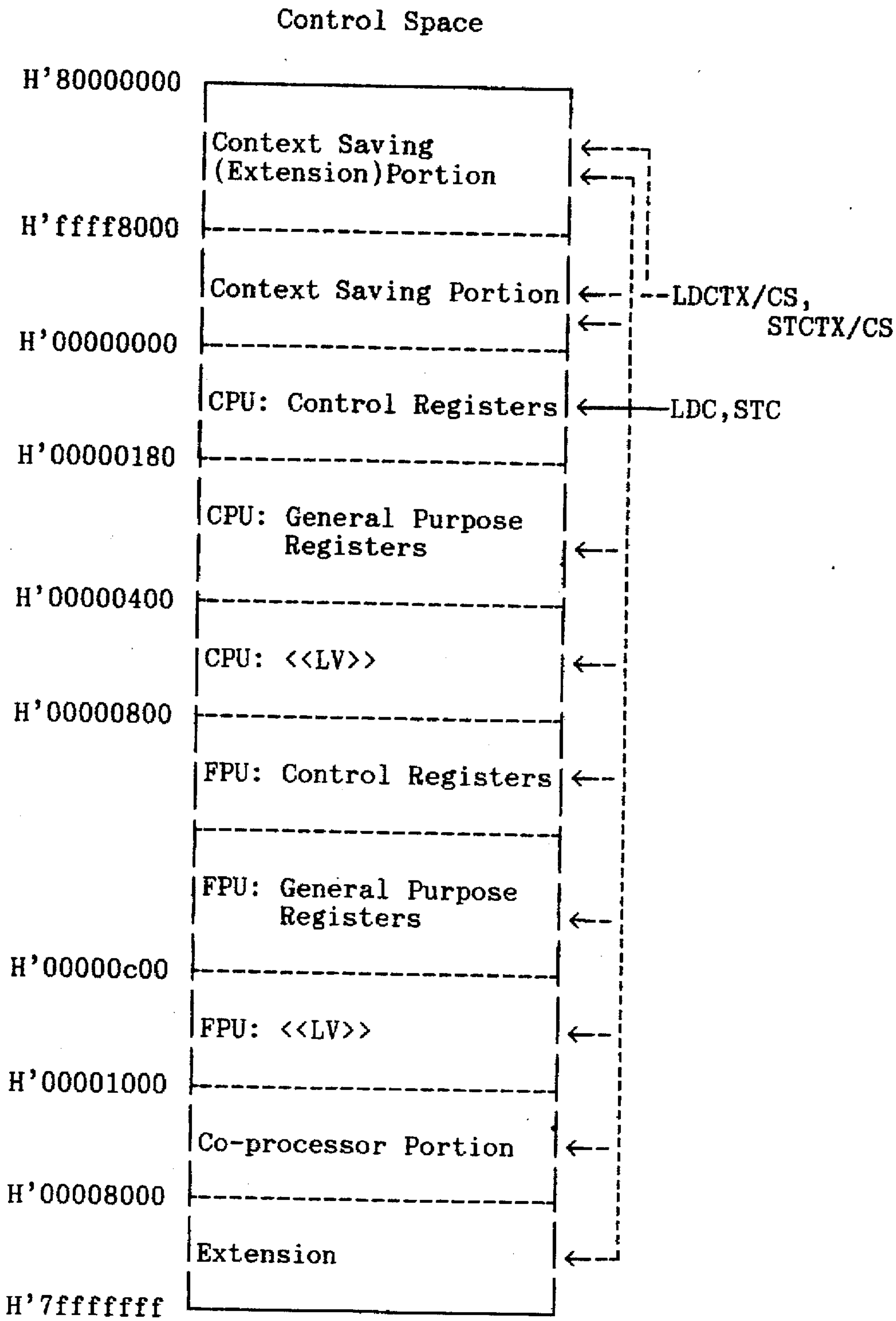
FIG. 326 is an illustration of control space.

Although the byte access and half word access are not available in the control space diagrammed in FIG. 326, the byte addressing mode is used because the execution address can be specified using the general purpose addressing mode. Confusion will occur unless the byte address is the same type as used in the logical space. To save the context in the control space, the general purpose addressing mode can be used in the control space.

If only the control registers in the main processor can be accessed with LDC and STC, the byte addressing mode loses its meaning and the specification becomes unnatural. In order to accommodate future plans, such unnaturalness for part of the functions is now unavoidable.

A7-2 Main Processor Control Registers

The mnemonics and addresses of the control registers are as follows. The address of the control register is placed at 8n+4, because of the expandability of the registers to 64 bits.

| | |
|---|---|
| H'0000 to H'03ff | Main processor, MMU (TRON reserve) |
| H'0400 to H'07ff | Main processor, MMU <<LV>> |
| H'0800 to H'0bff | FPU (TRON reserve) |
| H'0c00 to H'0fff | FPU <<LV>> |

* means the register provided every context.
/ means the register which will not always be provided (address assigned).

| Address | | Register |
|---|---|---|
| H'0000 | | reserved |
| H'0004 | * | PSW |
| H'0008 | | reserved |
| H'000c | (*) | SMRNG |
| H'0010 | | reserved |
| H'0014 | (*) | IMASK |
| H'0018 | | reserved |
| H'001c | | reserved |
| H'0020 | | reserved -- EITVBH |
| H'0024 | | EITVB. |
| H'0028 | | reserved -- JRNGVBH |
| H'002c | the data processor of the present invention | reserved – JRNGVB |
| H'0030 | | reserved – CTXBBH |
| H'0034 | * | CTXBB |
| H'0038 | | reserved |
| H'003c | | reserved |
| H'0040 | | reserved – SATBH |
| H'0044 | the data processor of the present invention | reserved – SATB |
| H'0048 | | reserved – UATBH |
| H'004c | * the data processor of the present invention | reserved – UATB |
| H'0050 | | reserved |
| H'0054 | the data processor of the present invention | reserved – LSID |
| H'0058 | | reserved |
| H'005c | | reserved |
| H'0060 | | reserved – IOADDRH |
| H'0064 | / | IOADDR |
| H'0068 | | reserved – IOMASKH |
| H'006c | / | IOMASK |
| H'0060 to H'007f | | reserved |
| H'0080 | | reserved |
| H'0084 | (*)the data processor of the present invention | reserved – DCE |
| H'0088 | | reserved |
| H'008c | | DI |
| H'0090 | | reserved |
| H'0094 | * the data processor of the present invention | reserved – CSW |
| H'0098 | | reserved |
| H'009c | (*)the data processor of the present invention | reserved – CTXBFM |
| H'00a0 to H'00ff | | reserved |
| H'0100 | | reserved – SPIH |
| H'0104 | | SPI |
| H'0108 to H'011f | | reserved |
| H'0120 | | reserved – SPOH |
| H'0124 | * | SPO |
| H'0128 | | reserved – SPLH |
| H'012c | * the data processor of the present invention | reserved – SP1 |
| H'0130 | | reserved – SP2H |
| H'0134 | * the data processor of the present invention | reserved – SP2 |
| H'0138 | | reserved – SP3H |
| H'013c | * | SP3 |
| H'0140 to H'017f | | reserved |
| H'0180 | | reserved – R0H |
| H'0184 | * the data processor of the present invention | reserved R0 |
| H'0188 | | reserved R1H |
| H'018c | * the data processor of the present invention | reserved R1 |
| . . . | | . . . |
| H'01e0 | | reserved R12H |
| H'01e4 | * the data processor of the present invention | reserved R12 |
| H'01e8 | | reserved R13H |
| H'01ec | * the data processor of the present invention | reserved R13 |
| H'01f0 | | reserved R14H |
| H'01f4 | * the data processor of the present invention | reserved R14 |
| H'01f8 | | reserved PCH |
| H'01fc | * the data processor of the present invention | reserved PC |
| H'0200 to H'03ff | | reserved |
| (H'0400 to H'07ff | | <<LV>>) |
| H'0424 | | BBC |
| H'042C | | BBP |
| H'0534 | | DBC |
| H'0484 | | XBP0 |
| H'048C | | XBP1 |

-continued

| | |
|---|---|
| H'0504 | OBP0 |
| H'050C | OBP1 |

A7-3 Unused Bits in Control Registers

If "1" is written to the unused bits in the control registers, it is preferable to check them and to cause an EIT to occur. If they are improperly checked, it is difficult to maintain the compatibility (especially, with lower grade chips) and an overhead for checking the bits takes place. Thus, except for PSW, the data processor of the present invention does not check the unused bits.

Even for a chip with the registers whose functions are specified in <<L2>> (like CTXBFM), it does not check an error and does not always read data which is written.

Although the bits are not checked, it is important for the user to note that the bits which are not used should be filled with '0'.

A reserved function exception (RFE) occurs for PSW, if '1' is written to the unused bit '–'.

Bits '–', '=', and '*' in the description of the control registers mean the following:

'–' Reserved to '0' (An exception occurs if violated.)

'+' Reserved to '1' (An exception occurs if violated.) Although '0' or '1' can be written to this bit, a reserved function error (RFE) in the instructions (such as LDC and LDCTX) occurs.

'=' Reserved to '0' (It is ignored if violated.)

'#' Reserved to '1' (It is ignored if violated.) Even if '1' or '0' is written to this bit, it is ignored. The operation when '0' or '1' is written is the same as that when '1' or '0' is written.

'*' Any value can be written. The operation of hardware is the same as that when '=' or '#' is written. Regandless of the value written, it is ignored. Unlike '=' and '#' this bit will not be used even if the function of the chip is extended in future. Thus, the user can write any value to this bit. It is important for the user to note that this bit should be ignored and the bit mask process should be omitted.

In IMASK, SMRNG, DI, DCE and CTXBFM, the unused bits are represented by '*'. In PSW, the unused bits are represented by '–'. In other control registers, the unused bits are represented by '='.

In PSB and PSM, the unused fields are also represented by '–'. Thus, in LDPSB and LDPSM, a reserved function exception (RFE) occurs.

If the bit being read is '–' '0' is read If the bit is '=' or '*', the value obtained is unknown. Thus the currently read value may be different fom the previously read value.

A7-4 Contents of Control Registers

Figure 327:
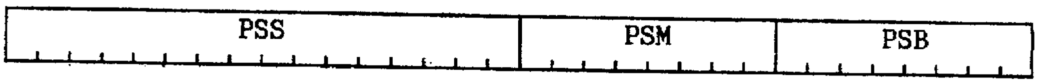
FIG. 327 is a view of the format of PSW.

PSW: shown in FIG. 327.

Processor Status Word

For details, see the related chapter in this specification.

PSM,PSB

These registers are the only user accessible low order two bytes which are extracted from PSW. They are accessed with the LDPSB, LDPSM, STPSB and STPSM instructions. Only PSB and PSM of the control registers can be accessed from any ring other than ring 0.

Figure 328:
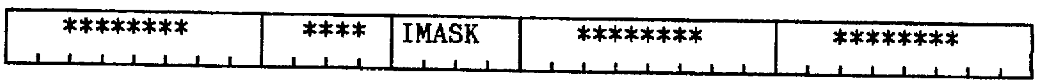
FIG. 328 is a view of the format of IMASK.

IMASK: shown in FIG. 328.

This IMASK field, which can be independently accessed, is extracted from PSW for a different register. It is used to simplify the operation of IMASK and to enhance its performance. Even if data is written to fields other than IMASK, it is ignored.

Figure 329:
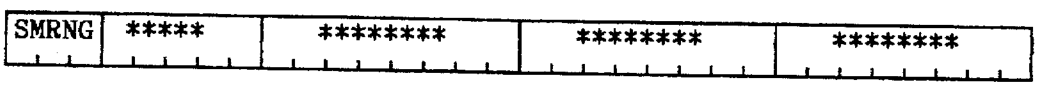
FIG. 329 is a view of the format of SMRNG.

SMRNG: shown in FIG. 329.

This SMRNG field, which can be independently accessed, is extracted from PSW for a different register. It is used to simplify the operation of SMRNG and to enhance its performance. Even if data is written to fields other than SMRNG, it is ignored.

Figure 330:
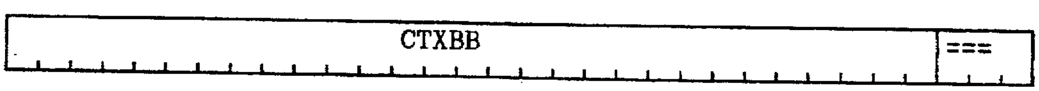
FIG. 330 is a view of the format of CTXBB.

CTXBB: shown in FIG. 330.

Context Block Base

This register points at the base address of CTXB. It is used in the LDCTX and STCTX instructions. For expansion to the data processor of the present Invention 64, as well as in the data processor of the present Invention 32, 8-byte alignment for CTXBB is required. Thus, the lower three bits of CTXBB are represented with '==='. In other words, although they are reserved as 0, violations are ignored.

Figure 331:
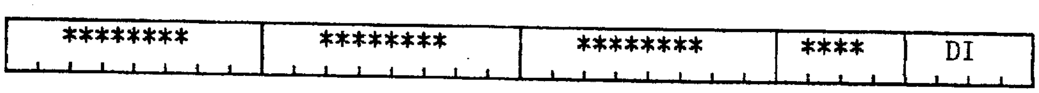
FIG. 331 is a view of the format of DI.

DI: shown in FIG. 331.

This register shows DI (delayed interrupt) requests.

DI=0000 DI request after external interrupt (NMI) process with priority 0.

DI=0001 DI request after external interrupt process with priority 1.

DI=0010 DI request after external interrupt process with priority 2.

DI=1110 DI request after external interrupt process with priority 15.

DI=1111 No DI request

DI (delayed interrupt) is a mechanism which generates external interrupt by software. It is effective for suspending various process requests which asynchronously occur and to serialize the process order. If there is a process to be started after an external interrupt with higher priority, the process can be automatically started by sending the request to DI.

DI performs the same process as DCE for an external interrupt. When IMASK of PSW is changed by an instruction like REIT, the EIT process of DI is started if DI<IMASK.

Even if data is written to a field other than DI of the register, it is ignored.

Figure 332:
FIG. 332 is a view of the format of CSW.

CSW: shown in FIG. 332.

Context Status Word

This register gathers the information which should be switched every context and which is not nested. This register is composed of the DCE field which represents the DCE (delayed context exception) request and the CTXBFM field which represents the CTXB format. For the CTXBFM function, see Appendix 8.

If the function of CTXBFM is not implemented, since the DCE register and CSW register deal with the same information, the CSW register may be not also implemented (an RFE occurs when accessed). At the time, although the CSW register is formally placed in CTXB, the DCE register is actually placed in CTXB.

The relationship between CSW and DCE and between CSW and CTXBFM is similar to that between PSW and IMASK and between PSW and SMRNG. CSW which compresses the information such as DCE and CTXBFM is placed to CTXB. In the data processor of the present invention, DCE='111' is fixedly used.

Figure 333:
FIG. 333 is a view of the format of DCE.

DCE: shown in FIG. 333.

Delayed Context Exception

The DCE field can be independently accessed is extracted from CSW for a different register. It is used to simplify the operation of DCE and to enhance its performance. Even if data is written to fields other than DEC, it is ignored. When the context is switched, it is transferred between CTXB and the DCE register instead of the CSW register if the CSW register is not implemented. When the context is saved, the bits represented with '*' become all '0' and are written to CTXB. When the context is loaded, the bit values represented with '*' are not checked.

Figure 334:
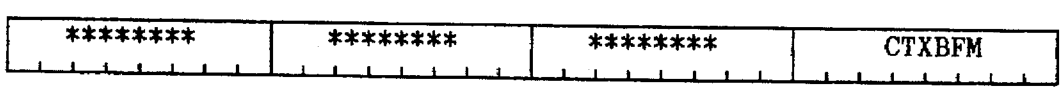
FIG. 334 is a view of the format of CTXBFM.

CTXBFM: shown in FIG. 334.

Context Block Format

The CTXBFM field, which can be independently accessed, is extracted from CSW for a different register. It is used to simplify the operation of CTXBFM and to enhance its performance. Even if data is written to fields other, it is ignored.

This register is specified in <<L2>>.

EITVB: shown in FIG. 335.

EIT Vector Base

The register represents the start of the physical address of EIT (exception and interrupt) vector table. The data processor32 of the present invention, as well as the data processor64 of the present invention, require 8-byte alignment for EITVB. Thus, the lower three bits of EITVB are represented with '==='. In other words, although they are reserved as 0, they are ignored if they are violated.

JRNGVB: shown in FIG. 336.

JRNG Vector Base

The register represents the start logical address of the vector table of the JRNG instruction. The table base address in JRNGVB, the data processor32 of the present invention, as well as the data processor64 of the present invention, require 8-byte alignment. Since the LSB of JRNGVB is an enable bit, when E is '0', the execution of JRNG is inhibited. Thus, the low order 3 bits of JRNGVB are represented with '==E'. Although the bits represented with '=' are reserved as 0, it is ignored when violated.

SP0 to SP3: shown in FIG. 337.

SPI: shown in FIG. 338.

IOADDR, IOMASK: shown in FIG. 339.

IO Mask

When the address translation is not performed (AT of PSW=00, 10), this register specifies the physical address of the I/O area.

If the address translation cannot be performed when the system is started, the I/O area is specified using the two registers IOADDR and IOMASK, although in the address translation with MMU, the I/O area is specified by the NC bit of PTE.

When the logical product by the physical address and IOMASK is equal to IOADDR, it is treated as the I/O area if the memory is accessed without address translation. The data of the area is not fetched and pre-fetched to the cache and the memory access that the instruction requires just accords with the practical physical memory access.

If the address translation is performed, the IOADDR and IOMASK registers are not used. If data cache and data prefetch are not conducted by the processor, it is not always necessary to use the IOADDR and IOMASK registers.

UATB: shown in FIG. 340.

Unshared region Address Translation Base

For detail, see Appendix 3.

SATB: shown in FIG. 341.

Shared region Address Translation Base

For detail, see Appendix 3.

LSID: shown in FIG. 342.

Logical Space ID

A unique number which identifies the multiple logical spaces is placed. If TLB and logical caches in multiple logical spaces are used at the same time, this number is used. The number of bits available for LSID depends on the implementation.

Appendix 8 CTXB of the Data Processor of the Present Invention

A8-1 What is CTXB?

The data processor of the present invention does not provide an MMU. The CTXB format that Data Processor of the present invention will support has not yet been completely decided.

If OS supports parallel processes such as tasks, processes and call routines, the information on the hardware resource is required every program for parallel processes. Since such hardware resources are used in a time sharing manner, the hardware resource information for programs which are currently executed should be saved in the memory.

In the data processor of the present invention, a program flow which is a unit of the parallel processes is named a context. The total hardware resource information saved in the memory is named a context block (CTXB).

The CTXB space can be selected from logical space (LS) and control space (CS) as options of LDCTX and STCTX instructions. For ease of describing the OS, it is acceptable to use LS. For high speed operation of the context switch and for accommodating the context switch in order to save memory in the chip, CS can be also used. However, CS will be specified when the context memory will be accommodated in future chips. Currently, the specification of CS is specified in <<L2>>. the data processor of the present invention has a CTXB base register (CTXBB) which stores the start address of CTXB for the currently executing context.

Part of the CTXB format is supported by hardware with the LDCTX and STCTX instructions.

The Data Processor32 of the Present Invention Standard CTXB Format: shown in FIG. 343.

Generally, PC and PSW of the user program should be switched rather than those of the OS. However, PC and PSW of the user program are routinely saved in the stack when OS is evoked, because PC and PSW are placed in the stack in the above CTXB format.

If the context is switched directly at the end of the external interrupt process handler which uses SPI, to realize the preceding CTXB format, it is necessary to transfer PC and PSW with different instructions. However, in this case, with DCE and DI, when exiting from the external interrupt, the context can be switched. With this method, by specifying SP0 using DCE and DI, the preceding data structure can be naturally realized.

A8-2 Variation of CTXB

The portions with '*1' to '*5' of information in CTXB vary depending on the system configuration. They are described as follows:

The content and format of CTXB may be dynamically varied by the following causes (or every context).

Configuration of OS and Presence/Absence of MMU (*1 to *3)

Since the switching of SP1 to SP3 with the context switch may be meaningless, it may be not necessary to save SP1 to SP3. In addition, it is not necessary to switch UATB and LSID in applications which do not use an MMU.

(*1) Since in JRNG to RRNG an outer ring is saved in the stack of the inner ring, a value of SP for a more outer ring than the current ring is meaningless. For a context switch which is executed only in ring 0, the value of SP1 to SP3 is meaningless. As SP0 is switched, SP1 to SP3 are also indirectly switched since SP1 to SP3 are directly or indirectly saved in the stack of SP0. On the other hand, if the context is switched in TRAPA to REIT, SP1 to SP3 should be also switched. Thus, there are two cases where SP1 to SP3 are included in CTXB.

(*2) MMU is not accommodated. In the <<L1R>> specification, UATB is not required.

(*3) LSID serves to identify multiple logical spaces. LSID is provided in the <<L2>> specification, so that there are two cases where LSID is included in CTXB.

Assignment of General Purpose Registers to be Saved(*4) If registers, which are not used for context and the working registers used for OS, are not saved and restored for CTXB, wasteful data transfer can be prevented, so that the context switch time is shortened.

Presence/Absence of Co-Processor (*5) Although registers of FPU differ from the general purpose registers, it should be provided for context information. Thus, CTXB may dynamically vary depending on whether the context uses FPU or not.

For a CTXB which varies, the data processor of the present invention performs the following way.

In the first version <<L1>> chips, only CSW, SP0 to SP3, and UATB are transferred with LDCTX and STCTX, while R0 to R14 are transferred with the instructions LDM and STM, so that (*4) is satisfied.

The register (CTXBFM) which identifies the current CTXB format is provided for other variations of CTXB. This register holds the information of what CTXB contains and what LDCTX and STCTX transfer. The information of CTXBFM and that of DCE are treated as the CSW register. [CTXBFM]: shown in FIG. 344.

FR Save the contents of the FPU registers.

Save the contexts of the FPU registers which are provided in the standard the data processor of the present invention. Especially, this function will be used when FPU will be accommodated in future chips.

RG Save the contents of R0 to R14. This function will especially be used when the context saving memory will be accommodated in the chip in future.

SP Save the content of SP.

SP=00 Save the contents of SP0, SP1, SP2 and SP3.

SP=01 Reserved

SP=10 Save the contents of SP0 and SP3 (for the <<L1R>> specification).

SP=11 Save only the contents of SP0.

This function is used when OS is evoked by JRNG and to prevent wasteful data transfer of SP1 to SP3. In addition, it is used when SP1 and SP2 are not provided in <<L1R>>.

MM Save the MMU related registers.

MM=00 Save the contents of UATB.

MM=01 Save the contents of UATB and LSID.

MM=10 Do not save the contents of the MMU related registers (for <<L1R>>).

MM=11 Reserved

[The details of CTXBFM are still under consideration.]

In CTXB (in the standard format of <<L1>>), the contents of CSW (DCE, CTXBFM), SP0 to SP3, and UATB are transferred with LDCTX and STCTX. This operation is specified by setting CTXBFM to all zeros.

In the LDCTX instruction, the format following CTXB is determined by CTXBFM in CSW (in the new context being fetched from CTXB) and is loaded.

In the STCTX instruction, the specified value of the current CTXBFM is saved in CTXB. However, the function of CTXBFM is specified in <<L2>> for compatibility with future upgrades.

In short, the fixed CTXB is specified in <<L1>>, while the variable CTXB (upgrade compatible) is specified in <<L2>>.

Since it is not necessary to transfer the contents of SP1, SP2 and UATB, these values are not included in CTXB for the <<L1R>> chips. The values of these registers included in CTXB, can be selected by CTXBFM, however, the accommodation of CTXBFM becomes a burden to the chip. It is possible to directly specify the CTXB format by extra options for the LDCTX and STCTX instructions and to specify the availability of CTXBFM by extra options for the LDCTX and STCTX instructions.

A8-3 Software Context

Every process and every task includes the information where the OS is controlled by software. Since such information depends on the OS, it cannot be supported by hardware (LSTCTX and STCTX instructions). Such information is named the software context. In the case of ITRON, for example, the task status, address of process routine upon termination, address of exception process, wakeup count, ring area for queue configuration, and so forth are included in the software context.

If CTXB is placed in the logical space (LS), the hardware context such as general purpose registers can be treated as the software context. However, if a different space such as CS is used as the hardware context, it is necessary to place the software context at CS (in this case, the LDC and STC instructions are available) or to indirectly reference both the software context and hardware context by connecting the pointer.

Appendix 9 EIT Process of the Data Processor of the Present Invention

The outline of the EIT process is as follows, however, the detail is still under consideration.

The process which causes a regular program execution flow to be suspended by the hardware mechanism, and then which is asynchronously started, is called the EIT process in the data processor of the present Invention. The EIT process breaks down into the following.

Internal interrupt (trap)

Exception Interrupt (exception)

External interrupt (interrupt)

The trap, exception and interrupt are classified depending on where an EIT occurs from the programmer's viewpoint, rather than the mechanical differences in the implementation (differences in information saved in the stack).

If the processor detects an EIT while executing instructions, it suspends the execution of sequential instructions and starts the EIT process. When the hardware of the processor detects an EIT, it causes the status of the processor to be saved in the stack and starts the EIT handler. On the other hand, the EIT process handler serves to recover the error depending on the EIT, display the error message and perform the emulation. The EIT process handler is implemented in software. Most of the EIT processes issue the REIT instruction at the end of the EIT process handler, exits to the former instruction queue being suspended and restores the process.

Instructions which have not been defined, error detection for incorrect instructions, and emulation mechanisms will all be enhanced by considering future upgrade compatibilities. Thus, if incorrect combinations of instruction formats or an attempt to execute unimplemented functions is made, they are treated as an error, so that an exception interrupt occurs.

A9-1 Types of EIT

The data processor of the present invention generates the following types of EIT.

[For memory and address]

Page out exception (POE) ...... The data processor of the present invention does not generate it.

This EIT occurs if the PI bit of UATB, SATB, STE and PTE is 0. It includes page out, page table out, and section table out. It is a page fault exception.

Address Translation Exception (ATRE)

This EIT occurs if an error occurs during address translation. If the reserved bit pattern is used in STE and PTE, if the portion which is not used by UATB, SATB, STE and PTE or if the memory is referenced by violating the ring protection, EIT detailed information is distinguished by the information in the stack when an ATRE occurs.

Bus Access Exception (BAE)

This EIT occurs if no response takes place from the bus within a specified time while accessing an instruction or operand or if the memory cannot be accessed. It is a bus error.

Odd Address Jump Exception (OAJE)

This EIT occurs if the jump address is odd. This exception occurs in instructions where the jump address is directly assigned as an operand (such as JMP and ACB), in instructions where the return address is obtained from the stack (RTS, EXITD, RRNG, and REIT) and in the JRNG instruction. However, this exception does not occur when starting the EIT process. If the new PC is odd when the EIT process is started, a system error exception (SEE) occurs. [JRNG and EIT are still under development.]

[For Instructions and Arithmetic Operations]

Privileged Instruction Violation Exception (PIVE) This exception occurs if a privileged instruction is executed from a ring other than ring 0.

<<L1>> Function Exception (L1E)

This exception occurs if the <<L1>> function is executed in a processor which does not implement the <<L1>> function. In a processor which implements the <<L1>> function, this exception does not occur and the vector number for this EIT is reserved.

Reserved Instruction Exception (RIE)

This exception occurs if an instruction and the bit pattern of an addressing mode which are currently not assigned is executed. It is an undefined instruction exception. This exception occurs. If: 1) the 64-bit size is assigned in data processor32 of the present invention, 2) P bit is set to '1', 3) an <<L2>> instruction which has not been implemented is executed, or 4) an option which has not been defined and implemented is assigned. This exception also occurs if an addressing mode which is inhibited by an instruction (such as an assignment of immediate by the JMP instruction) is used or if an additional mode in any level which has not been implemented.

Reserved Function Exception (RFE)

This exception occurs if the function being reserved for future extension is used in a bit pattern other than the instruction and addressing modes.

A reserved function exception occurs. if: 1) '1' is written to XA and the reserved ('–') bit for PSW, 2) the reserved value (such as SM, RNG=001) is written to the field of SMRNG, or 3) '1' is written to the PSM and PSB reserved ('–') bits with the non-privileged instructions (LDPSB and LDPSM). In addition, if a control register which has not been implemented is accessed or if "imask≦16" is assigned with the WAIT instruction, a reserved function exception (RFE) occurs.

The exception where an error can be determined using only an instruction bit pattern (including the assignment of addressing mode and size), is treated as a reserved instruction exception (RIE). However, The exception where the status is changed depending on address and operand value is treated as a reserved function exception (RFE) when an error occurs.

Co-processor Instruction Exception (CIE)

This exception occurs if an instruction which is assigned to the co-processor is executed while the co-processor is not connected.

Co-processor Command Exception (CCE)

...... Data Processor of the present invention does not generate it.

This exception occurs if an error is detected in the interface with the co-processor.

Co-processor Execution Exception (CEE)

...... Data Processor of the present invention does not generate it.

This exception occurs if an error occurs in the execution of a co-processor instruction.

Illegal Operand Exception (IOE)

This exception occurs if an illegal operand is assigned. It also occurs if the width exceeds 32 (64) bits when a fixed length bit field instruction is assigned.

Although a jump to an odd address and zero division are considered part of the illegal operand exception, it is broken down into different exceptions, Illegal operand handling other than illegal operand exception and zero division exception, are not performed (comparison of upper bound and lower bound in the CHK instruction), An instruction is executed directly with a proper interpretation (if the count is larger in the shift instruction). However, if the result of the instruction being executed is illegal (such as an overflow), an EIT does not occur. In this case, V_flag is set and the instruction is terminated (instructions such as ADD and MOV) or no operation is performed (such as an overflow in UNPKss).

Decimal Illegal Operand Exception (DDE)

In the signed decimal arithmetic operation instructions, this exception occurs if data other than 0 to 9 is assigned as an operand.

Although this exception is a quasi-illegal operand exception (IOE), it is classified as a different exception.

Reserved Stack Format Exception (RSFE)

This exception occurs if the number which represents the format of the EIT stack frame (FORMAT) cannot be processed by the REIT instruction when the control exits from EIT.

Ring Transition Violation Exception (RTVE)

.... the data processor of the present invention does not generate it.

This exception occurs if an illegal ring transition is attempted, such as a transition to an outer ring with the JRN instruction or a transition to an inner ring with the RRNG instruction.

If the page containing JRNGVTE is referenced with the JRNG instruction in an area which is not used, a not-used area reference error of the address translation exception (ATRE) rather than a ring transition violation exception (RTVE) occurs.

Zero Divide Exception (ZDE)

This exception occurs if the division by zero is performed.

[For Debug]

Debug Exception (DBE)

This exception occurs in debugging operations. It is an exception for executing the single step and setting a break-point of an instruction. The details of the specification are in <<LV>>.

[For Trap]

Trap Instruction (TRAPA)

This trap occurs with the TRAPA instruction. There are 16 types of EIT vectors for TRAPA in accordance with the operand vectors of TRAPA.

Conditional TRAP Instruction (TRAP)

This trap occurs with the TRAP instruction.

[DCE, DI]

Delayed Context Exception (DCE)

This exception occurs if the value of the DCE field in the CSW register (or DCE register) is smaller than that of the SMRNG field in PSW. This exception is effective for processing various asynchronous events (completion of I/O) depending on the context.

Delayed Interrupt (DI)

This interrupt occurs if the value of the DI field in the DI register is smaller than that of the IMASK field in PSW. This EIT is effective in processing an asynchronous event which is independent of the context.

There are 15 types of EIT vectors for the DI process every interrupt priority.

Although this EIT is an exception because it occurs by executing an instruction such as the REIT instruction, it is an interrupt because it is started irrespective of the context being executed.

Although PSW (which includes the IMASK field) depends on the context, only the IMASK field is usually used independent of the context.

[Others]

Reset Interrupt (RI)

This interrupt is set by an external reset signal.

System Error Exception (SEE)

This exception occurs if a fatal error occurs during the EIT process.

[Interrupt]

External Interrupt (EI)

This interrupt is set by a hardware signal from an off-chip sourse. Generally, the external interrupt is checked at the end of each instruction. However, in Data Processor of the present Invention, there are high level instructions where the upper limit of the execution time is not determined (variable length bit field instructions, string instructions and the QSCH instruction). In these instructions, an external interrupt can be accepted during execution of an instruction.

Fixed Vector External Interrupt (FVEI)

This interrupt is set by a hardware signal from off-chip. Each EIT vector is determined for every priority. It is an auto vector interrupt.

Reserved exceptions, illegal exceptions, and violation exceptions are distinguished as follows.

Reserved XXX Exceptions

These exceptions may be removed in future expansions, They may differ depending on the manufacturer's implementation.

Illegal XXX Exceptions

Unlike reserved exceptions, even with future function extension, these exceptions will remain. They are the same regardless of the manufacturer's implementation.

XXX Violation Exceptions

In order to protect rings, the execution is restricted.

Others

Exceptions include such as the OS and system configuration and those over multiple classifications.

A9-2 Operations of EIT

When a processor detects an EIT, EIT processing is performed under the following procedures, where reset interrupt (RI) and system error exception (SEE) are different in operation from the above. The following description is limited to the data processor 32 of the present invention, the data processor 64 of the present invention having possibility to differ in parameters or the like.

(E1) Formation of Vector Number

A processor forms therein the vector number corresponding to its EIT, where for external interrupt (EI), the EIT vector number is obtained from the off-chip, such as a peripheral LSI.

(E2) Read of EITVTE

Figure 345:
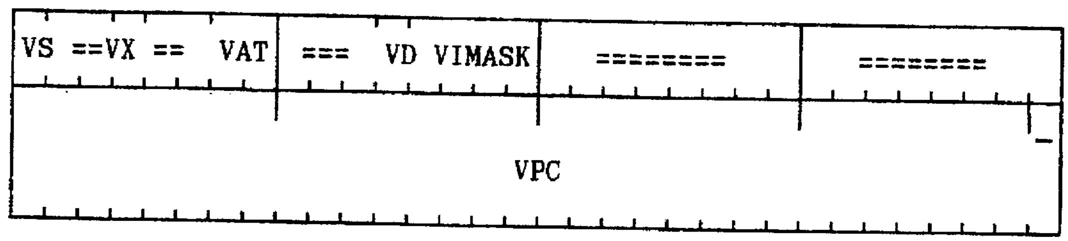
FIG. 345 is a view of the format of EITVTE.

In the data processor of the present invention, a table showing correspondence of the head address of the EIT process handler with the EIT vector number is called the EIT vector table (EITVT), one entry of which is called EITVTE. The EITVTE in the data processor of the present invention consists of 8 bytes in consideration of the degree of freedom and expansion/in the EIT processing. In the EITVTE not only the head address (PC) of the EIT process handler but also partial field of PSW can be set. Hence, EITVTE is of quasi-structure to PC+PSW. Format of EITVTE is as shown in FIG. 345.

---

VS (Vector SM): SM after the EIT processing, where VS is not directly SM after the EIT processing. Details will be discussed below.
VX (Vector XA): XA after the EIT processing, which is now reserved to O at present (negligible when contrary).
VAT (Vector AT): AT after the EIT processing.
VD (Vector DB): DB after EIT processing.
VIMASK (Vector IMASK): IMASK after the EIT processing, where VIMASK is not directly IMASK. Details will be discussed below.
VPC (Vector PC): PC after the EIT processing.
' = ' : reserved to O. (negligible when contrary)
' – ' : reserved to O. (system error exception occurs when contrary)

---

The processor reads EITVTE presented by the physical address of "(EIT Vector Number)×8+EITVTB." The EI vector number formed at (E1).

(E3) Update of PSW

PSW, on the basis of EITVTE, is updated as follows:

[Except for External Interrupt]

min (VS, old SM)==>new SM

Selection of stack pointer. When the stack pointer other than SPI is used prior to EIT generation, a stack pointer (SP0 or SPI) which is used at the EIT process handler is selected by VS. When SPI is already used prior to EIT generation, SPI is used for EIT process handler regardless of VS. Such specification is because of consideration of a case where EIT nests.

Old RNG==>new PRNG

00==>new RNG

EIT process handler is inevitably executed by the ring 0.

EITVTE has unused bits so that it is possible to specify in the future EIT entering into a ring other than the ring 0 in the future.

VX==>New XA

At present, fixed to 0.

VAT==>New AT

During the execution of EIT process handler, the existence of address conversion can be switched.

VD==>New DB

During the execution of EIT process handler, the environment of debug can be changed-over.

min (VIMASK, Old IMASK)==>New IMASK

Even when the exception interrupt or the internal interrupt causes EIT, IMASK can be operated in the EIT processing. Using this function, the external interrupt can be inhibited simultaneously with start of EIT processing. Accordingly, this function is available for a process (for example, transfer of stack frame formed by EIT) which is carried out inseparately from EIT processing.

[External Interrupt]

min (VS, old SM)==>new SM

Old RNG==>New PRNG

00==>New RNG

VX==>New XA

VAT==>New AT

VD==>New DB min (VIMASK, Priority of the generated external interrupt)==>New IMASK Only this portion is different from the case other than the external interrupt.

This function can inhibit multiple interrupts of low priority. In addition, by the function of interrupt mask, the relation of the priority of generated external interrupt <old IMASK should hold.

(E4) Save of Processor Information to Stack

Figure 346:
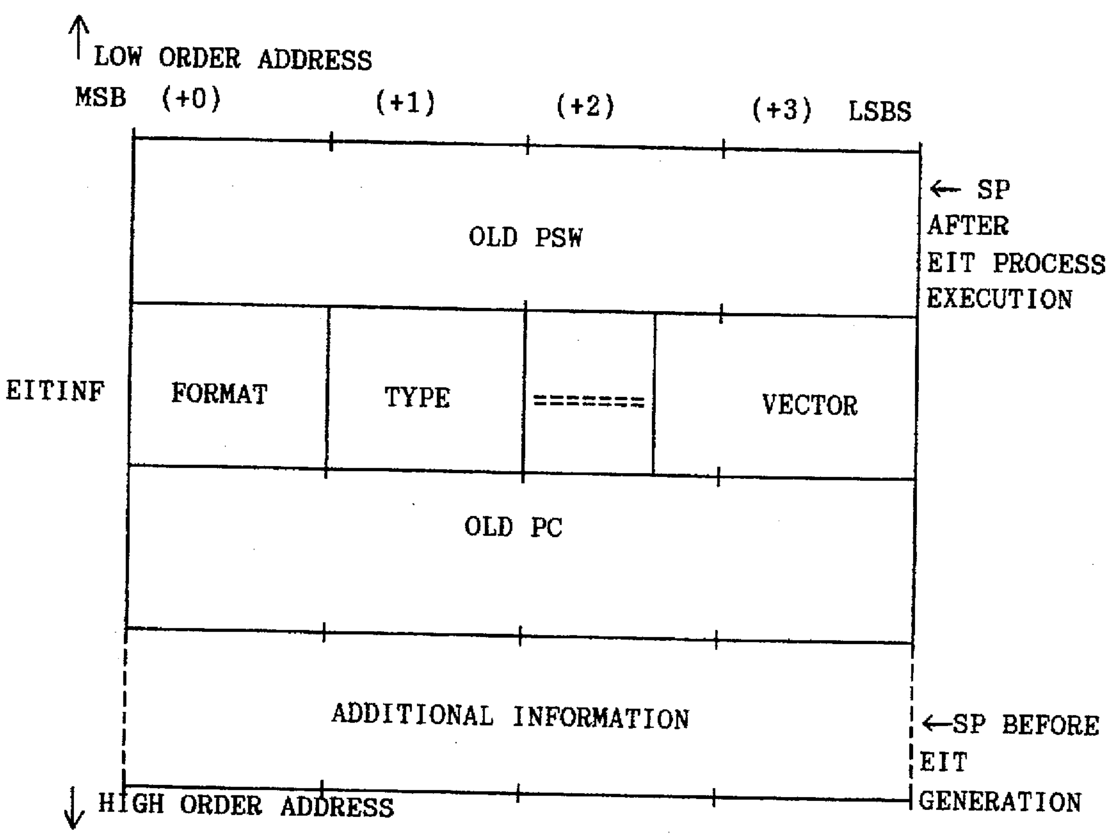
FIG. 346 is an illustration of stack frame.

Old PC, old PSW prior to EIT generation and the various information (including EITNIF—EIT vector and stack format regarding the generated EIT) are saved to the stack. The stack used for the save is selected by new SM and new RNG (=00), the stack frame formed at this time is as shown in FIG. 346.

EITINF charges into 32 bits the information, such as stack frame format (FORMAT), EIT type (TYPE) and EIT vector number (VECTOR) formed by generated EIT. The existence and the contents of the added information are different in the kind of EIT from each other. The REIT instruction is performed using the FORMAT in the EITINF obtaining the information for returning to the instruction sequence prior to EIT.

In addition, the EIT stack frame formed in the data processor 64 of the present invention, is expected to consist of two long words; one long word for old PC, one long word for old PSW and EITINF.

EITINF is placed adjacent to PSW in consideration of maintaining alignment for the data processor 64 of the present invention. The reason for placing PSW at the stack top is that the XA bit saved in the stack is adapted to be readable, even when the data processor 64 of the invention has 32 bit context and 64 bit context mixed with each other in the future.

(E5) Start of EIT Process Handler

Transfer VPC to PC so as to start EIT process handler. If an EIT occurs at the instruction prefetch, the EIT processing is delayed until the instruction to be fetched is required.

On the contrary, REIT instruction at the last of EIT process handler is processed as follows and then retuned to the prior instruction sequence.

(R1) Read from Stack

Old PSW and EITINF are read from the stack. When XA bit in the PSW is 0, the context (task or process) generating EIT consists of 32 bits, whereby old PC is continuously read at 32 bit width from the stack. In addition, the data processor 32 of the present invention has all 32 bit contexts.

Furthermore, the existence of the added information is decided by FORMAT in EITINF, so that when the same exists, it is read from the stack. The added information includes EXPC, IOINF, ERADDR, ERDATA and SPI, the detailed meaning thereof depends on the implementation.

When FORMAT is of a value not supported by the processor (a value not to be generated by EIT), reserved stack format exception (RSFE) occurs.

(R2) PSW Restoration

Using the old PSW read from the stack, all the fields (SMRNG, XA, AT, DB, IMASK, PSW and PSB) of PSW is restored to the prior value of EIT generation, at which time if the old PSW includes the reserved value, the reserved function exception (RFE) occurs.

(R3) Reexecution of Storage Buffer (depending on the implementation)

Reexecution of write cycle caused by the storage buffer generating the former EIT in the REIT instruction may be carried out depending on the values of FORMAT and added information, ERADDR and ERDATA in the added information of the stack are used as the address and data information for execution of write cycle. Refer to item of EIT type description in detail.

In addition, it depends on the implementation of the processor to reexecute the storage buffer.

(R4) Return to Instruction Sequence executed when EIT is detected.

Restore old PC read from the stack to PC and restart the instruction included by PC.

At this time using the TYPE field in EITINF, the EIT type is changed to be next accepted. Such function is utilized for consistently performing the multiple EIT processing and for exactly carrying out single step operation of instruction inclusive of execution by emulation.

In addition, the VECTOR field in EITINF is not particularly used for the REIT instruction. In spite of this, VECTOR is included in EITINF because the information is provided with respect to the program of EIT processing handler.

A9-3 Types of EIT

EIT of the data processor of the present invention is classified paying attention to the position of PC when the execution is restarted after completion of EIT processing and to the priority of EIT processing, the following classification is obtained, which corresponds directly to a value of the TYPE field in EITINF.

[Instruction Interrupt Type EIT (Type=0, PC undefined)]

When the EIT occurs, the EIT is immediately detected to enter into the EIT processing. In the case of this EIT type, returning to the instruction sequence is not possible. RI, SEE correspond to the EIT.

[Instruction Completion Type (Type=1 to 3, PC next Instruction)]

The EIT, when generated, is detected after the instruction processing under execution at that time, and then enters the EIT processing. Generally, REIT instruction is executed at the last of EIT process handler for the EIT, thereby enabling the next instruction to that executed during generation of EIT to start reexecution. In addition, TYPE=1 to 3 is distinguished by the relation of priority, to which TRAP, TRAPA, DBE, DI and DCE correspond.

[Instruction-Reexecution-Type EIT (TYPE=4, PC present instruction)]

In this EIT case, the statuses of the processor and the memory are restored to the prior statuses of the instruction interrupted by the EIT. Generally, REIT instruction is executed at the last of EIT process handler for the EIT, whereby the instruction execution can be restarted from the instruction executed when EIT occurred, to which POE, ATRE, BAE, RIE, RFE, PIVE and IOE correspond.

The instruction-completion-type EIT relates to the instruction previously executed, and the instruction-reexecution-type EIT relates to the instruction under the present execution. Accordingly, when a plurality of EITs are generated simultaneously, the instruction-completion-type EIT must be processed in advance of others. The instruction interrupt type EIT has high priority. When such EIT is detected, it is not reasonable to process other EITs. Hence, when the instruction-interrupt-type-EIT and other EIT are simultaneously generated, the instruction- interrupt-type- EIT must firstly be processed. After all, the priority, when plural EITs are simultaneously generated, is given in instruction interrupt type>instruction completion type>instruction reexecution type, resulting in that TYPE=0 to 4 of EITINF directly indicate the priority of EIT.

The correspondence of the kind of EIT to TYPE is clearly decided as for RI, TRAP, but it depends on the implementation somewhat.

Accordingly, when the factor of EIT is analyzed by software, it is better not to be referred or rewritten the TYPE field.

For example, the page out exception (POE) is the instruction-reexecution-type-EIT, which usually becomes TYPE=4. However, in the processor which implements a store buffer for memory write, when POE occurs at the last write cycle in a instruction (using the store buffer), the instruction need not be reexecuted from the beginning, but the last write-in cycle only is corrected, whereby no conflict occurs in processing. Hence, POE at such case is of instruction-completion-type so that the processing of the last write cycle causing an error may be carried out in REIT instruction. In this case, POE is classified into the TYPE=1 troup. PC stacked by EIT processing is not the PC of the POE occurring instruction but the next instruction.

In the instruction-reexecution-type, when an error occurs during the execution of instruction, it is the principle to restore the state as before instruction execution and start the EIT process (TYPE=4). However, when an error occurs just before completion of instruction, the instruction is assumed to be once completed to start EIT of TYPE=1 and the remaining processing (write cycle of storage buffer) depends on REIT instruction, such implementation being possible. If such method is utilized, TYPE in POE includes two of 1 and 4. In this case, since the processing necessary for REIT instruction depends on the TYPE, the REIT instruction should correspond to the EIT type.

For this method, the data processor does not reexecute the instruction entirely with respect to the EIT caused by the error occurring at the last write cycle of the instruction, but reexecutes the last write cycle only. In this case, ERADDR or ERDATA saved in the stack as the EIT added information corresponds to the internal information saved for executing the instruction continuously.

A9-4 Stack Format of EIT

When an EIT is detected, the information for the EIT process is saved in the stack. The stack format is shown in FIG. 347.

"Other information" depends on the stack format of each EIT. It includes the information which is used to analyze the cause of EIT and which is restored from the EIT handler. The stack format correspondence is as shown in FIG. 348.

PC: Start address of the instruction to be executed after exiting from EIT by the REIT instruction.

EXPC: PC of the instruction which is executed when an EIT is detected. If a debug exception relating to the PC breakpoint occurs, the PC value of the instruction just preceding the instruction whose PC value is the same as the breakpoint to be executed.

IOINF: Information relating to I/O

Error Addr: Address of the bus cycle which causes an EIT to occur.

Error Data: Bus cycle data which causes an EIT to occur (only write).

SPI: SPI value if an EIT is detected

Format No.0: Reserved instruction exception, reserved function exception, reserved stack format exception, ring transition violation exception, odd address jump exception, <<L1>> function exception, co-processor instruction exception, fixed vector external interrupt, delayed interrupt exception, external interrupt Format No.1: Bus access exception, address translation exception Format No.2: Debug exception, privileged instruction violation exception, zero divide exception, illegal operand exception, conditional trap instruction, trap instruction Format No.3: All DBG EIT's EXPC is introduced for the following purposes:

Provision of error analysis information

When EIT of TYPE=1 occurs during the write-in of storage buffer, EXPC specifies the instruction carrying out the write-in, PC having proceeded ahead.

In debug exception, PC specifies the next instruction, EXPC specifies the former instruction. Accordingly, for example, when the debug exception is adapted to start during the execution of jump instruction, a value of PC before the jump can be obtained by EXPC and that after the jump by PC.

Multiple EIT Processing

In the case of EIT, such as TRAPA of TYPE=1, the information of EXPC is not required in the process handler. However, when EIT (such as TRAPA) of TYPE=1 and EIT(such as debug exception) of TYPE=2 occur simultaneously, in EIT of TYPE=1, EXPC used at TYPE=2 must be saved. For this purpose, EXPC is saved even in TRAPA.

In this case, EXPC after execution of REIT instruction with respect to TRAPA processing does not specify the start address of REIT instruciton, but must specify the restored value of old EXPC popped up from the stack. In other words, when the pending debug exception starts just after starting the REIT instruction, EXPC saved to the stack does not specify the PC of REIT instruction but must specify the PC of TRAPA instruction (this example assumes that the debug exception is masked by EITVTE of TRAPA).

Also, structure of IOINF is as shown in FIG. 349.

---

=: reserved to '0'.
W1: indication of write retry at REIT instruction
This bit is available for EIT of memory access series (TYPE=1)

W1=0 write retry necessary
W1=1 write retry unnecessary

MEL: the state where address translation exception occurs

| | |
|---|---|
| 0000 | no error |
| 0001 | error regarding access right |
| 0010 | to 1110 (reserved) |
| 1111 | access error regarding I/O region |

MEC: error code of error related to memory access

| | |
|---|---|
| 0000 | no error |
| 0001 | unused region reference error |
| 0010 | (reserved) |
| 0011 | (reserved) |
| 0100 | ring protection violation error regarding read |
| 0101 | ring protection violation error regarding write |
| 0110 | ring protection violation error regarding execution |
| 0111 | (reserved) |
| 1000 | unable bus access when read |
| 1001 | unable bus access when writing |
| 1010 | (reserved) |
| 1011 | (reserved) |
| 1100 | (reserved) |
| 1101 | memory indirect addressing in I/O region |
| 1110 | instruction execution in I/O region |
| 1111 | read access across I/O region and other regions |

-continued

| | |
|---|---|
| | write across I/O region and other region |
| RW: | bus cycle type |
| | RW=0 write |
| | RW=1 read |
| BL: | bus lock condition |
| | BL=0 not under bus locking |
| | BL=1 under bus locking |
| PA: | space specification |
| | PA=0 (reserved) . . . logical space (address conversion) |
| | PA=1 physical space (non address conversion) |
| AT: | access type of bus cycle in which EIT occurs |
| | AT=000 Data |
| | AT=001 Program |
| | AT=010 Interrupt vector fetch |
| | AT=011 to 111 (reserved) |
| SIZ: | Data size when write retry is carried out |
| | 0000 (reserved) |
| | 0001 1 byte |
| | 0010 2 bytes |
| | 0011 3 bytes |
| | 0100 4 bytes |
| | 0101 to 1111 (reserved) |

Figure 350D:
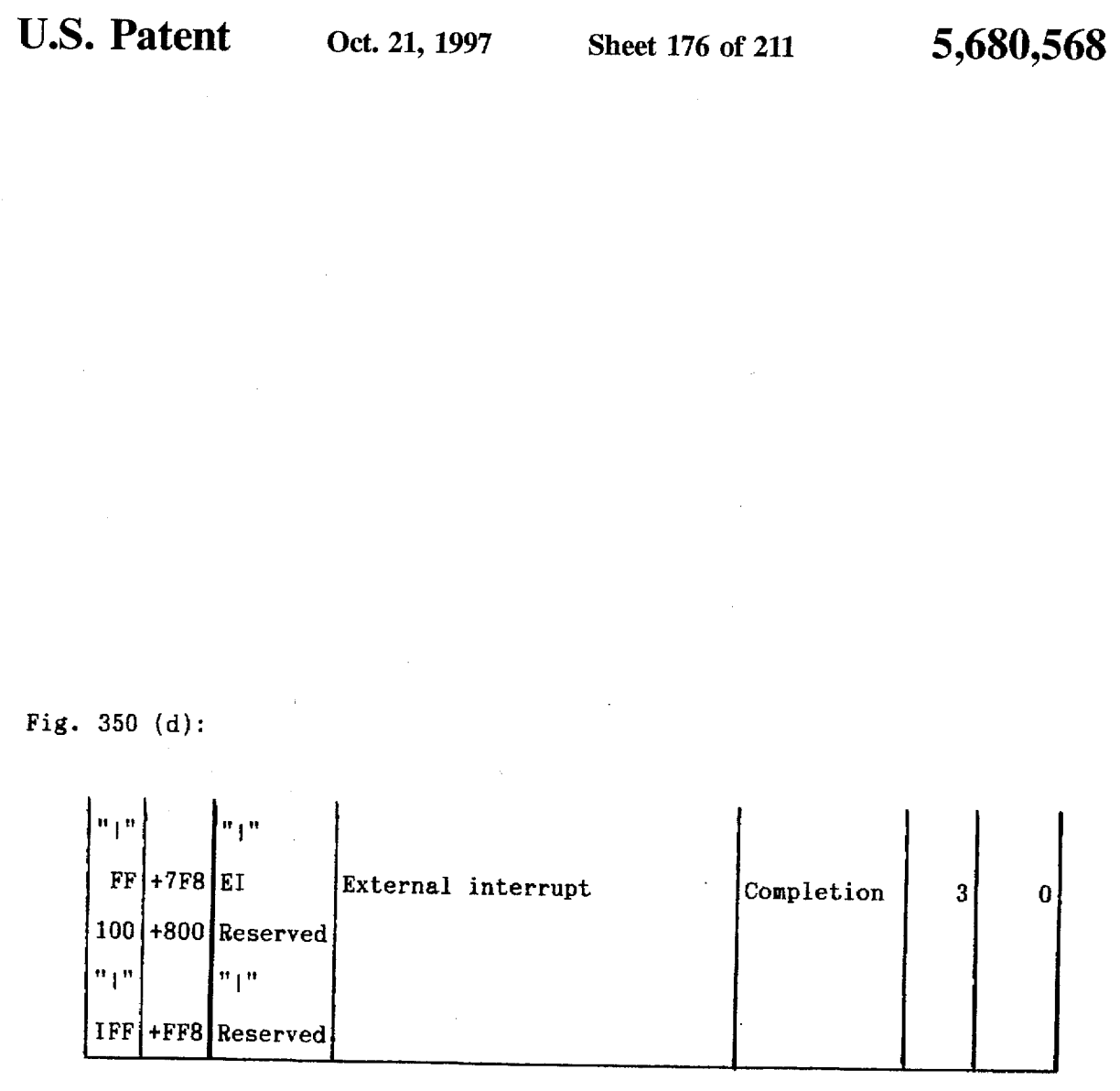

A9-5. EIT Vector Table of the Data Processor of the Present Invention: refer to FIG. 350.

Entry of EIT table regarding the reset interrupt and EIT (No. 0 to 5) of DBG mode comprises an SPI value and a PC value. Entry of EIT table regarding other EITs comprises a PSW value and the PC value.

An initial value of EITVB is 'FFFFF000' at the reset state, whereby the reset interrupt fetches entries (SPI, PC) from physical address 'FFFFF000'.

A9-6. Error during EIT processing

When a serious error such that another EIT occurs during the EIT processing (from the occurrence of EIT to the setting of new PSW through save in condition), system error exception (SEE) is provided. Bus access exception accompanied by EITVTE, old PC, page absence exception of stack accompanied by save of old PSW, and address translation exception have possibility of being system error exception (SEE). Also, when LSB of a word including VPC of EITVTE is '1', the system error exception is provided.

The system error exception (SEE) occurs regardless of the use of stack of either of SPI and SP0. When the page out exception occurs at the stacks SP0, the EIT processing does not continue by changing over to the stack SPI or the stack specified by EITVTE of the page absence exception.

Meanwhile, since ring transition by JRNG is not EIT, when the page out exception occurs during the JRNG processing, the stack specified by EITVTE of page out exception is used to carry out the EIT processing of page out exception. At this point, it is necessary to take care because TRAPA included in EIT processing and JRNG not included therein are different by one level in the step to be a system error (refer to FIG. 351).

Anyway, it is necessary for OS programming to assign the stack region specified by SPI to the permanent region in the memory and also the stack region specified by SP0 except for the particular use too.

A9-7. Multiple EIT

Detection of EIT and processing with respect to thereto, except for EIT of TYP=0, are carried out at the end of each instruction. Accordingly, there is possibility of simultaneously detecting a plurality of EITs at the end of instruction in certain cases, which is called the multiple EIT. Herein, the multiple EIT processing order will be described.

Figure 352:
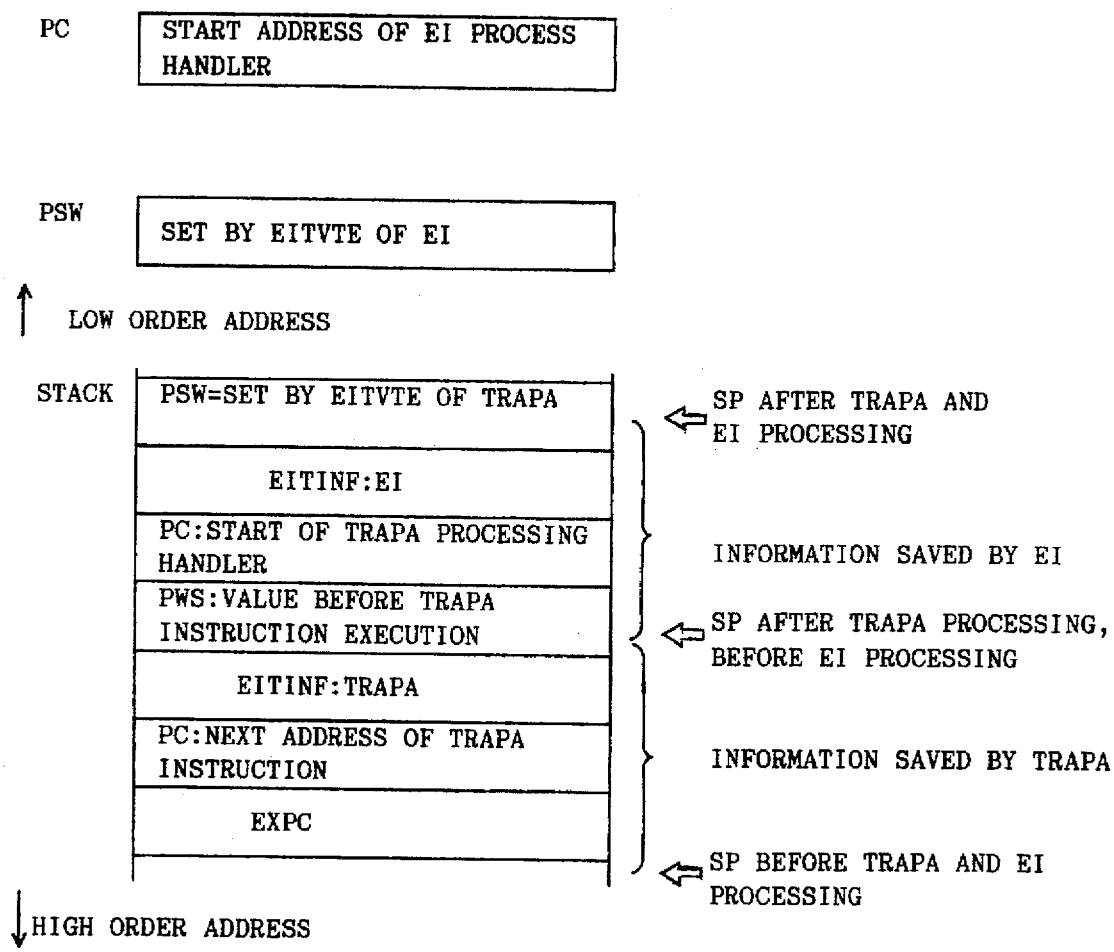

For example, in the case where TRAPA of TYP=0 and external interrupt (EI) of TYP=3 simultaneously occur, at first, EIT processing is carried out with respect to TRAPA and the EIT processing continues with respect to EI. As a result, stack PC, PSW and stack are as shown in FIG. 352.

Hence, in this example, after the end of EIT processing, at first EI process handler is executed. After end of EI process handler, the REIT instruction placed at the last thereof, the step transfers to the TRAPA processing handler at a lower level. In other words, the TRAPA process handler of higher priority is deferred.

However, since EIT processing of TRAPA precedes in the above example, PSW is changeable to mask EI. In other words, when EITVTE of TRAPA specifies VIMASK<EI Priority, IMASK is changed in the EIT processing TRAPA, thereby not performing the EIT processing with respect to EI. In this case, the TRAPA process handler is executed. When IMASK is restored to the original value by the last REIT instruction of the handler, the EI masked is started.

Thus, EI masked by up-date of PSW during the EIT processing of high priority (of small number TYPE) comprises TYP=2 to 3 of EIT, such as, DBE, EI, DI, and DCE. On the contrary, EIT capable of being masked (EIT capable of holding processing demand) is of TYP=2 to 3 of low priority.

On the contrary, for TRAPA, the register and for holding request of EIT processing are not at all prepared. Since PC proceeds to the next instruction, TRAPA instruction cannot be reexecuted. Hence, unless the EIT processing is performed just after execution of TRAPA instruction, the request for EIT processing is lost. For the purpose of preventing this, TRAPA is TYP=1 of high priority.

The EIT of TYP=4 is for reexecuting the instruction so that when the same instruction is once more executed after completion of processing with respect to other EIT, the same EIT again occurs, whereby EIT of instruction-execution-type (TYP=4) is of the lowest priority. Accordingly, for the multiple EIT, EIT of TYP=4 need not be performed. The request of starting EIT of TYP=4 is canceled by detection of TYP=1 to 3 simultaneously occurring.

The above is different from EIT accepted just after REIT instruction execution. The REIT instruction adjusts EIT accepted just after completion of REIT instruction by TYPE of EITINF hopped from the stacks. The TYPE of EIT accepted after REIT instruction execution is as shown in FIG. 353.

Among the above, TYPE=2 is debug exception (DBE). It is meant that the debug exception is not accepted just after completion of REIT instruction execution during the EIT processing with respect to the debug exception. It is for single step execution every 1 instruction that treatment of debug exception of TYPE=2 is different as to whether or not the debug exception is just after REIT instruction execution. In this case, if the debug execution again occurs just after REIT instruction with respect to the debug exception, the debugged program is not at all promoted of execution resulting in that the debug exception only continuously occurs. Accordingly, the above-mentioned mechanism is adapted not to create the debugging exception just after REIT instruction, but to create the same after one instruction execution.

Generally, it is necessary for single step execution to have two internal conditions of executing the next instruction or starting the debugging exception. The data processor of the present invention is considered to represent the two conditions by combination of the internal condition as to whether or not it is just after REIT instruction execution with TYPE of EIT.

In addition, the single step execution on the basis of such consideration is applicable to the occurrence of other EIT simultaneously with the occurrence of debug exception.

When the EIT process handler of reserved instruction exception (RIE) carries out instruction emulation, differently from the process handler with respect to other EIT (such as page out), the debug exception should start before and behind the RIE process handler. For example, when usual instruction →debug exception→page out exception is after the single step execution, it is necessary to nextly execute the usual instruction, but when usual instruction →debug exception→reserved instruction exception (emulation), nextly the debug exception starts.

The reason for this is that while the debugger or debug objective program does not at all view the page out exception, the emulation exception must be viewed as "execution of one instruction" for the debugger objective program.

For the data processor of the present invention, TYPE of EITINF is adjusted in the EIT process handler of reserved instruction exception so as to enable the aforesaid operation.

A9-8 DI of "Data Processor of the Invention"

A9-8-1 DI Operation

DI (delayed interrupt) of the data processor an EIT occurring when the DI field in the DI register is of smaller value than that of IMASK field in PSW. Such function is effective when the asynchronous matter independent of the context is made pending so as to register the processing request only or when the process order is serialized.

The EIT vector for DI processing is prepared of 15 kinds every interrupt priority. The relation between the IMASK value and the external interrupt allowable when the flag variation occurs is as shown in FIG. 354.

It is necessary when IMASK is larger or DI is smaller to check whether or not DI is started. Accordingly, the following instructions correspond to the above:

| | | |
|---|---|---|
| LDC src, @ psw | ; | psw is address of PSW in the control space. |
| LDC src, @ imask | ; | imask is address of imask in the control space. |
| LDC src, @ di | ; | di is address of DI in the control space |
| REIT | | |
| WAIT | | |

Among the above, for other than LDC src, @di, a value of DI field prior to execution of these instructions becomes the level of started DI (priority). The DI level affects the vector member of EIT started as DI. Also, when LDC src, @di starts DI, the DI level to be started is not the DI field value prior to LDC execution but the DI field value (src) newly set by LDC.

In addition, IMASK may change even when EIT has started (entirely including external interrupt, exception and TRAP), in which DI is not started because the IMASK value does not increase.

When DI is started, DI field is reset to 1111 (non request). Also, the IMASK field changes similarly to the occurrence of external interrupt to treat the accepted DI level as priority.

In brief, min (VIMASK, accepted DI level)==>new IMASK, is obtained.

A9-8-2 Example of Using DI

[Example; delayed dispatch of the Data Processor of the present invention]

The data Processor of the present invention, when the system call issued from the external interrupt process handler changes the state of ready queue, delays until the following dispatching (such as replacement of the register or the like) returns from the interrupt process handler, which is for avoiding conflict accompanied by the multiple interruption. Such delay is realized by D1 function.

Prerequisite

System call specified VIMASK=14 at EITVIE of TRAPA, which is for carrying out the last dispatching of system call processing by the D1 function.

The portion for processing dispatching is started by DI14.

'|' represents the state under execution and '¦' the state of intermitting execution.

General System Call Processing

Figure 355:
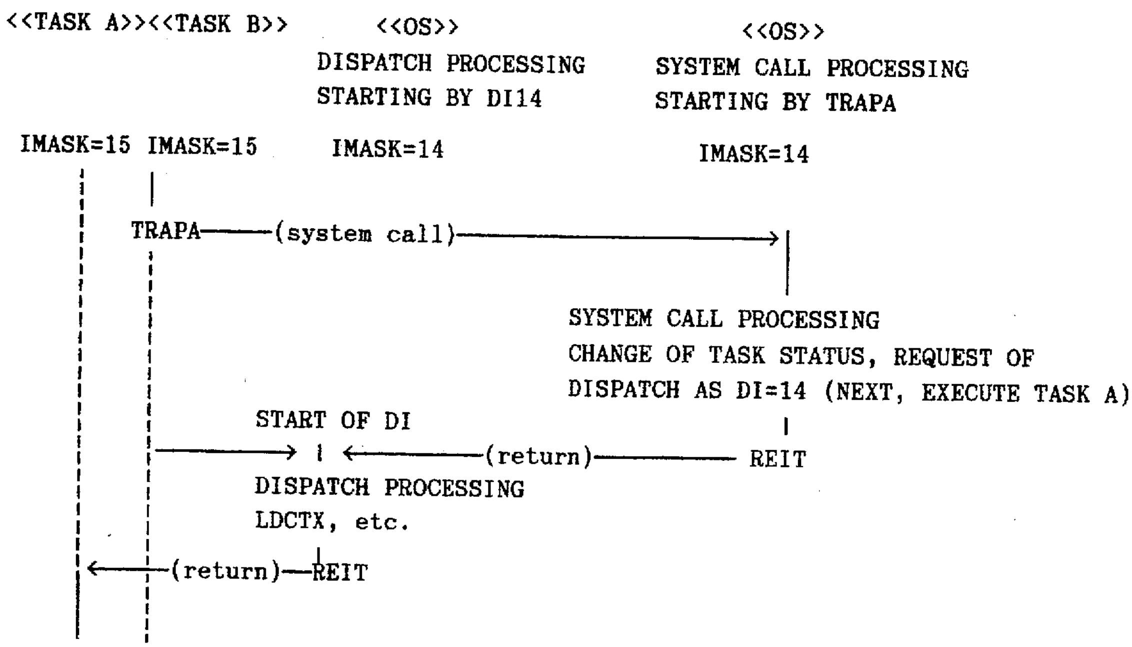
FIGS. 355 and 356 are illustrations of system call.

This is shown in FIG. 355.

System Call from External Interrupt Handler

Figure 356:
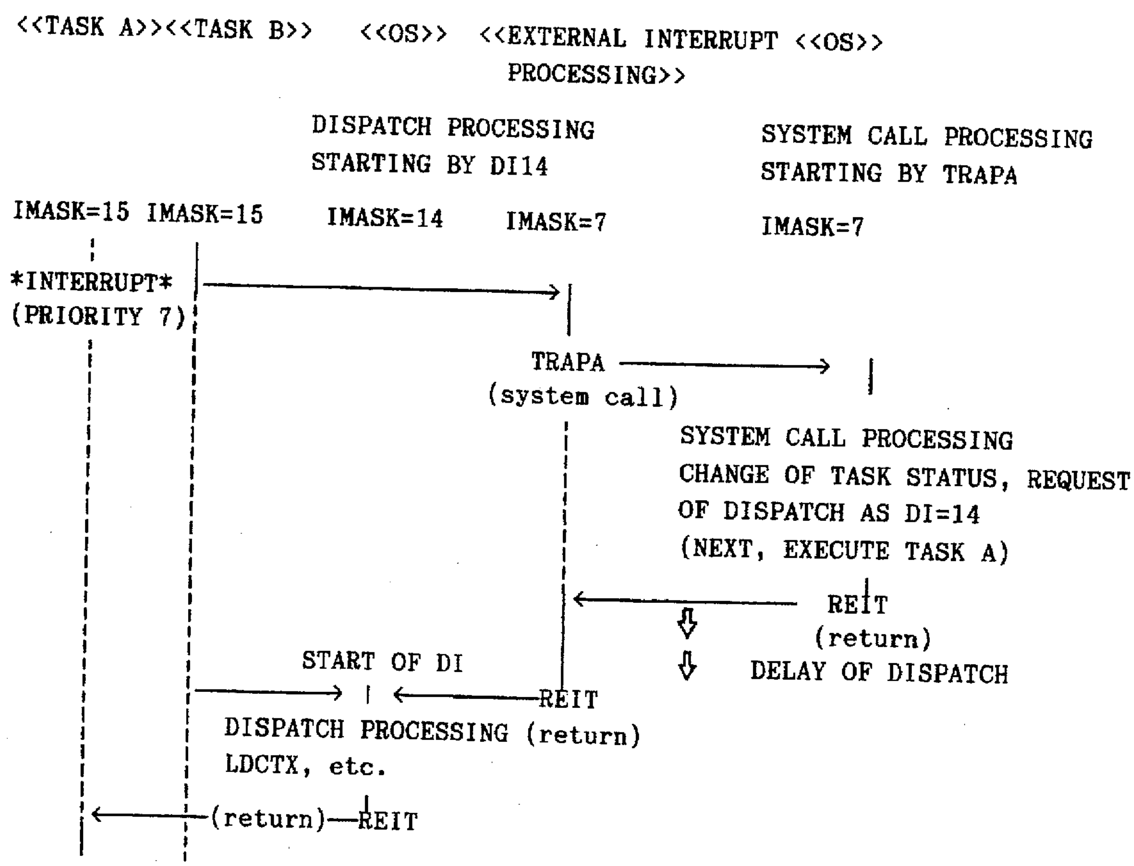

This is shown in FIG. 356.

If D1 function is used, the delayed dispatch processing can readily be realized, and can easily cope with the occurrence of the multiple interrupt or the nest of system call.

A9-9 DCE of Data Processor of the Present Invention

A9-9-1 Operation of DCE

DCE (Delayed Context Exception ) is an EIT occurring when smaller in a value than the DCE field in the DCE register (or CSW register). This function is effective when the processing of asynchronous matter (completion of input output or the like) regarding the context is made pending so as to register the processing request only, or when the process order is serialized.

DCE field in DCE register (or CSW register) is the field for accepting the DCE request.

Since the DCE register (or CSW register) is an inherent register every context, it is possible to give separate DCE request to each context. Since DCE follows each context, DCE is not started during the processing of external interrupt independent from the context.

Also, even when DCE of higher priority is requested by other context A, unless dispatched by the context A, DCE of context A is not started. Even if the DCE request from another context B is lower in priority than the above, DCE of context B is firstly started.

The relation between the value of DCE field and DCE started at that time is as shown in FIG. 357.

In every case, DCE is started if SMRNG>DCE.

When (reserved) is specified, it actually acts as the same as DCE=000, where the programming utilizing this function should not be performed for the future extension.

When SMRNG is larger or the value of DCE field is smaller, there is possibility to start DCE. Accordingly, for the following instruction corresponding to the above condition, it is necessary to check whether or not DCE starts.

| |
|---|
| LDC src @ psw; psw is address of PSW in the control space. |
| LDC src @ smrng; smrng is address of SMRNG in the control space. |
| LDC src @ csw; csw is address of CSW in the control space, where CSW may not be provided. |
| REIT |
| RRNG |

In addition, when EIT starts (including all the external interrupt, exception and TRAP) and JRNG is executed, SMRNG may change, but for EIT or JRNG, the value of SMRNG does not increase, whereby DCE is not started.

DCE is started as one EIT processing. When EIT of DCE is started, DCE field is reset to 111 (no request). The SMRNG field, as the same as general EIT processing, changes following EITVTE allotted to the vector number of DCE. Since DCE is processed every context, the started EIT process handler usually uses not SPI but SP0. It is possible to enter SM=0 (using SPI) at DCE processing due to setting of EITVTE, which is disposed as the problem on equipment operation and hardware is not particularly checked. When DCE is started by the REIT instruction or the RRNG instruction, the actual processing to start DCE may be performed simultaneously with REIT or RRNG, but in specification of operation, EIT is adapted to start after REIT or RRNG is once executed. For example, when DCE=110, RRNG returns from ring 1 to ring 3, then DCE is started to enter ring 0, at which time RRNG must be ring 3 but not ring 1. DCE is compared with DI or external interruption as shown in FIG. 358.

In the case where the input-output is informed of completion, the flow of starting the corresponding context DCE in the external interrupt processing routine may be caused.

It is not impossible to simulate DCE by software, but since generally PSW or PC saved on the stack must be changed, the simulation is fairly troublesome, because the interrupting program must be informed of all the stack format of the interrupted program.

A9-9-2 Nest of DCE

DCE, if the multiple nest is formed, is more effective. Hence, when a plurality of DCE requests occur, it is problematical how they are processed.

The data processor of the present invention is intended to process the nest by software.

```
    <<plural DCE request queuing processing example>>
[when setting DCE request]
    if (DCE=111), then
    new DCE request ==> DCE field
    /* when DCE request only   /*
    else,
    newly created DCE request enters into DCE request queue
constituted in the order of rings.
    endif
[when processing DCE]
    /* when DCE starts, 111==> DCE is obtained by
        hardware.
    if (DCE request queue is not empty), then the next
entry of DCE request queue is set to the DCE field.
    endif
```

A9-9-3 DCE Using Example

[Example: start of input-output management program]

Figure 359:
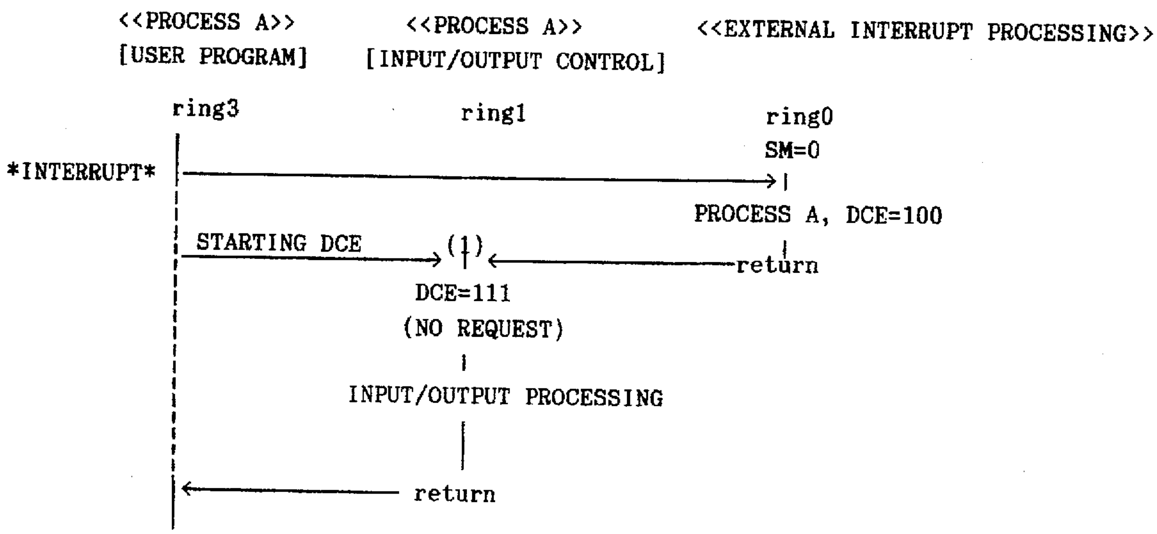
FIG. 359 is an illustration of an example of the use of DCE, FIGS. 360(*a*)–360(*o*) are a view of bit allocation, FIGS. 361(*a*)–360(*e*) show an index of operand field names.

The input-output completion is informed by external interrupt so that the input-output management unit (ring 1) is to be started asychronously with respect to the process A (refer to FIG. 359). '|' represents condition during the execution, and '¦' represents condition of intermitting the execution.

Starting address of (1) is to be specified every process (context), but actually the EIT processing vector at DCE in common to the processes, whereby it is necessary that DCE request table every process is analyzed by OS and jumps thereto.

In this drawing, when the external interrupt occurs, the process A happens to be executed. When the external interrupt of input-output occurs during the execution of other processes, the start of input-output management unit at the ring 1 is delayed until dispatch to the process A is carried out.

Appendix 10 Instruction Bit Pattern of Data Processor of the Invention

[Cautions Regarding Notation]

The notation of the instruction bit pattern is as follows:

'–': reserved to 0 (exception occurs when contrary)

'+': reserved to 1 (exception occurs when contrary)

If the bit is 0(1), the processing is normal and if it is 1(0), the reserved instruction exception (RIE) occurs.

'=': reserved to 0 (negligible when contrary) '*' at Ver 0.87.

'#': reserved to 1 (negligible when contrary)

In the user's manual it is written clearly to keep the bit 0(1) for the furture expansion, where actually the operation is the same even when the bit is 0(1) or 1(0).

The "negligible when contrary" is not so preferable for the architecture, which may be inevitable for the instruction bit pattern allocation, future expansibility and high speed execution of the instruction.

'~': reserved to 0 (operation is not guaranteed when contrary)

'1': reserved to 1 (operation is not guaranteed when contrary)

In the user's manual, it is written clearly to keep the bit 0(1) for future expansion. The operation is normal when the bit is 0(1), but if the bit is 1(0), the operation is depend on the implementation.

The "operation is not guaranteed when contrary"0 is not so preferable for the architecture, which may be inevitable for the implementation, instruction bit pattern allocation and high speed execution of instruction. For example, a first halfword "!R" at LDATE and MULX corresponds thereto.

A10-1 Bit Allocation to Every Instruction Format

[Caution regarding Bit Allocation]

The data processor of the present invention is fairly different in addressing mode from each instruction, which should be checked. The bit pattern is allocated for easily distinguishing the allowable addressing mode in order to facilitate the check. An operand inhibitting the particular addressing mode is adapted to be clarified in principle only by a halfword including the operand.

P-bit is separately placed in one-by-one every operand (except for the register direct specification and immediate specification) and as to the implied stack reference, which is represented by 'P' or 'Q' in the instruction pattern.

However, when covered by the general instructiion, the P-bit may not be placed in the instruction pattern at the abbreviation of the same instruction (only PUSH, POP and PUSHA do not have a P-bit for the stack reference).

The instruction bit pattern freely usable by each maker is shown by LVreserved, which can be utilized as the instruction not released to the user for making an interface with, for example, ICE.

The bit patterns are shown in FIG. 360.

A10-2 Regarding Detection of Reserved Instruction Exception

The patterns shown by RIE in FIG. 360 are the reserved bit pattern for future expansion. When the instruction bit pattern shown by RIE is executed, a reserved instruction exception occurs. Beside this, when the not-implemented option and size (inclusive of not-provided <<L2>>) are specified, an undefined option is specified, the '–' portion in the instruction bit pattern is made '1', the '+' portion in the instruction bit pattern is made '0', the 'P' and 'Q' bits in the instructiion are made '1', and the reserved condition (cccc) and termination condition (eeee) are specified, all the reserved instruction exceptions (RIE) occur. At present, except for exceptions LDATE and MULX or the like, all the instruction patterns are checked in principle as to the first to forth bytes, so that the pattern, when different, is treated as RIE. The fifth and sixth bytes are not checked so that the pattern, even if different, is not treated as an error.

If the first HW includes a general addressing mode and, RIE is to be detected at second HW, the second HW is placed after the extension of Ea of the first HW. This bit pattern is indicated by {RIE-X}. Regarding the patterns expected to be provided with the future function expansion and the patterns which may be different in operation from other makers' chips, an exception detection should be especially carried out.

The reason to prevent the error occurrence when such an instruction pattern is executed. Considering the above purpose, the priority of checking for the reserved instruction exception (RIE) is as follows:

↑ High priority (The meaning is already decided)

Specifying the not-implemented <<L2>> function.

Specifying the 64 bit size (PR, MM, WW, SS=11) (The possibility to be utilized for instruction expansion is high).

Specifying the instruction pattern represented as RIE.

'+' of '+X' in BVPAT to BVSCH.

'–' of the second HW at the group of PSTLB to EXITD:G.

Specifying P-bit.

(Almost not-utilized for instruction expansion)

'!' of the first HW'!R" at the group of LDATE to INDEX.

'+' of the second HW'+W' at the group of STATE to QINS.

'+' of the first HW'+X' at the group of PSTLB to EXITD:G.

'–' of the second HW in ACB;R, SCB:R.

↓ Low priority

The bit pattern to be checked is as described in the aforesaid specification. However, in the future the detailed specification related to detection of the reserved instruction exception is adjusted on the basis of the above purpose so that the specification may be subject to change.

In addition, it is not particularly ruled to start EIT when the instruction is read to a certain extent. Hence, even when only the first HW is apparent to start EIT, the instruction may be read up to the second HW. Also, when EIT is seen to start only by an ope-code portion (the reserved instruction exception), it is allowable to process up to the Ea extension portion.

A10-3 Index of Operand Field Name: shown in FIG. 361.

A10-4 Bit Allocation of Addressing Mode

| | | |
|---|---|---|
| Common Bit Pattern | | |
| Regarding the size | | |
| 01: 16 bits | | |
| 10: 32 bits | | |
| 11: 64 bits | | |
| Addressing Mode | | |
| 00: @reg+ or the like | | |
| 01: 16 bit relative indirect mode | | |
| 10: 32 bit relative indirect mode | | |
| 11: additional mode | | |
| Register Specification | | |
| 00 (particular) | | |
| 01 (SP) | | |
| 10 abs or 0 | | |
| 11 PC | | |
| Additional Mode | | |
| EI<RX>MS | PXXD<d4> | |
| | '-' is a bit reserved to 0. | |
| **<RN>0* | ******** | Rn is index. |
| **---01* | *--***** | absence of index. |
| **---11* | *--***** | PC is index. Scaling by XX ≠ 00 is not available. |
| ******** | ***0<d4>: | 4 bit displacement |
| ******** | ***1--01: | 1 bit displacement |
| ******** | ***1--10: | 32 bit displacement |
| **** *** | ***1--11: | 64 bit displacement |

The size specifying portion of <d4> and specifying portion of disp:16, disp:32 of MISC mode are positioned at the same bit.

| Basic Mode | | | |
|---|---|---|---|
| P000 | xxxx | MISC | P=0:SH |
| | 0000 | {RIE} | |
| | 0001 | {RIE} | |
| | 0010 | {RIE} | |
| | 0011 | {RIE} –@ads:64 | |
| | 0100 | @SP+(read:@SP+, write:illegal, rmw:illegal) | |
| | 0101: | @–SP(read:illegal, write:@–SP, rmw:illegal) | |
| | 0110 | :{RIE} | |
| | 0111 | :{RIE} | |
| | 1000 | :{RIE} | |
| | 1001 | :@ads:16 | |
| | 1010 | :@ads:32 | |
| | 1011 | :absolute additional mode | |
| | 1100 | :Imm(read @PC+, write:illegal, rmw:illegal) | |
| | 1101 | :@(disp:16, PC) | |
| | 1110 | : @(disp: 32, PC) | |
| | 1111 | : PC relative additional mode | |
| 0001 | <Rn> | :Rn | Sh |
| 1001 | xxxx | {RIE} | |
| P010 | <Rn> | @(disp:16, Rn) | P=0:Sh |
| P011 | <Rn> | @Rn | P=0:Sh |
| P100 | <Rn> | @(disp:32, Rn) | |
| P101 | <d4> | @(disp:4, FP) <<L2>> | |
| P110 | <Rn> | Register relative additiional mode | |
| P111 | <d4> | @(disp:4, SP) <<L2>> | |

For *1** pattern, the extension portion is not attached.

When the undefined addressing mode is specified (including P-bit=1 in EA), the reserved instruction exception (RIE) occurs. Concretely, RIE is provided in the case of following patterns:

| [Ea] | | [Sh] |
|---|---|---|
| 0000 | 00** | 00 00** |
| 0000 | 011* | 00 011* |
| 0000 | 1000 | 00 1000 |
| 0101 | **** (only when <<L2>> is not provided) | |
| 0111 | **** (only when <<L2>> is not provided) | |
| 1*** | **** | |

Even if the reserved pattern is specified in the additional mode, the reserved instruction exception (RIE) occurs. RIE also occurs in the following cases; <Rn>≠0000,0001 at M=1; other than <d4>≠0001,0010 at D=1; P=1; and XX=11.

At a level in the additional mode, if the scaling other than X2, X4 and X8 is specified, an indefinite value is placed as a temporary value depending on the implementation after the processing at that level. EIT is not provided. Also, when a <<2>> instruction is not implemented and the additional mode of five levels or more is specified, the reserved instruction exception (RIE) occurs. (under adjustment in detail, and the reserved function exception may be provided). If an unreasonable combination of addressing mode is specified (such as, JMP #imm-data, CMP#, #1), the reserved instruction exception (RIE) is provided. The case where combination of addressing mode not-executable due to the unprovided <<L2>> instruction is specified, is included in the above (a bit field instruction for specifying the register is applicable thereto).

A-10-5 Bit Allocation of Instruction Option

In any case, the initial value (an option value of 0, 00 . . . ) provides the default at the assembler.

cccc: Condition specification at Bcc, TRAP/cc,
eeee: Termination condition specification at the string instruction and QSCH instruction,
p, q..: P-bit specification (Q.. when necessary operands indicates plural operands for P bit)
b: /F=0, /B=1 (BSCH, BVSCH, BVMAP, BVCPY, SCMP, SMOV, QSCH),
r: /IF=0, /R=1 (SSCH),
c: /IN=0, /S=1 (CHK)-CHK, 'c' of change index value,
d: /0=0, /1=1 (BSCH, BVSCH)- 'd' of data,
m: /NM=0, /MR=1 (QSCH)- 'm' of mark,
p: /AS=0, /SS=1 (PTLB, PSTLB, LDATE) -PTLB, 'p' of specific space,
Att: /PT=000, /ST=001, /AT=110, {RIE}=010 to 101, 111 (PSTLB, LDATE, STATE),
xx: /LS=00, /CS=01, {RIE}=10,11(LDCTX, STCTX).

A10-6 Condition Specification (cccc) for Bcc and TRAP/cc Instructions

The allocation of cccc value is shown in FIG. 362.

A10-7 Termination Condition Specification (eeee)

The allocation of the eeee value is shown in FIG. 363.

In the <<L2>> termination conditions which have two conditions coupled with .or., M_flag is used to indicate either one termination condition. The M_flag is set when the condition ends in comparison with R4, which is concretely shown in FIG. 364.

When the condition of M_flag=1 is not satisfied and the termination condition other than the above ends, M-flag=0 is obtained. If the termination condition of <<L2>> is not implemented, M-flag=0 is always obtained.

A10-8 Operation Code of BVMAP Instruction

This is an operation code to be placed in the low order 4-bits at R5, which is shown in FIG. 365.

A10-9 Addressing Mode Correspondence

Correspondence of the operand at each instruction with the inhibited addressing mode is shown in FIG. 366. For combination of mark O, the addressing mode thereof is usable.

For combination of mark X, if it is executed, the reserved instruction exception (RIE) occurs.

Appendix 11 Detail Specification of High Level Instructions and Register Values in End State In the instruction descriptions, the detail of high level instructions, and their register values upon completion, have not been completely described. They are summarized in the following.

A11-1 Convention for Determining Specification of High Level Function Instructions In SMOV/B, SCMP/B, BVMAP/B and BVCPY/V, there are two types of processes: one is the format of pre-decrement in accordance with @-SP, the other is the format of the post-decrement in accordance with SMOV/F and SSCH/R. While the area of H'100 to H'1ff is transferred with SMOV/B.B, if SMOV/B is specified in pre-decrement, the initial value of the register becomes H'200. If SMOV/B is specified in post-decrement, the initial value of the register becomes H'1ff.

[Drawbacks of Post-Decrement]

The symmetry between SMOV/F and SMOV/B and that between SCMP/F and SCMP/B breaks down. For example, if SMOV/B is executed on the string which uses the area up to H'000000ff, while with SMOV/B.B, H'000000ff is set as the initial value of the pointer. With SMOV/B.W, H'000000fc should be set as the initial value of the pointer.

[Drawbacks of Pre-Decrement]

The consistency of search instructions such as SSCH and BSCH breaks down. After the instruction is executed, if the last value of the pointer always points at an element which satisfies the termination condition (the element of the search result) because SSCH is used, the pre-update/post-update cannot be changed based on the process direction of /F, /B and /R. Thus, it is impossible to pre-decrement only /B. (Although SSCH/B does not exist, it is similar to the specification of BSCH/B.)

In the data processor of the present invention, the drawbacks of post-decrement should be thoroughly considered, so that SMOV/B and SCMP/B are specified in the pre-decrement.

There is another problem to be considered. There is some ambiquity as to whether SMOV, SCMP and SSCH termination conditions should end the instruction before or after the pointer is updated.

[Drawbacks of terminating the instruction before the pointer is updated]

If an instruction is terminated based on the element size, the pointer is updated and the instruction is terminated after the pointer points at the next element (in the case of /F, an element which is not processed), so that it does not conform to the specification. In other words, updating the pointer depends on whether the termination condition is satisfied or not. Therefore, the specification becomes complicated and it is difficult to obtain a high speed implementation.

If a search operation is successively performed after another search operation is satisfied, the pointer must be updated before the second search is perform. It also applies to SMOV and SCMP.

[Drawbacks of terminating the instruction after the pointer is updated]

Since the pointer value changes from that of the element which satisfies the termination condition (search condition) after an instruction is executed, this type of specification is not simple for the SSCH instruction. It is also difficult to specify the BVSCH and BSCH instructions.

In the data processor of the present invention, the drawbacks of terminating an instruction before the pointer is updated has been given much consideration. The specification is defined in such a manner that an instruction is terminated after the pointer is updated.

Thus, after the SMOV/F, SCMP/F SSCH/F and SSCH/R instructions are terminated, the pointer points at the element following the element which satisfied the termination condition. Since the pointer is updated in the pre-decrement manner for the SMOV/B and SCMP/B instructions, after an instruction is completed, the pointer points at the element where the termination condition is satisfied.

To match the specifications of BVMAP/B and BVCPY/B with those of SMOV/B and SSCMP/B, the maximum offset+1 in the bit field is specified by R1 and R4.

Since it is convenient for BVSCH and BSCH that the bit offset after the execution of the instruction directly points at the bit to be searched, /F and /B should be specified in the same manner. Since the pointer for QSCH is structured in the pre-update manner, it differs from SSCH and BSCH in the pointer update timing. The search patterns of BSCH/F (BVSCH/F), SSCH/F and QSCH/F are summarized as follows.

BSCH/F Search data starting from where the pointer currently points. After the search operation is completed, the pointer points at the data that was searched.

SSCH/F Search data starting from where the pointer currently points. After the search operation is completed, the pointer points to the data following the searched data.

QSCH/F Search the data following that where the pointer is pointing. After the search operation is completed, the pointer points at the data that was searched.

In a string instruction, the element number R2 is treated as an unsigned number. By considering R2 as an unsigned number and assigning R2=0, the element number is interpreted as H'10000000 to prevent termination. This function can be used for the strcmp function in the C language. In the implementation, by considering R2 as an unsigned number, the determination of termination by the number of elements becomes easy.

On the other hand, the width of the bit field instruction is treated as signed data irrespective of the fixed length bit field instructions and variable length bit field instructions.

When executing a bit field instruction, its width is added to the offset; however, offset is signed data. If the width is unsigned data, a complicated situation such that a signed number is added to an unsigned number takes place. The element size of the string instruction is multiplied and then the result is added to the pointer, unsigned number is proper.

If the width of a variable length bit field instruction is in the range from H'80000000 to H'ffffffff, the execution of an instruction is affected by whether data is signed or unsigned. If the data is signed, the instruction is terminated by setting V_flag. If the data is unsigned, even if the width of the data is within the range, the bit field operation is conducted. However, while the content of width is in the range from H'80000000 to H'ffffffff, if the result of offset+width is treated as singed data, an overflow already occurs. Even if the result of offset+width is treated as unsigned data (33-bit signed data), an overflow occurs depending on the value of offset. Since it is defined so that if the result of offset+width causes an overflow, the operation is not guranteed. Even if the data is treated as unsigned data, the cases where the operation is not assured may increase. If the data is unsigned data and the operation of width>H'80000000 is to be assured, the burden on hardware will increase.

Since string instructions may be terminated by termination conditions, it is possible to prevent them from getting terminated by the element size. To represent infinity (H'10000000) using '0', it is necessary to treat the element size as unsigned data. Since there is no instruction termination element except the width for BVMAP and BVCPV, it is necessary to assign it a meaningful value. In this case, the rule where "the values in the registers are treated as signed numbers" should be applied.

[Summary of Basic Rules for String Instructions and Variable Length Bit Field Instructions]

In search type instructions, the timing for updating the pointer does not depend on the direction where data is searched.

In both /F and /B options of BSCH and BVSCH, after the search operation is completed, the pointer points at the bit which has been found.

After the search operation is completed in both /F and /R options of SSCH, the pointer points at the element following that which is found.

For instructions with the/F option, post-increment is performed; with the /B option, the pre-decrement is performed.

This method applies to SMOV, SCMP, BVMAP and BVCPY. Although SSTR and BVPAT have only the /F option, the same rule applies to them.

In the string instructions, the element size is treated as unsigned data. If it is '0', it represents H'100000000. In the variable length bit field instructions, width is treated as signed data. Only if the content of width is in the range from H'00000001 to H'7ffffff, is an actual bit field operation performed.

A11-2 Detailed Specification of String Instructions

SMOV

The operation of SMOV is summarized as follows. If the final result is the same, it is possible to change the following memory access order (it applieds to other high level instructions). If an incorrect option is used, the operation when option /F is used (if src<dest) and that when option /B is used (if src>dest) can differ as follows.

```
[Operation of SMOV/F]
0 ==> V_flag
repeat
      R2 - 1 ==> R2
      mem[R0] ==> mem[R1] ==> temp
      R0 + size ==> R0
      R1 + size ==> R1
      compare temp with R3, R4 and set F_flag, M_flag
                                                according to eeee
                              /* If the termination condition is
                                    satisfied,F_flag is set to 1. */
      if (F_flag = 1) then exit
      check_interrupt
until (R2 = 0)
1 ==> V_flag
[Operation of SMOV/B]
0 ==> V_flag
repeat
      R2 - 1 ==> R2
      R0 - size ==> R0
      R1 - size ==> R1
      mem[R0] ==> mem[R1] == temp
      compare temp with R3, R4 and set F_flag, M_flag
                                                according to eeee
                              /* If the termination condition is
                                    satisfied,F_flag is set to 1. */
      if (F_flag = 1) then exit
      check_interrupt
until (R2 = 0)
1 ==> V_flag
```

In SMOV, one or more elements are processed regardless of what the initial value of R2 is. The termination factors of SMOV are summarized as follows.

1. Termination by the number of elements (data) (R2) If an instruction is terminated by the number of elements, V_flag is set to '1'. This case and the following case do not occur at the same time.
2. Termination by the termination condition When F_flag is set to 1, the elements where the termination condition is satisfied are also transferred.

SCMP

SCMP may be terminated by mismatched data being compared, in addition to instruction terminations by the number of elements and by the termination condition. If the instruction is terminated by mismatch of two pieces of data in SCMP, as the instruction is terminated by the termination condition, after the pointer is updated, the instruction is terminated.

It is possible to satisfy both the termination condition and the termination factor due to the mismatch of two pieces of data at the same time in SCMP.

If SCMP is terminated by the number of elements, the next element is not compared. On the other hand, if the next element is mismatched or the termination condition is satisfied, the instruction is terminated as V_flag=1, F_flag=0 and Z_flag=1.

If the final result is the same, the memory access order can be changed from the following order, i.e. only the equivalent operation is necessary.

```
[Operation of SCMP/F]
0 ==> V_flag
repeat
      R2 - 1 ==> R2
      mem[R0] ==> temp1
      mem[R1] ==> temp2
      R0 + size ==> R0
      R1 + size ==> R1
      compare temp1 with temp2 and set Z_flag,
                                      L_flag, X_flag
          /* If data is mismatched, Z_flag is set to 0. */
        compare temp1 with R3, R4 and set F_flag,
            M_flag according to eeee
          /* If the termination condition is satisfied,
            F_flag is set to 1. */
        if (F_flag = 1 .or. Z_flag = 0) then exit
            /* The instruction is terminated if the
            termination condition is satisfied or
            data is mismatched.              */
      check_interrupt
until (R2 =0)
1 ==> V_flag
[Operation of SCMP/B]
0 ==> V_flag
repeat
      R2 - 1 ==> R2
      R0 - size ==> R0
      R1 - size ==> R1
      mem[R0] ==> temp1
      mem[R1] ==> temp2
      compare templ with temp2 and set Z_flag,
                                      L_flag, X_flag
          /* If data is mismatched, Z_flag is set to 0. */
        compare temp1 with R3, R4 and set F_flag, M_flag
                                      according to eeee
          /* If the termination condition is satisfied,
                                      F_flag is set to 1. */
        if (F_flag = 1 .or. Z_flag = 0) then exit
          /* The instruction is terminated if the
          termination condition is satisfied or
          data is mismatched.              */
        check_interrupt
until (R2 =0)
1 ==> V_flag
```

The termination factors of SCMP are summarized as follows.

1. Termination by the number of elements (data) (R2) The status flags are set as follows.

Z_flag=1, F_flag=0 and V_flag=1. Cases 2 and 3 can not occur at the same time as this one.

2. Termination by the termination condition

F_flag is set to '1' and V_flag is set to '0'. The elements which satisfy the termination condition are also compared. The result of comparison is sent to Z_flag, L_flag and X_flag. If the result is mismatched, it means that the two termination factors 2 and 3 are satisfied at the same time.

3. Termination by mismatch of elements being compared

The comparison result of mismatched elements is set to Z_flag (=0), L_flag and X_flag. V_flag is set to '0'.

SSCH

If SSCH is terminated by the termination condition (search condition), in both options /F and /R, the pointer points at the element following that where the termination condition is satisfied. If SSCH is terminated by the number of elements, the pointer points at the next element after the instruction is executed.

The operation of SSCH is summarized as follows.

[Operation of SSCH/F]

```
0 ==> V_flag
repeat
      R2 - 1 ==> R2
      mem[R0] ==> temp
      R0 + size ==> R0
      compare temp with R3, R4 and set F_flag, M_flag
                                      according to eeee
          /* If the termination condition is satisfied,
                                      F_flag is set to 1. */
if (F_flag = 1) then exit
          /* The instruction is terminated by the
            termination condition (search condition). */
      check_interrupt
until (R2 = 0)
1 ==> V_flag
[Operation of SSCH/R]
0 ==> V_flag
repeat
      R2 - 1 ==> R2
      mem[R0] ==> temp
      R0 + R5 ==> R0
      compare temp with R3, R4 and set F_flag, M_flag
                                      according to eeee
          /* If the termination condition is satisfied,
                                      F_flag is set to 1. */
      if (F_flag = 1) then exit
          /* The instruction is terminated by the
            termination condition (search condition). */
      check_interrupt
until (R2 = 0)
1 ==> V_flag
```

The termination factors of SSCH are summarized as follows.

1. Termination by the number of elements (data) (R2) V_flag is set to '1'. The cases 1 and 2 do not occur at the same time.
2. Termination by termination condition (search condition) F_flag is set to '1'.

SSTR

In SSTR, the status flags are not changed. The operation of SSCH is summarized as follows.

```
[Operation of SSTR]
  repeat
  R2-1==>R2
  R3==>mem[R1]
  R1+size==>R1
  check_interrupt
  until (R2=0)
```

A11-3 Register Values upon Completion of High level Instructions

If a high level function instruction is executed in data processor of the present invention, when the instruction is terminated, the value of each register changes as follows. RXinit represents the value of register RX before the instruction is executed. In addition, RX end represents the value of register RX after the instruction is executed.

[BVSCH]

If /F is used, the offset range from R1init to R1init+R2init−1 is searched.

If /B is used, the offset range from R1init to R1init−R2init+1 is searched.

If R2init(width)≦0, V_flag is set and the instruction is terminated. However, R1 and R2 are not changed.

If the search operation is successfully terminated:

R0 (base address): Not changed

R1 (offset): Search result. Bit offset of the bit being found.

R2 (width): Total bit field length. In short, in /F, R2init+R1init−R1init−R1end; in /B, R2init−R1init+R1end.

If the search operation is not successfully terminated:

R0 (base address): Not changed

R1 (offset): Offset of the bit following that which is last searched. In short, in /F, R1init+R2init; in /B, R1init–R2init. This is the same as BSCH.

R2 (width): 0

[BVMAP], [BVCPY]

If /F is used, the area with a bit offset of R1init to R1init+R2init–1 becomes src; the area with a bit offset of R4init to R4init+R2init–1 becomes dest.

If /B is used, the area with a bit offset of R1init –1 to R1init–R2init becomes src; the area with a bit offset of R4init–1 to R4init–R2init becomes dest.

If R2init (width)≦0, the instruction is terminated. R1, R2 and R4 are not changed.

R0 (src base): Not changed

R1 (src offset): If /F is used, R1init+R2init; if /B is used, R1init–R2init

R2 (width): 0

R3 (dest base): Not changed

R4 (dest offset): If /F is used, R4init+R2init; if /B is used, R4init–R2init.

R5 (type of operation): Not changed (only for BVMAP)

[BVPAT]

The area with the bit offset of R4init to R4init+R2init –1 becomes dest.

If R2init (width)≦0, the instruction is terminated. R2 and R4 are not changed.

R0 (pattern): Not changed

R2 (width): 0

R3 (dest base): Not changed

R4 (dest offset): R4init+R2init

R5 (type of operation): Not changed

[SMOV]

If /F is used, the area with the following addresses is src;

R0init to R0init+R2init*element_size–1 the area with the following addresses is dest;

R1init to R1init+R2init*element_size–1

If /B is used, the area with the following addresses is src;

R0init–1 to R0init–R2init*element_size the area with the following addresses is dest;

R1init –1 to R1init–R2init*element_size

For example, when the string from H'0000 to H'00ff is transferred to H'0300 to H'03ff, if it is copied using SMOV/F.W, registers are as follows;

R0=H'0000, R1=H'0300 and R2=H'0040

If it is copied using SMOV/B.W, registers are as follows;

R0=H'0100, R1=H'0400 and R2=H'0040.

However, if the termination condition is satisfied, the process is canceled immediately. The data which satisfies where the termination condition is transferred to dest.

If the instruction is terminated by the number of elements (V_flag=1):

R0 (src address): If /F is used, R0init+R2init*element size. If /B is used, R0init–R2init*element_size R1 (dest address): If /F is used, R1init+R2init*element size. If /B is used, R1init –R2init*element_size R2 (number of elements): 0

R3 (termination condition 1): Not changed

R4 (termination condition 2): Not changed

If the instruction is terminated because the termination condition has been satisfied (F_flag=1): R0 (src address): If /F is used, the address of the element following that of src where the termination condition is satisfied.

If /B is used, the address of the element of src where the termination condition is satisfied.

R1 (dest address): If /F is used, the address of dest where the element following the src which satisfied the termination condition should be transferred.

If /B is used, the address of dest where the element of src which satisfied the termination condition should be transferred.

With both /F and /B, R1init+R0end–R0init.

R2 (number of elements): The number of elements which has not transferred.

If /F is used, R2init–(R0end–R0init)/element_size.

If /B is used, R2init–(R0init–R0end)/element_size.

R3 (termination condition 1): Not changed

R4 (termination condition 2): Not changed

[SCMP]

If /F is used, the area with the following addresses is src1;

R0init to R0init+R2init*element_size–1 the area with the following address is src2;

R1init to R1init+R2init*element_size–1 If /B is used, the area with the following addresses is src1;

R0init–1 to R0init–R2init*element_size the area with the following addresses is src2;

R1init–1 to R1init–R2init*element_size

For example, If SCMP/F.W is used to compare the string of H'0000 to H'00ff with that of H'0300 to H'03ff, registers are as follows;

R0=H'0000, R1=H'0300, and R2=H'0040

When they are compared using SCMP/B.W, registers are as follows;

R0=H'0100, R1=H'0400, and R2=H'0040

However, if the termination condition is satisfied, the process is canceled midway. When the termination condition is satisfied, the elements are compared and the result is set to L_flag, X_flag and Z_flag. In addition, if a mismatched element is found during the comparison operation, the process is canceled midway.

If the instruction is terminated by the number of elements (V_flag=1):

R0 (src1 address): If /F is used, R0init+R2init*element size; if /B is used, R0init–R2init*element_size.

However, if R2init<0, it is not changed.

R1 (src2 address): If /F is used, R1init+R2init*element size; if /B is used, R1init–R2init*element_size.

R2 (number of elements): 0

R3 (termination condition 1): Not changed

R4 (termination condition 2): Not changed

If the instruction is terminated because the termination condition has been satisfied or because there is a mismatch of the element value (F_flag=1 .or. Z_flag=0):

R0 (src1 address): If /F is used, the address of the element following the src1 where the termination condition is satisfied (or by mismatch).

If /B is used, the address of the element of src1 where the termination condition is satisfied (or by mismatch).

R1 (src2 address): If /F is used, the address of the element of src2 which correspond to the element following the src1 where the termination condition is satisfied (or by mismatch).

If /B is used, the address of the element of src2 which corresponds to the src1 where the termination condition is satisfied (or by mismatch).

With both /F and /B, R1init+R0end–R0init.

R2 (number of elements): The number of elements which are not compared.

If /F is used, R2init–(R0end–R0init)/element_size; if /B is used, R2init–(R0init–R0end)/element_size.

R3 (termination condition1): Not changed

R4 (termination condition2): Not changed

[SSCH]

The area with the following addresses is searched if /F is used;

R0init to R0init+R2init*element_size–1

The area with the following addresses is searched every R5, if /R is used;

R0init to R0init+R5*R2init–1

However, if the termination (search) condition is satisfied, the process is canceled midway.

If the instruction is terminated by the number of elements (V_flag=1):

R0 (src address): If /F is used, R0init+R2init*element_size; if /R is used, R0init+R2init*R5 R2 (number of elements): 0

R3 (termination condition 1): Not changed

R4 (termination condition 2): Not changed

R5 (pointer update value): Not changed

If the instruction is terminated by satisfying the termination (search) condition (F_flag=1):

R0 (src address): The address of the element following the src which satisfies the termination condition R2 (number of elements): Number of elements which have not been searched. If /F is used, R2init–(R0end–R0init)/element_size.

If /R is used, R2init–(R0end–R0init)/R5

R3 (termination condition 1): Not changed

R4 (termination condition 2): Not changed

R5 (pointer update value): Not changed

[SSTR]

Data which is assigned by R3 is repeatedly written to the area with the following address;

R1init to R1init+R2init*element_size–1

Unlike other instructions, the termination condition is not assigned. In addition, the flags are not set. If R2init (width) ≦0, the instruction is immediately terminated. R1 and R2 are not changed.

R1 (dest address): R1init+R2init*element size

R2 (number of elements): 0

R3 (write data): Not changed

[QSCH]

If the instruction is terminated by the queue termination value (R2) (V_flag=1):

R0 (entry address): R2init

R1 (previous entry): The address of the entry just before (in the case of /F) or just after (in the case of /B) the entry represented with R0end.

R2 (queue termination value): Not changed

R3 (termination condition 1): Not changed

R4 (termination condition 2): Not changed

R5 (offset): Not changed

R6 (mask): Not changed

If the instruction is terminated because the termination condition (search condition) has been satisfied (F_flag=1):

R0 (entry address): The address of the queue entry because the termination condition has been satisfied.

R1 (previous entry): The address of the entry just before the entry (in the case of /F) represented by R0end or just after the entry (in the case of /B) represented with R0end.

R2 (queue termination value): Not changed

R3 (termination condition 1): Not changed

R4 (termination condition 2): Not changed

R5 (offset): Not changed

R6 (mask): Not changed

Figure 1:
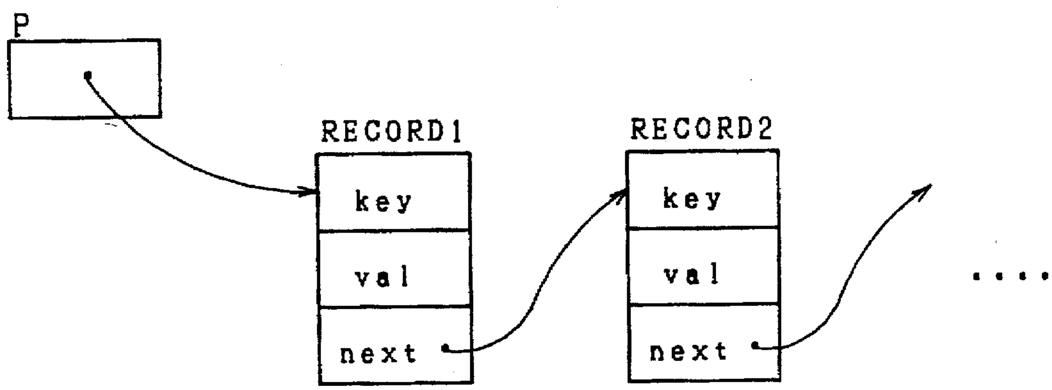
FIG. 1 is a structural view of data at the conventional apparatus.
Figure 2:
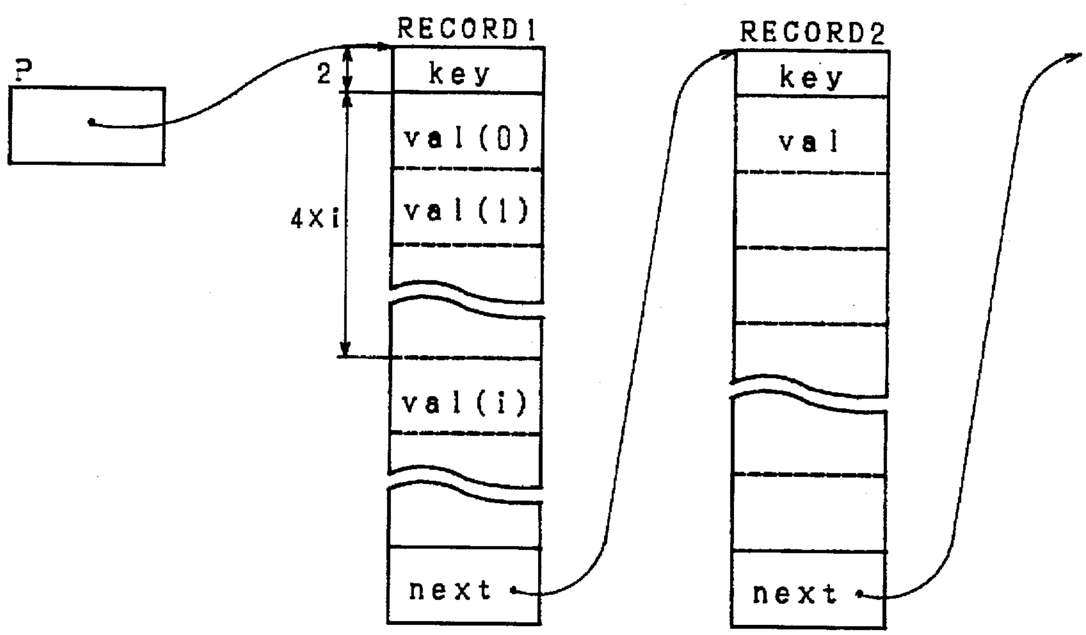
FIG. 2-(A) and -(B) are illustrations of address calculation at the conventional data processor.
Figure 2B:
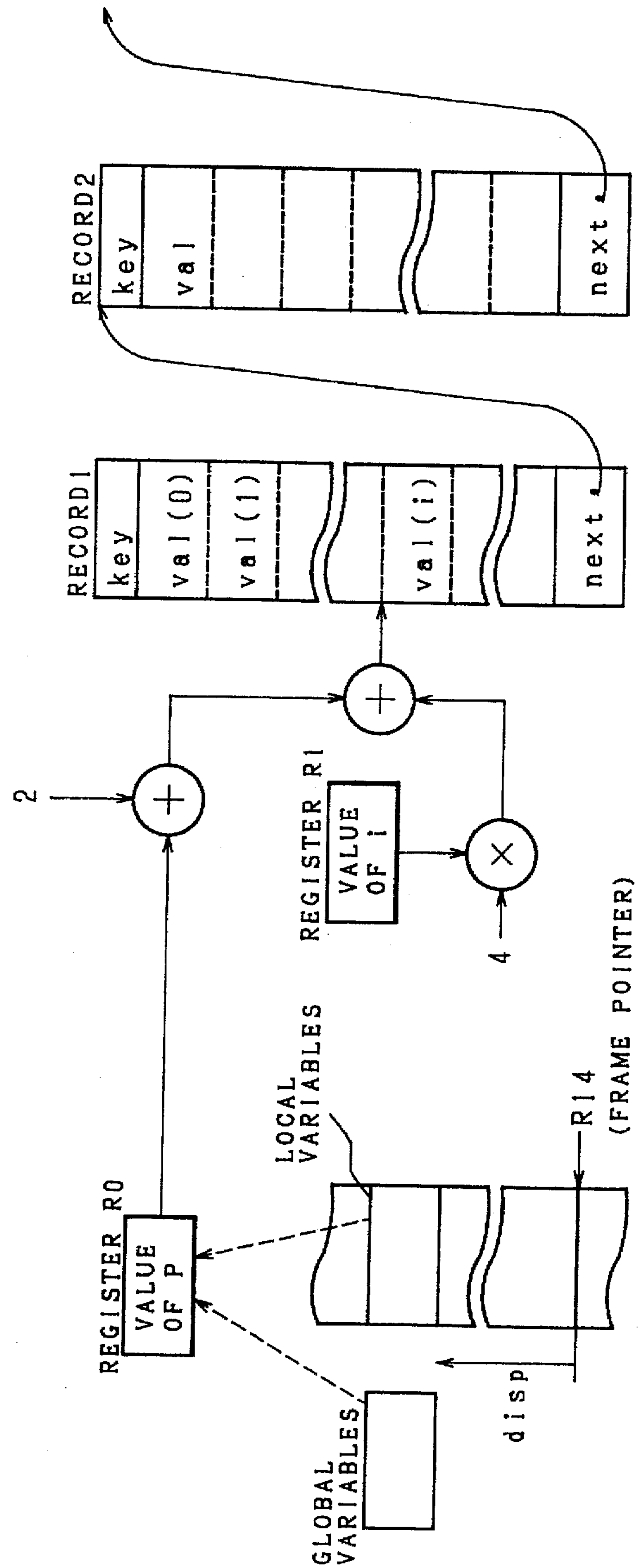
Figure 3:
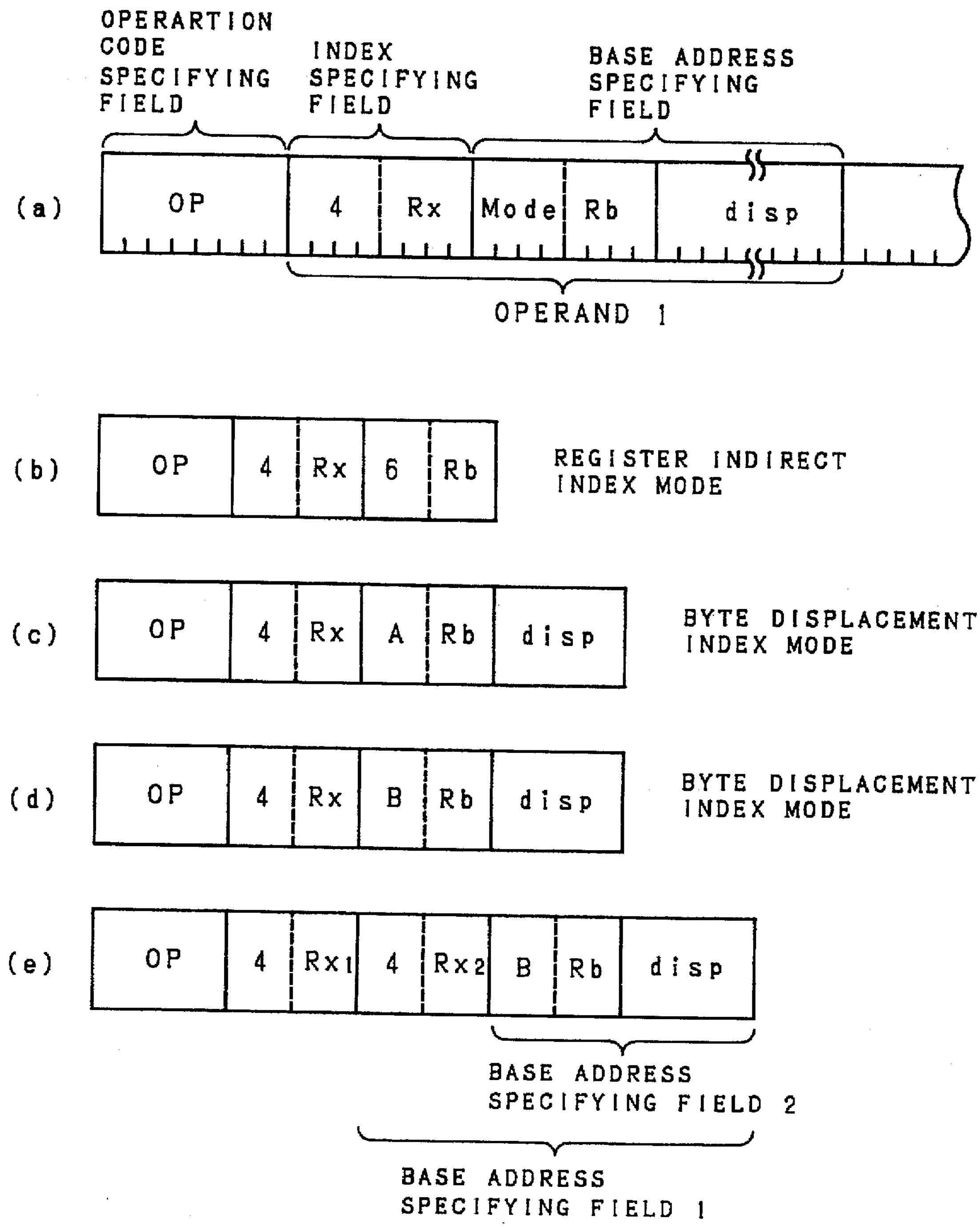
FIG. 3 is an illustration of an operand extension method at the conventional apparatus.

The data processor of the present invention is different from the conventional one in that, in the example in FIG. 2-(B), (1) When P is in the register R0, val [i] is representable as @(R0, 2, R1*4), (2) When P is a global variable, val [i] as @(@(0, p), 2, R1*4), and (3) When P is a local variable and positioned at displacement disp from the present frame pointer, val [i] as @(@(R14, disp), 2, R1*4).

As seen from the above, the present invention can make it easy for the data processor to reference the operand without executing a needless instruction for address computation, and also facilitates the structure of complier. In the instruction format of the present invention, the field for specifying the base address is provided ahead of the operand so that the address modification extension is performed with respect to the base address, thereby sequentially calculating the address while reading each part of the operand.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method for providing an address in a data processor, the data processor having an instruction execution unit for executing a plurality of instructions, said address based on address information in said instructions and a memory having a plurality of addressable memory elements, each of said memory elements being addressable by an addressable having an address bit-width, the method comprising:

receiving instructions from memory, at least a first of said instructions having at least one operand, at least another of said instructions having means for specifying an address, the range of said address being the entire memory range addressable by addresses with said bit-width said instruction having at least an operation code specifying portion for specifying the kind of operation;

an effective address specifying field specifying a first intermediate address of at least one operand;

a first additional mode specifying field usable in performing address extension modification with respect to at least said first intermediate address to provide a second intermediate address, first bit means in said first instruction for indicating whether or not further modification is to be performed, said bit means being provided in said instruction without being provided in every address word in memory, receiving a second additional mode specifying field when said first bit means has a first value, said second additional mode specifying field usable in performing address extension modification to at least said second intermediate address provided in connection with said first additional mode specifying field;

receiving a second bit means for indicating whether or not further modification is to be performed said second bit means being a bit in said first instruction;

providing said first intermediate address using said effective address specifying field;

providing a second intermediate address, using said first additional mode specifying field and said first intermediate address, before said step of receiving said second bit means;

providing a third address, using said second additional mode specifying field and said second intermediate address, when said first bit means has said first value;

deriving an address, said derived address being based at least partly on said third address when said first bit means has said first value, and said derived address being based on said second intermediate address when said first bit means has a second value; and providing said derived address to said instruction execution unit.

2. A method, as claimed in claim 1, wherein said step of providing said first intermediate address is performed without using said first additional mode specifying field.

3. A method, as claimed in claim 1, wherein said step of providing said second intermediate address is performed without using said second additional mode specifying field.

4. A method, as claimed in claim 1, wherein said step of providing said first intermediate address is performed before said step of providing a second intermediate address.

5. A method, as claimed in claim 1, wherein said step of providing said second intermediate address is performed before said step of providing a third address.

6. A method for providing first and second operand addresses in a data processor, the data processor having a memory, said memory having a plurality of addressable memory elements each of said memory elements being addressable by an address having an address bit-width, a means for receiving instructions from memory, and an instruction execution unit for executing a plurality of instructions, said address based on address information in said instructions, the method comprising:

receiving in said means for receiving, at least portions of instructions from memory, at least a first of said instructions being an instruction for an operation in relation to at least first and second operands, at least another of said instructions having means for specifying an address, the range of said address being the entire memory range addressable by addresses with said bit-width, said first instruction having a first operation code for specifying a single operation;

a first plurality of fields for specifying a first operand address including at least a first effective address-specifying field and first and second address information fields, said first plurality of fields including at least a first bit means in said first instruction for indicating whether or not further modification is to be performed, said bit means being provided in said instruction without being provided in every address word in memory;

a second plurality of fields for specifying a second operand address, including at least a second effective address-specifying field and at least one extension modification field, said second plurality of fields including at least second bit means for indicating whether or not further modification is to be performed;

said first effective address-specifying field specifying an effective address of said first operand;

said first and second address information fields usable for obtaining an address for said first operand;

said second effective address-specifying field specifying an effective address of said second operand, said at least one extension modification field usable for obtaining an address for said second operand;

obtaining said address for said first operand without reference to a second operation code by a process including providing a first intermediate address using said first effective address specifying field, without reference to said first or second address information field;

providing a second intermediate address using said first intermediate address and said first address information field, without reference to said second address information field;

providing a third address using said second intermediate address and said second address information field before receiving any of said second plurality of fields in said means for receiving;

deriving an address based at least partly on said third address; and providing said obtained address to said instruction execution unit.

7. A method for providing an address in a data processor, the data processor having an instruction execution unit for executing a plurality of instructions, and a memory having a plurality of addressable memory elements, each of said memory elements being addressable by an address having an address bit-width, said address based on address information in said instructions, the method comprising:

receiving instructions from memory, at least a first of said instructions having at least one operand, at least another of said instructions having means for specifying an address, the range of said address being the entire memory range addressable by addresses with said bit-width, said first instruction having at least an operation code specifying portion for specifying the kind of operation;

an effective address specifying field specifying a first intermediate address of at least one operand;

a first additional mode specifying field usable in performing address extension modification with respect to at least said first intermediate address to provide a second intermediate address, said first additional mode specifying field including first means in said first instruction for indicating whether or not further modification is to be performed, said first means being provided in said first instruction without being provided in every address word in memory, second means for indicating whether or not indirect memory reference is to be performed, third means for identifying a register, fourth means for indicating a scaling factor and fifth means for indicating a displacement;

providing said first intermediate address using said effective address specifying field;

calculating a temporary address using said first additional mode specifying field by adding first and second quantities to said first intermediate address, said first quantity being equal to the contents of the register specified by said third means multiplied by said scaling factor indicated by said fourth means and said second quantity being based on said displacement indicated by said fifth means;

providing said second intermediate address being equal to said temporary address when said second means indicates direct reference and said second intermediate address being equal to the value stored at said temporary address when said second means indicates indirect memory reference;

receiving a second additional mode specifying field when said first bit means has a first value, said second additional mode specifying field usable in performing address extension modification to at least said second intermediate address provided in connection with said first additional mode specifying field;

receiving a second bit means for indicating whether or not further modification is to be performed, said receiving of said second bit means occurring after said step of providing a second intermediate address;

providing a third address using said second additional mode specifying field and said second intermediate address when said first bit means has said first value;

deriving an address to provide a derived address, said derived address being based at least partly on said third address when said first bit means has said first value, said derived address being based on said second intermediate address when said first bit means has a second value; and providing said derived address to said instruction execution unit.

8. In a data processor having an instruction execution unit for executing a plurality of instructions, and a memory having a plurality of addressable memory elements each of said memory elements being addressable by an address having an address bit-width, apparatus for providing an address based on address information in said instructions, comprising:

means for receiving instructions from memory, at least one of said instructions having at least one operand, at least another of said instructions having means for specifying an address, the range of said address being the entire memory range addressable by addresses with said bit-width, said one instruction having an operation code specifying portion for specifying the kind of operation;

an effective address specifying field specifying an effective first intermediate address of at least one operand;

a first additional mode specifying field which includes a first mode specifier usable in performing address extension modification with respect to at least said first intermediate address according to a first addressing mode specified by said first mode specifier to provide a second intermediate address;

bit means in said instruction for indicating that further modification is to be performed when said bit means has a first value and for indicating no further modification when said bit means has a second value, said bit means being provided in said instruction without being provided in every address word in memory;

a second additional mode specifying field which includes a second mode specifier usable in performing address extension modification with respect to at least said second intermediate address provided in connection with said first additional mode specifying field according to a second addressing mode, different from said first addressing mode, specified by said second mode specifier to provide a third address;

means for deriving an address based at least partly on said third address; and means for providing said derived address to said instruction execution unit.

9. Apparatus, as set forth in claim 8, wherein said first intermediate address is provided using information specified by said effective address specifying field without reference to said first additional mode specifying field.

10. Apparatus, as set forth in claim 8 wherein said second intermediate address is provided using information specified by said effective address specifying field and said first additional mode specifying field without reference to said second additional mode specifying field.

11. Apparatus as claimed in claim 8, wherein said bit means includes a bit in said first additional mode specifying field.

12. Apparatus, as claimed in claim 8, wherein each additional mode specifying field includes a bit means for indicating whether or not further modification is to be performed.

13. In a data processor having an instruction execution unit for executing a plurality of instructions, apparatus for providing an address based on address information in said instructions, comprising:

means for receiving instructions from memory, at least one of said instructions having at least one operand, said instruction having an operation code specifying portion for specifying the kind of operation;

a plurality of fields for specifying a first operand address including, at least an effective address specifying field and first and second additional mode specifying fields;

said effective address specifying field specifying an effective first intermediate address of at least one operand;

said first additional mode specifying field usable in performing address extension modification with respect to at least said first intermediate address to provide a second intermediate address;

said second additional mode specifying field usable in performing address extension modification with respect to at least said second intermediate address provided in connection with said first additional mode specifying field to provide a third address;

wherein each of said first and second additional mode specifying fields has at least one of the following fields an indirect reference specifying field means for indicating whether or not memory is indirectly referenced in each said additional mode specifying field, an index addition field means for indicating whether or not an index register is added in each said additional mode specifying field, an index register number field means for indicating the register number for each said additional mode specifying field, and a displacement length field means for indicating a length of displacement to be added in each said additional mode specifying field;

means for deriving an address based at least partly on said effective address specifying field and said first and second additional mode specifying fields; and means for providing said derived address to said instruction execution unit.

14. In a data processor having an instruction execution unit for executing instructions in relation to data at addresses obtainable from address information in said instructions, apparatus for providing an address based on said information, comprising:

means for receiving at least portions of instructions from memory, at least a first of said instructions having a plurality of fields including at least a first field means for specifying an operation to be performed, second field means for specifying a first intermediate address of a first operand, third field means for specifying addressing extension with respect to said first intermediate address to provide a second intermediate address, fourth field means for specifying an addressing extension as an extension to said second intermediate address and field means for specifying the address of a second operand which includes at least a fifth field; and means for providing an address using at least said second, third, and fourth means before receiving said fifth field in said means for receiving.

15. In a data processor having an instruction execution unit for executing a plurality of instructions and a memory having a plurality of addressable memory elements each of said memory elements being addressable by an address having an address bit-width, apparatus for providing an address based on address information in said instructions, comprising:

means for receiving instructions from memory, at least one of said instructions having at least one operand, at least another of said instructions having means for specifying an address, the range of said address being the entire memory range addressable by addresses with said bit-width, said at least one instruction having first means for specifying the kind of operation;

second means for specifying a first intermediate address;

third means for specifying information usable in performing address extension modification of said first intermediate address to provide a second intermediate address, said third means also including continuation bit means in said one instruction wherein when said bit means has a first value, said bit means indicates further extension modification is to be performed and when said bit means has a second value, said bit means indicates further extension modification is not to be performed, said bit means being provided in said one instruction without being provided in every address word in memory;

means for obtaining an address based at least partly on said second intermediate address; and means for providing said obtained address to said instruction execution unit.

16. In a data processor having an instruction execution unit for executing a plurality of instructions and a memory having a plurality of addressable memory elements, each of said memory elements being addressable by an address having an address bit-width, apparatus for providing an address based on address information in said instructions, comprising:

means for receiving at least portions of instructions from memory, at least one of said instructions having first and second operands, at least another of said instructions having means for specifying an address, the range of said address being the entire memory range addressable by addresses with said bit-width, said at least one instruction having:

an operation code-specifying portion for specifying the kind of operation;

a first plurality of fields for specifying a first operand address including at least a first effective address-specifying field and first and second additional mode-specifying fields, said first plurality of fields including at least a first bit means in said one instruction for indicating whether or not further modification is to be performed, said bit means being provided in said instruction without being provided in every address word in memory, a second plurality of fields for specifying a second operand address including at least a second effective address specifying field, said first effective address-specifying field specifying a first intermediate address of said first operand;

said first additional mode-specifying field usable in performing address extension modification with respect to at least said first intermediate address to provide a second intermediate address;

said second additional mode-specifying field usable in performing address extension modification to at least said second intermediate address provided in connection with said first additional mode-specifying field to provide a third intermediate address said second effective address-specifying field, specifying an effective address of said second operand;

means for providing a third address based on said third intermediate address, before receiving said second effective address-specifying field in said means for receiving; and means for providing said third address to said instruction execution unit.

17. In a data processor having an instruction execution unit for executing a plurality of instructions in relation to data at addresses obtainable from address information in said instructions, apparatus for providing an address based on said information, comprising:

means for receiving at least portions of instructions from memory, at least a first of said instructions having a plurality of fields including at least a first field means for specifying an operation to be performed, a second field means for specifying a first intermediate address of a first operand, a third field means for specifying addressing extension with respect to said first intermediate address to provide a second intermediate address and a fourth field means for specifying addressing extension with respect to said second intermediate address to provide a third address;

first means for indicating whether or not said second intermediate address is indirectly referenced;

second means, different from said first means, for indicating whether or not said third address is indirectly referenced, and means for deriving an address of a first operand based at least partly on said third address.

18. In a data processor having an instruction execution unit for executing instructions in relation to data at addresses obtainable from address information in said instructions, apparatus for providing an address based on said information, comprising:

means for receiving at least portions of instructions from memory, at least a first of said instructions having a plurality of fields including at least a first field means for specifying an operation to be performed, second field means for specifying a first intermediate address of a first operand, third field means for specifying addressing extension with respect to said first intermediate address to provide a second intermediate address and fourth field means for specifying addressing extensions with respect to said second intermediate address to provide a third address;

first means, in said third field means, for indicating whether or not an index register is to be added to said first intermediate address second means, different from said first means, for indicating whether or not an index register is to be added to said second intermediate address; and means for deriving an address based at least partly on said second intermediate address.

19. In a data processor having an instruction execution unit for executing a plurality of instructions and a memory having a plurality of addressable memory elements each of said memory elements being addressable by an address having an address bit-width, apparatus for providing an address based on address information in said instructions, comprising:

means for receiving instructions from memory, at least one of said instructions having at least one operand, at least another of said instructions having means for specifying an address, the range of said address being the entire memory range addressable by addresses with said bitwidth, said one instruction having an operation code specifying portion for specifying the kind of operation;

an address specifying field specifying an intermediate address of at least one operand;

one or a plurality of extension field including address extension modification information to be used with said intermediate address on the address extension modification information of the preceding extension field; and bit means in said instruction for indicating that further modification is to be performed when said bit means has a first value and for indicating no further modification when said bit means has a second value, said bit means being provided for each said extension field;

means for deriving an address based on the extension field when said bit means has said second value; and means for providing said derived address to said instruction execution unit.

* * * * *